US011740776B2

(12) United States Patent
Wilson et al.

(10) Patent No.: US 11,740,776 B2
(45) Date of Patent: Aug. 29, 2023

(54) CONTEXT-SPECIFIC USER INTERFACES

(71) Applicant: Apple Inc., Cupertino, CA (US)

(72) Inventors: Christopher Wilson, San Francisco, CA (US); Gary Ian Butcher, San Jose, CA (US); Kevin Will Chen, Sunnyvale, CA (US); Imran Chaudhri, San Francisco, CA (US); Alan C. Dye, San Francisco, CA (US); Aurelio Guzman, San Jose, CA (US); Jonathan P. Ive, San Jose, CA (US); Chanaka G. Karunamuni, San Jose, CA (US); Kenneth Kocienda, San Jose, CA (US); Kevin Lynch, Woodside, CA (US); Pedro Mari, Santa Cruz, CA (US); Alessandro Sabatelli, San Francisco, CA (US); Brian Schmitt, Venice, CA (US); Eric Lance Wilson, San Jose, CA (US); Lawrence Y. Yang, Bellevue, WA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/935,002

(22) Filed: Jul. 21, 2020

(65) Prior Publication Data

US 2020/0348827 A1 Nov. 5, 2020

Related U.S. Application Data

(63) Continuation of application No. 15/405,122, filed on Jan. 12, 2017, which is a continuation of application
(Continued)

(51) Int. Cl.
*G06F 3/04845* (2022.01)
*G06T 3/60* (2006.01)
(Continued)

(52) U.S. Cl.
CPC .......... *G06F 3/04845* (2013.01); *G06F 1/163* (2013.01); *G06F 3/017* (2013.01);
(Continued)

(58) Field of Classification Search
CPC ...... G06F 3/04845; G06F 9/451; G06F 1/163; G06F 3/0362; G06F 3/0416;
(Continued)

(56) References Cited

U.S. PATENT DOCUMENTS

| | | | |
|---|---|---|---|
| 872,200 | A | 11/1907 | Rowe |
| 3,148,500 | A | 9/1964 | Thomas |

(Continued)

FOREIGN PATENT DOCUMENTS

| | | | |
|---|---|---|---|
| AU | 2010249319 | A1 | 6/2012 |
| AU | 2015101019 | A4 | 9/2015 |

(Continued)

OTHER PUBLICATIONS

Applicant-Initiated Interview Summary received for U.S. Appl. No. 15/421,865, dated Dec. 15, 2020, 6 pages.

(Continued)

*Primary Examiner* — Matthew Ell
*Assistant Examiner* — Kenny Nguyen
(74) *Attorney, Agent, or Firm* — DLA Piper LLP (US)

(57) ABSTRACT

Context-specific user interfaces for use with a portable multifunction device are disclosed. The methods described herein for context-specific user interfaces provide indications of time and, optionally, a variety of additional information. Further disclosed are non-transitory computer-readable storage media, systems, and devices configured to perform the methods described herein.

42 Claims, 115 Drawing Sheets

Related U.S. Application Data

No. 14/815,898, filed on Jul. 31, 2015, now Pat. No. 9,582,165, which is a continuation of application No. PCT/US2015/034607, filed on Jun. 7, 2015.

(60) Provisional application No. 62/129,835, filed on Mar. 7, 2015, provisional application No. 62/044,994, filed on Sep. 2, 2014, provisional application No. 62/032,562, filed on Aug. 2, 2014.

(51) Int. Cl.

| | |
|---|---|
| ***G06F 3/0488*** | (2022.01) |
| ***G06F 3/04842*** | (2022.01) |
| ***G06F 3/04817*** | (2022.01) |
| ***G06F 3/0482*** | (2013.01) |
| ***G06F 3/0485*** | (2022.01) |
| ***G06F 9/451*** | (2018.01) |
| ***G06F 1/16*** | (2006.01) |
| ***G06F 3/0362*** | (2013.01) |
| ***G06F 3/041*** | (2006.01) |
| ***G06F 3/04883*** | (2022.01) |
| ***G06F 3/01*** | (2006.01) |
| ***G06F 3/04847*** | (2022.01) |
| ***G06T 13/80*** | (2011.01) |

(52) U.S. Cl.

CPC .......... *G06F 3/0362* (2013.01); *G06F 3/0416* (2013.01); *G06F 3/0482* (2013.01); *G06F 3/0485* (2013.01); *G06F 3/0488* (2013.01); *G06F 3/04817* (2013.01); *G06F 3/04842* (2013.01); *G06F 3/04847* (2013.01); *G06F 3/04883* (2013.01); *G06F 9/451* (2018.02); *G06T 3/60* (2013.01); *G06T 13/80* (2013.01); *G06T 2213/00* (2013.01)

(58) Field of Classification Search

CPC .. G06F 3/04883; G06F 3/0482; G06F 3/0485; G06F 3/017; G06F 3/04847; G06F 3/0488; G06F 3/04842; G06F 3/04817; G06T 13/80; G06T 3/60; G06T 2213/00

See application file for complete search history.

(56) References Cited

U.S. PATENT DOCUMENTS

| | | | |
|---|---|---|---|
| 4,205,628 | A | 6/1980 | Null |
| 4,355,380 | A | 10/1982 | Huguenin et al. |
| 4,597,674 | A | 7/1986 | Thompson, III |
| 4,847,819 | A | 7/1989 | Hong |
| 4,945,521 | A | 7/1990 | Klaus |
| 5,124,959 | A | 6/1992 | Yamazaki et al. |
| 5,208,790 | A | 5/1993 | Sato et al. |
| 5,220,541 | A | 6/1993 | Vuilleumier |
| 5,455,808 | A | 10/1995 | Grupp et al. |
| 5,500,835 | A | 3/1996 | Born |
| 5,508,979 | A | 4/1996 | Eisenegger |
| 5,659,693 | A | 8/1997 | Hansen et al. |
| 5,825,353 | A | 10/1998 | Will |
| 5,845,257 | A | 12/1998 | Fu et al. |
| 5,892,519 | A | 4/1999 | Hirai et al. |
| 5,986,655 | A | 11/1999 | Chiu et al. |
| 5,999,195 | A | 12/1999 | Santangeli |
| 6,043,818 | A | 3/2000 | Nakano et al. |
| 6,084,598 | A | 7/2000 | Chekerylla |
| 6,097,371 | A | 8/2000 | Siddiqui et al. |
| 6,128,012 | A | 10/2000 | Seidensticker et al. |
| 6,160,767 | A | 12/2000 | Ho |
| 6,199,012 | B1 | 3/2001 | Hasegawa |
| 6,279,018 | B1 | 8/2001 | Kudrolli et al. |
| 6,297,795 | B1 | 10/2001 | Kato et al. |
| 6,353,449 | B1 | 3/2002 | Gregg et al. |
| 6,359,839 | B1 | 3/2002 | Schenk et al. |
| 6,416,471 | B1 | 7/2002 | Kumar et al. |
| 6,441,824 | B2 | 8/2002 | Hertzfeld et al. |
| 6,449,219 | B1 | 9/2002 | Hepp et al. |
| 6,452,597 | B1 | 9/2002 | Goldberg et al. |
| 6,477,117 | B1 | 11/2002 | Narayanaswami et al. |
| 6,496,780 | B1 | 12/2002 | Harris et al. |
| 6,525,997 | B1 | 2/2003 | Narayanaswami et al. |
| 6,539,243 | B1 | 3/2003 | Kimura et al. |
| 6,539,343 | B2 | 3/2003 | Zhao et al. |
| 6,549,218 | B1 | 4/2003 | Gershony et al. |
| 6,556,222 | B1 | 4/2003 | Narayanaswami |
| 6,690,623 | B1 | 2/2004 | Maano |
| 6,728,533 | B2 | 4/2004 | Ishii et al. |
| 6,806,893 | B1 | 10/2004 | Kolawa et al. |
| 6,809,724 | B1 | 10/2004 | Shiraishi et al. |
| 6,871,076 | B2 | 3/2005 | Samn et al. |
| 7,036,025 | B2 | 4/2006 | Hunter |
| 7,036,090 | B1 | 4/2006 | Nguyen |
| 7,113,809 | B2 | 9/2006 | Noesgaard et al. |
| 7,203,380 | B2 | 4/2007 | Chiu et al. |
| 7,257,254 | B2 | 8/2007 | Tunney et al. |
| 7,302,650 | B1 | 11/2007 | Allyn et al. |
| 7,378,954 | B2 | 5/2008 | Wendt et al. |
| 7,479,949 | B2 | 1/2009 | Jobs et al. |
| 7,515,509 | B2 | 4/2009 | Klein et al. |
| 7,515,903 | B1 | 4/2009 | Cast |
| 7,593,749 | B2 | 9/2009 | Vallström et al. |
| 7,619,615 | B1 | 11/2009 | Donoghue et al. |
| 7,637,204 | B2 | 12/2009 | Sumser et al. |
| 7,716,057 | B2 | 5/2010 | Horvitz |
| 7,751,285 | B1 | 7/2010 | Cain et al. |
| 7,773,460 | B2 | 8/2010 | Holt |
| 7,843,769 | B2 | 11/2010 | Ishida et al. |
| 7,898,542 | B1 | 3/2011 | Yu et al. |
| 7,907,476 | B2 | 3/2011 | Lee |
| 8,041,968 | B2 | 10/2011 | Tupman |
| 8,046,617 | B2 | 10/2011 | Fleck et al. |
| 8,105,208 | B2 | 1/2012 | Oleson et al. |
| 8,238,876 | B2 | 8/2012 | Teng et al. |
| 8,245,143 | B2 | 8/2012 | Yach et al. |
| 8,364,855 | B2 | 1/2013 | James et al. |
| 8,375,326 | B2 | 2/2013 | Bucher et al. |
| 8,405,663 | B2 | 3/2013 | Wikkerink et al. |
| 8,462,997 | B2 | 6/2013 | Soldan et al. |
| 8,584,031 | B2 | 11/2013 | Moore et al. |
| 8,595,649 | B2 | 11/2013 | Sherrard et al. |
| 8,613,070 | B1 | 12/2013 | Deva et al. |
| 8,635,475 | B2 | 1/2014 | Lin et al. |
| 8,686,961 | B2 | 4/2014 | Yamano |
| 8,725,842 | B1 | 5/2014 | Al-nasser |
| 8,732,609 | B1 | 5/2014 | Bayersdorfer et al. |
| 8,768,648 | B2 | 7/2014 | Panther et al. |
| 8,775,844 | B1 | 7/2014 | Peterson |
| 8,811,951 | B1 | 8/2014 | Faaborg et al. |
| 8,825,445 | B2 | 9/2014 | Hoffman et al. |
| 8,847,903 | B2 | 9/2014 | Stokes et al. |
| 8,854,925 | B1 | 10/2014 | Lee et al. |
| 8,866,761 | B2 | 10/2014 | Enami |
| 8,868,338 | B1 | 10/2014 | Lookingbill et al. |
| 8,884,874 | B1 | 11/2014 | Chun et al. |
| 8,903,671 | B2 | 12/2014 | Park et al. |
| 8,924,894 | B1 | 12/2014 | Yaksick et al. |
| 8,938,394 | B1 | 1/2015 | Faaborg et al. |
| 8,948,819 | B2 | 2/2015 | Yun et al. |
| 8,963,894 | B2 | 2/2015 | Klassen et al. |
| 8,996,639 | B1 | 3/2015 | Faaborg et al. |
| 9,070,092 | B2 | 6/2015 | Shieh et al. |
| 9,082,314 | B2 | 7/2015 | Tsai |
| 9,100,944 | B2 | 8/2015 | Sauhta et al. |
| 9,141,270 | B1 | 9/2015 | Stuart et al. |
| 9,152,211 | B2 | 10/2015 | Gunn et al. |
| 9,152,212 | B2 | 10/2015 | Gunn |
| 9,164,663 | B1 | 10/2015 | Berard |
| 9,171,268 | B1 | 10/2015 | Penilla et al. |
| 9,173,052 | B2 | 10/2015 | Hauser et al. |
| 9,191,988 | B2 | 11/2015 | Newham |
| 9,197,738 | B2 | 11/2015 | Peev et al. |
| 9,237,855 | B2 | 1/2016 | Hong et al. |

(56) References Cited

U.S. PATENT DOCUMENTS 9,239,605 B1 1/2016 Nanda et al.
9,244,562 B1 1/2016 Moscovich et al.
9,259,615 B2 2/2016 Weast et al.
9,292,310 B2 3/2016 Chaudhri et al.
9,369,537 B1 6/2016 Mathew et al.
9,377,762 B2 6/2016 Hoobler et al.
9,400,489 B2 7/2016 Kim et al.
9,436,269 B2 9/2016 Yang
9,448,685 B1 9/2016 Somin et al.
9,459,781 B2 10/2016 Kocienda et al.
9,477,208 B2 10/2016 Park et al.
9,489,074 B2 11/2016 Oonishi
9,542,070 B2 1/2017 Xu et al.
9,547,425 B2 1/2017 Kocienda et al.
9,557,806 B2 1/2017 Väyrynen
9,568,891 B2 2/2017 Adams et al.
9,582,165 B2 2/2017 Wilson et al.
9,594,354 B1 3/2017 Kahn et al.
9,600,178 B2 3/2017 Yun et al.
9,606,695 B2 3/2017 Matas
9,625,987 B1 4/2017 Lapenna et al.
9,729,730 B2 8/2017 Levesque et al.
9,753,436 B2 9/2017 Ely et al.
9,756,172 B2 9/2017 Piemonte et al.
9,794,397 B2 10/2017 Min et al.
9,800,525 B1 10/2017 Lerner et al.
9,939,872 B2 4/2018 Graham et al.
10,019,599 B1 7/2018 Moran et al.
10,055,121 B2 8/2018 Chaudhri et al.
10,062,133 B1 8/2018 Mishra et al.
10,135,905 B2 11/2018 Chaudhri et al.
10,216,392 B2 2/2019 Zhao
10,268,432 B2 4/2019 Kyung
10,282,078 B2 5/2019 Choi
10,304,347 B2 5/2019 Wilson et al.
10,317,977 B2 6/2019 Yang
10,356,070 B2 7/2019 Cha et al.
10,459,887 B1 10/2019 Dvortsov et al.
10,466,881 B2 11/2019 Sasaki et al.
10,489,508 B2 11/2019 Zhai et al.
10,620,590 B1 4/2020 Guzman et al.
10,643,246 B1 5/2020 Suprasadachandran Pillai
10,684,592 B2 6/2020 Chang et al.
10,721,711 B2 7/2020 Kirov et al.
10,761,702 B2 9/2020 Block et al.
10,788,797 B1 9/2020 Guzman et al.
10,807,005 B2 10/2020 Dugan et al.
10,817,981 B1 10/2020 Belkin
10,852,905 B1 12/2020 Guzman et al.
10,878,782 B1 12/2020 Guzman et al.
10,908,559 B1 2/2021 Guzman et al.
10,936,345 B1 3/2021 Guzman et al.
11,009,833 B2 5/2021 Essery
11,023,090 B2 6/2021 Xu et al.
11,050,873 B2 6/2021 Kim et al.
11,061,372 B1 7/2021 Chen et al.
11,435,887 B1 9/2022 Mirho et al.
2002/0054066 A1 5/2002 Kikinis et al.
2002/0054157 A1 5/2002 Hayashi et al.
2002/0054541 A1 5/2002 Hall et al.
2002/0059623 A1 5/2002 Rodriguez et al.
2002/0081976 A1 6/2002 Fujisawa et al.
2002/0098857 A1 7/2002 Ishii
2002/0099452 A1 7/2002 Kawai
2002/0115478 A1 8/2002 Fujisawa et al.
2002/0131331 A1 9/2002 Molander et al.
2002/0140633 A1 10/2002 Rafii et al.
2002/0180797 A1 12/2002 Bachmann
2003/0002391 A1 1/2003 Biggs et al.
2003/0027621 A1 2/2003 Libby et al.
2003/0067497 A1 4/2003 Pichon et al.
2003/0074647 A1 4/2003 Andrew et al.
2003/0079057 A1 4/2003 Ruskin et al.
2003/0081506 A1 5/2003 Karhu et al.
2003/0107603 A1 6/2003 Clapper
2003/0135769 A1 7/2003 Loughran
2003/0140309 A1 7/2003 Saito et al.
2003/0164847 A1 9/2003 Zaima et al.
2003/0169306 A1 9/2003 Makipaa et al.
2003/0182628 A1 9/2003 Lira
2003/0214885 A1 11/2003 Powell et al.
2003/0229900 A1 12/2003 Reisman
2004/0001105 A1 1/2004 Chew et al.
2004/0017733 A1 1/2004 Sullivan
2004/0021699 A1 2/2004 Fildebrandt et al.
2004/0047244 A1 3/2004 Iino et al.
2004/0066710 A1 4/2004 Yuen et al.
2004/0075699 A1 4/2004 Franchi et al.
2004/0075700 A1 4/2004 Liu et al.
2004/0077462 A1 4/2004 Brown et al.
2004/0083474 A1 4/2004 Mckinlay et al.
2004/0168107 A1 8/2004 Sharp et al.
2004/0181771 A1 9/2004 Anonsen et al.
2004/0192332 A1 9/2004 Samn
2004/0203342 A1 10/2004 Sibecas et al.
2004/0218472 A1 11/2004 Narayanaswami et al.
2004/0225966 A1 11/2004 Besharat et al.
2004/0243547 A1 12/2004 Chhatrapati et al.
2004/0266491 A1 12/2004 Howard et al.
2005/0015803 A1 1/2005 Macrae et al.
2005/0041667 A1 2/2005 Miller et al.
2005/0052446 A1 3/2005 Plut
2005/0094492 A1 5/2005 Rosevear et al.
2005/0124389 A1 6/2005 Yang
2005/0125744 A1 6/2005 Hubbard et al.
2005/0139852 A1 6/2005 Chen et al.
2005/0156873 A1 7/2005 Walter et al.
2005/0188856 A1 9/2005 Sumser et al.
2005/0190653 A1 9/2005 Chen
2005/0195173 A1 9/2005 Mckay
2005/0197063 A1 9/2005 White et al.
2005/0198319 A1 9/2005 Chan et al.
2005/0200611 A1 9/2005 Goto et al.
2005/0261031 A1 11/2005 Seo et al.
2005/0278757 A1 12/2005 Grossman et al.
2006/0007785 A1 1/2006 Fernandez et al.
2006/0019649 A1 1/2006 Feinleib et al.
2006/0020904 A1 1/2006 Aaltonen et al.
2006/0035628 A1 2/2006 Miller et al.
2006/0035632 A1 2/2006 Sorvari et al.
2006/0055700 A1 3/2006 Niles et al.
2006/0069604 A1 3/2006 Leukart et al.
2006/0085765 A1 4/2006 Peterson et al.
2006/0087502 A1 4/2006 Karidis et al.
2006/0092770 A1 5/2006 Demas
2006/0098634 A1 5/2006 Umemoto et al.
2006/0123362 A1 6/2006 Keely
2006/0132456 A1 6/2006 Anson
2006/0166708 A1 7/2006 Kim et al.
2006/0197753 A1 9/2006 Hotelling
2006/0210092 A1 9/2006 Navid
2006/0214935 A1 9/2006 Boyd et al.
2006/0277469 A1 12/2006 Chaudhri et al.
2007/0004451 A1 1/2007 C. Anderson
2007/0006096 A1 1/2007 Kim et al.
2007/0021153 A1 1/2007 Novak
2007/0030256 A1 2/2007 Akaike et al.
2007/0052851 A1 3/2007 Ochs et al.
2007/0055947 A1 3/2007 Ostojic et al.
2007/0057775 A1 3/2007 O'Reilly et al.
2007/0082707 A1 4/2007 Flynt et al.
2007/0094330 A1 4/2007 Russell et al.
2007/0097113 A1 5/2007 Lee et al.
2007/0101279 A1 5/2007 Chaudhri et al.
2007/0113181 A1 5/2007 Blattner et al.
2007/0146344 A1 6/2007 Martin et al.
2007/0150842 A1 6/2007 Chaudhri et al.
2007/0157103 A1 7/2007 Arneson et al.
2007/0162872 A1 7/2007 Hong et al.
2007/0192718 A1 8/2007 Voorhees et al.
2007/0211042 A1 9/2007 Kim et al.
2007/0213955 A1 9/2007 Ishida et al.
2007/0226653 A1 9/2007 Moore et al.
2007/0236475 A1 10/2007 Wherry

(56) References Cited

U.S. PATENT DOCUMENTS

| | | | |
|---|---|---|---|
| 2007/0239754 | A1 | 10/2007 | Schnitman et al. |
| 2007/0250772 | A1 | 10/2007 | Milosevski |
| 2007/0261537 | A1 | 11/2007 | Eronen et al. |
| 2007/0279190 | A1 | 12/2007 | Lugt et al. |
| 2007/0287140 | A1 | 12/2007 | Liebowitz |
| 2008/0005599 | A1 | 1/2008 | Theocharous et al. |
| 2008/0024459 | A1 | 1/2008 | Poupyrev et al. |
| 2008/0033779 | A1 | 2/2008 | Coffman et al. |
| 2008/0046839 | A1 | 2/2008 | Mehra et al. |
| 2008/0052643 | A1 | 2/2008 | Ike et al. |
| 2008/0057926 | A1 | 3/2008 | Forstall et al. |
| 2008/0062141 | A1 | 3/2008 | Chaudhri |
| 2008/0071885 | A1 | 3/2008 | Hardy et al. |
| 2008/0076637 | A1 | 3/2008 | Gilley et al. |
| 2008/0082930 | A1 | 4/2008 | Omernick et al. |
| 2008/0082934 | A1 | 4/2008 | Kocienda et al. |
| 2008/0095470 | A1 | 4/2008 | Chao et al. |
| 2008/0098031 | A1 | 4/2008 | Ducharme |
| 2008/0098313 | A1 | 4/2008 | Pollack |
| 2008/0100693 | A1 | 5/2008 | Jobs et al. |
| 2008/0122796 | A1 | 5/2008 | Jobs et al. |
| 2008/0127268 | A1 | 5/2008 | Bergeron et al. |
| 2008/0130421 | A1 | 6/2008 | Akaiwa et al. |
| 2008/0143729 | A1 | 6/2008 | Wyatt et al. |
| 2008/0150959 | A1 | 6/2008 | Marui et al. |
| 2008/0151700 | A1 | 6/2008 | Inoue et al. |
| 2008/0155428 | A1 | 6/2008 | Lee |
| 2008/0167834 | A1 | 7/2008 | Herz et al. |
| 2008/0168396 | A1 | 7/2008 | Matas et al. |
| 2008/0174606 | A1 | 7/2008 | Rengarajan et al. |
| 2008/0186808 | A1 | 8/2008 | Lee |
| 2008/0192021 | A1 | 8/2008 | Lim et al. |
| 2008/0195961 | A1 | 8/2008 | Bae et al. |
| 2008/0201438 | A1 | 8/2008 | Mandre et al. |
| 2008/0201647 | A1 | 8/2008 | Lagerstedt et al. |
| 2008/0215240 | A1 | 9/2008 | Howard et al. |
| 2008/0246778 | A1 | 10/2008 | Ham et al. |
| 2008/0247519 | A1 | 10/2008 | Abella et al. |
| 2008/0270934 | A1 | 10/2008 | Firebaugh et al. |
| 2009/0005882 | A1 | 1/2009 | Boyer et al. |
| 2009/0012988 | A1 | 1/2009 | Brown |
| 2009/0016168 | A1 | 1/2009 | Smith |
| 2009/0016492 | A1 | 1/2009 | Tsuchiya |
| 2009/0017800 | A1 | 1/2009 | Middleton |
| 2009/0051327 | A1 | 2/2009 | Bohne |
| 2009/0051649 | A1 | 2/2009 | Rondel |
| 2009/0058821 | A1 | 3/2009 | Chaudhri et al. |
| 2009/0059730 | A1 | 3/2009 | Lyons et al. |
| 2009/0068984 | A1 | 3/2009 | Burnett |
| 2009/0070675 | A1 | 3/2009 | Li |
| 2009/0077497 | A1 | 3/2009 | Cho et al. |
| 2009/0100342 | A1 | 4/2009 | Jakobson et al. |
| 2009/0141046 | A1 | 6/2009 | Rathnam et al. |
| 2009/0143114 | A1 | 6/2009 | Vargas et al. |
| 2009/0144639 | A1 | 6/2009 | Nims et al. |
| 2009/0146962 | A1 | 6/2009 | Ahonen et al. |
| 2009/0158173 | A1 | 6/2009 | Palahnuk et al. |
| 2009/0164923 | A1 | 6/2009 | Ovi et al. |
| 2009/0177538 | A1 | 7/2009 | Brewer et al. |
| 2009/0178007 | A1 | 7/2009 | Matas et al. |
| 2009/0178008 | A1 | 7/2009 | Herz et al. |
| 2009/0183080 | A1 | 7/2009 | Thakkar et al. |
| 2009/0189915 | A1 | 7/2009 | Mercer et al. |
| 2009/0199130 | A1 | 8/2009 | Tsern et al. |
| 2009/0216556 | A1 | 8/2009 | Martin et al. |
| 2009/0231356 | A1 | 9/2009 | Barnes et al. |
| 2009/0239587 | A1 | 9/2009 | Negron et al. |
| 2009/0244015 | A1 | 10/2009 | Sengupta et al. |
| 2009/0249247 | A1 | 10/2009 | Tseng et al. |
| 2009/0254624 | A1 | 10/2009 | Baudin et al. |
| 2009/0256780 | A1 | 10/2009 | Small et al. |
| 2009/0259958 | A1 | 10/2009 | Ban |
| 2009/0262088 | A1 | 10/2009 | Moll-Carrillo et al. |
| 2009/0264116 | A1 | 10/2009 | Thompson et al. |
| 2009/0279392 | A1 | 11/2009 | Scott et al. |
| 2009/0284389 | A1 | 11/2009 | Klassen et al. |
| 2009/0287470 | A1 | 11/2009 | Farnsworth et al. |
| 2009/0300146 | A1 | 12/2009 | Park et al. |
| 2009/0300598 | A1 | 12/2009 | Choi |
| 2009/0305732 | A1 | 12/2009 | Marcellino et al. |
| 2009/0312059 | A1 | 12/2009 | Pratt et al. |
| 2009/0313299 | A1 | 12/2009 | Bonev et al. |
| 2009/0319467 | A1 | 12/2009 | Berg et al. |
| 2009/0327886 | A1 | 12/2009 | Whytock et al. |
| 2010/0015774 | A1 | 1/2010 | Shimamune et al. |
| 2010/0016771 | A1 | 1/2010 | Jardine et al. |
| 2010/0017748 | A1 | 1/2010 | Taylor et al. |
| 2010/0026640 | A1 | 2/2010 | Kim et al. |
| 2010/0048358 | A1 | 2/2010 | Tchao et al. |
| 2010/0060586 | A1 | 3/2010 | Pisula et al. |
| 2010/0062905 | A1 | 3/2010 | Rottler et al. |
| 2010/0064255 | A1 | 3/2010 | Rottier et al. |
| 2010/0069035 | A1 | 3/2010 | Johnson |
| 2010/0081473 | A1 | 4/2010 | Chatterjee et al. |
| 2010/0085203 | A1 | 4/2010 | Kahn et al. |
| 2010/0088597 | A1 | 4/2010 | Shin et al. |
| 2010/0099462 | A1 | 4/2010 | Baek et al. |
| 2010/0100841 | A1 | 4/2010 | Shin et al. |
| 2010/0110082 | A1 | 5/2010 | Myrick et al. |
| 2010/0114974 | A1 | 5/2010 | Jung et al. |
| 2010/0123724 | A1 | 5/2010 | Moore et al. |
| 2010/0124152 | A1 | 5/2010 | Lee |
| 2010/0138764 | A1 | 6/2010 | Hatambeiki et al. |
| 2010/0141606 | A1 | 6/2010 | Bae et al. |
| 2010/0146437 | A1 | 6/2010 | Woodcock et al. |
| 2010/0146463 | A1 | 6/2010 | Cho et al. |
| 2010/0149573 | A1 | 6/2010 | Pat et al. |
| 2010/0156807 | A1 | 6/2010 | Stallings et al. |
| 2010/0156833 | A1 | 6/2010 | Kim et al. |
| 2010/0157742 | A1 | 6/2010 | Relyea et al. |
| 2010/0167712 | A1 | 7/2010 | Stallings et al. |
| 2010/0175006 | A1 | 7/2010 | Li |
| 2010/0178873 | A1 | 7/2010 | Lee et al. |
| 2010/0194692 | A1 | 8/2010 | Orr et al. |
| 2010/0198453 | A1 | 8/2010 | Dorogusker et al. |
| 2010/0205563 | A1 | 8/2010 | Haapsaari et al. |
| 2010/0217657 | A1 | 8/2010 | Gazdzinski et al. |
| 2010/0218089 | A1 | 8/2010 | Chao et al. |
| 2010/0223563 | A1 | 9/2010 | Green |
| 2010/0225495 | A1 | 9/2010 | Marui |
| 2010/0226213 | A1 | 9/2010 | Drugge |
| 2010/0235726 | A1 | 9/2010 | Ording et al. |
| 2010/0243516 | A1 | 9/2010 | Martin et al. |
| 2010/0248688 | A1 | 9/2010 | Teng et al. |
| 2010/0251176 | A1 | 9/2010 | Fong et al. |
| 2010/0257469 | A1 | 10/2010 | Kim et al. |
| 2010/0269108 | A1 | 10/2010 | Boudreau et al. |
| 2010/0271312 | A1 | 10/2010 | Alameh et al. |
| 2010/0281374 | A1 | 11/2010 | Schulz et al. |
| 2010/0289723 | A1 | 11/2010 | London |
| 2010/0292600 | A1 | 11/2010 | Dibenedetto et al. |
| 2010/0295789 | A1 | 11/2010 | Shin et al. |
| 2010/0295803 | A1 | 11/2010 | Kim et al. |
| 2010/0299436 | A1 | 11/2010 | Khalid et al. |
| 2010/0309149 | A1 | 12/2010 | Blumenberg et al. |
| 2011/0000968 | A1 | 1/2011 | Phillips et al. |
| 2011/0003587 | A1 | 1/2011 | Belz et al. |
| 2011/0003665 | A1 | 1/2011 | Burton et al. |
| 2011/0004835 | A1 | 1/2011 | Yanchar et al. |
| 2011/0016425 | A1 | 1/2011 | Homburg et al. |
| 2011/0018695 | A1 | 1/2011 | Bells et al. |
| 2011/0022294 | A1 | 1/2011 | Apley |
| 2011/0025719 | A1 | 2/2011 | Yanase et al. |
| 2011/0029870 | A1 | 2/2011 | May et al. |
| 2011/0047014 | A1 | 2/2011 | De Angelo |
| 2011/0057903 | A1 | 3/2011 | Yamano et al. |
| 2011/0059769 | A1 | 3/2011 | Brunolli |
| 2011/0061010 | A1 | 3/2011 | Wasko et al. |
| 2011/0061017 | A1 | 3/2011 | Ullrich et al. |
| 2011/0070924 | A1 | 3/2011 | Kim et al. |
| 2011/0071818 | A1 | 3/2011 | Jiang |
| 2011/0074699 | A1 | 3/2011 | Marr et al. |
| 2011/0076992 | A1 | 3/2011 | Chou et al. |
| 2011/0078622 | A1 | 3/2011 | Missig et al. |

(56) References Cited

U.S. PATENT DOCUMENTS

| | | | |
|---|---|---|---|
| 2011/0078624 | A1 | 3/2011 | Missig et al. |
| 2011/0080411 | A1 | 4/2011 | Wikkerink et al. |
| 2011/0081923 | A1 | 4/2011 | Bednar et al. |
| 2011/0083111 | A1 | 4/2011 | Forutanpour et al. |
| 2011/0098928 | A1 | 4/2011 | Hoffman et al. |
| 2011/0109540 | A1 | 5/2011 | Milne et al. |
| 2011/0115721 | A1 | 5/2011 | Li et al. |
| 2011/0119610 | A1 | 5/2011 | Hackborn et al. |
| 2011/0138329 | A1 | 6/2011 | Wells et al. |
| 2011/0151415 | A1 | 6/2011 | Darling et al. |
| 2011/0157046 | A1 | 6/2011 | Lee et al. |
| 2011/0166777 | A1 | 7/2011 | Chavakula |
| 2011/0167369 | A1 | 7/2011 | van Os |
| 2011/0167382 | A1 | 7/2011 | Van Os |
| 2011/0173221 | A1 | 7/2011 | Ahiakpor et al. |
| 2011/0175832 | A1 | 7/2011 | Miyazawa et al. |
| 2011/0179372 | A1 | 7/2011 | Moore et al. |
| 2011/0181521 | A1* | 7/2011 | Reid .................... G06F 3/0483 345/173 |
| 2011/0182151 | A1 | 7/2011 | Geyer et al. |
| 2011/0183650 | A1 | 7/2011 | McKee |
| 2011/0191661 | A1 | 8/2011 | Phillips et al. |
| 2011/0191695 | A1 | 8/2011 | Dinka et al. |
| 2011/0193878 | A1 | 8/2011 | Seo et al. |
| 2011/0197165 | A1 | 8/2011 | Filippov et al. |
| 2011/0202834 | A1 | 8/2011 | Mandryk et al. |
| 2011/0202861 | A1 | 8/2011 | Fritzley et al. |
| 2011/0202883 | A1 | 8/2011 | Oh et al. |
| 2011/0205182 | A1 | 8/2011 | Miyazawa et al. |
| 2011/0205851 | A1 | 8/2011 | Harris |
| 2011/0218765 | A1 | 9/2011 | Rogers et al. |
| 2011/0227872 | A1 | 9/2011 | Huska et al. |
| 2011/0230986 | A1 | 9/2011 | Lafortune et al. |
| 2011/0234152 | A1 | 9/2011 | Frossen et al. |
| 2011/0234633 | A1 | 9/2011 | Ogura et al. |
| 2011/0237221 | A1 | 9/2011 | Prakash et al. |
| 2011/0248992 | A1 | 10/2011 | Van et al. |
| 2011/0252146 | A1 | 10/2011 | Santamaria et al. |
| 2011/0256848 | A1 | 10/2011 | Bok et al. |
| 2011/0261079 | A1 | 10/2011 | Ingrassia et al. |
| 2011/0265002 | A1 | 10/2011 | Hong et al. |
| 2011/0279852 | A1 | 11/2011 | Oda et al. |
| 2011/0281342 | A1 | 11/2011 | Porsch et al. |
| 2011/0285656 | A1 | 11/2011 | Yaksick et al. |
| 2011/0296324 | A1 | 12/2011 | Goossens et al. |
| 2011/0302518 | A1 | 12/2011 | Zhang |
| 2011/0306393 | A1 | 12/2011 | Goldman et al. |
| 2011/0306421 | A1 | 12/2011 | Nishimoto et al. |
| 2011/0316858 | A1 | 12/2011 | Shen et al. |
| 2011/0320938 | A1 | 12/2011 | Schorsch et al. |
| 2012/0001922 | A1 | 1/2012 | Escher et al. |
| 2012/0011449 | A1 | 1/2012 | Sasson et al. |
| 2012/0013552 | A1 | 1/2012 | Ahn |
| 2012/0015779 | A1 | 1/2012 | Powch et al. |
| 2012/0017180 | A1 | 1/2012 | Flik et al. |
| 2012/0019400 | A1 | 1/2012 | Patel et al. |
| 2012/0019513 | A1 | 1/2012 | Fong et al. |
| 2012/0019610 | A1 | 1/2012 | Hornyak et al. |
| 2012/0026110 | A1 | 2/2012 | Yamano et al. |
| 2012/0028707 | A1 | 2/2012 | Raitt et al. |
| 2012/0036220 | A1 | 2/2012 | Dare et al. |
| 2012/0040719 | A1 | 2/2012 | Lee et al. |
| 2012/0047447 | A1 | 2/2012 | Haq |
| 2012/0052921 | A1 | 3/2012 | Lim et al. |
| 2012/0059664 | A1 | 3/2012 | Georgiev et al. |
| 2012/0059787 | A1 | 3/2012 | Brown et al. |
| 2012/0062470 | A1 | 3/2012 | Chang et al. |
| 2012/0066629 | A1 | 3/2012 | Lee et al. |
| 2012/0071770 | A1 | 3/2012 | Grey et al. |
| 2012/0077554 | A1 | 3/2012 | Ahn et al. |
| 2012/0079375 | A1 | 3/2012 | Ogino et al. |
| 2012/0084729 | A1 | 4/2012 | Lin et al. |
| 2012/0092383 | A1 | 4/2012 | Hysek et al. |
| 2012/0102399 | A1 | 4/2012 | Nicholson |
| 2012/0105358 | A1 | 5/2012 | Momeyer et al. |
| 2012/0110438 | A1 | 5/2012 | Peraza et al. |
| 2012/0113008 | A1 | 5/2012 | Makinen et al. |
| 2012/0113762 | A1 | 5/2012 | Frost |
| 2012/0116550 | A1 | 5/2012 | Hoffman et al. |
| 2012/0117507 | A1 | 5/2012 | Tseng et al. |
| 2012/0124499 | A1 | 5/2012 | Tsai et al. |
| 2012/0150327 | A1 | 6/2012 | Altman et al. |
| 2012/0154156 | A1 | 6/2012 | Kuntzel |
| 2012/0154293 | A1 | 6/2012 | Hinckley et al. |
| 2012/0159380 | A1 | 6/2012 | Kocienda et al. |
| 2012/0167008 | A1 | 6/2012 | Zaman et al. |
| 2012/0182226 | A1 | 7/2012 | Tuli |
| 2012/0197523 | A1 | 8/2012 | Kirsch |
| 2012/0204123 | A1 | 8/2012 | Bauer et al. |
| 2012/0210263 | A1 | 8/2012 | Perry et al. |
| 2012/0212495 | A1 | 8/2012 | Butcher et al. |
| 2012/0214458 | A1 | 8/2012 | Levien et al. |
| 2012/0218177 | A1 | 8/2012 | Pang et al. |
| 2012/0218201 | A1* | 8/2012 | Tamas .................. G06F 1/1626 345/173 |
| 2012/0223935 | A1 | 9/2012 | Renwick et al. |
| 2012/0231849 | A1 | 9/2012 | Yamashita et al. |
| 2012/0243735 | A1 | 9/2012 | Wu et al. |
| 2012/0254263 | A1 | 10/2012 | Hiestermann et al. |
| 2012/0254318 | A1 | 10/2012 | Poniatowski |
| 2012/0254804 | A1 | 10/2012 | Sheha et al. |
| 2012/0254810 | A1 | 10/2012 | Heck et al. |
| 2012/0288139 | A1 | 11/2012 | Singhar |
| 2012/0290109 | A1 | 11/2012 | Engelberg et al. |
| 2012/0297346 | A1 | 11/2012 | Hoffknecht et al. |
| 2012/0304084 | A1* | 11/2012 | Kim ..................... G06F 3/0486 715/762 |
| 2012/0319984 | A1 | 12/2012 | Borovsky et al. |
| 2012/0320081 | A1 | 12/2012 | Kim et al. |
| 2012/0322508 | A1 | 12/2012 | Forstall et al. |
| 2012/0323933 | A1 | 12/2012 | He et al. |
| 2012/0324357 | A1 | 12/2012 | Viegers et al. |
| 2012/0324390 | A1* | 12/2012 | Tao .................... G06F 3/04847 715/771 |
| 2013/0007665 | A1 | 1/2013 | Chaudhri et al. |
| 2013/0014019 | A1 | 1/2013 | Kim et al. |
| 2013/0019175 | A1 | 1/2013 | Kotler et al. |
| 2013/0021236 | A1 | 1/2013 | Bender et al. |
| 2013/0024781 | A1 | 1/2013 | Douillet et al. |
| 2013/0024802 | A1 | 1/2013 | Zeng et al. |
| 2013/0026293 | A1 | 1/2013 | Schneider et al. |
| 2013/0030892 | A1 | 1/2013 | Liu et al. |
| 2013/0044072 | A1 | 2/2013 | Kobayashi et al. |
| 2013/0044080 | A1 | 2/2013 | Chiang |
| 2013/0046397 | A1 | 2/2013 | Fadell et al. |
| 2013/0050263 | A1 | 2/2013 | Khoe et al. |
| 2013/0055147 | A1 | 2/2013 | Vasudev et al. |
| 2013/0057566 | A1 | 3/2013 | Kriese et al. |
| 2013/0063084 | A1 | 3/2013 | Tilvis et al. |
| 2013/0063364 | A1 | 3/2013 | Moore |
| 2013/0063366 | A1 | 3/2013 | Paul |
| 2013/0063383 | A1 | 3/2013 | Anderssonreimer et al. |
| 2013/0067391 | A1 | 3/2013 | Pittappilly et al. |
| 2013/0069893 | A1 | 3/2013 | Brinda et al. |
| 2013/0076757 | A1 | 3/2013 | Pritting |
| 2013/0082965 | A1 | 4/2013 | Wada et al. |
| 2013/0093715 | A1 | 4/2013 | Marsden et al. |
| 2013/0103797 | A1 | 4/2013 | Park et al. |
| 2013/0107674 | A1 | 5/2013 | Gossweiler et al. |
| 2013/0111550 | A1 | 5/2013 | Naveh et al. |
| 2013/0111579 | A1 | 5/2013 | Newman et al. |
| 2013/0116967 | A1 | 5/2013 | Akcasu et al. |
| 2013/0117383 | A1 | 5/2013 | Hymel et al. |
| 2013/0120106 | A1 | 5/2013 | Cauwels et al. |
| 2013/0121119 | A1 | 5/2013 | Umamoto |
| 2013/0132888 | A1 | 5/2013 | Tijssen |
| 2013/0137073 | A1 | 5/2013 | Nacey et al. |
| 2013/0141365 | A1 | 6/2013 | Lynn et al. |
| 2013/0141371 | A1 | 6/2013 | Hallford et al. |
| 2013/0143512 | A1 | 6/2013 | Hernandez et al. |
| 2013/0147825 | A1 | 6/2013 | Martin et al. |
| 2013/0157646 | A1 | 6/2013 | Ferren et al. |
| 2013/0157729 | A1 | 6/2013 | Tabe |
| 2013/0169870 | A1 | 7/2013 | Lee et al. |

(56) References Cited

U.S. PATENT DOCUMENTS

| | | | |
|---|---|---|---|
| 2013/0173699 | A1 | 7/2013 | Parks et al. |
| 2013/0174044 | A1 | 7/2013 | Hill |
| 2013/0185813 | A1 | 7/2013 | Shim et al. |
| 2013/0191785 | A1 | 7/2013 | Wu et al. |
| 2013/0201098 | A1 | 8/2013 | Schilit et al. |
| 2013/0205194 | A1 | 8/2013 | Decker et al. |
| 2013/0205210 | A1 | 8/2013 | Jeon et al. |
| 2013/0215044 | A1 | 8/2013 | Ahn et al. |
| 2013/0222271 | A1 | 8/2013 | Alberth et al. |
| 2013/0225152 | A1 | 8/2013 | Matthews, III et al. |
| 2013/0227412 | A1 | 8/2013 | Ornstein et al. |
| 2013/0232443 | A1 | 9/2013 | Ryu et al. |
| 2013/0234924 | A1 | 9/2013 | Janefalkar et al. |
| 2013/0234929 | A1 | 9/2013 | Libin et al. |
| 2013/0234964 | A1 | 9/2013 | Kim et al. |
| 2013/0234969 | A1 | 9/2013 | Yeh et al. |
| 2013/0239060 | A1 | 9/2013 | Kang et al. |
| 2013/0239063 | A1 | 9/2013 | Ubillos et al. |
| 2013/0243924 | A1 | 9/2013 | Bhandari et al. |
| 2013/0254705 | A1 | 9/2013 | Mooring et al. |
| 2013/0262298 | A1 | 10/2013 | Morley et al. |
| 2013/0263043 | A1 | 10/2013 | Sarbin et al. |
| 2013/0275875 | A1 | 10/2013 | Gruber et al. |
| 2013/0305189 | A1 | 11/2013 | Kim |
| 2013/0314204 | A1 | 11/2013 | Ho et al. |
| 2013/0314302 | A1 | 11/2013 | Jeung et al. |
| 2013/0316763 | A1 | 11/2013 | Kader |
| 2013/0318158 | A1 | 11/2013 | Teng et al. |
| 2013/0318437 | A1 | 11/2013 | Jung et al. |
| 2013/0318466 | A1 | 11/2013 | Estrada et al. |
| 2013/0322218 | A1 | 12/2013 | Burkhardt et al. |
| 2013/0326418 | A1 | 12/2013 | Utsuki et al. |
| 2013/0331130 | A1 | 12/2013 | Lee |
| 2013/0332721 | A1 | 12/2013 | Chaudhri et al. |
| 2013/0332856 | A1 | 12/2013 | Sanders et al. |
| 2013/0345978 | A1 | 12/2013 | Lush et al. |
| 2013/0345980 | A1 | 12/2013 | Van Os et al. |
| 2014/0013414 | A1 | 1/2014 | Bruck et al. |
| 2014/0013945 | A1 | 1/2014 | Tanaka et al. |
| 2014/0015784 | A1 | 1/2014 | Oonishi |
| 2014/0022183 | A1 | 1/2014 | Ayoub et al. |
| 2014/0032706 | A1 | 1/2014 | Kuscher et al. |
| 2014/0036639 | A1 | 2/2014 | Boni et al. |
| 2014/0037109 | A1 | 2/2014 | Ban |
| 2014/0040831 | A1 | 2/2014 | Akasaka et al. |
| 2014/0043367 | A1 | 2/2014 | Sakaino et al. |
| 2014/0047525 | A1 | 2/2014 | Bonhoff |
| 2014/0055388 | A1 | 2/2014 | Yook et al. |
| 2014/0055495 | A1 | 2/2014 | Kim et al. |
| 2014/0059493 | A1 | 2/2014 | Kim |
| 2014/0063049 | A1 | 3/2014 | Armstrong-Muntner |
| 2014/0068755 | A1 | 3/2014 | King et al. |
| 2014/0073256 | A1 | 3/2014 | Newham et al. |
| 2014/0074570 | A1 | 3/2014 | Hope et al. |
| 2014/0075003 | A1 | 3/2014 | Tanaka et al. |
| 2014/0080465 | A1 | 3/2014 | Cho |
| 2014/0082533 | A1 | 3/2014 | Kelley et al. |
| 2014/0086123 | A1 | 3/2014 | Deivasigamani et al. |
| 2014/0094224 | A1 | 4/2014 | Lozovoy et al. |
| 2014/0101169 | A1 | 4/2014 | Kurata et al. |
| 2014/0123005 | A1 | 5/2014 | Forstall et al. |
| 2014/0123043 | A1 | 5/2014 | Schmidt et al. |
| 2014/0125620 | A1 | 5/2014 | Panther et al. |
| 2014/0126336 | A1 | 5/2014 | Goeller et al. |
| 2014/0129959 | A1 | 5/2014 | Battles et al. |
| 2014/0135631 | A1 | 5/2014 | Brumback et al. |
| 2014/0136986 | A1 | 5/2014 | Martin et al. |
| 2014/0139422 | A1 | 5/2014 | Mistry et al. |
| 2014/0139454 | A1 | 5/2014 | Mistry et al. |
| 2014/0139637 | A1 | 5/2014 | Mistry et al. |
| 2014/0143678 | A1 | 5/2014 | Mistry et al. |
| 2014/0143682 | A1 | 5/2014 | Druck et al. |
| 2014/0143737 | A1 | 5/2014 | Mistry et al. |
| 2014/0149878 | A1 | 5/2014 | Mischari et al. |
| 2014/0157167 | A1 | 6/2014 | Zhu |
| 2014/0157189 | A1 | 6/2014 | Morita |
| 2014/0157321 | A1 | 6/2014 | Kurita et al. |
| 2014/0164907 | A1 | 6/2014 | Jung et al. |
| 2014/0164945 | A1 | 6/2014 | Junqua et al. |
| 2014/0164955 | A1 | 6/2014 | Thiruvidam et al. |
| 2014/0171132 | A1 | 6/2014 | Ziemianska et al. |
| 2014/0171156 | A1 | 6/2014 | Pattikonda et al. |
| 2014/0173439 | A1 | 6/2014 | Gutierrez et al. |
| 2014/0176475 | A1 | 6/2014 | Myers et al. |
| 2014/0179272 | A1 | 6/2014 | Zhang et al. |
| 2014/0181183 | A1 | 6/2014 | Yamamoto et al. |
| 2014/0181219 | A1 | 6/2014 | Wang et al. |
| 2014/0189577 | A1 | 7/2014 | Haslam et al. |
| 2014/0189578 | A1 | 7/2014 | Shuttleworth et al. |
| 2014/0189584 | A1 | 7/2014 | Weng et al. |
| 2014/0189589 | A1 | 7/2014 | Kim et al. |
| 2014/0195476 | A1 | 7/2014 | Sxhmidt |
| 2014/0195972 | A1 | 7/2014 | Lee et al. |
| 2014/0197946 | A1 | 7/2014 | Park et al. |
| 2014/0197965 | A1 | 7/2014 | Park et al. |
| 2014/0200691 | A1 | 7/2014 | Lee et al. |
| 2014/0201655 | A1 | 7/2014 | Mahaffey et al. |
| 2014/0210708 | A1 | 7/2014 | Simmons et al. |
| 2014/0210801 | A1 | 7/2014 | Li |
| 2014/0223490 | A1 | 8/2014 | Pan et al. |
| 2014/0229752 | A1 | 8/2014 | Lee et al. |
| 2014/0240122 | A1 | 8/2014 | Roberts et al. |
| 2014/0244009 | A1 | 8/2014 | Mestas |
| 2014/0244165 | A1 | 8/2014 | Bells et al. |
| 2014/0245161 | A1 | 8/2014 | Yuen et al. |
| 2014/0245177 | A1 | 8/2014 | Maklouf et al. |
| 2014/0250374 | A1 | 9/2014 | Ohki et al. |
| 2014/0250391 | A1* | 9/2014 | Jong .................. G06F 3/04883 715/763 |
| 2014/0253487 | A1 | 9/2014 | Bezinge et al. |
| 2014/0258935 | A1 | 9/2014 | Nishida et al. |
| 2014/0267303 | A1 | 9/2014 | Larkin et al. |
| 2014/0269614 | A1 | 9/2014 | Maguire et al. |
| 2014/0276244 | A1 | 9/2014 | Kamyar |
| 2014/0282103 | A1 | 9/2014 | Jerry |
| 2014/0282153 | A1 | 9/2014 | Christiansen et al. |
| 2014/0282207 | A1 | 9/2014 | Wouhaybi et al. |
| 2014/0282254 | A1 | 9/2014 | Feiereisen et al. |
| 2014/0289660 | A1 | 9/2014 | Min |
| 2014/0293755 | A1 | 10/2014 | Geiser et al. |
| 2014/0302834 | A1 | 10/2014 | Jones |
| 2014/0304664 | A1 | 10/2014 | Lee et al. |
| 2014/0306898 | A1 | 10/2014 | Cueto |
| 2014/0310348 | A1 | 10/2014 | Keskitalo et al. |
| 2014/0310350 | A1 | 10/2014 | Borggaard et al. |
| 2014/0310618 | A1 | 10/2014 | Venkatesh |
| 2014/0310643 | A1 | 10/2014 | Karmanenko et al. |
| 2014/0317543 | A1 | 10/2014 | Kim |
| 2014/0325384 | A1 | 10/2014 | Kobayashi |
| 2014/0325408 | A1 | 10/2014 | Leppanen et al. |
| 2014/0328151 | A1 | 11/2014 | Serber |
| 2014/0331314 | A1 | 11/2014 | Fujioka |
| 2014/0337450 | A1 | 11/2014 | Choudhary et al. |
| 2014/0337791 | A1 | 11/2014 | Agnetta et al. |
| 2014/0342792 | A1 | 11/2014 | Markus |
| 2014/0344723 | A1 | 11/2014 | Malik et al. |
| 2014/0344820 | A1 | 11/2014 | Kumar |
| 2014/0344951 | A1 | 11/2014 | Brewer |
| 2014/0347275 | A1 | 11/2014 | Jung et al. |
| 2014/0347289 | A1 | 11/2014 | Lee et al. |
| 2014/0359124 | A1 | 12/2014 | Adimatyam et al. |
| 2014/0359477 | A1 | 12/2014 | Chen |
| 2014/0359637 | A1 | 12/2014 | Yan |
| 2014/0362105 | A1 | 12/2014 | Kocienda et al. |
| 2014/0371887 | A1 | 12/2014 | Hoffman et al. |
| 2014/0380229 | A1 | 12/2014 | Volodin et al. |
| 2015/0011204 | A1 | 1/2015 | Seo et al. |
| 2015/0015500 | A1 | 1/2015 | Lee et al. |
| 2015/0019981 | A1 | 1/2015 | Petitt et al. |
| 2015/0019982 | A1 | 1/2015 | Petitt et al. |
| 2015/0022438 | A1 | 1/2015 | Hong |
| 2015/0026615 | A1 | 1/2015 | Choi et al. |
| 2015/0033136 | A1 | 1/2015 | Sasaki et al. |
| 2015/0037545 | A1 | 2/2015 | Sun |

(56) References Cited

U.S. PATENT DOCUMENTS

2015/0042571 A1 2/2015 Lombardi et al.
2015/0043046 A1 2/2015 Iwamoto
2015/0049033 A1 2/2015 Kim et al.
2015/0052461 A1 2/2015 Sullivan et al.
2015/0055197 A1 2/2015 Romanoff et al.
2015/0057945 A1 2/2015 White et al.
2015/0058651 A1 2/2015 Choi et al.
2015/0061988 A1 3/2015 Galu, Jr.
2015/0062052 A1 3/2015 Bernstein et al.
2015/0062130 A1 3/2015 Ho
2015/0067513 A1 3/2015 Zambetti et al.
2015/0067596 A1 3/2015 Brown et al.
2015/0071043 A1 3/2015 Kubota
2015/0081474 A1 3/2015 Kostka et al.
2015/0082193 A1 3/2015 Wallace et al.
2015/0082446 A1 3/2015 Flowers et al.
2015/0083970 A1 3/2015 Koh et al.
2015/0098309 A1 4/2015 Adams et al.
2015/0100537 A1 4/2015 Grieves et al.
2015/0100621 A1 4/2015 Pan
2015/0105125 A1 4/2015 Min et al.
2015/0106221 A1 4/2015 Tapley et al.
2015/0106752 A1 4/2015 Yang
2015/0111558 A1 4/2015 Yang
2015/0112700 A1 4/2015 Sublett et al.
2015/0112990 A1 4/2015 Van Os et al.
2015/0113435 A1 4/2015 Phillips
2015/0113468 A1 4/2015 Clark
2015/0117162 A1 4/2015 Tsai et al.
2015/0118657 A1 4/2015 Shrake et al.
2015/0128042 A1 5/2015 Churchill et al.
2015/0128078 A1 5/2015 Oh et al.
2015/0130830 A1 5/2015 Nagasaki et al.
2015/0131121 A1 5/2015 Kang
2015/0143234 A1 5/2015 Norris
2015/0153952 A1 6/2015 Grossman et al.
2015/0160806 A1 6/2015 Fey et al.
2015/0160812 A1 6/2015 Yuan et al.
2015/0160856 A1 6/2015 Jang et al.
2015/0163210 A1 6/2015 Meyers et al.
2015/0172438 A1 6/2015 Yang
2015/0185703 A1 7/2015 Tanaka
2015/0185995 A1 7/2015 Shoemaker et al.
2015/0194050 A1 7/2015 Lee
2015/0194137 A1 7/2015 Wyatt
2015/0195179 A1 7/2015 Skare et al.
2015/0205509 A1 7/2015 Scriven et al.
2015/0207922 A1 7/2015 Kobayashi et al.
2015/0217163 A1 8/2015 Amis et al.
2015/0220265 A1 8/2015 Takahashi
2015/0220299 A1 8/2015 Kim et al.
2015/0228048 A1 8/2015 Heo et al.
2015/0248200 A1 9/2015 Cho et al.
2015/0248235 A1 9/2015 Offenberg et al.
2015/0253736 A1 9/2015 Watterson
2015/0253740 A1 9/2015 Nishijima et al.
2015/0254875 A1 9/2015 Zhang
2015/0261284 A1 9/2015 Lee et al.
2015/0269848 A1 9/2015 Yuen et al.
2015/0271120 A1 9/2015 Langholz
2015/0277545 A1 10/2015 Flowers et al.
2015/0286372 A1 10/2015 Swindell et al.
2015/0286391 A1 10/2015 Jacobs et al.
2015/0301506 A1 10/2015 Koumaiha
2015/0301608 A1 10/2015 Nagaraju et al.
2015/0302624 A1 10/2015 Burke
2015/0312175 A1 10/2015 Langholz
2015/0317945 A1 11/2015 Andress et al.
2015/0324751 A1 11/2015 Orenstein et al.
2015/0339261 A1 11/2015 Jha et al.
2015/0346694 A1 12/2015 Hoobler et al.
2015/0346824 A1 12/2015 Chen et al.
2015/0355830 A1 12/2015 Chaudhri et al.
2015/0365892 A1 12/2015 Ma et al.
2015/0366518 A1 12/2015 Sampson
2015/0370469 A1 12/2015 Leong et al.
2015/0378592 A1 12/2015 Kim
2015/0379476 A1 12/2015 Chaudhri et al.
2016/0004393 A1 1/2016 Faaborg et al.
2016/0021168 A1 1/2016 Chaudhri et al.
2016/0022202 A1 1/2016 Peterson et al.
2016/0027420 A1 1/2016 Eronen
2016/0034133 A1 2/2016 Wilson
2016/0034148 A1 2/2016 Wilson et al.
2016/0034152 A1 2/2016 Wilson et al.
2016/0034166 A1 2/2016 Wilson et al.
2016/0034167 A1 2/2016 Wilson et al.
2016/0036996 A1 2/2016 Midholt et al.
2016/0044091 A1 2/2016 Doumet
2016/0044442 A1 2/2016 Pacelli et al.
2016/0048161 A1 2/2016 Carceroni et al.
2016/0048283 A1 2/2016 Yang et al.
2016/0049106 A1 2/2016 Connell et al.
2016/0054710 A1* 2/2016 Jo ........................ G04G 9/0064
715/763
2016/0054892 A1 2/2016 Kim et al.
2016/0058336 A1 3/2016 Blahnik et al.
2016/0058337 A1 3/2016 Blahnik et al.
2016/0062450 A1 3/2016 Han et al.
2016/0062540 A1 3/2016 Yang et al.
2016/0062570 A1 3/2016 Dascola et al.
2016/0062572 A1 3/2016 Yang et al.
2016/0062589 A1 3/2016 Wan et al.
2016/0062630 A1 3/2016 Anzures et al.
2016/0065505 A1 3/2016 Iskander
2016/0065707 A1 3/2016 Yang et al.
2016/0065708 A1 3/2016 Yang et al.
2016/0066277 A1 3/2016 Yang et al.
2016/0073034 A1 3/2016 Mukherjee et al.
2016/0085397 A1 3/2016 Jain
2016/0091867 A1 3/2016 Mansour et al.
2016/0097651 A1 4/2016 Jung et al.
2016/0098137 A1 4/2016 Kim et al.
2016/0117147 A1 4/2016 Zambetti et al.
2016/0134840 A1 5/2016 Mcculloch
2016/0142763 A1 5/2016 Kim et al.
2016/0165037 A1 6/2016 Youn et al.
2016/0165038 A1 6/2016 Lim et al.
2016/0170731 A1 6/2016 Maddern et al.
2016/0179353 A1 6/2016 Iskander
2016/0180568 A1 6/2016 Bullivant et al.
2016/0187995 A1 6/2016 Rosewall
2016/0188179 A1 6/2016 Roh
2016/0188181 A1 6/2016 Smith
2016/0189328 A1 6/2016 Vranjes et al.
2016/0191511 A1 6/2016 Tijerina et al.
2016/0192324 A1 6/2016 Zhang et al.
2016/0193502 A1 7/2016 Kang et al.
2016/0205244 A1 7/2016 Dvortsov
2016/0210568 A1 7/2016 Krupa et al.
2016/0212374 A1 7/2016 Usbergo et al.
2016/0217601 A1 7/2016 Tsuda et al.
2016/0259518 A1 9/2016 King et al.
2016/0259542 A1 9/2016 Chaudhri et al.
2016/0261675 A1 9/2016 Block et al.
2016/0266548 A1 9/2016 Akiyama
2016/0283094 A1 9/2016 Choi
2016/0320756 A1 11/2016 Lee et al.
2016/0327911 A1 11/2016 Eim et al.
2016/0327915 A1 11/2016 Katzer et al.
2016/0332025 A1 11/2016 Repka
2016/0342141 A1 11/2016 Koumaiha et al.
2016/0342327 A1 11/2016 Chi et al.
2016/0357151 A1 12/2016 Block et al.
2016/0357282 A1 12/2016 Block et al.
2016/0357354 A1 12/2016 Chen et al.
2016/0357386 A1 12/2016 Choi
2016/0357413 A1 12/2016 Block et al.
2016/0358311 A1 12/2016 Chen et al.
2017/0004798 A1 1/2017 Park et al.
2017/0010677 A1 1/2017 Roh et al.
2017/0011210 A1 1/2017 Cheong et al.
2017/0019517 A1 1/2017 Wilder et al.
2017/0039535 A1 2/2017 Park et al.

(56) References Cited

U.S. PATENT DOCUMENTS

| | | | |
|---|---|---|---|
| 2017/0040001 | A1 | 2/2017 | Zhang et al. |
| 2017/0045993 | A1 | 2/2017 | Oh et al. |
| 2017/0046024 | A1 | 2/2017 | Dascola et al. |
| 2017/0046052 | A1 | 2/2017 | Lee et al. |
| 2017/0053542 | A1 | 2/2017 | Wilson et al. |
| 2017/0061934 | A1 | 3/2017 | Shin |
| 2017/0068407 | A1 | 3/2017 | Wilson et al. |
| 2017/0068439 | A1 | 3/2017 | Mohseni |
| 2017/0075305 | A1 | 3/2017 | Ryu et al. |
| 2017/0075316 | A1 | 3/2017 | Berdinis et al. |
| 2017/0082983 | A1 | 3/2017 | Katzer et al. |
| 2017/0087469 | A1 | 3/2017 | Hardee et al. |
| 2017/0109011 | A1 | 4/2017 | Jiang |
| 2017/0123571 | A1 | 5/2017 | Huang et al. |
| 2017/0123640 | A1 | 5/2017 | Wilson et al. |
| 2017/0127354 | A1 | 5/2017 | Garland et al. |
| 2017/0134321 | A1 | 5/2017 | Ushio et al. |
| 2017/0149795 | A1 | 5/2017 | Day, II |
| 2017/0160898 | A1 | 6/2017 | Lee et al. |
| 2017/0164292 | A1 | 6/2017 | Santamaria et al. |
| 2017/0176950 | A1 | 6/2017 | Jung et al. |
| 2017/0186399 | A1 | 6/2017 | Moritani et al. |
| 2017/0192730 | A1 | 7/2017 | Yang et al. |
| 2017/0209766 | A1 | 7/2017 | Riley et al. |
| 2017/0212648 | A1 | 7/2017 | Choi et al. |
| 2017/0230236 | A1 | 8/2017 | Kim et al. |
| 2017/0236497 | A1 | 8/2017 | Huitema et al. |
| 2017/0239524 | A1 | 8/2017 | Lee et al. |
| 2017/0243508 | A1 | 8/2017 | Cheng et al. |
| 2017/0255169 | A1 | 9/2017 | Lee et al. |
| 2017/0257426 | A1 | 9/2017 | Wilbur et al. |
| 2017/0266494 | A1 | 9/2017 | Crankson et al. |
| 2017/0269715 | A1 | 9/2017 | Kim et al. |
| 2017/0269792 | A1 | 9/2017 | Xu et al. |
| 2017/0277136 | A1 | 9/2017 | Minami et al. |
| 2017/0286913 | A1 | 10/2017 | Liu et al. |
| 2017/0287312 | A1 | 10/2017 | Schofield et al. |
| 2017/0294174 | A1 | 10/2017 | Albadawi et al. |
| 2017/0300013 | A1 | 10/2017 | Satou et al. |
| 2017/0322658 | A1 | 11/2017 | Lee et al. |
| 2017/0322711 | A1 | 11/2017 | Robinson et al. |
| 2017/0325196 | A1 | 11/2017 | Cho et al. |
| 2017/0329477 | A1 | 11/2017 | Sachidanandam et al. |
| 2017/0337554 | A1 | 11/2017 | Mokhasi et al. |
| 2017/0354845 | A1 | 12/2017 | Williams et al. |
| 2017/0357329 | A1 | 12/2017 | Park et al. |
| 2017/0357358 | A1 | 12/2017 | Teutschler et al. |
| 2017/0357413 | A1 | 12/2017 | Green |
| 2017/0357426 | A1 | 12/2017 | Wilson et al. |
| 2017/0357427 | A1 | 12/2017 | Wilson et al. |
| 2017/0357495 | A1 | 12/2017 | Crane et al. |
| 2017/0371394 | A1 | 12/2017 | Chan et al. |
| 2018/0011450 | A1 | 1/2018 | Stackowski |
| 2018/0024619 | A1 | 1/2018 | Kasuo et al. |
| 2018/0033311 | A1 | 2/2018 | Berggren |
| 2018/0052428 | A1 | 2/2018 | Abramov |
| 2018/0059903 | A1 | 3/2018 | Lim et al. |
| 2018/0061308 | A1 | 3/2018 | Bae et al. |
| 2018/0067633 | A1 | 3/2018 | Wilson et al. |
| 2018/0074462 | A1 | 3/2018 | Helder et al. |
| 2018/0081515 | A1 | 3/2018 | Block et al. |
| 2018/0088537 | A1 | 3/2018 | Murai |
| 2018/0088733 | A1 | 3/2018 | Syed et al. |
| 2018/0088797 | A1 | 3/2018 | Mcatee et al. |
| 2018/0097925 | A1 | 4/2018 | Ryu et al. |
| 2018/0120927 | A1 | 5/2018 | Ma et al. |
| 2018/0121060 | A1 | 5/2018 | Jeong et al. |
| 2018/0136810 | A1 | 5/2018 | Martin et al. |
| 2018/0150212 | A1 | 5/2018 | Chen et al. |
| 2018/0150443 | A1 | 5/2018 | Singleton |
| 2018/0157452 | A1 | 6/2018 | Nelson et al. |
| 2018/0174550 | A1 | 6/2018 | Zhang et al. |
| 2018/0181078 | A1 | 6/2018 | Imamura |
| 2018/0181381 | A1 | 6/2018 | Michaely et al. |
| 2018/0188925 | A1 | 7/2018 | Na et al. |
| 2018/0246635 | A1 | 8/2018 | Baer et al. |
| 2018/0246639 | A1 | 8/2018 | Han et al. |
| 2018/0260080 | A1 | 9/2018 | Cho |
| 2018/0261183 | A1 | 9/2018 | Gou et al. |
| 2018/0275739 | A1 | 9/2018 | Minami et al. |
| 2018/0288560 | A1 | 10/2018 | Naik et al. |
| 2018/0316783 | A1 | 11/2018 | Ye et al. |
| 2018/0321842 | A1 | 11/2018 | Lee et al. |
| 2018/0329587 | A1 | 11/2018 | Ko et al. |
| 2018/0335927 | A1 | 11/2018 | Anzures et al. |
| 2018/0341389 | A1 | 11/2018 | Kim et al. |
| 2018/0343023 | A1 | 11/2018 | Park et al. |
| 2018/0348844 | A1 | 12/2018 | Lingutla et al. |
| 2018/0349022 | A1 | 12/2018 | Chaudhri et al. |
| 2018/0352435 | A1 | 12/2018 | Donley et al. |
| 2018/0366068 | A1 | 12/2018 | Liu et al. |
| 2018/0374429 | A1 | 12/2018 | Nakamura |
| 2019/0018445 | A1 | 1/2019 | Watanabe et al. |
| 2019/0026011 | A1 | 1/2019 | Wang et al. |
| 2019/0037004 | A1 | 1/2019 | Chaudhri et al. |
| 2019/0050045 | A1 | 2/2019 | Jha et al. |
| 2019/0057593 | A1 | 2/2019 | Park et al. |
| 2019/0069244 | A1 | 2/2019 | Jeon et al. |
| 2019/0079576 | A1 | 3/2019 | Liu et al. |
| 2019/0121300 | A1 | 4/2019 | Peterson et al. |
| 2019/0121523 | A1 | 4/2019 | Block et al. |
| 2019/0139207 | A1 | 5/2019 | Jeong et al. |
| 2019/0158645 | A1 | 5/2019 | Yang et al. |
| 2019/0163142 | A1 | 5/2019 | Chang et al. |
| 2019/0172016 | A1 | 6/2019 | Chaudhri et al. |
| 2019/0180221 | A1 | 6/2019 | Greenberger et al. |
| 2019/0182749 | A1 | 6/2019 | Breaux et al. |
| 2019/0212707 | A1 | 7/2019 | Minami et al. |
| 2019/0213037 | A1 | 7/2019 | Kim et al. |
| 2019/0232110 | A1 | 8/2019 | Williams et al. |
| 2019/0232111 | A1 | 8/2019 | Williams et al. |
| 2019/0235748 | A1 | 8/2019 | Seol et al. |
| 2019/0237003 | A1 | 8/2019 | Cao et al. |
| 2019/0250813 | A1 | 8/2019 | Block et al. |
| 2019/0268771 | A1 | 8/2019 | Seo et al. |
| 2019/0279520 | A1 | 9/2019 | Wilson et al. |
| 2019/0281154 | A1 | 9/2019 | Choi et al. |
| 2019/0302972 | A1 | 10/2019 | Kline et al. |
| 2019/0324620 | A1 | 10/2019 | Gu et al. |
| 2019/0339860 | A1 | 11/2019 | Chen et al. |
| 2019/0340348 | A1 | 11/2019 | Yu et al. |
| 2019/0349469 | A1 | 11/2019 | Skogen et al. |
| 2020/0042311 | A1 | 2/2020 | Shin |
| 2020/0050332 | A1 | 2/2020 | Yang et al. |
| 2020/0068095 | A1 | 2/2020 | Nabetani |
| 2020/0073122 | A1 | 3/2020 | Rothkopf et al. |
| 2020/0089302 | A1 | 3/2020 | Kim et al. |
| 2020/0110946 | A1 | 4/2020 | Kline et al. |
| 2020/0125037 | A1 | 4/2020 | Jo et al. |
| 2020/0133206 | A1 | 4/2020 | Jo et al. |
| 2020/0149921 | A1 | 5/2020 | Hoffman et al. |
| 2020/0201540 | A1 | 6/2020 | Zambetti et al. |
| 2020/0228646 | A1 | 7/2020 | Hotes et al. |
| 2020/0242228 | A1 | 7/2020 | Farraro et al. |
| 2020/0249632 | A1 | 8/2020 | Olwal et al. |
| 2020/0264567 | A1 | 8/2020 | Ok et al. |
| 2020/0319348 | A1 | 10/2020 | Oshita et al. |
| 2020/0327862 | A1 | 10/2020 | Sinha et al. |
| 2020/0342144 | A1 | 10/2020 | Alameh et al. |
| 2020/0356063 | A1 | 11/2020 | Guzman et al. |
| 2020/0356224 | A1 | 11/2020 | Wilson |
| 2020/0356242 | A1 | 11/2020 | Wilson et al. |
| 2020/0356252 | A1 | 11/2020 | Ko et al. |
| 2020/0356687 | A1 | 11/2020 | Salzman et al. |
| 2020/0359204 | A1 | 11/2020 | Hawkins et al. |
| 2020/0379413 | A1 | 12/2020 | Chen et al. |
| 2020/0408521 | A1 | 12/2020 | Lyons et al. |
| 2021/0042028 | A1 | 2/2021 | Block et al. |
| 2021/0048929 | A1 | 2/2021 | Agnoli et al. |
| 2021/0073741 | A1 | 3/2021 | Chaudhri et al. |
| 2021/0132780 | A1 | 5/2021 | Kyung |
| 2021/0149694 | A1 | 5/2021 | Guzman et al. |
| 2021/0173431 | A1 | 6/2021 | Yang et al. |
| 2021/0201732 | A1 | 7/2021 | Ranjan et al. |

(56) References Cited

U.S. PATENT DOCUMENTS

| | | | |
|---|---|---|---|
| 2021/0203765 | A1 | 7/2021 | Yang et al. |
| 2021/0216654 | A1 | 7/2021 | Ko et al. |
| 2021/0294438 | A1 | 9/2021 | Yang |
| 2021/0349426 | A1 | 11/2021 | Chen et al. |
| 2021/0349427 | A1 | 11/2021 | Chen et al. |
| 2021/0349583 | A1 | 11/2021 | Guzman et al. |
| 2021/0349611 | A1 | 11/2021 | Chen et al. |
| 2021/0349741 | A1 | 11/2021 | Guzman et al. |
| 2022/0047918 | A1 | 2/2022 | Williams et al. |
| 2022/0129858 | A1 | 4/2022 | Chaudhri et al. |
| 2022/0157184 | A1 | 5/2022 | Wilson et al. |
| 2022/0184309 | A1 | 6/2022 | Rosinko et al. |
| 2022/0198984 | A1 | 6/2022 | Connor et al. |
| 2022/0214785 | A1 | 7/2022 | Giv |
| 2022/0221964 | A1 | 7/2022 | Ko et al. |
| 2022/0229537 | A1 | 7/2022 | Chen et al. |
| 2022/0236867 | A1 | 7/2022 | Chen et al. |
| 2022/0276780 | A1 | 9/2022 | Ko et al. |
| 2022/0291793 | A1 | 9/2022 | Zambetti et al. |
| 2022/0342514 | A1 | 10/2022 | Chao et al. |
| 2023/0004270 | A1 | 1/2023 | Chen et al. |
| 2023/0008229 | A1 | 1/2023 | Chen et al. |
| 2023/0035532 | A1 | 2/2023 | Chen et al. |
| 2023/0052490 | A1 | 2/2023 | Chaudhri et al. |
| 2023/0066552 | A1 | 3/2023 | Van Os et al. |
| 2023/0071987 | A1 | 3/2023 | Zeng et al. |
| 2023/0078153 | A1 | 3/2023 | Yang et al. |
| 2023/0082876 | A1 | 3/2023 | Guzman et al. |

FOREIGN PATENT DOCUMENTS

| | | | |
|---|---|---|---|
| AU | 2015101639 | A4 | 12/2015 |
| CA | 2356232 | A1 | 3/2002 |
| CA | 2781636 | A1 | 7/2010 |
| CA | 2792987 | A1 | 10/2011 |
| CA | 2800123 | C | 7/2016 |
| CA | 2986980 | A1 | 5/2019 |
| CH | 707412 | A2 | 6/2014 |
| CN | 1337638 | A | 2/2002 |
| CN | 1397904 | A | 2/2003 |
| CN | 1536511 | A | 10/2004 |
| CN | 1610866 | A | 4/2005 |
| CN | 1997957 | A | 7/2007 |
| CN | 101042618 | A | 9/2007 |
| CN | 101098535 | A | 1/2008 |
| CN | 101118469 | A | 2/2008 |
| CN | 101203821 | A | 6/2008 |
| CN | 101382438 | A | 3/2009 |
| CN | 100492288 | C | 5/2009 |
| CN | 101505320 | A | 8/2009 |
| CN | 101627349 | A | 1/2010 |
| CN | 101702112 | A | 5/2010 |
| CN | 101819486 | A | 9/2010 |
| CN | 101873386 | A | 10/2010 |
| CN | 101939740 | A | 1/2011 |
| CN | 101978374 | A | 2/2011 |
| CN | 101981987 | A | 2/2011 |
| CN | 102012738 | A | 4/2011 |
| CN | 102163098 | A | 8/2011 |
| CN | 201928419 | U | 8/2011 |
| CN | 102301415 | A | 12/2011 |
| CN | 102426490 | A | 4/2012 |
| CN | 102438092 | A | 5/2012 |
| CN | 102681648 | A | 9/2012 |
| CN | 102687176 | A | 9/2012 |
| CN | 102695302 | A | 9/2012 |
| CN | 102750070 | A | 10/2012 |
| CN | 102754071 | A | 10/2012 |
| CN | 102763066 | A | 10/2012 |
| CN | 102772211 | A | 11/2012 |
| CN | 102790826 | A | 11/2012 |
| CN | 102859480 | A | 1/2013 |
| CN | 102989159 | A | 3/2013 |
| CN | 103154954 | A | 6/2013 |
| CN | 103399480 | A | 11/2013 |
| CN | 103425451 | A | 12/2013 |
| CN | 103544920 | A | 1/2014 |
| CN | 103558916 | A | 2/2014 |
| CN | 103562832 | A | 2/2014 |
| CN | 103576902 | A | 2/2014 |
| CN | 103607660 | A | 2/2014 |
| CN | 103649897 | A | 3/2014 |
| CN | 103713843 | A | 4/2014 |
| CN | 103744671 | A | 4/2014 |
| CN | 103793075 | A | 5/2014 |
| CN | 103902165 | A | 7/2014 |
| CN | 103914238 | A | 7/2014 |
| CN | 103973899 | A | 8/2014 |
| CN | 203773233 | U | 8/2014 |
| CN | 104102388 | A | 10/2014 |
| CN | 104160362 | A | 11/2014 |
| CN | 104205785 | A | 12/2014 |
| CN | 104281257 | A | 1/2015 |
| CN | 104281405 | A | 1/2015 |
| CN | 104288983 | A | 1/2015 |
| CN | 104360735 | A | 2/2015 |
| CN | 104434314 | A | 3/2015 |
| CN | 104487929 | A | 4/2015 |
| CN | 104501043 | A | 4/2015 |
| CN | 104508426 | A | 4/2015 |
| CN | 104580576 | A | 4/2015 |
| CN | 105204931 | A | 12/2015 |
| CN | 105260049 | A | 1/2016 |
| CN | 105264479 | A | 1/2016 |
| CN | 105335087 | A | 2/2016 |
| CN | 105388966 | A | 3/2016 |
| CN | 105389078 | A | 3/2016 |
| CN | 105389107 | A | 3/2016 |
| CN | 105453016 | A | 3/2016 |
| CN | 205608658 | U | 9/2016 |
| CN | 106056848 | A | 10/2016 |
| CN | 106486044 | A | 3/2017 |
| CN | 106598201 | A | 4/2017 |
| CN | 106605201 | A | 4/2017 |
| CN | 107239101 | A | 10/2017 |
| CN | 107430489 | A | 12/2017 |
| CN | 107643677 | A | 1/2018 |
| CN | 107870560 | A | 4/2018 |
| CN | 108255049 | A | 7/2018 |
| CN | 109196469 | A | 1/2019 |
| CN | 109313655 | A | 2/2019 |
| CN | 109690445 | A | 4/2019 |
| CN | 110471582 | B | 10/2021 |
| DE | 202017105858 | U1 | 3/2018 |
| EP | 0579093 | A1 | 1/1994 |
| EP | 0831629 | A2 | 3/1998 |
| EP | 1079371 | A1 | 2/2001 |
| EP | 1659504 | A2 | 5/2006 |
| EP | 1674889 | A1 | 6/2006 |
| EP | 1674977 | A2 | 6/2006 |
| EP | 1679879 | A2 | 7/2006 |
| EP | 1750242 | A2 | 2/2007 |
| EP | 1777611 | A1 | 4/2007 |
| EP | 1832969 | A2 | 9/2007 |
| EP | 1855170 | A2 | 11/2007 |
| EP | 1885109 | A2 | 2/2008 |
| EP | 1988432 | A1 | 11/2008 |
| EP | 2040146 | A2 | 3/2009 |
| EP | 2120115 | A2 | 11/2009 |
| EP | 2175367 | A2 | 4/2010 |
| EP | 2194508 | A1 | 6/2010 |
| EP | 2194698 | A1 | 6/2010 |
| EP | 2204702 | A1 | 7/2010 |
| EP | 2284646 | A1 | 2/2011 |
| EP | 2290922 | A1 | 3/2011 |
| EP | 2302493 | A2 | 3/2011 |
| EP | 2312512 | A1 | 4/2011 |
| EP | 2360902 | A2 | 8/2011 |
| EP | 2367098 | A2 | 9/2011 |
| EP | 2413577 | A2 | 2/2012 |
| EP | 2423810 | A1 | 2/2012 |
| EP | 2426902 | A1 | 3/2012 |
| EP | 2437148 | A2 | 4/2012 |
| EP | 2547117 | A1 | 1/2013 |

(56) References Cited

FOREIGN PATENT DOCUMENTS

| | | | |
|---|---|---|---|
| EP | 2600215 | A1 | 6/2013 |
| EP | 2602759 | A2 | 6/2013 |
| EP | 2615607 | A2 | 7/2013 |
| EP | 2629483 | A1 | 8/2013 |
| EP | 2653961 | A1 | 10/2013 |
| EP | 2677775 | A1 | 12/2013 |
| EP | 2693382 | A2 | 2/2014 |
| EP | 2720126 | A1 | 4/2014 |
| EP | 2733598 | A2 | 5/2014 |
| EP | 2738640 | A2 | 6/2014 |
| EP | 2821912 | A1 | 1/2015 |
| EP | 2942932 | A1 | 11/2015 |
| EP | 2990887 | A2 | 3/2016 |
| EP | 2993602 | A1 | 3/2016 |
| EP | 2998822 | A2 | 3/2016 |
| EP | 3056949 | A1 | 8/2016 |
| EP | 3101958 | A1 | 12/2016 |
| EP | 3376342 | A1 | 9/2018 |
| EP | 3401770 | A1 | 11/2018 |
| EP | 3465408 | B1 | 8/2020 |
| EP | 3896560 | A1 | 10/2021 |
| GB | 2370208 | A | 6/2002 |
| GB | 2475669 | A | 6/2011 |
| JP | 49-134364 | A | 12/1974 |
| JP | 53-31170 | A | 3/1978 |
| JP | 56-621 | A | 1/1981 |
| JP | 3007616 | U | 2/1995 |
| JP | 8-110955 | A | 4/1996 |
| JP | 9-251084 | A | 9/1997 |
| JP | 10-143636 | A | 5/1998 |
| JP | 10-506472 | A | 6/1998 |
| JP | 11-109066 | A | 4/1999 |
| JP | 11-160470 | A | 6/1999 |
| JP | 11-232013 | A | 8/1999 |
| JP | 2000-122957 | A | 4/2000 |
| JP | 2000-162349 | A | 6/2000 |
| JP | 3062531 | B2 | 7/2000 |
| JP | 2001-144884 | A | 5/2001 |
| JP | 2001-147282 | A | 5/2001 |
| JP | 2001-273064 | A | 10/2001 |
| JP | 2001-313886 | A | 11/2001 |
| JP | 2001-318852 | A | 11/2001 |
| JP | 2002-73486 | A | 3/2002 |
| JP | 2002-507718 | A | 3/2002 |
| JP | 2002-251238 | A | 9/2002 |
| JP | 2002-271451 | A | 9/2002 |
| JP | 2002-342356 | A | 11/2002 |
| JP | 2002-351768 | A | 12/2002 |
| JP | 2003-9404 | A | 1/2003 |
| JP | 2003-30245 | A | 1/2003 |
| JP | 2003-233616 | A | 8/2003 |
| JP | 2003-296246 | A | 10/2003 |
| JP | 2004-28918 | A | 1/2004 |
| JP | 2004-519033 | A | 6/2004 |
| JP | 2004-184396 | A | 7/2004 |
| JP | 2005-521890 | A | 7/2005 |
| JP | 2005-532607 | A | 10/2005 |
| JP | 2005-339017 | A | 12/2005 |
| JP | 2006-101505 | A | 4/2006 |
| JP | 2006-293340 | A | 10/2006 |
| JP | 2008-97202 | A | 4/2008 |
| JP | 2008-175800 | A | 7/2008 |
| JP | 2009-147889 | A | 7/2009 |
| JP | 2009-239867 | A | 10/2009 |
| JP | 2009-293960 | A | 12/2009 |
| JP | 2010-124181 | A | 6/2010 |
| JP | 2010-245940 | A | 10/2010 |
| JP | 2010-257051 | A | 11/2010 |
| JP | 3168099 | U | 6/2011 |
| JP | 2011-159172 | A | 8/2011 |
| JP | 2011-209786 | A | 10/2011 |
| JP | 2011-217000 | A | 10/2011 |
| JP | 2011-530101 | A | 12/2011 |
| JP | 2012-32306 | A | 2/2012 |
| JP | 2012-53642 | A | 3/2012 |
| JP | 2012-505478 | A | 3/2012 |
| JP | 2012-109778 | A | 6/2012 |
| JP | 2012-123475 | A | 6/2012 |
| JP | 2012-147432 | A | 8/2012 |
| JP | 2012-517630 | A | 8/2012 |
| JP | 2012-203537 | A | 10/2012 |
| JP | 2012-203832 | A | 10/2012 |
| JP | 2012-531607 | A | 12/2012 |
| JP | 2013-3671 | A | 1/2013 |
| JP | 2013-29925 | A | 2/2013 |
| JP | 2013-506225 | A | 2/2013 |
| JP | 2013-92989 | A | 5/2013 |
| JP | 2013-530458 | A | 7/2013 |
| JP | 2013-146557 | A | 8/2013 |
| JP | 2013-175188 | A | 9/2013 |
| JP | 2013-232230 | A | 11/2013 |
| JP | 2014-35766 | A | 2/2014 |
| JP | 2014-503861 | A | 2/2014 |
| JP | 2014-123197 | A | 7/2014 |
| JP | 2014-143575 | A | 8/2014 |
| JP | 2014-519126 | A | 8/2014 |
| JP | 2014-216868 | A | 11/2014 |
| JP | 5630676 | B2 | 11/2014 |
| JP | 2015-210587 | A | 11/2015 |
| JP | 2016-013151 | A | 1/2016 |
| JP | 2017-527026 | A | 9/2017 |
| JP | 2017-531225 | A | 10/2017 |
| JP | 2017-531230 | A | 10/2017 |
| JP | 2018-514838 | A | 6/2018 |
| JP | 2018-113544 | A | 7/2018 |
| JP | 2018-116067 | A | 7/2018 |
| KR | 10-2004- 0107489 | A | 12/2004 |
| KR | 10-2004-25314 | Y1 | 9/2006 |
| KR | 10-2007-0025292 | A | 3/2007 |
| KR | 10-2008-0058246 | A | 6/2008 |
| KR | 10-0864578 | B1 | 10/2008 |
| KR | 10-2009-0112132 | A | 10/2009 |
| KR | 10-2010-0025846 | A | 3/2010 |
| KR | 10-2010-0025853 | A | 3/2010 |
| KR | 10-2011-0093729 | A | 8/2011 |
| KR | 10-2012-0132134 | A | 12/2012 |
| KR | 10-2013-0109466 | A | 10/2013 |
| KR | 10-2014-0025552 | A | 3/2014 |
| KR | 10-2014-0064687 | A | 5/2014 |
| KR | 10-2014-0074824 | A | 6/2014 |
| KR | 10-2015-0001287 | A | 1/2015 |
| KR | 10-2015-0008996 | A | 1/2015 |
| KR | 10-2015-0038711 | A | 4/2015 |
| KR | 10-2015-0081140 | A | 7/2015 |
| KR | 10-2015-0093090 | A | 8/2015 |
| KR | 10-2016-0026314 | A | 3/2016 |
| KR | 10-2017-0032471 | A | 3/2017 |
| KR | 10-2017-0076452 | A | 7/2017 |
| KR | 10-2017-0081391 | A | 7/2017 |
| KR | 10-2017-0082698 | A | 7/2017 |
| KR | 10-2018-0011581 | A | 2/2018 |
| KR | 10-1875907 | B1 | 7/2018 |
| KR | 10-2019-0020850 | A | 3/2019 |
| KR | 10-2019-0071285 | A | 6/2019 |
| KR | 10-2019-0114034 | A | 10/2019 |
| TW | 498240 | B | 8/2002 |
| TW | 546942 | B | 8/2003 |
| TW | 200512616 | A | 4/2005 |
| TW | 200850058 | A | 12/2008 |
| TW | 200915698 | A | 4/2009 |
| TW | I348803 | B | 9/2011 |
| TW | 201232486 | A | 8/2012 |
| TW | M435665 | U | 8/2012 |
| TW | 201419115 | A | 5/2014 |
| WO | 98/40795 | A1 | 9/1998 |
| WO | 1999/66394 | A1 | 12/1999 |
| WO | 1999/66395 | A2 | 12/1999 |
| WO | 2001/71433 | A1 | 9/2001 |
| WO | 2002/054157 | A1 | 7/2002 |
| WO | 2003/048872 | A1 | 6/2003 |
| WO | 2003/085460 | A2 | 10/2003 |
| WO | 2004/056107 | A1 | 7/2004 |
| WO | 2004/095414 | A1 | 11/2004 |
| WO | 2005/109829 | A1 | 11/2005 |

(56) References Cited

FOREIGN PATENT DOCUMENTS

| | | | |
|---|---|---|---|
| WO | 2006/012343 | A2 | 2/2006 |
| WO | 2006/094308 | A2 | 9/2006 |
| WO | 2006/112641 | A1 | 10/2006 |
| WO | 2006/094308 | A3 | 12/2006 |
| WO | 2006/131780 | A1 | 12/2006 |
| WO | 2007/018881 | A2 | 2/2007 |
| WO | 2007/102110 | A2 | 9/2007 |
| WO | 2008/114491 | A1 | 9/2008 |
| WO | 2009/053775 | A1 | 4/2009 |
| WO | 2009/085378 | A1 | 7/2009 |
| WO | 2009/146857 | A2 | 12/2009 |
| WO | 2010/017627 | A1 | 2/2010 |
| WO | 2011/000893 | A1 | 1/2011 |
| WO | 2011/041427 | A2 | 4/2011 |
| WO | 2011/062871 | A2 | 5/2011 |
| WO | 2011/084857 | A1 | 7/2011 |
| WO | 2011/084859 | A1 | 7/2011 |
| WO | 2011/099819 | A2 | 8/2011 |
| WO | 2011/130849 | A8 | 10/2011 |
| WO | 2011/149231 | A2 | 12/2011 |
| WO | 2012/021507 | A2 | 2/2012 |
| WO | 2012/128361 | A1 | 9/2012 |
| WO | 2012/161434 | A2 | 11/2012 |
| WO | 2012/170446 | A2 | 12/2012 |
| WO | 2013/051048 | A1 | 4/2013 |
| WO | 2013/093558 | A1 | 6/2013 |
| WO | 2013/097895 | A1 | 7/2013 |
| WO | 2013/111239 | A1 | 8/2013 |
| WO | 2013/135270 | A1 | 9/2013 |
| WO | 2013/136548 | A1 | 9/2013 |
| WO | 2013/169842 | A2 | 11/2013 |
| WO | 2013/169846 | A1 | 11/2013 |
| WO | 2013/169849 | A2 | 11/2013 |
| WO | 2013/169851 | A2 | 11/2013 |
| WO | 2013/169854 | A2 | 11/2013 |
| WO | 2013/169870 | A1 | 11/2013 |
| WO | 2013/169875 | A2 | 11/2013 |
| WO | 2013/169877 | A2 | 11/2013 |
| WO | 2013/169882 | A2 | 11/2013 |
| WO | 2014/024000 | A1 | 2/2014 |
| WO | 2014/078114 | A1 | 5/2014 |
| WO | 2014/081181 | A1 | 5/2014 |
| WO | 2014/105274 | A1 | 7/2014 |
| WO | 2014/105276 | A1 | 7/2014 |
| WO | 2014/105278 | A1 | 7/2014 |
| WO | 2014/105279 | A1 | 7/2014 |
| WO | 2014/143776 | A2 | 9/2014 |
| WO | 2014/189197 | A1 | 11/2014 |
| WO | 2014/200730 | A1 | 12/2014 |
| WO | 2015/023419 | A1 | 2/2015 |
| WO | 2015/029313 | A1 | 3/2015 |
| WO | 2015/034960 | A1 | 3/2015 |
| WO | 2015/065402 | A1 | 5/2015 |
| WO | 2015/163536 | A1 | 10/2015 |
| WO | 2016/022203 | A1 | 2/2016 |
| WO | 2016/022204 | A1 | 2/2016 |
| WO | 2016/022205 | A1 | 2/2016 |
| WO | 2016/022496 | A2 | 2/2016 |
| WO | 2016/025395 | A2 | 2/2016 |
| WO | 2016/032076 | A1 | 3/2016 |
| WO | 2016/036427 | A1 | 3/2016 |
| WO | 2016/036522 | A2 | 3/2016 |
| WO | 2016/057062 | A1 | 4/2016 |
| WO | 2016/099097 | A1 | 6/2016 |
| WO | 2016/144385 | A1 | 9/2016 |
| WO | 2016/144563 | A1 | 9/2016 |
| WO | 2016/144977 | A1 | 9/2016 |
| WO | 2017/062621 | A1 | 4/2017 |
| WO | 2017/213777 | A1 | 12/2017 |
| WO | 2017/213899 | A1 | 12/2017 |
| WO | 2017/213937 | A1 | 12/2017 |
| WO | 2018/048700 | A1 | 3/2018 |
| WO | 2018/213451 | A1 | 11/2018 |
| WO | 2019/200350 | A1 | 10/2019 |
| WO | 2019/217086 | A2 | 11/2019 |
| WO | 2019/217249 | A2 | 11/2019 |
| WO | 2021/050190 | A1 | 3/2021 |

OTHER PUBLICATIONS

Final Office Action received for U.S. Appl. No. 16/389,722, dated Dec. 8, 2020, 18 pages.

Intention to Grant Received for Danish Patent Application No. PA201970596, dated Dec. 1, 2020, 2 pages.

Non-Final Office Action received for U.S. Appl. No. 16/401,934, dated Dec. 11, 2020, 26 pages.

Non-Final Office Action received for U.S. Appl. No. 16/997,588, dated Dec. 14, 2020, 21 pages.

Office Action received for Australian Patent Application No. 2020102158, dated Dec. 8, 2020, 9 pages.

Office Action received for Australian Patent Application No. 2020204506, dated Dec. 7, 2020, 6 pages.

Office Action received for European Patent Application No. 16762356.0, dated Dec. 11, 2020, 7 pages.

Applicant-Initiated Interview Summary received for U.S. Appl. No. 16/377,892, dated Oct. 13, 2020, 5 pages.

Applicant-Initiated Interview Summary received for U.S. Appl. No. 16/378,136, dated Oct. 13, 2020, 4 pages.

Barbosa Jonathan, "Weather Clock 2.1 for Android", APKPure, Online Available at: https://apkpure.com/weather-clock/com.urbandroid.wclock, Oct. 15, 2015, 3 pages.

Elecont, "Weather clock—hourly forecast description", Accurate 10-day weather forecast, NOAA radar and satellite, buoy, Elecont LLC Forums, Online Available at: https://www.tapatalk.com/groups/elecontfr/weather-clock-hourly-forecast-description-t427.html, Dec. 1, 2011, 5 pages.

Non-Final Office Action received for U.S. Appl. No. 15/421,865, dated Oct. 7, 2020, 20 pages.

Non-Final Office Action received for U.S. Appl. No. 16/659,507, dated Oct. 7, 2020, 16 pages.

Office Action received for Korean Patent Application No. 10-2020-7001340, dated Sep. 24, 2020, 19 pages (8 pages of English Translation and 11 pages of Official Copy).

Advisory Action received for U.S. Appl. No. 16/377,892, dated Apr. 9, 2021, 4 pages.

Advisory Action received for U.S. Appl. No. 16/378,136, dated Apr. 12, 2021, 4 pages.

Final Office Action received for U.S. Appl. No. 16/806,981, dated Apr. 14, 2021, 24 pages.

Final Office Action received for U.S. Appl. No. 16/861,651, dated Apr. 20, 2021, 14 pages.

Notice of Acceptance received for Australian Patent Application No. 2020204506, dated Apr. 8, 2021, 3 pages.

Office Action received for Australian Patent Application No. 2020203919, dated Mar. 30, 2021, 5 pages.

Office Action received for Chinese Patent Application No. 201680012936.3, dated Mar. 3, 2021, 12 pages (5 pages of English Translation and 7 pages of Official Copy).

Office Action received for Chinese Patent Application No. 201810411708.4, dated Feb. 26, 2021, 16 pages (8 pages of English Translation and 8 pages of Official Copy).

Office Action received for Korean Patent Application No. 10-2019-7029673, dated Apr. 8, 2021, 7 pages (3 pages of English Translation and 4 pages of Official Copy).

Notice of Allowance received for Korean Patent Application No. 10-2021-7002597, dated Feb. 25, 2021, 5 pages (1 page of English Translation and 4 pages of Official Copy).

Supplemental Notice of Allowance received for U.S. Appl. No. 14/815,890, dated Mar. 10, 2021, 2 pages.

Dev Phlam, "Clockwork Tomato Presentation", Retrieved from the Internet: URL: https://www.youtube.com/watch?v=2IQDx9REn0E, Apr. 29, 2016, 6 pages.

Extended European Search Report received for European Patent Application No. 20176616.9, dated Sep. 8, 2020, 7 Pages.

(56) References Cited

OTHER PUBLICATIONS

Office Action received for Korean Patent Application No. 10-2019-7029673, dated Sep. 3, 2020, 9 pages (4 pages of English Translation and 5 pages of Official Copy).
Applicant-Initiated Interview Summary received for U.S. Appl. No. 16/659,507, dated Nov. 17, 2020, 3 pages.
Decision on Appeal received for U.S. Appl. No. 14/815,890, dated Nov. 24, 2020, 13 pages.
International Preliminary Report on Patentability received for PCT Patent Application No. PCT/US2019/030770, dated Nov. 19, 2020, 14 pages.
International Search Report and Written Opinion received for PCT Patent Application No. PCT/US2020/031536, dated Sep. 23, 2020, 16 pages.
International Search Report and Written Opinion received for PCT Patent Application No. PCT/US2020/031575, dated Aug. 20, 2020, 14 pages.
Invitation to Pay Additional Fees received for PCT Patent Application No. PCT/US2020/031536, dated Jul. 31, 2020, 9 pages.
Invitation to Pay Additional Fees received for PCT Patent Application No. PCT/US2020/045814, dated Nov. 18, 2020, 11 pages.
Non-Final Office Action received for U.S. Appl. No. 16/806,981, dated Nov. 13, 2020, 22 pages.
Non-Final Office Action received for U.S. Appl. No. 16/861,651, dated Nov. 27, 2020, 11 pages.
Notice of Allowance received for U.S. Appl. No. 16/584,281, dated Nov. 18, 2020, 8 pages.
Office Action received for Chinese Patent Application No. 201710439448.7, dated Oct. 10, 2020, 19 pages (8 pages of English Translation and 11 pages of Official Copy).
Record of Oral Hearing received for U.S. Appl. No. 14/815,890, mailed on Nov. 20, 2020, 18 pages.
Result of Consultation received for European Patent Application No. 15730925.3, dated Nov. 24, 2020, 4 pages.
"3C Blogger Kisplay Share", Samsung GALAXY Tab S Hands-on SideSync 3.0 Is Amazing, Jul. 4, 2014, 4 pages. (Official Copy Only) {See Communication under 37 CFR § 1.98(a) (3)}.
"Accepted Outlook Meetings Move to Deleted Folder" Available online at:—https://social.technet.microsoft.com/Forums/office/en-US/f3301c9a-a93f-49f7-be13-c642e285f150/accepted-outlook-meetings-move-to-deleted-folder?forum=outlook, Jan. 13, 2011, 4 pages.
Advisory Action received for U.S. Appl. No. 14/752,776, dated Aug. 31, 2018, 3 pages.
Advisory Action received for U.S. Appl. No. 14/846,511, dated Oct. 22, 2019, 5 pages.
Advisory Action received for U.S. Appl. No. 14/846,511, dated Sep. 19, 2018, 8 pages.
Advisory Action received for U.S. Appl. No. 15/421,865, dated Apr. 16, 2020, 7 pages.
Advisory Action received for U.S. Appl. No. 16/582,020, dated Aug. 3, 2020, 4 pages.
"AdyClock—Night Alarm Clock", App for android, Google play store page: <https://web.archive.org/web/20130924223153/https://play.google.com/store/apps/details?id=com.adyclock&hl=en>, Sep. 24, 2013, 2 pages.
"Android 2.3.4 User's Guide", Online available at:—<https://static.googleusercontent.com/media/www.google.com/en//help/hc/pdfs/mobile/AndroidUsersGuide-2.3.4.pdf>, May 20, 2011, 384 pages.
Andro Dollar, "Huawei Watch GT Always on Mode UPDATE is finally here! LK", Online Available at:—<https://www.youtube.com/watch?v=AJw_FIAf7v4>, Jun. 6, 2019, 4 pages.
Android Tips, "Create a Minimal Lock Screen with WidgetLocker", Online Available at: <http://appstap192.blogspot.com/2012/01/create-minimal-lock-screen-with.html>, Jan. 18, 2012, 6 pages.
"AOD too dim. I've answered my own question to help others", Online Available at:—<https://forums.androidcentral.com/samsung-galaxy-s9-s9-plus/874444-aod-too-dim-ive-answered-my-own-question-help-others.html>, Mar. 11, 2018, 3 pages.
Applicant Initiated Interview Summary received for U.S. Appl. No. 14/846,511, dated Apr. 20, 2020, 4 pages.
Applicant Initiated Interview Summary received for U.S. Appl. No. 16/265,938, dated Mar. 11, 2020, 5 pages.
Applicant Initiated Interview Summary received for U.S. Appl. No. 16/389,722, dated Jul. 7, 2020, 5 pages.
Applicant Initiated Interview Summary received for U.S. Appl. No. 16/582,020, dated Jul. 14, 2020, 5 pages.
Applicant Initiated Interview Summary received for U.S. Appl. No. 16/582,020, dated Mar. 25, 2020, 5 pages.
Applicant Initiated Interview Summary received for U.S. Appl. No. 16/585,399, dated Mar. 25, 2020, 3 pages.
Applicant-Initiated Interview Summary received for U.S. Appl. No. 15/421,865, dated Feb. 3, 2020, 5 pages.
Applicant-Initiated Interview Summary received for U.S. Appl. No. 15/798,235, dated Feb. 3, 2020, 3 pages.
Applicant-Initiated Interview Summary received for U.S. Appl. No. 16/147,523, dated Apr. 27, 2020, 3 pages.
Applicant-Initiated Interview Summary received for U.S. Appl. No. 16/259,954, dated Mar. 23, 2020, 3 pages.
Applicant-Initiated Interview Summary received for U.S. Appl. No. 16/265,938, dated May 28, 2020, 5 pages.
"Axiang's Network Notebook, Deep Analysis on Samsung's 2013 New Flagship: tell you what kind of mobile phone GALAXY S4 is!", available at: https://axiang.cc/archives/6115, Apr. 22, 2013, 4 pages. (Official Copy Only) {See Communication under 37 CFR § 1.98(a) (3)}.
Big Phil TV, "Gear S3 Watch faces with great always on display (A O D)", Available online at: <https://www.youtube.com/watch?v=2cxMnrMiGU8>, Apr. 5, 2017, 3 pages.
Brief Communication regarding Oral Proceedings received for European Patent Application No. 17206177.2, mailed on Nov. 21, 2019, 5 pages.
"Brightness on lock screen", Online Available at: https://www.reddit.eom/r/galaxys10/comments/b4d5fb/brightness_on_lock_screen/, 2019, 1 page.
Cancellation of Oral Proceedings received for European Patent Application No. 17206177.2, mailed on Dec. 4, 2019, 2 pages.
Cengic, Suad, "Samsung Gear S3—Display Always on! Cool!", Available online at: <https://www.youtube.com/watch?v=ceeDinbPwOY>, Mar. 10, 2017, 3 pages.
Certificate of Examination received for Australian Patent Application No. 2018101855, dated Aug. 6, 2019, 2 pages.
Certification of Examination received for Australian Patent Application No. 2018100158, dated Oct. 23, 2018, 2 pages.
Chan, Christine, "Handoff Your Browser to Your iPhone or iPad! Plus a Chance to Win a Copy!", Apr. 12, 2011, 2 pages.
Codrington, Simon, "Intuitive Scrolling Interfaces with CSS Scroll Snap Points", Online Available at: <https://www.sitepoint.com/intuitive-scrolling-interfaces-with-css-scroll-snap-points/>, Dec. 8, 2015, 14 pages.
Corrected Notice of Allowance received for U.S. Appl. No. 14/841,614, dated Jan. 8, 2019, 3 pages.
Corrected Notice of Allowance received for U.S. Appl. No. 15/554,204, dated Aug. 19, 2020, 3 pages.
Dan, "Get This Look: 'Minimal' Zooper Widget", Online Available at:—<https://www.androidguys.com/featured/customize/get-look-minimal-zooper-widget/>, Mar. 7, 2014, 2 pages.
Droid Life, "How to: Use Always-on Apps with Android Wear", Available online at: <<https://www.youtube.com/watch?v=_-xYB9EBTaA>, Jun. 26, 2015, 3 pages.
Decision to Grant Received for Danish Patent Application No. PA201770397, dated Feb. 6, 2018, 2 pages.
Decision to Grant received for Danish Patent Application No. PA201770791, dated Jul. 7, 2020, 2 pages.
Decision to Grant received for European Patent Application No. 15711969.4, dated Sep. 26, 2019, 2 pages.
Decision to Grant received for European Patent Application No. 15739110.3, dated Sep. 19, 2019, 2 pages.
Decision to Grant received for European Patent Application No. 17206177.2, dated Aug. 6, 2020, 2 pages.
"Digital alarm clock app for Android", Goggle play store digital alarm clock description page, Mar. 25, 2015, 3 pages.

(56) References Cited

OTHER PUBLICATIONS

Ellis, Benus, "Use a Phone Number in the Google Calendar Where Line for One Click Calling", Available online at: <https://ellisbenus.com/ellis-benus/use-a-phone-number-in-the-google-calender-where-line-for-one-click-calling>, Ellis Benus—Small Business Web Guru, Oct. 3, 2012, 2 pages.
European Search Report received for European Patent Application No. 17206177.2, dated Apr. 30, 2018, 4 pages.
European Search Report received for European Patent Application No. 20172197.4, dated Jul. 28, 2020, 4 pages.
Examiner's Answer to Appeal Brief received for U.S. Appl. No. 15/128,952, mailed on Jan. 8, 2020, 9 pages.
Examiner's Pre-Review Report received for Japanese Patent Application No. 2018-080122, dated Feb. 25, 2020, 6 pages (3 pages of English Translation and 3 pages of Official Copy).
Extended European Search Report (includes Partial European Search Report and European Search Opinion) received for European Patent Application No. 16190252.3, dated Mar. 1, 2017, 10 pages.
Extended European Search Report for European Application No. 19185318.3, dated Nov. 20, 2019, 8 pages.
Extended European Search Report received for European Patent Application No. 17810723.1, dated Nov. 12, 2019, 9 pages.
Extended European Search Report received for European Patent Application No. 19203942.8, dated Apr. 1, 2020, 10 pages.
Feist, Jonathan, "Android Customization—How to Create a Custom Clock Widget Using Zooper Widget", Available Online at: <https://www.androidauthority.com/zooper-widget-clock-366476/>, May 15, 2014, 10 pages.
Final Office Action received for U.S. Appl. No. 14/752,776, dated May 29, 2018, 36 pages.
Final Office Action received for U.S. Appl. No. 14/841,614, dated May 10, 2018, 13 pages.
Final Office Action received for U.S. Appl. No. 14/841,623, dated Sep. 5, 2017, 16 pages.
Final Office Action received for U.S. Appl. No. 14/846,511 dated May 10, 2018, 21 pages.
Final Office Action received for U.S. Appl. No. 14/846,511, dated Aug. 11, 2020, 25 pages.
Final Office Action received for U.S. Appl. No. 14/846,511, dated Jun. 5, 2019, 24 pages.
Final Office Action received for U.S. Appl. No. 15/128,952, dated Jul. 18, 2018, 19 pages.
Final Office Action received for U.S. Appl. No. 15/421,865, dated Dec. 2, 2019, 19 pages.
Final Office Action received for U.S. Appl. No. 15/798,235, dated Oct. 9, 2018, 45 pages.
Final Office Action received for U.S. Appl. No. 15/798,235, dated Oct. 18, 2019, 25 pages.
Final Office Action received for U.S. Appl. No. 16/147,523, dated Aug. 4, 2020, 15 pages.
Final Office Action received for U.S. Appl. No. 16/265,938, dated Apr. 7, 2020, 45 pages.
Final Office Action received for U.S. Appl. No. 16/582,020, dated Apr. 28, 2020, 31 pages.
"Fitbit surge Fitness Watch", Manual version 1.0, May 7, 2015, 48 pages.
Frakes, Dan, "How to Get Started with Airplay", Online available at: <https://www.macworld.com/article/2039770/how-to-get-started-with-airplay.html>, Macworld, May 27, 2013, 8 pages.
"GT-I9500(Galaxy S4) User Manual, SAMSUNG", Rev.1.1, May 2013, 14 pages. (Official Copy Only) {See Communication under 37 CFR § 1.98(a) (3)}.
Intention to Grant Received for Danish Patent Application No. PA201770397, dated Aug. 18, 2017, 7 pages.
Intention to Grant received for Danish Patent Application No. PA201770791, dated Feb. 19, 2020, 2 pages.
Intention to Grant received for European Patent Application No. 15711969.4, dated May 29, 2019, 11 pages.
Intention to Grant received for European Patent Application No. 15739110.3, dated Mar. 7, 2019, 8 pages.
Intention to Grant received for European Patent Application No. 15739110.3, dated Sep. 11, 2019, 6 pages.
Intention to Grant received for European Patent Application No. 17206177.2, dated Feb. 24, 2020, 8 pages.
International Preliminary Report on Patentability received for PCT Patent Application No. PCT/US2015/019317, dated Dec. 15, 2016, 18 pages.
International Preliminary Report on Patentability received for PCT Patent Application No. PCT/US2015/038173, dated Jan. 5, 2017, 10 pages.
International Preliminary Report on Patentability received for PCT Patent Application No. PCT/US2015/038174, dated Jan. 5, 2017, 27 pages.
International Preliminary Report on Patentability received for PCT Patent Application No. PCT/US2015/041424, dated Feb. 2, 2017, 13 Pages.
International Preliminary Report on Patentability received for PCT Patent Application No. PCT/US2015/054223, dated Dec. 14, 2017, 18 pages.
International Preliminary Report on Patentability received for PCT Patent Application No. PCT/US2017/034834, dated Dec. 20, 2018, 9 pages.
International Preliminary Report on Patentability received for PCT Patent Application No. PCT/US2017/035554, dated Dec. 20, 2018, 39 pages.
International Preliminary Report on Patentability received for PCT Patent Application No. PCT/US2018/032164, dated Nov. 21, 2019, 11 pages.
International Preliminary Report on Patentability received for PCT Patent Application No. PCT/US2015/046787, dated Mar. 16, 2017, 19 pages.
International Search Report and Written Opinion received for PCT Patent Application No. PCT/US2015/054223, dated Jul. 6, 2016, 25 pages.
International Search Report and Written Opinion received for PCT Patent Application No. PCT/US2017/034834, dated Aug. 23, 2017, 10 pages.
International Search Report and Written Opinion received for PCT Patent Application No. PCT/US2017/035554, dated Sep. 22, 2017, 42 pages.
International Search Report and Written Opinion received for PCT Patent Application No. PCT/US2018/032164, dated Oct. 18, 2018, 16 Pages.
International Search Report and Written Opinion received for PCT Patent Application No. PCT/US2019/030770, dated Oct. 31, 2019, 23 pages.
Invitation to pay additional fees received for PCT Patent Application No. PCT/US2015/054223, dated Mar. 9, 2016, 9 pages.
Invitation to Pay Additional Fees received for PCT Patent Application No. PCT/US2017/035554, dated Jul. 20, 2017, 2 pages.
Invitation to Pay Additional Fees received for PCT Patent Application No. PCT/US2018/032164, dated Aug. 21, 2018, 10 pages.
Invitation to Pay Additional Fees received for PCT Patent Application No. PCT/US2019/030770, dated Jul. 26, 2019, 12 pages.
Invitation to Pay Additional Fees received for PCT Patent Application No. PCT/US2020/030079, dated Jul. 14, 2020, 12 pages.
Invitation to Pay Search Fees received for European Patent Application No. 15753796.0, dated Mar. 24, 2020, 3 pages.
International Search Report and Written Opinion received for PCT Patent Application No. PCT/US2015/019317, dated Aug. 25, 2015, 24 pages.
Invitation to Pay Additional Fees received for PCT Patent Application No. PCT/US2015/019317, dated May 22, 2015, 7 pages.
International Search Report and Written Opinion received for PCT Patent Application No. PCT/US2015/038173 dated Sep. 25, 2015, 13 pages.
International Search Report and Written Opinion received for PCT Patent Application No. PCT/US2015/038174, dated Jan. 18, 2016, 38 pages.
Invitation to Pay Additional Fees received for PCT Patent Application No. PCT/US2015/038174, dated Oct. 5, 2015, 5 pages.

(56) References Cited

OTHER PUBLICATIONS

International Search Report and Written Opinion received for PCT Patent Application No. PCT/US2015/041424, dated Mar. 31, 2016, 18 pages.
Invitation to Pay Additional Fees received for PCT Patent Application No. PCT/US2015/041424, dated Nov. 12, 2015, 6 pages.
International Search Report and Written Opinion received for PCT Patent Application No. PCT/US2015/046787, dated Apr. 1, 2016, 26 pages.
Invitation to Pay Additional Fees received for PCT Patent Application No. PCT/US2015/046787, dated Dec. 15, 2015, 8 pages.
IPhone, "User Guide for iOS 7.1 Software", Mar. 2014, 162 pages.
Jepson, Tom, "How to Auto-Forward Specific Emails in Gmail?", Available online at:—<http://www.tomjepson.co.uk/how-to-auto-forward-specific-emails-in-gmail/>, May 19, 2013, 7 pages.
"Kinect Gesture Commands—Kinect Voice Commands", Xbox Wire, Available Online at: <https://hwcdn.libsyn.com/p/4/4/c/44c89c7f273167b4/Xbox_One_Kinect_Voice_Gesture.pdf?c_id=6458139&cs_id=6458139&expiration=1555411736&hwt=fe78eb09654ea677c9fbf836ad2ed82b >, 2013, 2 pages.
"Looking for a Launcher That Changes the Default Homescreen or Widgets Based on Wifi, Location, or Other Context", Online Available at: <https://www.reddit.com/r/androidapps/comments/35lu90/looking_for_a_launcher_that_changes_the_default/>, 2015, 2 pages.
"Microsoft Outlook 2010(TM) A Beginners Guide", Available online at:—http://www.reading.ac.uk/web/files/its/outlook2010.pdf, Apr. 1, 2012, 24 pages.
Minutes of the Oral Proceedings received for European Application No. 15711969.4, mailed on May 16, 2019, 7 pages.
"Mugs", Online Available at: https://web.archive.org/web/20151029034349/http://le-mugs.com/, Oct. 29, 2015, 14 pages.
Netsapiens, "Click to Call in MS Outlook", Available online at:—<https://netsapiens.com/click-to-call-in-ms-outlook-windows-apps/>, May 4, 2012, 8 pages.
"Night Display (Alarm Clock) App", Google Play Store Night Display (Alarm Clock) Description page, Online available at:—<https://web.archive.org/web/20141007124222/https://play.google.com/store/apps/details?id=com.srk.nighttimedisplay&hl=en>, Oct. 7, 2014, pp. 1-3.
Non-Final Office Action received for U.S. Appl. No. 15/421,865, dated Mar. 21, 2019, 18 pages.
Non-Final Office Action received for U.S. Appl. No. 14/805,403, dated Nov. 16, 2017, 21 pages.
Non-Final Office Action received for U.S. Appl. No. 14/752,776, dated Jan. 2, 2018, 30 pages.
Non-Final Office Action received for U.S. Appl. No. 14/752,776, dated Nov. 5, 2018, 48 Pages.
Non-Final Office Action received for U.S. Appl. No. 14/841,608, dated Apr. 12, 2017, 9 Pages.
Non-Final Office Action received for U.S. Appl. No. 14/841,614, dated Jul. 27, 2017, 13 pages.
Non-Final Office Action received for U.S. Appl. No. 14/841,623, dated Feb. 2, 2017, 17 pages.
Non-Final Office Action received for U.S. Appl. No. 14/846,511 dated Jan. 7, 2020, 25 pages.
Non-Final Office Action received for U.S. Appl. No. 14/846,511 dated Oct. 27, 2017, 15 pages.
Non-Final Office Action received for U.S. Appl. No. 15/128,952, dated Apr. 1, 2019, 20 pages.
Non-Final Office Action received for U.S. Appl. No. 15/128,952, dated Dec. 29, 2017, 13 pages.
Non-Final Office Action received for U.S. Appl. No. 15/798,235, dated Apr. 24, 2019, 25 pages.
Non-Final Office Action received for U.S. Appl. No. 15/798,235, dated Mar. 14, 2018, 58 pages.
Non-Final Office Action received for U.S. Appl. No. 16/147,523, dated Dec. 27, 2019, 11 pages.
Non-Final Office Action received for U.S. Appl. No. 16/259,954, dated Feb. 5, 2020, 10 pages.
Non-Final Office Action received for U.S. Appl. No. 16/265,938, dated Nov. 4, 2019, 28 pages.
Non-Final Office Action received for U.S. Appl. No. 16/377,892, dated May 21, 2020, 9 pages.
Non-Final Office Action received for U.S. Appl. No. 16/378,136, dated Jun. 2, 2020, 8 pages.
Non-Final Office Action received for U.S. Appl. No. 16/389,722, dated Apr. 3, 2020, 15 pages.
Non-Final Office Action received for U.S. Appl. No. 16/418,786, dated Apr. 24, 2020, 16 pages.
Non-Final Office Action received for U.S. Appl. No. 16/582,020, dated Jan. 13, 2020, 39 pages.
Non-Final Office Action received for U.S. Appl. No. 16/585,399, dated Jan. 23, 2020, 28 pages.
Non-Final Office Action received for U.S. Appl. No. 14/846,511, dated Nov. 30, 2018, 22 Pages.
Notice of Acceptance received for Australian Patent Application No. 2015267671, dated Apr. 4, 2018, 3 pages.
Notice of Acceptance received for Australian Patent Application No. 2015279544, dated Mar. 1, 2018, 3 pages.
Notice of Acceptance received for Australian Patent Application No. 2016231598, dated Mar. 1, 2018, 3 Pages.
Notice of Acceptance received for Australian Patent Application No. 2017277813, dated Jun. 16, 2020, 3 pages.
Notice of Acceptance received for Australian Patent Application No. 2018202751, dated Sep. 4, 2019, 3 pages.
Notice of Acceptance received for Australian Patent Application No. 2018204286, dated Feb. 27, 2020, 3 pages.
Notice of Acceptance received for Australian Patent Application No. 2015279545, dated Feb. 9, 2018, 3 Pages.
Notice of Allowance received for Chinese Patent Application No. 201580028505.1, dated Sep. 19, 2019, 2 pages (1 page of English Translation and 1 page of Official Copy).
Notice of Allowance received for Chinese Patent Application No. 201580029054.3, dated Jul. 19, 2019, 2 pages (1 page of English Translation and 1 page of Official Copy).
Notice of Allowance received for Chinese Patent Application No. 201810037665.8, dated Jul. 9, 2019, 4 pages (1 page of English Translation and 3 pages of Official Copy).
Notice of Allowance received for Japanese Patent Application No. 2016-569669, dated Mar. 19, 2018, 4 pages (1 page of English translation and 3 pages of Official Copy).
Notice of Allowance received for Japanese Patent Application No. 2018-537840, dated Mar. 19, 2020, 4 pages (1 page of English Translation and 3 pages of Official Copy).
Notice of Allowance received for Korean Patent Application No. 10-2016-7032902, dated Sep. 7, 2018, 3 pages (1 page of English Translation and 2 pages of Official Copy).
Notice of Allowance received for Korean Patent Application No. 10-2018-7022101, dated Oct. 14, 2019, 4 pages (1 page of English Translation and 3 pages of Official Copy).
Notice of Allowance received for Taiwanese Patent Application No. 104108223, dated Jan. 10, 2017, 3 pages (Official Copy Only). {See Communication under 37 CFR § 1.98(a) (3)}.
Notice of Allowance received for Taiwanese Patent Application No. 104123593, dated Oct. 1, 2018, 4 pages (1 pages of English Translation and 3 pages Official Copy).
Notice of Allowance received for Taiwanese Patent Application No. 104128519, dated Nov. 20, 2017, 5 pages (2 page of English Translation and 3 pages of Official Copy).
Notice of Allowance received for Taiwanese Patent Application No. 104134740, dated Dec. 8, 2016, 5 pages (1 page of English Translation of Search Report and 4 pages of Official Copy).
Notice of Allowance received for U.S. Appl. No. 14/841,608, dated Nov. 14, 2017, 5 pages.
Notice of Allowance received for U.S. Appl. No. 14/805,403, dated Jul. 11, 2018, 15 pages.
Notice of Allowance received for U.S. Appl. No. 14/841,614, dated Oct. 24, 2018, 10 pages.
Notice of Allowance received for U.S. Appl. No. 14/841,623, dated Feb. 23, 2018, 8 pages.
Notice of Allowance received for U.S. Appl. No. 15/554,204, dated Jul. 13, 2020, 10 pages.

(56) References Cited

OTHER PUBLICATIONS

Notice of Allowance received for U.S. Appl. No. 15/616,480, dated Jan. 3, 2019, 8 pages.
Notice of Allowance received for U.S. Appl. No. 15/798,235, dated Apr. 1, 2020, 8 pages.
Notice of Allowance received for U.S. Appl. No. 16/259,954, dated May 7, 2020, 9 pages.
Notice of Allowance received for U.S. Appl. No. 16/585,366, dated Jan. 2, 2020, 6 pages.
Notice of Allowance received for U.S. Appl. No. 16/585,399, dated Jul. 21, 2020, 9 pages.
"Nova Launcher—Lock Screen Edit 2", Online Available at: https://forums.androidcentral.com/ask-question/835057-nova-launcher-lock-screen-edit.html, Sep. 2017, pages.
Office Action received for European Patent Application No. 15711969.4, dated Nov. 17, 2017, 9 pages.
Office Action received for Australian Patent Application No. 2015267671, dated Apr. 5, 2017, 2 pages.
Office Action received for Australian Patent Application No. 2015279544, dated Apr. 18, 2017, 4 pages.
Office Action received for Australian Patent Application No. 2015279544, dated Feb. 13, 2018, 5 pages.
Office Action received for Australian Patent Application No. 2016231598, dated Apr. 7, 2017, 5 Pages.
Office Action received for Australian Patent Application No. 2017100667, dated Aug. 3, 2017, 9 pages.
Office Action received for Australian Patent Application No. 2017277813, dated Jun. 11, 2019, 3 pages.
Office Action received for Australian Patent Application No. 2017277813, dated Mar. 20, 2020, 4 pages.
Office Action received for Australian Patent Application No. 2017277971, dated Aug. 12, 2020, 3 pages.
Office Action received for Australian Patent Application No. 2017277971, dated Jun. 3, 2020, 3 pages.
Office Action received for Australian Patent Application No. 2018100158, dated Apr. 23, 2018, 5 pages.
Office Action received for Australian Patent Application No. 2018101855, dated Feb. 22, 2019, 4 pages.
Office Action received for Australian Patent Application No. 2018201089, dated Jul. 23, 2020, 4 pages.
Office Action received for Australian Patent Application No. 2018202751, dated Apr. 2, 2019, 4 pages.
Office Action received for Australian Patent Application No. 2018204286, dated Apr. 17, 2019, 5 pages.
Office Action received for Australian Patent Application No. 2018204286, dated Nov. 12, 2019, 5 pages.
Office Action received for Australian Patent Application No. 2018204286, dated Sep. 5, 2019, 5 pages.
Office Action received for Australian Patent Application No. 2018206770, dated Apr. 30, 2019, 4 pages.
Office Action received for Australian Patent Application No. 2018206770, dated Jul. 16, 2019, 5 pages.
Office Action received for Australian Patent Application No. 2018206770, dated Jul. 25, 2018, 5 pages.
Office Action received for Australian Patent Application No. 2018206770, dated Mar. 5, 2019, 3 pages.
Office Action received for Australian Patent Application No. 2019208225, dated Mar. 20, 2020, 3 pages.
Office Action received for Australian Patent Application No. 2015279545, dated Apr. 13, 2017, 3 pages.
Office Action received for Chinese Patent Application No. 201580028505.1, dated Jan. 16, 2019, 15 pages (5 pages of English Translation and 10 pages of Official Copy).
Office Action received for Chinese Patent Application No. 201580028505.1, dated Jun. 20, 2019, 7 pages (3 pages of English Translation and 4 pages of Official Copy).
Office Action received for Chinese Patent Application No. 201580029054.3, dated Dec. 5, 2018, 12 pages (6 pages of English Translation and 6 pages of Official Copy).
Office Action received for Chinese Patent Application No. 201580046788.2, dated Apr. 15, 2019, 13 pages (6 pages of English Translation and 7 pages of Official Copy).
Office Action received for Chinese Patent Application No. 201580046788.2, dated Feb. 25, 2020, 14 pages (7 pages of English Translation and 7 pages of Official Copy).
Office Action received for Chinese Patent Application No. 201680012936.3, dated Aug. 18, 2020, 15 pages (5 pages of English Translation and 10 pages of Official Copy).
Office Action received for Chinese Patent Application No. 201680047983.1, dated Jul. 1, 2020, 6 pages (3 pages of English Translation and 3 pages of Official Copy).
Office Action received for Chinese Patent Application No. 201710439448.7, dated Mar. 27, 2020, 13 pages (7 pages of English Translation and 6 pages of Official Copy).
Office Action received for Chinese Patent Application No. 201810037665.8, dated Dec. 7, 2018, 10 pages (5 pages of English Translation and 5 pages of Official Copy).
Office Action Received for Danish Patent Application No. PA201570768, dated Sep. 13, 2016, 8 pages.
Office Action received for Danish Patent Application No. PA201570770, dated Apr. 7, 2017, 7 pages.
Office Action received for Danish Patent Application No. PA201570770, dated Mar. 17, 2016, 9 pages.
Office Action received for Danish Patent Application No. PA201570770, dated Sep. 12, 2016, 6 pages.
Office Action received for Danish Patent Application No. PA201770423, dated Jun. 12, 2018, 7 pages.
Office Action received for Danish Patent Application No. PA201770423, dated Mar. 29, 2019, 6 pages.
Office Action received for Danish Patent Application No. PA201770791, dated Jan. 31, 2018, 8 pages.
Office Action received for Danish Patent Application No. PA201770791, dated Jul. 13, 2018, 2 pages.
Office Action received for Danish Patent Application No. PA201770791, dated Jun. 11, 2019, 3 pages.
Office Action Received for European Patent Application No. 15739109.5, dated Jan. 31, 2018, 7 pages.
Office Action Received for European Patent Application No. 15739110.3, dated Jan. 31, 2018, 8 pages.
Office Action received for European Patent Application No. 15753796.0, dated Aug. 4, 2020, 9 pages.
Office Action received for European Patent Application No. 15760008.1, dated Jul. 16, 2019, 9 pages.
Office Action received for European Patent Application No. 16190252.3, dated Feb. 19, 2018, 7 pages.
Office Action received for European Patent Application No. 17206177.2, dated May 15, 2018, 6 pages.
Office Action received for European Patent Application No. 17810749.6, dated Aug. 20, 2019, 9 pages.
Office Action received for European Patent Application No. 20172197.4, dated Aug. 5, 2020, 6 pages.
Office Action received for Japanese Patent Application No. 2018-080122, dated Aug. 9, 2019, 5 pages (2 pages of English Translation and 3 pages of Official Copy).
Office Action received for Japanese Patent Application No. 2018-080122, dated Jan. 28, 2019, 11 pages (6 pages of English Translation and 5 pages of Official Copy).
Office Action received for Japanese Patent Application No. 2018-537840, dated Jul. 8, 2019, 15 pages (8 pages of English Translation and 7 pages of Official copy).
Office Action received for Korean Patent Application No. 10-2018-7022101, dated Feb. 14, 2019, 15 pages (6 pages of English Translation and 9 pages of Official Copy).
Office Action received for Korean Patent Application No. 10-2018-7022101, dated Jul. 9, 2019, 10 pages (5 pages of English Translation and 5 pages of Official Copy).
Office Action received for Korean Patent Application No. 10-2018-7035747, dated Apr. 9, 2020, 11 pages (5 pages of English Translation and 6 pages of Official Copy).
Office Action received for Taiwanese Patent Application No. 104108223, dated Apr. 25, 2016, 10 pages (5 pages of English Translation and 5 pages of Official copy).

(56) References Cited

OTHER PUBLICATIONS

Office Action received for Taiwanese Patent Application No. 104123593, dated May 24, 2016, 57 pages (26 pages of English Translation and 31 pages of Official Copy).
Office Action received for Taiwanese Patent Application No. 104123593, dated Sep. 13, 2016, 8 pages (3 pages of English Translation and 5 pages of Official Copy).
Office Action received for Taiwanese Patent Application No. 104128519, dated Mar. 29, 2017, 16 pages (7 pages of English Translation and 9 pages of Official Copy).
Office Action received for Taiwanese Patent Application No. 104120843, dated Jan. 30, 2016, 5 pages (1 page of English Translation of Search Report and 4 pages of Official Copy).
"Online Alarm Clock", https://web.archive.org/web/20150505081746/http://www.online-stopwatch.com/online-alarm-clock, May 5, 2015, 2 pages.
Partial Supplementary European Search Report received for European Patent Application No. 17810749.6, dated Apr. 25, 2019, 8 pages.
Phandroid, "New Android Wear Wrist Gestures in Marshmallow", Available online at: ttps://www.youtube.com/watch?v=0WhKuklpQ9A, Feb. 11, 2016, 3 pages.
RazykdReviews, "In Depth Review of Apple Watch Activity and Workout App", Online available at <https://www.youtube.com/watch?v=GkKI3qlK0ow>, May 11, 2015, 1 page.
Rizknows, "Garmin Connect Mobile App—Review #2", Available online at: https://www.youtube.com/watch?v=7my3wMpeRbE, Oct. 22, 2015, 1 page.
"Remote Phone Call 22", Available online at <https://web.archive.org/web/20140625104844/https://www.justremotephone.com/>, Jun. 25, 2014, pages.
"Responding to a meeting invitation", Available online at:—https://web.archive.org/web/20121128174157/https://www.zimbra.com/desktop7/help/en_US/Calendar/Responding_to_an_invitation.htm, Nov. 28, 2012, 1 page.
Search Report and Opinion received for Danish Patent Application No. PA201770423, dated Oct. 4, 2017, 10 pages.
Search Report received for Danish Patent Application No. 201570768, dated Mar. 17, 2016, 11 pages.
Samsung, "SM-G900F User Manual", English (EU). Rev.1.0, Mar. 2014, 249 pages.
Shankland, Stephen, "Chrome OS Gets 'OK Google' Voice Search Control", Available online at:—<http://www.cnet.com/news/chrome-os-gets-ok-google-voice-search-control/>, May 21, 2014, 4 pages.
Studio 39, "Clock & Calendar for Smartwatch 2", Available online at:—<https://www.youtube.com/watch?v=Uj-K2vMnrj8>, Nov. 20, 2013, 2 pages.
Summons to Attend Oral Proceedings received for European Patent Application No. 15711969.4, mailed on Oct. 22, 2018, 12 pages.
Summons to Attend Oral Proceedings received for European Patent Application No. 15739109.5, mailed on Aug. 23, 2018, 9 pages.
Summons to Attend Oral Proceedings received for European Patent Application No. 15739109.5, mailed on Oct. 4, 2018, 3 Pages.
Summons to Attend Oral Proceedings received for European Patent Application No. 15739110.3, mailed on Aug. 23, 2018, 10 pages.
Summons to Attend Oral Proceedings received for European Patent Application No. 15739110.3, mailed on Oct. 2, 2018, 3 pages.
Summons to Attend Oral Proceedings received for European Patent Application No. 16190252.3, mailed on Jan. 8, 2019, 3 pages.
Summons to Attend Oral Proceedings received for European Patent Application No. 16190252.3, mailed on Oct. 30, 2018, 13 pages.
Summons to Attend Oral Proceedings received for European Patent Application No. 17206177.2, mailed on Jun. 3, 2019, 8 pages.
Summons to Attend Oral Proceedings received for European Patent Application No. 17810749.6, mailed on Aug. 12, 2020, 11 pages.
Supplemental Notice of Allowance received for U.S. Appl. No. 14/805,403, dated Oct. 4, 2018, 3 pages.
Supplemental Notice of Allowance received for U.S. Appl. No. 14/841,608, dated Jan. 25, 2018, 2 pages.
Supplemental Notice of Allowance received for U.S. Appl. No. 15/616,480, dated Mar. 28, 2019, 2 pages.
Supplemental Notice of Allowance received for U.S. Appl. No. 16/585,399, dated Aug. 26, 2020, 2 pages.
Supplementary European Search Report received for European Patent Application No. 17810749.6, dated Aug. 6, 2019, 6 pages.
"The Simply Alarm app for Pebble", available online at <https://web.archive.org/web/20150517070400/http://www.rebootsramblings.ca/n/sahhelp/https://www.youtube.com/watch?v=IVp1scQPw08>, May 17, 2015, 1 page.
Tablet Talk, "Tablet Talk App: Frequently Asked Questions—Tablet Talk", Online available at:—<https://web.archive.org/web/20140625102903/http:/1www.tablettalkapp.com/faq>, Jun. 25, 2014, pp. 1-6.
Vanhemert, Kyle, "Why Siri Could Be the Killer App for Smartwatches", Retrieved from the Internet: <https://www.wired.com/2013/12/what-can-a-smartwatch-really-do/>, Dec. 19, 2013, 14 pages.
Wade, Cliff, "Get the most out of Nova Launcher: Changing Icon Sizes", Online Available at: <https://www.androidguys.com/tips-tools/get-nova-launcher-changing-icon-sizes/>, Nov. 16, 2015, 3 pages.
Wade, Cliff, "Get the most out of Nova Launcher: Customizing the Dock (Contest Included)", Online Available at: <https://www.androidguys.com/tips-tools/get-nova-launcher-customizing-dockcontest-included/>, Dec. 1, 2015, 5 pages.
Zephyrnix, "Steam's In-Game Home menu", Online Available at: <https://www.youtube.com/watch?v=jLoRFiPkcUw>, see 0;00-1;06, Feb. 15, 2011, 3 pages.
Applicant-Initiated Interview Summary received for U.S. Appl. No. 16/377,892, dated Mar. 26, 2021, 2 pages.
Applicant-Initiated Interview Summary received for U.S. Appl. No. 16/378,136, dated Mar. 26, 2021, 2 pages.
Applicant-Initiated Interview Summary received for U.S. Appl. No. 16/418,786, dated Mar. 30, 2021, 4 pages.
Applicant-Initiated Interview Summary received for U.S. Appl. No. 16/861,651, dated Mar. 25, 2021, 6 pages.
Examiner Interview Summary received for U.S. Appl. No. 16/806,981, dated Mar. 26, 2021, 2 pages.
Final Office Action received for U.S. Appl. No. 15/421,865, dated Mar. 19, 2021, 20 pages.
Final Office Action received for U.S. Appl. No. 16/997,588, dated Mar. 30, 2021, 23 pages.
Non-Final Office Action received for U.S. Appl. No. 15/405,122, dated Apr. 2, 2021, 35 pages.
Non-Final Office Action received for U.S. Appl. No. 16/582,020, dated Apr. 5, 2021, 29 pages.
Office Action received for Chinese Patent Application No. 201680013193.1, dated Feb. 1, 2021, 8 pages (3 pages of English Translation and 5 pages of Official Copy).
Office Action received for Korean Patent Application No. 10-2020-7001340, dated Mar. 26, 2021, 13 pages (6 pages of English Translation and 7 pages of Official Copy).
Applicant-Initiated Interview Summary received for U.S. Appl. No. 15/405,122, dated Dec. 22, 2020, 5 pages.
Decision on Appeal received for U.S. Appl. No. 15/128,952, mailed on Dec. 28, 2020, 23 pages.
Notice of Allowance received for Korean Patent Application No. 10-2018-7035747, dated Dec. 9, 2020, 5 pages (2 pages of English Translation and 3 pages of Official Copy).
Office Action received for Chinese Patent Application No. 201680012936.3, dated Dec. 1, 2020, 21 pages (8 pages of English Translation and 13 pages of Official Copy).
Office Action received for Danish Patent Application No. PA202070609, dated Dec. 10, 2020, 8 pages.
Office Action received for Japanese Patent Application No. 2018-080122, dated Nov. 27, 2020, 16 pages (8 pages of English Translation and 8 pages of Official Copy).
Office Action received for Korean Patent Application No. 10-2020-7026036, dated Dec. 7, 2020, 8 pages (3 pages of English Translation and 5 pages of Official Copy).
Result of Consultation received for European Patent Application No. 17810749.6, dated Dec. 15, 2020, 3 pages.

(56) References Cited

OTHER PUBLICATIONS

Singh Lovepreet, "Samsung Galaxy Watch: How to Change Watch Face—Tips and Tricks", Online available at: <https://www.youtube.com/watch?pp=desktop&v=IN7gPxTZ1qU>, Retrieved on Dec. 10, 2020, Dec. 4, 2018, 1 page.
Vids Tube,"Bitmoji Clockface on Fitbit Versa Sense/Versa 3/Versa 2", Available online at:<https://www.youtube.com/watch?v=4V_xDnSLeHE>, Retrieved on Dec. 3, 2020, Jun. 30, 2019, 1 page.
Woolsey Amanda, "Howto Customize the Clock on the Apple Watch", Available online at:<https://www.youtube.com/watch?v=t-3Bckdd9B4>, Retrieved on Dec. 11, 2020, Apr. 25, 2015, 1 page.
Examiner-Initiated Interview Summary received for U.S. Appl. No. 16/806,981, dated on May 24, 2021, 4 pages.
Non-Final Office Action received for U.S. Appl. No. 16/389,722, dated Jun. 3, 2021, 17 pages.
Notice of Allowance received for Japanese Patent Application No. 2020-074878, dated May 28, 2021, 4 pages (1 page of English Translation and 3 pages of Official Copy).
Notice of Allowance received for U.S. Appl. No. 16/377,892, dated May 24, 2021, 9 pages.
Notice of Allowance received for U.S. Appl. No. 16/378,136, dated Jun. 3, 2021, 7 pages.
Office Action received for Australian Patent Application No. 2021202834, dated May 28, 2021, 2 pages.
Office Action received for Chinese Patent Application No. 201580046788.2, dated Mar. 25, 2021, 9 pages (4 pages of English Translation and 5 pages of Official Copy).
Search Report received for Netherlands Patent Application No. 2015236, dated Apr. 21, 2021, 19 pages (13 pages of English Translation and 6 pages of Official Copy).
International Search Report and Written Opinion received for PCT Patent Application No. PCT/US2020/030079, dated Sep. 4, 2020, 18 pages.
Non-Final Office Action received for U.S. Appl. No. 15/405,122, dated Sep. 24, 2020, 30 pages.
Notice of Allowance received for U.S. Appl. No. 15/798,235, dated Sep. 22, 2020, 8 pages.
Final Office Action received for U.S. Appl. No. 16/418,786, dated Jan. 13, 2021, 14 pages.
Notice of Allowance received for U.S. Appl. No. 16/585,714, dated Jan. 8, 2021, 8 pages.
Office Action received for Australian Patent Application No. 2020203919, dated Dec. 23, 2020, 5 pages.
Baar, Marius, "Fitbit Ace—Unboxing, Setup and 24 Hour Test", YouTube [online] [video], Retrieved from: <https://youtu.be/ekvkfqOyrls>, See especially 4:44, Oct. 24, 2018, 3 pages.
Intention to Grant received for Danish Patent Application No. PA202070609, dated Jan. 14, 2021, 2 pages.
International Search Report and Written Opinion received for PCT Patent Application No. PCT/US2020/045814, dated Jan. 20, 2021, 16 pages.
My Mate Vince, "Setting up the Fitbit Alta HR Activity Tracker on Apple iOS", Online available at: <https://youtu.be/FdwRF4lfvFc>, Jun. 18, 2017, 3 pages.
Notice of Allowance received for U.S. Appl. No. 16/585,714, dated Jan. 27, 2021, 2 pages.
Office Action received for Australian Patent Application No. 2019208225, dated Dec. 21, 2020, 3 pages.
Result of Consultation received for European Patent Application No. 17810749.6, dated Jan. 18, 2021, 3 pages.
Result of Consultation received for European Patent Application No. 17810749.6, dated Jan. 21, 2021, 18 pages.
Search Report and Opinion received for Danish Patent Application No. PA202070610, dated Jan. 8, 2021, 9 pages.
Wearablezone, "How to Set Up Your Fitbit Profile", Online available at: <https://youtu.be/jsWPtcDWiJM>, Jun. 6, 2016, 3 pages.
Xdream, "TickTalk Video User Manual", YouTube [online] [video], Online available at: <https://youtu.be/jYhq3DwmVzo>, Mar. 17, 2017, 3 pages.
Advisory Action received for U.S. Appl. No. 14/841,606, dated Feb. 28, 2019, 3 pages.
Advisory Action received for U.S. Appl. No. 14/815,898, dated Aug. 30, 2016, 3 pages.
Advisory Action received for U.S. Appl. No. 14/822,769, dated Apr. 30, 2018, 4 pages.
Advisory Action received for U.S. Appl. No. 14/833,014, dated Jan. 27, 2017, 3 pages.
Advisory Action received for U.S. Appl. No. 15/554,204, dated Mar. 12, 2020, 3 pages.
Airshow, "Airshow App for Mobile Devices", 2012, 4 pages.
Android Central,"BeWeather weather app for Android", Available online at: <https://www.youtube.com/watch?v=G2EY2K-XkSI>, Sep. 1, 2011, 1 page.
Android Central, "Changing the watchface on your Android Wear device", Retrieved from: <https://www.youtube.com/watch?v=YYwFe2Kqil>, Jul. 2, 2014, 4 pages.
APK Root, "Butterfly 3D Live Wallpaper 1.0 APK", Available at <http://net-suckga-ilauncher2.apk-dl.com/butterfly-3d-live-wallpaper>, Feb. 26, 2013, 7 pages.
Applicant-Initiated Interview Summary received for U.S. Appl. No. 15/405,122, dated May 21, 2020, 5 pages.
Applicant-Initiated Interview Summary received for U.S. Appl. No. 15/554,204, dated Jan. 31, 2020, 3 pages.
Applicant-Initiated Interview Summary received for U.S. Appl. No. 15/554,204, dated Oct. 11, 2019, 5 pages.
Avdonin Nikita, "Astroviewer 3D", Available at <https://www.youtube.comjwatch?v=zY0tslx3JHY/>, Nov. 5, 2013, 2 pages.
Bogdanov Alexei, "SKMEI 1016", Available online at <https://www.youtube.com/watch?v=E4q4Fug05Fw>, Jun. 21, 2014, 2 pages.
Brief Communication regarding Oral Proceedings received for European Patent Application No. 15730925.3, mailed on Feb. 18, 2020, 7 pages.
Castellini Rick, "Google Earth", Retrieved from <https://www.youtube.com/watch?v=bgjMSBXsFZQ>, How to Use Google Earth for Beginners, Feb. 12, 2013, 3 pages.
Clark Josh, "Designing Great iPhone Apps", O'Reilly Japan Co., O'Reilly Tim, vol. 1, May 24, 2012, 5 pages.
Corrected Notice of Allowance received for U.S. Appl. No. 14/815,879, dated Jul. 13, 2017, 3 pages.
Corrected Notice of Allowance received for U.S. Appl. No. 14/815,879, dated Jul. 28, 2017, 3 pages.
Corrected Notice of Allowance received for U.S. Appl. No. 14/815,879, dated Sep. 21, 2017, 2 pages.
Corrected Notice of Allowance received for U.S. Appl. No. 14/822,769, dated Jan. 17, 2019, 8 pages.
Corrected Notice of Allowance received for U.S. Appl. No. 14/841,402, dated May 4, 2018, 2 pages.
Corrected Notice of Allowance received for U.S. Appl. No. 15/183,663, dated Feb. 25, 2019, 3 pages.
Corrected Notice of Allowance received for U.S. Appl. No. 15/183,663, dated Mar. 27, 2019, 2 pages.
Corrected Notice of Allowance received for U.S. Appl. No. 15/355,956, dated Jan. 3, 2020, 2 pages.
Corrected Notice of Allowance received for U.S. Appl. No. 15/798,257, dated Aug. 26, 2019, 2 pages.
Corrected Notice of Allowance received for U.S. Appl. No. 15/798,257, dated Jul. 9, 2019, 2 pages.
Corrected Notice of Allowance received for U.S. Appl. No. 15/798,257, dated Jun. 12, 2019, 2 pages.
Corrected Notice of Allowance received for U.S. Appl. No. 16/103,699, dated May 29, 2019, 2 pages.
Cyr Jim, "Apple Watch—Customize Modular Watch Face", available online at: https://www.youtube.com/watch?v=02W93HbKIK8, May 13, 2015, 2 pages.
Decision on Acceptance received for Australian Patent Application No. 2015298710, dated Jul. 19, 2019, 18 pages.
Decision on Appeal received for U.S. Appl. No. 14/833,014, mailed on Oct. 30, 2019, 10 pages.
Decision on Opposition received for Australian Patent Application No. 2015298710, mailed on Aug. 9, 2019, 4 pages.
Decision on Opposition received for Australian Patent Application No. 2015298710, mailed on Aug. 20, 2018, 20 pages.

(56) References Cited

OTHER PUBLICATIONS

Decision to Grant received for Danish Patent Application No. PA201670320, dated Oct. 18, 2018, 2 pages.
Decision to Grant received for European Patent Application No. 15747595.5, dated Jul. 16, 2020, 2 pages.
Decision to Grant received for European Patent Application No. 15759998.6, dated Jun. 18, 2020, 2 pages.
Decision to Refuse received for European Patent Application No. 15730924.6, dated Mar. 15, 2019, 12 pages.
"Deluxe Moon—Guide", available online at:—https://web.archive.org/web/20130520161057/http://www.lifewaresolutions.com/deluxe_moon_guide_ip.html, May 20, 2013, 5 pages.
EBPMan Tech Reviews,"LG G3 Tips: How to customize the clock face", Available online at: https://www.youtube.com/watch?v=evraMWFb1fY, Jul. 25, 2014, 1 page.
Ergonomic requirements for office work with visual display terminals (VDTs), Part 13: User guidance, International Standard ISO, Zuerich, CH, vol. 9241-13, Jul. 15, 1998, 40 pages.
Evgenyevich Sergey, "Earth & Moon in HD Gyro 3D", Available at <https://www.youtube.com/watch?v=IRwNcaSYrls/>, Dec. 1, 2013, 2 pages.
Examiner's Answer to Appeal Brief received for U.S. Appl. No. 14/815,890, mailed on Mar. 20, 2020, 16 pages.
Examiner's Answer to Appeal Brief received for U.S. Appl. No. 14/833,014, mailed on Nov. 2, 2017, 48 pages.
Extended European Search Report received for European Patent Application No. 16762356.0, dated Nov. 9, 2018, 10 pages.
Extended European Search Report received for European Patent Application No. 16837432.0, dated Mar. 11, 2019, 10 pages.
Feldman Ari, "Excerpts from: Designing Arcade Computer Game Graphics", Available online at: http://www.phatcode.net/res/269/files/dacgg.pdf, Jan. 1, 2001, 35 pages.
Final Office Action received for U.S. Appl. No. 14/815,890, dated Feb. 26, 2018, 20 pages.
Final Office Action received for U.S. Appl. No. 14/815,890, dated May 14, 2019, 22 pages.
Final Office Action received for U.S. Appl. No. 14/815,890, dated Nov. 21, 2016, 18 pages.
Final Office Action received for U.S. Appl. No. 14/815,898, dated Jun. 9, 2016, 19 pages.
Final Office Action received for U.S. Appl. No. 14/821,667, dated Apr. 26, 2018, 13 pages.
Final Office Action received for U.S. Appl. No. 14/822,769, dated Jan. 4, 2018, 25 pages.
Final Office Action received for U.S. Appl. No. 14/833,014, dated Oct. 26, 2016, 32 pages.
Final Office Action received for U.S. Appl. No. 14/841,402, dated Aug. 25, 2017, 17 pages.
Final Office Action received for U.S. Appl. No. 14/841,606, dated Sep. 7, 2018, 34 pages.
Final Office Action received for U.S. Appl. No. 15/352,215, dated Mar. 7, 2019, 22 pages.
Final Office Action received for U.S. Appl. No. 15/405,122, dated Jan. 21, 2020, 36 pages.
Final Office Action received for U.S. Appl. No. 15/554,204, dated Oct. 31, 2019, 22 pages.
Final Office Action received for U.S. Appl. No. 15/881,544, dated Jan. 29, 2019, 14 pages.
Final Office Action received for U.S. Appl. No. 14/822,769, dated Nov. 9, 2016, 18 pages.
Final Office Action received for U.S. Appl. No. 14/815,879, dated Mar. 24, 2016, 46 pages.
First Action Interview received for U.S. Appl. No. 14/815,890, dated Aug. 12, 2016, 3 pages.
Fuchphone Extras, "LG G Watch—Designs | Watch Faces", Available online at: <https://www.youtube.com/watch?v=yqxzqdi_MSE>, Jul. 27, 2014, 1 page.
Fuchphone Extras, "Samsung Gear Live—Designs | Watch Faces", Available online at: <https://www.youtube.com/watch?v=fFjtVAxyimE>, Jul. 26, 2014, 1 page.
Fukuda Kazuhiro, "Xperia Z1 Perfect Manual", SotecCo., Ltd., No. 1, Nov. 15, 2013, pp. 217-218.
Gazer, "iPhone 4S Super Manual", Shuwa System Co., SAITO Kazukuni, vol. 1, Jun. 6, 2013, 7 pages.
Geary David, "Programming HTML5 Canvas", O'Reilly Japan, Inc., No. 1, Jul. 23, 2014, pp. 327-330.
Geek, "How to Put the Day ofthe Week into the Windows Taskbar Clock", available online at: <https://www.howtogeek.eom/194103/how-to-put-the-day-of-the-week-into-the-windows-taskbar-clock/>, 2014, 3 pages.
Google Earth 7.0.1.8244, retrieved from the Internet: <http://dl.google.com/dl/earth/client/ge7/release_7_0_1/googleearth-win-bundle-7.0.1.8244.exe>, Oct. 29, 2012, 1 page.
Google Earth on Android—AndroidCentral.com, Available online at:—<https://www.youtube.com/watch?v=1WxN1RunrE4>, Feb. 22, 2010, 1 page.
GottaBeMobile, "How to Change Watch Faces on Android Wear", available online at <https://www.youtube.com/watch?v=B8iRGkGq6a8>, Jul. 9, 2014, 4 pages.
Horowitz Paul, "Always Show Scroll Bars in Mac OS X", OS X Daily, available online at: <http://osxdaily.com/2011/08/03/show-scroll-bars-mac-os-x-lion/>. Aug. 3, 2011, 7 pages.
Intention to Grant received for Danish Patent Application No. PA201670320, dated May 17, 2018, 2 pages.
Intention to Grant received for European Patent Application No. 15730925.3, dated May 28, 2020, 10 pages.
Intention to Grant received for European Patent Application No. 15747595.5, dated Feb. 17, 2020, 8 pages.
Intention to Grant received for European Patent Application No. 15759998.6, dated Apr. 17, 2020, 10 pages.
Intention to Grant received for European Patent Application No. 15759998.6, dated Nov. 21, 2019, 12 pages.
Intention to Grant received for Danish Patent Application No. PA201570496, dated Feb. 17, 2016, 6 pages.
Intention to Grant received for Danish Patent Application No. PA201570563, dated Mar. 17, 2016, 7 pages.
Internet Blog Post, "[PC] Pre-Customization of Black Desert's Characters", Online Available at:—<https://blog.naver.com/hsh6051/220209813968>, Dec. 14, 2014, 41 pages.
International Preliminary Report on Patentability received for PCT Application No. PCT/US2016/037686, dated Mar. 1, 2018, 12 pages.
International Preliminary Report on Patentability received for PCT Patent Application No. PCT/US2015/034604, dated Feb. 16, 2017, 21 pages.
International Preliminary Report on Patentability received for PCT Patent Application No. PCT/US2015/034606, dated Feb. 16, 2017, 11 pages.
International Preliminary Report on Patentability received for PCT Patent Application No. PCT/US2015/034607, dated Feb. 16, 2017, 18 pages.
International Preliminary Report on Patentability received for PCT Patent Application No. PCT/US2015/044473, dated Mar. 2, 2017, 20 pages.
International Preliminary Report on Patentability received for PCT Patent Application No. PCT/US2015/044485, dated Mar. 2, 2017, 20 pages.
International Preliminary Report on Patentability received for PCT Patent Application No. PCT/US2015/044517, dated Mar. 16, 2017, 10 pages.
International Preliminary Report on Patentability received for PCT Patent Application No. PCT/US2015/046262, dated Mar. 16, 2017, 26 pages.
International Preliminary Report on Patentability received for PCT Patent Application No. PCT/US2015/053353, dated Sep. 21, 2017, 15 pages.
International Preliminary Report on Patentability received for PCT Patent Application No. PCT/US2016/017271, dated Sep. 21, 2017, 13 pages.
International Preliminary Report on Patentability received for PCT Patent Application No. PCT/US2016/021403, dated Sep. 21, 2017, 21 pages.

(56) References Cited

OTHER PUBLICATIONS

International Preliminary Report on Patentability received for PCT Patent Application No. PCT/US2016/035090, dated Dec. 14, 2017, 14 pages.
International Search Report and Written Opinion received for PCT Patent Application No. PCT/US2015/053353, dated May 9, 2016, 21 pages.
International Search Report and Written Opinion received for PCT Patent Application No. PCT/US2016/017271, dated Sep. 1, 2016, 18 pages.
International Search Report and Written Opinion received for PCT Patent Application No. PCT/US2016/021403, dated May 12, 2016, 23 pages.
International Search Report and Written Opinion received for PCT Patent Application No. PCT/US2016/035090, dated Oct. 4, 2016, 17 pages.
International Search Report and Written Opinion received for PCT Patent Application No. PCT/US2016/037686, dated Sep. 9, 2016, 19 pages.
International Search Report and Written Opinion received for PCT Patent Application No. PCT/US2015/034604, dated Nov. 9, 2015, 30 pages.
International Search Report and Written Opinion received for PCT Patent Application No. PCT/US2015/034607, dated Dec. 1, 2015, 23 pages.
International Search Report and Written Opinion received for PCT Patent Application No. PCT/US2015/034606, dated Dec. 2, 2015, 17 pages.
International Search Report and Written Opinion received for PCT Patent Application No. PCT/US2015/044473, dated Feb. 12, 2016, 24 pages.
International Search Report and Written Opinion received for PCT Patent Application No. PCT/US2015/044485, dated Feb. 9, 2016, 27 pages.
International Search Report and Written Opinion received for PCT Patent Application No. PCT/US2015/044517, dated Oct. 28, 2015, 13 pages.
International Search Report and Written Opinion received for PCT Patent Application No. PCT/US2015/046262, dated Mar. 15, 2016, 34 pages.
"Instruction Manual", Detailed version, KDDI Corporation, No. 1, vol. 1, Jun. 2014, 4 pages.
Invitation to Pay Additional Fee received for European Patent Application No. 15747595.5, dated Feb. 9, 2018, 6 pages.
Invitation to Pay Additional Fees received for PCT Patent Application No. PCT/US2015/044485, dated Nov. 3, 2015, 7 pages.
Invitation to Pay Additional fees received for PCT Patent Application No. PCT/US2015/053353, dated Jan. 21, 2016, 7 pages.
Invitation to Pay Additional Fees received for PCT Patent Application No. PCT/US2016/017271, dated May 25, 2016, 7 pages.
Invitation to Pay Additional Fees received for PCT Patent Application No. PCT/US2016/035090, dated Jul. 15, 2016, 2 pages.
Invitation to Additional Fees and Partial International Search Report received for PCT Patent Application No. PCT/US2015/034604 dated Sep. 4, 2015, 6 pages.
Invitation to Additional Fees and Partial International Search Report received for PCT Patent Application No. PCT/US2015/034606 dated Sep. 9, 2015, 6 pages.
Invitation to Pay Additional Fees received for PCT Patent Application No. PCT/US2015/034607, dated Sep. 30, 2015, 4 pages.
Invitation to Pay Additional Fees received for PCT Patent Application No. PCT/US2015/044473, dated Nov. 3, 2015, 5 pages.
Invitation to Pay Additional Fees received for PCT Patent Application No. PCT/US2015/046262, dated Nov. 23, 2015, 7 pages.
"Kidizoom Smartwatch", Available online at <https://www.vtechnl.com/media/downloads/Kidizoom-Smart-Watch.pdf>, Jun. 24, 2014, 23 pages.
Kenney Briley, "How to Customize a Smartwatch and other Personalization Questions", Available online at: <https://smartwatches.org/learn/customize-smartwatch/>, Jan. 23, 2014, 3 pages.
"Link to Wayback Machine with link to Google Play Showing Different Layouts of Complications Associated with a Clock Face", Available Online at <https://play.google.com/store/apps/details?id=com.levelup.beautifulwidgets.free&hl=da>, Sep. 9, 2013, 6 pages.
"Living Earth", available at: http;//www.livingcarthapp.com/, 2014, 6 pages.
Minutes of Oral Proceedings received for European Patent Application No. 15730924.6, mailed on Mar. 13, 2019, 4 pages.
Minutes of Oral Proceedings received for European Patent Application No. 15730925.3, mailed on May 26, 2020, 11 pages.
"MS Excel 2013", Jan. 29, 2013, 2 pages.
Nerdtalk, "The Best Android Clock Widgets", available at: <https://www.youtube.com/watch?v=E1bAprWByfU>, Apr. 25, 2011, 1 page.
"New, but unsigned—Easy Stopwatch for Symbian", Available online at <http://www.allaboutsymbian.com/flow/item/19490_New_but_unsigned-Easy_StopWatc.php>, Mar. 15, 2014, 15 pages.
Non-Final Office Action received for U.S. Appl. No. 14/815,890, dated Jun. 6, 2017, 19 pages.
Non-Final Office Action received for U.S. Appl. No. 15/881,544, dated Jun. 7, 2018, 15 pages.
Non-Final Office Action received for U.S. Appl. No. 15/554,204, dated Apr. 17, 2019, 19 pages.
Non-Final Office Action received for U.S. Appl. No. 14/815,879, dated Dec. 15, 2016, 33 pages.
Non-Final Office Action received for U.S. Appl. No. 14/815,890, dated Dec. 18, 2018, 21 pages.
Non-Final Office Action received for U.S. Appl. No. 14/821,667, dated Feb. 4, 2019, 13 pages.
Non-Final Office Action received for U.S. Appl. No. 14/821,667, dated Jul. 14, 2017, 12 pages.
Non-Final Office Action received for U.S. Appl. No. 14/822,769, dated Jun. 29, 2016, 14 pages.
Non-Final Office Action received for U.S. Appl. No. 14/822,769, dated May 4, 2017, 21 pages.
Non-Final Office Action received for U.S. Appl. No. 14/822,769, dated May 24, 2018, 30 pages.
Non-Final Office Action received for U.S. Appl. No. 14/839,889, dated Mar. 7, 2017, 26 pages.
Non-Final Office Action received for U.S. Appl. No. 14/841,402, dated Jan. 25, 2017, 18 pages.
Non-Final Office Action received for U.S. Appl. No. 14/841,606, dated Dec. 7, 2017, 30 pages.
Non-Final Office Action received for U.S. Appl. No. 14/841,606, dated May 8, 2019, 28 pages.
Non-Final Office Action received for U.S. Appl. No. 15/183,663, dated Jul. 9, 2018, 13 pages.
Non-Final Office Action received for U.S. Appl. No. 15/352,215, dated Sep. 20, 2018, 31 pages.
Non-Final Office Action received for U.S. Appl. No. 15/355,956, dated May 31, 2019, 32 pages.
Non-Final Office Action received for U.S. Appl. No. 15/405,122, dated May 31, 2019, 43 pages.
Non-Final Office Action received for U.S. Appl. No. 16/103,699, dated Nov. 30, 2018, 14 pages.
Non-Final Office Action received for U.S. Appl. No. 14/815,879, dated Nov. 6, 2015, 35 pages.
Non-Final Office Action received for U.S. Appl. No. 14/815,890, dated Oct. 19, 2015, 5 pages.
Non-Final Office Action received for U.S. Appl. No. 14/815,898, dated Dec. 1, 2015, 22 pages.
Non-Final Office Action received for U.S. Appl. No. 14/815,907, dated Jan. 12, 2016, 22 pages.
Non-Final Office Action received for U.S. Appl. No. 14/815,909, dated Nov. 27, 2015, 12 pages.
Non-Final Office Action received for U.S. Appl. No. 14/822,769, dated Feb. 5, 2016, 14 pages.
Non-Final Office Action received for U.S. Appl. No. 14/833,014, dated Mar. 21, 2016, 26 pages.
Notice of Acceptance received for Australian Patent Application No. 2015298710, dated Oct. 8, 2019, 3 pages.
Notice of Acceptance received for Australian Patent Application No. 2016229847, dated Sep. 12, 2018, 3 pages.

(56) References Cited

OTHER PUBLICATIONS

Notice of Acceptance received for Australian Patent Application No. 2018279037, dated May 13, 2020, 3 pages.
Notice of Allowance received for Chinese Patent Application No. 201510481525.6, dated May 27, 2019, 2 pages.
Notice of Allowance received for Chinese Patent Application No. 201510483268.X, dated Nov. 6, 2019, 2 pages.
Notice of Allowance received for Chinese Patent Application No. 201510483305.7, dated Jan. 8, 2019, 3 pages.
Notice of Allowance received for Chinese Patent Application No. 201510484514.3, dated Jun. 6, 2019, 2 pages.
Notice of Allowance received for Chinese Patent Application No. 201510557356.X, dated Mar. 5, 2020, 2 pages.
Notice of Allowance received for Chinese Patent Application No. 201520594249.X, dated Jul. 12, 2016, 4 pages.
Notice of Allowance received for Danish Patent Application No. PA201570495, dated Feb. 22, 2017, 1 page.
Notice of Allowance received for Danish Patent Application No. PA201570496, dated Apr. 18, 2016, 2 pages.
Notice of Allowance received for Danish Patent Application No. PA201570563, dated May 24, 2016, 2 pages.
Notice of Allowance received for Danish Patent Application No. PA201570667, dated Nov. 11, 2016, 2 pages.
Notice of Allowance received for Japanese Patent Application No. 2017-505450, dated Mar. 9, 2018, 10 pages.
Notice of Allowance received for Japanese Patent Application No. 2017-505842, dated Mar. 16, 2020, 4 pages.
Notice of Allowance received for Japanese Patent Application No. 2017-505847, dated May 20, 2019, 4 pages.
Notice of Allowance received for Japanese Patent Application No. 2017-545918, dated Jul. 22, 2019, 4 pages.
Notice of Allowance received for Japanese Patent Application No. 2018-074971, dated Apr. 23, 2019, 4 pages.
Notice of Allowance received for Japanese Patent Application No. 2018-107114, dated Mar. 22, 2019, 4 pages.
Notice of Allowance received for Japanese Patent Application No. 2019-096219, dated Jun. 26, 2020, 4 pages.
Notice of Allowance received for Korean Patent Application No. 10-2017-7005939, dated Mar. 30, 2018, 5 pages.
Notice of Allowance received for Korean Patent Application No. 10-2018-7018904, dated Jun. 26, 2020, 4 pages.
Notice of Allowance received for Netherland Patent Application No. 2019753, dated Jul. 6, 2018, 6 pages.
Notice of Allowance received for Taiwanese Patent Application No. 104124962, dated Jul. 27, 2017, 3 pages.
Notice of Allowance received for Taiwanese Patent Application No. 104124963, dated Sep. 28, 2017, 5 pages.
Notice of Allowance received for Taiwanese Patent Application No. 104124995, dated Jul. 27, 2017, 3 pages.
Notice of Allowance received for Taiwanese Patent Application No. 104124997, dated Jun. 16, 2017, 5 pages.
Notice of Allowance received for Taiwanese Patent Application No. 104124998, dated Mar. 31, 2017, 3 pages.
Notice of Allowance received for Taiwanese Patent Application No. 104128684, dated Feb. 23, 2017, 3 pages.
Notice of Allowance received for U.S. Appl. No. 14/815,879, dated Jun. 26, 2017, 8 pages.
Notice of Allowance received for U.S. Appl. No. 14/815,898, dated Dec. 5, 2016, 3 pages.
Notice of Allowance received for U.S. Appl. No. 14/815,898, dated Oct. 24, 2016, 14 pages.
Notice of Allowance received for U.S. Appl. No. 14/815,907, dated Jul. 28, 2016, 9 pages.
Notice of Allowance received for U.S. Appl. No. 14/815,907, dated Nov. 30, 2016, 2 pages.
Notice of Allowance received for U.S. Appl. No. 14/815,909, dated Jun. 9, 2016, 3 pages.
Notice of Allowance received for U.S. Appl. No. 14/815,909, dated May 3, 2016, 12 pages.
Notice of Allowance received for U.S. Appl. No. 14/815,909, dated May 20, 2016, 2 pages.
Notice of Allowance received for U.S. Appl. No. 14/815,909, dated Sep. 6, 2016, 2 pages.
Notice of Allowance received for U.S. Appl. No. 14/821,667, dated Jun. 12, 2019, 9 pages.
Notice of Allowance received for U.S. Appl. No. 14/822,769, dated Nov. 29, 2018, 12 pages.
Notice of Allowance received for U.S. Appl. No. 14/833,014, dated Nov. 20, 2019, 5 pages.
Notice of Allowance received for U.S. Appl. No. 14/839,889, dated Oct. 30, 2017, 16 pages.
Notice of Allowance received for U.S. Appl. No. 14/841,402, dated Apr. 26, 2018, 16 pages.
Notice of Allowance received for U.S. Appl. No. 15/183,663, dated Jan. 17, 2019, 6 pages.
Notice of Allowance received for U.S. Appl. No. 15/352,215, dated Nov. 27, 2019, 20 pages.
Notice of Allowance received for U.S. Appl. No. 15/355,956, dated Nov. 22, 2019, 29 pages.
Notice of Allowance received for U.S. Appl. No. 15/798,257, dated May 22, 2019, 14 pages.
Notice of Allowance received for U.S. Appl. No. 15/881,544, dated Jun. 26, 2019, 6 pages.
Notice of Allowance received for U.S. Appl. No. 15/881,544, dated Nov. 7, 2019, 5 pages.
Notice of Allowance received for U.S. Appl. No. 16/103,699, dated Apr. 11, 2019, 8 pages.
Nova, "Tour of the Solar System", Retrieved from <http://www.pbs.org/wgbh/nova/space/tour-solar-system.html>, May 24, 2013, 14 pages.
Obara Yuuta, "iPhone Application Selection for Univesity Students", Shuwa System Co., Saito Kazukuni, vol. 1, May 16, 2013, 4 pages.
Octoba, "Just Install It—Utilizing Method for Android Application Business", ASCII Media Works Co. Takano Kiyoshi, vol. 1, Apr. 25, 2013, 6 pages.
Omar Romero, "Sony Smartwatch 2 Custom Watchfaces Tutorial", Retrieved From: <https://www.youtube.com/watch?v=8odbxqwSQR8>, May 1, 2014, 2 pages.
Office Action received for Australian Patent Application No. 2015101021, dated Apr. 26, 2016, 4 pages.
Office Action received for Australian Patent Application No. 2015298710, dated Apr. 13, 2017, 3 pages.
Office Action received for Australian Patent Application No. 2015298710, dated Feb. 15, 2017, 2 pages.
Office Action received for Australian Patent Application No. 2015298710, dated Nov. 6, 2018, 4 pages.
Office Action received for Australian Patent Application No. 2015298710, dated Sep. 24, 2018, 4 pages.
Office Action received for Australian Patent Application No. 2016100411, dated Jun. 10, 2016, 3 pages.
Office Action received for Australian Patent Application No. 2016100476, dated Jun. 9, 2016, 4 pages.
Office Action received for Australian Patent Application No. 2016100765, dated Aug. 5, 2016, 2 pages.
Office Action received for Australian Patent Application No. 2016100765, dated Dec. 16, 2016, 3 pages.
Office Action received for Australian Patent Application No. 2016229847, dated Jul. 3, 2018, 4 pages.
Office Action received for Australian Patent Application No. 2018201089, dated Oct. 11, 2019, 4 pages.
Office Action received for Australian Patent Application No. 2018279037, dated Jan. 17, 2020, 4 pages.
Office Action received for Australian Patent Application No. 2018279037, dated Jun. 18, 2019, 5 pages.
Office Action received for Australian Patent Application No. 2015101019, dated Oct. 14, 2015, 3 pages.
Office Action received for Australian Patent Application No. 2015101019, dated Apr. 7, 2016, 4 pages.
Office Action received for Australian Patent Application No. 2015101019, dated Feb. 12, 2016, 4 pages.

(56) References Cited

OTHER PUBLICATIONS

Office Action received for Australian Patent Application No. 2015101020, dated Oct. 26, 2015, 8 pages.
Office Action received for Australian Patent Application No. 2015101021, dated Oct. 28, 2015, 10 pages.
Office Action received for Australian Patent Application No. 2015101183, dated Nov. 6, 2015, 4 pages.
Office Action received for Chinese Patent Application No. 201520595384.6, dated Mar. 25, 2016, 3 pages.
Office Action received for Chinese Patent Application No. 201510479088.4, dated Apr. 22, 2020, 7 pages.
Office Action received for Chinese Patent Application No. 201510479088.4, dated Mar. 12, 2018, 20 pages.
Office Action received for Chinese Patent Application No. 201510479088.4, dated May 7, 2019, 6 pages.
Office Action received for Chinese Patent Application No. 201510481525.6, dated Aug. 29, 2018, 10 pages.
Office Action received for Chinese Patent Application No. 201510481525.6, dated Nov. 29, 2017, 9 pages.
Office Action received for Chinese Patent Application No. 201510483268.X, dated Apr. 16, 2019, 6 pages.
Office Action received for Chinese Patent Application No. 201510483268.X, dated Dec. 1, 2017, 11 pages.
Office Action received for Chinese Patent Application No. 201510483268.X, dated Oct. 19, 2018, 10 pages.
Office action received for Chinese Patent Application No. 201510483305.7, dated Aug. 31, 2018, 10 pages.
Office action received for Chinese Patent Application No. 201510483305.7, dated Dec. 1, 2017, 13 pages.
Office Action received for Chinese Patent Application No. 201510484514.3, dated Apr. 4, 2018, 12 pages.
Office Action received for Chinese Patent Application No. 201510484514.3, dated Dec. 24, 2018, 13 pages.
Office Action received for Chinese Patent Application No. 201510557356.X, dated Aug. 15, 2019, 12 pages.
Office Action received for Chinese Patent Application No. 201510557356.X, dated Dec. 29, 2017, 11 pages.
Office Action received for Chinese Patent Application No. 201510557356.X, dated Nov. 23, 2018, 12 pages.
Office Action received for Chinese Patent Application No. 201520594249.X, dated Mar. 25, 2016, 3 pages.
Office Action received for Chinese Patent Application No. 201520595384.6, dated Dec. 30, 2016, 2 pages.
Office Action received for Chinese Patent Application No. 201520595384.6, dated Jul. 22, 2016, 3 pages.
Office Action received for Chinese Patent Application No. 201520595385.0, dated Dec. 30, 2016, 2 pages.
Office Action received for Chinese Patent Application No. 201520595385.0, dated Jul. 22, 2016, 3 pages.
Office Action received for Chinese Patent Application No. 201520595385.0, dated Mar. 25, 2016, 3 pages.
Office Action Received for Chinese Patent Application No. 201520595408.8, dated Dec. 30, 2016, 2 pages.
Office Action received for Chinese Patent Application No. 201520595408.8, dated Jul. 25, 2016, 3 pages.
Office Action received for Chinese Patent Application No. 201520595408.8, dated Mar. 25, 2016, 3 pages.
Office Action received for Chinese Patent Application No. 201520595538.1, dated Dec. 30, 2016, 2 pages.
Office Action received for Chinese Patent Application No. 201520595538.1, dated Jul. 22, 2016, 3 pages.
Office Action received for Chinese Patent Application No. 201520679198.0, dated Jun. 24, 2016, 5 pages.
Office Action received for Chinese Patent Application No. 201621208900.6, dated Apr. 26, 2017, 2 pages.
Office Action received for Chinese Patent Application No. 201680012936.3, dated Mar. 20, 2020, 23 pages.
Office Action received for Chinese Patent Application No. 201680013193.1, dated Mar. 25, 2020, 21 pages.
Office Action received for Chinese Patent Application No. 201680047983.1, dated Mar. 18, 2019, 18 pages.
Office Action received for Chinese Patent Application No. 201680047983.1, dated Nov. 28, 2019, 9 pages.
Office Action Received for Chinese Patent Application No. 201520594249.X, dated Dec. 9, 2015, 4 pages.
Office Action Received for Chinese Patent Application No. 201520595384.6, dated Dec. 9, 2015, 4 pages.
Office Action Received for Chinese Patent Application No. 201520595385.0, dated Dec. 9, 2015, 4 pages.
Office Action Received for Chinese Patent Application No. 201520595408.8, dated Dec. 9, 2015, 4 pages.
Office Action received for Chinese Patent Application No. 201520595538.1, dated Mar. 25, 2016, 3 pages.
Office Action Received for Chinese Patent Application No. 201520595538.1, dated Dec. 9, 2015, 4 pages.
Office Action received for Chinese Patent Application No. 2015206791980, dated Mar. 7, 2016, 6 pages.
Office Action Received for Chinese Patent Application No. 2015206791980, dated Nov. 18, 2015, 4 pages.
Office Action received for Danish Patent Application No. PA201570499, dated Nov. 1, 2017, 6 pages.
Office Action received for Danish Patent Application No. PA201570495, dated Oct. 29, 2015, 7 pages.
Office Action received for Danish Patent Application No. PA201570495, dated Dec. 9, 2016, 2 pages.
Office action received for Danish Patent Application No. PA201570495, dated May 4, 2016, 8 pages.
Office Action received for Danish Patent Application No. PA201570497, dated Feb. 21, 2017, 3 pages.
Office Action received for Danish Patent Application No. PA201570497, dated May 17, 2016, 6 pages.
Office Action received for Danish Patent Application No. PA201570497, dated Nov. 15, 2016, 2 pages.
Office Action received for Danish Patent Application No. PA201570497, dated Oct. 24, 2017, 2 pages.
Office Action received for Danish Patent Application No. PA201570498, dated Feb. 6, 2017, 2 pages.
Office Action received for Danish Patent Application No. PA201570498, dated Jun. 2, 2016, 8 pages.
Office Action received for Danish Patent Application No. PA201570498, dated Oct. 26, 2017, 5 pages.
Office Action received for Danish Patent Application No. PA201570499, dated Feb. 14, 2017, 2 pages.
Office Action received for Danish Patent Application No. PA201570499, dated Jun. 16, 2016., 8 pages.
Office Action received for Danish Patent Application No. PA201570499, dated Jun. 19, 2018, 4 pages.
Office Action received for Danish Patent Application No. PA201570667, dated Sep. 2, 2016, 2 pages.
Office Action received for Danish Patent Application No. PA201670319, dated Aug. 2, 2016, 6 pages.
Office Action received for Danish Patent Application No. PA201670319, dated Jun. 21, 2017, 6 pages.
Office Action received for Danish Patent Application No. PA201670319, dated Nov. 24, 2016, 7 pages.
Office Action received for Danish Patent Application No. PA201670320, dated Aug. 4, 2016, 9 pages.
Office Action received for Danish Patent Application No. PA201670320, dated Dec. 5, 2016, 4 pages.
Office Action received for Danish Patent Application No. PA201670320, dated Jan. 18, 2018, 2 pages.
Office Action received for Danish Patent Application No. PA201670320, dated Jul. 3, 2017, 4 pages.
Office Action received for Danish Patent Application No. PA201570496, dated Oct. 29, 2015, 6 pages.
Office Action received for Danish Patent Application No. PA201570497, dated Oct. 30, 2015, 6 pages.
Office Action received for Danish Patent Application No. PA201570498, dated Oct. 30, 2015, 7 pages.
Office Action received for Danish Patent Application No. PA201570499, dated Nov. 3, 2015, 7 pages.

(56) References Cited

OTHER PUBLICATIONS

Office Action received for Danish Patent Application No. PA201570667, dated Apr. 1, 2016, 7 pages.
Office Action received for European Patent Application No. 15730924.6, dated Dec. 12, 2017, 8 pages.
Office Action received for European Patent Application No. 15730925.3, dated Apr. 12, 2018, 8 pages.
Office Action received for European Patent Application No. 15747595.5, dated Apr. 15, 2019, 4 pages.
Office Action received for European Patent Application No. 15747595.5, dated Jun. 27, 2018, 8 pages.
Office Action received for European Patent Application No. 15759998.6, dated Dec. 19, 2018, 6 pages.
Office Action received for European Patent Application No. 15759998.6, dated Jul. 16, 2018, 6 pages.
Office Action received for European Patent Application No. 15759998.6, dated May 29, 2019, 6 pages.
Office Action received for European Patent Application No. 16708014.2, dated Apr. 3, 2019, 7 pages.
Office Action received for European Patent Application No. 16837432.0, dated Jan. 10, 2020, 7 pages.
Office Action received for European Patent Application No. 15730925.3, dated Feb. 27, 2019, 5 pages.
Office Action received for German Patent Application No. 112015003083.2, dated Mar. 9, 2018, 12 pages.
Office Action received for Japanese Patent Application No. 2017-505450, dated Jun. 20, 2017, 8 pages.
Office Action received for Japanese Patent Application No. 2017-505842, dated Feb. 22, 2019, 11 pages.
Office Action received for Japanese Patent Application No. 2017-505842, dated Sep. 9, 2019, 7 pages.
Office Action received for Japanese Patent Application No. 2017-505847, dated Feb. 12, 2019, 13 pages.
Office Action received for Japanese Patent Application No. 2017-510631, dated Mar. 2, 2018, 12 pages.
Office Action received for Japanese Patent Application No. 2017-545918, dated Sep. 14, 2018, 12 pages.
Office Action received for Japanese Patent Application No. 2018-074971, dated Jan. 28, 2019, 6 pages.
Office Action received for Japanese Patent Application No. 2018-107114, dated Oct. 9, 2018, 4 pages.
Office Action received for Korean Patent Application No. 10-2017-7005939, dated Jun. 30, 2017, 6 pages.
Office Action received for Korean Patent Application No. 10-2017-7024570, dated Jul. 10, 2019, 6 pages.
Office Action received for Korean Patent Application No. 10-2017-7024570, dated Sep. 28, 2018, 14 pages.
Office Action received for Korean Patent Application No. 10-2018-7018904, dated Aug. 20, 2019, 8 pages.
Office Action received for Korean Patent Application No. 10-2019-7029673, dated Nov. 5, 2019, 10 pages.
Office Action received for Netherland Patent Application No. 2015245, dated Jan. 24, 2017, 11 pages.
Office Action received for Netherland Patent Application No. 2019753, dated Apr. 12, 2018, 8 pages.
Office Action received for Netherland Patent Application No. 2015239, dated Oct. 28, 2016, 13 pages.
Office Action Received for Taiwanese Patent Application No. 104124962, dated Nov. 29, 2016, 6 pages.
Office Action received for Taiwanese Patent Application No. 104124998, dated Nov. 29, 2016, 6 pages.
Office Action received for Taiwanese Patent Application No. 104124963, dated Jan. 5, 2017, 11 pages.
Office Action received for Taiwanese Patent Application No. 104124995, dated Dec. 1, 2016, 6 pages.
Office Action received for Taiwanese Patent Application No. 104124997, dated Dec. 8, 2016, 12 pages.
Office Action received for Taiwanese Patent Application No. 104126627, dated Nov. 29, 2016, 9 pages.
Office Action received for Taiwanese Patent Application No. 104126627, dated Aug. 30, 2018, 22 pages.
Office Action received for Taiwanese Patent Application No. 104126627, dated Dec. 20, 2018, 4 pages.
Office Action received for Taiwanese Patent Application No. 104126627, dated Oct. 16, 2017, 7 pages.
Office Action received for Taiwanese Patent Application No. 104128684, dated Nov. 8, 2016, 24 pages.
Office Action received for Taiwanese Patent Application No. 104128705, dated Aug. 29, 2016, 18 pages.
Office Action received for Taiwanese Patent Application No. 104128705, dated Mar. 16, 2017, 3 pages.
Office Action received for Taiwanese Patent Application No. 104132636, dated Dec. 13, 2018, 26 pages.
Office Action received for Taiwanese Patent Application No. 104132636, dated Mar. 23, 2017, 25 pages.
Office Action received for Taiwanese Patent Application No. 104132636, dated Oct. 31, 2017, 10 pages.
"Pentax K20D Operating Manual", http://www.ricoh-imaging.eu/en/operating-manuals-download.html, Pentax Corporation, 2008, pp. 173-174.
Pre-Interview First Office Action received for U.S. Appl. No. 14/815,890, dated May 26, 2016, 4 pages.
Rehman A., "Install Android 4.2 Gesture-Based Keyboard & Clock App on Jelly Bean 4.1 or Higher", Excerpts From, Available online at <http://www.addictivetips.com/android/install-android-4-2-keyboard-clock-app-apk-on-jelly-bean-4-1-x/>, Nov. 3, 2012, 4 pages.
Restriction Requirement received for U.S. Appl. No. 14/815,890, dated Feb. 22, 2016, 5 pages.
"Reuse Animations—Synfig Animation Studio", Available online at: https://wiki.synfig.org/index.php?title=Doc:Reuse_Animations&oldid=18173, May 20, 2013, 5 pages.
Search Report and Opinion Received for Netherland Patent Application No. 2015232, dated Jan. 25, 2017, 9 pages.
Search Report and Opinion received for Netherland Patent Application No. 2015242, dated Jul. 4, 2017, 20 pages.
Search Report and Opinion received for Netherland Patent Application No. 2015364, dated Jul. 4, 2017, 12 pages.
Search Report and Opinion received for Netherland Patent Application No. 2018531, dated Jul. 27, 2017, 14 pages.
Shiota Shinji, "Windows 7 Dojo", Weekly ASCII, Ascii Mediaworks Inc., vol. 798, Aug. 31, 2010, 3 pages.
Smartwatch, "App Earth Space HD Live Wallpaper APK for Smart Watch", Version 1.7, Android version 2.2, Aug. 27, 2013, 1 page.
Sony, "Live View™ micro display", Extended User Guide, Aug. 2010, 27 pages.
Sony, "Sony Smartwatch", User Guide, Dec. 2011, 18 pages.
"Solar Walk Free", Vito Technology, Jun. 19, 2014, 9 pages.
StateOfTech, "Samsung Galaxy Gear Tips—Change the Clock Face", Retrieved from: https://www.youtube.com/watch?v=GOom7AZUAjY, Dec. 11, 2013, 2 pages.
Summons to Attend Oral Proceedings received for European Patent Application No. 15730924.6, mailed on Jun. 13, 2018, 10 pages.
Summons to Attend Oral Proceedings received for European Patent Application No. 15730925.3, mailed on Oct. 2, 2019, 8 pages.
Sun Set, "Sun Set Solar Image Clock", Online Available at: <https://web.archive.orgjweb/20140719005410/http://www.sunsetclock.com/>, 2013, 5 pages.
Supplemental Notice of Allowance received for U.S. Appl. No. 14/833,014, dated Mar. 12, 2020, 2 pages.
TalkAndroid, "Android Wear walkthrough", Available online at: <https://www.youtube.com/watch?v=4xntpZac4sw>, Jun. 30, 2014, 1 page.
"Tropical Fish 14", Available online at: <https://www.turbosquid.com/3d-models/tropical-fish-3d-model/388510>, Feb. 4, 2008, 2 pages.
Tweedie Steven, "Create and Customize Your Own Emojis with 'Makemoji' for iPhone", Available online at: http://www.businessinsider.com/create-custom-emojis-with-makemoji-app-2014-8, Aug. 19, 2014, 6 pages.
"UI Kit User Interface Catalog: Page Controls", Available online at <https://web.archive.org/web/20140703123442/https://developer.

(56) References Cited

OTHER PUBLICATIONS apple.com/library/ios/documentation/userexperience/conceptual/UIKitUICatalog/UIPageControl.html>, Dec. 16, 2013, 4 pages.
Viticci Frederico, "Checking Time Zones with Living Earth—MacStories", Online Available at: <https://www.macstories.net/reviews/checking-time-zones-with-living-earth/>, Dec. 11, 2013, pp. 1-5.
Watchophilia, "Mickey Mouse Watches", Online Available at: <https://web.archive.org/web/20130929065422/https://www.watchophilia.com/photogallery/mickey-mouse/>, Sep. 29, 2013, 16 pages.
Watchuseek, "The watch every father needs: M-I-C-K-E-Y, M-O-U-S-E. Mickey Mouse . . . ?", Online Available at: <https://forums.watchuseek.com/f2/watch-every-father-needs-m-i-c-k-e-y-m-o-u-s-e-mickey-mouse-855069.html>, 2013, 3 pages.
Whitwam Ryan, "Facer is Fast Becoming the De Facto Custom Watch Face Maker for Android Wear", Available online at: <http://www.androidpolice.com/2014/09/19/facer-is-fast-becoming-the-de-facto-custom-watch-face-maker-for-android-wear>, Sep. 19, 2014, 11 pages.
Wikipedia, "Emoji", Available online at: https://en.wikipedia.org/w/index.php?title=Emoji&oldid=648831795, Feb. 25, 2015, 12 pages.
Wikipedia, "Emoticon", Available online at: https://en.wikipedia.org/w/index.php?title=Emoticon&oldid=648776142, Feb. 25, 2015, 9 pages.
Zukerman Erez, "6 Beautiful, Interesting & Versatile Timer Apps [Android]", Online available at: <http://www.makeuseof.com/tag/beautiful-interesting-versatile-timer-apps-android/>, May 18, 2012, 5 pages.
Advisory Action received for U.S. Appl. No. 16/389,722, dated Mar. 9, 2021, 5 pages.
Applicant-Initiated interview Summary received for U.S. Appl. No. 16/401,934, dated Feb. 23, 2021, 8 pages.
Decision to Grant received for Danish Patent Application No. PA201970596, dated Feb. 26, 2021, 2 pages.
Notice of Acceptance received for Australian Patent Application No. 2017277971, dated Feb. 17, 2021, 3 pages.
Notice of Allowance received for U.S. Appl. No. 16/659,507, dated Feb. 24, 2021, 7 pages.
Office Action received for Australian Patent Application No. 2020239670, dated Mar. 3, 2021, 4 pages.
Office Action received for Chinese Patent Application No. 201680047983.1, dated on Feb. 1, 2021, 6 pages (3 pages of English Translation and 3 pages of Official Copy).
Office Action received for Danish Patent Application No. PA201970599, dated Mar. 1, 2021, 4 pages.
Office Action received for European Patent Application No. 16708014.2, dated Mar. 4, 2021, 7 pages.
Applicant-Initiated Interview Summary received for U.S. Appl. No. 16/997,588, dated May 12, 2021, 2 pages.
Decision to Grant received for Danish Patent Application No. PA202070609, dated May 3, 2021, 2 pages.
Notice of Allowance received for Chinese Patent Application No. 201680013193.1, dated May 7, 2021, 5 pages (1 page of English Translation and 4 pages of Official Copy).
Notice of Allowance received for Chinese Patent Application No. 201680047983.1, dated Apr. 28, 2021, 3 pages (1 page of English Translation and 2 pages of Official Copy).
Notice of Allowance received for Japanese Patent Application No. 2018-080122, dated May 7, 2021, 28 pages (1 page of English Translation and 27 pages of Official Copy).
Notice of Allowance received for Korean Patent Application No. 10-2020-7001340, dated May 10, 2021, 5 pages (2 pages of English Translation and 3 pages of Official Copy).
Office Action received for Australian Patent Application No. 2020102158, dated Apr. 27, 2021, 5 pages.
Summons to Attend Oral Proceedings received for European Patent Application No. 16762356.0, mailed on May 10, 2021, 10 pages.
Extended European Search Report received for European Patent Application No. 20185974.1, dated Oct. 28, 2020, 7 pages.
Notice of Allowance received for U.S. Appl. No. 16/585,721, dated Oct. 30, 2020, 9 pages.
Office Action received for Chinese Patent Application No. 201580046788.2, dated Sep. 22, 2020, 10 pages (5 pages of English Translation and 5 pages of Official Copy).
Office Action received for Danish Patent Application No. PA201970597, dated Oct. 29, 2020, 4 pages.
Office Action received for Japanese Patent Application No. 2019-151358, dated Oct. 2, 2020, 5 pages (2 pages of English Translation and 3 pages of Official Copy).
Applicant-Initiated Interview Summary received for U.S. Appl. No. 16/997,588, dated Jan. 29, 2021, 3 pages.
Decision to Refuse received for European Patent Application No. 17810749.6, dated Jan. 29, 2021, 24 pages.
Final Office Action received for U.S. Appl. No. 16/377,892, dated Jan. 28, 2021, 11 pages.
Final Office Action received for U.S. Appl. No. 16/378,136, dated Jan. 28, 2021, 9 pages.
Minutes of the Oral Proceedings received for European Patent Application No. 17810749.6, mailed on Jan. 26, 2021, 8 pages.
Notice of Acceptance received for Australian Patent Application No. 2019208225, dated Jan. 21, 2021, 3 pages.
Notice of Allowance received for Chinese Patent Application No. 201510479088.4, dated Jan. 21, 2021, 2 pages (1 page of English Translation and 1 page of Official Copy).
Notice of Allowance received for Chinese Patent Application No. 201710439448.7, dated Jan. 26, 2021, 2 pages (1 page of English Translation and 1 page of Official Copy).
Notice of Allowance received for Japanese Patent Application No. 2019-151358, dated Jan. 22, 2021, 4 pages (1 page of English Translation and 3 pages of Official Copy).
Office Action received for Australian Patent Application No. 2020309093, dated Jan. 21, 2021, 3 pages.
Office Action received for Chinese Patent Application No. 201780033973.7, dated Jan. 22, 2021, 27 pages (11 pages of English Translation and 16 pages of Official Copy).
Summons to Attend Oral Proceedings received for European Patent Application No. 15760008.1, mailed on Feb. 5, 2021, 11 pages.
Feist Jonathan, "Android customization—How to create a custom clock widget using zooper widget", Android Authority, Available Online at: https://www.androidauthority.com/zooper-widget-clock-366476/, May 15, 2014, pp. 1-13.
Applicant Initiated Interview Summary received for U.S. Appl. No. 16/389,722, dated Feb. 11, 2021, 4 pages.
Notice of Allowance received for U.S. Appl. No. 14/815,890, dated Feb. 12, 2021, 8 pages.
Office Action received for European Patent Application No. 16837432.0, dated Jan. 27, 2021, 7 pages.
Applicant Initiated Interview Summary received for U.S. Appl. No. 16/584,445, dated Mar. 17, 2020, 5 pages.
Applicant-Initiated Interview Summary received for U.S. Appl. No. 16/147,523, dated Oct. 26, 2020, 3 pages.
Applicant-Initiated Interview Summary received for U.S. Appl. No. 16/584,281, dated Mar. 9, 2020, 5 pages.
Applicant-Initiated Interview Summary received for U.S. Appl. No. 16/584,281, dated Sep. 14, 2020, 6 pages.
Applicant-Initiated Interview Summary received for U.S. Appl. No. 16/585,714, dated Jul. 20, 2020, 5 pages.
Applicant-Initiated Interview Summary received for U.S. Appl. No. 16/585,721, dated Aug. 31, 2020, 5 pages.
Applicant-Initiated Interview Summary received for U.S. Appl. No. 16/585,721, dated Mar. 13, 2020, 5 pages.
Final Office Action received for U.S. Appl. No. 16/584,281, dated Apr. 15, 2020, 26 pages.
Final Office Action received for U.S. Appl. No. 16/585,721, dated Apr. 1, 2020, 28 pages.
Non-Final Office Action received for U.S. Appl. No. 16/584,281, dated Dec. 10, 2019, 23 pages.
Non-Final Office Action received for U.S. Appl. No. 16/584,445, dated Dec. 26, 2019, 19 pages.
Non-Final Office Action received for U.S. Appl. No. 16/585,714, dated Apr. 16, 2020, 18 pages.

(56) References Cited

OTHER PUBLICATIONS

Non-Final Office Action received for U.S. Appl. No. 16/585,721, dated Dec. 27, 2019, 25 pages.
Notice of Allowance received for U.S. Appl. No. 16/265,938, dated Oct. 15, 2020, 8 pages.
Notice of Allowance received for U.S. Appl. No. 16/584,281, dated Sep. 29, 2020, 5 pages.
Notice of Allowance received for U.S. Appl. No. 16/584,445, dated Apr. 17, 2020, 9 pages.
Notice of Allowance received for U.S. Appl. No. 16/584,445, dated Jul. 23, 2020, 8 pages.
Notice of Allowance received for U.S. Appl. No. 16/584,445, dated Jun. 24, 2020, 5 pages.
Notice of Allowance received for U.S. Appl. No. 16/584,445, dated May 29, 2020, 5 pages.
Notice of Allowance received for U.S. Appl. No. 16/584,445, dated Oct. 21, 2020, 6 pages.
Notice of Allowance received for U.S. Appl. No. 16/585,714, dated Sep. 25, 2020, 15 pages.
Notice of Allowance received for U.S. Appl. No. 16/585,721, dated Sep. 30, 2020, 15 pages.
Office Action and Search Report received for Danish Patent Application No. PA201970598, dated Jan. 28, 2020, 6 pages.
Office Action received for Australian Patent Application No. 2020203919, dated Oct. 19, 2020, 5 pages.
Office Action received for Chinese Patent Application No. 201680013193.1, dated Sep. 7, 2020, 6 pages (3 pages of English Translation and 3 pages of Official Copy).
Office Action received for Chinese Patent Application No. 201910906898.1, dated Sep. 9, 2020, 8 pages (3 pages of English Translation and 5 pages of Official Copy).
Office Action received for Danish Patent Application No. PA201970596, dated May 6, 2020, 4 pages.
Office Action received for Danish Patent Application No. PA201970598, dated Oct. 9, 2020, 4 pages.
Office Action received for Danish Patent Application No. PA201970599, dated Jan. 23, 2020, 6 pages.
Office Action received for Danish Patent Application No. PA201970599, dated May 27, 2020, 4 pages.
Office Action received for Japanese Patent Application No. 2020-074878, dated Sep. 7, 2020, 13 pages (7 pages of English Translation and 6 pages of Official Copy).
Office Action received for Korean Patent Application No. 10-2018-7035747, dated Oct. 14, 2020, 6 pages (3 pages of English Translation and 3 pages of Official Copy).
Search Report and Opinion received for Danish Patent Application No. PA201970596, dated Dec. 4, 2019, 11 pages.
Search Report and Opinion received for Danish Patent Application No. PA201970597, dated Dec. 18, 2019, 10 pages.
Search Report and Opinion received for Danish Patent Application No. PA201970598, dated Oct. 31, 2019, 9 pages.
Search Report and Opinion received for Danish Patent Application No. PA201970599, dated Nov. 8, 2019, 12 pages.
Decision on Acceptance received for Australian Patent Application No. 2018201089, dated Apr. 20, 2021, 28 pages.
Intention to Grant received for Danish Patent Application No. PA201970597, dated Apr. 20, 2021, 2 pages.
Office Action received for Danish Patent Application No. PA201970598, dated Apr. 15, 2021, 6 pages.
Rowinski Dan, "Why The All-In-One Smartwatch Isn't Happening Any Time Soon", Online available at:—https://web.archive.org/web/20140123074218if_/https://readwrite.com/2014/01/20/smartwatch-wearable-fitness-remote-control/, Jan. 20, 2014, 6 pages.
Sony Smartwatch 2 update—new feartures and watchface creator!!! New!!!, Online available at:—https://www.youtube.com/watch?v=k3jjBv7QZSk, May 8, 2014, 3 pages.
StateOfTech, "Samsung Galaxy Gear Tips—Installing and Customizing Clock Faces", Online available at:—https://www.youtube.com/watch?v=p2GzpL3xlUo, Dec. 12, 2013, 3 pages.
TechCloud, "How to Create Custom Watch Face for Samsung Galaxy Gear Smartwatch just in Few Seconds", Online available at:—https://www.youtube.com/watch?v=6rO-_SREDjQ, Oct. 9, 2013, 3 pages.
TheUnlockr, "How to Change the Watch Face on the Galaxy Gear", Online available at:—https://www.youtube.com/watch?v=Z7EBG5aBiZg, Jan. 3, 2014, 3 pages.
Applicant-Initiated Interview Summary received for U.S. Appl. No. 15/405,122, dated Jul. 7, 2021, 4 pages.
Applicant-Initiated Interview Summary received for U.S. Appl. No. 15/421,865, dated Jun. 30, 2021, 6 pages.
Board Decision received for Chinese Patent Application No. 201680012936.3, dated Jun. 16, 2021, 2 pages (1 page of English Translation and 1 page of Official Copy).
European Search Report received for European Patent Application No. 21165295.3, dated Jun. 18, 2021, 4 pages.
Notice of Acceptance received for Australian Patent Application No. 2021202836, dated Jun. 25, 2021, 3 pages.
Notice of Allowance received for Japanese Patent Application No. 2020-551465, dated Jun. 28, 2021, 4 pages (1 page of English Translation and 3 pages of Official Copy).
Office Action received for Australian Patent Application No. 2019267413, dated Jun. 29, 2021, 3 pages.
Office Action received for Australian Patent Application No. 2020239774, dated Jun. 28, 2021, 8 pages.
Office Action received for Danish Patent Application No. PA202070610, dated Jun. 18, 2021, 8 pages.
Office Action received for European Patent Application No. 21165295.3, dated Jul. 1, 2021, 10 pages.
Rosa et al., "Stripe Generator—a Free Tool for the Web Design Community", Available online at: http://www.stripegenerator.com/, Mar. 28, 2019, 2 pages.
Wade Cliff, "Get the most out of Nova Launcher: Changing Icon Sizes", Online available at: https://www.androidguys.com/tips-tools/get-nova-launcher-changing-icon-sizes/, Nov. 16, 2015, 6 pages.
Advisory Action received for U.S. Appl. No. 16/806,981, dated Jun. 14, 2021, 6 pages.
Certificate of Examination received for Australian Patent Application No. 2020102158, dated Jun. 8, 2021, 2 pages.
Corrected Notice of Allowance received for U.S. Appl. No. 16/378,136, dated Jun. 11, 2021, 2 pages.
Examiner's Answer to Appeal Brief received for U.S. Appl. No. 14/846,511, mailed on Jun. 14, 2021, 15 pages.
Final Office Action received for U.S. Appl. No. 16/401,934, dated Jun. 14, 2021, 30 pages.
Jean, "Our Pact Parental Control Review", Available online at : https://www.bewebsmart.com/parental-controls/our-pact-parental-control-review/, Jun. 25, 2016, 25 pages.
Non-Final Office Action received for U.S. Appl. No. 16/943,737, dated Jun. 25, 2021, 18 pages.
Non-Final Office Action received for U.S. Appl. No. 17/041,350, dated Jun. 10, 2021, 24 pages.
Notice of Acceptance received for Australian Patent Application No. 2018201089, dated May 28, 2021, 3 pages.
Office Action received for European Patent Application No. 20176616.9, dated Jun. 10, 2021, 4 pages.
Office Action received for Korean Patent Application No. 10-2021-7013453, dated Jun. 5, 2021, 6 pages (2 pages of English Translation and 4 pages of Official Copy).
Office Action received for Korean Patent Application No. 10-2021-7013454, dated Jun. 5, 2021, 6 pages (2 pages of English Translation and 4 pages of Official Copy).
PhoneBuff, "Hybrid Stopwatch & Timer Android App Review", Available Online at: https://www.youtube.com/watch?v=B43oCFPiWvY, Apr. 4, 2012, 7 pages.
Applicant Initiated Interview Summary received for U.S. Appl. No. 17/031,671, dated Nov. 8, 2021, 5 pages.
Final Office Action received for U.S. Appl. No. 15/405,122, dated Nov. 5, 2021, 45 pages.
Final Office Action received for U.S. Appl. No. 17/031,765, dated Oct. 29, 2021, 34 pages.

(56) References Cited

OTHER PUBLICATIONS

International Search Report and Written Opinion received for PCT Patent Application No. PCT/US2021/031669, dated Oct. 13, 2021, 17 pages.
Invitation to Pay Additional Fees received for PCT Patent Application No. PCT/US2021/031669, dated Aug. 19, 2021, 9 pages.
Non-Final Office Action received for U.S. Appl. No. 17/068,386, dated Oct. 28, 2021, 20 pages.
Notice of Allowance received for Chinese Patent Application No. 201910906898.1, dated Oct. 28, 2021, 4 pages (1 page of English Translation and 3 pages of Official Copy).
Notice of Allowance received for Korean Patent Application No. 10-2020-7028759, dated Oct. 19, 2021, 4 pages (1 page of English Translation and 3 pages of Official Copy).
Notice of Allowance received for U.S. Appl. No. 16/401,934, dated Nov. 1, 2021, 11 pages.
Notice of Allowance received for U.S. Appl. No. 17/087,845, dated Oct. 28, 2021, 9 pages.
Office Action received for Chinese Patent Application No. 201780034203.4, dated Sep. 24, 2021, 7 pages (3 pages of English Translation and 4 pages of Official Copy).
Office Action received for European Patent Application No. 19203942.8, dated Oct. 29, 2021, 6 pages.
Extended European Search Report received for European Patent Application No. 21169911.1, dated Sep. 20, 2021, 9 pages.
Extended European Search Report received for European Patent Application No. 21177569.7, dated Sep. 20, 2021, 8 pages.
International Search Report and Written Opinion received for PCT Patent Application No. PCT/US2021/031212, dated Sep. 21, 2021, 21 pages.
Minutes of the Oral Proceedings received for European Patent Application No. 15760008.1, mailed on Sep. 21, 2021, 6 pages.
Non-Final Office Action received for U.S. Appl. No. 16/418,786, dated Oct. 4, 2021, 10 pages.
Non-Final Office Action received for U.S. Appl. No. 16/861,651, dated Sep. 30, 2021, 16 pages.
Notice of Allowance received for U.S. Appl. No. 16/997,588, dated Sep. 30, 2021, 12 pages.
Office Action received for Japanese Patent Application No. 2020-124605, dated Sep. 3, 2021, 5 pages (2 pages of English Translation and 3 pages of Official Copy).
Applicant Initiated Interview Summary received for U.S. Appl. No. 16/582,020, dated Jul. 9, 2021, 4 pages.
Applicant-Initiated Interview Summary received for U.S. Appl. No. 17/031,654, dated Feb. 1, 2021, 2 pages.
Non-Final Office Action received for U.S. Appl. No. 16/147,523, dated Jul. 21, 2021, 20 pages.
Non-Final Office Action received for U.S. Appl. No. 17/031,654, dated Nov. 19, 2020, 12 pages.
Non-Final Office Action received for U.S. Appl. No. 17/031,671, dated Apr. 30, 2021, 27 pages.
Non-Final Office Action received for U.S. Appl. No. 17/031,765, dated Jun. 28, 2021, 32 pages.
Non-Final Office Action received for U.S. Appl. No. 17/068,386, dated Jul. 15, 2021, 16 pages.
Notice of Acceptance received for Australian Patent Application No. 2020239670, dated Jul. 2, 2021, 3 pages.
Notice of Acceptance received for Australian Patent Application No. 2020309093, dated Jul. 8, 2021, 3 pages.
Notice of Allowance received for Chinese Patent Application No. 201780033973.7, dated Jul. 7, 2021, 5 pages (1 page of English Translation and 4 pages of Official Copy).
Notice of Allowance received for U.S. Appl. No. 17/031,654, dated Feb. 10, 2021, 9 pages.
Notice of Allowance received for U.S. Appl. No. 17/031,654, dated May 27, 2021, 8 pages.
Office Action received for Danish Patent Application No. PA202070624, dated Jun. 16, 2021, 5 pages.
Office Action received for Danish Patent Application No. PA202070625, dated Jun. 16, 2021, 3 pages.
Office Action received for European Patent Application No. 17810723.1, dated Jul. 9, 2021, 8 pages.
Office Action received for European Patent Application No. 20172197.4, dated Jul. 8, 2021, 5 pages.
Office Action received for Korean Patent Application No. 10-2020-7028759, dated Jun. 29, 2021, 12 pages (5 pages of English Translation and 7 pages of Official Copy).
Search Report and Opinion received for Danish Patent Application No. PA202070623, dated Dec. 21, 2020, 9 pages.
Search Report and Opinion received for Danish Patent Application No. PA202070624, dated Dec. 10, 2020, 10 pages.
Search Report and Opinion received for Danish Patent Application No. PA202070625, dated Dec. 17, 2020, 9 pages.
Applicant-Initiated Interview Summary received for U.S. Appl. No. 16/147,523, dated Dec. 10, 2021, 4 pages.
Applicant-Initiated Interview Summary received for U.S. Appl. No. 17/031,765, dated Dec. 15, 2021, 4 pages.
Decision to Grant received for European Patent Application No. 15730925.3, dated Dec. 9, 2021, 2 pages.
Final Office Action received for U.S. Appl. No. 16/389,722, dated Dec. 6, 2021, 19 pages.
Intention to Grant received for European Patent Application No. 19185318.3, dated Dec. 10, 2021, 12 pages.
Invitation to Pay Search Fees received for European Patent Application No. 20761084.1, dated Dec. 7, 2021, 3 pages.
Non-Final Office Action received for U.S. Appl. No. 17/013,778, dated Dec. 9, 2021, 11 pages.
Notice of Acceptance received for Australian Patent Application No. 2019267413, dated Nov. 23, 2021, 3 pages.
Notice of Allowance received for U.S. Appl. No. 16/418,786, dated Dec. 9, 2021, 9 pages.
Notice of Allowance received for U.S. Appl. No. 17/103,436, dated Dec. 8, 2021, 12 pages.
Office Action received for Chinese Patent Application No. 202110453180.9, dated Nov. 8, 2021, 21 pages (11 pages of English Translation and 10 pages of Official Copy).
Result of Consultation received for European Patent Application No. 16762356.0, dated Nov. 29, 2021, 3 pages.
Applicant-Initiated Interview Summary received for U.S. Appl. No. 16/147,523, dated Sep. 14, 2021, 3 pages.
Applicant-Initiated Interview Summary received for U.S. Appl. No. 17/031,765, dated Sep. 22, 2021, 5 pages.
Applicant-Initiated Interview Summary received for U.S. Appl. No. 17/068,386, dated Sep. 21, 2021, 2 pages.
Applicant-Initiated Interview Summary received for U.S. Appl. No. 17/103,436, dated Sep. 22, 2021, 2 pages.
Brief Communication Regarding Oral Proceedings received for European Patent Application No. 15760008.1, mailed on Sep. 13, 2021, 8 pages.
Final Office Action received for U.S. Appl. No. 17/041,350, dated Sep. 17, 2021, 25 pages.
Notice of Acceptance received for Australian Patent Application No. 2020203919, dated Sep. 3, 2021, 3 pages.
Notice of Allowance received for U.S. Appl. No. 16/377,892, dated Sep. 9, 2021, 9 pages.
Notice of Allowance received for U.S. Appl. No. 16/378,136, dated Sep. 22, 2021, 7 pages.
Result of Consultation received for European Patent Application No. 15760008.1, dated Sep. 9, 2021, 7 pages.
Supplemental Notice of Allowance received for U.S. Appl. No. 16/867,002, dated Sep. 9, 2021, 2 pages.
International Preliminary Report on Patentability received for PCT Patent Application No. PCT/US2020/030079, dated Nov. 18, 2021, 12 pages.
International Preliminary Report on Patentability received for PCT Patent Application No. PCT/US2020/031536, dated Nov. 18, 2021, 11 pages.
International Preliminary Report on Patentability received for PCT Patent Application No. PCT/US2020/031575, dated Nov. 18, 2021, 9 pages.
Non-Final Office Action received for U.S. Appl. No. 17/317,042, dated Nov. 10, 2021, 13 pages.

(56) References Cited

OTHER PUBLICATIONS

Office Action received for Korean Patent Application No. 10-2021-7036016, dated Nov. 10, 2021, 13 pages (6 pages of English Translation and 7 pages of Official Copy).
Applicant Initiated Interview Summary received for U.S. Appl. No. 17/031,671, dated Aug. 2, 2021, 5 pages.
Invitation to Pay Additional Fees received for PCT Patent Application No. PCT/US2021/031212, dated Jul. 28, 2021, 19 pages.
Lyons et al., "Facet: A Multi-Segment Wrist Worn System", Online available at: http://fetlab.io/publications/2012-Facet-a%20multi-segment%20wrist%20worn%20system.pdf, Oct. 7-10, 2012, pp. 123-129.
Notice of Acceptance received for Australian Patent Application No. 2021202834, dated Jul. 15, 2021, 3 pages.
Notice of Allowance received for Chinese Patent Application No. 201680012936.3, dated Jul. 13, 2021, 4 pages (1 page of English Translation and 3 pages of Official Copy).
Notice of Allowance received for Korean Patent Application No. 10-2020-7026036, dated Jul. 26, 2021, 4 pages (1 page of English Translation and 3 pages of Official Copy).
Notice of Allowance received for U.S. Appl. No. 16/582,020, dated Jul. 27, 2021, 29 pages.
Office Action received for Australian Patent Application No. 2020203919, dated Jul. 19, 2021, 7 pages.
Office Action received for Australian Patent Application No. 2020239749, dated Jul. 16, 2021, 5 pages.
Office Action received for Chinese Patent Application No. 201910906898.1, dated Jun. 23, 2021, 6 pages (3 pages of English Translation and 3 pages of Official Copy).
Applicant-Initiated Interview Summary received for U.S. Appl. No. 16/389,722, dated Sep. 7, 2021, 4 pages.
Applicant-Initiated Interview Summary received for U.S. Appl. No. 16/861,651, dated Sep. 3, 2021, 5 pages.
Applicant-Initiated Interview Summary received for U.S. Appl. No. 16/943,737, dated Sep. 7, 2021, 4 pages.
Decision to Grant received for Danish Patent Application No. PA201970597, dated Aug. 19, 2021, 2 pages.
Final Office Action received for U.S. Appl. No. 17/031,671, dated Sep. 7, 2021, 27 pages.
Non-Final Office Action received for U.S. Appl. No. 16/806,981, dated Sep. 1, 2021, 27 pages.
Office Action received for Danish Patent Application No. PA202070623, dated Aug. 24, 2021, 3 pages.
Final Office Action received for U.S. Appl. No. 16/147,523, dated Oct. 14, 2021, 22 pages.
Intention to Grant received for European Patent Application No. 15760008.1, dated Oct. 5, 2021, 11 pages.
Office Action received for Australian Patent Application No. 2020239774, dated Oct. 5, 2021, 3 pages.
Office Action received for Chinese Patent Application No. 202110194015.6, dated Sep. 28, 2021, 13 pages (6 pages of English Translation and 7 pages of Official Copy).
Office Action received for Korean Patent Application No. 10-2021-7025301, dated Oct. 15, 2021, 5 pages (2 pages of English Translation and 3 pages of Official Copy).
Supplemental Notice of Allowance received for U.S. Appl. No. 16/997,588, dated Oct. 22, 2021, 4 pages.
Applicant-Initiated Interview Summary received for U.S. Appl. No. 17/041,350, dated Aug. 18, 2021, 2 pages.
Corrected Notice of Allowance received for U.S. Appl. No. 16/377,892, dated Aug. 11, 2021, 3 pages.
Corrected Notice of Allowance received for U.S. Appl. No. 16/378,136, dated Aug. 11, 2021, 2 pages.
Corrected Notice of Allowance received for U.S. Appl. No. 16/582,020, dated Aug. 11, 2021, 2 pages.
Intention to Grant received for European Patent Application No. 15730925.3, dated Aug. 16, 2021, 10 pages.
Non-Final Office Action received for U. S. U.S. Appl. No. 17/013,778, dated Aug. 20, 2021, 9 pages.
Non-Final Office Action received for U.S. Appl. No. 17/103,436, dated Aug. 18, 2021, 16 pages.
Notice of Allowance received for Korean Patent Application No. 10-2019-7029673, dated Aug. 3, 2021, 3 pages (1 page of English Translation and 2 pages of Official Copy).
Notice of Allowance received for Korean Patent Application No. 10-2021-7013453, dated Aug. 11, 2021, 5 pages (2 pages of English Translation and 3 pages of Official Copy).
Notice of Allowance received for Korean Patent Application No. 10-2021-7013454, dated Aug. 12, 2021, 4 pages (1 page of English Translation and 3 pages of Official Copy).
Notice of Allowance received for U.S. Appl. No. 16/867,002, dated Aug. 20, 2021, 12 pages.
Office Action received for Chinese Patent Application No. 201780034203.4, dated Jul. 14, 2021, 12 pages (5 pages of English Translation and 7 pages of Official Copy).
Sony, "Sony Smartwatch 3 SWR50", User Guide, Jul. 2014, 31 pages.
Result of Consultation received for European Patent Application No. 20185974.1, dated Apr. 4, 2022, 4 pages.
Applicant-Initiated Interview Summary received for U.S. Appl. No. 16/861,651, dated Dec. 29, 2021, 5 pages.
Corrected Notice of Allowance received for U.S. Appl. No. 16/401,934, dated Dec. 23, 2021, 3 pages.
Corrected Notice of Allowance received for U.S. Appl. No. 17/103,436, dated Dec. 22, 2021, 2 pages.
Decision on Appeal received for U.S. Appl. No. 14/846,511, dated Dec. 29, 2021, 20 pages.
Intention to Grant received for European Patent Application No. 16762356.0, dated Dec. 23, 2021, 8 pages.
Minutes of Oral Proceedings received for European Patent Application No. 16762356.0, dated Dec. 17, 2021, 5 pages.
Non-Final Office Action received for U.S. Appl. No. 15/421,865, dated Dec. 29, 2021, 23 pages.
Non-Final received for U.S. Appl. No. 17/078,896, dated Dec. 24, 2021, 17 pages.
Notice of Acceptance received for Australian Patent Application No. 2020269232, dated Dec. 16, 2021, 3 pages.
Office Action received for Australian Patent Application No. 2020250323, dated Dec. 14, 2021, 2 pages.
Office Action received for Chinese Patent Application No. 201810411708.4, dated Nov. 12, 2021, 12 pages (6 pages of English Translation and 6 pages of Official Copy).
Office Action received for Chinese Patent Application No. 202110454541.1, dated Oct. 20, 2021, 19 pages (10 pages of English Translation and 9 pages of Official Copy).
Office Action received for Indian Patent Application No. 202017041557, dated Dec. 8, 2021, 8 pages.
Office Action received for Japanese Patent Application No. 2020-124605, dated Dec. 17, 2021, 2 pages (1 page of English Translation and 1 page of Official Copy).
Office Action received for Korean Patent Application No. 10-2021-7036246, dated Nov. 26, 2021, 5 pages (2 pages of English Translation and 3 pages of Official Copy).
Summons to Attend Oral Proceedings received for European Patent Application No. 20176616.9, mailed on Dec. 17, 2021, 7 pages.
Notice of Acceptance received for Australian Patent Application No. 2020250323, dated Feb. 28, 2022, 3 pages.
Notice of Allowance received for Korean Patent Application No. 10-2021-7034748, dated Jan. 27, 2022, 6 pages (2 pages of English Translation and 4 pages of Official Copy).
Office Action received for Japanese Patent Application No. 2020-124605, dated May 13, 2022, 6 pages (3 pages of English Translation and 3 pages of Official Copy).
Intention to Grant received for European Patent Application No. 20185974.1, dated Apr. 28, 2022, 8 pages.
Notice of Allowance received for Japanese Patent Application No. 2020-124605, dated Dec. 5, 2022, 4 pages (1 page of English Translation and 3 pages of Official Copy).
Notice of Allowance received for Korean Patent Application No. 10-2022-7014529, dated Dec. 13, 2022, 8 pages (2 pages of English Translation and 6 pages of Official Copy).

(56) References Cited

OTHER PUBLICATIONS

Extended European Search Report received for European Patent Application No. 22188724.3, dated Mar. 2, 2023, 14 pages.
Advisory Action received for U.S. Appl. No. 15/405,122, dated Apr. 18, 2022, 5 pages.
Advisory Action received for U.S. Appl. No. 16/861,651, dated Jul. 29, 2022, 4 pages.
Advisory Action received for U.S. Appl. No. 16/943,737, dated Jun. 1, 2022, 6 pages.
Advisory Action received for U.S. Appl. No. 17/031,765, dated Dec. 12, 2022, 7 pages.
Advisory Action received for U.S. Appl. No. 17/181,089, dated Dec. 20, 2022, 4 pages.
Applicant Initiated Interview Summary received for U.S. Appl. No. 16/806,981, dated Jan. 28, 2022, 4 pages.
Applicant Initiated Interview Summary received for U.S. Appl. No. 17/031,671, dated Jun. 13, 2022, 7 pages.
Applicant Initiated Interview Summary received for U.S. Appl. No. 17/681,584, dated Mar. 24, 2023, 2 pages.
Applicant Initiated Interview Summary received for U.S. Appl. No. 17/746,807, dated Mar. 31, 2023, 2 pages.
Applicant-Initiated Interview Summary received for U.S. Appl. No. 15/405,122, dated Mar. 1, 2022, 4 pages.
Applicant-Initiated Interview Summary received for U.S. Appl. No. 15/421,865, dated Feb. 28, 2022, 5 pages.
Applicant-Initiated Interview Summary received for U.S. Appl. No. 16/147,523, dated Jun. 13, 2022, 4 pages.
Applicant-Initiated Interview Summary received for U.S. Appl. No. 16/389,722, dated Feb. 18, 2022, 5 pages.
Applicant-Initiated Interview Summary received for U.S. Appl. No. 16/389,722, dated Nov. 4, 2022, 4 pages.
Applicant-Initiated Interview Summary received for U.S. Appl. No. 16/418,786, dated May 9, 2022, 2 pages.
Applicant-Initiated Interview Summary received for U.S. Appl. No. 16/418,786, dated Sep. 23, 2022, 2 pages.
Applicant-Initiated Interview Summary received for U.S. Appl. No. 16/943,737, dated Apr. 29, 2022, 6 pages.
Applicant-Initiated Interview Summary received for U.S. Appl. No. 17/013,778, dated Feb. 28, 2022, 2 pages.
Applicant-Initiated Interview Summary received for U.S. Appl. No. 17/031,671, dated Dec. 9, 2022, 5 pages.
Applicant-Initiated Interview Summary received for U.S. Appl. No. 17/031,765, dated Apr. 17, 2023, 4 pages.
Applicant-Initiated Interview Summary received for U.S. Appl. No. 17/031,765, dated May 23, 2022, 5 pages.
Applicant-Initiated Interview Summary received for U.S. Appl. No. 17/031,765, dated Nov. 16, 2022, 5 pages.
Applicant-Initiated Interview Summary received for U.S. Appl. No. 17/041,350, dated Feb. 2, 2022, 2 pages.
Applicant-Initiated Interview Summary received for U.S. Appl. No. 17/068,386, dated Apr. 24, 2023, 2 pages.
Applicant-Initiated Interview Summary received for U.S. Appl. No. 17/068,386, dated Jan. 13, 2022, 2 pages.
Applicant-Initiated Interview Summary received for U.S. Appl. No. 17/078,896, dated Apr. 25, 2022, 2 pages.
Applicant-Initiated Interview Summary received for U.S. Appl. No. 17/158,936, dated Dec. 28, 2022, 4 pages.
Applicant-Initiated Interview Summary received for U.S. Appl. No. 17/181,089, dated Apr. 7, 2023, 5 pages.
Applicant-Initiated Interview Summary received for U.S. Appl. No. 17/181,089, dated Nov. 22, 2022, 3 pages.
Applicant-Initiated Interview Summary received for U.S. Appl. No. 17/181,089, dated Oct. 7, 2022, 4 pages.
Applicant-Initiated Interview Summary received for U.S. Appl. No. 17/317,042, dated Apr. 29, 2022, 2 pages.
Applicant-Initiated Interview Summary received for U.S. Appl. No. 17/341,839, dated Apr. 29, 2022, 2 pages.
Applicant-Initiated Interview Summary received for U.S. Appl. No. 17/341,839, dated Sep. 16, 2022, 2 pages.
Applicant-Initiated Interview Summary received for U.S. Appl. No. 17/373,163, dated Apr. 11, 2022, 2 pages.
Applicant-Initiated Interview Summary received for U.S. Appl. No. 17/516,537, dated Jul. 5, 2022, 4 pages.
Applicant-Initiated Interview Summary received for U.S. Appl. No. 17/516,537, dated Nov. 22, 2022, 2 pages.
Applicant-Initiated Interview Summary received for U.S. Appl. No. 17/556,165, dated Oct. 28, 2022, 4 pages.
Applicant-Initiated Interview Summary received for U.S. Appl. No. 17/572,117, dated Feb. 1, 2023, 4 pages.
Applicant-Initiated Interview Summary received for U.S. Appl. No. 17/572,117, dated Nov. 17, 2022, 4 pages.
Applicant-Initiated Interview Summary received for U.S. Appl. No. 17/591,184, dated Feb. 27, 2023, 2 pages.
Applicant-Initiated Interview Summary received for U.S. Appl. No. 17/591,184, dated Sep. 23, 2022, 2 pages.
Applicant-Initiated Interview Summary received for U.S. Appl. No. 17/713,016, dated Feb. 14, 2023, 4 pages.
Applicant-Initiated Interview Summary received for U.S. Appl. No. 17/738,940, dated Mar. 7, 2023, 4 pages.
Applicant-Initiated Interview Summary received for U.S. Appl. No. 17/948,578, dated Apr. 11, 2023, 3 pages.
Applicant-Initiated Interview Summary received for U.S. Appl. No. 17/951,875, dated Feb. 28, 2023, 2 pages.
Board Decision received for Chinese Patent Application No. 201580046788.2, dated Jun. 6, 2022, 17 pages (1 page of English Translation and 16 pages of Official Copy).
Board Opinion received for Chinese Patent Application No. 201580046788.2, dated Dec. 29, 2021, 10 pages (4 pages of English Translation and 6 pages of Official Copy).
Brief Communication Regarding Oral Proceedings received for European Patent Application No. 17810723.1, dated Nov. 11, 2022, 11 pages.
Brief Communication Regarding Oral Proceedings received for European Patent Application No. 20176616.9, dated Jun. 9, 2022, 1 page.
Brief Communication Regarding Oral Proceedings received for European Patent Application No. 20176616.9, dated May 27, 2022, 1 page.
Corrected Notice of Allowance received for U.S. Appl. No. 16/401,934, dated Feb. 28, 2022, 3 pages.
Corrected Notice of Allowance received for U.S. Appl. No. 16/418,786, dated Jan. 5, 2022, 3 pages.
Corrected Notice of Allowance received for U.S. Appl. No. 16/418,786, dated Jun. 23, 2022, 2 pages.
Corrected Notice of Allowance received for U.S. Appl. No. 17/013,778, dated Mar. 7, 2023, 5 pages.
Corrected Notice of Allowance received for U.S. Appl. No. 17/041,350, dated Apr. 4, 2022, 3 pages.
Corrected Notice of Allowance received for U.S. Appl. No. 17/041,350, dated Mar. 15, 2022, 3 pages.
Corrected Notice of Allowance received for U.S. Appl. No. 17/341,839, dated Oct. 26, 2022, 2 pages.
Corrected Notice of Allowance received for U.S. Appl. No. 17/373,163, dated Jul. 15, 2022, 5 pages.
Corrected Notice of Allowance received for U.S. Appl. No. 17/373,163, dated Jun. 27, 2022, 5 pages.
Corrected Notice of Allowance received for U.S. Appl. No. 17/515,143, dated Mar. 29, 2023, 2 pages.
Corrected Notice of Allowance received for U.S. Appl. No. 17/941,962, dated Apr. 14, 2023, 6 pages.
Decision to Grant received for European Patent Application No. 15760008.1, dated Aug. 11, 2022, 2 pages.
Decision to Grant received for European Patent Application No. 16762356.0, dated Apr. 26, 2022, 2 pages.
Decision to Grant received for European Patent Application No. 19185318.3, dated Mar. 31, 2022, 3 pages.
Decision to Grant received for European Patent Application No. 20185974.1, dated Aug. 19, 2022, 3 pages.
Decision to Grant received for European Patent Application No. 21177569.7, dated Apr. 6, 2023, 3 pages.

(56) References Cited

OTHER PUBLICATIONS

Decision to Refuse received for Japanese Patent Application No. 2020-159824, dated Sep. 30, 2022, 6 pages (3 pages of English Translation and 3 pages of Official Copy).
Examiner-Initiated Interview Summary received for U.S. Appl. No. 16/806,981, dated Jan. 13, 2022, 4 pages.
Examiner's Answer to Appeal Brief received for U.S. Appl. No. 15/405,122, dated Jan. 11, 2023, 16 pages.
Examiner's Answer to Appeal Brief received for U.S. Appl. No. 16/861,651, dated Jan. 18, 2023, 16 pages.
Examiner's Answer to Appeal Brief received for U.S. Appl. No. 17/013,778, dated Dec. 20, 2022, 9 pages.
Extended European Search Report received for European Patent Application No. 22157106.0, dated Jun. 27, 2022, 8 pages.
Extended European Search Report received for European Patent Application No. 22169639.6, dated Jul. 19, 2022, 14 pages.
Extended European Search Report received for European Patent Application No. 22173249.8, dated Aug. 19, 2022, 15 pages.
Extended European Search Report received for European Patent Application No. 22179347.4, dated Oct. 13, 2022, 7 pages.
Extended European Search Report received for European Patent Application No. 22197186.4, dated Jan. 19, 2023, 9 pages.
Final Office Action received for U.S. Appl. No. 15/421,865, dated Jul. 12, 2022, 27 pages.
Final Office Action received for U.S. Appl. No. 16/389,722, dated Mar. 17, 2023, 14 pages.
Final Office Action received for U.S. Appl. No. 16/806,981, dated Mar. 1, 2022, 33 pages.
Final Office Action received for U.S. Appl. No. 16/861,651, dated Jan. 26, 2022, 16 pages.
Final Office Action received for U.S. Appl. No. 16/943,737, dated Feb. 4, 2022, 24 pages.
Final Office Action received for U.S. Appl. No. 17/013,778, dated Apr. 1, 2022, 11 pages.
Final Office Action received for U.S. Appl. No. 17/031,671, dated Nov. 15, 2022, 27 pages.
Final Office Action received for U.S. Appl. No. 17/031,765, dated Sep. 12, 2022, 37 pages.
Final Office Action received for U.S. Appl. No. 17/068,386, dated Mar. 3, 2022, 29 pages.
Final Office Action received for U.S. Appl. No. 17/158,936, dated Apr. 7, 2023, 18 pages.
Final Office Action received for U.S. Appl. No. 17/181,089, dated Apr. 19, 2023, 13 pages.
Final Office Action received for U.S. Appl. No. 17/181,089, dated Oct. 21, 2022, 15 pages.
Final Office Action received for U.S. Appl. No. 17/341,839, dated Jul. 18, 2022, 15 pages.
Final Office Action received for U.S. Appl. No. 17/516,537, dated Oct. 11, 2022, 9 pages.
Final Office Action received for U.S. Appl. No. 17/572,117, dated Dec. 22, 2022, 16 pages.
Final Office Action received for U.S. Appl. No. 17/591,184, dated Dec. 23, 2022, 10 pages.
Final Office Action received for U.S. Appl. No. 17/681,584, dated Apr. 20, 2023, 15 pages.
Final Office Action received for U.S. Appl. No. 17/713,016, dated Mar. 15, 2023, 6 pages.
Final Office Action received for U.S. Appl. No. 17/746,807, dated Apr. 26, 2023, 16 pages.
Intention to Grant received for Danish Patent Application No. PA202070623, dated Jul. 20, 2022, 2 pages.
Intention to Grant received for European Patent Application No. 15760008.1, dated Apr. 6, 2022, 11 pages.
Intention to Grant received for European Patent Application No. 16708014.2, dated May 10, 2022, 8 pages.
Intention to Grant received for European Patent Application No. 16837432.0, dated April 14,2023, 8 pages.
Intention to Grant received for European Patent Application No. 17810723.1, dated Dec. 16, 2022, 9 pages.
Intention to Grant received for European Patent Application No. 20761084.1, dated Mar. 27,2023, 10 pages.
Intention to Grant received for European Patent Application No. 21169911.1, dated Mar. 6, 2023, 9 pages.
Intention to Grant received for European Patent Application No. 21177569.7, dated Oct. 27, 2022, 8 pages.
International Preliminary Report on Patentability received for PCT Patent Application No. PCT/US2020/045814, dated Mar. 17, 2022, 12 pages.
International Preliminary Report on Patentability received for PCT Patent Application No. PCT/US2021/031212, dated Nov. 24, 2022, 16 pages.
International Preliminary Report on Patentability received for PCT Patent Application No. PCT/US2021/031669, dated Nov. 24, 2022, 12 pages.
International Search Report and Written Opinion received for PCT Patent Application No. PCT/US2022/026371, dated Oct. 12, 2022, 16 pages.
International Search Report and Written Opinion received for PCT Patent Application No. PCT/US2022/029279, dated Nov. 9, 2022, 16 pages.
Invitation to Pay Additional Fees and Partial International Search Report received for PCT Patent Application No. PCT/US2022/029279, dated Sep. 15, 2022, 9 pages.
Invitation to Pay Additional Fees received for PCT Patent Application No. PCT/US2022/026371, dated Aug. 18, 2022, 9 pages.
Invitation to Pay Search Fees received for European Patent Application No. 20730136.7, dated Jul. 1, 2022, 4 pages.
Minutes of the Oral Proceedings received for European Patent Application No. 17810723.1, dated Dec. 9, 2022, 7 pages.
Non-Final Office Action received for U.S. Appl. No. 16/147,523, dated Apr. 26, 2022, 22 pages.
Non-Final Office Action received for U.S. Appl. No. 16/389,722, dated Jul. 7, 2022, 16 pages.
Non-Final Office Action received for U.S. Appl. No. 16/418,786, dated Aug. 1, 2022, 18 pages.
Non-Final Office Action received for U.S. Appl. No. 16/418,786, dated Mar. 28, 2022, 14 pages.
Non-Final Office Action received for U.S. Appl. No. 16/943,737, dated Mar. 28, 2023, 28 pages.
Non-Final Office Action received for U.S. Appl. No. 17/031,671, dated Apr. 1, 2022, 32 pages.
Non-Final Office Action received for U.S. Appl. No. 17/031,671, dated Mar. 17, 2023, 34 pages.
Non-Final Office Action received for U.S. Appl. No. 17/031,765, dated Mar. 28, 2023, 31 pages.
Non-Final Office Action received for U.S. Appl. No. 17/031,765, dated Mar. 29, 2022, 33 pages.
Non-Final Office Action received for U.S. Appl. No. 17/068,386, dated Jan. 30, 2023, 20 pages.
Non-Final Office Action received for U.S. Appl. No. 17/158,936, dated Nov. 30, 2022, 17 pages.
Non-Final Office Action received for U.S. Appl. No. 17/181,089, dated Feb. 17, 2023, 14 pages.
Non-Final Office Action received for U.S. Appl. No. 17/181,089, dated May 13, 2022, 12 pages.
Non-Final Office Action received for U.S. Appl. No. 17/341,839, dated Mar. 17, 2022, 14 pages.
Non-Final Office Action received for U.S. Appl. No. 17/373,163, dated Jan. 27, 2022, 14 pages.
Non-Final Office Action received for U.S. Appl. No. 17/516,537, dated May 5, 2022, 8 pages.
Non-Final Office Action received for U.S. Appl. No. 17/546,630, dated Mar. 30, 2023, 41 pages.
Non-Final Office Action received for U.S. Appl. No. 17/556,165, dated Sep. 7, 2022, 15 pages.
Non-Final Office Action received for U.S. Appl. No. 17/572,117, dated Oct. 6, 2022, 15 pages.
Non-Final Office Action received for U.S. Appl. No. 17/591, 184, dated Apr. 21, 2023, 15 pages.
Non-Final Office Action received for U.S. Appl. No. 17/591,184, dated Aug. 4, 2022, 18 pages.

(56) References Cited

OTHER PUBLICATIONS

Non-Final Office Action received for U.S. Appl. No. 17/681,584, dated Jan. 18, 2023, 12 pages.
Non-Final Office Action received for U.S. Appl. No. 17/713,016, dated Oct. 27, 2022, 25 pages.
Non-Final Office Action received for U.S. Appl. No. 17/738,940, dated Dec. 22, 2022, 31 pages.
Non-Final Office Action received for U.S. Appl. No. 17/746,807, dated Feb. 2, 2023, 14 pages.
Non-Final Office Action received for U.S. Appl. No. 17/827,004, dated Nov. 9, 2022, 27 pages.
Non-Final Office Action received for U.S. Appl. No. 17/948,578, dated Feb. 2, 2023, 13 pages.
Non-Final Office Action received for U.S. Appl. No. 17/951,875, dated Jan. 23, 2023, 12 pages.
Notice of Acceptance received for Australian Patent Application No. 2020239749, dated May 27, 2022, 3 pages.
Notice of Acceptance received for Australian Patent Application No. 2020239774, dated Jan. 5, 2022, 3 pages.
Notice of Acceptance received for Australian Patent Application No. 2021202797, dated May 9, 2022, 3 pages.
Notice of Acceptance received for Australian Patent Application No. 2021203216, dated Jul. 26, 2022, 3 pages.
Notice of Acceptance received for Australian Patent Application No. 2021203636, dated Apr. 14, 2022, 3 pages.
Notice of Acceptance received for Australian Patent Application No. 2021245228, dated Oct. 4, 2022, 3 pages.
Notice of Acceptance received for Australian Patent Application No. 2021250863, dated Jan. 13, 2023, 3 pages.
Notice of Acceptance received for Australian Patent Application No. 2021277718, dated Mar. 3, 2023, 3 pages.
Notice of Acceptance received for Australian Patent Application No. 2022202292, dated Jul. 6, 2022, 3 pages.
Notice of Acceptance received for Australian Patent Application No. 2022220279, dated Sep. 27, 2022, 3 pages.
Notice of Allowance received for Chinese Patent Application No. 201780034203.4, dated Jan. 17, 2022, 2 pages (1 page of English Translation and 1 page of Official Copy).
Notice of Allowance received for Chinese Patent Application No. 201910924197.0, dated Apr. 5, 2023, 3 pages (2 pages of English Translation and 1 page of Official Copy).
Notice of Allowance received for Chinese Patent Application No. 202110194015.6, dated Mar. 9, 2022, 6 pages (3 pages of English Translation and 3 pages of Official Copy).
Notice of Allowance received for Chinese Patent Application No. 202110454541.1, dated May 31, 2022, 6 pages (3 pages of English Translation and 3 pages of Official Copy).
Notice of Allowance received for Chinese Patent Application No. 202111457936.3, dated Nov. 7, 2022, 4 pages (1 page of English Translation and 3 pages of Official Copy).
Notice of Allowance received for Danish Patent Application No. PA202070623, dated Sep. 20, 2022, 2 pages.
Notice of Allowance received for Japanese Patent Application No. 2020-159825, dated Mar. 25, 2022, 5 pages (1 page of English Translation and 4 pages of Official Copy).
Notice of Allowance received for Japanese Patent Application No. 2020-562622, dated Aug. 26, 2022, 4 pages (1 page of English Translation and 3 pages of Official Copy).
Notice of Allowance received for Japanese Patent Application No. 2021-023661, dated Apr. 10, 2023, 4 pages (1 page of English Translation and 3 pages of Official Copy).
Notice of Allowance received for Japanese Patent Application No. 2021-105941, dated Jul. 4, 2022, 4 pages (1 page of English Translation and 3 pages of Official Copy).
Notice of Allowance received for Japanese Patent Application No. 2021-122610, dated Aug. 5, 2022, 4 pages (1 page of English Translation and 3 pages of Official Copy).
Notice of Allowance received for Japanese Patent Application No. 2021-565837, dated May 16, 2022, 4 pages (1 page of English Translation and 3 pages of Official Copy).
Notice of Allowance received for Japanese Patent Application No. 2022-139320, dated Jan. 6, 2023, 4 pages (1 page of English Translation and 3 pages of Official Copy).
Notice of Allowance received for Japanese Patent Application No. 2022-512865, dated Oct. 3, 2022, 4 pages (1 page of English Translation and 3 pages of Official Copy).
Notice of Allowance received for Korean Patent Application No. 10-2020-0123852, dated Mar. 9, 2023, 7 pages (2 pages of English Translation and 5 pages of Official Copy).
Notice of Allowance received for Korean Patent Application No. 10-2020-0123852, dated Nov. 28, 2022, 7 pages (2 pages of English Translation and 5 pages of Official Copy).
Notice of Allowance received for Korean Patent Application No. 10-2020-0123857, dated Feb. 21, 2023, 6 pages (1 page of English Translation and 5 pages of Official Copy).
Notice of Allowance received for Korean Patent Application No. 10-2020-0123887, dated Nov. 28, 2022, 7 pages (2 pages of English Translation and 5 pages of Official Copy).
Notice of Allowance received for Korean Patent Application No. 10-2021-7025301, dated Mar. 16, 2022, 4 pages (1 page of English Translation and 3 pages of Official Copy).
Notice of Allowance received for Korean Patent Application No. 10-2021-7036016, dated Sep. 28, 2022, 7 pages (2 pages of English Translation and 5 pages of Official Copy).
Notice of Allowance received for Korean Patent Application No. 10-2021-7036246, dated Mar. 2, 2022, 5 pages (1 page of English Translation and 4 pages of Official Copy).
Notice of Allowance received for Korean Patent Application No. 10-2021-7036678, dated Mar. 7, 2022, 5 pages (1 page of English Translation and 4 pages of Official Copy).
Notice of Allowance received for Korean Patent Application No. 10-2022-7001721, dated Feb. 28, 2022, 5 pages (1 page of English Translation and 4 pages of Official Copy).
Notice of Allowance received for Korean Patent Application No. 10-2022-7019205, dated Jan. 5, 2023, 8 pages (2 pages of English Translation and 6 pages of Official Copy).
Notice of Allowance received for U.S. Appl. No. 16/147,523, dated Aug. 4, 2022, 9 pages.
Notice of Allowance received for U.S. Appl. No. 16/147,523, dated Nov. 28, 2022, 8 pages.
Notice of Allowance received for U.S. Appl. No. 16/147,523, dated Oct. 4, 2022, 8 pages.
Notice of Allowance received for U.S. Appl. No. 16/401,934, dated Feb. 2, 2022, 8 pages.
Notice of Allowance received for U.S. Appl. No. 16/418,786, dated Jun. 14, 2022, 9 pages.
Notice of Allowance received for U.S. Appl. No. 16/418,786, dated Nov. 22, 2022, 6 pages.
Notice of Allowance received for U.S. Appl. No. 16/867,002, dated Mar. 1, 2022, 7 pages.
Notice of Allowance received for U.S. Appl. No. 16/997,588, dated Mar. 18, 2022, 9 pages.
Notice of Allowance received for U.S. Appl. No. 17/013,778, dated Feb. 23, 2023, 8 pages.
Notice of Allowance received for U.S. Appl. No. 17/041,350, dated Feb. 24, 2022, 6 pages.
Notice of Allowance received for U.S. Appl. No. 17/078,896, dated May 13, 2022, 8 pages.
Notice of Allowance received for U.S. Appl. No. 17/087,845, dated Mar. 3, 2022, 9 pages.
Notice of Allowance received for U.S. Appl. No. 17/317,042, dated Jul. 26, 2022, 12 pages.
Notice of Allowance received for U.S. Appl. No. 17/317,042, dated Nov. 9, 2022, 10 pages.
Notice of Allowance received for U.S. Appl. No. 17/341,839, dated Dec. 2, 2022, 6 pages.
Notice of Allowance received for U.S. Appl. No. 17/341,839, dated Oct. 5, 2022, 5 pages.
Notice of Allowance received for U.S. Appl. No. 17/373,163, dated Jul. 27, 2022, 8 pages.
Notice of Allowance received for U.S. Appl. No. 17/373,163, dated May 11, 2022, 8 pages.

(56) References Cited

OTHER PUBLICATIONS

Notice of Allowance received for U.S. Appl. No. 17/515,143, dated Dec. 16, 2022, 11 pages.
Notice of Allowance received for U.S. Appl. No. 17/515,143, dated Mar. 13, 2023, 10 pages.
Notice of Allowance received for U.S. Appl. No. 17/516,537, dated Apr. 17, 2023, 8 pages.
Notice of Allowance received for U.S. Appl. No. 17/516,537, dated Dec. 27, 2022, 7 pages.
Notice of Allowance received for U.S. Appl. No. 17/556,165, dated Feb. 21, 2023, 12 pages.
Notice of Allowance received for U.S. Appl. No. 17/572,117, dated Apr. 4, 2023, 9 pages.
Notice of Allowance received for U.S. Appl. No. 17/591,184, dated Feb. 22, 2023, 5 pages.
Notice of Allowance received for U.S. Appl. No. 17/713,016, dated Apr. 18, 2023, 10 pages.
Notice of Allowance received for U.S. Appl. No. 17/941,962, dated Mar. 10, 2023, 11 pages.
Office Action received for Australian Patent Application No. 2020239749, dated Jan. 21, 2022, 4 pages.
Office Action received for Australian Patent Application No. 2021202797, dated Feb. 4, 2022, 5 pages.
Office Action received for Australian Patent Application No. 2021203216, dated Mar. 7, 2022, 8 pages.
Office Action received for Australian Patent Application No. 2021203636, dated Mar. 23, 2022, 3 pages.
Office Action received for Australian Patent Application No. 2021245228, dated Aug. 31, 2022, 2 pages.
Office Action received for Australian Patent Application No. 2021250863, dated Oct. 6, 2022, 6 pages.
Office Action received for Australian Patent Application No. 2021277718, dated Dec. 5, 2022, 3 pages.
Office Action received for Australian Patent Application No. 2021277718, dated Jan. 23, 2023, 4 pages.
Office Action received for Australian Patent Application No. 2021277718, dated Oct. 17, 2022, 4 pages.
Office Action received for Australian Patent Application No. 2022201419, dated Mar. 20, 2023, 3 pages.
Office Action received for Australian Patent Application No. 2022202292, dated May 10, 2022, 2 pages.
Office Action received for Australian Patent Application No. 2022202583, dated Mar. 24, 2023, 4 pages.
Office Action received for Australian Patent Application No. 2022209277, dated Mar. 10, 2023, 6 pages.
Office Action received for Australian Patent Application No. 2022218607, dated Apr. 14, 2023, 3 pages.
Office Action received for Chinese Patent Application No. 201810411708.4, dated Feb. 24, 2022, 10 pages (5 pages of English Translation and 5 pages of Official Copy).
Office Action received for Chinese Patent Application No. 201910875660.7, dated Dec. 26, 2022, 7 pages (3 pages of English Translation and 4 pages of Official Copy).
Office Action received for Chinese Patent Application No. 201910924197.0, dated Nov. 30, 2022, 13 pages (6 pages of English Translation and 7 pages of Official Copy).
Office Action received for Chinese Patent Application No. 202010295272.4, dated Feb. 27, 2023, 15 pages (6 pages of English Translation and 9 pages of Official Copy).
Office Action received for Chinese Patent Application No. 202110453180.9, dated Dec. 26, 2022, 13 pages (8 pages of English Translation and 5 pages of Official Copy).
Office Action received for Chinese Patent Application No. 202110453180.9, dated Jun. 16, 2022, 14 pages (7 pages of English Translation and 7 pages of Official Copy).
Office Action received for Chinese Patent Application No. 202110783860.7, dated Mar. 10, 2022, 15 pages (5 pages of English Translation and 10 pages of Official Copy).
Office Action received for Chinese Patent Application No. 202110783860.7, dated Nov. 15, 2022, 8 pages (2 pages of English Translation and 6 pages of Official Copy).
Office Action received for Chinese Patent Application No. 202111457936.3, dated Jul. 5, 2022, 18 pages (9 pages of English Translation and 9 pages of Official Copy).
Office Action received for Danish Patent Application No. PA202070610, dated Mar. 14, 2022, 7 pages.
Office Action received for Danish Patent Application No. PA202070623, dated May 23, 2022, 3 pages.
Office Action received for Danish Patent Application No. PA202070624, dated Feb. 4, 2022, 4 pages.
Office Action received for Danish Patent Application No. PA202070625, dated Feb. 8, 2022, 2 pages.
Office Action received for Danish Patent Application No. PA202070625, dated Sep. 23, 2022, 4 pages.
Office Action received for European Patent Application No. 15753796.0, dated Jun. 2, 2022, 2 pages.
Office Action received for European Patent Application No. 19724997.2, dated Oct. 27, 2022, 5 pages.
Office Action received for European Patent Application No. 20729346.5, dated Jan. 17, 2022, 8 pages.
Office Action received for European Patent Application No. 20729346.5, dated Jul. 28, 2022, 9 pages.
Office Action received for European Patent Application No. 20730136.7, dated Jan. 19, 2023, 4 pages.
Office Action received for European Patent Application No. 20730136.7, dated Oct. 6, 2022, 11 pages.
Office Action received for European Patent Application No. 20761084.1, dated Dec. 14, 2022, 5 pages.
Office Action received for European Patent Application No. 20761084.1, dated May 9, 2022, 9 pages.
Office Action received for European Patent Application No. 21169911.1, dated Dec. 1, 2022, 4 pages.
Office Action received for European Patent Application No. 21169911.1, dated Jun. 3, 2022, 5 pages.
Office Action received for European Patent Application No. 21177569.7, dated Jun. 9, 2022, 5 pages.
Office Action received for Indian Patent Application No. 202017048447, dated Sep. 5, 2022, 6 pages.
Office Action received for Indian Patent Application No. 202118025047, dated Apr. 26, 2022, 6 pages.
Office Action received for Japanese Patent Application No. 2020-159823, dated Aug. 15, 2022, 6 pages (3 pages of English Translation and 3 pages of Official Copy).
Office Action received for Japanese Patent Application No. 2020-159823, dated Dec. 23, 2021, 8 pages (4 pages of English Translation and 4 pages of Official Copy).
Office Action received for Japanese Patent Application No. 2020-159824, dated Dec. 17, 2021, 13 pages (7 pages of English Translation and 6 pages of Official Copy).
Office Action received for Japanese Patent Application No. 2020-159825, dated Dec. 10, 2021, 4 pages (2 pages of English Translation and 2 pages of Official Copy).
Office Action received for Japanese Patent Application No. 2020-562622, dated Jan. 7, 2022, 13 pages (6 pages of English Translation and 7 pages of Official Copy).
Office Action received for Japanese Patent Application No. 2021-023661, dated Feb. 25, 2022, 6 pages (3 pages of English Translation and 3 pages of Official Copy).
Office Action received for Japanese Patent Application No. 2021-023661, dated Oct. 3, 2022, 8 pages (4 pages of English Translation and 4 pages of Official Copy).
Office Action received for Korean Patent Application No. 10-2020-0123852, dated Jun. 9, 2022, 10 pages (4 pages of English Translation and 6 pages of Official Copy).
Office Action received for Korean Patent Application No. 10-2020-0123857, dated Dec. 16, 2022, 8 pages (4 pages of English Translation and 4 pages of Official Copy).
Office Action received for Korean Patent Application No. 10-2020-0123857, dated Jun. 9, 2022, 12 pages (5 pages of English Translation and 7 pages of Official Copy).

(56) References Cited

OTHER PUBLICATIONS

Office Action received for Korean Patent Application No. 10-2020-0123887, dated Jun. 9, 2022, 5 pages (2 pages of English Translation and 3 pages of Official Copy).
Office Action received for Korean Patent Application No. 10-2020-7032187, dated Jun. 10, 2022, 16 pages (7 pages of English Translation and 9 pages of Official Copy).
Office Action received for Korean Patent Application No. 10-2021-7036678, dated Dec. 22, 2021, 6 pages (2 pages of English Translation and 4 pages of Official Copy).
Office Action received for Korean Patent Application No. 10-2022-7019205, dated Sep. 21, 2022, 6 pages (2 pages of English Translation and 4 pages of Official Copy).
Pre-Appeal Review Report received for Japanese Patent Application No. 2020-159823, dated Jan. 12, 2023, 4 pages (2 pages of English Translation and 2 pages of Official Copy).
Programmatically download APK from google play store, Retrieved from the Internet: https://stackoverflow.com/questions/13703982/prog ram maticallydownload-apk-from-google-play-store/13704021#13704021, Dec. 10, 2012, 2 pages.
Result of Consultation received for European Patent Application No. 17810723.1, dated Nov. 30, 2022, 3 pages.
Summons to Attend Oral Proceedings received for European Patent Application No. 16708014.2, dated Oct. 10, 2022, 5 pages.
Summons to Attend Oral Proceedings received for European Patent Application No. 17810723.1, dated Jul. 5, 2022, 8 pages.
Summons to Attend Oral Proceedings received for European Patent Application No. 20172197.4, dated Apr. 14, 2023, 8 pages.
Summons to Attend Oral Proceedings received for European Patent Application No. 20729346.5, dated Jan. 23, 2023, 11 pages.
Supplemental Notice of Allowance received for U.S. Appl. No. 16/147,523, dated Aug. 23, 2022, 2 pages.
Supplemental Notice of Allowance received for U.S. Appl. No. 16/867,002, dated Mar. 16, 2022, 2 pages.
Supplemental Notice of Allowance received for U.S. Appl. No. 16/997,588, dated Apr. 20, 2022, 4 pages.
Droid LIFE,"20+ Galaxy S9, S9+ Tips and Tricks", Available Online at: https://www.youtube.com/watch?v=sso0mYTfV6w, Mar. 22, 2018, pp. 1-33.
Gauging Gadgets, "How to Customize Watch Faces—Garmin Venu Tutorial", Online Available at: https://www.youtube.com/watch?v=dxajKKulaP0, Jan. 7, 2020, 14 pages.
Google, "Android User's Guide", Retrieved from the Internet: https://static.googleusercontent.com/media/www.google.com/en//help/hc/pdfs/mobile/AndroidUsersGuide-30-100.pdf, Feb. 23, 2011, 140 pages.
Hoffman Chris, "5+ Cool Uses for Android's Daydream Mode", retrieved from—https://www.howtogeek.com/170990/5-cool-uses-for-androids-daydream-mode, Jul. 12, 2017, 8 pages.
Ilovex, ""Stripe Generator", a tool that makes it easy to create striped materials", Online available at: https://www.ilovex.co.jp/blog/system/webconsulting/stripe-generator.html, May 2, 2012, 3 pages (Official Copy Only) See Communication Under Rule 37 CFR § 1.98(a) (3).
Jurick et al., "iPhone Hacks", Tips & Tools for Unlocking the Power of Your iPhone & iPod touch, online:URL:https://api.pageplace.de/preview/DT0400.9780596550974_A23629666/preview-9780596550974_A23629666.pdf >, Apr. 2009, 49 pages.
Kasai Yoshino, "Apple Watch Absolute Basics—Season 3—The key is to customize the dial", Mynavi Corporation, Online Available at: https://news.mynavi.jp/article/20171104-apple_watch/, Nov. 4, 2017, 5 pages (Official Copy only) See Communication Under Rule 37 CFR § 1.98(a) (3).
Lee et al., "PASS: Reducing Redundant Notifications between a Smartphone and a Smartwatch for Energy Saving", IEEE Transactions on Mobile Computing, vol. 19, No. 11, Jul. 23, 2019, pp. 2656-2669.
Lein et al., "Patternizer", Available online at: https://patternizer.com/, Apr. 2016, 5 pages.
Lyons Kent, "Smartwatch Innovation: Exploring a Watch-First Model", Pervasive Computing, Jan. 2016, pp. 10-13.
Poppinga et al., "Sensor-Based Identification of Opportune Moments for Triggering Notifications", IEEE CS, Mar. 14, 2014, pp. 22-29.
Pradhan et al., "Understanding and Managing Notifications", IEEE Infocom 2017—IEEE Conference on Computer Communications, May 1, 2017, 9 pages.
Siewiorek et al., "SenSay: A context-aware mobile phone", Retrieved from the Internet: URL:http://www.cs.cmu.edu/aura/docdir/sensay_iswc.pdf sensay_iswc.pdf, 2003, 10 pages.
Spears Ann, "dimming screen before/instead of screensaver?", retrieved from—https://discussions.apple.com/thread/339700, Jan. 28, 2006, 1 page.
Applicant-Initiated Interview Summary received for U.S. Appl. No. 17/031,765, dated May 3, 2023, 6 pages.
Final Office Action received for U.S. Appl. No. 17/068,386, dated May 8, 2023, 23 pages.
Notice of Acceptance received for Australian Patent Application No. 2022209277, dated Apr. 28, 2023, 3 pages.
Notice of Allowance received for U.S. Appl. No. 17/941,962, dated May 3, 2023, 10 pages.
Office Action received for Australian Patent Application No. 2022203957, dated May 12, 2023, 5 pages.
Office Action received for Chinese Patent Application No. 201911099970.0, dated Feb. 23, 2023, 15 pages (05 pages of English Translation and 10 pages of Official Copy).
Applicant Initiated Interview Summary received for U.S. Appl. No. 17/546,630, dated May 22, 2023, 4 pages.
Applicant-Initiated Interview Summary received for U.S. Appl. No. 16/389,722, dated May 31, 2023, 4 pages.
Applicant-Initiated Interview Summary received for U.S. Appl. No. 17/031,671, dated May 23, 2023, 3 pages.
Applicant-Initiated Interview Summary received for U.S. Appl. No. 17/181,089, dated May 16, 2023, 4 pages.
Applicant-Initiated Interview Summary received for U.S. Appl. No. 17/941,962, dated May 30, 2023, 2 pages.
Final Office Action received for U.S. Appl. No. 17/951,875, dated May 30, 2023, 12 pages.
Office Action received for Korean Patent Application No. 10-2023-7011744, dated May 15, 2023, 11 pages (5 pages of English Translation and 6 pages of Official Copy).

* cited by examiner

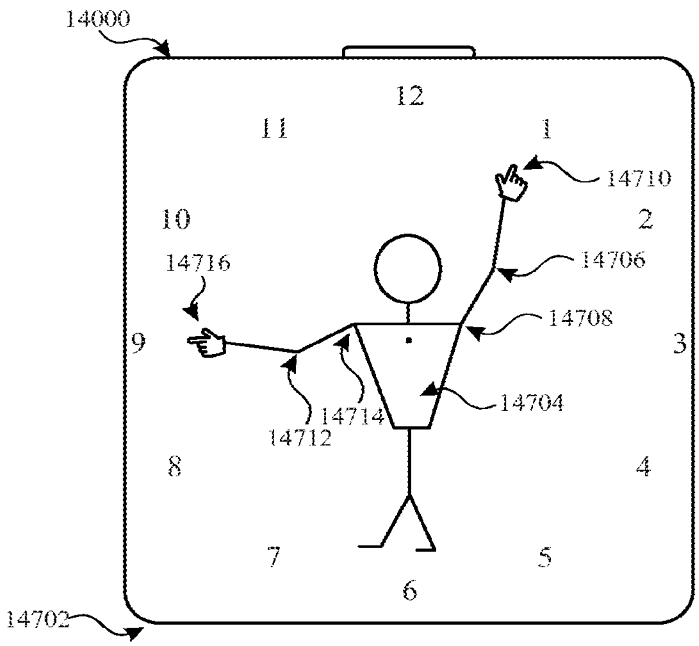
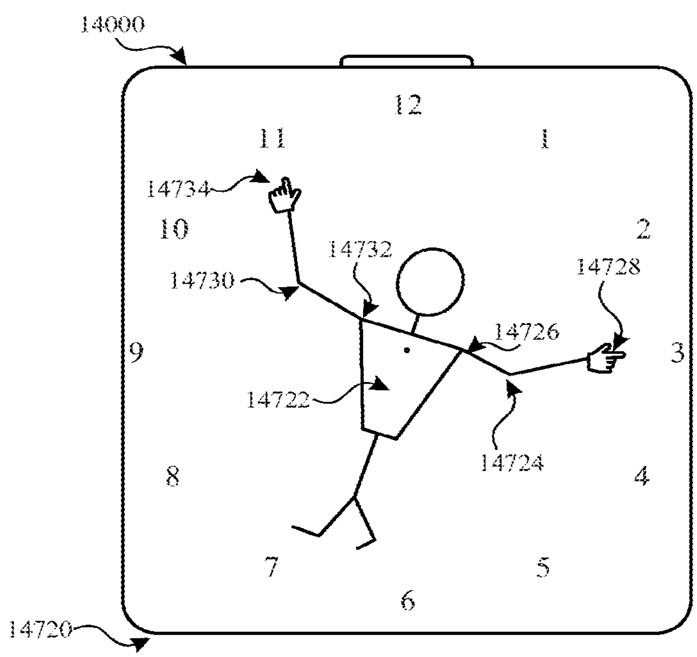
*FIG. 14C*

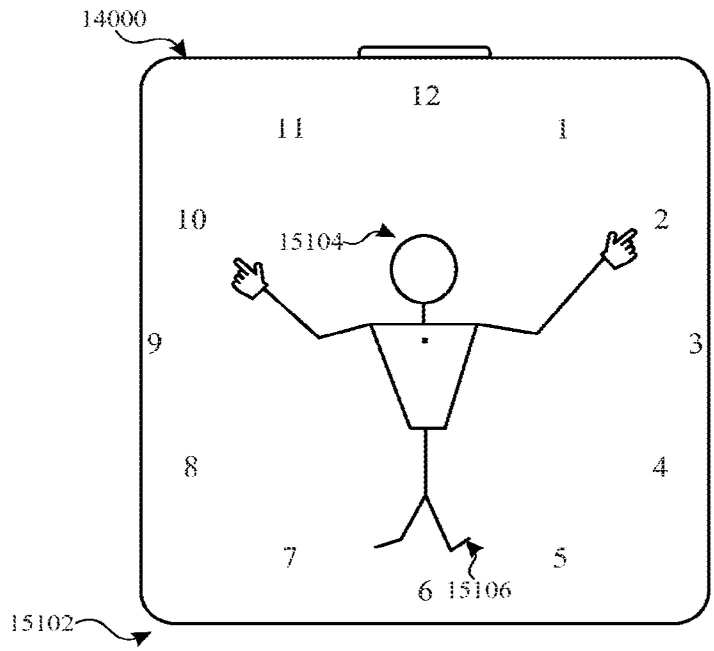
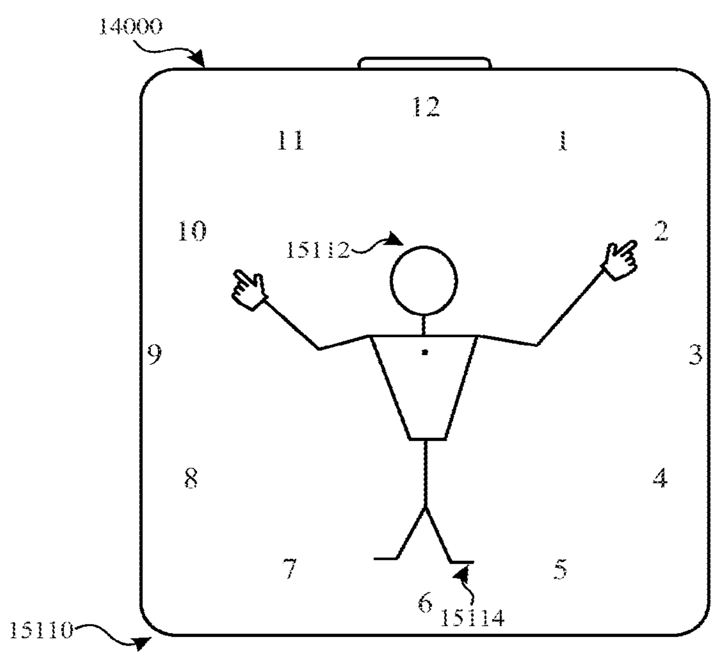
*FIG. 14G*

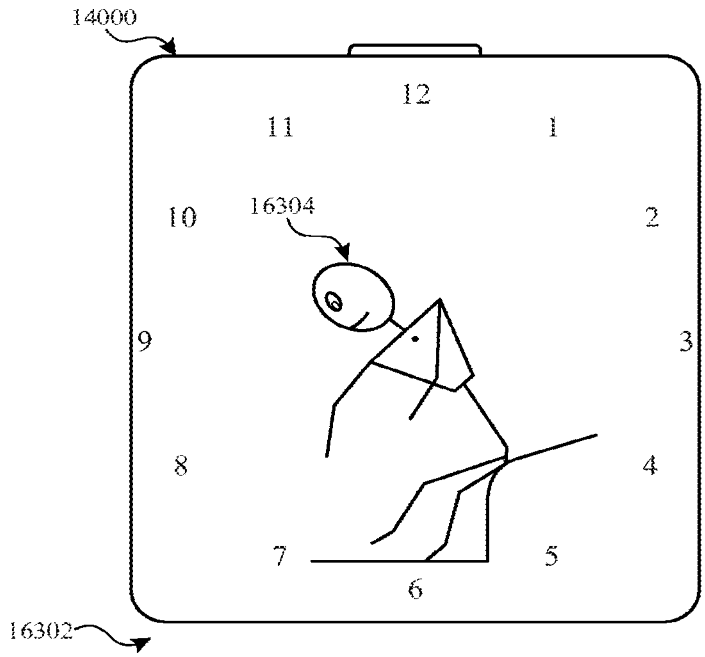
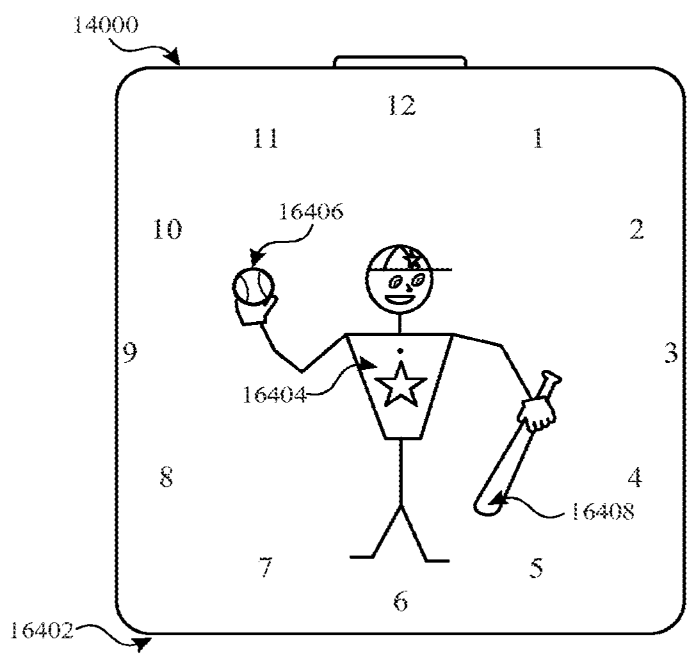
FIG. 14R

2100

Figure 23:
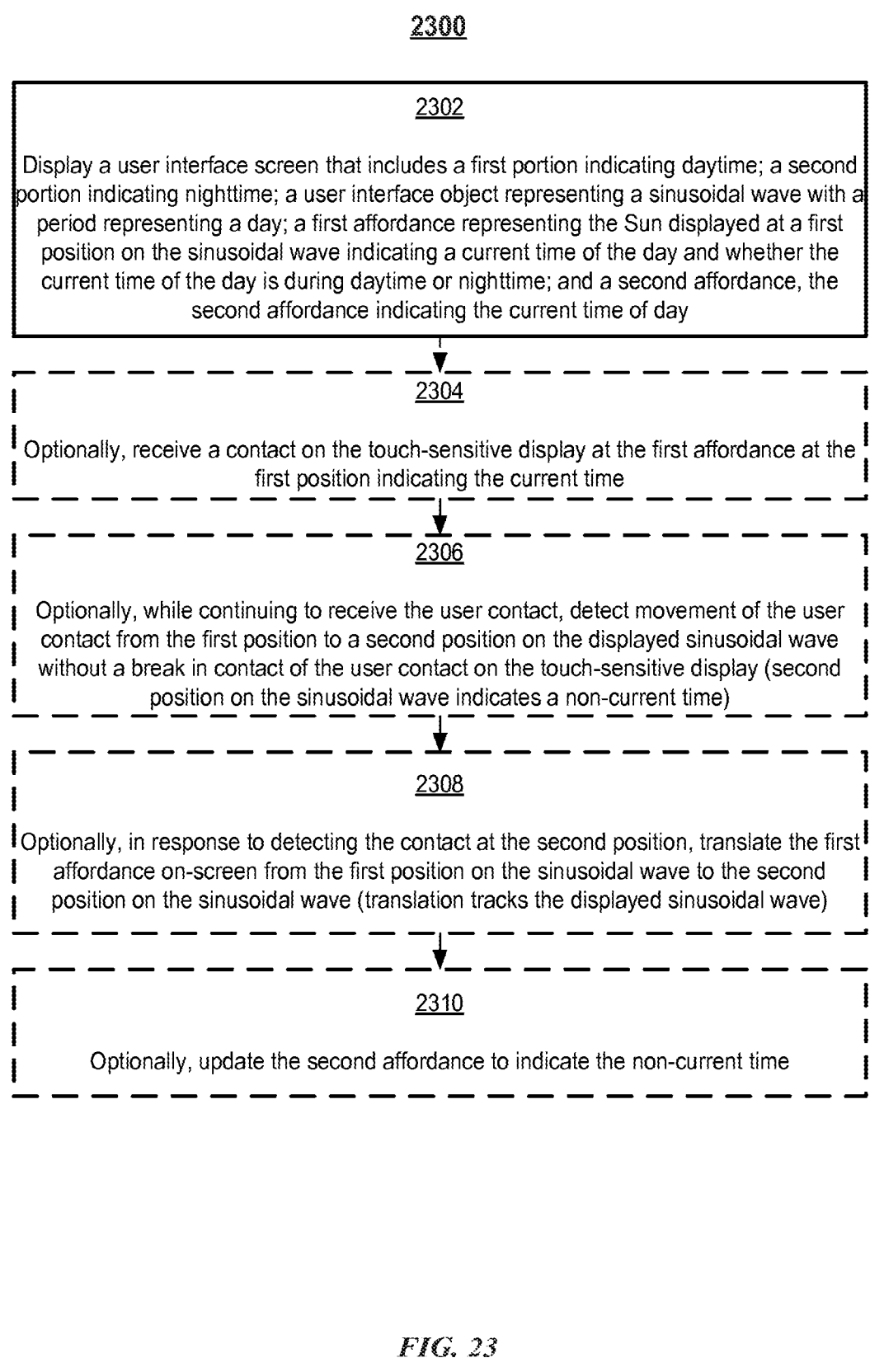

2300

2302

Display a user interface screen that includes a first portion indicating daytime; a second portion indicating nighttime; a user interface object representing a sinusoidal wave with a period representing a day; a first affordance representing the Sun displayed at a first position on the sinusoidal wave indicating a current time of the day and whether the current time of the day is during daytime or nighttime; and a second affordance, the second affordance indicating the current time of day

2304

Optionally, receive a contact on the touch-sensitive display at the first affordance at the first position indicating the current time

2306

Optionally, while continuing to receive the user contact, detect movement of the user contact from the first position to a second position on the displayed sinusoidal wave without a break in contact of the user contact on the touch-sensitive display (second position on the sinusoidal wave indicates a non-current time)

2308

Optionally, in response to detecting the contact at the second position, translate the first affordance on-screen from the first position on the sinusoidal wave to the second position on the sinusoidal wave (translation tracks the displayed sinusoidal wave)

2310

Optionally, update the second affordance to indicate the non-current time

Figure 24:
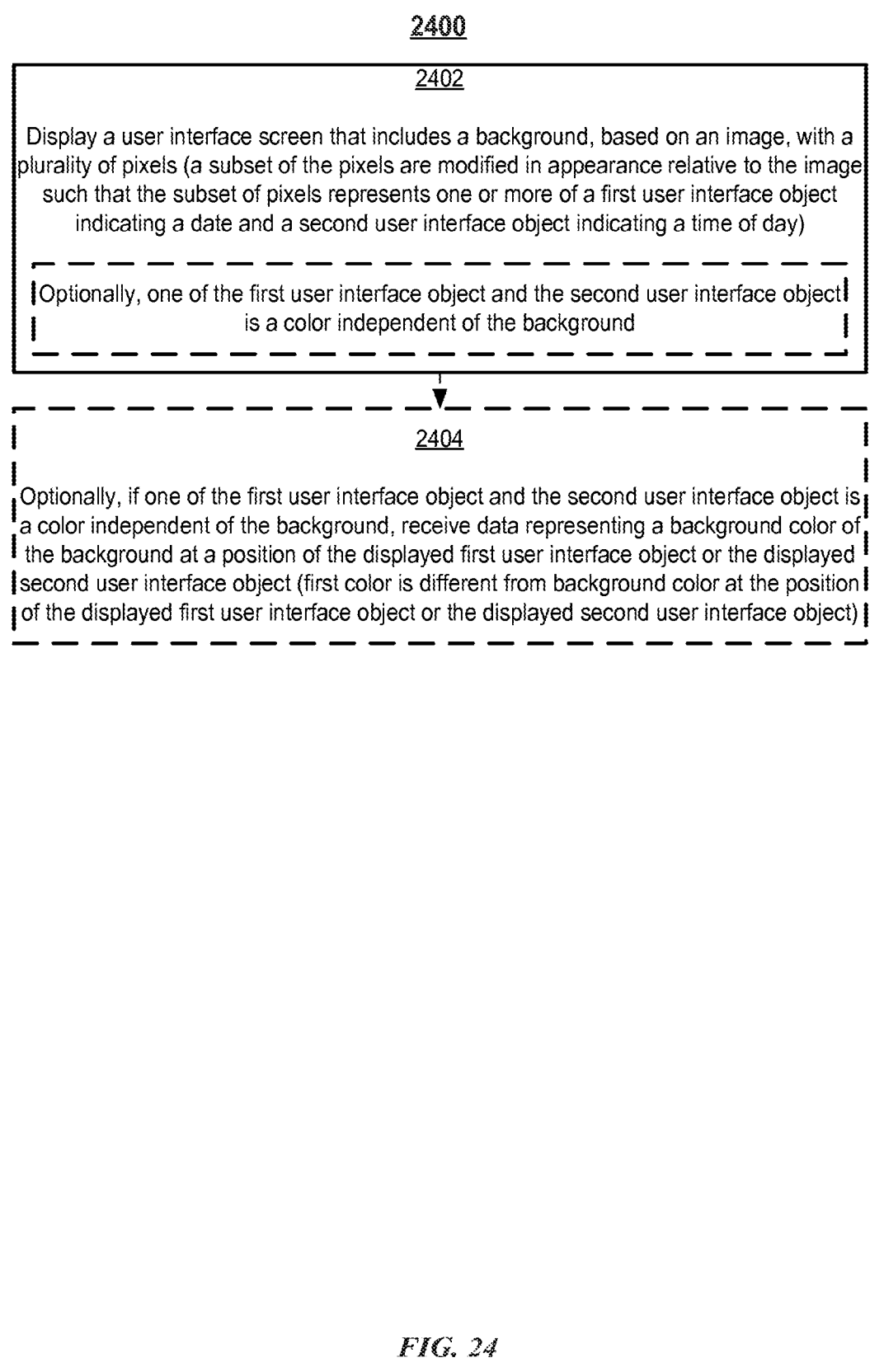

Display a user interface screen that includes a background, based on an image, with a plurality of pixels (a subset of the pixels are modified in appearance relative to the image such that the subset of pixels represents one or more of a first user interface object indicating a date and a second user interface object indicating a time of day)

Optionally, one of the first user interface object and the second user interface object is a color independent of the background

2404

Optionally, if one of the first user interface object and the second user interface object is a color independent of the background, receive data representing a background color of the background at a position of the displayed first user interface object or the displayed second user interface object (first color is different from background color at the position of the displayed first user interface object or the displayed second user interface object)

Figure 27B:
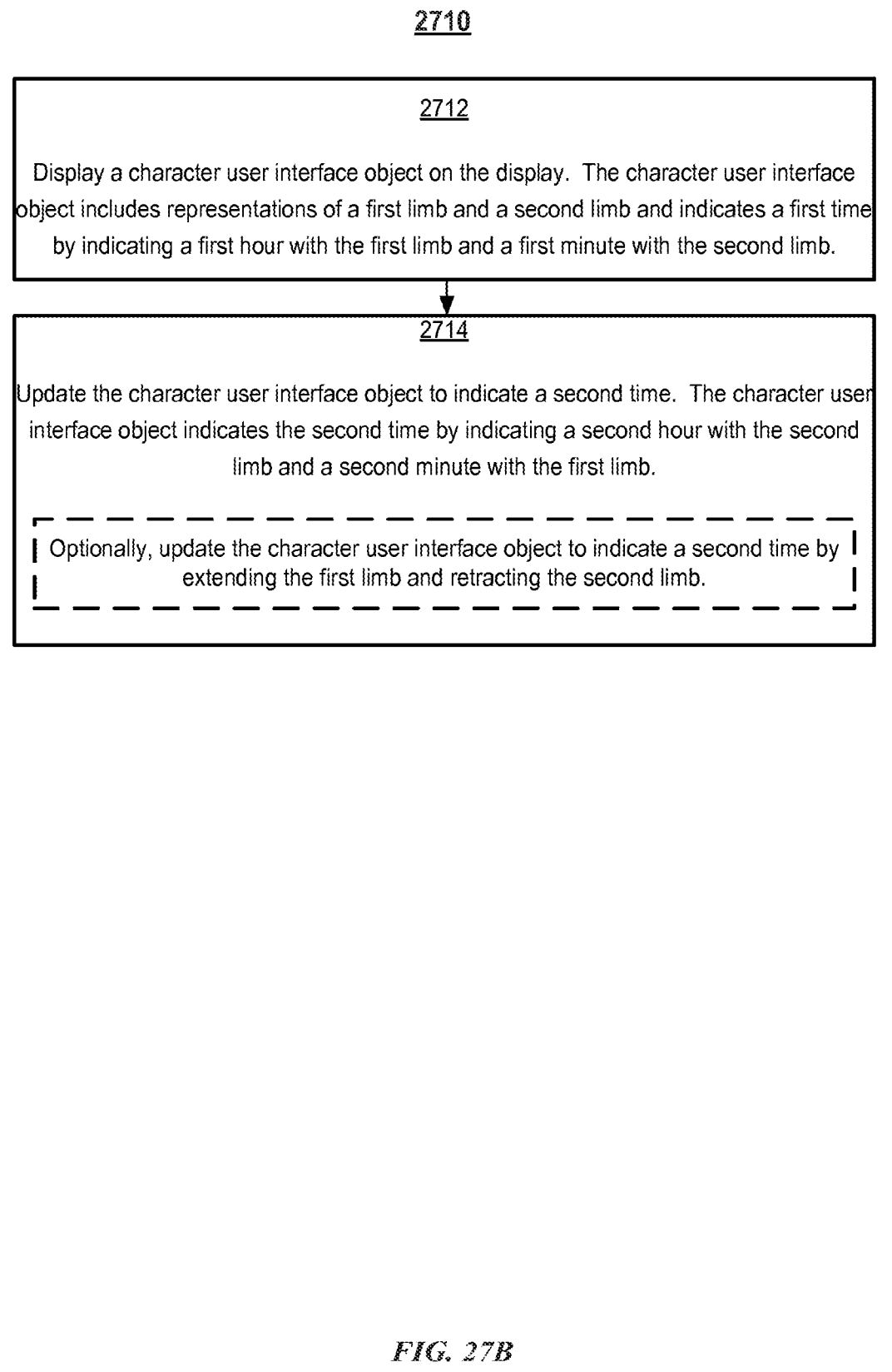

Display a character user interface object on the display. The character user interface object includes representations of a first limb and a second limb and indicates a first time by indicating a first hour with the first limb and a first minute with the second limb.

↓

2714

Update the character user interface object to indicate a second time. The character user interface object indicates the second time by indicating a second hour with the second limb and a second minute with the first limb.

Optionally, update the character user interface object to indicate a second time by extending the first limb and retracting the second limb.

Figure 27C:
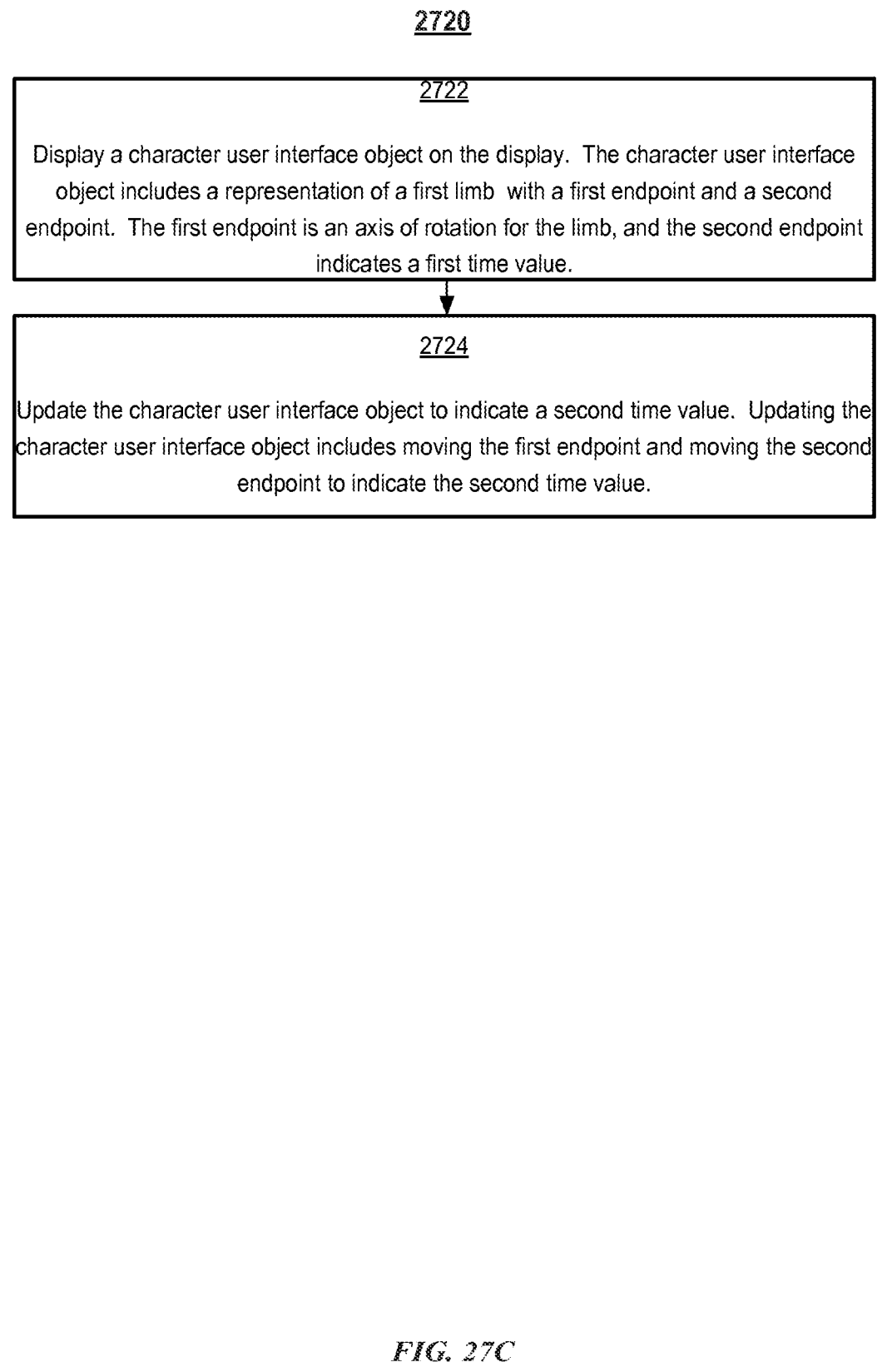

Display a character user interface object on the display. The character user interface object includes a representation of a first limb with a first endpoint and a second endpoint. The first endpoint is an axis of rotation for the limb, and the second endpoint indicates a first time value.

↓

2724

Update the character user interface object to indicate a second time value. Updating the character user interface object includes moving the first endpoint and moving the second endpoint to indicate the second time value.

Figure 54A:
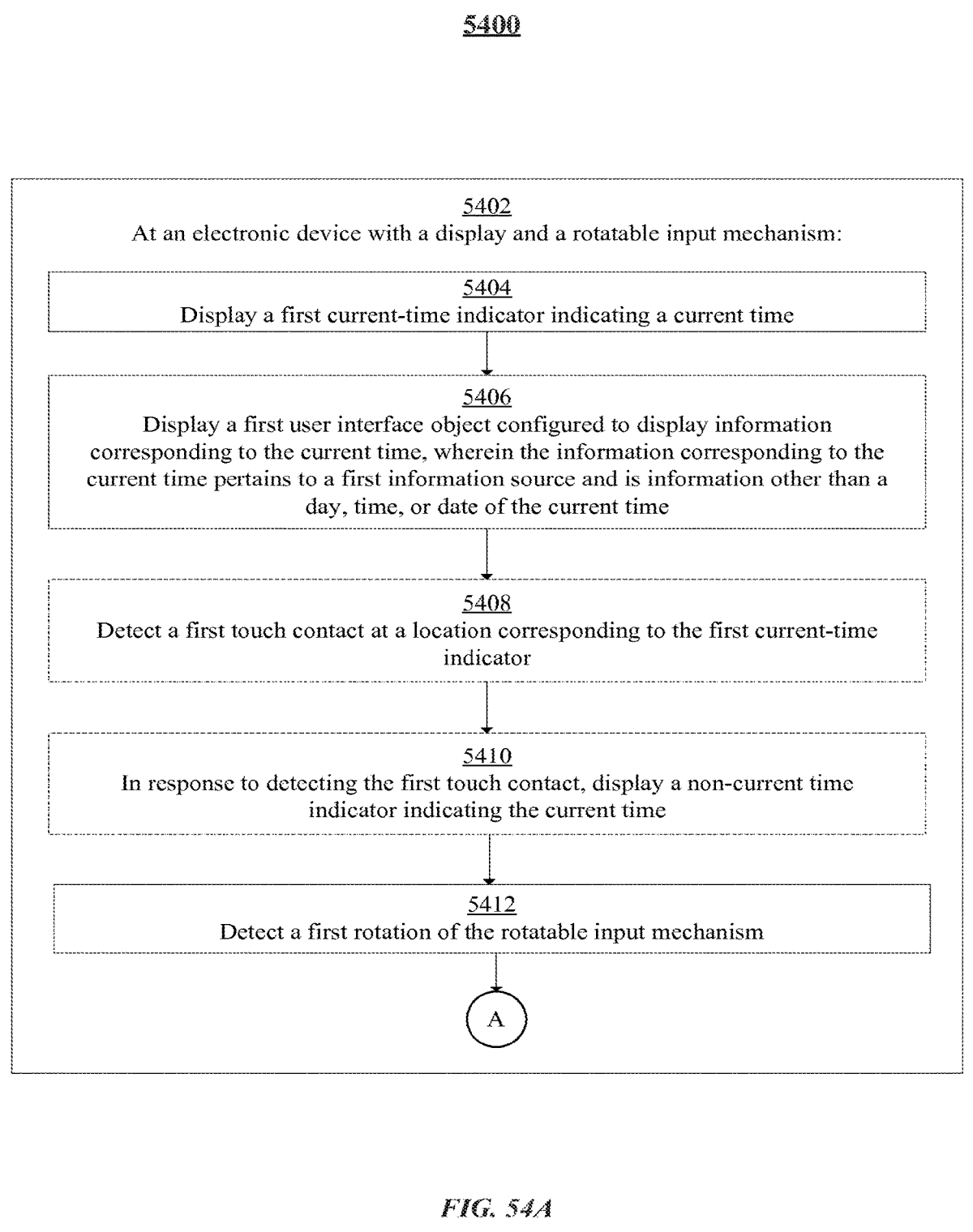

5402
At an electronic device with a display and a rotatable input mechanism:

5404
Display a first current-time indicator indicating a current time

5406
Display a first user interface object configured to display information corresponding to the current time, wherein the information corresponding to the current time pertains to a first information source and is information other than a day, time, or date of the current time 5408
Detect a first touch contact at a location corresponding to the first current-time indicator 5410
In response to detecting the first touch contact, display a non-current time indicator indicating the current time 5412
Detect a first rotation of the rotatable input mechanism

Figure 54D:
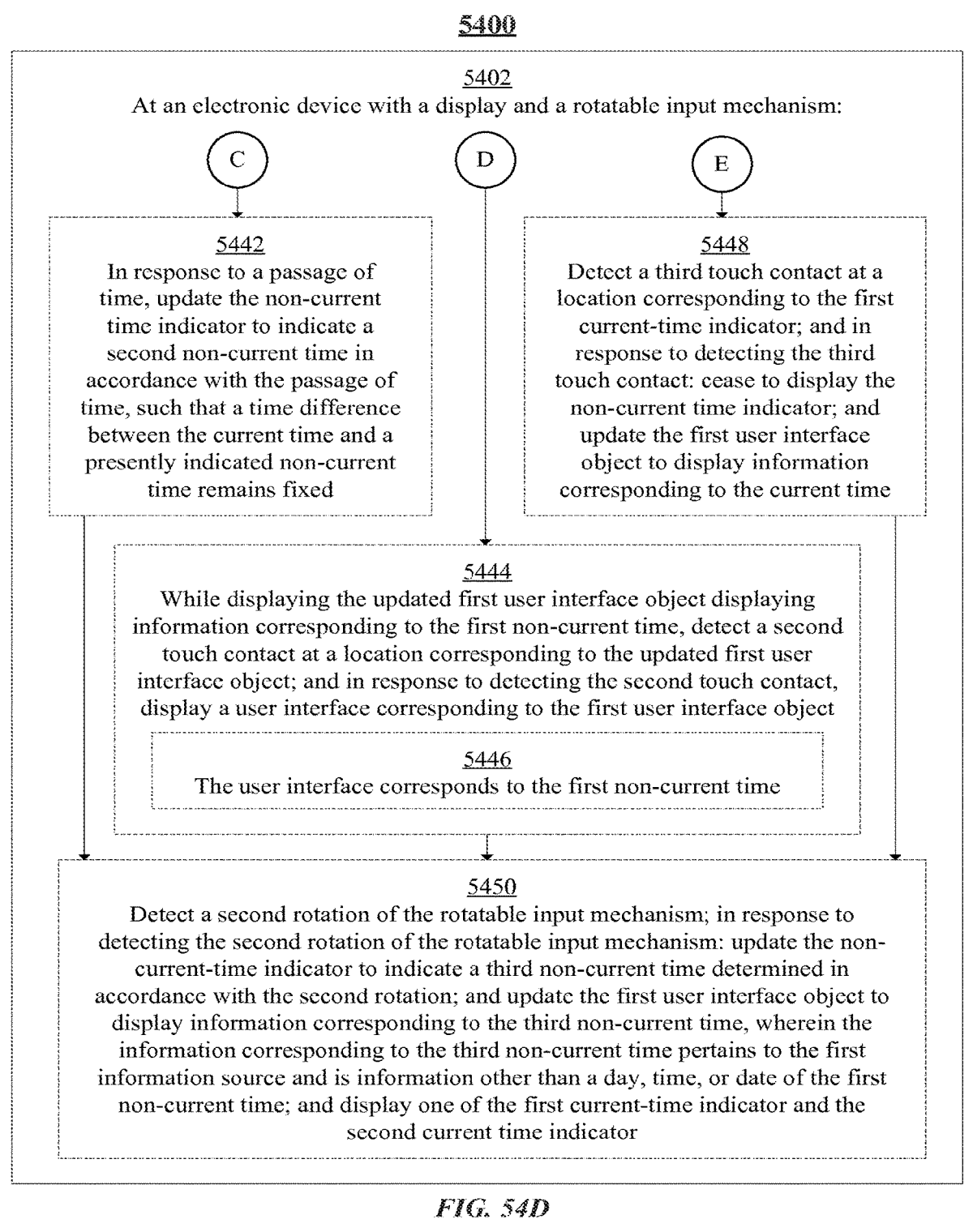

5402
At an electronic device with a display and a rotatable input mechanism:

C

D

E

5442
In response to a passage of time, update the non-current time indicator to indicate a second non-current time in accordance with the passage of time, such that a time difference between the current time and a presently indicated non-current time remains fixed 5448
Detect a third touch contact at a location corresponding to the first current-time indicator; and in response to detecting the third touch contact: cease to display the non-current time indicator; and update the first user interface object to display information corresponding to the current time 5444
While displaying the updated first user interface object displaying information corresponding to the first non-current time, detect a second touch contact at a location corresponding to the updated first user interface object; and in response to detecting the second touch contact, display a user interface corresponding to the first user interface object 5446
The user interface corresponds to the first non-current time 5450
Detect a second rotation of the rotatable input mechanism; in response to detecting the second rotation of the rotatable input mechanism: update the non-current-time indicator to indicate a third non-current time determined in accordance with the second rotation; and update the first user interface object to display information corresponding to the third non-current time, wherein the information corresponding to the third non-current time pertains to the first information source and is information other than a day, time, or date of the first non-current time; and display one of the first current-time indicator and the second current time indicator

Figure 54E:
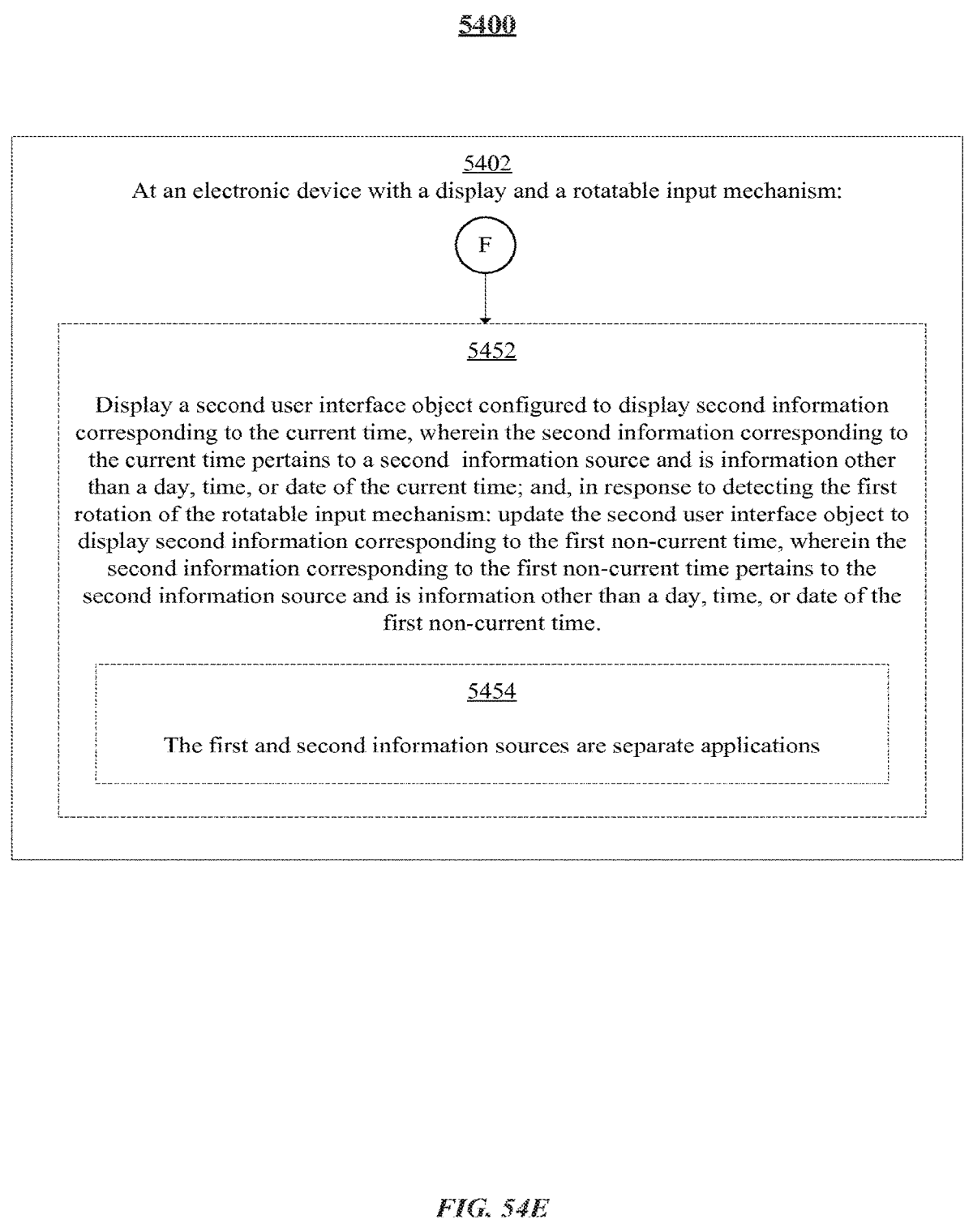

At an electronic device with a display and a rotatable input mechanism:

F

5452

Display a second user interface object configured to display second information corresponding to the current time, wherein the second information corresponding to the current time pertains to a second information source and is information other than a day, time, or date of the current time; and, in response to detecting the first rotation of the rotatable input mechanism: update the second user interface object to display second information corresponding to the first non-current time, wherein the second information corresponding to the first non-current time pertains to the second information source and is information other than a day, time, or date of the first non-current time.

5454

The first and second information sources are separate applications

Figure 57A:
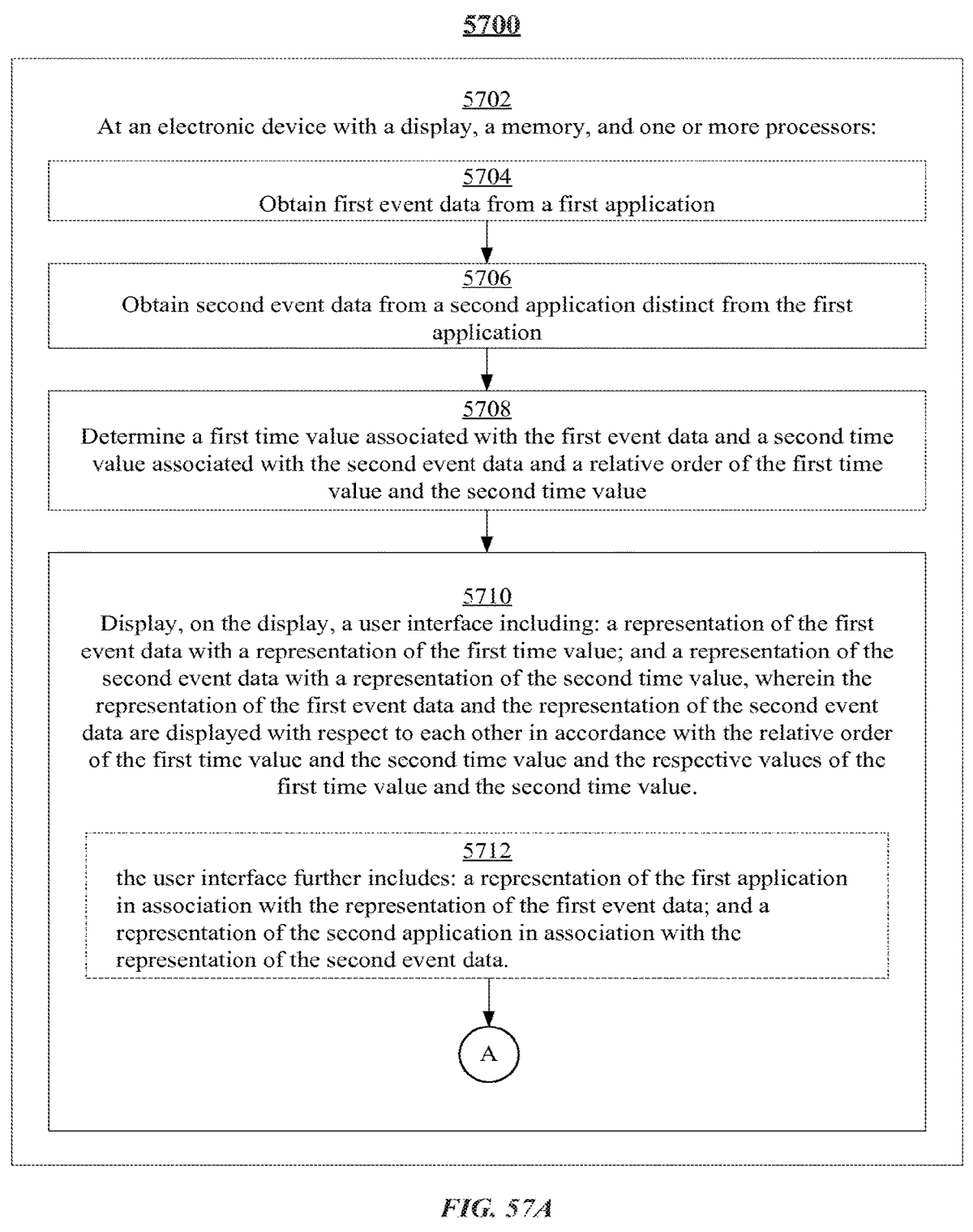

5702
At an electronic device with a display, a memory, and one or more processors:

5704
Obtain first event data from a first application

5706
Obtain second event data from a second application distinct from the first application 5708
Determine a first time value associated with the first event data and a second time value associated with the second event data and a relative order of the first time value and the second time value 5710
Display, on the display, a user interface including: a representation of the first event data with a representation of the first time value; and a representation of the second event data with a representation of the second time value, wherein the representation of the first event data and the representation of the second event data are displayed with respect to each other in accordance with the relative order of the first time value and the second time value and the respective values of the first time value and the second time value.

5712
the user interface further includes: a representation of the first application in association with the representation of the first event data; and a representation of the second application in association with the representation of the second event data.

Figure 57B:
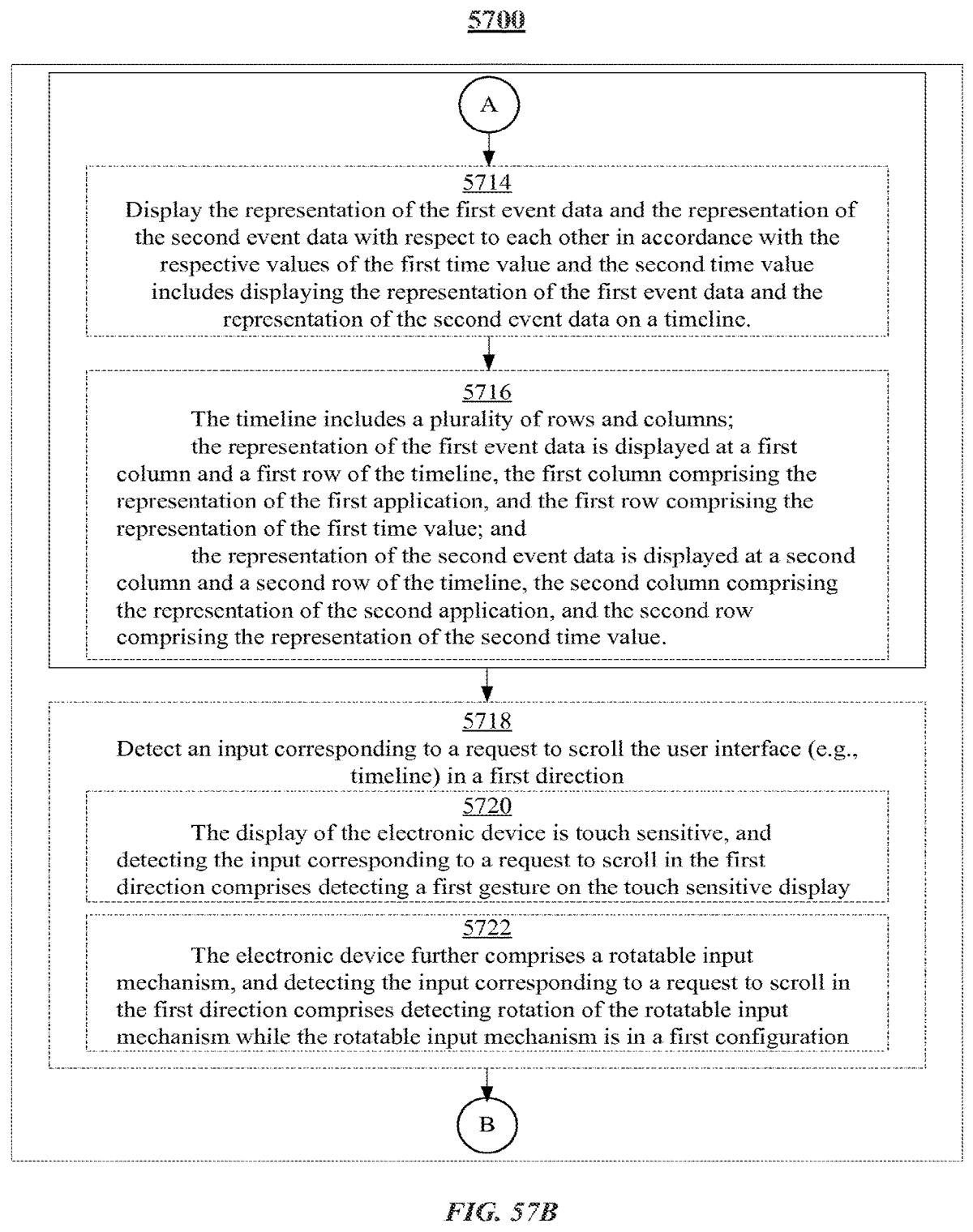

5714
Display the representation of the first event data and the representation of the second event data with respect to each other in accordance with the respective values of the first time value and the second time value includes displaying the representation of the first event data and the representation of the second event data on a timeline.

5716
The timeline includes a plurality of rows and columns;
the representation of the first event data is displayed at a first column and a first row of the timeline, the first column comprising the representation of the first application, and the first row comprising the representation of the first time value; and
the representation of the second event data is displayed at a second column and a second row of the timeline, the second column comprising the representation of the second application, and the second row comprising the representation of the second time value.

5718
Detect an input corresponding to a request to scroll the user interface (e.g., timeline) in a first direction 5720
The display of the electronic device is touch sensitive, and detecting the input corresponding to a request to scroll in the first direction comprises detecting a first gesture on the touch sensitive display 5722
The electronic device further comprises a rotatable input mechanism, and detecting the input corresponding to a request to scroll in the first direction comprises detecting rotation of the rotatable input mechanism while the rotatable input mechanism is in a first configuration

Figure 57C:
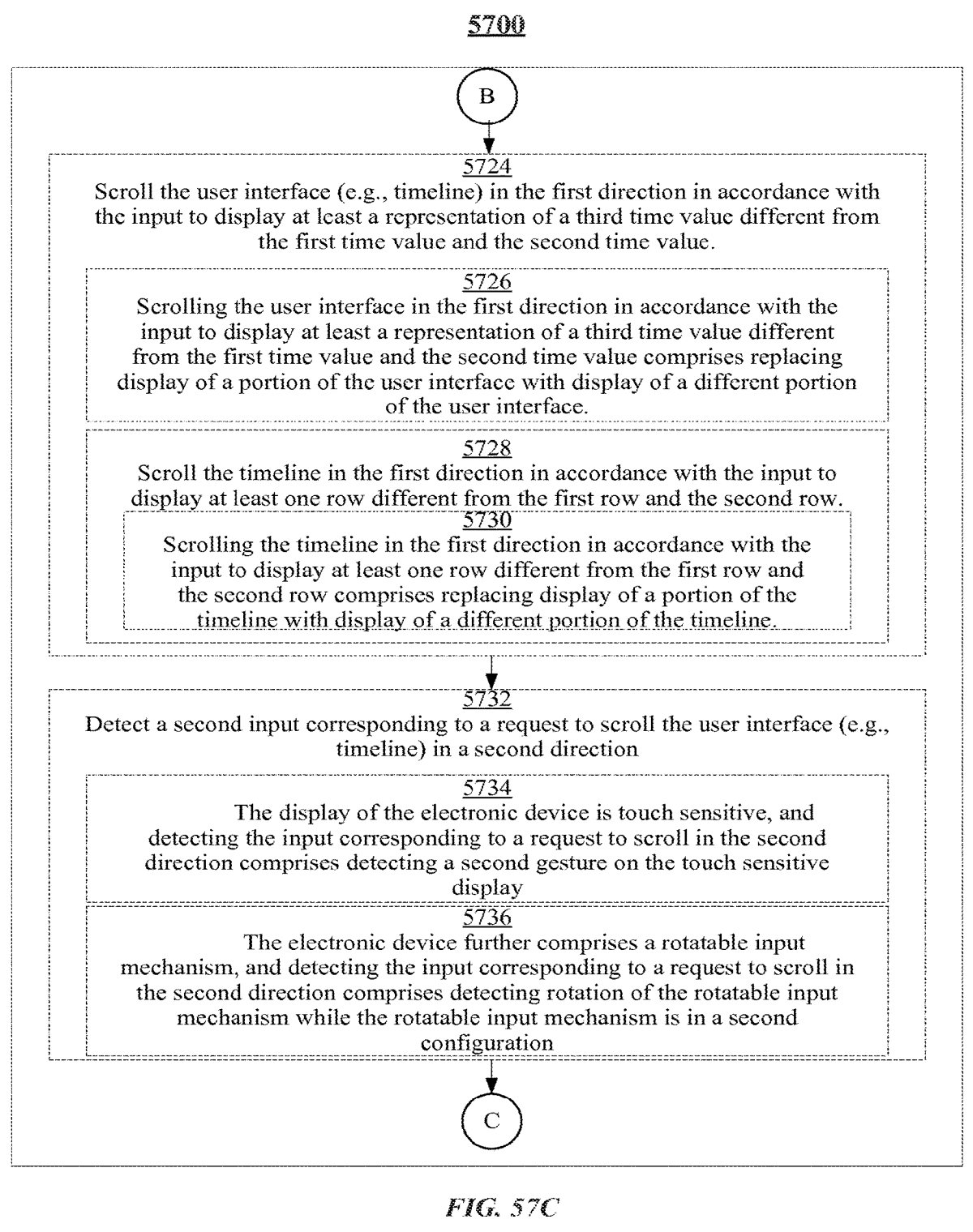

5724
Scroll the user interface (e.g., timeline) in the first direction in accordance with the input to display at least a representation of a third time value different from the first time value and the second time value.

5726
Scrolling the user interface in the first direction in accordance with the input to display at least a representation of a third time value different from the first time value and the second time value comprises replacing display of a portion of the user interface with display of a different portion of the user interface.

5728
Scroll the timeline in the first direction in accordance with the input to display at least one row different from the first row and the second row.

5730
Scrolling the timeline in the first direction in accordance with the input to display at least one row different from the first row and the second row comprises replacing display of a portion of the timeline with display of a different portion of the timeline.

5732
Detect a second input corresponding to a request to scroll the user interface (e.g., timeline) in a second direction 5734
The display of the electronic device is touch sensitive, and detecting the input corresponding to a request to scroll in the second direction comprises detecting a second gesture on the touch sensitive display 5736
The electronic device further comprises a rotatable input mechanism, and detecting the input corresponding to a request to scroll in the second direction comprises detecting rotation of the rotatable input mechanism while the rotatable input mechanism is in a second configuration

Figure 57D:
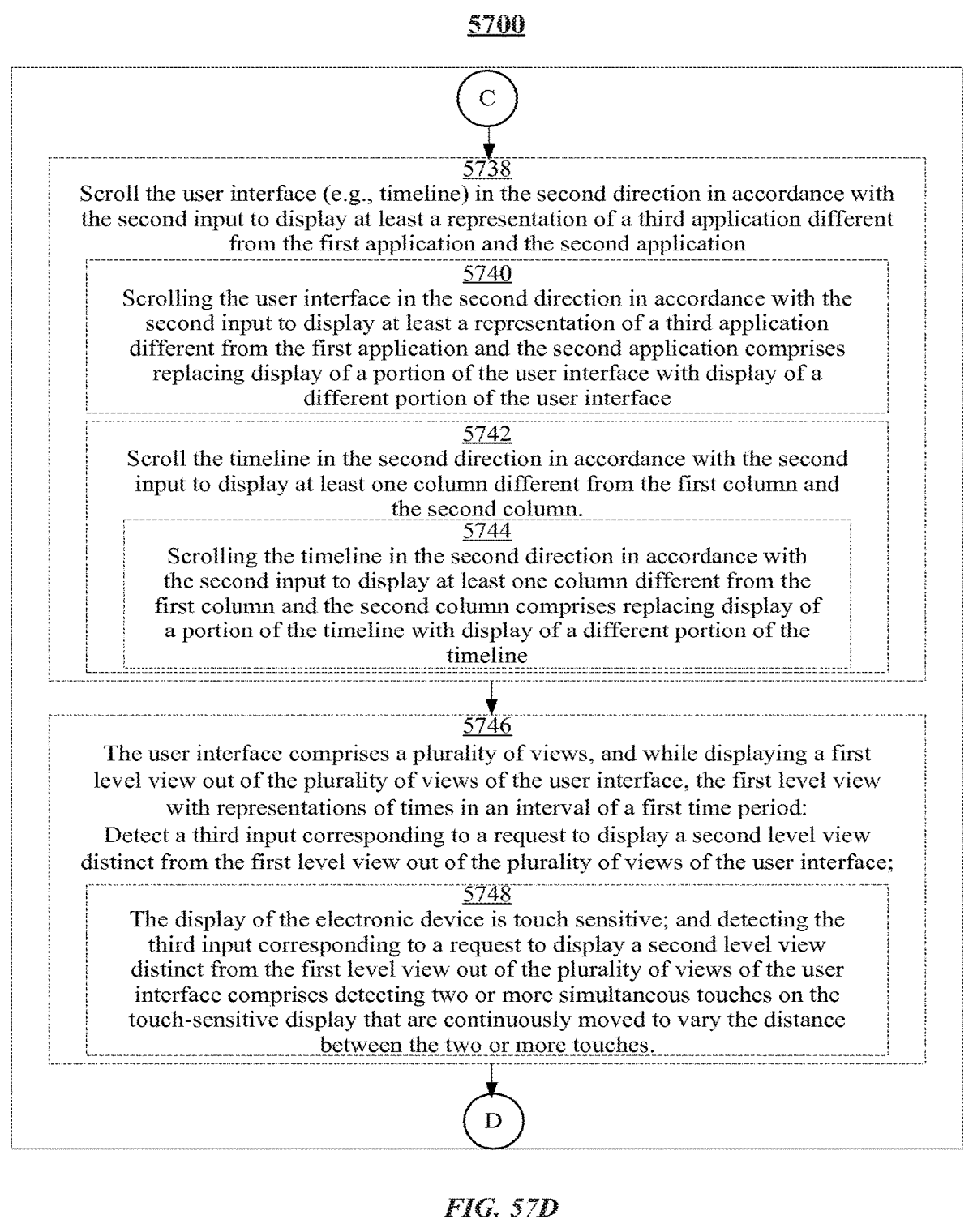

5738
Scroll the user interface (e.g., timeline) in the second direction in accordance with the second input to display at least a representation of a third application different from the first application and the second application 5740
Scrolling the user interface in the second direction in accordance with the second input to display at least a representation of a third application different from the first application and the second application comprises replacing display of a portion of the user interface with display of a different portion of the user interface 5742
Scroll the timeline in the second direction in accordance with the second input to display at least one column different from the first column and the second column.

5744
Scrolling the timeline in the second direction in accordance with the second input to display at least one column different from the first column and the second column comprises replacing display of a portion of the timeline with display of a different portion of the timeline 5746
The user interface comprises a plurality of views, and while displaying a first level view out of the plurality of views of the user interface, the first level view with representations of times in an interval of a first time period:
Detect a third input corresponding to a request to display a second level view distinct from the first level view out of the plurality of views of the user interface;

5748
The display of the electronic device is touch sensitive; and detecting the third input corresponding to a request to display a second level view distinct from the first level view out of the plurality of views of the user interface comprises detecting two or more simultaneous touches on the touch-sensitive display that are continuously moved to vary the distance between the two or more touches.

Figure 60D:
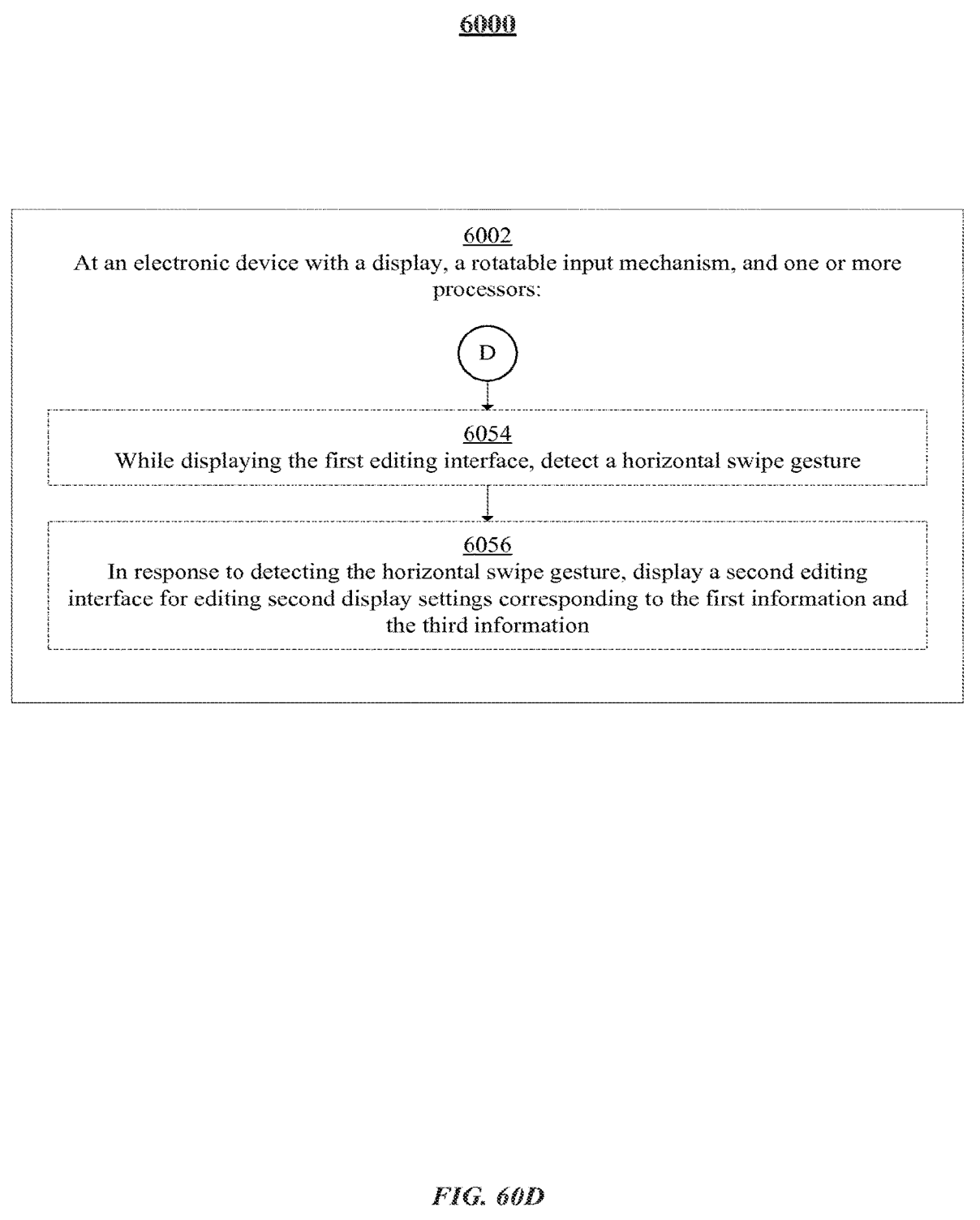

6002
At an electronic device with a display, a rotatable input mechanism, and one or more processors:

D

6054
While displaying the first editing interface, detect a horizontal swipe gesture 6056
In response to detecting the horizontal swipe gesture, display a second editing interface for editing second display settings corresponding to the first information and the third information

CONTEXT-SPECIFIC USER INTERFACES

CROSS-REFERENCE TO RELATED APPLICATIONS

This application is a continuation of U.S. patent application Ser. No. 15/405,122, filed Jan. 12, 2017, entitled "CONTEXT-SPECIFIC USER INTERFACES," which is a continuation of U.S. patent application Ser. No. 14/815,898, filed Jul. 31, 2015, which is a continuation of International Patent Application Serial No. PCT/US2015/034607, filed Jun. 7, 2015, which claims priority to the following applications: U.S. Provisional Patent Application Ser. No. 62/032,562, filed Aug. 2, 2014; U.S. Provisional Patent Application Ser. No. 62/044,994, filed Sep. 2, 2014; U.S. Provisional Patent Application Ser. No. 62/129,835, filed Mar. 7, 2015. All of these applications are hereby incorporated by reference in their entirety.

This application relates to the following applications: International Patent Application Serial No. PCT/US2013/040087, entitled "Device, Method, and Graphical User Interface for Moving a User Interface Object Based on an Intensity of a Press Input," filed May 8, 2013; International Patent Application Serial No. PCT/US2013/040072, entitled "Device, Method, and Graphical User Interface for Providing Feedback for Changing Activation States of a User Interface Object," filed May 8, 2013; International Patent Application Serial No. PCT/US2013/040070, entitled "Device, Method, and Graphical User Interface for Providing Tactile Feedback for Operations Performed in a User Interface," filed May 8, 2013; International Patent Application Serial No. PCT/US2013/040067, entitled "Device, Method, and Graphical User Interface for Facilitating User Interaction with Controls in a User Interface," filed May 8, 2013; International Patent Application Serial No. PCT/US2013/040061, entitled "Device, Method, and Graphical User Interface for Displaying User Interface Objects Corresponding to an Application," filed May 8, 2013; International Patent Application Serial No. PCT/US2013/040058, entitled "Device, Method, and Graphical User Interface for Displaying Additional Information in Response to a User Contact," filed May 8, 2013; International Patent Application Serial No. PCT/US2013/040056, entitled "Device, Method, and Graphical User Interface for Scrolling Nested Regions," filed May 8, 2013; International Patent Application Serial No. PCT/US2013/040054, entitled "Device, Method, and Graphical User Interface for Manipulating Framed Graphical Objects," filed May 8, 2013; International Patent Application Serial No. PCT/US2013/069489, entitled "Device, Method, and Graphical User Interface for Switching Between User Interfaces," filed Nov. 11, 2013; International Patent Application Serial No. PCT/US2013/069486, entitled "Device, Method, and Graphical User Interface for Determining Whether to Scroll or Select Content," filed Nov. 11, 2013; International Patent Application Serial No. PCT/US2013/069484, entitled "Device, Method, and Graphical User Interface for Moving a Cursor According to a Change in an Appearance of a Control Icon with Simulated Three-Dimensional Characteristics," filed Nov. 11, 2013; International Patent Application Serial No. PCT/US2013/069483, entitled "Device, Method, and Graphical User Interface for Transitioning Between Touch Input to Display Output Relationships," filed Nov. 11, 2013; International Patent Application Serial No. PCT/US2013/069479, entitled "Device, Method, and Graphical User Interface for Forgoing Generation of Tactile Output for a Multi-Contact Gesture," filed Nov. 11, 2013; International Patent Application Serial No. PCT/US2013/069472, entitled "Device, Method, and Graphical User Interface for Navigating User Interface Hierarchies," filed Nov. 11, 2013; International Patent Application Serial No. PCT/US2013/040108, entitled "Device, Method, and Graphical User Interface for Moving and Dropping a User Interface Object," filed May 8, 2013; International Patent Application Serial No. PCT/US2013/040101, entitled "Device, Method, and Graphical User Interface for Selecting User Interface Objects," filed May 8, 2013; International Patent Application Serial No. PCT/US2013/040098, entitled "Device, Method, and Graphical User Interface for Displaying Content Associated with a Corresponding Affordance," filed May 8, 2013; International Patent Application Serial No. PCT/US2013/040093, entitled "Device, Method, and Graphical User Interface for Transitioning Between Display States in Response to a Gesture," filed May 8, 2013; International Patent Application Serial No. PCT/US2013/040053, entitled "Device, Method, and Graphical User Interface for Selecting Object within a Group of Objects," filed May 8, 2013; U.S. Patent Application Ser. No. 61/778,211, entitled "Device, Method, and Graphical User Interface for Facilitating User Interaction with Controls in a User Interface," filed Mar. 12, 2013; U.S. Patent Application Ser. No. 61/778,191, entitled "Device, Method, and Graphical User Interface for Displaying User Interface Objects Corresponding to an Application," filed Mar. 12, 2013; U.S. Patent Application Ser. No. 61/778,171, entitled "Device, Method, and Graphical User Interface for Displaying Additional Information in Response to a User Contact," filed Mar. 12, 2013; U.S. Patent Application Ser. No. 61/778,179, entitled "Device, Method and Graphical User Interface for Scrolling Nested Regions," filed Mar. 12, 2013; U.S. Patent Application Ser. No. 61/778,156, entitled "Device, Method, and Graphical User Interface for Manipulating Framed Graphical Objects," filed Mar. 12, 2013; U.S. Patent Application Ser. No. 61/778,125, entitled "Device, Method, And Graphical User Interface for Navigating User Interface Hierarchies," filed Mar. 12, 2013; U.S. Patent Application Ser. No. 61/778,092, entitled "Device, Method, and Graphical User Interface for Selecting Object Within a Group of Objects," filed Mar. 12, 2013; U.S. Patent Application Ser. No. 61/778,418, entitled "Device, Method, and Graphical User Interface for Switching Between User Interfaces," filed Mar. 13, 2013; U.S. Patent Application Ser. No. 61/778,416, entitled "Device, Method, and Graphical User Interface for Determining Whether to Scroll or Select Content," filed Mar. 13, 2013; U.S. Patent Application Ser. No. 61/747,278, entitled "Device, Method, and Graphical User Interface for Manipulating User Interface Objects with Visual and/or Haptic Feedback," filed Dec. 29, 2012; U.S. Patent Application Ser. No. 61/778,414, entitled "Device, Method, and Graphical User Interface for Moving and Dropping a User Interface Object," filed Mar. 13, 2013; U.S. Patent Application Ser. No. 61/778,413, entitled "Device, Method, and Graphical User Interface for Selecting User Interface Objects," filed Mar. 13, 2013; U.S. Patent Application Ser. No. 61/778,412, entitled "Device, Method, and Graphical User Interface for Displaying Content Associated with a Corresponding Affordance," filed Mar. 13, 2013; U.S. Patent Application Ser. No. 61/778,373, entitled "Device, Method, and Graphical User Interface for Managing Activation of a Control Based on Contact Intensity," filed Mar. 12, 2013; U.S. Patent Application Ser. No. 61/778,265, entitled "Device, Method, and Graphical User Interface for Transitioning Between Display States in Response to a Gesture," filed Mar. 12, 2013; U.S. Patent Application Ser. No. 61/778,367, entitled "Device, Method, and Graphical User Interface for Moving a User Interface Object Based on an Intensity of a Press Input," filed Mar. 12, 2013; U.S. Patent Application Ser. No. 61/778,363, entitled "Device, Method, and Graphical User Interface for Transitioning Between Touch Input to Display Output Relationships," filed Mar. 12, 2013; U.S. Patent Application Ser. No. 61/778,287, entitled "Device, Method, and Graphical User Interface for Providing Feedback for Changing Activation States of a User Interface Object," filed Mar. 12, 2013; U.S. Patent Application Ser. No. 61/778,284, entitled "Device, Method, and Graphical User Interface for Providing Tactile Feedback for Operations Performed in a User Interface," filed Mar. 12, 2013; U.S. Patent Application Ser. No. 61/778,239, entitled "Device, Method, and Graphical User Interface for Forgoing Generation of Tactile Output for a Multi-Contact Gesture," filed Mar. 12, 2013; U.S. Patent Application Ser. No. 61/688,227, entitled "Device, Method, and Graphical User Interface for Manipulating User Interface Objects with Visual and/or Haptic Feedback," filed May 9, 2012; U.S. Provisional Patent Application Ser. No. 61/645,033, filed on May 9, 2012, entitled "Adaptive Haptic Feedback for Electronic Devices;" U.S. Provisional Patent Application Ser. No. 61/665,603, filed on Jun. 28, 2012, entitled "Adaptive Haptic Feedback for Electronic Devices;" and U.S. Provisional Patent Application Ser. No. 61/681,098, filed on Aug. 8, 2012, entitled "Adaptive Haptic Feedback for Electronic Devices;" U.S. Provisional Patent Application Ser. No. 62/044,894, filed on Sep. 2, 2014, entitled "Reduced-Size Interfaces for Managing Alerts;" U.S. Provisional Patent Application Ser. No. 62/044,979, filed on Sep. 2, 2014, entitled "Stopwatch and Timer User Interfaces;" U.S. Provisional Patent Application Ser. No. 62/026,532, "Raise Gesture Detection in a Device," filed Jul. 18, 2014; and U.S. patent application Ser. No. 14/476,700, "Crown Input for a Wearable Electronic Device," filed Sep. 3, 2014. The content of these applications is hereby incorporated by reference in their entirety.

FIELD

The present disclosure relates generally to computer user interfaces, and more specifically to context-specific user interfaces for indicating time.

BACKGROUND

Users rely on portable multifunction devices for keeping time, among a variety of other operations including running software applications. It is desirable to allow the user to access information through a single user interface while keeping the interface simple and intuitive to use. Further, a user may want to access different types of information, such as various aspects related to keeping time, or different application data points, in different contexts. It is therefore also desirable to allow the user to customize the user interface and the types of information provided through the user interface.

SUMMARY

Portable multifunction devices are able to provide many different types of information and interfaces to a user, and a user may wish to customize these user interfaces, and the types of information they provide, in different contexts. Therefore, context-specific user interfaces for keeping time are increasingly desirable.

Some techniques for managing (e.g., editing) context-specific user interfaces for indicating time using electronic devices, however, are generally cumbersome and inefficient. For example, existing techniques use a complex and time-consuming user interface, which may include multiple key presses or keystrokes. Existing techniques require more time than necessary, wasting user time and device energy. This latter consideration is particularly important in battery-operated devices.

Accordingly, the present invention provides, inter alia, the benefit of portable electronic devices with faster, more efficient methods and interfaces for managing context-specific user interfaces. Such methods and interfaces optionally complement or replace other methods for managing context-specific user interfaces. Such methods and interfaces reduce the cognitive burden on a user and produce a more efficient human-machine interface. Such methods and interfaces may also reduce the number of unnecessary, extraneous, repetitive, and/or redundant inputs, and may create a faster and more efficient user interface arrangement, which may reduce the number of required inputs, reduce processing power, and reduce the amount of time for which user interfaces need to be displayed in order for desired functions to be accessed and carried out. For battery-operated computing devices, such methods and interfaces conserve power and increase the time between battery charges.

The above deficiencies and other problems are reduced or eliminated by the disclosed devices, methods, and computer-readable media. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has hardware input mechanisms such as depressible buttons and/or rotatable input mechanisms. In some embodiments, the device has a graphical user interface (GUI), one or more processors, memory, and one or more modules, programs, or sets of instructions stored in the memory for performing multiple functions. In some embodiments, the user interacts with the GUI through finger contacts and gestures on the touch-sensitive surface and/or through rotating the rotatable input mechanism and/or through depressing hardware buttons. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

In some embodiments, a method of providing context-specific user interfaces comprises: at an electronic device with a display: receiving data representing a user input, and in response to receiving the data: displaying a user interface screen on the display, the user interface screen including a clock face indicating a first time, wherein the first time precedes a current time; and updating the user interface screen by animating the clock face to transition from indicating the first time to indicating the current time, wherein the animation represents the passage of time from the first time to the current time.

In some embodiments, a method of providing context-specific user interfaces comprises: at an electronic device with a touch-sensitive display: displaying on the touch-sensitive display a clock face that indicates current time, the clock face including: a user interface object comprising an hour hand and a minute hand, wherein the user interface object indicates the current time; one or more indications of an hourly timescale; and a stopwatch hand; receiving data representing a user input; and in response to receiving the data: substituting the one or more indications of an hourly timescale with an indication of a first timescale for the stopwatch hand; and animating the stopwatch hand to reflect passage of time.

In some embodiments, a method of providing context-specific user interfaces comprises: at an electronic device with a touch-sensitive display: displaying on the touch-sensitive display a user interface screen, the user interface screen including: a first affordance representing a simulation of a first region of the Earth as illuminated by the Sun at a current time; and a second affordance indicating the current time; receiving a user input; and in response to receiving the user input: rotating the simulation of the Earth to display a second region of the Earth as illuminated by the Sun at the current time.

In some embodiments, a method of providing context-specific user interfaces comprises: at an electronic device with a touch-sensitive display: displaying on the touch-sensitive display a user interface screen, the user interface screen comprising: a first portion of the user interface screen, the first portion indicating daytime; a second portion of the user interface screen, the second portion indicating nighttime; a user interface object, the user interface object representing a sinusoidal wave with a period representing a day, wherein the sinusoidal wave indicates a path of the Sun through the day, and wherein the sinusoidal wave is displayed in one or more of the first portion and the second portion; a first affordance representing the Sun, wherein the first affordance is displayed at a first position on the displayed sinusoidal wave, the first position indicating a current time of the day and whether the current time of the day is during daytime or nighttime; and a second affordance, the second affordance indicating the current time of day.

In some embodiments, a method of providing context-specific user interfaces comprises: at an electronic device with a touch-sensitive display: displaying a user interface screen on the display, the user interface screen including: a background based on an image, the background comprising a plurality of pixels, wherein a subset of the pixels are modified in appearance relative to the image such that the subset of pixels represents one or more of: a first user interface object indicating a date; and a second user interface object indicating a time of day.

In some embodiments, a method of providing context-specific user interfaces comprises: at an electronic device with a display: accessing a folder, the folder including two or more images; selecting from the folder a first image; and displaying on the display a user interface screen, the user interface screen comprising: a background based on the first image, the background comprising a plurality of pixels, wherein a subset of the pixels are modified in appearance relative to the image such that the subset of pixels represents one or more of: a first user interface object indicating a date; and a second user interface object indicating a time of day.

In some embodiments, a method of providing context-specific user interfaces comprises: at an electronic device with a touch-sensitive display: detecting a user input, wherein the user input is detected at a first time, and in response to detecting the user input: displaying a user interface screen, the user interface screen including: a first user interface object indicating the first time; and a second user interface object; and animating the second user interface object, the animation comprising a sequential display of a first animated sequence, a second animated sequence after the first animated sequence, and a third animated sequence after the second animated sequence, wherein the first animated sequence, the second animated sequence, and the third animated sequence are different; after animating the second user interface object, detecting a second user input, wherein the second user input is detected at a second time, wherein the second time is after the first time, and in response to detecting the second user input: accessing data representing the previously displayed second animated sequence; selecting a fourth animated sequence, wherein the fourth animated sequence is different from the first animated sequence and the second animated sequence; displaying a second user interface screen, the second user interface screen including: the first user interface object, wherein the first user interface object is updated to indicate the second time; and a third user interface object related to the second user interface object; and animating the third user interface object, the animation comprising a sequential display of the first animated sequence, the fourth animated sequence after the first animated sequence, and the third animated sequence after the fourth animated sequence.

In some embodiments, a method of providing context-specific user interfaces comprises: at an electronic device with a touch-sensitive display: detecting a user movement of the electronic device; and, in response to detecting the movement: displaying an animated reveal of a clock face, wherein the animation comprises: displaying an hour hand and a minute hand; and displaying a first hour indication; and after displaying the first hour indication, displaying a second hour indication, wherein the second hour indication is displayed on the clock face at a position after the first hour indication in a clockwise direction.

In some embodiments, a method of indicating time with a character-based user interface comprises: at an electronic device with a display and a touch-sensitive surface: displaying a character user interface object on the display, the character user interface object comprising representations of a first limb and a second limb, wherein the character user interface object indicates a first time by: indicating a first hour with the first limb and a first minute with the second limb; and updating the character user interface object to indicate a second time, wherein the character indicates the second time by: indicating a second hour with the second limb and a second minute with the first limb.

In some embodiments, a method of indicating time with a character-based user interface comprises: at an electronic device with a display and a touch-sensitive surface: displaying a character user interface object on the display, the character user interface object comprising a representation of a limb, the limb including: a first endpoint of the limb having a first position, wherein the first endpoint of the limb is an axis of rotation for the limb, and a second endpoint of the limb having a second position, wherein the position of the second endpoint of the limb indicates a first time value; and updating the character user interface object to indicate a second time value, wherein updating the character user interface object comprises moving the first endpoint of the limb to a third position, and moving the second endpoint of the limb to a fourth position to indicate the second time value.

In some embodiments, a method of indicating time with a character-based user interface comprises: at an electronic device with a display and a touch-sensitive surface: displaying a character user interface object on the display, the character user interface object comprising a representation of a limb, the limb including a first segment of the limb and a second segment of the limb, wherein the first segment of the limb connects a first endpoint of the limb to a joint of the limb, the first endpoint of the limb having a first position, and wherein the second segment of the limb connects a second endpoint of the limb to the joint of the limb, the second endpoint of the limb having a second position, wherein the joint of the limb is an axis of rotation for the second segment of the limb, and wherein the position of the second endpoint of the limb indicates a first time value, and updating the character user interface object to indicate a second time value, wherein updating comprises moving the second endpoint of the limb along the axis of rotation for the second segment of the limb to a third position to indicate the second time.

In some embodiments, a method of indicating time with a character-based user interface comprises: at an electronic device with a display and a touch-sensitive surface: displaying a character user interface object on the display, wherein the character user interface object indicates time; receiving first data indicative of an event; determining whether the event meets a condition; and in accordance with the determination that the event meets the condition: updating the displayed character user interface object by changing a visual aspect of the character user interface object.

In some embodiments, a method of indicating time with a character-based user interface comprises: at an electronic device with a display and a touch-sensitive surface: setting the display to an inactive state; receiving first data indicative of an event; in response to receiving the first data: setting the display to an active state; displaying a character user interface object on a side of the display; animating the character user interface object towards a center of the display; and displaying the character user interface at the center of the display in a position that indicates a current time.

In some embodiments, a method of providing context-specific user interfaces comprises: at an electronic device with a touch-sensitive display: a clock face; and an affordance wherein the affordance represents an application, wherein the affordance comprises a set of information obtained from the application, wherein the set of information is updated in accordance with data from the application, and wherein the affordance is displayed as a complication on the clock face; detecting a contact on the displayed affordance, and in response to detecting the contact: launching the application represented by the affordance.

In some embodiments, a method of providing context-specific user interfaces comprises: at an electronic device with a touch-sensitive display configured to detect intensity of contacts: displaying on the touch-sensitive display a user interface screen including a clock face; detecting a contact on the touch-sensitive display, the contact having a characteristic intensity, and in response to detecting the contact: determining whether the characteristic intensity is above an intensity threshold; and in accordance with a determination that the characteristic intensity is above the intensity threshold: entering a clock face edit mode of the electronic device; visually distinguishing the displayed clock face to indicate the clock face edit mode; and detecting a second contact on the touch-sensitive display, wherein the second contact is on the visually distinguished displayed clock face, and in response to detecting the second contact: visually indicating an element of the clock face for editing.

In some embodiments, a method of providing context-specific user interfaces comprises: at an electronic device with a touch-sensitive display configured to detect intensity of contacts: displaying on the touch-sensitive display a user interface screen including a clock face; detecting a contact on the touch-sensitive display, the contact having a characteristic intensity, and in response to detecting the contact: determining whether the characteristic intensity is above an intensity threshold; and in accordance with a determination that the characteristic intensity is above the intensity threshold: entering a clock face selection mode of the electronic device; visually distinguishing the displayed clock face to indicate the clock face selection mode, wherein the displayed clock face is centered on the display; and detecting a swipe on the touch-sensitive display, and in response to detecting the swipe: centering a second clock face on the display.

In some embodiments, a method of providing context-specific user interfaces comprises: at an electronic device with a touch-sensitive display and a rotatable input mechanism: displaying on the touch-sensitive display a user interface screen, the user interface screen including: a clock face; and an affordance on the clock face, the affordance indicating a first time of day; detecting a contact on the touch-sensitive display; and in response to detecting the contact: entering a user interaction mode of the electronic device; while the electronic device is in the user interaction mode, detecting a movement of the rotatable input mechanism, and in response to detecting the movement: updating the affordance to indicate a second time of day; detecting a second contact on the touch-sensitive display at the affordance indicating the second time, and in response to detecting the second contact: setting a user reminder for the second time of day.

In some embodiments, a method of providing context-specific user interfaces comprises: at an electronic device with a touch-sensitive display: displaying on the display a user interface screen, the user interface screen including a plurality of affordances, the plurality including a first affordance, wherein the first affordance indicates a clock face that includes: an indication of time; and an outline; detecting a contact on the displayed first affordance; and in response to detecting the contact: substituting the display of the user interface screen with a second user interface screen, wherein the substitution comprises retaining one of the one or more of the indication of time and the outline, wherein the retained indication of time or outline is displayed on the second user interface screen at a size larger than on the first user interface screen.

In some embodiments, a device comprises means for receiving data representing a user input; means responsive to receiving the data for displaying a user interface screen on a display, the user interface screen including a clock face indicating a first time, wherein the first time precedes a current time; and means for updating the user interface screen by animating the clock face to transition from indicating the first time to indicating the current time, wherein the animation represents the passage of time from the first time to the current time.

In some embodiments, a device comprises means for displaying a clock face on a touch-sensitive display that indicates current time, the clock face including: a user interface object comprising an hour hand and a minute hand, wherein the user interface object indicates the current time; one or more indications of an hourly timescale; and a stopwatch hand; means for receiving data representing a user input; means responsive to receiving the data for substituting the one or more indications of an hourly timescale with an indication of a first timescale for the stopwatch hand; and means for animating the stopwatch hand to reflect passage of time.

In some embodiments, a device comprises means for displaying on a touch-sensitive display a user interface screen, the user interface screen including: a first affordance representing a simulation of a first region of the Earth as illuminated by the Sun at a current time; and a second affordance indicating the current time; means for receiving a user input; and means responsive to receiving the user input for rotating the simulation of the Earth to display a second region of the Earth as illuminated by the Sun at the current time.

In some embodiments, a device comprises means for displaying on a touch-sensitive display a user interface screen, the user interface screen comprising: a first portion of the user interface screen, the first portion indicating daytime; a second portion of the user interface screen, the second portion indicating nighttime; a user interface object, the user interface object representing a sinusoidal wave with a period representing a day, wherein the sinusoidal wave indicates a path of the Sun through the day, and wherein the sinusoidal wave is displayed in one or more of the first portion and the second portion; a first affordance representing the Sun, wherein the first affordance is displayed at a first position on the displayed sinusoidal wave, the first position indicating a current time of the day and whether the current time of the day is during daytime or nighttime; and a second affordance, the second affordance indicating the current time of day.

In some embodiments, a device comprises means for displaying a user interface screen on a display, the user interface screen including: a background based on an image, the background comprising a plurality of pixels, wherein a subset of the pixels are modified in appearance relative to the image such that the subset of pixels represents one or more of: a first user interface object indicating a date; and a second user interface object indicating a time of day.

In some embodiments, a device comprises means for accessing a folder, the folder including two or more images; means for selecting from the folder a first image; and means for displaying on a display a user interface screen, the user interface screen comprising: a background based on the first image, the background comprising a plurality of pixels, wherein a subset of the pixels are modified in appearance relative to the image such that the subset of pixels represents one or more of: a first user interface object indicating a date; and a second user interface object indicating a time of day.

In some embodiments, a device comprises means for detecting a user input, wherein the user input is detected at a first time; means responsive to detecting the user input for displaying a user interface screen, the user interface screen including: a first user interface object indicating the first time; and a second user interface object; means for animating the second user interface object, the animation comprising a sequential display of a first animated sequence, a second animated sequence after the first animated sequence, and a third animated sequence after the second animated sequence, wherein the first animated sequence, the second animated sequence, and the third animated sequence are different; means for detecting a second user input, wherein the second user input is detected at a second time, wherein the second time is after the first time; means responsive to detecting the second user input for accessing data representing the previously displayed second animated sequence; means for selecting a fourth animated sequence, wherein the fourth animated sequence is different from the first animated sequence and the second animated sequence; means for displaying a second user interface screen, the second user interface screen including: the first user interface object, wherein the first user interface object is updated to indicate the second time; and a third user interface object related to the second user interface object; and means for animating the third user interface object, the animation comprising a sequential display of the first animated sequence, the fourth animated sequence after the first animated sequence, and the third animated sequence after the fourth animated sequence.

In some embodiments, a device comprises means for detecting a user movement of the device; means responsive to detecting the user movement for displaying an animated reveal of a clock face, wherein the animation comprises: displaying an hour hand and a minute hand; and displaying a first hour indication; and means for displaying a second hour indication, wherein the second hour indication is displayed on the clock face at a position after the first hour indication in a clockwise direction.

In some embodiments, a device comprises means for displaying a user interface screen on a display, the user interface screen including: a clock face; and an affordance wherein the affordance represents an application, wherein the affordance comprises a set of information obtained from the application, wherein the set of information is updated in accordance with data from the application, and wherein the affordance is displayed as a complication on the clock face; means for detecting a contact on the displayed affordance; and means responsive to detecting the contact for launching the application represented by the affordance.

In some embodiments, a device comprises means for displaying on a touch-sensitive display a user interface screen including a clock face; means for detecting a contact on the touch-sensitive display, the contact having a characteristic intensity; means responsive to detecting the contact for determining whether the characteristic intensity is above an intensity threshold; means for entering a clock face edit mode of the electronic device in accordance with a determination that the characteristic intensity is above the intensity threshold; means for visually distinguishing the displayed clock face to indicate the clock face edit mode; means for detecting a second contact on the touch-sensitive display, wherein the second contact is on the visually distinguished displayed clock face; and means responsive to detecting the second contact for visually indicating an element of the clock face for editing.

In some embodiments, a device comprises means for displaying on a touch-sensitive display a user interface screen including a clock face; means for detecting a contact on the touch-sensitive display, the contact having a characteristic intensity; means responsive to detecting the contact for determining whether the characteristic intensity is above an intensity threshold; means for entering a clock face selection mode of the electronic device in accordance with a determination that the characteristic intensity is above the intensity threshold; means for visually distinguishing the displayed clock face to indicate the clock face selection mode, wherein the displayed clock face is centered on the display; means for detecting a swipe on the touch-sensitive display; and means responsive to detecting the swipe for centering a second clock face on the display.

In some embodiments, a device comprises means for displaying a user interface screen on a touch-sensitive display, the user interface screen including: a clock face; and an affordance on the clock face, the affordance indicating a first time of day; means for detecting a contact on the touch-sensitive display; means responsive to detecting the contact for entering a user interaction mode of the electronic device; means for detecting a movement of the rotatable input mechanism while the device is in the user interaction mode; means responsive to detecting the movement for updating the affordance to indicate a second time of day; means for detecting a second contact on the touch-sensitive display at the affordance indicating the second time; and means responsive to detecting the second contact for setting a user reminder for the second time of day.

In some embodiments, a device comprises means for displaying a user interface screen on a display, the user interface screen including a plurality of affordances, the plurality including a first affordance, wherein the first affordance indicates a clock face that includes: an indication of time; and an outline; means for detecting a contact on the displayed first affordance; and means responsive to detecting the contact for substituting the display of the user interface screen with a second user interface screen, wherein the substitution comprises retaining one of the one or more of the indication of time and the outline, wherein the retained indication of time or outline is displayed on the second user interface screen at a size larger than on the first user interface screen.

In some embodiments, a method comprises: receiving data relating to a first subject matter; displaying first information relating to a first portion of the received data; detecting a first rotation of a rotatable input mechanism; and in response to detecting the first rotation of the rotatable input mechanism, supplementing the first information with second information relating to a second portion of the received data.

In some embodiments, a non-transitory computer-readable storage medium comprises instructions for: receiving data relating to a first subject matter; displaying first information relating to a first portion of the received data; detecting a first rotation of a rotatable input mechanism; and in response to detecting the first rotation of the rotatable input mechanism, supplementing the first information with second information relating to a second portion of the received data.

In some embodiments, a transitory computer-readable storage medium comprises instructions for: receiving data relating to a first subject matter; displaying first information relating to a first portion of the received data; detecting a first rotation of a rotatable input mechanism; and in response to detecting the first rotation of the rotatable input mechanism, supplementing the first information with second information relating to a second portion of the received data.

In some embodiments, a device comprises: a display; a rotatable input mechanism; one or more processors; and memory. In some embodiments, the memory stores instructions that, when executed by the one or more processors, cause the one or more processors to: receive data relating to a first subject matter; display first information relating to a first portion of the received data; detect a first rotation of the rotatable input mechanism; and, in response to detecting the first rotation of the rotatable input mechanism, supplementing the first information with second information relating to a second portion of the received data.

In some embodiments, a device comprises: means for receiving data relating to a first subject matter; means for displaying first information relating to a first portion of the received data; means for detecting a first rotation of the rotatable input mechanism; and means for, in response to detecting the first rotation of the rotatable input mechanism, supplementing the first information with second information relating to a second portion of the received data.

In some embodiments, an electronic device comprises: a display unit; a rotatable input mechanism unit; and a processing unit coupled to the display unit and the rotatable input mechanism unit. In some embodiments, the processing unit is configured to: receive data relating to a first subject matter; enable display on the display unit of first information relating to a first portion of the received data; detect a first rotation of the rotatable input mechanism unit; and, in response to detecting the first rotation of the rotatable input mechanism unit, supplement the first information with second information relating to a second portion of the received data.

In some embodiments, a method at an electronic device with a display comprises: obtaining first event data from a first application; obtaining second event data from a second application distinct from the first application; determining a first time value associated with the first event data and a second time value associated with the second event data and a relative order of the first time value and the second time value; and displaying, on the display, a user interface including: a representation of the first event data with a representation of the first time value; and a representation of the second event data with a representation of the second time value, wherein the representation of the first event data and the representation of the second event data are displayed with respect to each other in accordance with the relative order of the first time value and the second time value and the respective values of the first time value and the second time value.

In some embodiments, a non-transitory computer readable storage medium storing one or more programs, the one or more programs comprising instructions, which when executed by an electronic device with a touch-sensitive display cause the device to: obtain first event data from a first application; obtain second event data from a second application distinct from the first application; determine a first time value associated with the first event data and a second time value associated with the second event data and a relative order of the first time value and the second time value; and display, on the display, a user interface including: a representation of the first event data with a representation of the first time value; and a representation of the second event data with a representation of the second time value, wherein the representation of the first event data and the representation of the second event data are displayed with respect to each other in accordance with the relative order of the first time value and the second time value and the respective values of the first time value and the second time value.

In some embodiments, a transitory computer readable storage medium storing one or more programs, the one or more programs comprising instructions, which when executed by an electronic device with a touch-sensitive display cause the device to: obtain first event data from a first application; obtain second event data from a second application distinct from the first application; determine a first time value associated with the first event data and a second time value associated with the second event data and a relative order of the first time value and the second time value; and display, on the display, a user interface including: a representation of the first event data with a representation of the first time value; and a representation of the second event data with a representation of the second time value, wherein the representation of the first event data and the representation of the second event data are displayed with respect to each other in accordance with the relative order of the first time value and the second time value and the respective values of the first time value and the second time value.

In some embodiments, an electronic device, comprises: a touch-sensitive display; one or more processors; memory; and one or more programs, wherein the one or more programs are stored in the memory and configured to be executed by the one or more processors, the one or more programs including instructions, which when executed by the one or more processors, cause the device to: obtain first event data from a first application; obtain second event data from a second application distinct from the first application; determine a first time value associated with the first event data and a second time value associated with the second event data and a relative order of the first time value and the second time value; and display, on the display, a user interface including: a representation of the first event data with a representation of the first time value; and a representation of the second event data with a representation of the second time value, wherein the representation of the first event data and the representation of the second event data are displayed with respect to each other in accordance with the relative order of the first time value and the second time value and the respective values of the first time value and the second time value.

In some embodiments, an electronic device, comprises: means for obtaining first event data from a first application; means for obtaining second event data from a second application distinct from the first application; means for determining a first time value associated with the first event data and a second time value associated with the second event data and a relative order of the first time value and the second time value; and means for displaying, on a touch sensitive display of the device, a user interface including: a representation of the first event data with a representation of the first time value; and a representation of the second event data with a representation of the second time value, wherein the representation of the first event data and the representation of the second event data are displayed with respect to each other in accordance with the relative order of the first time value and the second time value and the respective values of the first time value and the second time value.

In some embodiments, an electronic device, comprises: a display unit configured to display a graphic user interface; a touch-sensitive surface unit configured to receive contacts; and a processing unit coupled to the display unit, the touch-sensitive surface unit, the rotatable and depressible input mechanism unit, and the button unit, the processing unit configured to: obtain first event data from a first application; obtain second event data from a second application distinct from the first application; determine a first time value associated with the first event data and a second time value associated with the second event data and a relative order of the first time value and the second time value; and display, on the display, a user interface including: a representation of the first event data with a representation of the first time value; and a representation of the second event data with a representation of the second time value, wherein the representation of the first event data and the representation of the second event data are displayed with respect to each other in accordance with the relative order of the first time value and the second time value and the respective values of the first time value and the second time value.

Thus, devices are provided with faster, more efficient methods and interfaces for managing (e.g., editing) context-specific user interfaces, thereby increasing the effectiveness, efficiency, and user satisfaction with such devices. Such methods and interfaces may complement or replace other methods for managing context-specific user interfaces.

DESCRIPTION OF THE FIGURES

FIG. 23 is a flow diagram illustrating a process for context-specific user interfaces.

FIG. 24 is a flow diagram illustrating a process for context-specific user interfaces.

FIG. 27B is a flow diagram illustrating a process for context-specific user interfaces.

FIG. 27C is a flow diagram illustrating a process for context-specific user interfaces.

FIGS. 54A-54E are flow diagrams illustrating methods of activating a mode of operation in accordance with some embodiments.

FIG. 57A is a flow diagram illustrating a process for context-specific user interfaces.

FIG. 57B is a flow diagram illustrating a process for context-specific user interfaces.

FIG. 57C is a flow diagram illustrating a process for context-specific user interfaces.

FIG. 57D is a flow diagram illustrating a process for context-specific user interfaces.

FIGS. 60A-60F are flow diagrams illustrating a process for supplementing displayed information in accordance with some embodiments.

DETAILED DESCRIPTION

Figure 1A:
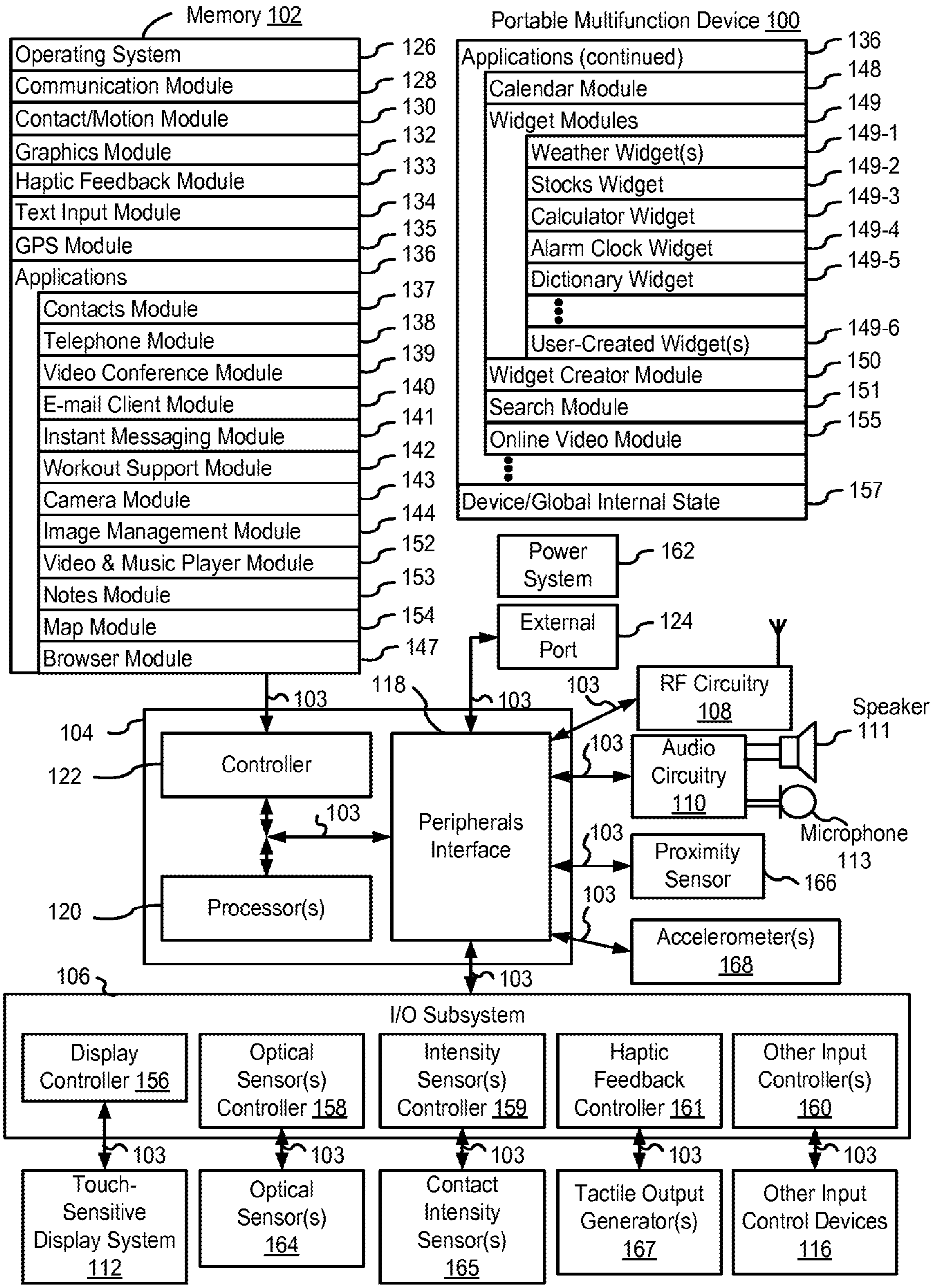
FIG. 1A is a block diagram illustrating a portable multifunction device with a touch-sensitive display in accordance with some embodiments.

The following description sets forth exemplary methods, parameters and the like. It should be recognized, however, that such description is not intended as a limitation on the scope of the present disclosure but is instead provided as a description of exemplary embodiments.

As discussed above, a user may customize context-specific user interfaces for keeping time and receiving certain types of information. It is challenging to provide the user a multitude of options for customizing such interfaces while providing highly usable interfaces. Moreover, it is also challenging to present options for customizing numerous variables such as color, display density, complications, and so forth in a way that is readily comprehensible and intuitive to the user. Context-specific user interfaces, and cohesive methods for allowing user customization of such interfaces, are highly desirable for portable multifunction devices.

Below, FIGS. 1A-1B, 2, 3, 4A-4B, and 5A-5B provide a description of exemplary devices for performing the techniques for providing context-specific user interfaces. FIGS. 6-19 illustrate exemplary context-specific user interfaces. The user interfaces in the figures are also used to illustrate the processes described below, including the processes in FIGS. 20-33.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
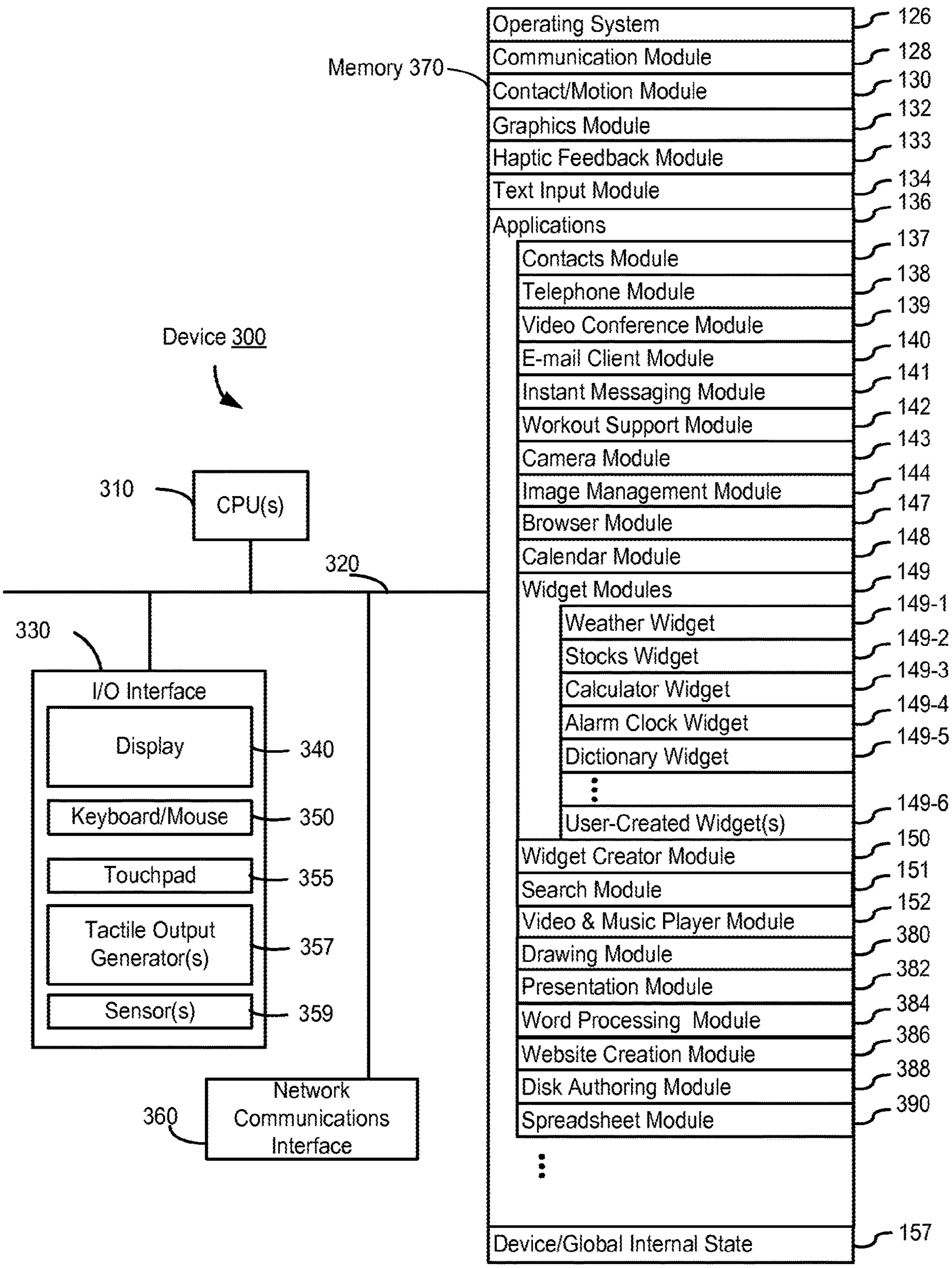
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, “instant messaging” refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
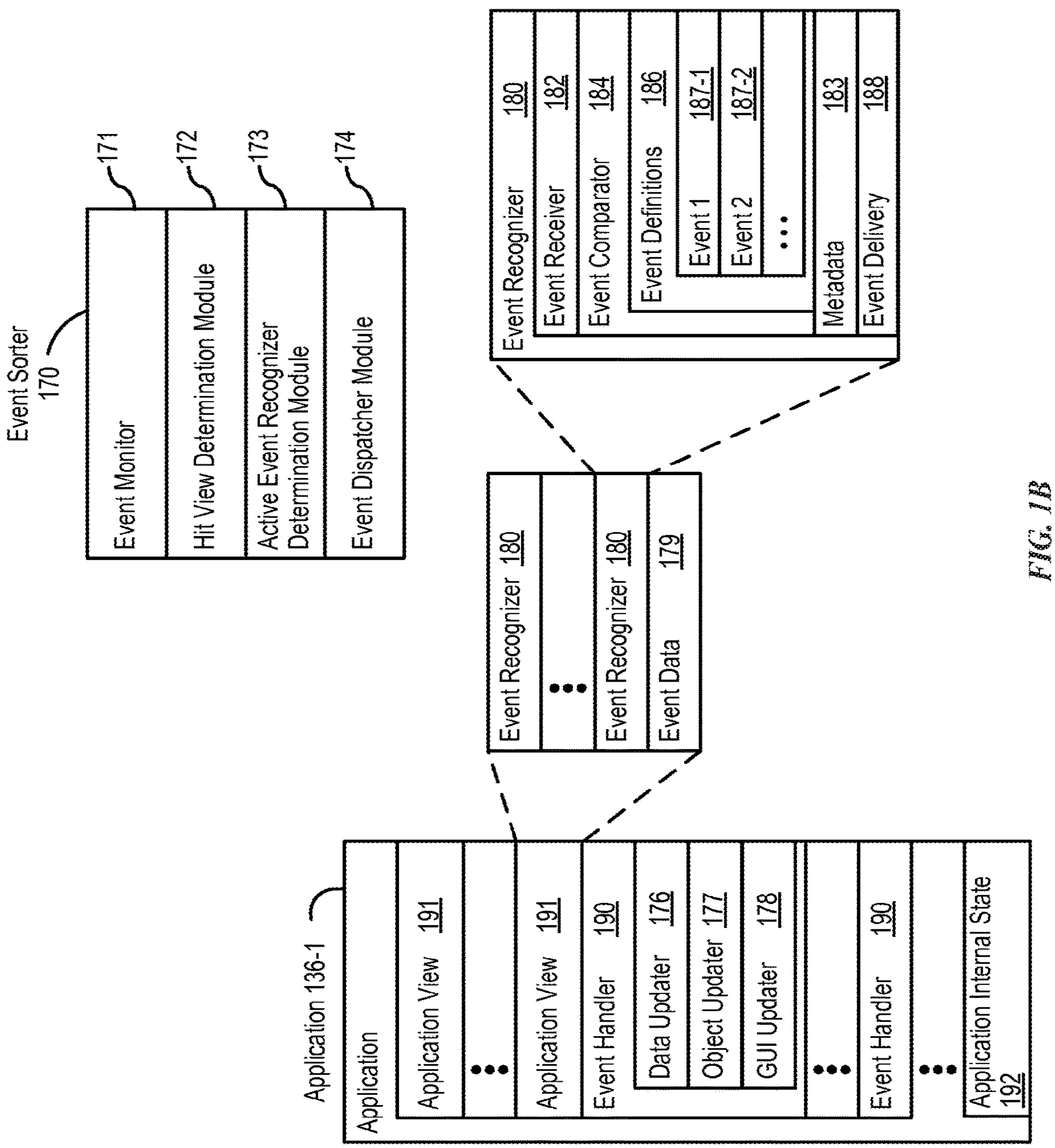
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
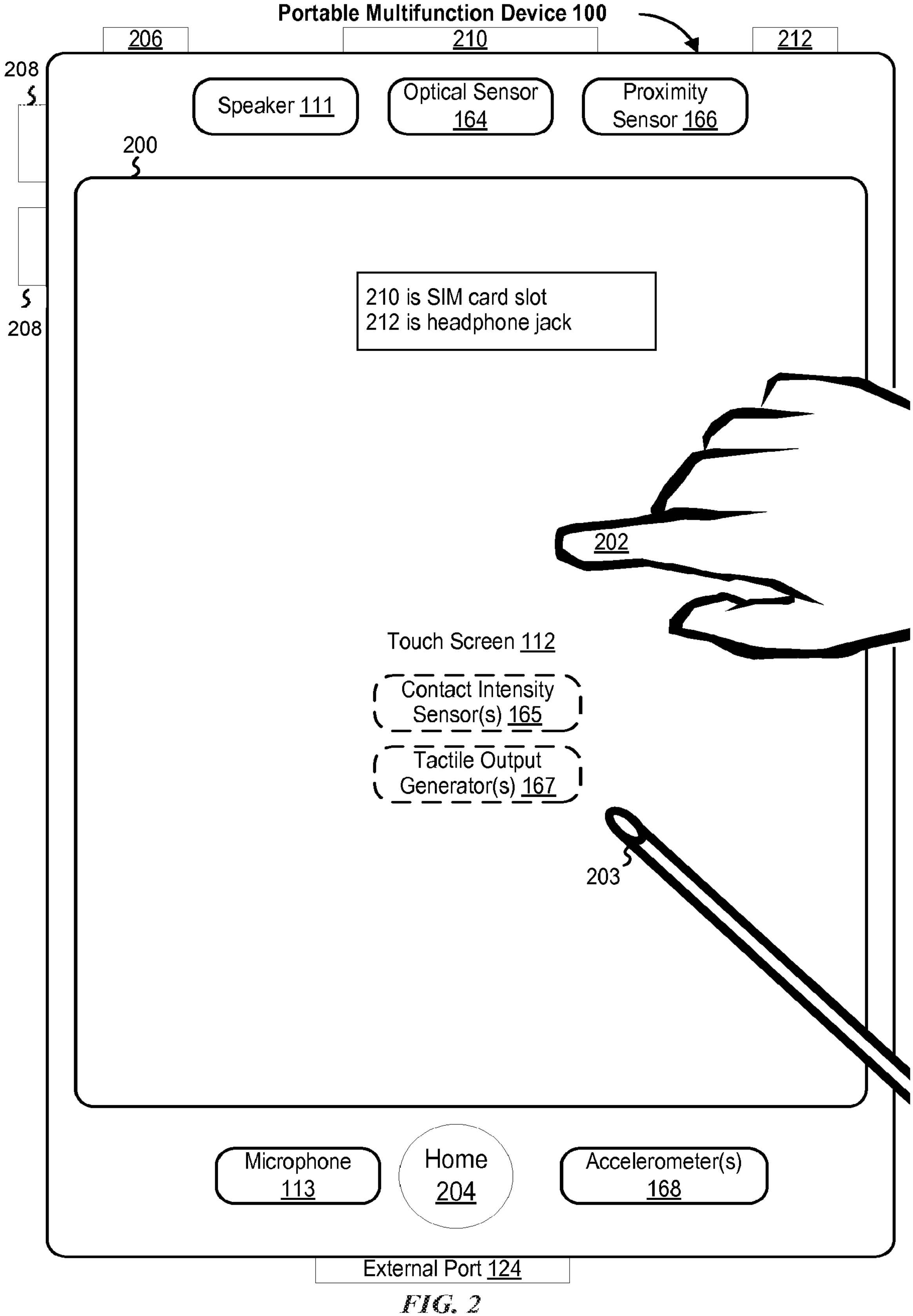
FIG. 2 illustrates a portable multifunction device having a touch-sensitive display in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
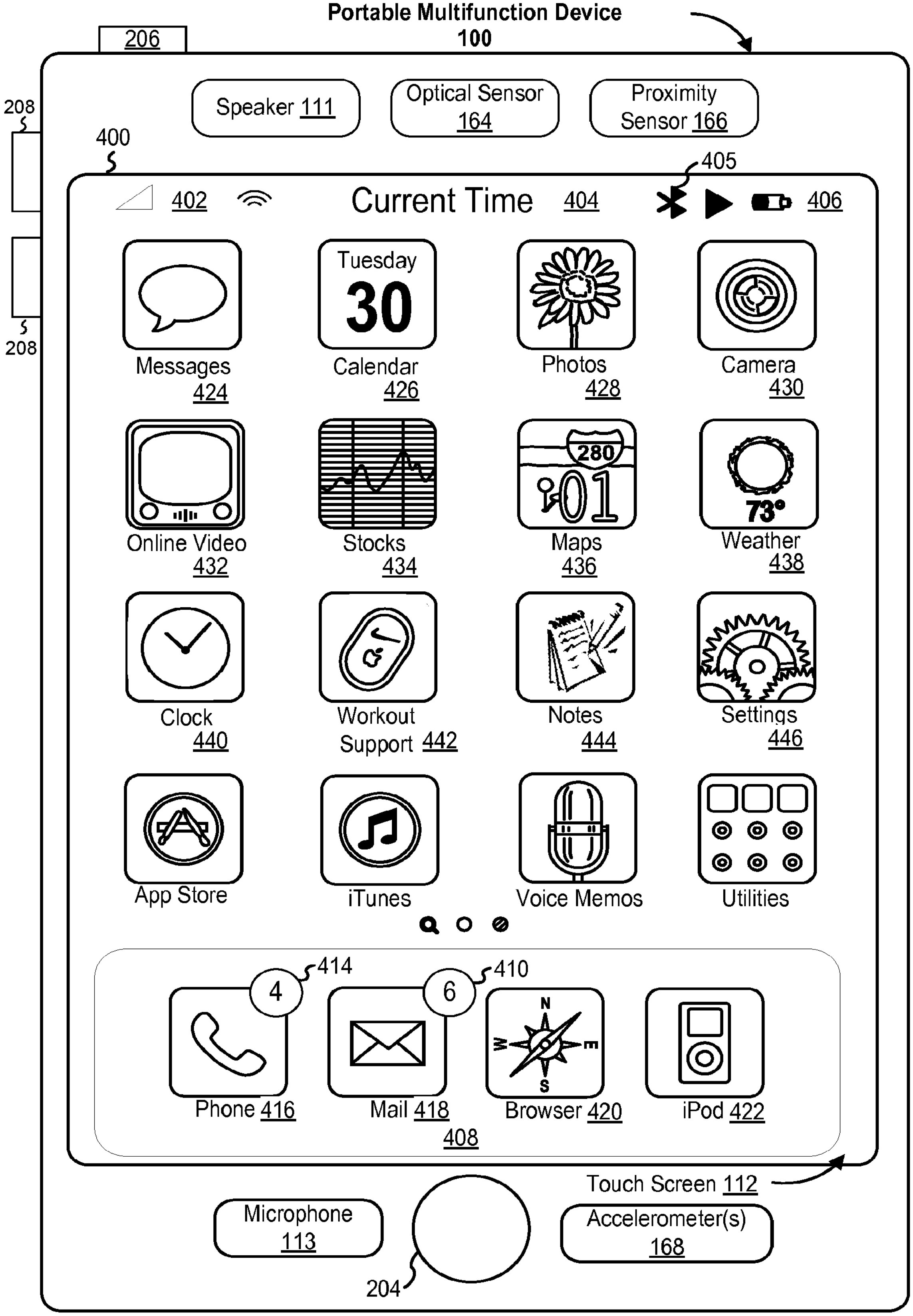
FIGS. 4A and 4B illustrate an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
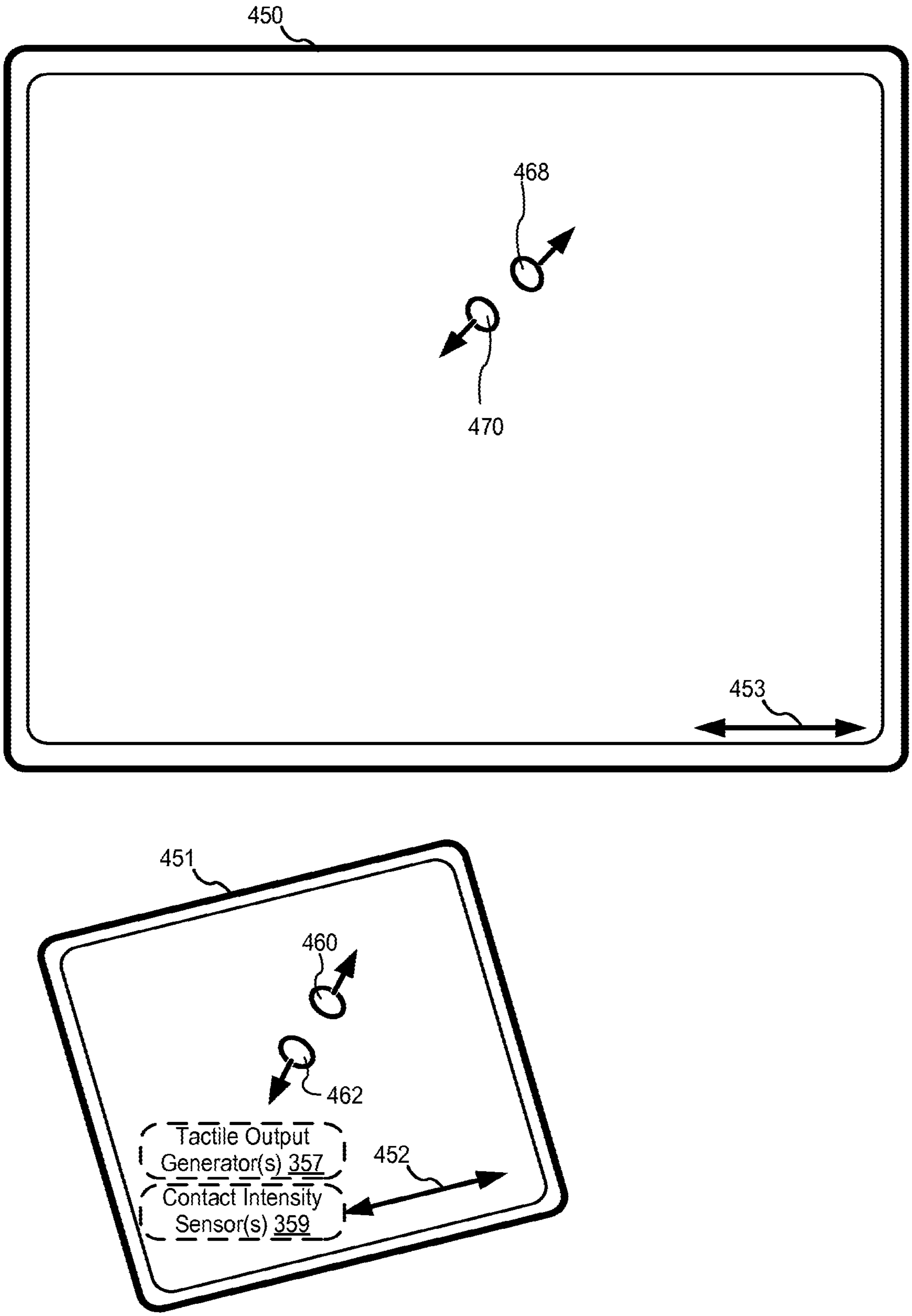

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
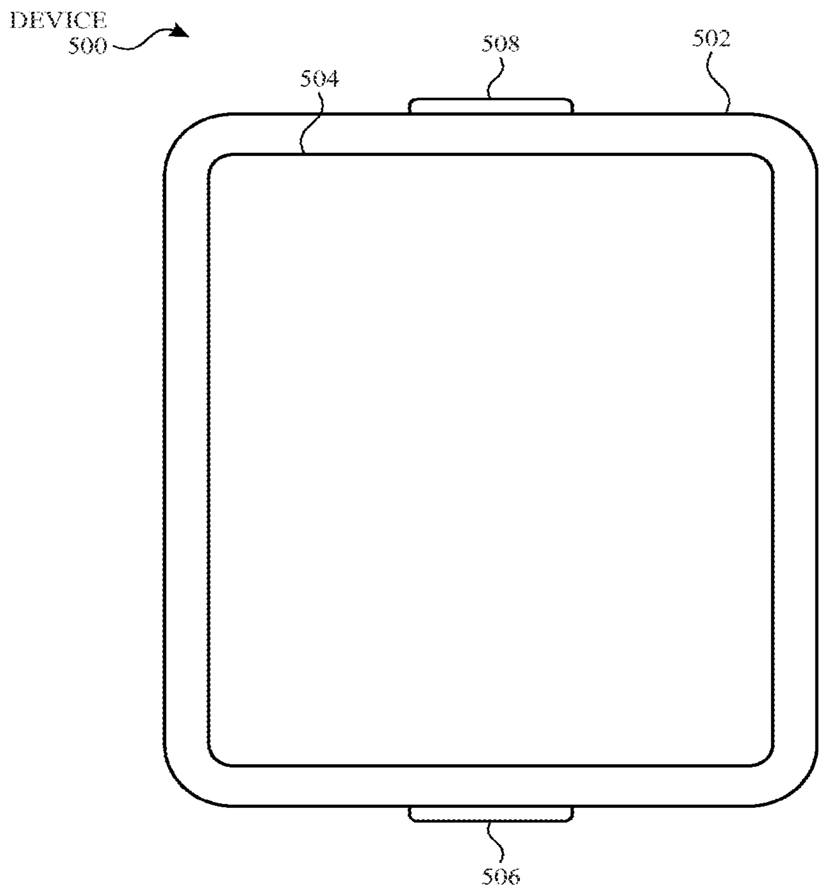
FIG. 5A is a block diagram illustrating a portable multifunction device with a touch-sensitive display and a rotatable and depressible input mechanism in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
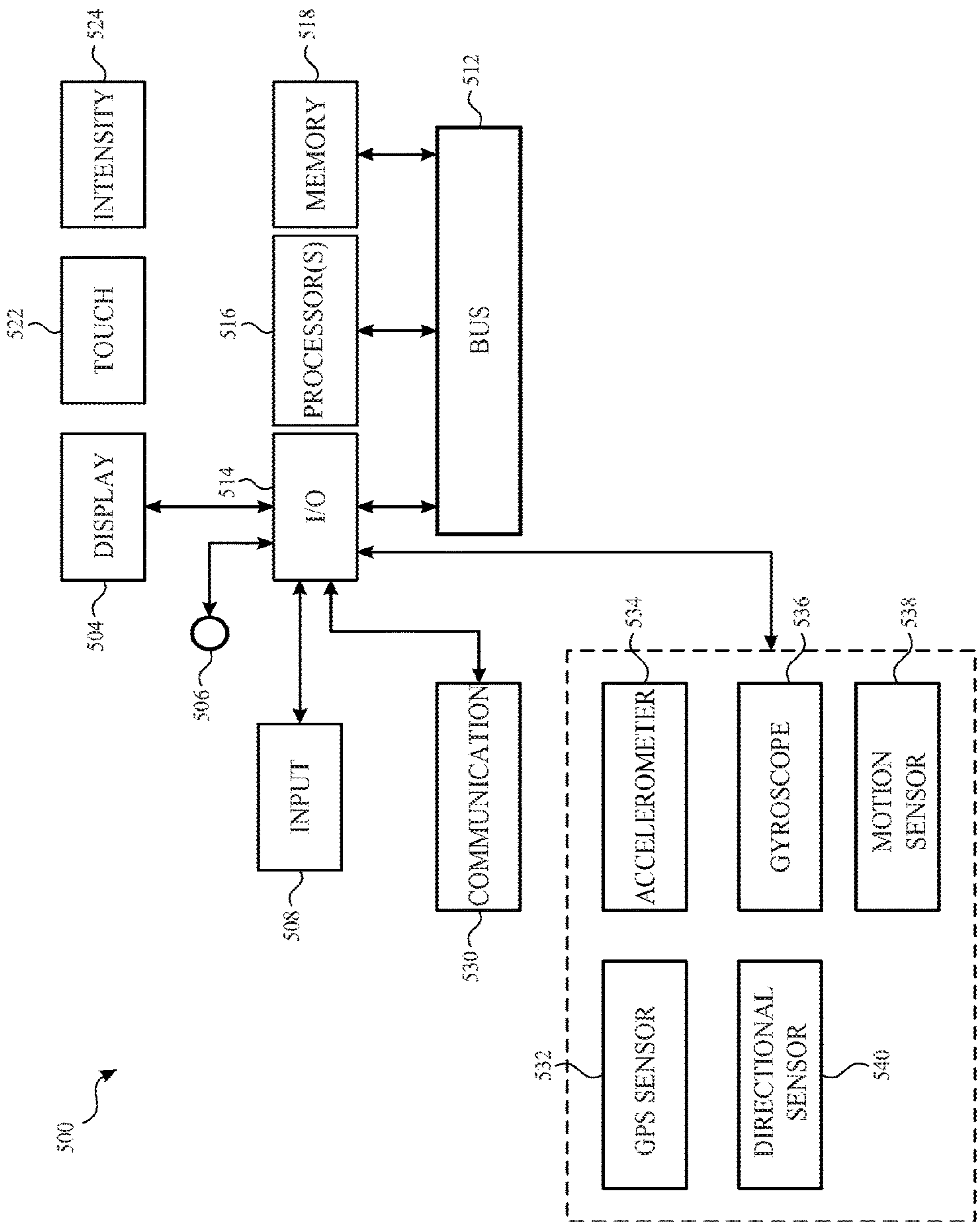
FIG. 5B illustrates a portable multifunction device having a touch-sensitive display and a rotatable and depressible input mechanism in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 2000-3300 (FIGS. 20-33). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term “characteristic intensity” of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a “light press” input. An increase of characteristic intensity of the contact from an intensity below the deep press intensity threshold to an intensity above the deep press intensity threshold is sometimes referred to as a “deep press” input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a “down stroke” of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an “up stroke” of the respective press input).

In some embodiments, the device employs intensity hysteresis to avoid accidental inputs sometimes termed “jitter,” where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the term "open application" or "executing application" refers to a software application with retained state information (e.g., as part of device/global internal state 157 and/or application internal state 192). An open or executing application may be any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

1. Context-Specific User Interfaces

Attention is now directed towards embodiments of context-specific user interfaces ("UP") and associated processes that may be implemented on a multifunction device with a display and a touch-sensitive surface, such as devices 100, 300, and/or 500 (FIGS. 1A, 3A, and/or 5A).

The following examples illustrate exemplary embodiments of context-specific user interfaces. Described herein are overall concepts related to customizable context-specific user interfaces. It is noted that the context-specific user interfaces described herein are editable in a number of ways. A user interface may display or otherwise indicate various types of information related to time, and the type(s) of information may be customizable by the user. A user interface may include aspects such as colors, density of display, and complications (or lack of complications) that are also customizable. As used here, consistent with its accepted meaning in art, a complication refers to any clock face feature other than those used to indicate the hours and minutes of a time (e.g., clock hands or hour/minute indications). Complications may provide different types of information to a user, such as data obtained from an application, and the information conveyed to a user by a complication is also customizable, as described below.

These combinatorial features result in many thousands, if not more, of available context-specific user interfaces. Since describing each of these permutations is not practical, particular aspects are highlighted with particular context-specific user interfaces, but these exemplary descriptions are in no way intended to limit such aspects to such context-specific user interfaces, as specific aspects may be used in other context-specific user interfaces, and specific context-specific user interfaces may have other aspects. These embodiments are meant to illustrate the overall concepts presented, but a skilled artisan will recognize that numerous other embodiments are possible within the scope of the techniques described herein.

Figure 6A:
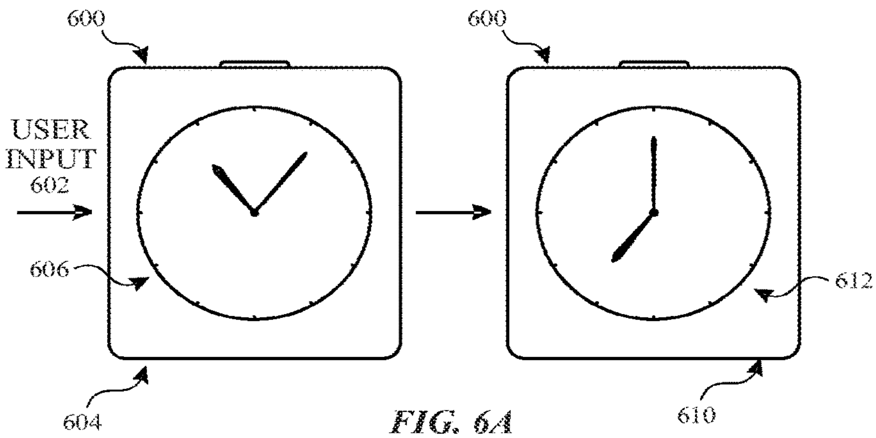
FIGS. 6A and 6B illustrate exemplary context-specific user interfaces.

FIG. 6A shows an exemplary context-specific user interface that may be operated on device 600. Device 600 may be device 100, 300, or 500 in some embodiments. The electronic device has a display (e.g., 504).

A user keeping track of the time of day may wish to gain some sense of how much time has elapsed since a particular event. For example, a user may wish to know how much time has elapsed since the last time the user viewed the time, or how much time has elapsed since a particular time of day, like morning. In addition to viewing a clock face, the user may wish to receive additional visual cues that reinforce the perception of elapsed time.

As shown in FIG. 6A, the device receives data representing user input 602. In response to receiving the data, the device displays user interface screen 604 on the display. Screen 604 includes clock face 606. In the example illustrated in FIG. 6A, the time is currently 7:00. Clock face 606 initially indicates a first time (10:05 as shown in FIG. 6A) that precedes the current time. Device 600 updates screen 604 by animating the clock face to transition from indicating the first time to indicating the current time. Updated screen 604 is depicted as screen 610, which displays clock face 612. Clock face 612 has been updated to indicate the current time. The animation from screens 604 to 610 represents the passage of time from the first time to the current time. In some embodiments, screen 604 and/or 610 may also include an indication of the date.

As described above, the context-specific user interface exemplified in FIG. 6A first displays the clock face indicating a first time. The first time may be determined based on different criteria. In some embodiments, the device receives second data representing a time of a previous user movement of the electronic device (e.g., a movement of the device such as a lowering of the user's wrist, if the device is wearable, or other movement indicative that the user is no longer actively viewing the display). The time of the previous user movement of the device may be the last time the user looked at the device, or the last time the display of the device was turned off, prior to receiving the data representing user input 602. The time of the previous user movement of the electronic device is then shown as the first time indicated by the clock face. For example, in FIG. 6A, 10:05 depicted by clock face 606 may be the time of a previous user movement of the device, indicating the time of a previous user interaction. In these examples, when the user interface screen updates, it provides the user an indication of how much time has elapsed since the previous user interaction (e.g., the last time the user looked at device 600).

In other embodiments, the first time may be based on a predetermined interval of time. For example, the first time may precede the current time by a first duration, and the first duration may be a predetermined duration before the current time. That is to say, rather than being based on a user interaction, the first time indicated by the clock face may be based on a predetermined or fixed duration before the current time.

In some embodiments, the predetermined duration is 5 hours. In response to user input, the clock face may depict a time 5 hours before the current time, then animate the clock face to transition from indicating the first time to indicating the current time. For example, if the current time is 6:00, the device may, in response to user input, display a clock face showing 1:00 that is animated to transition from 1:00 to 6:00.

In other embodiments, the first time may be based on a predetermined time of day. In this case, the device may begin the animation by indicating the same time of day (i.e., the first time) no matter the current time, and then animate the clock face until it reaches the current time. For example, the first time may be morning (e.g., 8:00 am). In this example, if the current time is 6:00, the device may, in response to user input, display a clock face showing 8:00 that is animated to transition from 8:00 to 6:00.

Regardless of how the first time is determined, in some embodiments, the clock face may be animated for a period of time indicative of the duration between the first time and the current time. That is to say, the length of the animation may be roughly proportional to the length of this duration. The length of animation may not be precisely proportional to the first duration, but rather it may convey to the user a general indication of an approximate length of the time. To illustrate using the examples described above, the clock face may be animated for a longer period of time if transitioning from 8:00 to 6:00 than it is if transitioning from 3:00 to 6:00. This may be particularly useful if the duration is variable, such as if the duration is based on the time between user interactions. In this case, a user will immediately comprehend that the time elapsed between interactions is longer if the animation of the clock face is longer, or that the time between interactions is shorter if the animation of the clock face is shorter.

In other embodiments, the clock face is animated for a period of time independent of the first duration. That is to say, the length of the animation is not proportional to the duration between the first time and the current time. In some embodiments, the length of animation may be the same for each animation. To illustrate using the examples described above, the clock face may be animated for the same period of time regardless if transitioning from 8:00 to 6:00 or from 3:00 to 6:00. This may be helpful to reduce the time a user is viewing the transition. Alternatively, the clock face is animated for a different period of time if transitioning from 8:00 to 6:00 compared to transitioning from 3:00 to 6:00, but the periods of time may not related to the first duration.

Figure 6B:
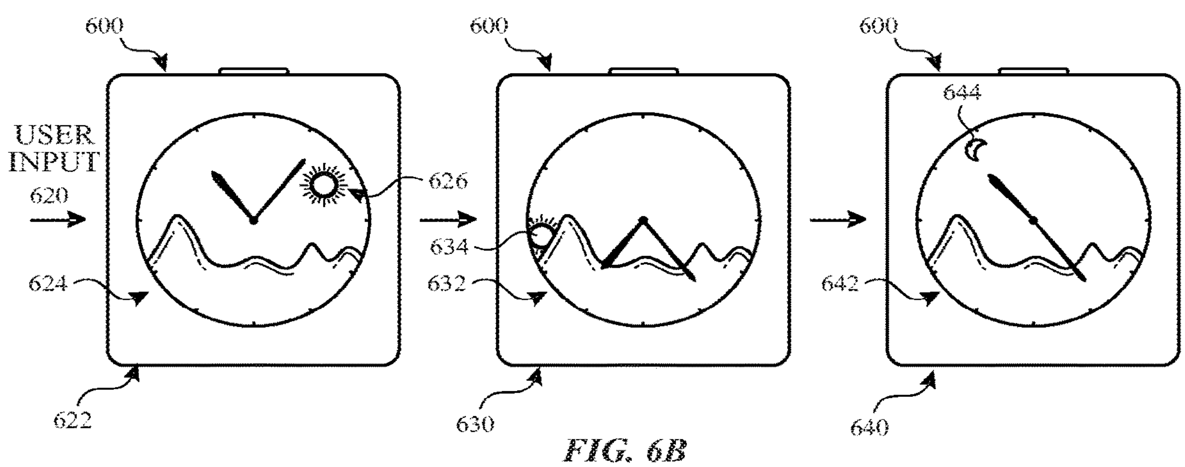

FIG. 6B illustrates optional features of this context-specific user interface. In response to data representing user input 620, device 600 displays user interface screen 622, which includes clock face 624. In this example, the current time is 10:25. Clock face 624 indicates a first time (in this example, 10:05). As a background, clock face 624 also displays an image of a mountain scene that is representative of the first time. For example, as shown in FIG. 6B, clock face 624 shows a morning view of the mountain scene (see, e.g., the position of sun 626 in the sky). Therefore, a user viewing clock face 624 understands the time based on the clock face itself and the background, which also represents the time indicated by the clock face. Note that this provides additional information to the user because the user understands that the indicated time is 10:05 am, not 10:05 pm, by the display of the scene.

In some embodiments, the device accesses an image of a scene that is representative of the time indicated by the clock face. An image of a scene that is representative of a time may connote to the user a similar time of day, in conjunction with the time indicated by the clock face. The image of the scene need not connote the precise time indicated by the clock face, nor does it need to be strictly linked to the time of day at the location of the scene (this will be discussed in greater detail below). In some embodiments, the image of the scene is an image captured at substantially the same time of day as the current time (i.e., the time of day when the image was taken at the scene). In other embodiments, the image of the scene is an image captured at a different time of day, as compared to the current time.

In some embodiments, the image of the scene may depict, for example, a city, beach, desert, park, lake, mountain, or valley. In some embodiments, the scene may be recognizable to the user, such as a scene of Yosemite Valley or Big Ben.

Device 600 then displays screens 630 and 640. Screen 630 is optional, as described below, and includes clock face 632, which is indicating a time between the first time and the current time. This intermediate time is further represented on clock face 632 by the background (see, e.g., setting sun 634). Screen 640 includes clock face 642, which depicts the current time. Clock face 642 also displays a background that represents the current time (see, e.g., moon 644).

Therefore, in some embodiments, and in response to receiving data representing user input 620, the device accesses a first image of a scene representative of the first time (e.g., the background of clock face 624), accesses a second image of the scene representative of the current time (e.g., the background of clock face 642), and in response to receiving the data representing the user input, successively displays the first image of the scene and the second image of the scene.

The successive display indicates the passage of time from the first time to the current time. The device may include a series of images for a particular scene (e.g., time lapse images), each depicting a different time of day, such that any first time or current time depicted by the clock face has a corresponding image of the scene that is representative of the depicted time. In some embodiments, the first image of the scene and the second image of the scene are displayed as backgrounds on the user interface screen.

In some embodiments, the device accesses a sequence of images of a scene that includes a first image of the scene representative of the first time (e.g., the background of clock face 624), one or more second images of the scene representative of one or more times between the first time and the current time (e.g., the background of clock face 632), and a third image of the scene representative of the current time (e.g., the background of clock face 642). In response to receiving the data representing user input 620, the device displays the sequence of images of the scene by animating the sequence of images to indicate the passage of time from the first time to the current time (e.g., like a flipbook). In some embodiments, the scene is user-designated (e.g., the device may store a set of time lapse images for different scenes, and the user may select the scene to be displayed).

As shown in FIG. 6B, device 600 sequentially displays screens 622, 630, and 640 to animate the displayed, respective backgrounds, thereby animating the image of the scene like a flipbook to indicate the passage of time. In some embodiments, the transition from screen 622 to 630 to 640 may also be animated, e.g., by animating the hands of the clock face to rotate in a clockwise manner, and/or by animating the display of the images of the scene, as with a flipbook. If the clock face instead or additionally depicts a representation of a digital clock, the numerical indications of the hour and the minute may be animated in some fashion to depict the passage of time. By displaying both the animated clock face and the animated image(s) of the scene, the device provides the user a clearer and readily distinguishable indication of the time between the first time and the current time.

In some embodiments, device 600 has a location sensor (e.g., GPS sensor 532 and/or GPS module 135), and the device obtains a current location of the device from the location sensor. The first image of the scene represents the first time at the current location, and the second image or the third image of the scene (e.g., whichever is representative of the current time) represents the current time at the current location. That is to say, the indicated passage of time reflects day/night hours at the current location. For example, if the user is at a location near the Arctic Circle, the current day may have daytime hours close to 24 hours (e.g., midnight sun). In this example, the images indicating the first time and the current time may all be daytime images of the scene (e.g., Yosemite Valley), even if the first time and the current time are separated by a long period of time. Therefore, the images of the scene may be representative of the depicted time(s) at the current location, but they may not be representative of the depicted time(s) at the location of the scene. This concept allows the device to display a context-specific user interface for depicting the passage of time at the current location and enhances a user's interaction with the device, since the animation is grounded in the user's experience (e.g., perception of time) at the current location.

In some embodiments, the device displays a user interface object on the user interface screen at a first position based on the first time. In some embodiments, the position may be based on a position along the clock face, like an hour indication (e.g., 6 o'clock position at the lower center of the display). In some embodiments, the position may be based on a position across a horizon, such as a position of the Sun or the Moon. For example, in FIG. 6B, the position of sun 626 indicates the first time because it represents the sun in the scene at a position in the east just short of high noon.

In some embodiments, the device animates the user interface object by moving the user interface object from the first position to a second position on the user interface screen, where the second position is based on the current time. Moving the user interface object from the first position to a second position indicates the passage of time from the first time to the current time. As shown in FIG. 6B, sun 626 moves across the sky in the sequence of images of the scene (cf. sun 626 and sun 634). The user interface object then depicts moon 644 at a position in the night sky indicating the current time. In some embodiments, the user interface object is a graphical representation of a sun (e.g., 626 and 634). In some embodiments, the user interface object is a graphical representation of a moon (e.g., 644).

In any of the embodiments described above, the user input may include a movement of the device. For example, a movement of the device could be raising of the user's wrist (if the device is wearable), or other movement indicative of the user raising the device to view the display. These movements could be detected, for example, by using an accelerometer (e.g., 534), a gyroscope (e.g., 536), a motion sensor (e.g., 538), and/or a combination thereof. In any of the context-dependent faces described herein, a movement of the device may be a user input that activates the display.

Further, in any of the context-dependent faces described herein, a movement of the device such as a lowering of the user's wrist (if the device is wearable) or other movement indicative that the user is no longer actively viewing the display, or a lack of a movement of the device such as raising of the user's wrist (if the device is wearable) or other movement indicative of the user raising the device to view the display, may be a user input that causes the device to turn off the display.

In other embodiments, the device may have a touch-sensitive display or touch-sensitive surface (e.g., touchpad 355 in FIG. 3, touch-sensitive surface 451 in FIG. 4B, and/or touchscreen 504), and the user input may be a contact on the touch-sensitive display.

Figure 7A:
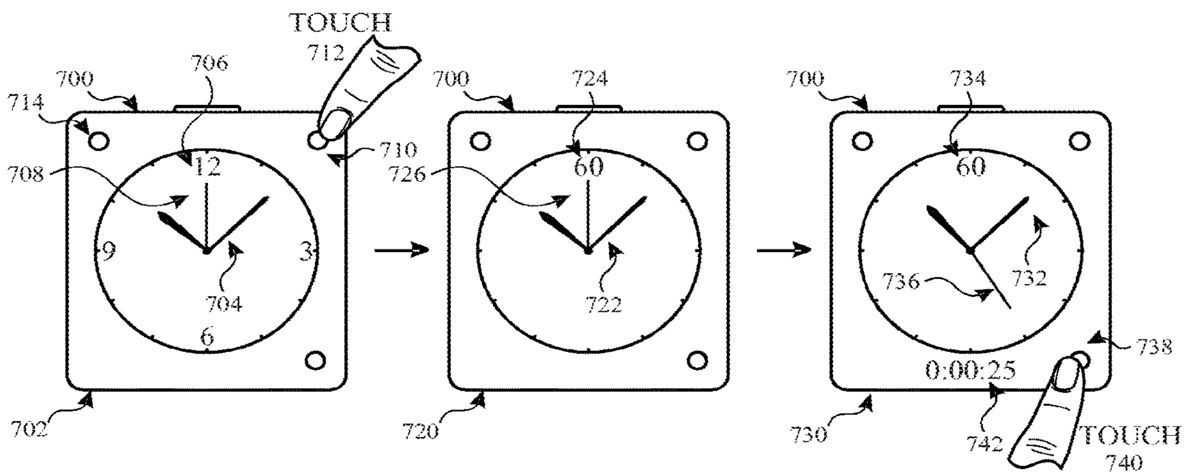
FIGS. 7A and 7B illustrate exemplary context-specific user interfaces.

Attention is now directed to the context-specific user interface shown in FIG. 7A. FIG. 7A shows exemplary context-specific user interfaces that may be operated on device 700. Device 700 may be device 100, 300, or 500 in some embodiments. The electronic device has a touch-sensitive display (e.g., touchscreen 504).

A user may wish to keep track of the time of day while also accessing a stopwatch function. For example, in contexts such as running or cycling, a user may wish to operate a stopwatch, record laps, and still maintain a view of the time of day.

As shown in FIG. 7A, device 700 displays a clock face that indicates current time, as depicted on user interface screen 702, on the touch-sensitive display. The clock face includes hour hand and minute hand 704. The clock face also includes one or more indications of an hourly timescale (e.g., numbers 12, 1, 2, 3, and/or tick marks or other visual indicators displayed at the corresponding positions on the clock face), such as 12 o'clock indicator 706. The clock face further includes stopwatch hand 708 (which, in some embodiments described below, also serves as a seconds hand. Note that, as used herein, the term seconds hand refers to a hand on a clock face that indicates seconds, not a second hand of two hands on a clock face).

As exemplified in FIG. 7A, device 700 receives user input, which in this case is touch 712 on start affordance 710. In response, the device replaces the 12 o'clock indicator 706 with stopwatch timescale indicator 724, as shown on screen 720. Stopwatch indicator 724 shows that the stopwatch timescale is a 60 second timescale. A timescale for the stopwatch hand may refer to the amount of time needed for the stopwatch hand to complete one full revolution around the displayed clock face. Note that the clock face on screen 720 includes hour hand and minute hand 722 and stopwatch hand 726, which are the same as hour hand and minute hand 704 and stopwatch hand 708.

Further in response to touch 712, device 700 animates stopwatch hand 726 to reflect passage of time, as shown by comparing screen 720 and 730. As shown on screen 730, the stopwatch hand has moved to a second position on the clock face (note the position of stopwatch hand 736), indicating the passage of time. Given that indicator 734 shows that the stopwatch timescale is 60 seconds, the position of stopwatch hand 736 indicates that 25 seconds have passed. As shown in FIG. 7A, the user accesses this information by touch 740 on lap affordance 738, which causes the display of time 742, indicating the time elapsed since touch 712. Note that hour hand and minute hand 732 are the same as 722 and 704, and these two hands have not changed position in the last 25 seconds. In this example, the hour hand and minute hand are indicating the same time of day (e.g., 10:10) throughout screens 702, 720, and 730.

Stated another way, the device displays the time of day with the hour hand and the minute hand, and it additionally displays a stopwatch hand. In response to receiving data representing user input, the indication(s) of the hour are replaced with indication(s) of a first timescale of the stopwatch hand, but the hour hand and the minute hand continue to indicate the time of day, even though the hour indication(s) have been replaced. This allows the user to view a stopwatch and the time of day simultaneously, while showing that the stopwatch has started and indicating the timescale for the stopwatch. Also in response to receiving the data, the device animates the stopwatch hand to reflect passage of time.

In some embodiments, while animating the stopwatch hand to reflect the passage of time, the device receives second data representing a second user input, and in response to receiving the second data, the device may cease the animation of the stopwatch hand. For example, this may function similar to a "stop" function for the stopwatch.

In some embodiments, the device may display on the touch-sensitive display a first affordance representing a start/stop function (e.g., affordance 710). The first data representing the first user input (e.g., touch 712) and the second data representing the second user input both represent contacts on the displayed first affordance. In other embodiments, the device may display separate affordances for the stopwatch start and stopwatch stop functions.

In some embodiments, the device may display on the touch-sensitive display a second affordance representing a lap function (e.g., affordance 738). The devices receives third data representing a contact on the displayed second affordance after receiving the first data (e.g., after invoking the start function) and before receiving the second data (e.g., before invoking the stop function). In response to receiving the third data, the device displays a third numerical indication of elapsed time between receiving the first data and receiving the third data. For example, this may function similar to a "lap" function for the stopwatch that causes a display of the time elapsed since invoking the start function. As described above, this feature is illustrated on screen 730.

In some embodiments, the device may display on the touch-sensitive display a third affordance representing a stopwatch application, which is depicted as affordance 714 on screen 702. The device receives fourth data representing a contact on the displayed third affordance, and in response to receiving the fourth data, the device launches the stopwatch application. This allows the user to access additional information and/or functionality related to the stopwatch feature directly from this context-specific user interface. In one embodiment, the stopwatch application is an application as described in related application: U.S. Provisional Patent Application Ser. No. 62/044,979, filed on Sep. 2, 2014, entitled "Stopwatch and Timer User Interfaces."

In some embodiments, the first timescale for the stopwatch hand may be 60 seconds, 30 seconds, 6 seconds, or 3 seconds. In some embodiments, the movement of the stopwatch hand is animated at a rate based on the first timescale for the stopwatch hand. For example, the stopwatch hand may move faster if the timescale is 3 seconds than if the timescale is 60 seconds. This allows the stopwatch hand to complete a full revolution around the clock face in the amount of time depicted by the first timescale.

In some embodiments, the device may substitute the one or more indications of an hourly timescale with an indication of a first timescale for the stopwatch hand by removing the one or more indications of the hourly timescale, displaying the indication of the first timescale for the stopwatch hand, and translating the displayed indication of the first timescale for the stopwatch hand in a rotational motion in a clockwise direction. As an illustrative example, if the display includes 12 numerical indications of hourly timescale, and the first timescale for the stopwatch hand is a 6 second timescale, the device may substitute the 12 numerals with a single 6 numeral. In some embodiments, this may be the same 6 numeral that was previously the indicator for the 6 o'clock hour, such that the substitute and display are not perceptible to the user. The device may display the 6 numerical indicating the first timescale for the stopwatch hand at the 6 o'clock position on the clock face, then translate the 6 in a clockwise motion around the clock face until it arrives at the top of the clock face (formerly the 12 o'clock position), at which point the translation stops. This improves the context-specific interface by reinforcing to the user that the clock face has transitioned from indicating hours and minutes to indicating the first timescale for the stopwatch hand.

Figure 7B:
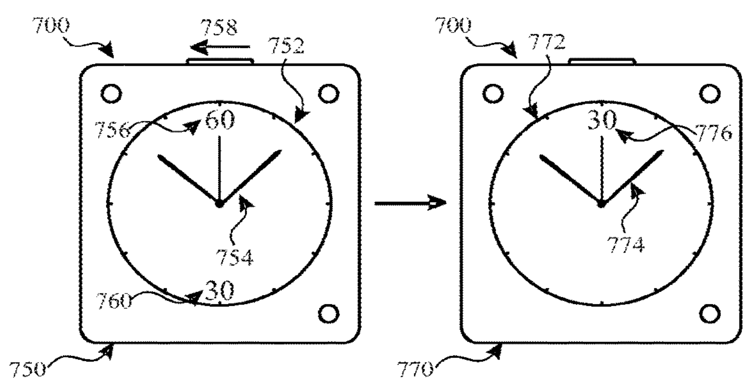

As illustrated in FIG. 7B, in some embodiments, the device has a rotatable input mechanism (e.g., 506), which may be used as an optional input to change the stopwatch timescale. FIG. 7B shows screen 750 with clock face 752, which includes hour hand and minute hand 754, and stopwatch timescale indicator 756 (showing a 60 second timescale). In response to receiving fifth data representing movement of the rotatable input mechanism (e.g., movement 758), the device 700 changes the stopwatch timescale to a second timescale, as shown by stopwatch timescale indicator 776, part of clock face 772 on screen 770. Note that screen 770 continues to display hour hand and minute hand 774. The second stopwatch timescale is different from the first stopwatch timescale. This allows the user to customize the timescale for the stopwatch hand through rotating the rotatable input mechanism, allowing for a context-specific user interface depending on the user's desired stopwatch timescale.

In some embodiments, the device substitutes the indication of the first timescale for the stopwatch hand with the indication of the second timescale for the stopwatch hand by removing the indication of the first timescale for the stopwatch hand, displaying the indication of the second timescale for the stopwatch hand, and translating the displayed indication of the second timescale for the stopwatch hand in a rotational motion in a clockwise direction.

As shown in FIG. 7B, indicator of the second timescale for the stopwatch hand 760 is displayed at a position on the clock face that indicates its relative position in the first timescale For example, indicator of a 30 second timescale 760 is displayed on clock face 752 at a position based on the sixty second timescale indicated by 756. In response to receiving data representing movement 758, the device removes 756, displays 760, and translates 760 in a rotational motion in a clockwise direction until it reaches the former position of the indicator of the first timescale for the stopwatch hand (e.g., (e.g., the former position of 756, as depicted by the position of 776 on clock face 772).

In some embodiments, after receiving the first data representing the first user input, the device animates the stopwatch hand to represent a rotational motion about an origin and ceases the animation to display the stopwatch hand at a position at π/2 radians (e.g., the 12 o'clock position) relative to the rotational motion about the origin. For example, the stopwatch hand may function as a seconds hand of the clock face before the first data is received. When the first data is received, the seconds hand may be animated to depict a rotation around the clock face (e.g., by rotating about the center point of the clock face) until it resets at the 12 o'clock position. This signals to the user that the seconds hand has now become the stopwatch hand.

Figure 8:
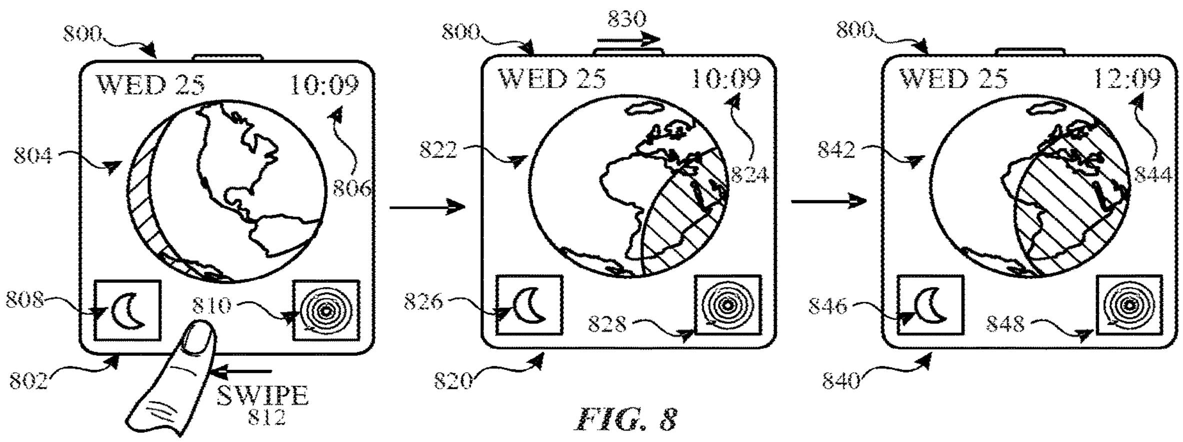
FIG. 8 illustrates exemplary context-specific user interfaces.

Attention is now directed to the context-specific user interface shown in FIG. 8. FIG. 8 shows exemplary context-specific user interfaces that may be operated on device 800. Device 800 may be device 100, 300, or 500 in some embodiments. The electronic device has a touch-sensitive display (e.g., touchscreen 504).

Figure 9:
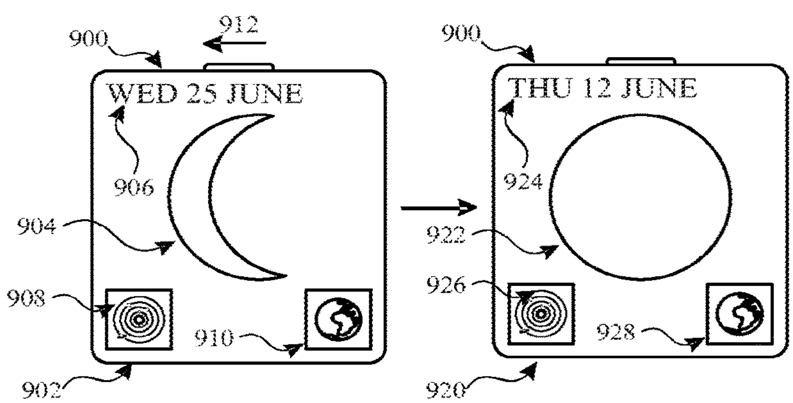
FIG. 9 illustrates exemplary context-specific user interfaces.
Figure 10:
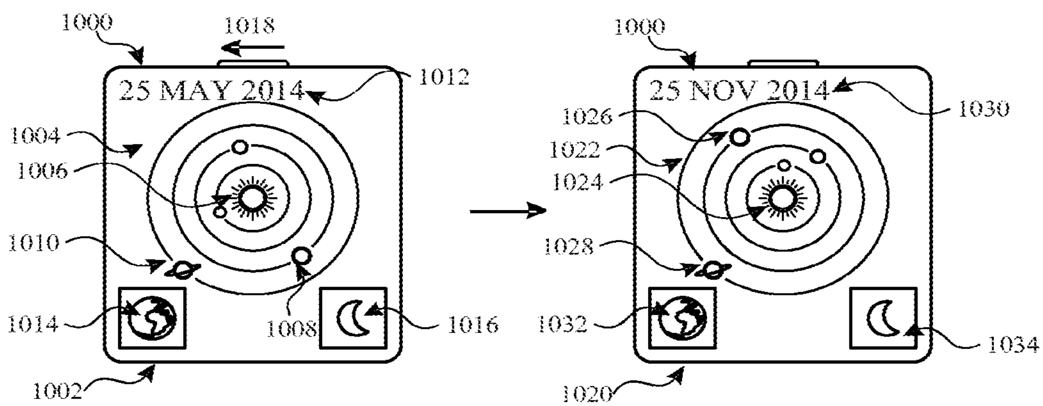
FIG. 10 illustrates exemplary context-specific user interfaces.

FIGS. 8-10 provide context-specific user interfaces that allow the user to view the passage of time while accessing a rich array of geographical, lunar, and astronomical information. For example, a user may have acquaintances all over the world and wish to know what parts of the world are in daytime or nighttime at a current time. A user may have an interest in the moon phase and wish to know what the Moon will look like tomorrow, next week, or next month. A user may have an interest in astronomy and wish to know how the planets are aligned at a particular time of interest, which could be the current day.

In FIG. 8, device 800 displays user interface screen 802 that includes first affordance 804. First affordance 804 represents a simulation of a region of the Earth, as illuminated by the Sun at the current time. For example, first affordance 804 shows that North, Central, and South America are currently in daytime, and part of the Pacific Ocean is currently in nighttime, thus simulating a region of the Earth as illuminated by the Sun at the current time.

Screen 802 also displays second affordance 806, which indicates the current time. Second affordance 806 indicates the current time (10:09) and optionally includes an indication of the day of the week (Wednesday) and the day of the month (25th). Screen 802 further displays moon affordance 808 and solar system affordance 810, which are used to invoke additional context-specific user interfaces accessible from this screen that will be described in more detail below.

In some embodiments, the simulation of the first region of the Earth as illuminated by the Sun at the current time is a realistic rendering of the Earth at the current time. For example, the simulation of the Earth may include specific geographic features. In some embodiments, the simulation of the Earth is updated to reflect weather patterns at the current time (e.g., by depicting cloud cover or other weather phenomena such as a tropical storm). The device may update the Earth to reflect global-scale by obtaining data from a weather service or external server, such as The Weather Channel, Accuweather, The National Weather Service, Yahoo!™ Weather, Weather Underground, the United States Naval Observatory, or the National Oceanic and Atmospheric Administration. In some embodiments, the simulation of the first region of the Earth as illuminated by the Sun at the current time may indicate other global events, such as the real-time position of the International Space Station, which may be obtained from a service or external server such as from NASA.

Device 800 receives a user input (in this example, swipe 812), and in response to receiving the user input, device 800 rotates the simulation of the Earth to display a second region of the Earth as illuminated by the Sun at the current time. This is depicted on screen 820, which displays first affordance 822 depicting a second region of the Earth as illuminated by the Sun at the current time, which is indicated by second affordance 824. This feature allows the user to access additional information other than the current time from this context-specific user interface. For example, a user is able to rotate the simulation of the Earth and display which regions are currently in daytime and which regions are currently in nighttime. Tying this information to a simulation of the Earth allows the user to access complex geographical and time-related data in a manner that is instantly intuitive and comprehensible.

In some embodiments, the first affordance representing the simulation of the first region of the Earth as illuminated by the Sun at the current time includes a representation of a solar terminator (e.g., a day/night line at the current time). As illustrated by affordances 804 and 822, the simulation of the Earth may include a depiction of a region of the Earth currently in daytime, a region of the Earth currently in nighttime, and/or a solar terminator dividing the two regions.

In some embodiments, the user input includes a swipe on the touch-sensitive display in a first swipe direction, as illustrated by swipe 812. This allows the user to swipe the display to rotate the simulation of the Earth. In some embodiments, the direction of rotation of the Earth is the same as the swipe direction. In some embodiments, the direction of rotation of the Earth is the opposite as the swipe direction.

In some embodiments, the user may rotate the simulation of the Earth in more than one direction using swipes in different directions. For example, a swipe in one direction may cause the representation of the Earth to rotate in one direction, and a swipe in an opposite or otherwise different direction may cause the representation of the Earth to rotate in an opposite direction. This allows the user to swipe in different directions to direct the rotation of the simulation of the Earth.

In some embodiments, as illustrated in FIG. 8, the device has a rotatable input mechanism (e.g., 506). Device 800 receives user input representing a movement of the rotatable input mechanism (e.g., movement 830), and in response, device 800 updates first affordance 822 to represent a simulation of the first region of the Earth as illuminated by the Sun at a non-current time. This is shown on screen 840 with first affordance 842 and second affordance 844. Comparing screens 820 and 840, the simulation of the Earth has been updated (cf. 822 and 842) from indicating a region of the Earth at the current time (10:09, indicated by 824) to indicating the same region of the Earth at a non-current time (12:09, indicated by 844). This feature provides the user access to further geographic and time-related information by allowing the user to view the Earth, as illuminated by the Sun, at various times throughout the day.

In some embodiments, the device has a location sensor (e.g., GPS sensor 532 and/or GPS module 135), and before displaying the user interface screen, the device obtains a current location of the electronic device from the location sensor and displays the first region of the Earth represented by the first affordance to indicate the current location of the electronic device. This allows the device to display the Earth in such a way that the current location is part of the visible portion of the simulation of the Earth, for example as a default or user-selectable state. In some embodiments, the first affordance includes a visual marking of the current location on the representation of the Earth. This allows the user to easily identify the current location on the simulation of the Earth.

In some embodiments, the device (e.g., device 800) visually marks the current location of the device on the representation of the Earth (e.g., by displaying a symbol at the appropriate location on the representation of the Earth and/or text indicating the current location). In some embodiments, this visual marking may be transitory, e.g., the visual marking may be displayed briefly and then disappear or fade out. In some embodiments, while the user is at the current location, the device does not repeat the visual marking of the current location. However, if the user changes locations, the first time the user looks at the display after changing location, the device will visually mark the new current location on the representation of the Earth as set forth above. In some embodiments, the device detects a user movement of the device (e.g., a movement of the device such as raising of the user's wrist, if the device is wearable, or other movement indicative that the user is viewing the display) and in response obtains a current location of the electronic device from the location sensor. The device may then determine whether the current location is the same as the location of the device at the last user movement of the device. In accordance with a determination that the current location has changed since the last user movement of the device, the device may visually mark the current location on the representation of the Earth.

In some embodiments, the device visually marks a location (e.g., a current location) corresponding to the location of a contact (e.g., the location of the contact's electronic device) on the representation of the Earth (e.g., by displaying a symbol at the appropriate location on the representation of the Earth and/or text indicating the contact's location). The contact may be stored, e.g., on the device or on an external device that is coupled to the device via wireless communication (e.g., Wi-Fi, Bluetooth™, near field communication ("NFC"), or any of the other cellular and/or other wireless communication techniques described herein). In some embodiments, the contact may be a contact associated with a user that has agreed to provide their location data to the user of device 800, such as through a Find My Friends application, and data indicating the location of the contact's electronic device may be provided through a server, which may provide the location of the contacts stored on device 800. This provides the user of device 800 a quick visual reference to alert them to the current location of a contact. In some embodiments, the user may further input the travel information for a contact (e.g., flight data for a contact traveling by air, train data, cruise or boat data, etc.). The device may obtain data representing the current or predicted location of the contact (provided, e.g., by an airline's server in the example of flight data) and update the visual marking of the contact's location based on the obtained data.

In some embodiments, the device detects a user movement of the device (e.g., a movement of the device such as raising of the user's wrist, if the device is wearable, or other movement indicative that the user is viewing the display). In response to detecting the movement, the device animates the first affordance representing the simulation of the Earth by translating the first affordance on-screen towards the center of the displayed user interface screen. For example, upon detecting a user movement, the device animates the simulation of the Earth to rotate in from a side or edge of the display to the center of the display.

In some embodiments, the device displays on the user interface screen a third affordance representing a moon (as depicted by affordances 808, 826, and 846). In some embodiments, the third affordance may be a graphical or stylized representation of a moon such as an icon, symbol, or a text indicating a moon. In some embodiments, the third affordance may be a realistic rendering of the Moon as seen from the Earth at the current time with actual lunar features depicted.

The device detects a contact on the displayed third affordance, and in response to detecting the contact, the device updates the display of the user interface screen by displaying a fourth affordance representing a simulation of the Moon as seen from the Earth at the current time and a fifth affordance indicating the current time. In some embodiments, updating the display of the user interface screen includes animating the first affordance representing the simulation of the first region of the Earth as illuminated by the Sun by zooming out. This animation allows the user to recognize that the astronomical scale and/or perspective has changed.

This transitions the user interface from providing information about the current time within the current day using a simulation of the Earth to providing information about the current time within the current month using a simulation of the Moon. Whereas the context-specific user interface described in reference to FIG. 8 provides the user worldwide, customizable geographical information about day/night conditions, a context-specific user interface that provides the user customizable information about moon phases and other lunar features is illustrated in FIG. 9.

FIG. 9 shows exemplary context-specific user interfaces that may be operated on device 900. Device 900 may be device 100, 300, or 500 in some embodiments. The electronic device has a touch-sensitive display (e.g., touchscreen 504).

As described above, device 900 is device 800 with an updated display. Device 900 is displaying screen 902, which includes affordance 904. Affordance 904 represents a simulation of the Moon as seen from the Earth at the current time (e.g., the current moon phase). In some embodiments, fourth affordance 904 is a realistic rendering of the Moon as seen from the Earth at the current time with actual lunar features depicted. As shown by fourth affordance 904, the current moon phase is a waning crescent moon. Although FIG. 9 shows a stylized crescent moon for the representation of the Moon, this is a schematic for illustrative purposes only. Fourth affordance 904 may depict a realistic rendering of the Moon, similar to how the Moon actually appears in the night sky. Screen 904 also includes fifth affordance 906, which illustrates the current time by showing the current date, day of the week, and month. In some embodiments, 906 indicates the current time of the day.

Device 900 receives a user input (e.g., movement 912 of the rotatable input mechanism), and in response to receiving the user input, the device rotates the simulation of the Moon to display the Moon as seen from the Earth at a non-current time, as shown on screen 920 by affordance 922, which represents the Moon at a non-current time, which is indicated by updated fifth affordance 924. A non-current time may be within the current month or in a different month.

This is somewhat analogous to the user interaction with the simulation of the Earth described for FIG. 8. The context-specific user interface exemplified in FIG. 9 allows the user to access information about the appearance of the Moon (e.g., Moon phase, or which regions of the Moon may be visible from Earth) at various times. In some embodiments, the size of the displayed simulation of the Moon may be representative of the relative distance between the Earth and the Moon at the depicted current or non-current time, or it may be representative of the visual size of the Moon at the depicted current or non-current time as perceived from Earth. The device may obtain such information from, e.g., a service or external server such as from NASA.

In some embodiments, a user may rotate the representation of the Moon and view corresponding times by swiping the touch-sensitive display. In some embodiments, the user input may include a swipe on the touch-sensitive display in a first swipe direction. In some embodiments, in response to receiving the user input, the simulation of the Moon as seen from the Earth is rotated in a first direction of rotation. In some embodiments, the first direction of rotation may be based at least in part on the first swipe direction. As used herein, a rotation of the Moon may include a rotation of the Moon on its axis to depict a different region of the Moon (e.g., a region of the Moon not visible from the Earth) and/or updating the appearance of the Moon as viewed from Earth at a particular time of interest, based on a rotation of the relative positions of the Moon, Earth, and Sun (e.g., updating the displayed lunar phase).

In some embodiments, the device receives a second user input, and in response to receiving the second user input, the device rotates the simulation of the Moon as seen from the Earth in a second direction of rotation that is different from the first direction. This user input could include, e.g., a swipe on the touch-sensitive display in a second swipe direction that is different from the first swipe direction.

This allows the user to direct both the direction of rotation of the Moon, and the time indicated by the fifth affordance, in response to swiping. For example, the user may swipe in one direction to rotate the Moon in a specific direction and view the Moon at later times in the month, and the user may swipe in another direction to rotate the Moon in an opposite direction and view the Moon at earlier times in the month.

In some embodiments, as shown in FIG. 9, a user may rotate the representation of the Moon and view corresponding times by rotating a rotatable input mechanism. Thus, in some embodiments, the device has a rotatable input mechanism (e.g., 506), and the user input may include a movement of the rotatable input mechanism in a first direction of rotation (e.g., rotation 912). In some embodiments, in response to receiving the user input, the simulation of the Moon as seen from the Earth is rotated in a first direction of rotation. In some embodiments, the first direction of rotation may be based at least in part on the direction of movement of the rotatable input mechanism.

In some embodiments, the device receives a second user input, and in response to receiving the second user input, the device rotates the simulation of the Moon as seen from the Earth in a second direction of rotation that is different from the first direction. This user input could include, e.g., a movement of the rotatable input mechanism in a second direction of rotation that is different from the first direction of rotation.

This allows the user to direct both the direction of rotation of the Moon, and the time indicated by the fifth affordance, in response to rotating the rotatable input mechanism. For example, the user may move the rotatable input mechanism in one direction to rotate the Moon in a specific direction and view the Moon at later times in the month, and the user may move the rotatable input mechanism in another direction to rotate the Moon in an opposite direction and view the Moon at earlier times in the month.

In any of the embodiments described herein, the displayed simulation of the Moon may indicate one or more additional lunar attributes, such as special moons (e.g., blue, black, or red moons, lunar eclipses, and so forth), the distance between the Moon and the Earth (as described above, e.g., for a supermoon), and/or moon wobble. In some embodiments, the additional lunar attribute(s) may be indicated by altering the appearance of the displayed simulation of the Moon (e.g., by changing the color, size, and/or tilt of the displayed simulation of the Moon). In some embodiments, the additional lunar attribute(s) may be indicated by text. In some embodiments, the additional lunar attribute(s) may correspond to the current lunar attribute(s). In some embodiments, the additional lunar attribute(s) may correspond to the lunar attribute(s) at the currently displayed date (e.g., if the user has rotated the Moon to view the Moon at earlier or later times in the month, as described above). For example, in some embodiments, while the simulation of the Moon is being rotated to depict the Moon at different times of the month or year, the simulation of the Moon may be updated to reflect one or more additional lunar attributes at the time currently indicated by the displayed simulation of the Moon.

In some embodiments, the device may display additional lunar information in response to a user input. The additional lunar information may be displayed, e.g., as part of screen 902 or 920, or on a user interface screen that replaces screen 902 or 920 (such as a lunar information application). Additional lunar information may include without limitation the name of the lunar phase, the distance from the Earth to the Moon, the time of moonrise and/or moonset (e.g., on the current day and/or at the user's current location), and the like. In some embodiments, the additional lunar information may correspond to the current lunar information (e.g., the current lunar phase, distance to the Moon, time of moonset/moonrise, etc.). In some embodiments, the additional lunar information may correspond to the lunar information of the currently displayed date, e.g., if the user has rotated the Moon to view the Moon at earlier or later times in the month, as described above.

For example, in some embodiments, the device may detect a user input (e.g., a user double tap on the touch-sensitive display, including a first contact on the touch-sensitive display and a second contact on the touch-sensitive display). In the exemplary embodiment and in response to the user double tap, the device may determine whether the first contact and the second contact were received within a predetermined interval. In response to detecting the user double tap, and in accordance with the determination that the first contact and the second contact were received within the predetermined interval, the device may display additional lunar information.

In some embodiments, the user interface screen, after updating the display to show the simulation of the Moon, displays an affordance indicating an earth (e.g., 910 or 928). Upon contacting the earth affordance, the user may return to the context-specific user interface described in reference to FIG. 8. In some embodiments, the earth affordance may be a graphical or stylized representation of an earth such as an icon, symbol, or a text indicating an earth. In some embodiments, the earth affordance may be a realistic rendering of the Earth.

In some embodiments, device 900 displays on the user interface screen a sixth affordance representing a solar system (as depicted by affordances 810, 828, 848, 908, and 926). In some embodiments, the sixth affordance may be a graphical or stylized representation of a solar system such as an icon, symbol, or a text indicating a solar system. In some embodiments, the sixth affordance may be a realistic rendering of the solar system.

Device 900 detects a contact on the displayed sixth affordance, and in response to detecting the contact, the device updates the display of the user interface screen by displaying a seventh affordance with representations of the Sun, the Earth, and one or more non-Earth planets at their respective positions at the current time and an eighth affordance indicating the current time. In some embodiments, updating the display of the user interface screen includes animating the first affordance representing the simulation of the first region of the Earth as illuminated by the Sun or animating the fourth affordance representing a simulation of the Moon as seen from the Earth by zooming out. This animation allows the user to recognize that the astronomical scale and/or perspective has changed.

This transitions the user from viewing information about the current time within the current month using a simulation of the Moon to viewing information about the current time within the current year using a simulation of the solar system. Whereas the context-specific user interface described in reference to FIG. 9 provides the user customizable information about lunar conditions, a context-specific user interface that provides the user customizable information about the solar system and relative positions of the Earth and other planet(s) is illustrated in FIG. 10.

FIG. 10 shows exemplary context-specific user interfaces that may be operated on device 1000. Device 1000 may be device 100, 300, or 500 in some embodiments. The electronic device has a touch-sensitive display (e.g., touchscreen 504).

As described above, device 1000 is device 800 and/or device 900 with an updated display. Device 1000 displays screen 1002, which includes seventh affordance 1004. Seventh affordance 1004 includes representation of the Sun 1006, representation of the Earth 1008, and representations of Mercury, Venus, and Saturn (e.g., Saturn is depicted by planet 1010). 1006, 1008, and 1010 are depicted at their respective positions at the current date (in this example, May 25, 2014), indicated by eighth affordance 1012. In some embodiments, eighth affordance 1012 also indicates the current time of day.

Optionally, in some embodiments, the solar system depicts all 8 planets. In some embodiments, the solar system depicts the four inner planets. In some embodiments, the solar system depicts other astronomical features, such as an asteroid or asteroid belt, one or more moons of one or more planets (e.g., the Moon), a manmade satellite or other space probe, a comet, Pluto, and so forth.

Device 1000 receives a seventh user input (e.g., movement 1018 of the rotatable input mechanism). In response, device 1000 updates the seventh affordance to depict respective positions of the Sun, the Earth, and the one or more non-Earth planets for a non-current date. This is depicted by seventh affordance 1022 on screen 1020. Seventh affordance 1022 includes representation of the Sun 1024, representation of the Earth 1026, and representations of Mercury, Venus, and Saturn (e.g., Saturn is depicted by planet 1028) at their respective positions at the non-current date, which is Nov. 25, 2014, as depicted by eighth affordance 1030. In some embodiments, eighth affordance 1030 also indicates the current time of day.

This context-specific user interface allows the user to access information about the relative positions of the Earth and one or more non-Earth planets at a non-current date, which may be within the current year or in a different year. In some embodiments, the Sun, the Earth, and the one or more non-Earth planets are depicted as realistic renderings. In some embodiments, the Sun, the Earth, and the one or more non-Earth planets are depicted as stylized or symbolic renderings.

In some embodiments, a user may rotate the representation of the solar system by swiping on the touch-sensitive display. Thus, in some embodiments, the user input may include a swipe on the touch-sensitive display. In some embodiments, in response to detecting a swipe, the Earth and the one or more non-Earth planets are rotated about the Sun in a first direction of rotation. In some embodiments, the first direction of rotation may be based at least in part on the first swipe direction.

In some embodiments, in response to detecting a swipe on the touch-sensitive display in a different direction, the device rotates the Earth and the one or more non-Earth planets about the Sun in a second direction of rotation that is different from the first direction. This allows the user to direct both the direction of rotation of the Earth and the one or more non-Earth planets, and the time indicated by the eighth affordance, in response to swiping. For example, the user may swipe in one direction to rotate the Earth and the one or more non-Earth planets in a specific direction and view the Earth and the one or more non-Earth planets at later dates during the year (or in a different year), and the user may swipe in another direction to rotate the Earth and the one or more non-Earth planets in an opposite direction and view the Earth and the one or more non-Earth planets at earlier dates during the year (or in a different year).

In some embodiments, as shown in FIG. 10, a user may rotate the representation of the solar system by rotating a rotatable input mechanism (e.g., 506). In these embodiments, the user input may include a movement of the rotatable input mechanism in a first direction of rotation (e.g., movement 1018). In some embodiments, in response to receiving the user input, the Earth and the one or more non-Earth planets are rotated about the Sun in a first direction of rotation. In some embodiments, the first direction of rotation may be based at least in part on the direction of movement of the rotatable input mechanism.

In some embodiments, the device receives a second user input, and in response to receiving the second user input, the device rotates the Earth and the one or more non-Earth planets about the Sun in a second direction of rotation that is different from the first direction. This user input could include, e.g., a movement of the rotatable input mechanism in a second direction of rotation that is different from the first direction of rotation.

This allows the user to direct both the direction of rotation of the Earth and the one or more non-Earth planets, and the time indicated by the eighth affordance, in response to rotating the rotatable input mechanism. For example, the user may move the rotatable input mechanism in one direction to rotate the Earth and the one or more non-Earth planets in a specific direction and view the Earth and the one or more non-Earth planets at later times in the year, and the user may move the rotatable input mechanism in another direction to rotate the Earth and the one or more non-Earth planets in an opposite direction and view the Earth and the one or more non-Earth planets at earlier times in the year.

In some embodiments, the representation of the Earth may further include a representation of the orbit of the Earth around the Sun. In some embodiments, the representation of the one or more non-Earth planets may further include a representation of the orbit of the one or more non-Earth planets around the Sun. The representation of an orbit may be a graphical representation, such as a line or ring. In some embodiments, the representation of the orbit may be stylized. In some embodiments, the representation of the orbit may be based on the actual dimensions of the planet's orbit around the Sun.

In some embodiments, the user may contact the touch-sensitive display at a location associated with the representation of the Earth or the one or more non-Earth planets. For example, the contact may be at or near the displayed representation of the planet itself, or the contact may be at or near the displayed representation of the planet's orbit. In some embodiments, the device may determine the selected planet based on a determination of the displayed representation of a planet or the displayed representation of a planet's orbit nearest to the location of the contact. In some embodiments, the contact may be a press and hold-type contact on the display. Upon detecting the contact, the device may visually distinguish the representation of the selected planet and/or the representation of the selected planet's orbit (e.g., by altering the color and/or brightness of the displayed planet and/or orbit, by displaying an outline or other visual demarcation of the planet and/or orbit, by animation the planet and/or orbit, etc.). In some embodiments, while continuing to receive the contact, the device may determine whether the duration of the contact exceeds a predetermined threshold and, in accordance with a determination that the contact exceeds the predetermined threshold, the device may visually distinguish the representation of the selected planet and/or the representation of the selected planet's orbit. When the user lets go of the contact, the device may display information about the selected planet. Such information may include, without limitation, the size of the planet, the distance (e.g., current distance, average distance, etc.) between the planet and the Sun, the distance (e.g., current distance, average distance, etc.) between the planet and the Earth (if the selected planet is not the Earth), a time and/or location in the sky when the planet will be visible from the Earth (if the selected planet is not the Earth), a temperature on the surface of the planet, the number of moons orbiting the planet, the number and/or identity of any spacecraft currently orbiting or near the planet, a description of the planet (e.g., whether the planet is terrestrial or gas, the date of discovery of the planet, information about the planet's name, and the like), a time (past, present, or future) of a particular alignment of the planet with another object in the solar system, and so forth.

After viewing the information about the planet, the user may wish to dismiss the information or view information about another planet. In some embodiments, the user may tap to dismiss the information or swipe to select another planet. For example, a swipe in a first direction may select the next planet whose orbit is farther from the Sun, relative to the previous planet, and a swipe in the opposite direction may select the next planet whose orbit is nearer to the sun, relative to the previous planet. In some embodiments, after displaying the information about the Earth or the one or more non-Earth planets associated with the contact, the device may receive a user input and determine whether the user input represents a tap or a swipe on the touch-sensitive display (e.g., by using contact/motion module 130 to detect the user gesture). In accordance with a determination that the user input represents a tap, the device may remove the displayed information about the planet. In accordance with a determination that the user input represents a swipe, the device may replace the displayed information about the planet with information about a second planet different from the first planet (e.g., a planet not associated with the user contact).

In some embodiments, the user interface screen, after updating the display to show the simulation of the solar system, displays an affordance indicating a moon (e.g., 1016 or 1034) and/or an affordance indicating an earth (e.g., 1014 or 1032). In some embodiments, the moon and/or the earth affordance may be a graphical or stylized representation of an earth or moon such as an icon, symbol, or a text. In some embodiments, the moon and/or the earth affordance may be a realistic rendering of the Moon or the Earth. Upon contacting the earth affordance, the user may return to the context-specific user interface described in reference to FIG. 8. Upon contacting the moon affordance, the user may return to the context-specific user interface described in reference to FIG. 9.

In some embodiments of any of the context specific-user interfaces illustrated in FIGS. 8-10, a user may move (e.g., rotate) a rotatable input mechanism to scroll a displayed indication of time forward or backward in time. It is to be appreciated that such a feature may be applied to any of the context-specific user interfaces described herein; however, for ease of explanation, this feature may be described in reference to FIGS. 8-10. Any model for mapping a movement of a rotatable input mechanism to the distance or speed of scrolling may be used, such as those described in U.S. patent application Ser. No. 14/476,700, "Crown Input for a Wearable Electronic Device," filed Sep. 3, 2014, which is hereby incorporated by reference in its entirety. For example, acceleration, velocity, or the like may be used to determine the amount of speed of scaling of the displayed indication of time.

In some embodiments, a user may move the rotatable input mechanism to scroll the indication(s) of time displayed on screen 802, 820, and/or 840. In response to detecting the movement of the rotatable input mechanism (e.g., movement 830), the device may update the displayed representation of the Earth, for example by simulating a rotation of the Earth, to display the Earth as illuminated by the Sun at a different time of day (compare 822 and 842). In some embodiments, the device may update the displayed indication of time to show a different time (compare 824 and 844). Similarly, as shown in FIG. 9, in response to detecting the movement of the rotatable input mechanism (e.g., movement 912), the device may update the displayed simulation of the Moon to display a different moon phase at a different time of month (compare, e.g., 904 and 922), and/or update the displayed indication of time to show a different time (compare, e.g., 906 and 924). Similarly, as shown in FIG. 10, in response to detecting the movement of the rotatable input mechanism (e.g., movement 1018), the device may update the displayed positions of the Earth and the one or more non-Earth planets to display different positions relative to the Sun at different times of year (compare, e.g., 1008 and 1010 to 1026 and 1028), and/or update the displayed indication of time to show a different time (compare, e.g., 1012 and 1030). In some embodiments, the representations of the Earth, the Moon, and/or the positions of the Earth and the one or more non-Earth planets may be rotated in a direction based on the direction of movement of the rotatable input mechanism. In some embodiments, the representations of the Earth, the Moon, and/or the positions of the Earth and the one or more non-Earth planets may be rotated at a rate based on the rate and/or amount of movement of the rotatable input mechanism, e.g., according to any of the models referenced above. It is to be appreciated that, depending on the displayed context-specific user interface, movement of the rotatable input mechanism may cause the displayed indication of time to be updated at different timescales. For example, the same degree and/or rate of rotation may cause the context-specific user interface shown in FIG. 8 to update by an hour, whereas the context-specific user interface shown in FIG. 9 may update by a day or week, or the context-specific user interface shown in FIG. 10 may update by a month or year.

In some embodiments of any of the context specific-user interfaces illustrated in FIGS. 8-10, the device may indicate other global or astronomical features or objects, such as the real-time position of the International Space Station, as described above. In some embodiments, a user may tap on the display (e.g., at a location corresponding to space), and in response to detecting the tap, the device may provide further information on other global or astronomical features or objects, e.g., the number of people currently in space, the number and/or name(s) of spacecraft currently in space, etc.

Figure 11A:
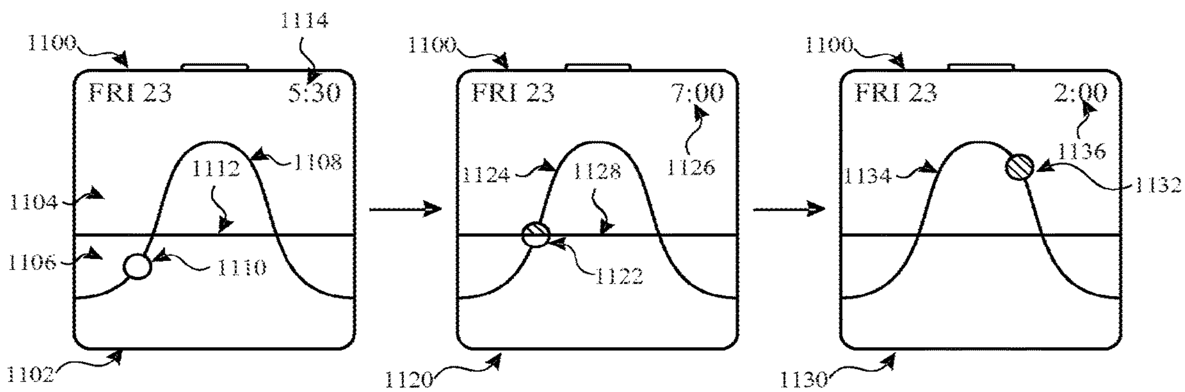
FIGS. 11A-11C illustrate exemplary context-specific user interfaces.

FIG. 11A shows exemplary context-specific user interfaces that may be operated on device 1100. Device 1100 may be device 100, 300, or 500 in some embodiments. The electronic device has a touch-sensitive display (e.g., touchscreen 504).

A user may wish to view the time of day in the context of daytime and nighttime hours. For example, a user may wish to know the time of dawn or dusk, or access a simple, visual indication of how much time is left before sunset.

As shown in FIG. 11A, device 1100 displays user interface screen 1102. User interface screen 1102 has two portions: first portion 1104 indicating daytime, and second portion 1106 indicating nighttime. Screen 1102 also displays a user interface object representing a sinusoidal wave 1108. Sinusoidal wave 1108 may represent the general appearance of a sinusoidal wave without mathematical accuracy or precision. Importantly, however, sinusoidal wave 1108 has a period of approximately a day and indicates the path of the Sun through the day. As shown in FIG. 11A, the troughs of 1108 represent solar midnight (corresponding to two solar midnights 24 hours apart), and the peak of 1108 represents solar noon for the day. Also displayed on screen 1102 is first affordance 1110, which is displayed at a position along sinusoidal wave 1108 at a position that indicates the current time of day. Screen 1102 also displays horizon line 1112, an optional feature which divides the daytime and nighttime portions of the display. As shown, horizon line 1112 intersects sinusoidal wave 1108 at two points, representing sunrise and sunset. Finally, screen 1102 displays second affordance 1114, which indicates the current time of day.

Through the course of the day, 1114 displays the current time (in this example, 5:30 am), and first affordance 1110 tracks along the sinusoidal wave. When 1110 is in daytime portion 1104, the current time is during daytime. When 1110 is in nighttime portion 1106, the current time is in nighttime. At 5:30 am, it is just before dawn, as first affordance 1110 is still in the nighttime portion of screen 1102. The features of this context-specific user interface provide the user a simple and intuitive way to track the current time and understand how long it is until, for example, sunset, or sunrise. In some embodiments, the affordance representing the sun appears hollow (e.g., like a ring) when at a position fully within the nighttime portion (e.g., 1106) of the display, as shown by first affordance 1110. This further reinforces to the user that it is currently before dawn.

For example, screen 1120 shows a second time of day and includes first affordance 1122, sinusoidal wave 1124, and second affordance 1126. As indicated by second affordance 1126, it is now sunrise at 7:00 am. The position of first affordance 1122 along wave 1124 is between the first portion and the second portion, indicating the transition from nighttime to daytime. This is further depicted on screen 1120 by positioning affordance 1122 on line 1128, which separates the two portions of the display. This is yet further indicated by the appearance of affordance 1122 itself, which, optionally, may be half-filled when the affordance is at a position intersecting the first and second portions of the display.

Screen 1130 shows a third time of day and includes first affordance 1132, sinusoidal wave 1134, and second affordance 1136. As indicated by second affordance 1136, it is now 2:00 pm. The position of first affordance 1132 along wave 1134 is within the first portion of the display, indicating daytime. This is further depicted by the appearance of affordance 1132 itself, which, optionally, may be filled when the affordance is at a position fully within the first portion.

In some embodiments, the color of the first and/or the second portion(s) may indicate daytime (e.g., with a warm or bright color) or nighttime (e.g., with a dark or cool color). In some embodiments, the first and second portions may be the same color, which may be representative of the current light conditions. In these embodiments, the user may still be able to tell the current light conditions through the sinusoidal wave, optional horizon line, and/or optional appearance of the sun affordance (e.g., filled, half-filled, or hollow). In some embodiments, the sinusoidal wave may include two or more colors, and these colors may indicate the daytime and nighttime portions (e.g., parts of the wave in the daytime portion may be one color, and parts of the wave in the nighttime portion may be another). Moreover, the two portions may be of any shape (not limited to rectangular). For example, the daytime portion may appear as an illuminated circle that encompasses the sinusoidal wave, with the nighttime portion appearing all around the circle.

In some embodiments, device 1100 may have a location sensor (e.g., GPS sensor 532 and/or GPS module 135). In these embodiments, device 1100 may obtain a current location of the device from the location sensor and indicate daytime and nighttime hours at the current location at the current time through the ratio of the displayed first and second portions. That is to say, the size of the daytime and nighttime portions of the display may be adjusted, relative to daytime hours at the current location and date. As an illustrative example, if the current location is near the Arctic Circle during summer, the daytime portion may include all or nearly all of the screen, such that all or nearly all of the displayed sinusoidal wave is within the daytime portion. As another example, if the user were to travel latitudinally across the globe, the position of affordance 1110, 1122, or 1132 (for example) would not change, but the ratio of daytime:nighttime portions and relative amount of the sinusoidal wave within each would be adjusted to reflect the current location. This provides a more realistic depiction of the time of day to the user, thus enhancing the user interface.

In some embodiments, the amplitude of the displayed sinusoidal wave is based on the height of the Sun relative to the horizon at the current location and current time. For example, the wave may flatten or otherwise decrease in amplitude to reflect the sun having a lower path through the sky at the location and current day (e.g., in locations more proximal to the poles in winter).

Figure 11B:
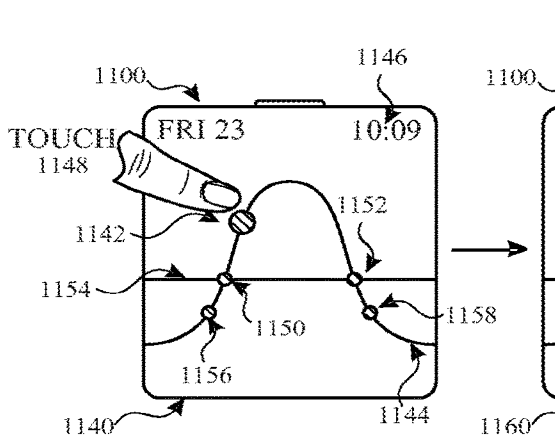

Attention is now directed to FIG. 11B, which illustrates an example of this context-specific user interface that provides a user-interactable feature to view additional day/night information. FIG. 11B shows user interface screen 1140 that can be displayed on device 1100. Screen 1140 includes first affordance 1142, which represents the position of the sun at the current time along sinusoidal wave 1144. Screen 1140 also displays second affordance 1146, which also indicates the current time (10:09 am). Device 1100 receives a user contact at displayed first affordance 1142, shown by touch 1148.

As detected by device 1100, the user touches first affordance 1142 and drags the affordance to a second position along the sinusoidal wave in a continuous gesture (as indicated by touch 1166). In response, as shown on screen 1160, device 1100 displays first affordance 1162 at the second position along sinusoidal wave 1164. Device 1100 also updates the second affordance 1168 to indicate a non-current time. This new time (12:09) corresponds to the time of day indicated by the second position of affordance 1162. Thus, the user is able to view the time of day represented by any position along the sinusoidal wave by simply moving affordance 1148 and/or 1166.

It is to be noted that the movement of the contact may begin and end at positions on the sinusoidal wave, but the movement itself need not precisely track the sinusoidal wave. That is, the user is not required to track the contact precisely along the sinusoidal wave. The device may simply receive a user contact at the displayed first affordance, and, while continuing to receive the user contact, detect a movement of the contact from the first position to a second position without a break in the user contact on the touch-sensitive display (e.g., the user does not lift their finger off the touch-sensitive display).

In response to detecting the contact at the second position, the device may translate the first affordance on-screen to the second position while tracking the sinusoidal wave. Thus, while the user contact does not need to track the sinusoidal wave, the device nonetheless translates the first affordance from the first position to the second position by tracking the first affordance along the sinusoidal wave. In some embodiments, the device may continuously update the time, as indicated by the second affordance. Alternatively, the device may update the time indicated by the second affordance when the continuous contact has come to rest at the second position. In alternative embodiment, after detecting the contact at the first position, the device may translate the first affordance on-screen to the second position on the sinusoidal wave in response to a rotation of a rotatable input mechanism.

FIG. 11B illustrates optional features of this context-specific user interface. As shown on screen 1140, in response to receiving user touch 1148 at affordance 1142, device 1100 displays affordances 1150 and 1152, which depict sunrise and sunset, respectively. Affordances 1150 and 1152 are displayed along wave 1144 at the two points where the wave intersects the boundary between the first portion indicating daytime and the second portion indicating nighttime. This boundary is demarcated on screen 1140 with optional horizon line 1154. When horizon line 1154 is displayed, affordances 1150 and 1152 are displayed at the two points where line 1154 intersects wave 1144. In some embodiments, affordances 1150 and 1152 may further include a numerical display of sunrise and sunset times, respectively, for the current day. In some embodiments, these affordances are also displayed while device 1100 receives user contact at the second position.

Also displayed on screen 1140 in response to receiving user touch 1148 at affordance 1142 are affordances 1156 and 1158. Affordances 1156 and 1158 are displayed along wave 1144 at positions corresponding to dawn and dusk, respectively. In some embodiments, these affordances are also displayed while device 1100 receives user contact at the second position. These displayed affordances indicate to the user when first and last light will occur, allowing the user to visually gauge when they will occur, or how long ago they occurred, by the distance from affordance 1142. In some embodiments, the time of dawn may be astronomical dawn, nautical dawn, or civil dawn. In some embodiments, the time of dusk may be astronomical dusk, nautical dusk, or civil dusk.

In some embodiments, device 1100 detects a contact at the displayed first affordance, a movement of the contact, and a break in contact. In response to detecting the break in contact, the device may translate the first affordance back to the position indicating the current time and update the second affordance to indicate the current time. This allows the user to drag the affordance to a position of interest, view the indicated time for that position, and by releasing the contact, "snap back" to the current position.

Figure 11C:
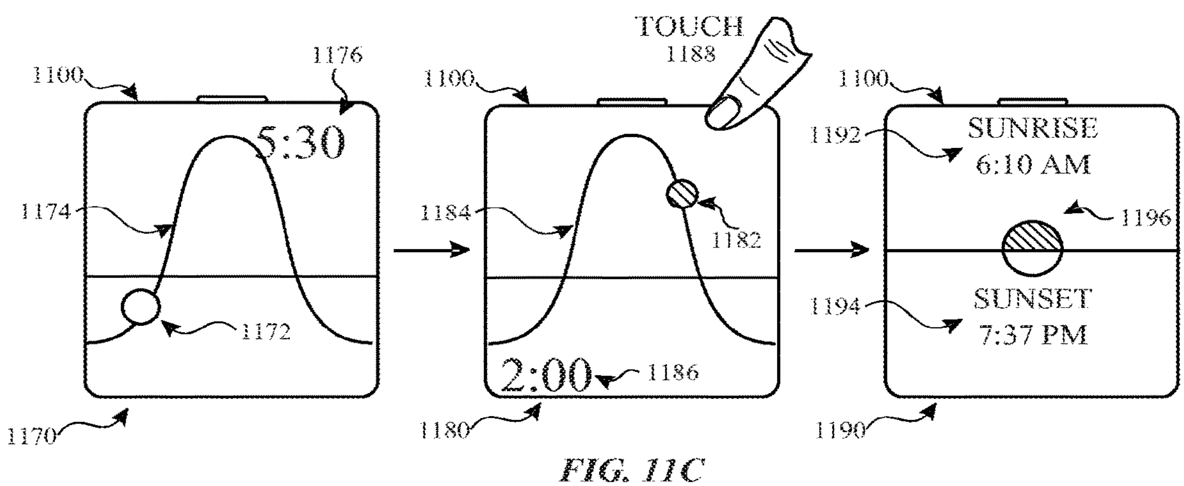

FIG. 11C illustrates further optional features of this context-specific user interface. In some embodiments, particularly when the user interface screen is displayed on a reduced-size display, it may be desirable to display each of the elements as large as possible for visibility. Screen 1170 displays first affordance 1172, sinusoidal wave 1174, and second affordance 1176. As shown, affordance 1176 intersects wave 1174. When the current time reaches 2:00, as shown on screen 1180, the position of affordance 1182 indicating 2:00 along wave 1184 intersects with the position of the second affordance. Device 1100 may determine whether the position of the first affordance intersects with the second affordance (e.g., a position that would overlap with, be obscured by, or otherwise appear close to the second affordance). In response to a determination that the affordances intersect, the device may display the second affordance at another position on the display that does not intersect. As illustrated on screen 1180, the position of affordance 1186 is different from that of 1176, because the relative position of 1176 on the screen would intersect with first affordance 1182. This accommodation allows the device to display a richly informative screen without visual interference between displayed elements.

The user may also contact the touch-sensitive display with touch 1188 on screen 1180. This contact may be, for example, at any position on the display besides the position of the first affordance representing the sun at the current time. In response to detecting the contact, device 1100 displays screen 1190, which includes sunrise time 1192, sunset time 1194, and affordance 1196, which provides a non-textual indication of daytime and nighttime. This allows the user to access sunrise and sunset times from any user interface screen.

The user may also set a reminder for a time of day through this context-specific user interface. For example, if the device has a rotatable input mechanism (e.g., 506), the user may rotate the rotatable input mechanism to set the reminder. In response to detecting a movement of the rotatable input mechanism, the device may translate the first affordance to a third position indicating a non-current time of day. The user may contact the first affordance displayed at the third position, and in response to detecting the contact, the device may set a user reminder for the indicated time of day.

For example, the device may display another affordance representing a user prompt to set an alert for the indicated time of day. The reminder could be a visual alert. In this example, the device may display a visual alert that is displayed when the time of day is approaching. Alternatively, the device may display at any time a visual affordance that shows the third position along the sinusoidal wave to help the user understand how far the indicated time of day is from the current time. In some embodiments, the user reminder could include an audio alert that audibly notifies the user when the indicated time of day has arrived or will arrive shortly. In some embodiments, the user reminder could include a haptic alert. The device may create a haptic signal to the user when the indicated time of day is approaching (e.g., using haptic feedback module 133 and tactile output generator 167).

These features allow the user to further customize this context-specific user interface. It is to be appreciated that this feature does not create a specific alert at a time and date; rather, it allows the user to set a generic alert for a time of day that is not tied to a specific date. For example, a user may notice a certain lighting effect, such as sunlight through a window in their house, and wish to set a reminder so that they can view this effect at the time of day when it occurs. Within the context of daytime/nighttime information, this allows the user to customize the user interface to include not only sunrise, sunset, dawn, dusk, and so forth, but also a time of day that they wish to designate.

Figure 12:
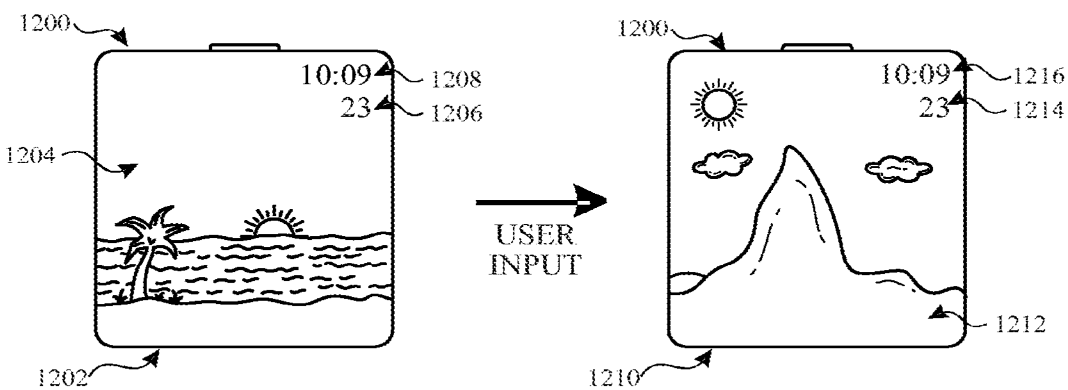
FIG. 12 illustrates exemplary context-specific user interfaces.

FIG. 12 shows exemplary context-specific user interfaces that may be operated on device 1200. Device 1200 may be device 100, 300, or 500 in some embodiments. In some embodiments, the electronic device has a touch-sensitive display (e.g., touchscreen 504).

A user may wish to view a certain background image on the user interface screen while retaining as much of the original image as possible. Therefore, it may be advantageous to provide a context-specific user interface that displays the time and/or date not simply as interface objects displayed over the image, but rather interface objects that appear to arise from the image itself, thereby maximizing the user's view of the image while still providing visible indications of the time and date. This may be particularly true if the user interface is displayed on a reduced-size display.

As shown in FIG. 12, device 1200 is displaying user interface screen 1202, which includes background 1204. Background 1204 is based on an image of a beach. In some embodiments, the image may be a photo.

As used here, consistent with its accepted meaning in the art, the phrase "background" refers to the background of a user interface screen that is visually distinguishable from text and user interface objects also displayed in the user interface screen. Basing a background on an image simply means displaying the image as a background of a displayed screen. In some cases, the image and the background may be identical. In other cases, displaying the image as a background may involve modifying one or more aspects of the image to fit on the display, such as image size, image cropping, image resolution, and so forth.

Screen 1202 also includes user interface objects 1206 and 1208. 1206 indicates a date (the $23^{rd}$), whereas 1208 indicates a time of day (10:09). In some embodiments, the device may indicate the current date and/or the current time of day.

Displayed background 1204 includes a plurality of pixels. A subset of these pixels is modified in appearance relative to the image such that the subset comes to represent one or more of user interface object 1206 and user interface object 1208. That is to say, at least one of these user interface objects is displayed by modifying the background. For example, the subset of pixels may be modified by changing color and/or intensity.

In some embodiments, the subset of the pixels may be modified by color blending. In some embodiments, the subset of the pixels may be modified by color blurring. In some embodiments, the subset of the pixels may be modified by applying a gradient. Importantly, these examples illustrate that the appearance of the subset of the pixels may be influenced by both the background image at the position of the user interface object(s) and the user interface object(s) themselves. This allows the user to view the image more clearly (since the user interface object(s) are not simply displayed on top of and obstructing the image), while also maintaining the legibility of the user interface object(s).

In some embodiments, one of user interface objects 1206 and 1208 is displayed by modifying the background, and the other is displayed independent of the background (e.g., a set color and/or intensity not produced by modifying the background pixel subset). In these embodiments, the device may receive data representing a background color at the position of the displayed user interface object (e.g., 1206 or 1208), and the color of the displayed user interface object may be different from this background color (e.g., a different color and/or intensity). For example, a background color at the position of the displayed user interface object may include the most prevalent color at that position. This feature ensures that, if one of the user interface objects is a preset color, it will be displayed legibly on the background, no matter the appearance of the background.

In some embodiments, the image on which the background is based may be stored on device 1200.

In other embodiments, the image on which the background is based may be stored on an external device that is coupled to device 1200 via wireless communication (e.g., Wi-Fi, Bluetooth™, near field communication ("NFC"), or any of the other cellular and/or other wireless communication techniques described herein). In these embodiments, before displaying screen 1202, device 1200 may receive (via wireless communication) data representing the background from the external device. Using these data, device 1200 may then display the background.

Optionally, when the image is stored on an external device, device 1200 may display a background based on the current background of the external device. For example, the device may receive (via wireless communication) data representing a current background from the external device and display a user interface screen that includes a background corresponding with the current background of the external devices. The device then modifies a subset of the pixels of the background from the external device to represent one or more of a user interface object indicating a date and a user interface object indicating a time of day. In some embodiments, device 1200 may further alter the background from the external device, for example, by changing one or more of the image size, image cropping, image resolution, and the like, particularly if the external device and device 1200 have different display dimensions and/or resolutions.

Returning to FIG. 12, a user may wish to select an image from a folder of images to serve as the background. Thus, device 1200 may access a folder that includes two or more images (e.g., the images shown on screens 1202 and 1210), select a first image, and display a user interface screen that includes a background based on the first image (e.g., background 1204). As described above, this background includes a subset of pixels that are modified in appearance relative to the image to represent one or more of a user interface object indicating a date (e.g., 1206) and a user interface object indicating a time (e.g., 1208).

Optionally, as shown in FIG. 12, after displaying screen 1202, device 1200 may receive data representing a user input. In response, device 1200 obtains data representing background 1204, select a second image from the folder that is different from the first image, and display screen 1210, which includes background 1212 based on the second image. As shown in FIG. 12, backgrounds 1204 and 1212 are based on different images: a beach scene and a mountain scene, respectively. This feature ensures that, when the user decides to change the displayed background, the device displays a different image, compared to the image displayed before the user input.

As shown on FIG. 12, screen 1210 also includes user interface object 1214 indicating a date and user interface object 1216 indicating a time of day. At least one of these user interface objects is displayed by modifying a subset of pixels of background 1212 at the position of the displayed user interface object(s), as described above. This subset may be modified in any of the ways described above, such as color blending, blurring, gradient, etc. In some embodiments, one of the user interface objects may be a color independent of the background, and device 1200 may modify this color to adapt to the background, as set forth above. The image on which the background is based may be stored on device 1200 or on an external device, as described above.

A variety of user inputs may serve as the user input to change the background. In some embodiments, the user input may be a touch on the display, a rotation of a rotatable input mechanism, a depression of a depressible and rotatable input mechanism, or a swipe on the display. In some embodiments, the user input may be a user movement of the electronic device (e.g., a movement of the device such as raising of the user's wrist, if the device is wearable, or other movement indicative that the user is viewing the display). Advantageously, this feature enables the device to display a different image each time the display is viewed, thereby providing the user with a customized display at each viewing and enhancing the user interaction with the device. As described above, a user movement of the device could be detected, for example, by using an accelerometer (e.g., 534), a gyroscope (e.g., 536), a motion sensor (e.g., 538), and/or a combination thereof.

In some embodiments, the user may choose to exclude an image from the folder so that it is no longer selected as a background. In these examples, the device may receive data representing a user prohibition of an image from the folder. Such a prohibition may be received through the user interface shown in FIG. 12, or it may be received through the folder containing the two or more images (e.g., the folder may include a feature that allows the user to select more images, drag images into the folder, delete images from the folder, and/or prohibit an image for use as a background). In response to receiving the data, the device may prevent the display of the image as a background in response to future user input.

Figure 13A:
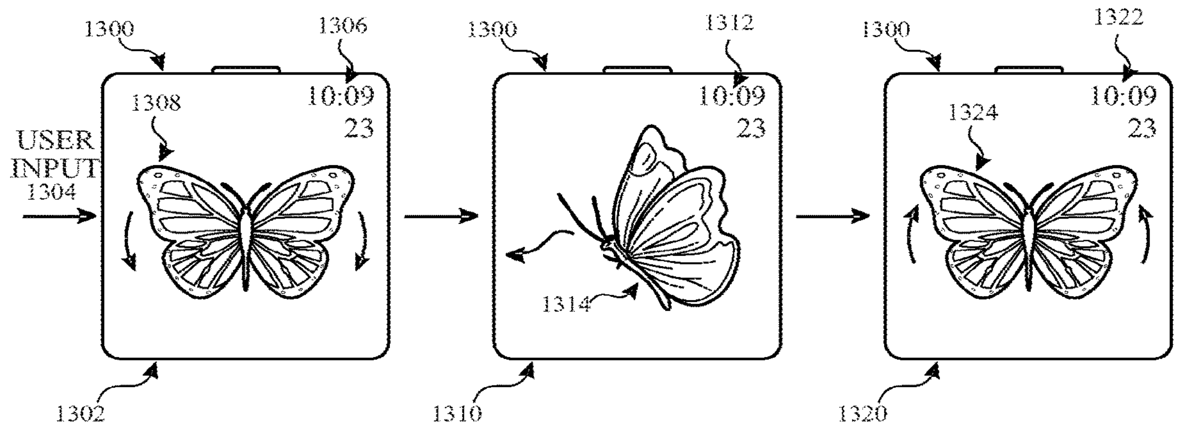
FIGS. 13A and 13B illustrate exemplary context-specific user interfaces.

FIG. 13A shows exemplary context-specific user interfaces that may be operated on device 1300. Device 1300 may be device 100, 300, or 500 in some embodiments. The electronic device has a touch-sensitive display (e.g., touchscreen 504).

A user may wish to view a displayed animation on an electronic device in response to an input. Because a user may look at an electronic device many times per day, particularly if the user relies on the device for timekeeping, it may be advantageous to provide the user a different experience each time the display is viewed. This keeps the user interested and engaged with the electronic device.

As shown in FIG. 13A, device 1300 displays user interface screen 1302 in response to detecting user input 1304 at 10:09. Screen 1302 includes user interface object 1306, which indicates the time, as well as user interface object 1308, which depicts a butterfly. After displaying screen 1302, device 1300 animates butterfly 1308 by sequentially displaying three animated sequences that are all different from each other. The first animated sequence is shown by butterfly 1308, which depicts the butterfly opening its wings. Next, screen 1310 displays the second animated sequence, which depicts butterfly 1314 flying from right to left on the display. Note that screen 1310 also displays user interface object 1312, which indicates the time. Finally, screen 1320 displays the third animated sequence, which depicts butterfly 1324 closing its wings. Screen 1320 again displays user interface object 1322 indicating the time.

Figure 13B:
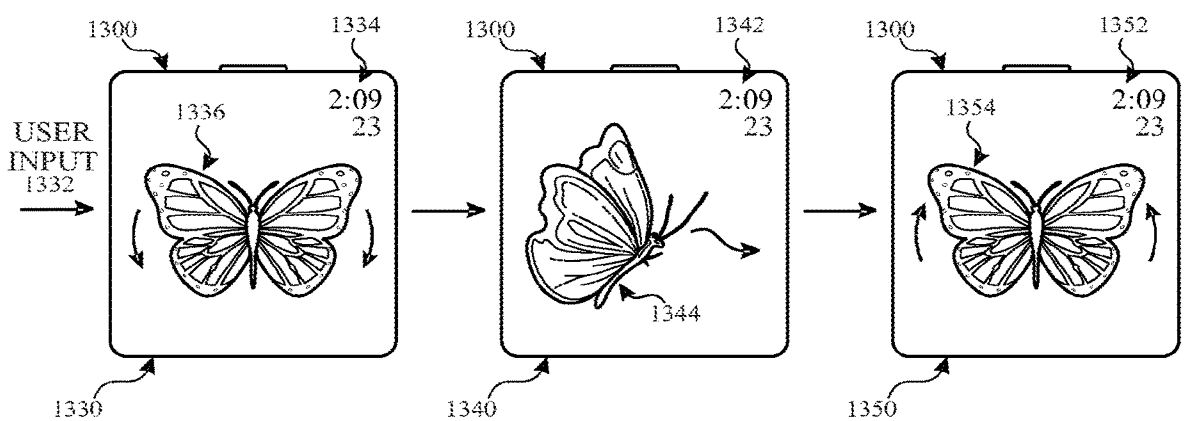

Later in the day, as shown in FIG. 13B, device 1330 detects a second user input 1332. In response, device 1300 accesses data representing the previously displayed animated sequence (i.e., the sequence shown by butterfly 1314). Device 1300 displays screen 1330. Screen 1330 includes user interface object 1334, which indicates the time is now 2:09, and user interface object 1336, which depicts a butterfly.

Device 1300 then animates butterfly 1336 by sequentially displaying three animated sequences. Butterfly 1336 on screen 1330 is animated using the same sequence as butterfly 1308 on screen 1302, showing the butterfly opening its wings. Next, screen 1340 shows butterfly 1334, which is animated to fly from left to right on the display. The animated sequence of butterfly 1334 is different from the animated sequence of butterfly 1314 on screen 1310 (data representing the sequence of butterfly 1314 had previously been accessed). This ensures that the user will view a different animation, as compared to the last user input. This makes the animation appear more realistic and/or engaging to the user, as this variation imparts a more random, lifelike quality to the animated user interface object.

Finally, screen 1350 shows butterfly 1354, which is animated using the same sequence (a butterfly closing its wings) as butterfly 1324 on screen 1320. Screens 1340 and 1350 also include user interface objects 1342 and 1342, respectively, which indicate the time.

FIGS. 13A and 13B show two butterflies (1336 and 1308) that are displayed in response to user inputs. Butterfly 1336 is related to 1308, but it need not be identical. In some embodiments, user interface object 1336 may be the same as user interface object 1308. In other embodiments, user interface object 1336 may be an object related, but not identical, user interface object 1308. For example, these user interface objects may be animals of the same general type but with different appearances (e.g., different colors, different postures, different species, and so forth).

The animated user interface object may be an animal, such as a butterfly or jellyfish, or it may be a plant, like a flower. In some embodiments, it may be a non-living object, single-celled organism, cartoon, human, and so forth. This context-specific user interface is not limited by the particular animated user interface object. The animated sequences may be specific to the displayed objects. For example, a jellyfish may swim across the screen in various directions, a flower may open, close, or be blown about the wind, and so on.

As illustrated by comparing butterfly 1308 to butterfly 1324, or butterfly 1336 to butterfly 1354, the third animated sequence may be based on a reverse of the first animated sequence. For example, if the first sequence depicts a butterfly opening its wings, the third sequence may depict a butterfly closing its wings. Since these sequences bookend the full animated sequence, this feature imparts a cohesive feel to the entire sequence. In some embodiments, the state of the user interface object at the beginning of the first animated sequence (e.g., butterfly 1308 has closed wings, which are then animated to open) corresponds with the state of the user interface object at the end of the third animated sequence (e.g., butterfly 1324 is animated to end on closed wings), thereby providing the user with the impression of one seamless animation.

A variety of user inputs may serve as the user input to display the screens exemplified in FIG. 13. In some embodiments, the user input may be a touch on the display, a rotation of a rotatable input mechanism, a depression of a depressible and rotatable input mechanism, or a swipe on the display. In some embodiments, the user input may be a user movement of the electronic device (e.g., a movement of the device such as raising of the user's wrist, if the device is wearable, or other movement indicative that the user is viewing the display). Advantageously, this feature enables the device to seemingly display a different animation each time the display is viewed.

In some embodiments, the user interface object displayed in response to user input may be the same after each input. In some embodiments, the user interface object could be different each time. For example, a user interface object may be reflected (e.g., about a horizontal and/or a vertical axis), flipped, and/or rotated to create a new user interface object. This is a source of variety for the displayed user interface object and the animated sequences. For example, rotating a single object horizontally, vertically, and horizontally and vertically creates four new objects, which when coupled with an animation that directs the movement of the object creates even more variations. These aspects add combinatorial possibilities which greatly increase the number of available animations for a single object, thus reducing the number of pre-programmed animated sequences. It also helps animate objects with fewer intrinsic features and/or movements, such as a jellyfish.

The user may also change the displayed user interface object. For example, device 1300 may detect a contact on the touch-sensitive display, and in response, device 1300 may substitute the displayed user interface object with a second user interface object. This second user interface object may be related to the first (e.g., the user could select an orange butterfly if the previous one was blue).

In some embodiments, as shown in FIGS. 13A and 13B, the user interface object indicating time may be a representation of a digital clock with numerical indications of an hour and a minute (see, e.g., objects 1306, 1312, 1322, 1334, 1342, and 1352). In some embodiments, the user interface object may display the current time in response to user input.

Figure 14A:
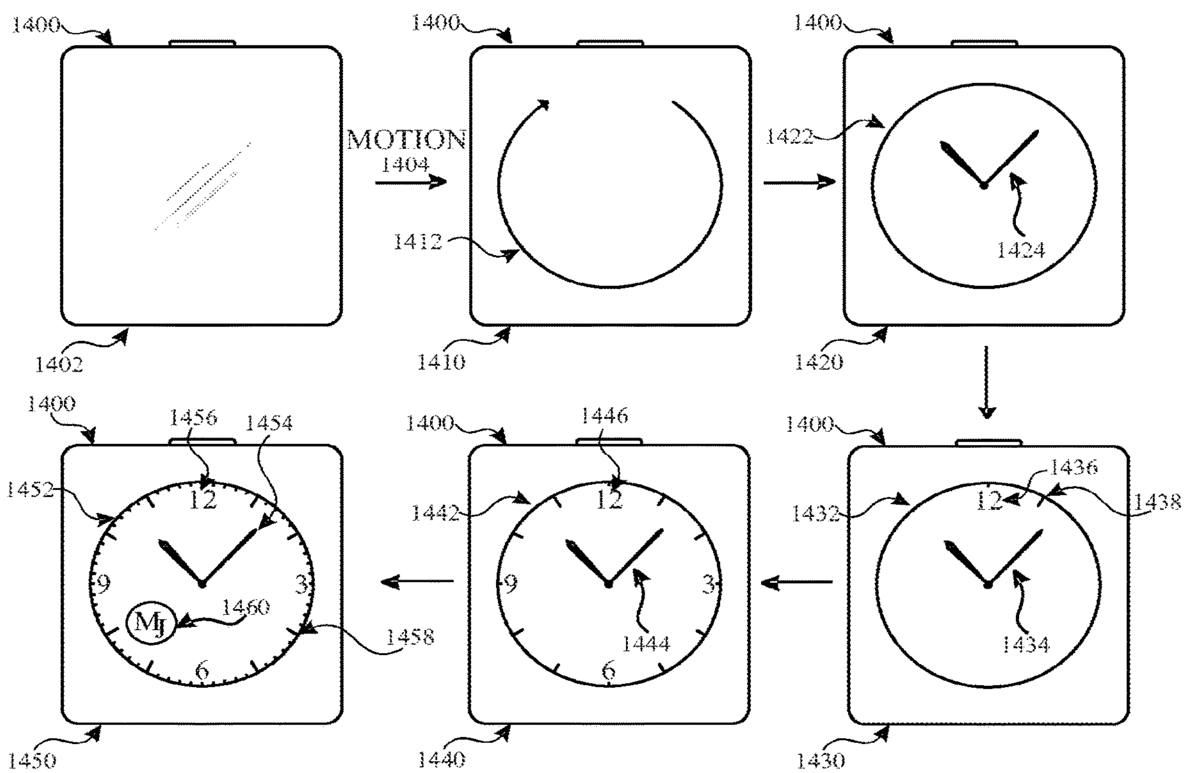
FIG. 14A illustrates exemplary context-specific user interfaces.

FIG. 14A shows exemplary context-specific user interfaces that may be operated on device 1400. Device 1400 may be device 100, 300, or 500 in some embodiments. The electronic device has a touch-sensitive display (e.g., touchscreen 504).

A user may wish to keep time with an interactive clock face. For example, a user may wish to view an animation with each viewing of the display, or view a clock face that changes color, to keep the interaction with the device interesting. A user may wish to customize the clock face with a personalized complication, like a monogram, or a personalized widget for displaying application data.

As shown in FIG. 14A, device 1400 has display 1402 turned off. In response to detecting a user movement of device 1400 (e.g., motion 1404), device 1400 displays an animated reveal of a clock face. On screen 1410, device 1400 displays clock face outline 1412, which is animated as if being filled in or drawn in a clockwise manner. On screen 1420, device 1400 displays full clock face outline 1422 and hour hand and minute hand 1424. On screen 1430, device 1400 displays full clock face outline 1432, hour hand and minute hand 1434, and hour indications 1436 and 1438 (indicating the 12 o'clock and 1 o'clock hours, respectively). These hour indications are progressively displayed in a clockwise direction, as shown by comparing screens 1430 and 1440.

On screen 1440, device 1400 displays clock face outline 1442, hour and minute hand 1444, and twelve hour indications, as represented by 12 o'clock indication 1446. On screen 1450, device 1400 displays clock face outline 1452, hour and minute hand 1454, twelve hour indications (as represented by 12 o'clock indication 1456), minute indications 1458, and monogram 1460, which is described in greater detail below. Therefore, as exemplified in FIG. 14, the clock face is animated to progressively reveal its features.

Two types of hour indications are depicted in FIG. 14A: numerical hour indications (e.g., 3, 6, 9, and 12, as indicated by hour indications 1436, 1446, and 1456) and symbolic hour indications (e.g., the tick marks displayed between the numerical indications on screens 1440 and 1450). Either type of indication may be used, alone or in combination. Any type of symbol may be used as an hour indications; the position around the clock face, rather than the symbol itself, conveys to the user which hour is indicated. The numbers of hour indications and/or minute indications (or lack thereof) may further be customized by the user, which will be explained in greater detail below.

FIG. 14A shows that one or more hour indications may be progressively displayed in a clockwise manner (e.g., they may appear sequentially in a clockwise direction, as depicted on screens 1430 and 1440). Similarly, the clock outline may optionally appear in a clockwise direction. This helps to orient the user. Optionally, the minute indications may appear progressively in a clockwise manner. The hour hand and the minute hand (and, optionally, a seconds hand) may be animated as well, such as radially (e.g., starting from the center of the clock face and appearing to extend outward towards the outline). In some embodiments, the hour and minute hand appear first, followed by the hour indications, then the minute indications. In some embodiments, the clock face shows current time.

In some embodiments, the clock face may include a color. Features such as the background of the clock face, clock face outline, seconds hand, hour indication(s), minute indication (s), hour hand, minute hand, and so forth may be displayed in any color. In some embodiments, device 1400 updates a color displayed on the clock face over time by continuously changing the color, so that the user perceives time passing through color change. This color may be, e.g., a background color, the color of the clock face itself, and/or the color of the seconds hand (e.g., the entire seconds hand, or a portion of the seconds hand, such as a pointer, dot, or other optional feature). As an illustrative example, the color may cycle through a gradient of colors, with the full cycle lasting a minute, an hour, a day, etc.

In some embodiments, device 1400 may detect a user movement of the device. As described above, a user movement of the device could be detected, for example, by using an accelerometer (e.g., 534), a gyroscope (e.g., 536), a motion sensor (e.g., 538), and/or a combination thereof. A user movement of the electronic device could include movements such as a movement of the device such as raising of the user's wrist, if the device is wearable, or other movement indicative that the user is viewing the display. In response to detecting the user movement, device 1400 may display a different color (e.g., a background color, the color of the clock face itself, and/or the color of the seconds hand). In some embodiments, this feature may be used to allow the user to change a static color displayed on the clock face. In other embodiments, this feature may be used to allow the user to change a continuously changing color, as exemplified above.

In some embodiments, device 1400 may display a complication on the clock face (e.g., within the clock face itself, or adjacent to the clock face on the display). As used here, consistent with its accepted meaning in art, a complication refers to any clock face feature other than those used to indicate the hours and minutes of a time (e.g., clock hands or hour/minute indications). For example, an affordance may be displayed as a clock face. As will be described in greater detail below, the affordance may represent an application, and in response to detecting a contact on the affordance, device 1400 may launch the application represented by the affordance.

Returning now to FIG. 14A, in some embodiments, a monogram may be displayed as a complication. Screen 1450 shows monogram affordance 1460 displayed as a clock face complication. Device 1400 may receive data representing a name, and in response to receiving the data, generate a monogram and display the monogram as affordance 1460 (in this example, "MJ"). Device 1400 may receive this data from one or more sources, such as a saved contact entry, a V-card, an image containing a monogram (e.g., an image taken or uploaded by a user), and so forth. In some embodiments, device 1400 has a user interface for monogram editing, which may be a feature of the user interface described in FIG. 14, a separate user interface on device 1400, or a user interface on an external device in wireless communication with device 1400. It is to be appreciated that these aspects (e.g., complications, monograms, and/or colors) may also be applied to any of the other context-specific user interfaces described herein. These features provide customizable elements a user may wish to include to personalize one or more clock faces, thereby improving the user interface by enhancing user interactability.

Figure 14B:
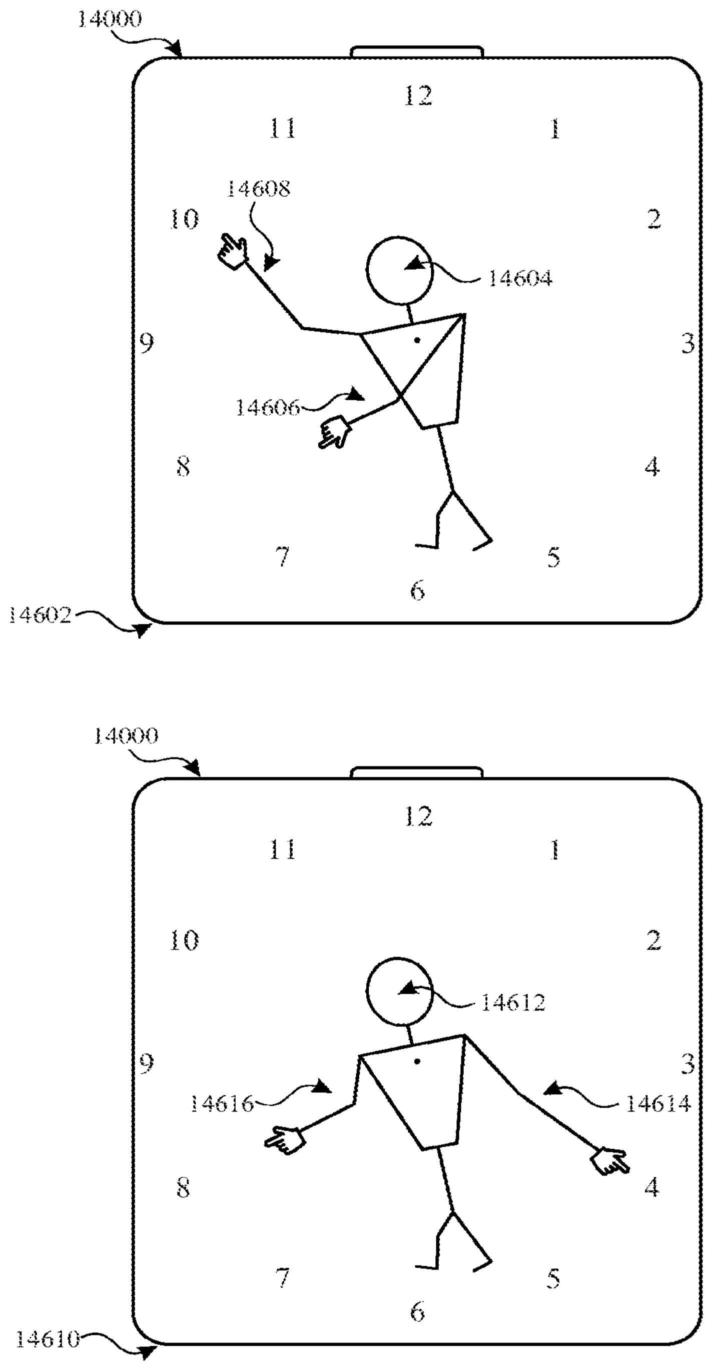
FIGS. 14B-14U illustrate exemplary context-specific user interfaces.

FIG. 14B shows exemplary user interface screen 14602 that device 14000 can display on its display. In some embodiments, device 14000 may be one or more of devices 100 (FIG. 1), 300 (FIG. 3), and/or 500 (FIG. 5). The electronic device has a touch-sensitive display (e.g., touchscreen 504).

Users rely on personal electronic devices to keep time throughout the day. It is becoming increasingly desirable to present the user with interactive user interfaces that promote user interaction with a personal electronic device. Indicating the time through a character-based user interface may enhance a user's interaction with the device. Increasing the level of interactivity of a character and improving the impression of natural motion displayed by a character improve the character's lifelike appearance, thereby enhancing and prolonging user interactions with the device. Enabling the character-based interface to not only keep time, but also provide information related to other events, further enhances user interactions with the device by conveying a more lifelike and interactive character-based user interface.

Accordingly, provided herein are context-specific user interfaces that include a character user interface object. A user may wish for such character-based user interface objects to adopt a more natural and lifelike appearance. Further, a user may wish for the character-based user interface object to act in a more dynamic manner, to interact with the user, and/or to provide event-related information to a user.

Device 14000 may display a character user interface object such as character user interface object 14604 on the display. Character user interface object 14604 has representations of limbs 14606 and 14608. As shown on user interface screen 14602, character user interface object 14604 may indicate a time, for example 7:50, through the positions of limbs 14606 and 14608.

A character user interface object may include any representation of a character, for example a human or anthropomorphized character. In some embodiments, a character may be a cartoon figure. In some embodiments, a character may be a realistic figure. In some embodiments, a character may be a human, animal, plant, other organism, or other object. In some embodiments a character may be a popularized character, such as a cartoon character.

Character user interface object 14604 may indicate time by indicating an hour with a first limb (e.g., limb 14606) and by indicating a minute with a second limb (e.g., limb 14608). In some embodiments, the character user interface object may be a static image that is updatable for different times. In some embodiments, the character user interface object may be animated and may depict movement. For example, the character user interface object may be animated to represent blinking of eyes, shifting its weight, and/or changing an expression (e.g., facial expression).

As described herein, a character user interface object may indicate a time through varying degrees of precision. As shown in FIG. 14B, a user interface screen may include one or more numerical indications of time values, i.e., numbers that indicate hour, minute, or second values on a clock face. However, since users are accustomed to perceiving clock faces, numerical indications of time values are optional, since the relative positioning of two objects resembling the hands of a clock may indicate an approximate time even without such numerical indications.

Any of the user interface screens described herein may further include one or more complications, such as indications of a date, a stopwatch, a chronograph, an alarm, and the like.

In addition, limbs of a character user interface object may indicate time to a user in various ways. For example, a limb (e.g., an arm or a leg) may indicate a time by its relative position on the display, or by "pointing" to a position on the display along a vector. A limb may also indicate a time by displaying an indicator of direction, such as a representation of a finger that indicates a position on the display corresponding to a time, either through its relative position or by pointing along a vector, as described above. A limb need not be precise in indicating a time.

Device 14000 may update the character user interface object to indicate a second time by reversing the roles of the first and second limbs, i.e., by indicating a second hour with the second limb and a second minute with the first limb. For example, FIG. 14B shows user interface screen 14610 that device 14000 may display. User interface screen 14610 includes character user interface object 14612. Character user interface object 14612 may be the same character user interface object as character user interface object 14604 but representing a different time.

As shown on user interface screen 14610, character user interface object 14612 is indicating a time, for example 8:20, through the positions of limbs 14614 and 14616. Comparing character user interface object 14604 and 14612, both have a first limb (limb 14606 and limb 14614, respectively) and a second limb (limb 14608 and limb 14616, respectively). However, character user interface object 14604's first limb (limb 14606) is indicating an hour, whereas character user interface object 14612's first limb (limb 14614) is indicating a minute. Similarly, character user interface object 14604's second limb (limb 14608) is indicating a minute, whereas character user interface object 14612's second limb (limb 14616) is indicating an hour.

In some embodiments, device 14000 may update the user interface object to indicate a second time by extending the first limb and retracting the second limb. As a user may be accustomed to a standard clock face, wherein the hour hand is shorter than the minute hand, altering the extension and/or retraction of the limbs when reversing their roles may make it easier for the user to keep track of the indicated times.

Allowing a character user interface object to indicate time using limbs with reversible roles increases the flexibility for displaying the character user interface object by allowing the character to maintain a natural appearance at all times. Otherwise, if the roles of the limbs were fixed, the character might contort in an awkward way at certain times of day, for example, between 12:30 and 12:40. Enabling the character to switch roles of the limbs affords more options for character postures and positions that may represent a more natural appearance, thereby enhancing the user's interactions with the device by portraying a more lifelike character user interface object.

Turning now to FIG. 14C, a user may wish to interact with a more natural-looking character user interface object. If a character user interface object indicates time with a limb that is always moving from a fixed position or role, this diminishes the natural appearance of the character because the range of motions and/or postures for the character is restricted. This can lead awkward postures and/or monotonous character appearance. A limb may indicate time via animations representing free movement from both endpoints of the limb, rather than a representation of rotation about an axis whereby one endpoint is always fixed, making the character user interface object appear more natural at different times of day.

It is understood that descriptions of mechanical motions (e.g., limb motion) used herein encompass displaying representations or simulations of mechanical motion.

FIG. 14C shows exemplary user interface screen 14702 that device 14000 can display on its display. In some embodiments, device 14000 may be one or more of devices 100 (FIG. 1), 300 (FIG. 3), and/or 500 (FIG. 5).

Device 14000 may display a character user interface object such as character user interface object 14704 on the display. Character user interface object 14704 has a representation of a limb 14706. As shown on user interface screen 14702, character user interface object 14704 may indicate a time, for example an hour such as 12, through the position of limb 14706. In some embodiments, the character user interface object may be a static image that is updatable for different times. In some embodiments, the character user interface object may be animated and may depict movement.

Limb 14706 has a first endpoint 14708 at a first position that serves as a representation of an axis of rotation for limb 14706. That is, the position of limb 14706 may be displayed or animated so as to represent rotation about endpoint 14708 to display different times of day. Limb 14706 also has a second endpoint 14710 at a second position that indicates a time value. In some embodiments, a time value may be an hour, a minute, and/or a second.

Device 14000 may update character user interface object 14704 to indicate a second time value by moving first endpoint 14708 to a third position, and moving second endpoint 14710 to a fourth position to indicate a second time value. Importantly, while first endpoint 14708 serves as an axis of rotation for limb 14706, first endpoint 14708 itself may also move to indicate time. Therefore, limb 14706 is able to adopt more natural postures because its positioning is afforded more flexibility. This enhances the lifelike appearance of the character.

As an example, user interface screen 14720 shows character user interface object 14722 with limb 14724 having first endpoint 14726 and second endpoint 14728. Character user interface object 14722 may be an updated display of character user interface object 14704. Comparing user interface screens 14702 and 14720, in particular limb 14706 and limb 14724, the position of the first endpoint has been updated, as reflected by the positions of first endpoints 14708 and 14726. First endpoint 14726 is at the third position, and second endpoint 14728 is at a fourth position to indicate the second time. As shown on user interface screens 14702 and 14720, limb 14706 has been updated to limb 14724 by (i) moving the position of first endpoint and (ii) rotating the limb at the axis of rotation.

In some embodiments, a character user interface object may include a representation of a second limb, such as second limb 14712. Like the first limb, second limb 14712 also has a first endpoint 14714 that is an axis of rotation for second limb 14712 and a second endpoint 14716. The position of second endpoint 14716 may indicate a third time value. For example, limb 14706 may indicate an hour value and limb 14712 may indicate a minute value. Device 14000 may update character user interface object 14704 to indicate a fourth time value by moving first endpoint 14714 of the second limb 14712 to a third position, and by moving second endpoint 14716 to a fourth position to indicate a second time value. This is depicted on user interface screen 14720, which depicts second limb 14730 with first endpoint 14732 at the third position and second endpoint 14734 at the fourth position.

As described above, first and second limbs of a character user interface object may each have two endpoints that may each change their position. In some embodiments, the first limb is connected to a torso at a first shoulder, and the second limb is connected to the torso at a second shoulder. In some embodiments, the torso connects the movements of each limb by each shoulder, such that a position of one shoulder may affect a position of the other shoulder. This feature adds to the lifelike and natural appearance of the character by coordinating or otherwise inter-relating the movements of both limbs, as with a living body.

Figure 14D:
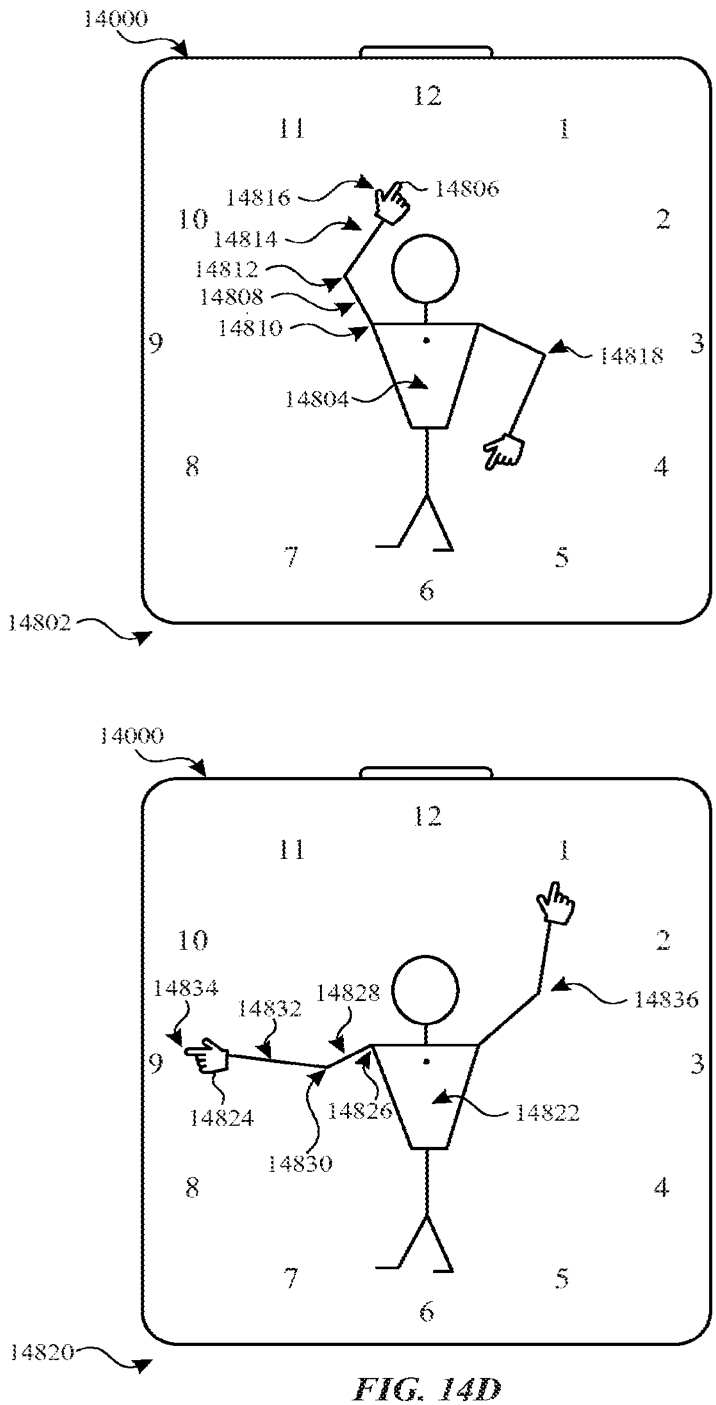

FIG. 14D shows exemplary user interface screen 14802 that device 14000 can display on its display. In some embodiments, device 14000 may be one or more of devices 100 (FIG. 1), 300 (FIG. 3), and/or 500 (FIG. 5).

Device 14000 may display a character user interface object such as character user interface object 14804 on the display. Character user interface object 14804 has a representation of a limb 14806. As shown on user interface screen 14802, character user interface object 14804 may indicate a time, for example an hour such as 12, through the position of limb 14806.

Limb 14806 has a first segment 14808 with a first endpoint 14810 at one end and a joint 14812 at the other. First endpoint 14810 has a first position. Limb 14806 also has a second segment 14814 with a second endpoint 14816 at one end and joint 14812 at the other. Therefore, first segment 14808 and second segment 14814 connect at joint 14812, which is an axis of rotation for second segment 14814. Second endpoint 14816 at the end of second segment 14814 (and hence, at one end of limb 14806) has a second position and indicates a first time value, for example an hour such as 12.

Device 14000 may update character user interface object 14804 to indicate a second time value by moving second endpoint 14814 along the axis of rotation to a third position to indicate the second time. Described in anthropomorphic terms, limb 14806 has representations of an upper arm 14808 and a forearm 14814 joined at an elbow 14812. Forearm 14814 may rotate at the elbow 14812 to indicate a different time. Adding a joint to a limb that indicates time is analogous to a hand of a clock, except that the arm is more natural looking than a clock hand because it includes a joint. Further, the joint enhances the potential range of motions that may be depicted by the limb.

User interface screen 14820 illustrates this by displaying character user interface object 14822 with limb 14824. In some embodiments, character user interface object may be the same object as character user interface object 14804 but in a different posture. Limb 14824 has a first endpoint 14826, first segment 14828, and joint 14830. Joint 14830 is connected to second segment 14832, which has second endpoint 14824. As demonstrated by comparing the features of character user interface objects 14804 and 14822, second endpoint 14834 is at a different position than second endpoint 14816, thus indicating a different time. This change in position is accomplished by rotating the second segment at the joint.

In some embodiments, moving the second endpoint may include depicting static images of the second endpoint at the first and third positions. In some embodiments, moving the second endpoint may include animating the character user interface object to translate the motion of the second endpoint on-screen.

In some embodiments, updating the character user interface object may include moving the first endpoint. As shown by user interface screen 14802 to user interface screen 14820, first endpoint 14810 may be moved to change the display of time, e.g., as shown by first endpoint 14826. Therefore, the character user interface object may have a limb that, in the arm analogy above, may rotate the upper arm at the shoulder, may move the shoulder itself, and may rotate the forearm at the elbow.

These features allow the character user interface object to assume a wider range of natural and lifelike postures with which to indicate time. If these features are animated on-screen, this allows the character to simulate the motion of a moving figure such as a person. This greatly improves user interaction with and connection to the device by more accurately simulating a moving figure like a person. It allows for both subtle and dynamic movements, giving the character a wider range of expressions that help simulate a personality of the character. Therefore, the character ceases to be a simple aggregation of two character-like clock hands that can only tell time and becomes more like an actual character that can express a personality, thereby enhancing the user's experiences with the device.

In some embodiments, the character user interface object (e.g., character user interface object 14804 and/or 14822) also includes a representation of a second limb, such as second limb 14818 as shown on user interface screen 14802 or second limb 14836 as shown on user interface screen 14820. As described above in reference to the first limb, a second limb may include a first segment connecting a first endpoint of the second limb to a joint and a second segment connecting a second segment to the joint. The first endpoint of the second limb may be at a first position, and the second endpoint of the second segment may be at a second position. The joint may serve as an axis of rotation for the second segment, which may indicate a third time value. Device 14000 may update the character user interface object by moving the second endpoint of the second limb along the axis of rotation at the joint to indicate a fourth time value.

In some embodiments, the first limb indicates an hour and the second limb indicates a minute. In some embodiments, the first limb indicates a minute and the second limb indicates an hour. The first limb and the second limb may be distinguished, for example, by length, as with traditional clock hands. The first limb and the second limb may be distinguished, for example, by the distance between the first and second endpoints. For example, one limb may be bent or the shoulder may be positioned such that, even though it may not be shorter than another limb, it appears shorter or otherwise distinct from another limb. The first limb and the second limb may be distinguished, for example, by the distance between the second endpoint and another object on the display, such as a numerical indication of time.

In some embodiments, updating the character user interface object to indicate the second time may include animating the character user interface object by translating the first endpoint on-screen. For example, the character may appear to move one or both shoulders. In some embodiments, the movement or position of one shoulder may affect the movement or position of another shoulder, simulating the connected motion of an actual figure such as a human.

In some embodiments, updating the character user interface object to indicate the second time may include animating the character user interface object by rotating the second segment at the joint on-screen. For example, the second segment may rotate at the joint like a forearm.

In some embodiments, the character user interface object may also translate on-screen, for example towards a center of the display.

Figure 14E:
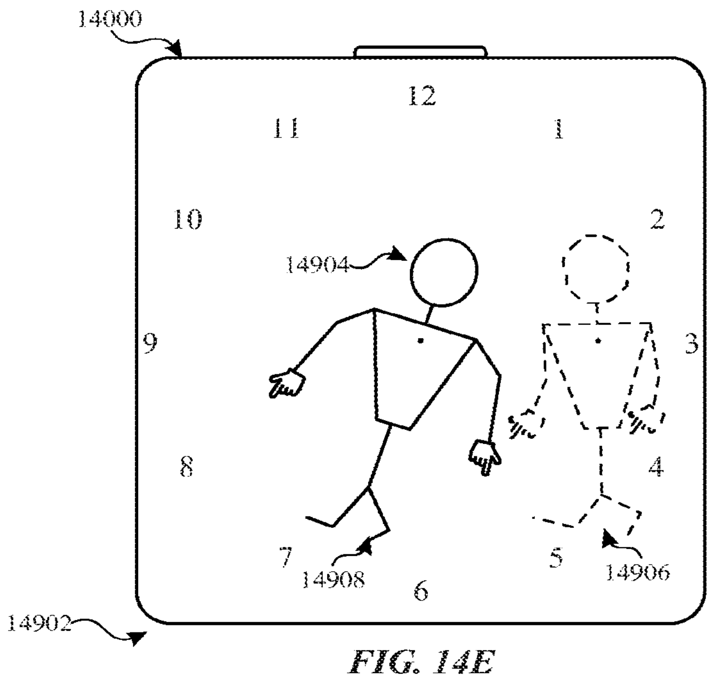

FIG. 14E shows exemplary user interface screen 14902 that device 14000 can display on its display. In some embodiments, device 14000 may be one or more of devices 100 (FIG. 1), 300 (FIG. 3), and/or 500 (FIG. 5). Device 14000 may display a character user interface object such as character user interface object 14904 on the display. User interface screen 14902 shows the translation of the character by sequential displays of character user interface object 14904 at two different locations, first at location 14906 and then at location 14908. Character user interface object 14904 is closer to the center of the display at location 14908, thus simulating motion in the right-to-left direction as shown in FIG. 14E. Motion such as this may be used, for example, when the user initiates an interaction with the device or looks at the device, which prompts the character to move to the center of the display and indicate a time.

In some embodiments, translating the character user interface object may include animating the character user interface object to represent walking, for example to the center of the display. Character user interface object 14904 illustrates this by depicting a character with legs and a torso. The different positions and postures represented by the legs and the torso of character user interface object 14904 at locations 14906 and 14908 represent walking. For example, in response to the user interacting with the device, the character may be animated to walk naturally onto the screen and then assume a position corresponding to the current time. The user interaction may include activating the screen, raising the device into a viewing position, pressing a button on the device that corresponds to activating a watch face, etc.

Figure 14F:
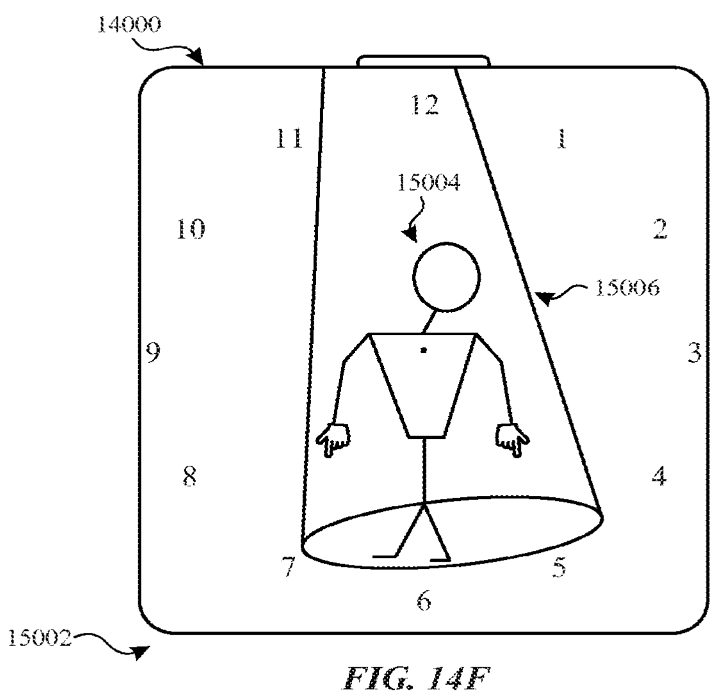

FIG. 14F shows exemplary user interface screen 15002 that device 14000 can display on its display. In some embodiments, device 14000 may be one or more of devices 100 (FIG. 1), 300 (FIG. 3), and/or 500 (FIG. 5). Device 14000 may display a character user interface object such as character user interface object 15004 on the display. Device 14000 may change a visual aspect of the displayed user interface screen to highlight the character user interface object. FIG. 14F illustrates an exemplary embodiment of this concept. User interface screen 15002 includes a spotlight 15006 that highlights character user interface object 15004.

In some embodiments, changing a visual aspect of the display could include one or more of changing the color and/or brightness of the user interface screen around the character user interface object, displaying a user interface object such as a spotlight, and so forth.

In some embodiments, device 14000 may animate the character user interface object to represent a response by the character user interface object to the changing of the visual aspect. As shown in the exemplary embodiment of FIG. 14F, character user interface object 15004 may be animated to simulate looking at spotlight 15006.

FIG. 14G shows exemplary user interface screen 15102 that device 14000 can display on its display. In some embodiments, device 14000 may be one or more of devices 100 (FIG. 1), 300 (FIG. 3), and/or 500 (FIG. 5). Device 14000 may display a character user interface object such as character user interface object 15104 on the display. Character user interface object 15104 may include a representation of a foot 15106. In some embodiments, character user interface object 15104 includes two limbs that indicate time values and two legs, at least one of which may include a foot.

In some embodiments, device 14000 may animate the foot to indicate passage of time. As shown on user interface screens 15102 and 15110, character user interface objects 15104 and 15112 include a foot (15106 and 15114, respectively). The different positions of feet 15106 and 15114 (different with respect to the position on the display and/or their posture within the character user interface object) depict this animation. For example, the character may be animated to simulate a motion of the foot, such as tapping. This may have a regular or irregular timing. In some embodiments, the foot is animated to move at a regular interval, such as once every second. When coupled with two limbs, this allows the character user interface object to depict, for example, hour, minute, and second time values.

In some embodiments, the first time and the second time depicted by the character user interface object are the same. In other words, the character user interface object may move by shifting a limb or any endpoint of a limb without depicting a different time. This allows the character to shift posture without changing the indicated time.

In some embodiments, the display may include one or more numerical indications of time. For example, the display may include a representation of a circular clock face with a character user interface object in the center encircled by numerical indicators, as with a clock.

The features described above allow a character user interface object to appear more natural and lifelike by adopting a wider range of natural motions while indicating a time. A user may wish to view representations of other events by the character user interface object. Allowing the character user interface object to react to external stimuli or internal system events portrays a more interactive character, thus depicting a closer representation of a personality. The enhanced interactivity of the character further improves the user's interactions with the device by providing additional notification that an event has occurred, the occurrence of which may not have been as apparent otherwise. A character user interface object may serve to supply notifications, reminders, and/or other information a user may wish to access from a personal electronic device, but the use of a character provides an interactive personality that the device may use to supply these items. Further, making the character responsive to internal system events (e.g., calendar events and the like) means the character is not strictly limited to responding to external user input. Put another way, the character appears to have a more lifelike personality because it responds to events not directly prompted by the immediate actions of the user.

Figure 14H:
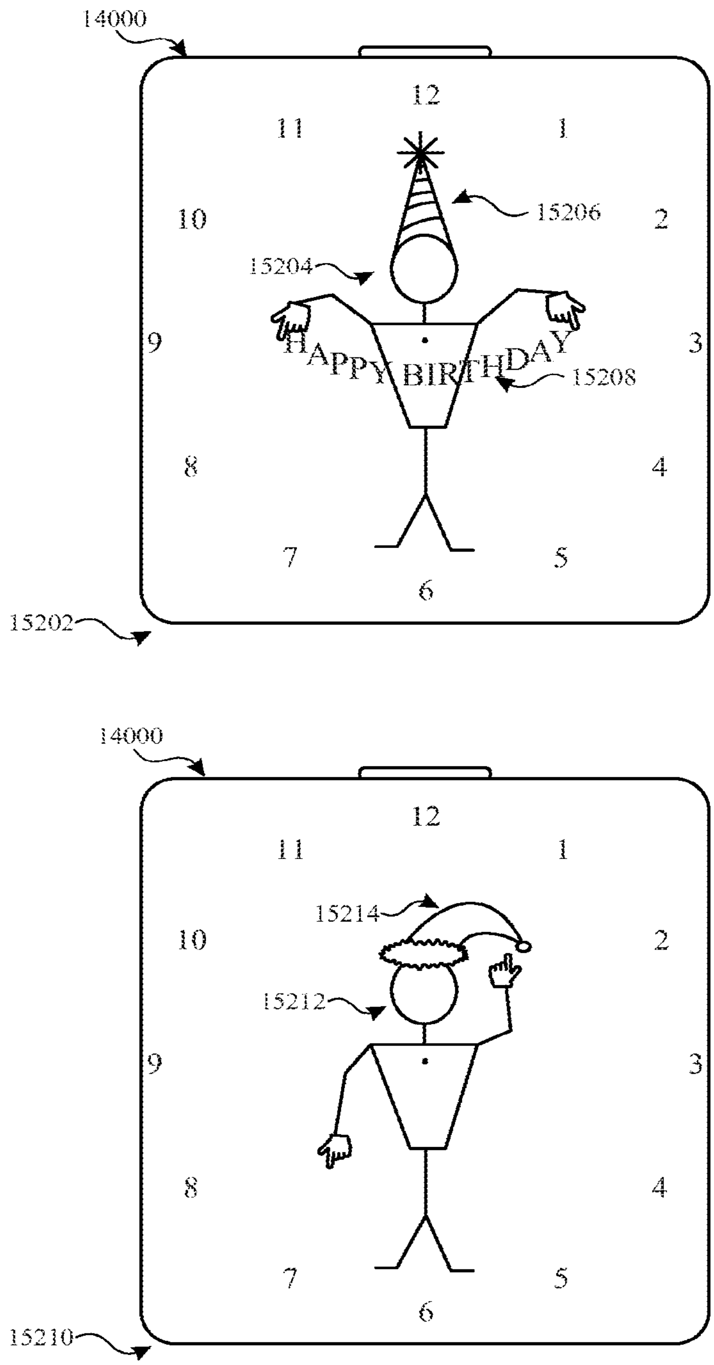

FIG. 14H shows exemplary user interface screen 15202 that device 14000 can display on its display. In some embodiments, device 14000 may be one or more of devices 100 (FIG. 1), 300 (FIG. 3), and/or 500 (FIG. 5). Device 14000 may display a character user interface object such as character user interface object 15204 on the display. Character user interface object 15204 indicates time as described above.

Device 14000 may receive first data indicative of an event. Device 14000 may determine whether the event meets a condition. In accordance with the determination that the event meets the condition, device 14000 may update character user interface object 15204 by changing a visual aspect of the character user interface object.

In some embodiments, after updating the displayed character user interface object, the character user interface object still indicates time. For example, the appearance or posture of the character may be altered, but the character still indicates time.

In some embodiments, after updating the displayed character user interface object, the character user interface object no longer only indicates time. For example, the character may adopt a posture, assume a facial expression, or use its limbs for a function other than indicating time, such as conveying a meaning related to the event and/or the condition.

In some embodiments, the first data indicates a calendar event. Device 14000 may receive data indicating a calendar event, for example, by obtaining data representing the event from a calendar application on device 14000. In this example, the condition may correspond to a duration of the calendar event. Determining whether the event meets the condition may include determining whether a current time is within the duration of the calendar event. For example, device 14000 may obtain a current time and determine whether the current time is within a duration of the calendar event (e.g., during the calendar event, or substantially contemporaneous with the calendar event but slightly preceding or slightly delayed after it).

An exemplary embodiment is shown on user interface screen 15202. In some embodiments, the calendar event is a birthday. In some embodiments, the birthday is a user's birthday. In some embodiments, updating the displayed character user interface object may include animating the character user interface object to display a birthday greeting. Character user interface object 15204 is animated to display festive hat 15206 and birthday banner 15208. This animation serves to notify the user of a birthday while making the character more interactive. Importantly, the character may change a visual aspect, such as by displaying a birthday greeting, without immediate input by the user, thus giving the impression that the character is able to act more autonomously, as with a personality. In some embodiments, the modification of the character is an indication of some important event related to one of the user's contacts, such as their birthday, anniversary, etc.

An exemplary embodiment is shown on user interface screen 15210. In some embodiments, the calendar event is a holiday. In some embodiments, updating the displayed character user interface object may include changing a visual aspect of the character user interface object to reflect the holiday. In this example, character user interface object 15212 depicts this through Santa Claus hat 15214. This animation serves to notify the user of the holiday while making the character more interactive and decreasing the monotony of character appearance. Other examples of holidays besides Christmas may include New Year's Eve or New Year's Day, Thanksgiving, Hanukkah, the 4th of July, St. Patrick's Day, Valentine's Day, and the like.

In some embodiments, device 14000 may receive data indicating a user preference, such as a user's favorite sports team. In accordance with receiving the data, device 14000 may update character user interface object 15204 by changing a visual aspect of the character user interface object to reflect the sports team. For example, the appearance of the character user interface object may be updated to portray the character user interface object wearing a uniform or other paraphernalia representing the sports team (e.g., a hat, jersey, uniform, or other representation include a logo, icon, or text representing the sports team). The display may also be updated to include with the character user interface object a second user interface object representing a sports object associated with the team's sport (e.g., a baseball bat and/or baseball, football, basketball, soccer ball, hockey stick and/or hockey puck, checkered flag, and so forth). The character may be updated in accordance with a determination that the team is playing that day or at that time, or in accordance with a determination that the user is going to attend an event featuring the team. The determination that the user is going to attend an event featuring the team may be made through an analysis of the user's calendar events or through a determination that an electronic ticket for an event is present on the electronic device or a paired electronic device. It is understood that a user's favorite sports team is merely an exemplary user preference, and other user preferences such as a representation of a flag or country are also contemplated.

Figure 14I:
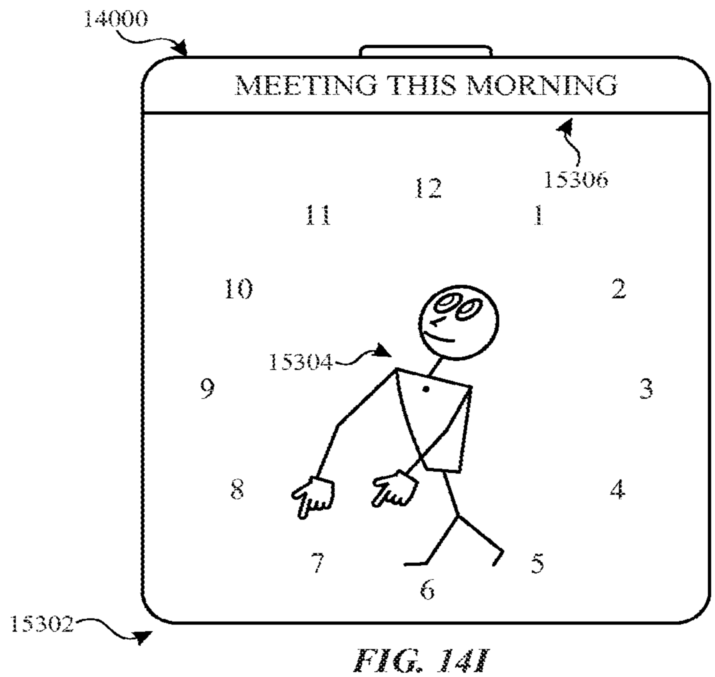

FIG. 14I shows exemplary user interface screen 15302 that device 14000 can display on its display. In some embodiments, device 14000 may be one or more of devices 100 (FIG. 1), 300 (FIG. 3), and/or 500 (FIG. 5). Device 14000 may display a character user interface object such as character user interface object 15304 on the display. Character user interface object 15304 indicates time as described above.

Device 14000 may receive data indicating a notification. A notification may include, for example, an email, text message, reminder, virtual assistant request, or other such notification. Device 14000 may further display the notification, or an affordance or user interface object representing receipt and/or a content of the notification, on user interface screen 15302, as depicted by notification 15306. Device 14000 may animate character user interface object 15304 to react to notification 15306. For example, as shown on user interface screen 15302, character user interface screen 15304 may appear to look at notification 15306. This may include, for example, a change in posture such that the character faces the notification, or a change in the appearance of the character, such as a face, to indicate looking in the direction of the notification. Again, by providing this change in posture or change in the character's focus, the user may be notified of an incoming alert or event that may otherwise have been less apparent.

Figure 14J:
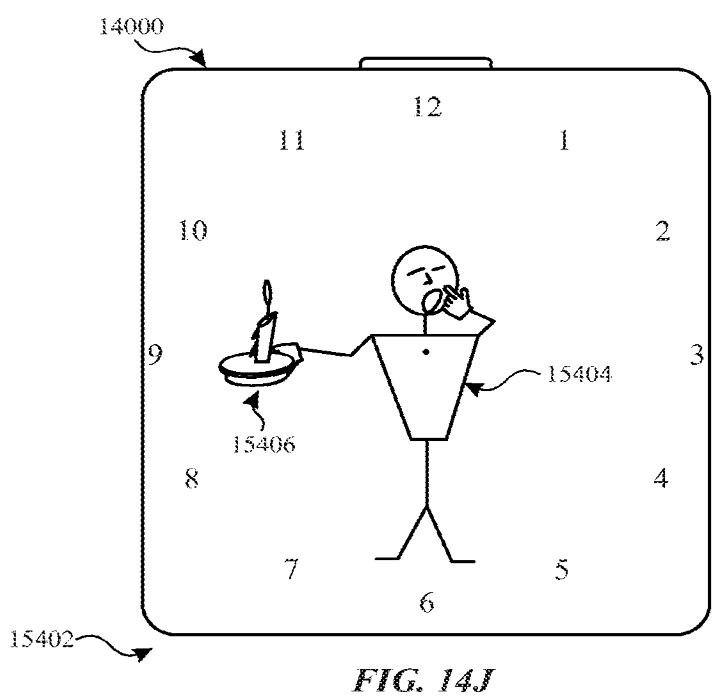

FIG. 14J shows exemplary user interface screen 15402 that device 14000 can display on its display. In some embodiments, device 14000 may be one or more of devices 100 (FIG. 1), 300 (FIG. 3), and/or 500 (FIG. 5). Device 14000 may display a character user interface object such as character user interface object 15404 on the display. Character user interface object 15404 indicates time as described above.

Device 14000 may receive first data indicating a time of day. A time of day could include a current time. Device 14000 may determine that the time of day meets a condition, such as by determining whether the time of day is within the nighttime portion of the day. Device 14000 may change a visual aspect of character user interface object 15404 to represent nighttime. As shown in user interface screen 15402, character user interface object 15404 represents nighttime by depicting a yawn and holding candle 15406. In some embodiments, character user interface object 15404 may be altered to depict wearing clothing associated with nighttime, such as pajamas. In some embodiments, the character interface object is modified to yawn or wear pajamas in accordance with a determination that the user should go to sleep. The determination may be based on, for example, any of a preset time, recognition of a pattern of the user's sleep, indication of an early event on the next day's calendar, recognition that the user has been active for longer than a predetermined time, etc.

Figure 14K:
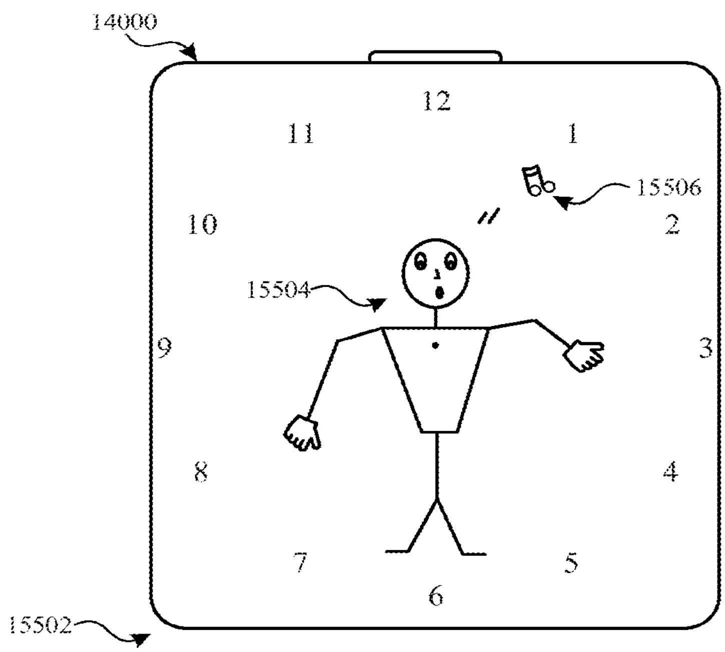

FIG. 14K shows exemplary user interface screen 15502 that device 14000 can display on its display. In some embodiments, device 14000 may be one or more of devices 100 (FIG. 1), 300 (FIG. 3), and/or 500 (FIG. 5). Device 14000 may display a character user interface object such as character user interface object 15504 on the display. Character user interface object 15504 indicates time as described above.

Device 14000 may receive data indicating a current time. Device 14000 may determine whether the current time corresponds to an hour on the hour (for example, 1:00, 2:00, and so forth). Device 14000 may determine whether the current time is an hour on the hour and if so, animate the character user interface object to announce the hour on the hour for one or more hours. As shown in user interface screen 15502, character user interface object 15504 announces the current hour by depicting musical note 15506. In some embodiments, the announcement of the hour could include a visual depiction of an announcement, such as by displaying a user interface object. In some embodiments, the announcement of an hour could include a sound such as a whistle, chime, one or more spoken words, or a bell toll.

Figure 14L:
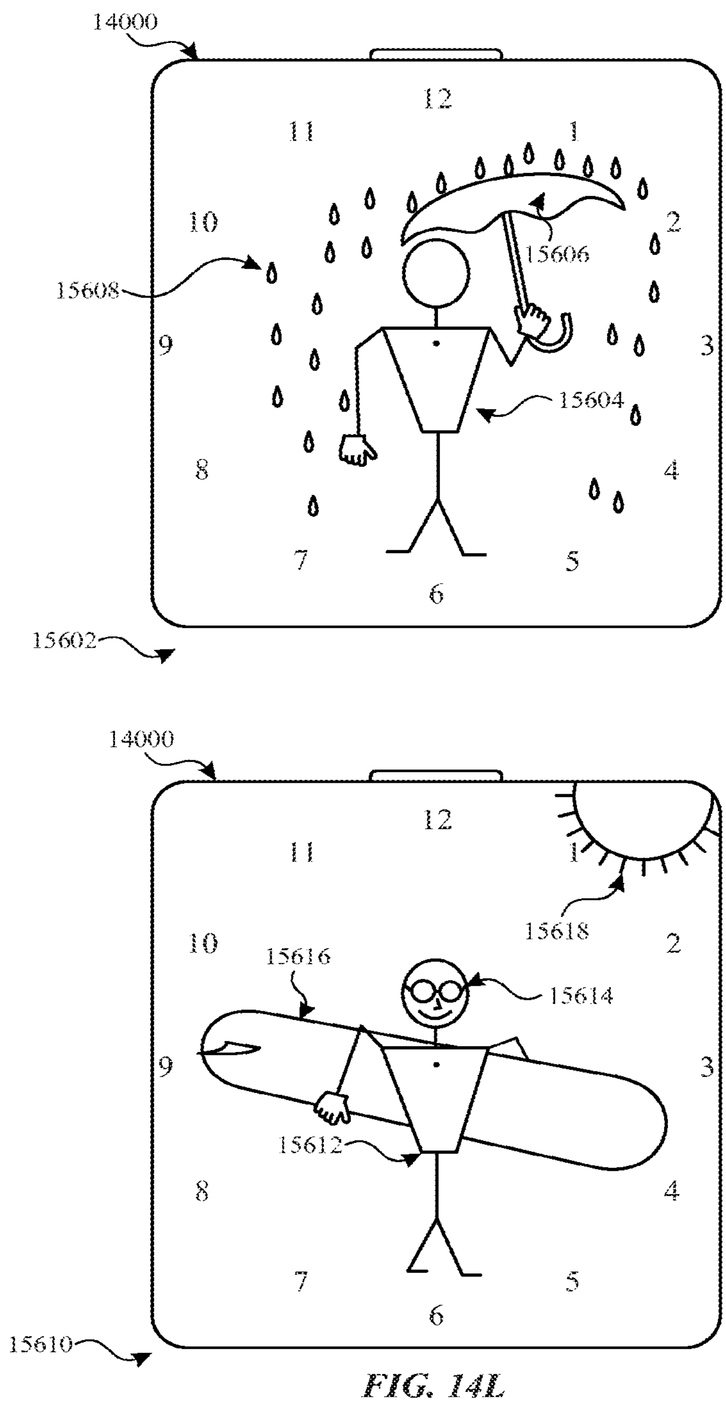

FIG. 14L shows exemplary user interface screen 15602 that device 14000 can display on its display. In some embodiments, device 14000 may be one or more of devices 100 (FIG. 1), 300 (FIG. 3), and/or 500 (FIG. 5). Device 14000 may display a character user interface object such as character user interface object 15604 on the display. Character user interface object 15604 indicates time as described above.

Device 14000 may receive data indicating current or forecasted weather. To receive data indicating current or forecasted weather, device 14000 may retrieve weather information from an external server. In some embodiments, device 14000 may retrieve weather information from a weather service, such as The Weather Channel, Accuweather, The National Weather Service, Yahoo! ™ Weather, Weather Underground, and the like.

Device 14000 may determine whether the current or forecasted weather corresponds to one or more designated weather conditions. Designated weather conditions may be system-designated and may include favorable weather conditions such as sunshine or inclement weather conditions such as rain, thunderstorms, wind, snow, and so forth. If device 14000 determines that the current or forecasted weather corresponds to one or more designated weather conditions, device 14000 may update the character user interface object to reflect the current or forecasted weather. For example, as shown in FIG. 14L, user interface screen 15602 includes character user interface object 15604 with umbrella 15606, as well as raindrops 15608. In some embodiments, device 14000 may display a user interface object to reflect the designated weather condition. In some embodiments, the character user interface object may be animated to react to the user interface object reflective of a designated weather condition. As another example, user interface screen 15610 displays character user interface object 15612 with sunglasses 15614 and surfboard 15616, as well as sun 15618.

Figure 14M:
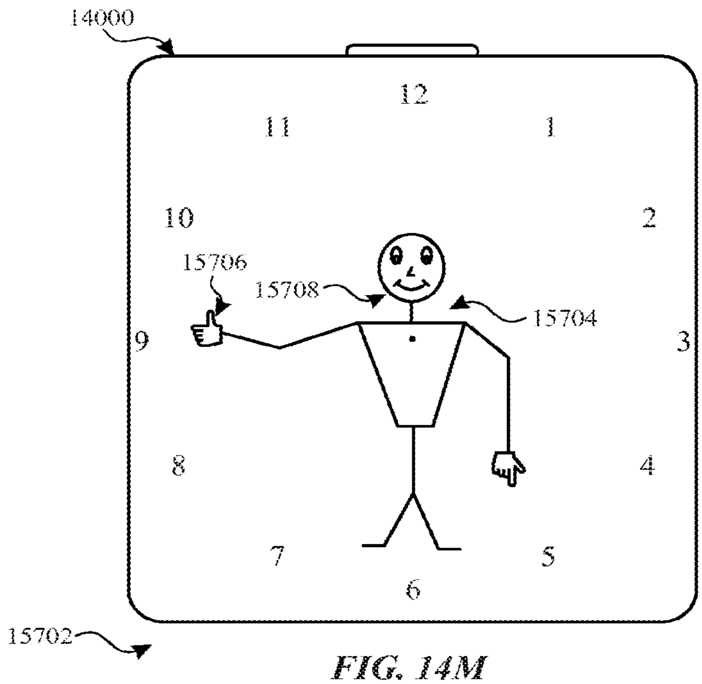

FIG. 14M shows exemplary user interface screen 15702 that device 14000 can display on its display. In some embodiments, device 14000 may be one or more of devices 100 (FIG. 1), 300 (FIG. 3), and/or 500 (FIG. 5). Device 14000 may display a character user interface object such as character user interface object 15704 on the display. Character user interface object 15704 indicates time as described above.

Device 14000 may receive data indicating a second electronic device. Device 14000 may determine whether the data corresponds to a threshold proximity of the second electronic device to device 14000. If so, device 14000 may update character user interface object 15704 by animating the character user interface object to react to the second electronic device. As shown in user interface screen 15702, character user interface object 15704 may depict thumbs up 15706 or smile 15708. In some embodiments, the posture of the character user interface object may be updated to reflect the proximity and/or direction of the second device. For example, the character user interface object may react in the direction of the device or be reflected on the display. In some embodiments, data indicating a second electronic device may be provided through a server, which may provide the location of the user's contacts that have agreed to provide their location data, such as Find My Friends. Data indicating a second electronic device may also be provided through a local network, for example, a recognition that one of the user's contacts has joined the same WiFi network. Data indicating a second electronic device may also be provided by the second electronic device itself, such as the second electronic device announcing itself through Bluetooth, Near Field Communication, etc.

In some embodiments, a device (such as device 14000) displaying a character user interface object indicating time may receive data indicating user activity. For example, the device may include a user activity monitor (such as a workout monitor), an accelerometer, a gyroscope, a motion sensor, and/or a combination thereof. The device may determine whether the data indicating user activity is received outside of a threshold interval after a previous user activity. For example, the device may determine whether a threshold period of time has elapsed since the last data indicating user activity (e.g., the last user workout). If the device determines that the data indicating user activity is received outside of the threshold interval after a previous user activity, the device may animate the character user interface object to reflect inactivity. For example, the character may change an expression and/or posture to represent boredom, a sedentary or recumbent posture, a sullen or apathetic appearance, and so forth.

Figure 14N:
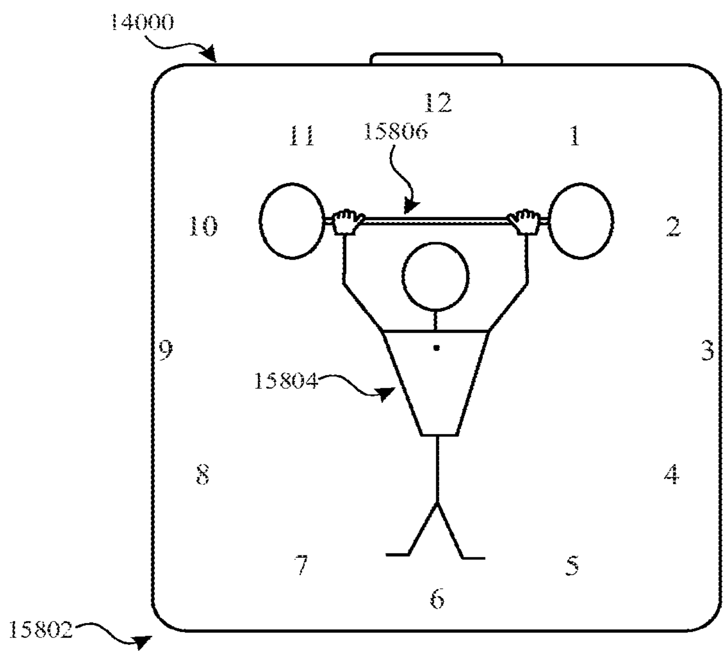

FIG. 14N shows exemplary user interface screen 15802 that device 14000 can display on its display. In some embodiments, device 14000 may be one or more of devices 100 (FIG. 1), 300 (FIG. 3), and/or 500 (FIG. 5). Device 14000 may display a character user interface object such as character user interface object 15804 on the display. Character user interface object 15804 indicates time as described above.

Device 14000 may receive data indicating user activity. For example, the device may include a user activity monitor (such as a workout monitor), an accelerometer, a gyroscope, a motion sensor, and/or a combination thereof. Device 14000 may determine whether the user activity is current user activity, and, if so, animate character user interface object 15804 to represent exercise. For example, user interface screen 15802 includes character user interface object 15804 and barbell 15806. In some embodiments, device 14000 may animate the character user interface object to depict an activity related to exercise, such as motion, running, weight lifting, swimming, bicycling, pushups, and/or sweat, heavy breathing, or any other signs of physical exertion. In some embodiments, the activity monitor may include options for the user to indicate which activity they are going to begin. In these cases the character appearance may be changed to reflect the selected activity option.

Figure 14O:
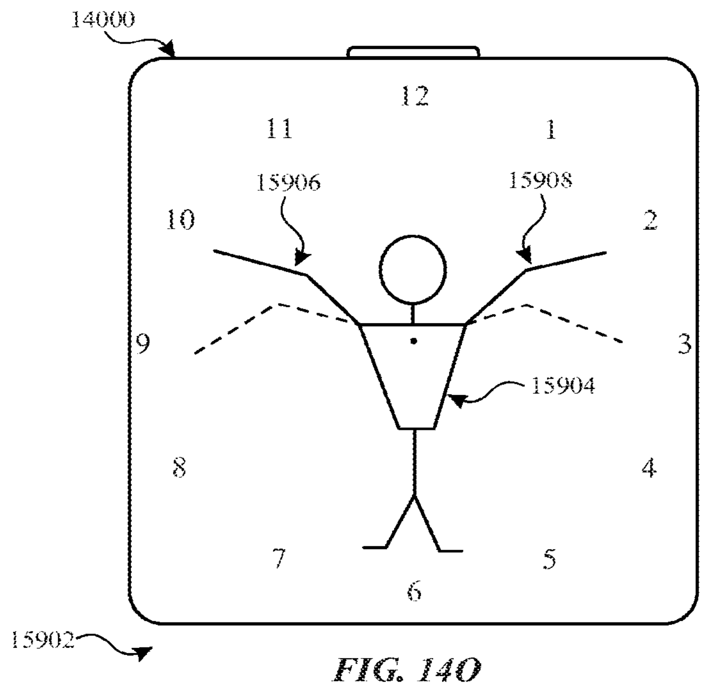

FIG. 14O shows exemplary user interface screen 15902 that device 14000 can display on its display. In some embodiments, device 14000 may be one or more of devices 100 (FIG. 1), 300 (FIG. 3), and/or 500 (FIG. 5). Device 14000 may display a character user interface object such as character user interface object 15904 on the display. Character user interface object 15904 indicates time as described above.

Device 14000 may receive data indicating user movement of the device, for example by using an accelerometer, directional sensor (e.g., compass), gyroscope, motion sensor, and/or a combination thereof, and so forth. Device 14000 may determine whether the data indicating user movement is received outside of a threshold interval after a previous user movement. For example, device 14000 may determine whether a threshold period of time has elapsed since the last data indicating user movement (e.g., picking up the device, a motion indicative of a user wrist movement, and so forth). If device 14000 determines that the data indicating user movement is received outside of the threshold interval after a previous user movement, device 14000 may animate the character user interface object to indicate fatigue. For example, user interface object 15904 includes limbs 15906 and 15908. Device 14000 may animate character user interface object 15904 to droop one or more of limbs 15906 and 15908. In some embodiments, device 14000 may animate character user interface object 15904 to shift position, portray physical effort, and the like.

Figure 14P:
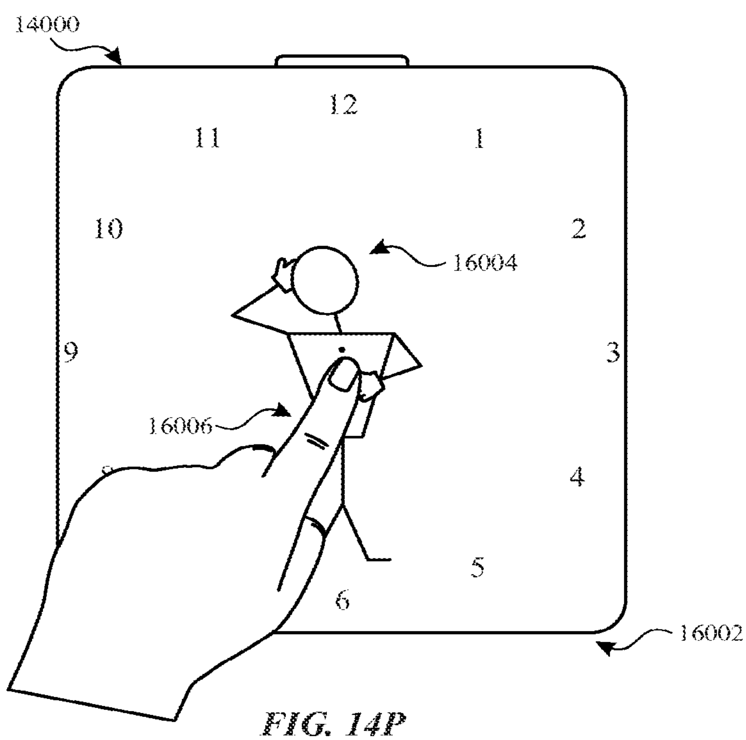

FIG. 14P shows exemplary user interface screen 16002 that device 14000 can display on its display. In some embodiments, device 14000 may be one or more of devices 100 (FIG. 1), 300 (FIG. 3), and/or 500 (FIG. 5). Device 14000 may display a character user interface object such as character user interface object 16004 on the display. Character user interface object 16004 indicates time as described above.

Device 14000 may receive data indicating a user contact on the touch-sensitive surface (e.g., a touchscreen). Device 14000 may determine whether the user contact corresponds to a user contact on character user interface object 16004. In some embodiments, the user contact may be on a touchscreen at the position of the character user interface object. In some embodiments, the user may input information to manipulate a cursor or other indicator to contact the displayed character user interface object. For example, as shown on user interface screen 16002, a user may contact character user interface object 16004 with touch 16006.

If device 14000 determines that the user contact corresponds to a user contact on character user interface object 16004, device 14000 may animate character user interface object 16004 to react to the contact. In some embodiments, the reaction may be a specific to the location of the contact on the character user interface object. In some embodiments, the reaction may be a general reaction. In some embodiments, the reaction may include, for example, reacting as to tickling, hugging, or other forms of friendly contact. In some embodiments, character user interface object 16004 may display a second animation distinct from the first animation in response to a second user contact.

Figure 14Q:
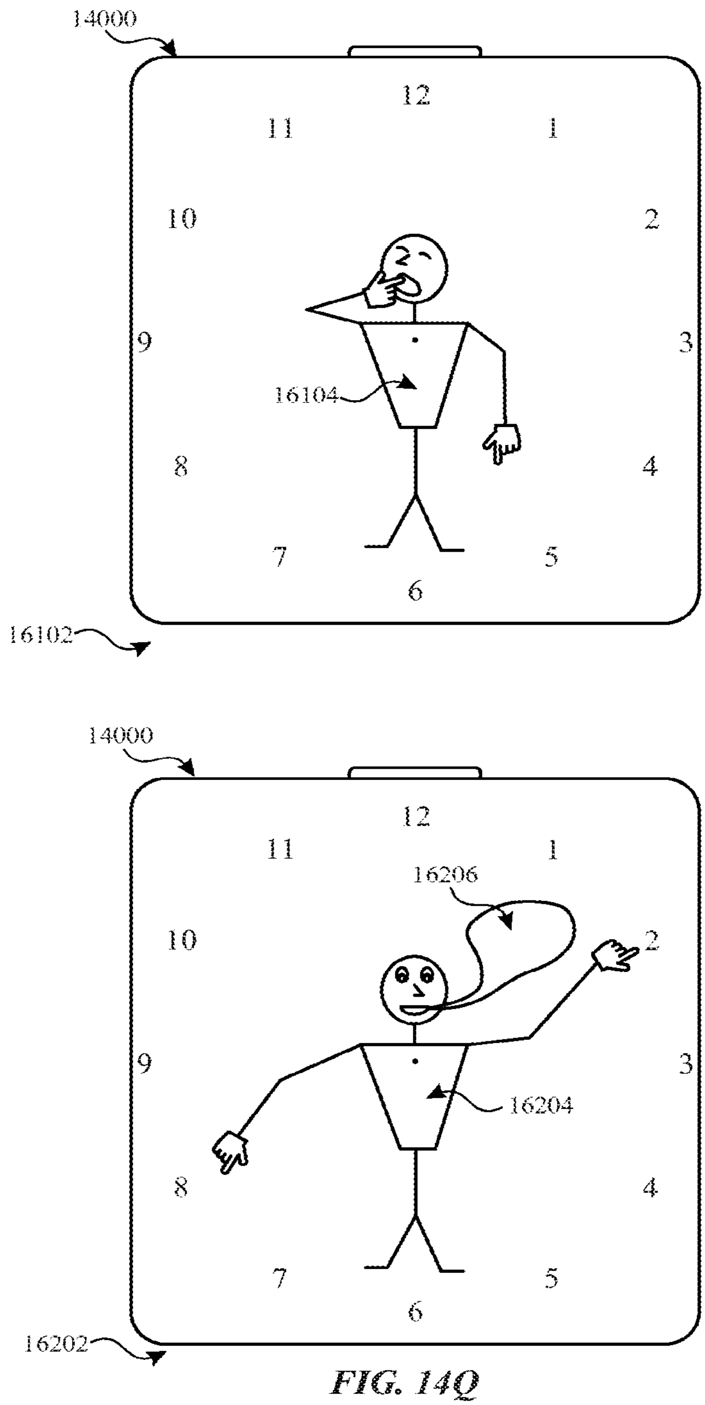

FIG. 14Q shows exemplary user interface screens 16102 and 16202 that device 14000 can display on its display. In some embodiments, device 14000 may be one or more of devices 100 (FIG. 1), 300 (FIG. 3), and/or 500 (FIG. 5). Device 14000 may display character user interface object 16104 on the display. Character user interface object 16104 indicates time as described above. As shown in FIG. 14Q, in some embodiments, character user interface object 16104 may depict a facial expression, such as a yawn. In some embodiments, character user interface object 16204 may depict speech, such as by presenting text in a displayed user interface object or affordance representing speech balloon 16206 or a thought balloon. Speech may be depicted to visually present an announcement made by a character user interface object, such as an announcement of the hour as described above with reference to character user interface object 15504 in FIG. 14K.

FIG. 14R shows exemplary user interface screens 16302 and 16402 that device 14000 can display on its display. In some embodiments, device 14000 may be one or more of devices 100 (FIG. 1), 300 (FIG. 3), and/or 500 (FIG. 5). Device 14000 may display character user interface object 16304. Character user interface object 16304 indicates time as described above. As shown in FIG. 14R, in some embodiments, character user interface object 16304 may depict boredom or fatigue, as described above. In some embodiments, the character user interface object may depict attire. For example, character user interface object 16404 may depict a sports team or a sports object (e.g., baseball 16406 and bat 16408), such as those representing the user's favorite sports team, as described above.

Figure 14S:
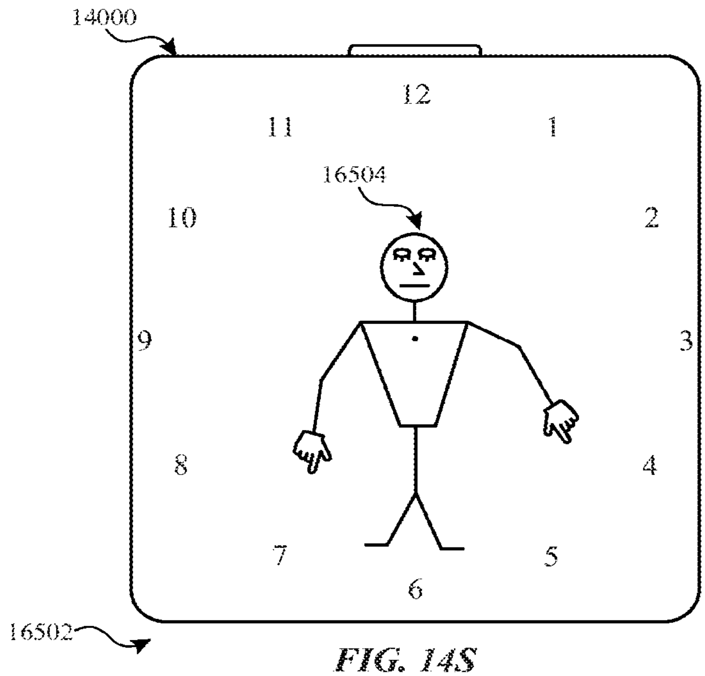

FIG. 14S shows exemplary user interface screen 16502 that device 14000 can display on its display. In some embodiments, device 14000 may be one or more of devices 100 (FIG. 1), 300 (FIG. 3), and/or 500 (FIG. 5). Device 14000 may display character user interface object 16504. Character user interface object 16504 indicates time as described above. As shown in FIG. 14S, in some embodiments, character user interface object 16504 may depict a facial expression, such as blinking, closing, or winking one or more the eyes. The character interface object may change facial expression at predetermined or random intervals to provide an indication to the user that the interface is still active.

Figure 14T:
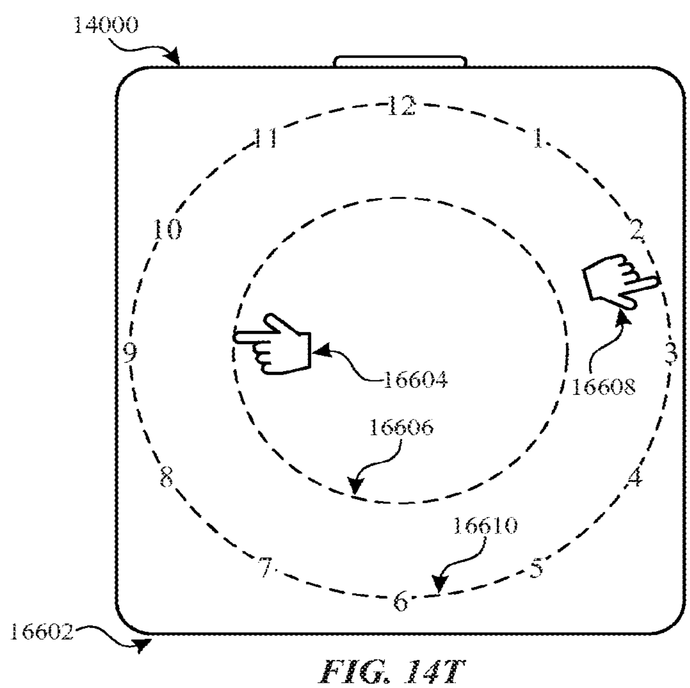

FIG. 14T shows exemplary user interface screen 16602 that device 14000 can display on its display. In some embodiments, device 14000 may be one or more of devices 100 (FIG. 1), 300 (FIG. 3), and/or 500 (FIG. 5). Device 14000 may display a character user interface object on the display. The displayed character user interface object indicates time as described above. As shown in FIG. 14T, in some embodiments, the character user interface object includes one or more second endpoints, such as a second endpoint of a limb and a second endpoint of a second limb, as described above. In some embodiments, the second endpoint 16604 of a first limb may indicate an hour and be positioned along the circumference of a first circle 16606. The second endpoint 16608 of a second limb may indicate a minute and be positioned along the circumference of a second circle 16610 that encircles the first circle 16606 and has a larger circumference than the first circle 16606. In this way, the user may distinguish which limb indicates an hour and which limb indicates a minute by the relative closeness to an edge of the display or to one or more displayed numerical indications of time.

In some embodiments, a device (such as device 14000) may detect a user input and, in response to detecting the user input, display a character user interface object. For example, the display of the device may show another display or be dark, then display the user interface object on the screen in response to the user input. In some embodiments, the user input may be a movement of the device (e.g., picking up the device, a motion indicative of a user wrist movement, and so forth). In some embodiments, the user input may be a touch on the touch-sensitive surface (e.g., a touchscreen).

Figure 14U:
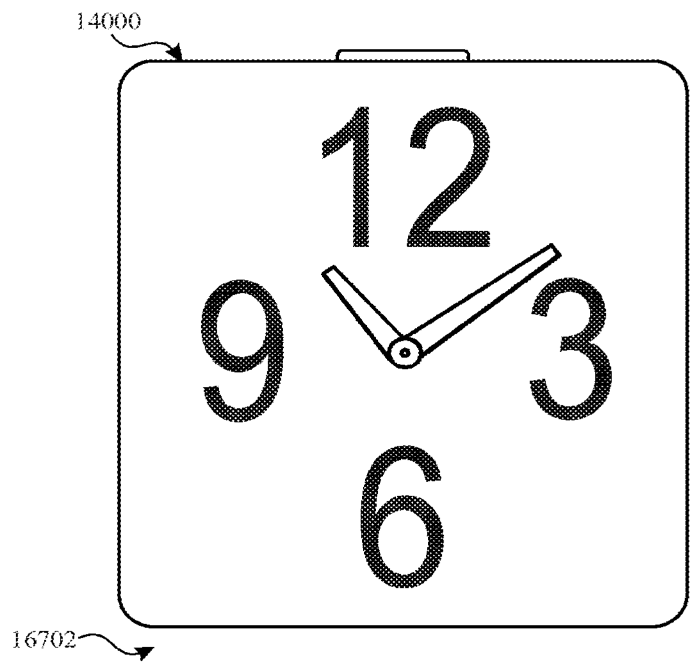

Turning now to FIG. 14U, users rely on personal electronic devices to keep time throughout the day. It is becoming increasingly desirable to present the user with interactive user interfaces that promote user interaction with a personal electronic device. Indicating the time through a cardinal-numbers-based user interface may enhance a user's interaction with the device. Increasing the level of simplicity of the interface screen, while still providing adequate cardinal numbers for simple and intuitive timekeeping, may increase the space available on small devices for additional information to be displayed, thereby enhancing and prolonging user interactions with the device.

Accordingly, provided herein are context-specific user interfaces that include a clock face featuring four cardinal numbers. A user may wish for such cardinal-numbers-based user interface to be easily readable and to leave adequate room (especially at the corners of a square screen) for additional information.

FIG. 14U shows exemplary user interface screen 16702 that device 14000 can display on its display. In some embodiments, device 14000 may be one or more of devices 100 (FIG. 1), 300 (FIG. 3), and/or 500 (FIG. 5).

Device 14000 may display interface 16702, including a clock face comprising one or more cardinal numbers. The clock face may be a representation of an analog clock featuring an hour hand, a minute hand, and a second hand. The cardinal numbers may each correspond to one of the 12 numbers that traditionally appear on a clock face, and they may appear in a position on the display corresponding to the respective number's usual position on a clock face. For example, the number "12" may appear at the top center of the display, the number "3" at the center right, the number "6" at the bottom center, and the number "9" at the center left. In some embodiments, fewer than four cardinal numbers may be used, such as only three or only two. In some embodiments, numbers other than "12," "3," "6," and "9" may be used; for example, interface 16702 could display a clock face featuring only the numbers "10, "2," and "6."

In some embodiments, the cardinal numbers displayed on interface 16702 may be displayed at a large enough size such that all 12 numbers of a traditional clock face could not be simultaneously displayed on a display of device 14000 at the same size. The smaller number of cardinal numbers displayed may thus be easier to read due to their larger size. In some embodiments, the number of cardinal numbers displayed is maintained at less than 12, even though sufficient space is available to display additional numbers, in order to maintain simplicity.

In some embodiments, a user is able to modify font settings and color settings of the cardinal-numbers-based interface. In some embodiments, different fonts may be used to render one or more of the displayed cardinal numbers. The same font may be used for all of the cardinal numbers, or a different font may be used for one or more of the numbers. In some embodiments, the font used is a system font that is a default font for an operating system of device 14000. In some embodiments, other fonts are available that reflect modifications or stylizations of the default system font. For example, fonts may be used that reflect a shadowed stylization of the system font, a rounded stylization of the system font, a striped stylization of the system font, a stencil stylization of the system font, an embossed stylization of the system font, a bold stylization of the system font, an italic stylization of the system font, etc. Stylizations of the system font may be used in place of or in addition to fonts that are unrelated to the system font. Using stylizations of the system font may create a consistent look and feel to the interface of the device while still allowing the user to customize the font.

In some embodiments different colors may be selected by a user to apply to all of the cardinal numbers or to one of the individual cardinal numbers. In some embodiments, a user may select a color theme that applies to one or more of the cardinal numbers, or to all of the cardinal numbers; a theme may be a curated selection of colors that are predetermined to correspond to one another. In some embodiments, a user may select an option to apply a gradient color scheme to one or more of the cardinal numbers. In some embodiments, a user may select an option to apply a color setting to one or more of the cardinal numbers such that the color or colors of the one or more cardinal numbers change over time, either according to a predetermined schedule or in accordance with contextual factors.

In some embodiments, a user may set the font settings or color settings of the device from an edit interface. For example, a user may apply a hard-press to the clock face of interface 16702 to activate an edit state. In the edit interface, a user may tap the clock face or a specific cardinal number to select one or more of the cardinal numbers. The selected one or more cardinal numbers may be highlighted in any suitable manner, including by being displayed in a larger size, to indicate that the one or more cardinal numbers are selected for editing. While the one or more cardinal numbers are selected for editing, the user may rotate a rotatable input mechanism of device 14000 in order to change the font or color setting by scrolling through settings. The setting may be arranged in an ordered progression such that the user may scroll through the available choices. In some embodiments, the ordered progression may loop around from one end to the other, such that when the user reaches the final setting in the ordered progression, he may proceed in the same direction to the first setting in the ordered progression.

In some embodiments, in the edit interface, paging dots may appear at the top of the interface to indicate to the user how many different pages are available in the edit interface. For example, an edit interface may have two pages, a first for editing color and a second for editing font. As described above, a user may select one or more of the cardinal numbers for editing in on one of the pages, and may use the rotatable input mechanism to change the setting. A user may then perform a horizontal swipe input detected by device 14000 in order to page to the adjacent page. For example, if the leftmost page is a page for editing color, then a user may swipe to the left in order to page to the right and access a page for editing font. At the font editing page, the user may edit font settings in a similar manner as described above. In some embodiments, a selection of one or more of the cardinal numbers for editing is maintained when a user pages between pages in the edit interface, while in other embodiments selections are cleared when a user pages.

In some embodiments, the edit interface may include additional pages for editing additional settings, or may enable editing one or more settings of the interface (such as an information density setting) in response to rotation of the rotatable input mechanism without having any of the cardinal numbers selected for editing.

In some embodiments, interface 16702 may display, in addition to the clock face, one or more other user interface objects, such as complications, that present information to the user. In some embodiments, the complications displayed may be customizable by the user in accordance with the methods described above. In some embodiments, complications may be displayed in predefined locations in interface 16702, such as at the corners. There may be sufficient room for clear and unobstructed display of complications in the corners of interface 16702 because the cardinal numbers may not occupy that space. In some embodiments, interface 16702 may feature no complications or other user interface objects, and may feature only the cardinal-numbers clock face.

2. Editing Context-Specific User Interfaces

The context-specific user interfaces described and illustrated herein provide numerous elements and features that a user may customize, depending upon a particular context. As described, these customizable elements enhance the user interfaces, making them more personal and interactive to the user.

At the same time, a user also wants a device that is easy and intuitive to use. Providing a multitude of features only serves to frustrate the user if the user interface does not provide comprehensible ways to edit these features. Described below are user interfaces for editing context-specific user interfaces that provide easy and intuitive methods that facilitate user customization.

Importantly, it is to be appreciated that, while particular embodiments such as clock faces may be described with respect to particular editing features, these editing features may also apply to one or more of the other user interfaces described herein. For example, a method for customizing a color of a clock face may be used to change the color of a seconds hand, change an animated object (e.g., a butterfly), or change a clock face background (e.g., a photo or image of a scene). Similarly, methods for customizing complications may be used to add and/or edit various complications on any clock face, regardless of whether an embodiment of that clock face bearing a particular complication was described herein. A skilled artisan will recognize that the methods described below provide user interface functionalities that may be applied to elements and aspects of various context-specific user interfaces in numerous combinations, such that each possible combination would be impossible to elaborate individually.

It is to be further appreciated that references to a "clock face" with respect to clock face editing and/or selection as described herein are not in any way limited to a traditional notion of a "clock face," e.g., a circular display with hour indications and one or more hands to indicate time, or a representation of a digital clock. Any context-specific user interface with an indication of time described herein may properly be termed a clock face.

Figure 15:
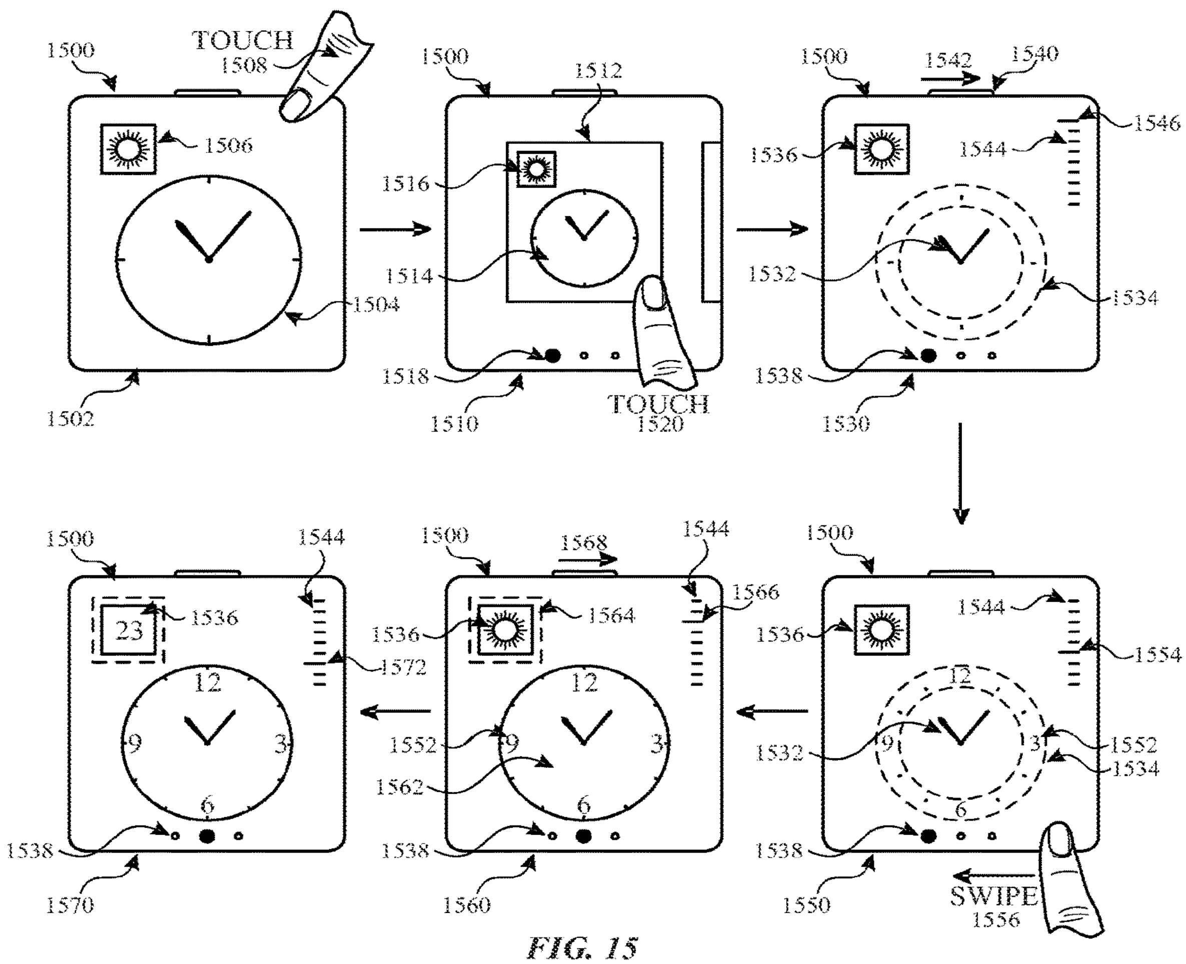
FIG. 15 illustrates exemplary context-specific user interfaces.

Attention is now directed to FIG. 15. FIG. 15 shows exemplary context-specific user interfaces that may be operated on device 1500. Device 1500 may be device 100, 300, or 500 in some embodiments. The electronic device has a touch-sensitive display (e.g., touchscreen 504) configured to detect the intensity of contacts. Exemplary components for detecting the intensity of contacts, as well as techniques for their detection, have been referenced and described in greater detail above.

Device 1500 displays user interface screen 1502, which includes clock face 1504. Clock face 1504 also includes complication 1506 that displays a set of information from a weather application (e.g., current weather conditions). In this example, the user wishes to change multiple aspects of clock face 1504. Specifically, the user decides to change the hour indications on clock face 1504 and complication 1506.

The user contacts the touch-sensitive display of device 1500 with touch 1508. Touch 1508 has a characteristic intensity above an intensity threshold, which prompts device 1500 to enter a clock face edit mode, shown on screen 1510. Clock face edit mode allows the user to edit one or more aspects of a clock face. Device 1500 indicates that the user has entered clock face edit mode by visually distinguishing the clock face. In this example, screen 1510 shows a smaller version of the display of screen 1502 (e.g., 1512), which includes reduced size clock face 1514 based on clock face 1504. Reduced size complication 1516, which is based on complication 1506, is also displayed. This display indicates to the user that the user is in clock face edit mode while giving the user an indication of what the edited clock face will look like on the display. In some embodiments, a user may be able to select a different clock face by swiping displayed screen 1510, as described in greater detail below in reference to FIGS. 16A-C.

Screen 1510 also displays paging affordance 1518. Paging affordances may indicate where the user is within a sequence of options, as well as how many options are available in the sequence. In clock face edit mode, paging affordances may indicate which editable aspect of the clock face a user is editing, where this aspect falls within a sequence of editable aspects, and the total number of editable aspects in the sequence (if clock face selection is available on this screen, paging affordance 1518 may depict the currently selected clock face within a sequence of selectable clock faces and/or clock face options, as described below). A paging affordance may be advantageous in clock face edit mode to help the user navigate the interface and explore all of the editable options available within each type of clock face.

The user selects the displayed clock face for editing by contacting 1512 through touch 1520. In response to detecting touch 1520, device 1500 visually indicates an element of the clock face for editing. As shown on screen 1530, the hour indications have been selected for editing, as indicated by outline 1534 around the position of the hour indications. The other elements of the clock face are still retained, as shown by hour hand and minute hand 1532 and complication 1536.

In this example, three aspects of the clock face are available for user editing. This is depicted by paging affordance 1538. The first editable aspect is the hour indications (e.g., their number and/or appearance). This is relayed to the user by paging affordance 1538. By viewing outline 1534 in combination with paging affordance 1538, the user recognizes that the hour indications are the first of three editable aspects of this clock face.

Device 1500 also has rotatable input mechanism 1540. The user may move rotatable input mechanism 1540 to cycle through different options for editing different aspects of the clock face. On screen 1530, the user may select different options for the hour indications (which are currently editable, as depicted by outline 1534) through movement 1542. Advantageously, using a rotatable input mechanism to cycle through editing options (rather than using, e.g., a touch interaction) frees up touch interactions with the screen to instead provide other functionalities, thus expanding the interactability of the device. Using a rotatable input mechanism is also helpful in cases where smaller elements of the display are being edited, as finer-scale touch gestures may be difficult on a reduced-size display for users with large fingers.

Also displayed on screen 1530 is positional indicator 1544, shown as a column of 9 lines. Positional indicator 1544 is an indicator of a current position along a series of positions. This is may be used, for example, in combination with rotatable input mechanism 1540. On screen 1530, positional indicator 1544 indicates to the user the position of the currently selected option (e.g., by line 1546) within a series of all selectable options.

Upon detecting movement 1542, device 1500 displays screen 1550. In response to detecting movement 1542, device 1500 edits the hour indications, in this case by increasing the number of indications and adding numerals. This is shown by indications 1552, still highlighted by outline 1534. The other elements of the clock face, hour hand and minute hand 1532 and complication 1536, remain the same. Positional indicator 1544 has been updated to indicate the position of this hour indication option, highlighted by line 1554, within a series of positions of hour indication options.

As indicated by paging affordance 1538, the hour indications are the first editable aspect of this clock face within a sequence of editable aspects. The user may select a second editable aspect by swiping the touch-sensitive display (e.g., swipe 1556). In response to detecting the swipe, device 1500 displays screen 1560. Screen 1560 includes clock face 1562, which now has 12 hour indications, including 4 numerical indications, as depicted by hour indications 1552. Note that these hour indications are the hour indications that were selected by the user on the previous screen (see indications 1552). Paging affordance 1538 has now been updated to indicate that editing complications is the second editable aspect within the sequence of editable aspects in this clock face.

On screen 1560, complication 1536 is currently editable, as indicated to the user by outline 1564. Currently, complication 1536 is displaying current weather conditions using information from a weather application. This option is option 3 in a series of options, as indicated by updated positional indicator 1544 and line 1566. Positional indicator 1544 lets the user know that the currently selected feature (i.e., complication 1536) is editable by the rotatable input mechanism.

While screen 1560 depicts a single complication, it should be understood that multiple complications may be displayed. When multiple complications are displayed, a user may select a particular complication for editing by contacting the corresponding position of the complication. Outline 1564 then transitions from the previously selected complication or element to the currently selected complication or element and rotatable input mechanism may then be used to edit the complication or element at the selected location. This concept is described in greater detail below in reference to FIG. 18C.

It is to be noted that positional indicator 1544 is displayed on screens 1530, 1550, and 1560, even though the available options depicted by the indicators are different. A positional indicator may be a universal indicator of options available through a particular type of user input, such as a movement of the rotatable input mechanism. Rather than displaying positions within a particular context, such as editing a certain feature or displaying data from a particular application, a positional indicator shows the user positions available through a type of user input, no matter the particular context in which the user input is being used. This better indicates to the user which user input should be used for this functionality. In some embodiments, a positional indicator is displayed on the display at a position adjacent to the user input for which it is used (e.g., next to the rotatable input mechanism to indicate positions accessible by moving the rotatable input mechanism).

A positional indicator (e.g., positional indicator 1544) may be responsive to one or more inputs. For example, as shown in FIG. 15, the positional indicator 1544 may indicate options available through a movement of the rotatable input mechanism. As described above, the user may scroll through the available options using movement of the rotatable input mechanism. However, a user may also wish to scroll through the available options using a second type of input, such as a contact (e.g., a swipe) on the touch-sensitive display. In some embodiments, a user viewing screen 1530 may swipe the touch-sensitive display in a different direction than the swipe used for removing a visual indication of a first element of the clock face for editing and visually indicating a second element of the clock face for editing (e.g., a downward swipe on the display). For example, to scroll through the available options shown in FIG. 15, the user may swipe in a substantially horizontal direction (e.g., swipe 1556) to scroll through editable aspects (e.g., with swipes moving left-to-right resulting in scrolling through the sequence of editable aspects in one direction, and swipes moving right-to-left resulting in scrolling through the sequence of editable aspects in a different direction, as depicted by updating the paging affordance 1538). In this example, the user may swipe in a substantially vertical direction (e.g., perpendicular to swipe 1556) to scroll through available options (e.g., with swipes moving downwards resulting in scrolling through the sequence of available options in one direction, and swipes moving upwards resulting in scrolling through the sequence of available options in a different direction, as depicted by updating the positional indicator 1544). In some embodiments, the user may swipe the display at or near the location of the displayed positional indicator to scroll through the sequence of available options.

In some embodiments, upon detecting the swipe, the device may update an indicator of position (e.g., an indicator of position along a series of positions that indicates a position of a currently selected option for the editable aspect along a series of selectable options for the editable aspect of the visually indicated element of the clock face) to indicate a second position along the series. In some embodiments, upon detecting the swipe, the device may edit an aspect of the visually indicated element of the clock face. In some embodiments, the device may visually distinguish the positional indicator (e.g., by changing a color, size, shape, animation, or other visual aspect) based on the type of input used to scroll the indicator. For example, in some embodiments, in response to detecting a movement of the rotatable input mechanism, the device may display the positional indicator in a first color (e.g., green), and in some embodiments, in response to detecting a swipe, the device may display the positional indicator in a second color different from the first color (e.g., white).

In clock face edit mode depicted on screen 1560, the user may be able to cycle through different types of information from the weather application, or change the application from which the information is drawn. In this case, the user moves rotatable input mechanism using movement 1568, which causes device 1500 to display screen 1570. This updates complication 1536 to display the current date, which is obtained from a calendar application. This option is indicated within positional indicator 1544 by line 1572. Note that paging affordance 1538 still indicates the second position because the user is still engaged in editing complications, the second editable aspect of this clock face. A determination that the contact has a characteristic intensity above a predetermined threshold may be user to distinguish the contact from other gestures, such as a tap or the beginning of a swipe.

Having finished editing the clock face, the user may now exit clock face selection mode and display the edited clock face on the display. In some embodiments, this may be done by detecting a user contact with a characteristic intensity above an intensity threshold. In accordance with a determination that the characteristic intensity is above the intensity threshold, the device may exit clock face edit mode and cease to visually distinguish the displayed clock face for editing (e.g., by increasing the size of the displayed clock face). In some embodiments, in accordance with a determination that the characteristic intensity is above the intensity threshold, the device may save this edited clock face as a new clock face that is accessible through clock face selection mode (described below). In accordance with a determination that the characteristic intensity is not above the intensity threshold (where the clock face includes an affordance representing an application, and where the contact is on the affordance representing the application), the device may launch the application represented by the affordance.

In some embodiments, the device may have a rotatable and depressible input mechanism (e.g., 506), and in response to detecting a depression of the rotatable and depressible input mechanism, the device may exit clock face edit mode, display the currently edited clock face, and/or save the currently edited clock face for later user selection, as described above.

FIG. 15 illustrates an exemplary embodiment of clock face edit mode, but a number of other potential embodiments are possible within the scope of the techniques described herein. For example, in FIG. 15, an element was indicated for editing by visibly distinguishing an outline around the element (e.g., by displaying a visible outline, or by distinguishing a pre-existing outline already visible around the element), as illustrated by outlines 1534 and 1564. In some embodiments, the outline may be animated to depict a rhythmic expansion and contraction (e.g., animation similar to pulsing or breathing). In some embodiments, the element indicated for editing itself may be animated to depict a rhythmic expansion and contraction. In some embodiments, the element may be animated to depict flashing. In some embodiments, a color of the element may be changed (e.g., a change in color and/or intensity). Any or all of these indications may be used to visually indicate the element that is currently editable.

As shown in FIG. 15, movement of a rotatable input mechanism may be employed as the user input for editing an aspect of the element indicated for editing. In some embodiments, if an outline is used to indicate the currently editable element, the outline may disappear when the rotatable input mechanism is being moved, and reappear when the movement stops. In this way, the user is able to see what the edited element will look like on the clock face as a whole, without any possible obstruction or distraction from the outline.

In some embodiments, in response to detecting the movement, the device may change a color of the element. This could include, e.g., changing a color of a clock face background (e.g., substituting a color if the clock face background is a particular color, or selecting a different image if the clock face background includes an image), changing a color of part or all of a seconds hand (if included on the clock face), changing a color of an hour and/or minute indication, and/or changing a color of a number or colon in the display of a representation of a digital clock. Since a seconds hand is a smaller element than a background (and therefore may be more difficult for the user to perceive), changing the color of the seconds hand may include an animated color change. For example, the seconds hand could first change a color of a particular point (e.g., a dot depicted along the seconds hand), then propagate this color change in either direction along the seconds hand. Alternatively, the color change could begin at the origin of the clock face and propagate outward. Animating a color change, particularly a change of a smaller element of the clock face, may be helpful to draw the user's attention to the color change.

In other embodiments, in response to detecting movement of the rotatable input mechanism, the device may change an aspect of a complication. For example, this could be used to change application data displayed by an application complication. In some embodiments, the complication may indicate a first set of information obtained by an application (e.g., application data. For example, if the application is a weather application, a set of information could be a forecasted weather condition, a current temperature, etc.), and upon editing, the complication could be updated to indicate a second set of information from the same application (e.g., if the application is a weather application, the display could be edited from showing a current temperature to showing current precipitation). In other embodiments, upon editing, the complication could be updated to indicate a set of information from a different application (e.g., if the application is a weather application, the display could be edited from showing weather to showing data from a calendar application, as illustrated by complication 1536).

In other embodiments, in response to detecting movement of the rotatable input mechanism, the device may change an aspect of display density. For example, as illustrated in FIG. 15, this could be used to edit the number of visible divisions of time (e.g., the number of displayed hour and/or minute indications, such as numbers 1-12 or other marks/symbols positioned along the clock face at the hour positions). In response to detecting movement of the rotatable input mechanism, the device may increase or decrease the number of visible divisions of time. As illustrated on screens 1530, 1550, and 1560, this could involve changing the number of visible divisions (e.g., from 4 to 12) and/or changing the number of numerical/symbolic hour indications (e.g., from 0 to 4).

In some embodiments, as illustrated in FIG. 15, an indicator of positions along a series of positions may be displayed (e.g., positional indicator 1544). In response to detecting movement of the rotatable input mechanism, the device may update the indicator from indicating a first to indicating a second position along the series of positions. In some embodiments, the indicated position may reflect a currently selected option for the currently editable aspect along a series of selectable options for the currently editable aspect. As described above, in some embodiments, the indicator is displayed on the display at a position adjacent to the rotatable input mechanism, thereby strengthening the user's association between the indicator and the input. In some embodiments, if the currently editable aspect is color, the device may display a positional indicator that includes a series of colors, such that the currently selected color option matches the color of the position currently indicated by the positional indicator (e.g., the color could be a similar or identical color). In some embodiments, the number of positions displayed in a position indicator increases or decreases depending on the number of options for the currently selected editable aspect.

In some embodiments, upon reaching the last position indicated by the positional indicator, the device may provide an indication to the user that the last option has been displayed. For example, the device may depict a dimming of one or more of the selected element, an outline around the selected element, and the positional indicator. In some embodiments, the device may animate one or more of the selected element, an outline around the selected element, and the positional indicator to expand and contract (e.g., like a rubber band). In some embodiments, the device may animate one or more of the selected element, an outline around the selected element, and the positional indicator to move on the display (e.g., by bouncing). These features may be advantageous to provide an indication to the user that the last option in the series of options has been reached.

In some embodiments, a user may select the element on the clock face for editing by contacting the touch-sensitive display at the position of the displayed element. In other embodiments, the element may be selected by swiping the touch-sensitive display, or rotating the rotatable input mechanism. Regardless of the input, selecting a second element for editing may involve removing a visual indication from the previous element and visually indicating a second element for editing (visually indicating may include any or all of the techniques described above).

In some embodiments, if the element selected for editing is indicated by an outline around the element, changing an element for editing could involve translating the outline on-screen away from the first element and/or translating a visible on-screen in a continuous on-screen movement towards the second element until the outline is displayed around the second element.

As illustrated in FIG. 15, clock face edit mode allows the user to alter multiple editable aspects of the clock faces described herein. In some embodiments, in response to detecting a swipe on the touch-sensitive display (e.g., swipe 1556), the device may select a second element of the clock face for editing, which in response to detecting another user input (e.g., a movement of the rotatable input mechanism), may be edited. This allows the user to cycle through different editable aspects of the displayed clock face, such as colors, number and/or type of complications, and display density.

A user may wish to match a color of a displayed clock face to an image. In some embodiments, the device may receive a user input, and in response to receiving the user input, the device may enter a color selection mode. While in the color selection mode, the device may receive data representing an image, and in response to receiving the data, the device may select a color of the image and update a displayed clock face by changing a color on the clock face (e.g., a clock face background, hour and/or minute indication, and/or seconds hand) to match the color of the image. In some embodiments, the color selected may have the greatest prevalence of the colors in the image. This allows the user to further customize a clock face to display a designated color. For example, if the user is wearing a blue shirt, the user could take an image of the blue shirt and match the color of the clock face to the shirt. In some embodiments, the data representing the image may be obtained from an image stored on the device, an image stored on an external device in wireless communication with the device (e.g., Wi-Fi, Bluetooth™, near field communication ("NFC"), or any of the other cellular and/or other wireless communication techniques described herein), or an image taken using a camera on the device, such as camera module 143 or optical sensor 164.

Figure 16A:
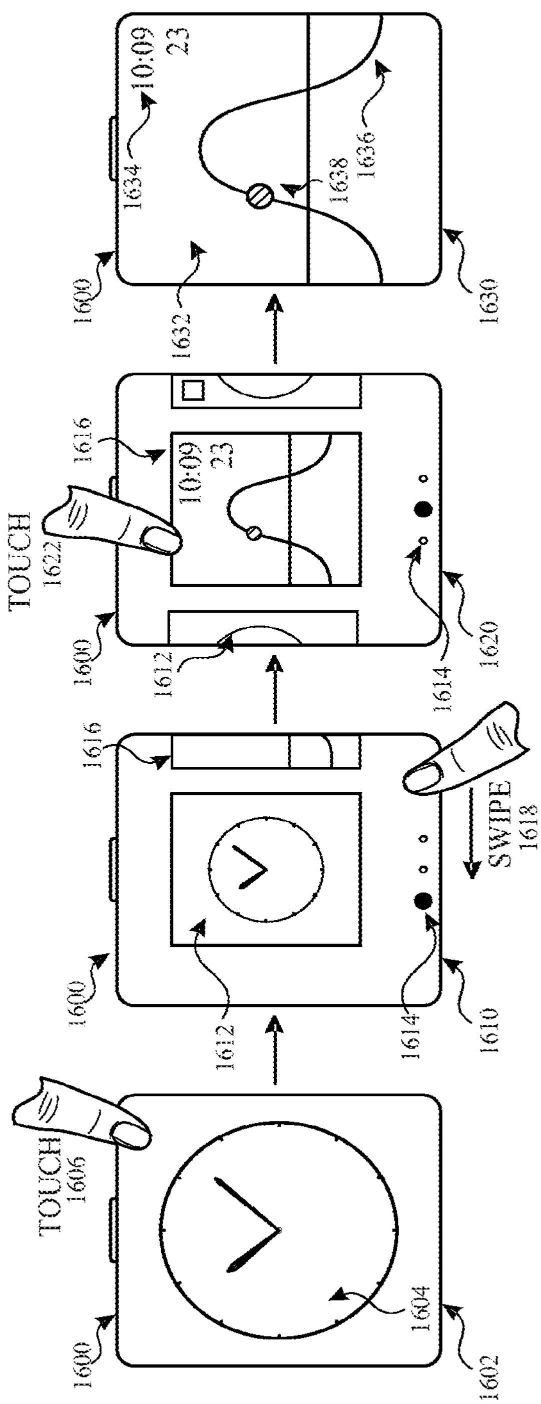
FIGS. 16A-16G illustrate exemplary context-specific user interfaces.
Figure 16B:
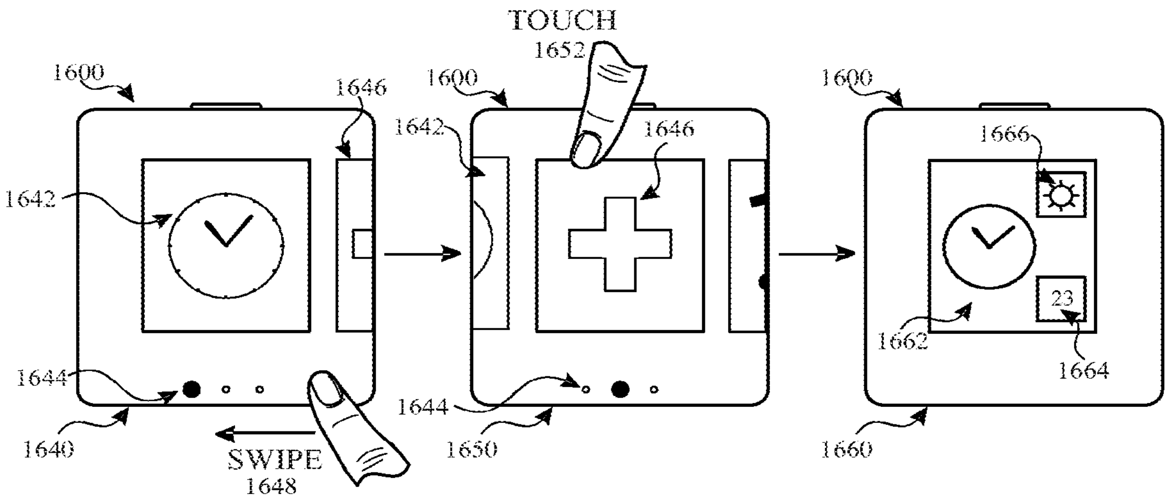
Figure 16C:
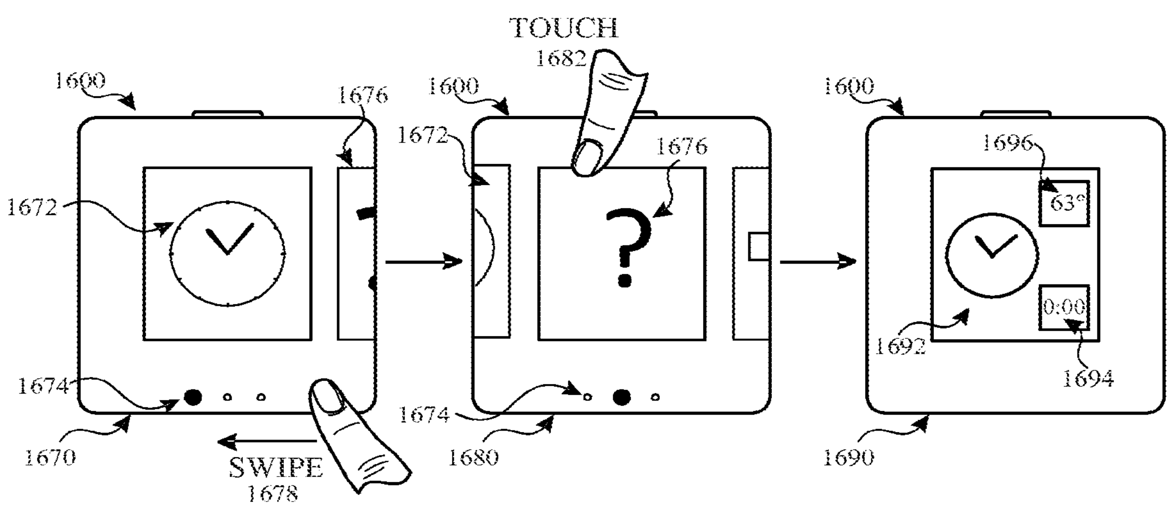

Having described various context-specific user interfaces and methods of user editing thereof, attention is now directed to methods of selecting a context-specific user interface shown in FIGS. 16A-C. Numerous individual context-specific user interfaces are possible using the techniques described here. A user may wish to select a particular clock face (e.g., from a saved library of clock faces) or make a new one, depending on a particular context. For example, a user may wish to display a particular clock face during working hours to project a professional appearance, but change the clock face during the weekend to reflect an interest (such as astronomy, exercise, or photography). A user may wish for quick access to a stopwatch in one context, while desiring an indication of daytime hours in another.

FIG. 16A shows exemplary context-specific user interfaces that may be operated on device 1600. Device 1600 may be device 100, 300, or 500 in some embodiments. The electronic device has a touch-sensitive display (e.g., touchscreen 504) configured to detect the intensity of contacts. Exemplary components for detecting the intensity of contacts, as well as techniques for their detection, have been referenced and described in greater detail above.

Device 1600 displays user interface screen 1602, which includes clock face 1604. In this example, the user wishes to switch from clock face 1604 to a different clock face. The user contacts the touch-sensitive display of device 1600 with touch 1606. Touch 1606 has a characteristic intensity above an intensity threshold, which prompts device 1600 to enter a clock face selection mode, shown on screen 1610. Clock face selection mode allows the user to select a clock face.

Device 1600 indicates that the user has entered clock face selection mode by visually distinguishing the clock face. This is shown on screen 1610. Screen 1610 visually distinguishes that the user has entered clock face selection mode by centering reduced size clock face 1612 on the display (reduced size clock face 1612 is based on clock face 1604). This indicates to the user that the user is in clock face selection mode while giving the user an indication of what the clock face will look like when displayed at full size.

Screen 1610 also includes paging affordance 1614. As described above, paging affordances may indicate where the user is within a sequence of options, as well as how many options are available in the sequence. Paging affordance 1614 indicates to the user that clock face 1612 is the first in a series of three selectable clock faces and/or clock face options (e.g., an option to add a new clock face or randomly generate a clock face, as described below). In clock face selection mode, a paging affordance may indicate a currently centered clock face and/or clock face option, a position of the currently centered clock face and/or clock face option within a sequence of clock faces and/or clock face options, and a total number of available clock faces and/or clock face options. This helps the user navigate the clock faces and clock face options.

Screen 1610 also includes a partial view of a second clock face, as shown by a partial view of second clock face 1616. In some embodiments, when the device is in clock face selection mode, the device may include a display a partial view of another clock face, or clock face option, particularly the clock face or clock face option next in the sequence (e.g., as indicated by the paging affordance). This further helps the user understand that additional options are available. In other embodiments, only one clock face is displayed at any time.

Clock face selection mode may be used to select a clock face for display as a context-specific user interface, or to select a clock face for editing. Therefore, in some embodiments, when a clock face such as clock face 1612 and/or clock face 1616 is centered on the display, a user may contact the displayed clock face on the touch-sensitive display to select the centered clock face for editing and enter into clock face editing mode (as described above in reference to FIG. 15). In some embodiments, clock face editing mode is entered when the contact has a characteristic intensity above an intensity threshold. Coupling clock face edit and selection modes in a single interface allows the user to select different clock faces and edit them quickly and easily.

A user may select a different clock face (for editing or for display as a context-specific user interface) by swiping. Device 1600 detects a swipe on the touch-sensitive display (e.g., swipe 1618). In response to detecting swipe 1618, device 1600 displays screen 1620. Screen 1620 includes second clock face 1616 centered on the display (part of second clock face 1616 was depicted on screen 1610). Screen 1620 also shows paging affordance 1614, which has been updated to indicate that the currently centered clock face 1616 is second within the sequence of clock faces and/or clock face options. Also shown is a partial view clock face 1612. This helps the user understand the sequence of clock faces, similar to a paging affordance but with the added benefit of displaying a partial view of the clock faces for user recognition.

To select clock face 1616, the user contacts the touch-sensitive display on clock face 1616 (e.g., touch 1622). In response to detecting touch 1622, device 1600 exits the clock face selection mode and displays screen 1630. Screen 1630 includes full-sized clock face 1632, which is based on clock face 1616. In this example, clock face 1632 is a context-specific user interface similar to those described in reference to FIGS. 11A-C and includes affordance 1634 indicating the time of day, user interface object 1636 (a sinusoidal wave indicating a path of the Sun through the day), and affordance 1638 representing the Sun.

As described above and illustrated in FIG. 16A, a user may select a clock face from a plurality of clock faces in the device's clock face selection mode. In some embodiments, at least a first and a second clock face are shown when the device is in clock face selection mode. These clock faces may be shown in sequence, but at a reduced size. In some embodiments, one clock face is centered on the display at any time, and the one or more additional clock faces on the display are shown in partial view, as depicted by partial views of clock faces 1612 and 1616. Centering a clock face may include includes translating the prior clock face in the sequence on-screen and displaying the prior clock face in partial view. In other embodiments, only a single clock face is displayed on the device at any one time (i.e., no partial views).

In some embodiments, centering a clock face on the display includes simulating a movement of the clock face towards the user on the display, as if it is approaching the user. This helps draw the user's attention to the clock face while conveying to the user a sense of the clock face sequence.

As depicted by screen 1620, device 1600 may display multiple available clock faces and/or clock face options in a sequence for selection by the user. A user may wish to re-order one or more clock faces within the sequence. Therefore, device 1600 may provide a clock face rearrangement mode to allow the user to select a particular clock face and change its order within the sequence of available clock faces and/or clock face options. In some embodiments, a user may contact the touch-sensitive display on a clock face (e.g., clock face 1616) and maintain the contact beyond a threshold interval (e.g., a "press and hold"-type user input). In response to detecting the contact, and in accordance with a determination that the contact exceeds a predetermined threshold, device 1600 may enter a clock face rearrangement mode. Device 1600 may highlight, outline, animate, or otherwise visually distinguish the clock face to indicate to the user that device 1600 has entered clock face rearrangement mode, and that the clock face has been selected for rearrangement. In some embodiments, while continuing to receive the user contact, device 1600 may detect movement of the user contact from a first position within the sequence of displayed clock faces and/or clock face options to a second position, which is different from the first position, without a break in contact of the user contact on the touch-sensitive display. In other embodiments, the contact comprising the movement from a first position within the sequence of displayed clock faces and/or clock face options to a second position, which is different from the first position, without a break in contact of the user contact on the touch-sensitive display may be a separate contact subsequent to entry into clock face rearrangement mode. In response to detecting the contact at the second position, device 1600 may translate the clock face on-screen from the first position to the second position. Optionally, other partial or complete clock faces and/or clock face options on the display may be moved accordingly to accommodate the new position of the user-selected clock face. A user may then cease the contact to select the second position as the new position for the clock face within the sequence of displayed clock faces and/or clock face options. In some embodiments, device 1600 may exit clock face rearrangement mode in response to detecting the break in contact on the touch-sensitive display after the position of at least one clock face has been rearranged. In other embodiments, in response to detecting a user input subsequent to the break in contact on the touch-sensitive display (e.g., a depression of a rotatable and depressible input mechanism such as 506), device 1600 may exit clock face rearrangement mode. In some embodiments, upon exiting clock face rearrangement mode, device 1600 may re-enter clock face selection mode.

In addition to selecting an existing context-specific user interface, a user may also wish to add a new one. FIG. 16B illustrates an exemplary user interface for generating a new clock face. Shown on FIG. 16B is device 1600, which displays screen 1640. Screen 1640 displays clock face 1642 and paging affordance 1644, which indicates to the user that the currently centered clock face is the first in a sequence of three selectable clock faces and/or clock face options. Screen 1640 also displays a partial view of a clock face generation affordance (e.g., 1646).

In this example, the user swipes the display (e.g., swipe 1648), and in response to detecting the swipe, device 1600 displays a full view of clock face generation affordance 1646 centered on screen 1650. In some embodiments, as depicted by affordance 1646, a clock face generation affordance may include a plus sign (or other text and/or symbol) to convey to the user that, upon activation of affordance 1646, device 1600 will generate a new clock face.

Note that screen 1650 also displays a partial view of previously displayed clock face 1642. This partial view of 1642 and updated paging affordance 1644 (updated to indicate that clock face generation is the second available user interface in the sequence) help orient the user within the sequence of available clock faces and/or clock face options. Further note that the partial view of clock face generation affordance 1646 on screen 1640 indicates to the user that a swipe will center affordance 1646 on the display (e.g., as displayed on screen 1650) for user activation.

A user may activate affordance 1646, for example by contacting affordance 1646 on the touch-sensitive display (e.g., touch 1652). In response to detecting the contact, device 1600 displays screen 1660, which includes newly generated clock face 1662 centered on the display. As shown on screen 1660, new clock face 1662 includes affordance 1664, which displays the current date (e.g., obtained from a calendar application), and affordance 1666, which displays the current weather conditions (e.g., obtained from a weather application).

In response to detecting an activation of affordance 1646, in some embodiments, the device remains in clock face selection mode after centering the displayed new clock face. In other embodiments, upon centering the newly generated clock face on the display, the device enters into clock face edit mode, as described above. This allows the user to edit one or more aspects of the newly generated clock face. In some embodiments, the device exits clock face selection mode and centers the new clock face as a full-size clock face on the display.

It is to be appreciated that, while new clock face 1662 depicts a representation of an analog clock, any of the context-specific user interfaces described herein (with any of the optional features described herein) may be a new clock face generated in response to activating the clock face generation affordance. In some embodiments, a new clock face may have a different customizable aspect, as compared to existing clock faces on the device. For example, if the user already has a clock face that includes a blue seconds hand, the device may generate a new clock face that includes a red seconds hand. This helps the user explore the options available for context-specific user interfaces described herein, thus enhancing the user interface by increasing variety.

In addition to selecting an existing context-specific user interface or generating a new context-specific user interface, a user may also wish to create a random context-specific user interface. FIG. 16C illustrates an exemplary user interface for generating a random clock face. Shown on FIG. 16C is device 1600, which displays screen 1670. Screen 1670 displays clock face 1672 and paging affordance 1674, which indicates to the user that the currently centered clock face is the first in a sequence of three selectable clock faces and/or clock face options. Screen 1670 also displays a partial view of a random clock face generation affordance (e.g., 1676).

In this example, the user swipes the display (e.g., swipe 1678), and in response to detecting the swipe, device 1600 displays a full view of random clock face generation affordance 1676 centered on screen 1680. In some embodiments, as depicted by affordance 1676, a random clock face generation affordance may include a question mark (or other text and/or symbol, such as the letter "R") to convey to the user that, upon activation of affordance 1676, device 1600 will generate a random clock face.

Note that screen 1680 also displays a partial view of previously displayed clock face 1672. The partial view of 1672, along with updated paging affordance 1674 (updated to indicate that random clock face generation is the second available user interface in the sequence), helps orient the user to the sequence of clock faces and/or options available in the sequence. Further note that the partial view of random clock face generation affordance 1676 on screen 1670 indicates to the user that a swipe will center affordance 1676 on the display (e.g., as displayed on screen 1680) for user activation.

A user may activate affordance 1676, for example by contacting affordance 1676 on the touch-sensitive display (e.g., touch 1682). In response to detecting the contact, device 1600 displays screen 1690, which includes randomly generated clock face 1692 centered on the display. As shown on screen 1690, new clock face 1692 includes affordance 1694, which represents an affordance for launching a stopwatch application, and affordance 1696, which displays the current temperature (e.g., obtained from a weather application).

In response to detecting an activation of affordance 1676, in some embodiments, the device remains in clock face selection mode after centering the displayed random clock face. In other embodiments, upon centering the randomly generated clock face on the display, the device enters into clock face edit mode, as described above. This allows the user to edit one or more aspects of the randomly generated clock face. In some embodiments, the device exits clock face selection mode and centers the random clock face as a full-size clock face on the display.

It is to be appreciated that, while random clock face 1692 depicts a representation of an analog clock, any of the context-specific user interfaces described herein (with any of the optional features described herein) may be a random clock face generated in response to activating the random clock face generation affordance.

In some embodiments, the random clock face may be different from any of the other clock faces available in clock face selection mode. The device may accomplish this in multiple ways. In some embodiments, the device may randomly generate a random clock face, and then check the random clock face against the other stored clock faces to ensure that it is different. In other embodiments, the device may generate a random clock face and rely on the inherent probability that it will be different from the stored clock faces, given the sheer number of potential clock faces made available by the techniques described herein.

In some embodiments, upon displaying the random clock face, the device may display a user prompt for generating a second random clock face. This allows the user to randomly generate another clock face if the user does not like the particular type of context-specific user interface and/or customized features of the random clock face. In some embodiments, the random clock face generation affordance may depict, e.g., a slot machine or other indication of a user prompt for generating a second random clock face, to provide this feature.

In addition to centering a clock face on the display for selection, the device may also highlight the centered clock face in one or more ways. For example, in some embodiments, the centered clock face may be displayed by visibly distinguishing an outline around the centered clock face (e.g., by displaying a visible outline, or by distinguishing a pre-existing outline already visible around the clock face), as illustrated by 1612, 1622, 1642, and 1672. In some embodiments, the outline may be animated to depict a rhythmic expansion and contraction (e.g., animation similar to pulsing or breathing). In some embodiments, the centered clock face itself may be animated to depict a rhythmic expansion and contraction. In some embodiments, the centered clock face may be animated to depict flashing. In some embodiments, a color of the centered clock face may be changed (e.g., a change in color and/or intensity). Any or all of these indications may be used to visually indicate that the centered clock face is currently selectable.

As described above, the techniques presented herein related to selection of a clock face may be applied to any of the context-specific user interfaces of the present disclosure. A user may wish to display a clock face with an image, such as a user photo or other image file, as the background (see, e.g., the context specific user-interfaces, components, and techniques described in reference to FIGS. 12, 24, and 39). It is therefore desirable to provide a user interface that allows the user to select an image from a set of multiple images (e.g., from an image folder or photo album). A user may also wish to customize the appearance of a selected image. For example, the image may have been taken on a device with a different resolution or aspect ratio, and the user may wish to customize the look of the image to fit a device with a reduced size display. As such, it is also desirable to provide a user interface that allows for quick customization of a selected image (e.g., by cropping, zooming, and/or re-centering the image) to fit a reduced size display. Advantageously, the techniques described below allow for an efficient interface that provides both of these functionalities, thereby improving battery life and reducing processor power by lessening the number of user inputs required to select and edit images.

Figure 16D:
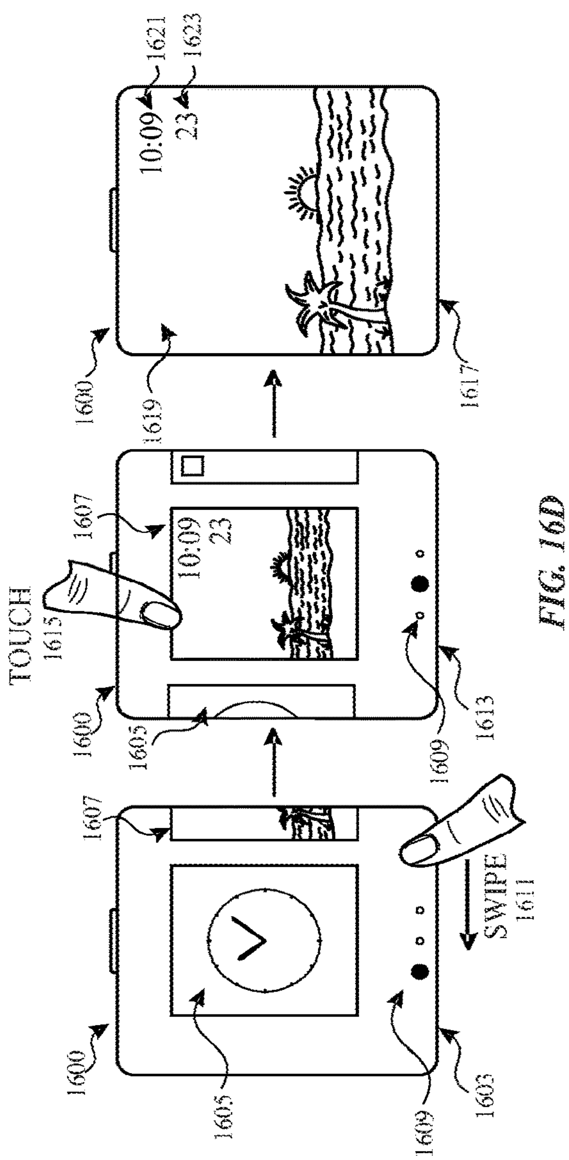

FIG. 16D shows additional exemplary user interfaces that may be operated on device 1600. In FIG. 16D, device 1600 displays screen 1603, which, similar to screen 1610 in FIG. 16A, includes reduced size clock face 1605, paging affordance 1609, and a partial view of clock face 1607. In response to detecting user swipe 1611, device 1600 displays screen 1613, which includes a partial view of clock face 1605, an updated paging affordance 1609 (updated to indicate to the user that the clock face represented by 1607 is the second of three available clock faces or clock face options), and reduced size clock face 1607.

In this example, reduced size clock face 1607 represents a user image by displaying a reduced size version of the user image. While 1607 shows a single, reduced size image that represents the user image, any representation of an image could be displayed, such as a set of multiple images (e.g., a representation of a photo album), or an affordance that represents an image and/or photo album via text, such as a text that reads "Photo," "Album," or the like. These representations indicate to the user that this option, when selected, displays a clock face with a background image along with an indication of the time of day and/or date. In some embodiments, more than one image, and/or more than one representation of an image, may displayed.

To select clock face 1607, the user contacts the touch-sensitive display on clock face 1607 (e.g., touch 1615). In response to detecting touch 1615, device 1600 exits the clock face selection mode and displays screen 1617. Screen 1617 displays a full-sized clock face that includes background 1619, affordance 1621 indicating a time of day, and affordance 1623 indicating a date or day of the month. Background 1619 may be based on the image represented by 1607. For example, it may be a larger version of the same image (e.g., if 1607 displays a single image), a larger version of an image thumbnail displayed as part of an album (e.g., if 1607 displays more than one image, as described below), or it may be an image represented via text by 1607. As used herein, a background "based on" an image may refer to a background that is based on at least the first image, i.e., additional images may be displayed. In some embodiments, affordance 1621 and/or 1623 may be generated by modifying in appearance a subset of pixels constituting background 1619 (e.g., as described in reference to FIG. 12, such as by color blurring, blending, gradient, etc.).

Figure 16E:
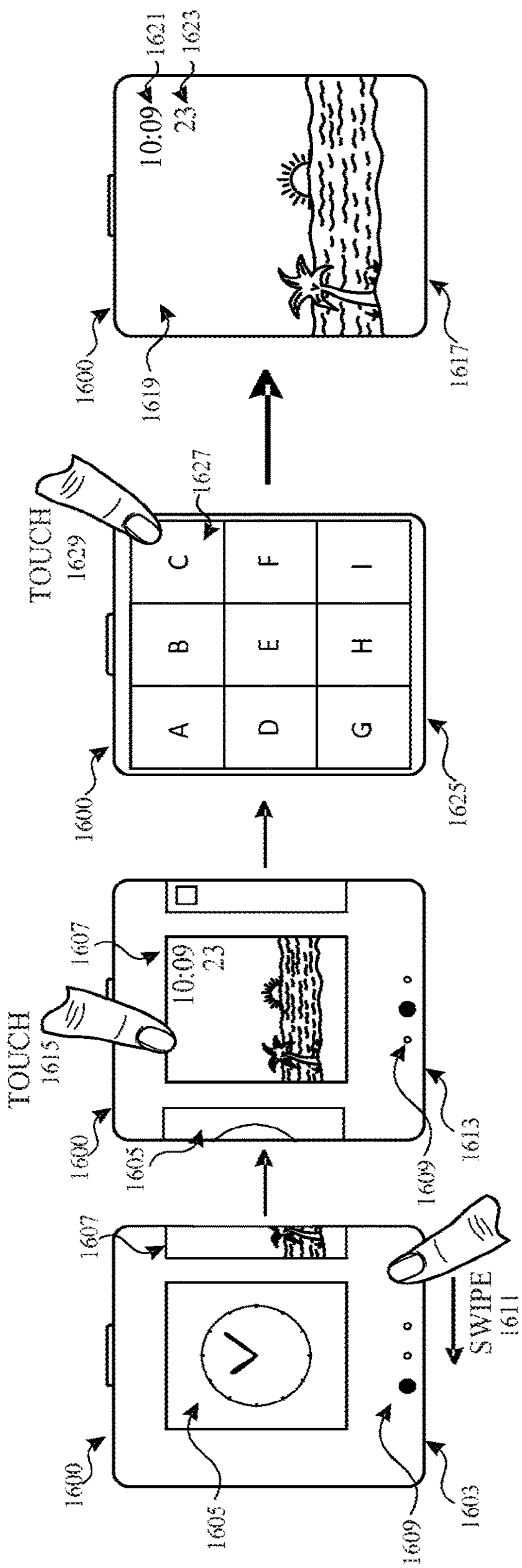

FIG. 16E illustrates an alternative technique for selecting an image-based clock face. Rather than immediately selecting a single image for display (e.g., as background 1619), a user may wish to first access a set of multiple images (e.g., a photo album). FIG. 16E begins with the same user interfaces and inputs described in relation to screens 1603 and 1613. However, in response to a user selection of the image-based clock face option (e.g., touch 1615 on reduced size clock face 1607), device 1600 instead displays screen 1625, which in this example includes representations of nine different images, including representation 1627, which represents the image on which background 1619 is based.

Screen 1625 represents a set of images (e.g., from a user photo album) in a grid-type layout with rows and columns. Any type of layout may be used. In some embodiments, screen 1625 may display a composite image comprising representations associated with individual images, such as photos from a photo album. These representations may include indications (e.g., labels) and/or visual representations (e.g., thumbnail images) of the corresponding images. The user may select the image associated with representation 1627 by contacting the displayed representation with touch 1629. In response to detecting touch 1629, device 1600 displays screen 1617, as described above.

In some embodiments, the user may have the option of pre-selecting a preference as to whether device 1600 displays a single image, as illustrated by FIG. 16D, or multiple images, as illustrated by FIG. 16E. In some embodiments, in response to a user selection of an image-based clock face (e.g., touch 1615), device 1600 may provide a user prompt for viewing a single image or multiple images. A user may then provide an input (e.g., a touch on the touch-sensitive display) to select the appropriate option.

Figure 16F:
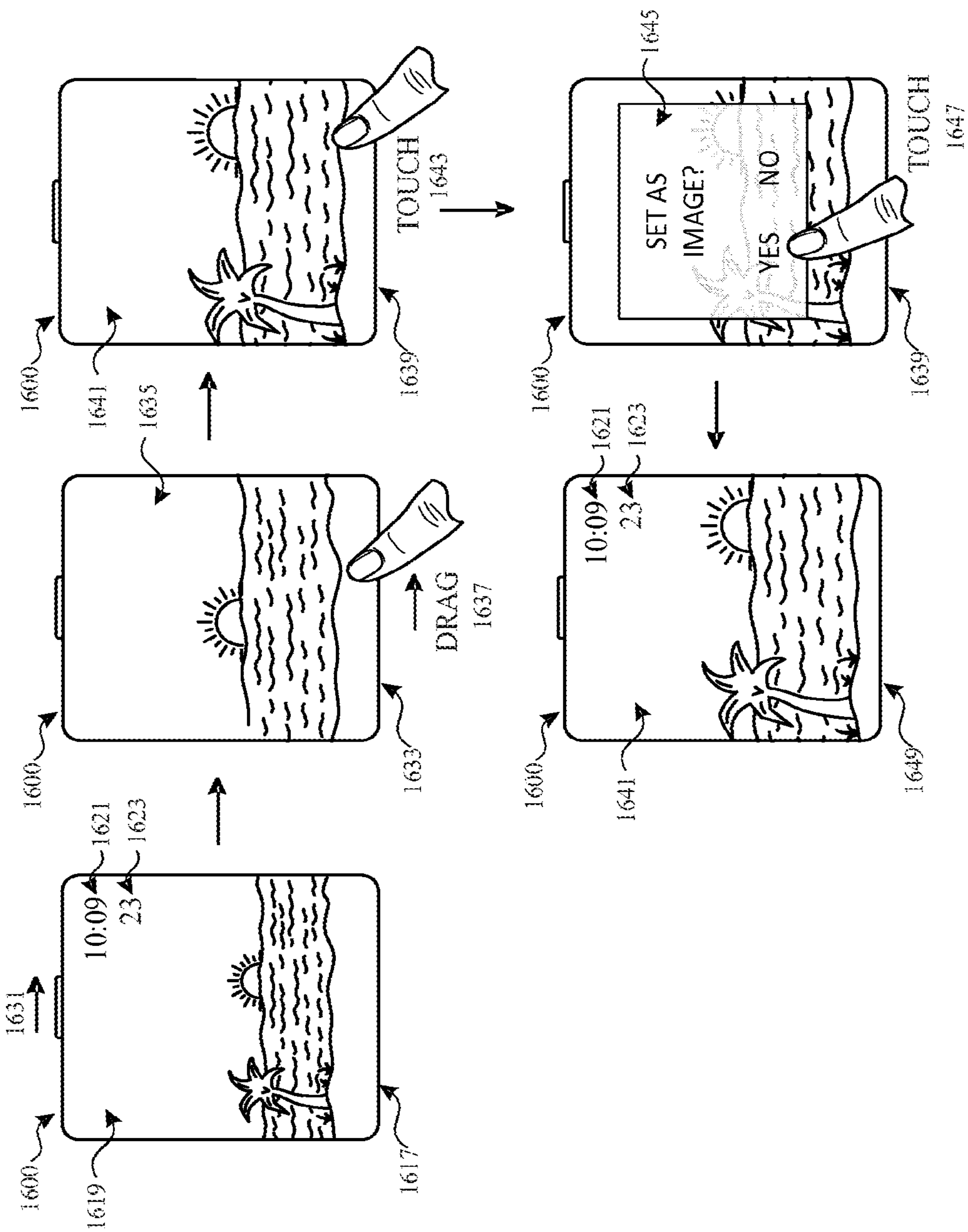
Figure 16G:
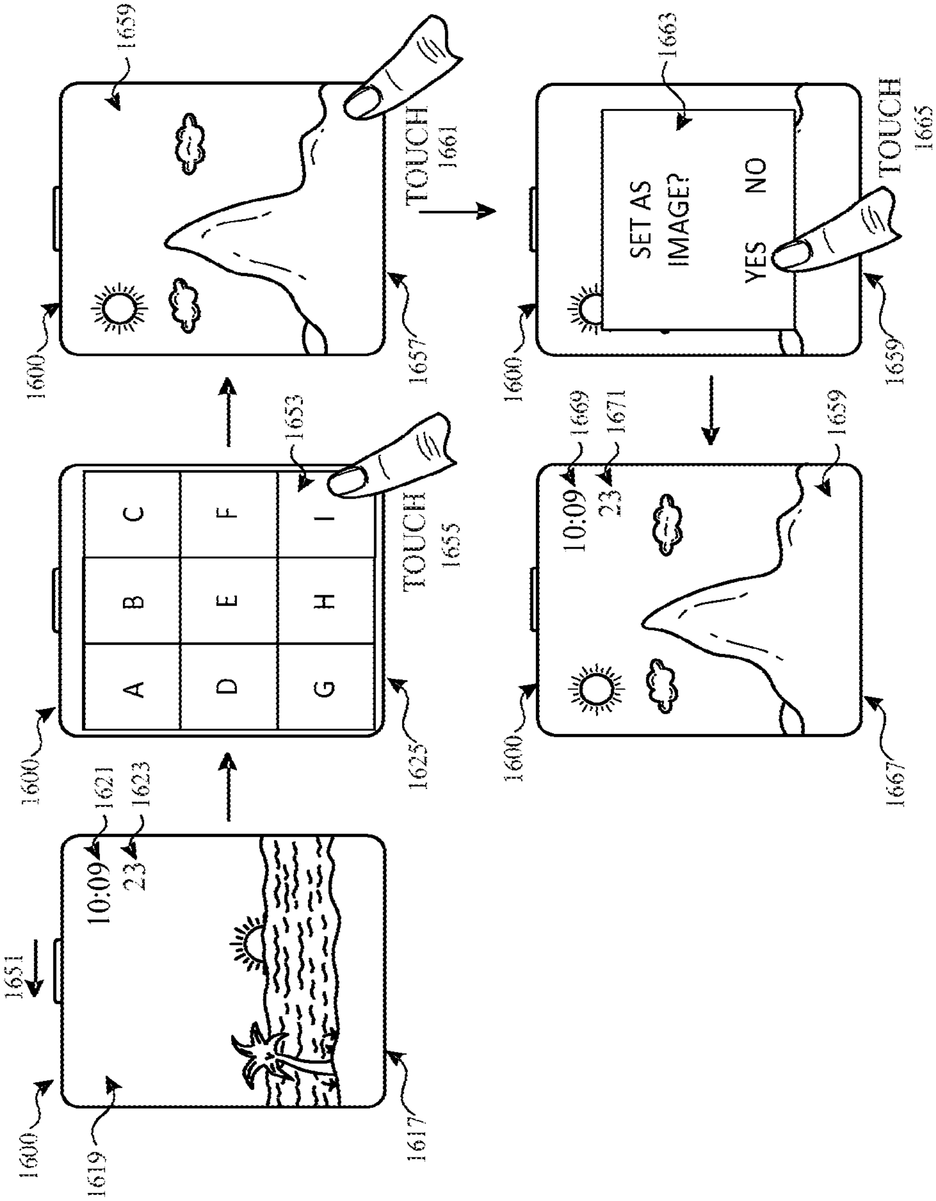

Once an image has been selected for the background of the clock face, a user may wish to modify the image or replace it with a different image. Advantageously, both functionalities may be provided from a single user interface using the zoom/crop operations described below. As an example, FIGS. 16F & 16G illustrate how simple rotations of a rotatable input mechanism in different directions may allow the user to navigate seamlessly from a single image to image modifications (e.g., zooming, cropping, and the like), or from a single image back out to a photo album (e.g., for selecting a different image). It will be appreciated that other user inputs, such as various touch gestures, may alternatively or additionally be employed.

As illustrated in FIG. 16F, while screen 1617 is displayed, the user may move a rotatable input mechanism is a first direction of rotation (e.g., movement 1631) to crop the image on which background 1619 is based. In response to detecting movement 1631, device 1600 displays screen 1633 with image 1635, a cropped image based on background 1619. Image 1635 may be generated, for example, by modifying background 1619 in one or more of the following ways: removing one or more outer portions of background 1619, increasing the magnification of at least a portion of background 1619 (e.g., zooming), or altering the aspect ratio of background 1619. This allows the user to quickly crop an image, for example to improve the appearance of the image on a reduced-size display.

In some embodiments, the amount of cropping used to generate image 1635 based on background 1619 is proportional to the degree, amount, speed, and/or number of rotations of the rotatable input mechanism. In other embodiments, the amount of cropping used to generate image 1635 based on background 1619 is not proportional to the degree, amount, speed, and/or number of rotations of the rotatable input mechanism. Any model for mapping a movement of a rotatable input mechanism to the amount or speed of cropping may be used, such as those described in reference to scrolling in U.S. patent application Ser. No. 14/476,700, "Crown Input for a Wearable Electronic Device," filed Sep. 3, 2014, which is hereby incorporated by reference in its entirety. For example, acceleration, velocity, or the like may be used to determine the amount of speed of scaling of the cropped image.

Other image manipulations are possible using other user inputs. For example, as illustrated in FIG. 16F, the user may provide a drag gesture (e.g., drag 1637) on screen 1633 to re-center or translate image 1635 on the display. In response to detecting drag 1637, device 1600 displays screen 1639 with image 1641. Image 1641 is based on a translation of 1635 on the display. The degree and/or orientation of the translation may be based at least in part on the amount, direction, and/or speed of drag 1637. Other user inputs are possible, such as taps or other contacts on the touch-sensitive display. For example, the user may tap or doubletap the image, and, in response, device 1600 may re-center the image based at least in part on the location of the received tap(s).

Once the user is satisfied with image 1641, it may be selected as the new background by a touch input, such as touch 1643. Touch 1643 has a characteristic intensity above an intensity threshold (which may be the same or different threshold described above in reference to touch 1606), which prompts device 1600 to display user prompt 1645 asking the user to confirm setting image 1641 as the background. In response to detecting a user confirmation of image 1641 (e.g., by touch 1647 on a "YES" affordance), device 1600 displays screen 1649, which includes image 1641 as the background and affordances 1621 and 1623. In other embodiments, device 1600 may forego displaying user prompt 1645 and instead display screen 1649 in response to touch 1643. If touch 1643 has a characteristic intensity that is not above the intensity threshold, device 1600 may forego displaying screen 1649 and/or modify image 1641 in appearance, e.g., as described above.

In some embodiments, affordances 1621 and/or 1623 may be modified in appearance, compared to when they are displayed on background 1619, based on the different appearance of 1641 compared to 1619. For example, they may constitute a modification of a subset of pixels of a different image, or a different subset of pixels from the same image (e.g., 1641 vs. 1619). In other embodiments, affordances 1621 and/or 1623 may have the same appearance on both screens.

FIG. 16G illustrates an exemplary technique for allowing the user to select a different image. While screen 1617 with background 1619 is displayed, the user may move a rotatable input mechanism is a second direction of rotation (e.g., movement 1651). In some embodiments, movement 1651 may have a direction of rotation opposite that of movement 1631. In response to detecting movement 1651, device 1600 displays screen 1625, which as described above represents a set of images (e.g., from a user photo album). The user may select the image corresponding to representation 1653 (which as described above may be an image such as a thumbnail or an indication such as a label) by touch 1655.

In response to detecting touch 1655, device 1600 displays screen 1657, which includes a background based on image 1659. Similar to FIG. 16F, the user may crop, zoom, or otherwise modify image 1659 through one or more rotations of the rotatable input mechanism or one or more touch gestures. Similar to FIG. 16F, the user may touch screen 1657 with touch 1661 to select image 1659 as the background image. Touch 1661 has a characteristic intensity above an intensity threshold (which may be the same or different threshold described above in reference to touch 1606 or 1643), so in accordance with a determination that touch 1661 has a characteristic intensity above the intensity threshold, device 1600 displays user prompt 1663 to confirm setting image 1659 as the background. In response to detecting a user confirmation of image 1659 (e.g., by touch 1663 on a "YES" affordance), device 1600 displays screen 1667, which includes image 1659 as the background and affordances 1669 and 1671. In other embodiments, device 1600 may forego displaying user prompt 1663 and instead display screen 1667 in response to touch 1661. If touch 1661 has a characteristic intensity that is not above the intensity threshold, device 1600 may forego displaying screen 1667 and/or modify image 1659 in appearance, e.g., as described above. In some embodiments, affordances 1669 and 1671 may be the same as affordances 1621 and 1623, respectively. In other embodiments, affordances 1669 and 1671 may be distinct from affordances 1621 and 1623, respectively, e.g., as modifications of a subset of pixels of a different image (image 1659 vs. 1619).

The techniques described above allow for a single user interface for selecting and modifying images to generate an image-based context-specific user interface of the present disclosure. Providing a single user interface for these functionalities reduces the number of user inputs required to accomplish these tasks, thereby reducing battery consumption and processor power. While these operations are illustrated in FIGS. 16F & 16G using the movement of a rotatable input mechanism (e.g., 506) and specific touch gestures, it will be appreciated that other combinations of user inputs such as touch gestures may be used.

In some embodiments, the user may access clock face edit mode and clock face selection mode through a shared interface. For example, a contact with a characteristic intensity above the intensity threshold may cause the device to enter clock face selection mode. In this example, screen 1510 in FIG. 15 may represent clock face selection mode, with a paging affordance that indicates the currently selected clock face within a sequence of selectable clock faces and/or clock face options. Upon entering clock face selection mode, in some embodiments, a second contact with a characteristic intensity above the intensity threshold may cause the device to enter into the clock face edit mode and select the currently centered clock face for editing. In other embodiments, upon entering clock face selection mode, the device may display an affordance representing clock face edit mode. Upon detecting a contact on the displayed affordance, the device may enter into the clock face edit mode and select the currently centered clock face for editing. These features help tie the context-specific user interface selection and editing functionalities into a single interface that is user-friendly and intuitive.

3. Additional Functionalities for Context-Specific User Interfaces

A user may wish for additional functionalities in a context-specific user interface that may be applied to the user interfaces described above. For example, a user may wish to set reminders, launch applications, and view the time at a designated location. Such functionalities are not limited to particular user interfaces described herein, but rather may be generally applied to any or all of them. The following functionalities are generalizable features that may be incorporated into any of the context-specific user interfaces described herein. While a specific functionality may be described in reference to a particular context-specific user interface below, this is in no way intended to be limiting.

Figure 17A:
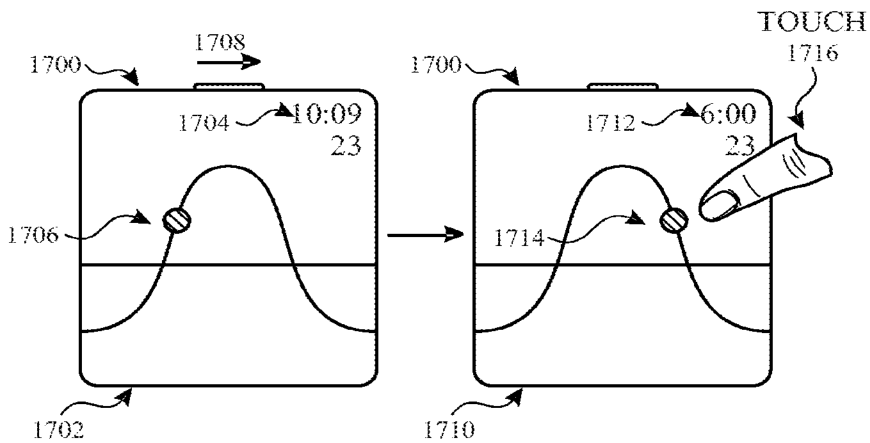
FIGS. 17A and 17B illustrate exemplary context-specific user interfaces.

FIG. 17A shows exemplary context-specific user interfaces that may be operated on device 1700. Device 1700 may be device 100, 300, or 500 in some embodiments. In some embodiments, the electronic device has a touch-sensitive display (e.g., touchscreen 504) and a rotatable input mechanism (e.g., 506 or 1540).

In this example, a user wants to set a reminder for 6:00 (this may be a reminder for 6:00 at a specific day or a general reminder for 6:00 every day). Device 1700 displays user interface screen 1702. Screen 1702 depicts a clock face similar to those described in reference to FIGS. 11A-C and includes affordance 1704, which indicates the time of day, and a sinusoidal wave indicating a path of the Sun through the day. Screen 1702 further includes affordance 1708, which as described in FIG. 11A indicates a current time of day by its position along the sinusoidal wave (10:09).

A user may contact the display, which then prompts the device to enter into a user interaction mode. User interaction mode provides the user additional interactions available within the user interface, such as setting a user reminder. Once in user interaction mode, a user moves the rotatable input mechanism (e.g., movement 1708), and in response to detecting the movement, device 1700 displays screen 1710. Screen 1710 displays a non-current time of day (6:00), as indicated by affordance 1712 and the position of affordance 1714 along the sinusoidal wave. The user may use movement 1708 to scroll through times of day until a designated time is displayed (in this case 6:00) so the user can set a reminder for the designated time of day.

The user contacts the display at affordance 1714 (e.g., touch 1716), and in response to detecting the contact, device 1700 sets a reminder for the indicated time of day (6:00). This allows the user to set a designate a time of day for a user reminder.

Figure 17B:
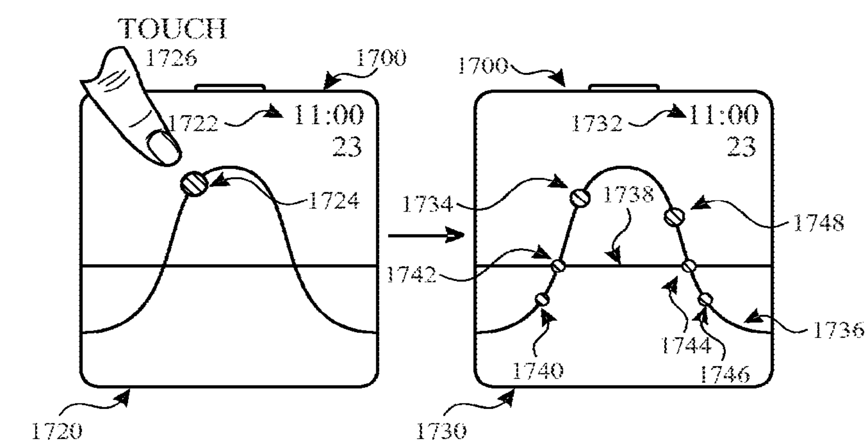

FIG. 17B shows device 1700 at a later time of day (11:00). Device 1700 displays screen 1720. Screen 1720 includes affordance 1722, which indicates the current time, and affordance 1724, which indicates a current time of day by its position along the sinusoidal wave. As shown in FIG. 11B, in this context-specific user interface, a user may contact affordance 1724 (e.g., touch 1726) to view user interface objects representing dawn, dusk, sunrise, and sunset.

In response to detecting the contact, device 1700 displays screen 1730. Screen 1730 includes affordance 1732, which indicates the current time of day, and affordance 1734, which also indicates the current time of day by its position along sinusoidal wave 1736. Line 1738 depicts the boundary between the daytime and nighttime portions of the display. As described above, screen 1730 includes user interface objects 1740 (representing a time of dawn), 1742 (representing a time of sunrise), 1744 (representing a time of sunset), and 1746 (representing a time of dusk).

Importantly, screen 1730 also displays affordance 1748. Affordance 1748 is a visual reminder of the time of day designated by the user (6:00) in FIG. 17A. Thus, the device now displays a user reminder for this time of day, in this case in response to a user contact on affordance 1724.

In some embodiments, setting the user reminder may include displaying an affordance representing a user prompt to set an alert for the designated time of day. This affordance may include a user interface for setting one or more properties of the alert.

In some embodiments, a user reminder may include a calendar event. For example, instead of a user setting the user reminder as described above, the device may import a calendar event from a calendar application. Using the example illustrated in FIG. 17B, affordance 1748 may represent a calendar event imported from a calendar application. Importing a calendar event from a calendar application allows the user to track the time of the calendar event compared with the current time and/or other times of interest (e.g., sunrise, sunset, dawn, or dusk). For example, the user may be able to view the time of a tennis match (stored as a calendar event) as part of screen 1730 and thereby gauge how much time is left before the match is scheduled, or how much time is available between the start of the match and sunset. In some embodiments, the user may move the rotatable input mechanism (e.g., movement 1708), and in response to detecting the movement, the device may snap to the user reminder by visually distinguishing affordance 1748 and/or by updating a displayed indication of time to indicate the time associated with the user reminder represented by affordance 1748.

In some embodiments, the user reminder represents a recurring event. In some embodiments, the time of the user reminder is based on a fixed chronological time. To use FIG. 17B as an example, if the user reminder is a tennis match, it may recur at the same chronological time throughout the year, but the position of affordance 1748 relative to line 1738 may change throughout the year. This would allow the user to determine whether sufficient daylight will be present throughout the match on a given date simply by viewing the position of affordance 1748. In other embodiments, the time of the user reminder is based on a solar condition (e.g., the amount of daylight or lack thereof). For example, a user reminder may reflect the time of a solar condition, such as a particular time before sunset, or the time that the sun is at a particular angle above the horizon. Therefore, if such a user reminder is recurring, the chronological time of the user reminder may vary over time while still representing the same solar condition, allowing the user to plan for viewing this solar condition at any time of the year.

The user reminder for the designated time of day may include one or more optional features. In some embodiments, the reminder may include a visual alert for the designated time of day. For example, the device may display a visual alert on or before the designated time of day. Alternatively, the device may display at any time a visual affordance that shows the designated time of day within the context of the current user interface. In the example of FIG. 17B, visual affordance 1748 is displayed along the sinusoidal wave to help the user understand how far the designated time of day is from the current time of day.

In some embodiments, the user reminder may include an audio alert for the designated time of day. For example, the device may play a sound on or before the designated time of day. In some embodiments, the user reminder may include a haptic alert generated on or before the designated time of day (e.g., using haptic feedback module 133 and tactile output generator 167). This haptic signal lets the user know when the designated time of day is approaching.

Figure 18A:
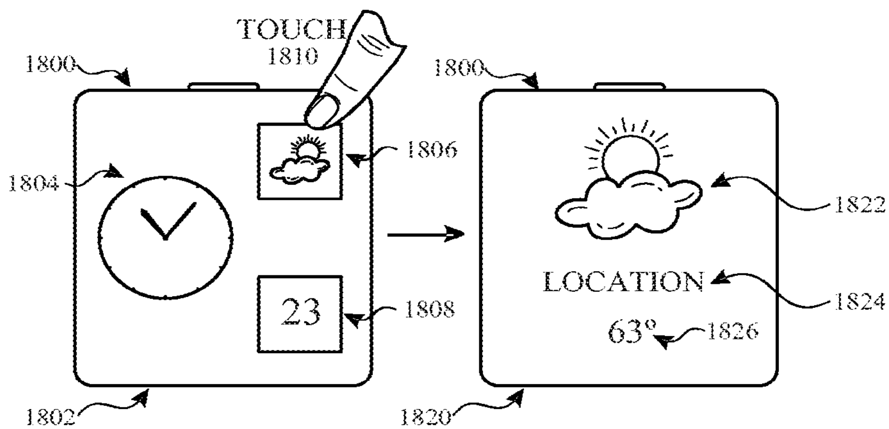
FIGS. 18A-18C illustrate exemplary context-specific user interfaces.

Turning now to FIG. 18A, any or all of the context-specific user interfaces described herein may include one or more complications. One type of complication a user may wish to use is a complication for launching an application. For example, the affordance representing the complication on the clock face may display a set of information from the corresponding application. However, a user may wish to view additional information from the application, or launch the full application itself.

FIG. 18A shows exemplary context-specific user interfaces that may be operated on device 1800. Device 1800 may be device 100, 300, or 500 in some embodiments. In some embodiments, the electronic device has a touch-sensitive display (e.g., touchscreen 504).

Device 1800 displays user interface screen 1802. Screen 1802 includes clock face 1804 and affordances 1806 and 1808, which are displayed as complications. Affordances 1806 and 1808 represent applications and include a set of information obtained from the corresponding application. In this example, affordance 1806 represents a weather application and displays weather conditions obtained from the weather application. Affordance 1808 represents a calendar application and displays the current date obtained from the calendar application. Affordance 1806 and affordance 1808 are updated in accordance with data from the corresponding application. For example, affordance 1806 is updated to display current weather conditions obtained from the weather application. Affordance 1808 is updated to display the current date obtained from the calendar application. For example, these complications may be application widgets updated based on application data.

To launch the weather application, a user contacts the display at affordance 1806 (e.g., touch 1810). In response, device 1800 launches the weather application, which is depicted on screen 1820. Screen 1820 shows further weather information, including current weather conditions (e.g., user interface object 1822), an indication of the current location (e.g., user interface object 1824), and an indication of the current temperature (e.g., user interface object 1826).

Figure 18B:
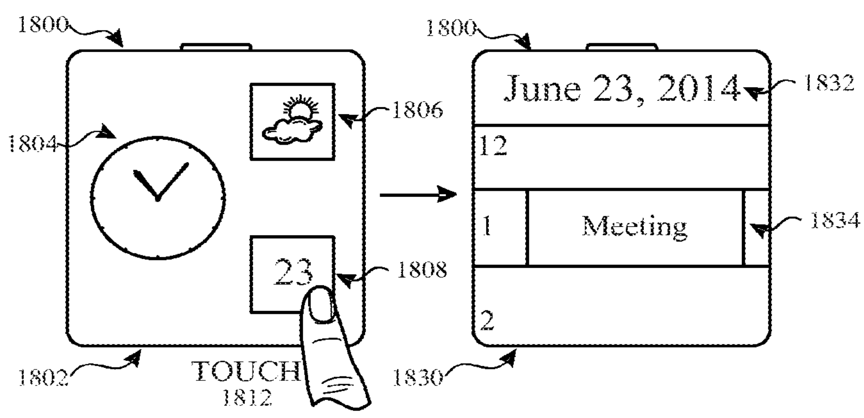

FIG. 18B also depicts device 1800 displaying screen 1802. As depicted in FIG. 18A, screen 1802 includes clock face 1804 and affordances 1806 and 1808, which are displayed as complications.

If a user wishes to launch the calendar application instead of the weather application, the user contacts the display at affordance 1808 (e.g., touch 1812). In response, device 1800 launches the calendar application, which is depicted on screen 1830. Screen 1830 shows further calendar information, including user interface object 1832, which depicts the full date, and user interface object 1834, which represents a calendar event (in this case, a meeting at 1).

In some embodiments, a user interface screen may display a complication that represents an application and includes a set of information obtained from the corresponding application. In some embodiments, as illustrated by FIGS. 18A and 18B, a user interface screen may display a plurality of complications that represent applications and include sets of information obtained from a plurality of applications, or a plurality of sets of information obtained from a single application.

In some embodiments, as described above, a user may move a rotatable input mechanism to scroll a displayed indication of time forward or backward. In some embodiments, the device may display two or more indications of time, and in response to detecting a movement of the rotatable input mechanism, the device may update one or more of the displayed indications of time and keep another indication of time constant. To illustrate using screen 1802 in FIGS. 18A and B as an example, if affordance 1808 represents an indication of current time (e.g., a digital display), the device may update the displayed clock face in response to detecting the movement of the rotatable input mechanism while continuing to display the current time with affordance 1808. The displayed clock face may be updated, for example, by animating a clockwise or counter-clockwise movement of one or more clock hands, depending on whether the displayed time is scrolled forward or backward.

In some embodiments, the device may update other displayed complications (e.g., those that do not indicate a time per se) in response to detecting the movement of the rotatable input mechanism. For example, in addition to updating the time displayed by clock face 1804, the device may also update the forecasted or historical weather condition displayed by affordance 1806 to correspond with the time indicated by clock face 1804. In these embodiments, the device may forego updating another displayed complication in response to scrolling the displayed time. For example, a displayed stopwatch complication may remain the same while the displayed clock face is updated. In some embodiments, a displayed complication that is not updated in response to detecting the movement of the rotatable input mechanism may be visually distinguished, such as by changing a hue, saturation, and/or lightness of the displayed complication. This allows the user to distinguish which complications are updated and which remain constant.

Advantageously, these context-specific user interface methods, which may be applied to any of the context-user interfaces described herein simply by including an application complication, allow the user to view updated information from a particular application while also presenting a quick way to launch the corresponding application in the same user interface object. Moreover, the application and/or application information depicted by the complication may further be customized using the editing methods described in reference to FIG. 15 (see, e.g., screen 1560 and 1570).

A user may navigate screens on, e.g., a portable multifunction device, that include many affordances. These affordances may represent, for example, applications that may be launched on the device. One such affordance may activate a context-specific user interface, such as those described herein. In order to help the user recognize that a particular affordance corresponds to launching a context-specific user interface, an animation that visually connects the affordance to the interface may be desirable.

Figure 18C:
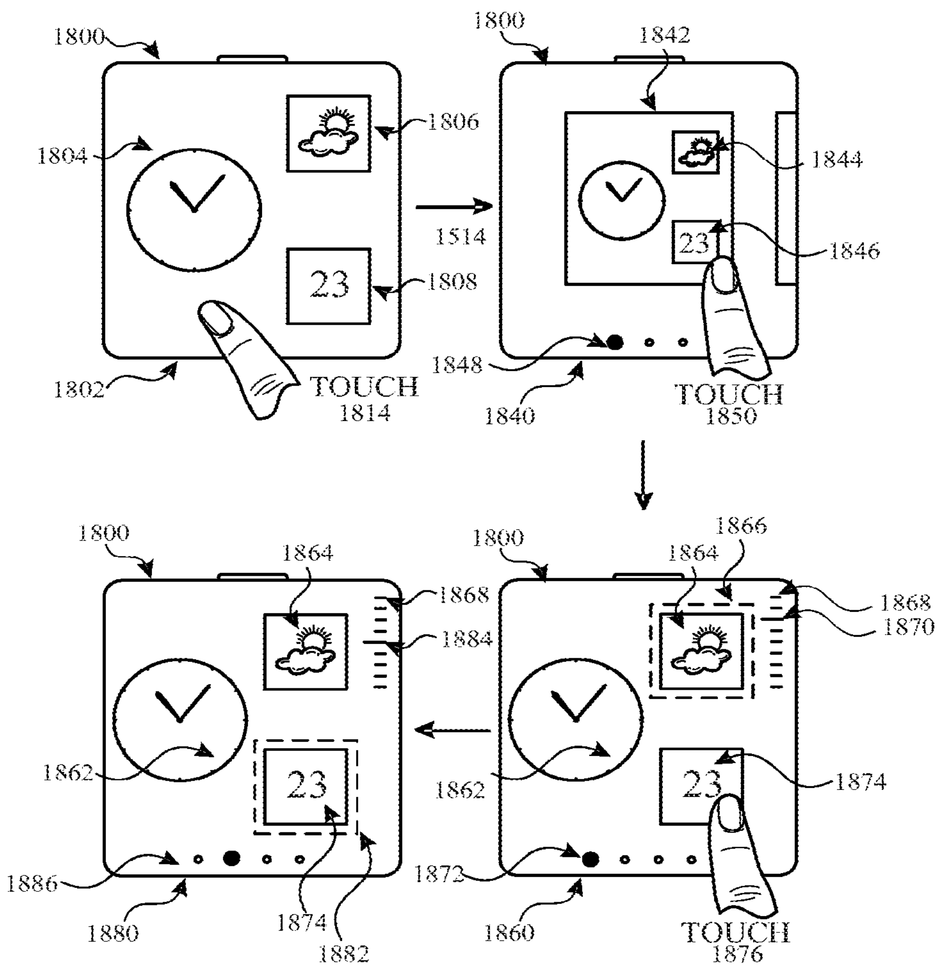

FIG. 18C shows an exemplary user interface for editing a clock face that contains more than one complication, such as the ones depicted in FIGS. 18A and 18B. FIG. 18C again depicts device 1800 displaying screen 1802, which includes clock face 1804, affordance 1806 representing a weather application, and affordance 1808 representing a calendar application.

As discussed above in reference to FIG. 15, a user may customize the complications displayed on screen 1802 by entering clock face edit mode. The user contacts the touch-sensitive display of device 1800 with touch 1814. Touch 1814 has a characteristic intensity above an intensity threshold, which prompts device 1800 to enter a clock face edit mode, shown on screen 1840. Device 1800 indicates that the user has entered clock face edit mode by visually distinguishing the clock face. In this example, screen 1840 shows a smaller version of the display of screen 1802 (e.g., 1842), which includes a reduced size clock face, reduced size complication 1844, which is based on complication 1806, and reduced size complication 1846, which is based on complication 1808.

A user selects this clock face for editing by contacting displayed clock face 1842 (e.g., touch 1850). In some embodiments, touch 1850 is a contact on the touch-sensitive display. In some embodiments, touch 1850 is a contact on the touch-sensitive display with a characteristic intensity above an intensity threshold. This causes device 1800 to enter into clock face edit mode and display screen 1860. Screen 1860 displays clock face 1862 for editing. Currently, affordance 1864 representing the weather application is selected for editing, as highlighted by outline 1866. Also displayed is positional indicator 1868, which indicates the position of the displayed complication in a series of complication options using line 1870. Positional indicator 1868 further indicates to the user that a rotatable input mechanism may be used to cycle through options available for editing affordance 1864 (e.g., which set of information from the weather application to display, or another application from which a set of information may be displayed). Paging affordance 1872 also displays the position of the aspect of clock face 1862 currently selected for editing (i.e., complication 1864) in a series of editable aspects.

Screen 1860 also displays affordance 1874, which represents the calendar application. To select this complication for editing, the user contacts displayed affordance 1874 (e.g., touch 1876). In response, device 1800 displays screen 1880. Like screen 1860, screen 1880 displays clock face 1862, affordance 1864 (which represents the weather application), positional indicator 1868, and affordance 1874 (which represents the weather application). Affordance 1874 is now highlighted for editing, as shown by outline 1882.

The position of this complication option is depicted by line 1884 in positional indicator 1868. Finally, paging affordance 1886 has been updated to display the position of affordance complication 1874 in a series of editable aspects of clock face 1862. The user may now edit the set of information displayed by affordance 1874 using the rotatable input mechanism (e.g., which set of information from the calendar application to display, or another application from which a set of information may be displayed). In summary, while in clock face edit mode, a user may select a complication for editing when more than one complication is displayed by contacting the displayed complication. In some embodiments, this causes the affordance to be highlighted (e.g., by a visible outline or other means for visibly distinguishing the affordance described herein).

Figure 19:
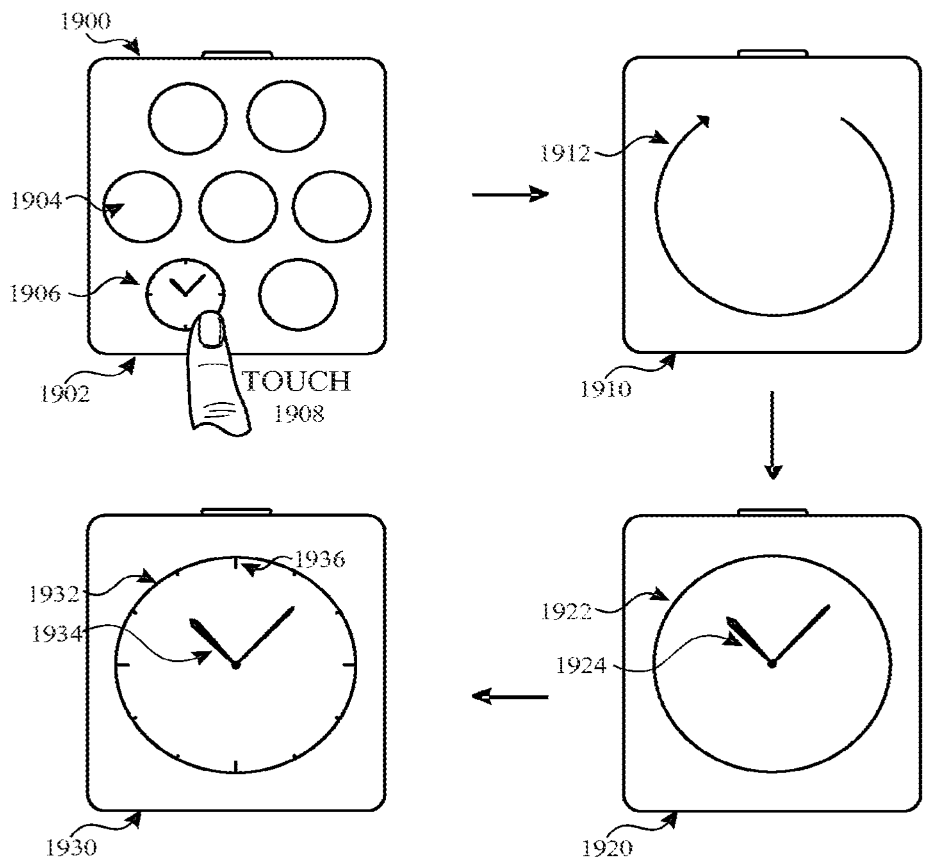
FIG. 19 illustrates exemplary context-specific user interfaces.

FIG. 19 shows exemplary context-specific user interfaces that may be operated on device 1900. Device 1900 may be device 100, 300, or 500 in some embodiments. In some embodiments, the electronic device has a touch-sensitive display (e.g., touchscreen 504).

Device 1900 displays user interface screen 1902, which includes a plurality of affordances (e.g., affordances 1904 and 1906). Affordance 1906 represents a clock face that includes an indication of time (e.g., the hour hand, minute hand, and tick marks) and an outline (e.g., a circle or a polygon such as a square with rounded corners). In some embodiments, the clock face may indicate the current time. The user contacts the touch-sensitive display (e.g., touch 1908) at affordance 1906, and in response, device 1900 displays, sequentially, screens 1910, 1920, and 1930 in continuous on-screen animation.

Screen 1910 shows outline 1912 being animated by progressively displaying the element in a rotational motion (e.g., as if it is being filled in or drawn in a clockwise manner). Next, screen 1920 shows full outline 1922 and hour hand and minute hand 1924. Finally, screen 1930 shows full outline 1932, hour hand and minute hand 1934, and hour indication 1936. Like the outline, the hour indications may also be progressively filled in sequentially (e.g., in a clockwise manner). Importantly, at least one of the elements from affordance 1906 is maintained on screen 1930 (e.g., an outline, or the hour and minute hands), but at a larger display size.

While FIG. 19 depicts an analog clock face with an hour hand and a minute hand, the techniques described in reference to FIG. 19 may apply to many context-specific user interfaces. For example, if the user interface displays a representation of the Earth (as shown in FIG. 8), the affordance in the plurality of affordances may depict an Earth, and the outline of the Earth may be retained and/or drawn in using a clockwise motion.

A user may also wish to receive an indication from a portable multifunction device that a missed or unread notification is available. Thus, in any of the embodiments described herein, a device may receive a notification, determine whether the notification has been missed (e.g., not viewed or marked as not read), and in accordance with a determination that the notification has been missed, display an affordance indicating a missed notification. in accordance with a determination that the notification has not been missed, the device may forego displaying the affordance indicating a missed notification. In some embodiments, an aspect of the displayed affordance represents a number of missed notifications received by the electronic device. For example, the displayed affordance may change color, change size, or be animated (e.g., to depict pulsing) to represent a number of missed notifications. In some embodiments, in response to receiving data representing user viewing of the missed notification, the device may remove the displayed affordance. This provides the user a quick visual reminder that a notification may be viewed.

A user may also wish to launch an application, such as a stopwatch application, from any of the context-specific user interfaces described herein. Thus, in any of the embodiments described herein, a device may display a stopwatch progress affordance that indicates a currently running stopwatch application. For example, the stopwatch progress affordance may depict a representation of a digital stopwatch (e.g., similar to affordance 1694 in FIG. 16C). This representation may be continuously updated to indicate a stopwatch time generated by the currently running stopwatch application. A user may contact the stopwatch progress affordance, and in response to detecting the contact, the device may launch the stopwatch application. This provides a functional reminder that a stopwatch is currently running from any context-specific user interface.

When traveling, a user may wish to quickly access the time at home, or another designated location. Thus, in any of the embodiments described herein, a device may include a location sensor (e.g., GPS sensor 532 and/or GPS module 135). While any clock face is displayed on the display, a user may contact the display, and in response to detecting the contact, the device may access a designated home location (e.g., a home time zone). The device may obtain a current time zone (i.e., at the current location of the device), determine whether the current time zone is different from the home time zone, and in accordance with a determination that the current time zone is different from the home time zone, update the displayed clock face to indicate current time at the home time zone. In accordance with a determination that the current time zone is not different from the home time zone, the device may continue to display the same clock face to indicate current time at both the home time zone and the current time zone.

In some embodiments, a user may designate the home time zone. For example, the device may provide a user interface for designating the home time zone.

In other embodiments, the device may designate the home time zone. For example, the device could base this designation on data representing amount of time spent at a location, which times of day are spent at the location, and/or a number of contact entries associated with the location. In this way, the device may automatically be able to designate a home time zone.

A user may wish to display different context-specific user interfaces, such as those described herein, depending on a particular context. For example, a user may wish to display a specific context-specific user interface or specific content (e.g., information provided by a displayed complication) while at work, then display a different context-specific user interface or different content while at home. In some embodiments, a user may designate a time of day to change the displayed context-specific user interface. In some embodiments, a user may designate an interval during the day wherein a particular context-specific user interface is displayed. In other embodiments, the device may include a location sensor, and a user may designate a context-specific user interface to be displayed at a particular location (e.g., a home or office). In some embodiments, the device may employ a heuristic method to track previous user interactions, such as a time of day and/or location whereupon a user has changed context-specific user interfaces, a particular context-specific user interface that has been selected or de-selected, and the like. For example, if a user has changed context-specific user interfaces at an approximately regular time after returning home from work, the device may display a prompt asking if the user would like to change context-specific user interfaces at the same time on the following day. In some embodiments, the device automatically changes the context-specific user interface based on a previous user interaction. In other embodiments, the device prompts the user to change the context-specific user interface based on a previous user interaction.

It may be desirable to vary the display of any of the devices described herein. Thus, in any of the embodiments described herein, a device may display a clock face that includes a plurality of pixels, detect a movement of the device (as described above), and in response to detecting the movement, move the displayed clock face on the display. Moving may include modifying a subset of the pixels in the plurality (e.g., by changing color and/or intensity of one or more pixels).

A user may wish to use a virtual tachymeter (e.g., a tachymeter that is not based on a physical tachymeter dial built onto the device) on any of the devices described herein. A virtual tachymeter may be provided, for example, by a tachymeter user interface object that may be displayed on a dedicated tachymeter user interface screen, or on any of the user interface screens described herein (e.g., as a tachymeter complication). The user may provide a user input to start the virtual tachymeter and, subsequently the user may stop the virtual tachymeter by providing a second user input. For example, the tachymeter user interface object may include a start affordance, a stop affordance, or a combined start/stop affordance. The user may start the virtual tachymeter by contacting the start affordance or the start/stop affordance and stop the virtual tachymeter by contacting the stop affordance or the start/stop affordance. In another example, one or both user inputs may be an input on a mechanical button (e.g., a rotation and/or depression of the rotatable and depressible input mechanism 506, and/or a press on button 508) to start and/or stop the virtual tachymeter. In some embodiments, one or both user inputs may be an audio (e.g., verbal) input.

After the user has stopped the virtual tachymeter, the device may display a time value based on the time elapsed between start and stop. This time value may be based on, for example, a number of units of time in a predetermined interval (e.g., the number of seconds in an hour). In some embodiments, the displayed time value may be based on the number of units of time in the predetermined interval (e.g., the number of seconds in an hour) divided by the time elapsed between start and stop. In some embodiments, the user may customize the units of time used by the tachymeter, the units of time in the predetermined interval, and/or the predetermined interval. In some embodiments, while the virtual tachymeter is running, the tachymeter user interface object may include an updating display to indicate the passage of time, such as a running or continuously updated countdown of the time value, a rotating shape, and the like. Advantageously, since the tachymeter is virtual, it may measure any increment or interval of time because it is not constrained or fixed like a traditional tachymeter, such as a watch tachymeter. For example, a watch tachymeter is typically limited to measuring times less than or equal to 60 seconds, because the displayed time values are fixed (e.g., painted or etched onto a tachymeter dial) and only apply to values within one full rotation of the second hand.

A user may wish to use a virtual telemeter (e.g., a telemeter that is not based on a physical telemeter dial built onto the device) on any of the devices described herein. A virtual telemeter may be provided, for example, by a telemeter user interface object that may be displayed on a dedicated telemeter user interface screen, or on any of the user interface screens described herein (e.g., as a telemeter complication).

The user may provide a user input to start the virtual telemeter and, subsequently the user may stop the virtual telemeter by providing a second user input. For example, the telemeter user interface object may include a start affordance, a stop affordance, or a combined start/stop affordance. The user may start the virtual telemeter by contacting the start affordance or the start/stop affordance and stop the virtual telemeter by contacting the stop affordance or the start/stop affordance. In another example, one or both user inputs may be an input on a mechanical button (e.g., a rotation and/or depression of the rotatable and depressible input mechanism 506, and/or a press on button 508) to start and/or stop the virtual telemeter. In some embodiments, one or both user inputs may be an audio (e.g., verbal) input. After the user has stopped the virtual telemeter, the device may display a distance based on the time elapsed between start and stop. This distance may be based on the speed of sound. For example, the user may see lightning, start the telemeter, and stop the telemeter when the user hears thunder. In this case, the distance reported by the telemeter will indicate the distance between the user and the lightning, based on the time interval between when the light reaches the user and when the sound reaches the user. In some embodiments, the user may designate the units for reporting the distance (e.g., kilometers, miles, etc.). In some embodiments, while the virtual telemeter is running, the telemeter user interface object may include an updating display to indicate the passage of time, such as a running or continuously updated distance, a rotating shape, and the like. Advantageously, since the telemeter is virtual, it may measure any increment or interval of time because it is not constrained or fixed like a traditional telemeter, such as a watch telemeter. For example, a watch telemeter is typically limited to measuring times less than or equal to 60 seconds, because the displayed time values are fixed (e.g., painted or etched onto a telemeter dial) and only apply to values within one full rotation of the second hand.

A user may wish to use a repeated interval timer on any of the devices described herein, e.g., a timer that provides a user alert that is repeated at a certain interval. For example, if the user is exercising (e.g., interval training), they may wish to receive an alert every 30 seconds to change their mode of exercise or take a break. In another example, a user taking medication may wish to receive an alert to take their medication every hour, 4 hours, 6 hours, 12 hours, 24 hours, and so forth. Any suitable interval or duration of time may be used. In some embodiments, the device may display a repeated interval timer user interface. The repeated interval timer user interface may include, for example, an affordance for the user to designate the interval, the timescale for the interval (e.g., seconds, minutes, hours, days, weeks, months, years, etc.), and the like. In response to receiving data representing a user-designated time interval, the device may provide a user alert that is repeated at times based on the user-designated time interval. In some embodiments, the alert may include a visual alert, an audio alert, and/or a haptic alert (e.g., using haptic feedback module 133 and tactile output generator 167), or any combination thereof. Rather than being based on a designated end point (e.g., a reminder for a particular day or time), the repeated interval timer is based on providing the user a demarcation of a particular interval of time. In some embodiments, the repeated interval timer runs until the user ends the timer. In some embodiments, the device may further display an affordance for ending the repeated interval timer (e.g., as part of the repeated interval timer user interface, or at the time of the user alert).

In some embodiments, any of the devices described herein may further generate or receive a user alert including information and display a user notification based on the alert on any of the user interface screens described herein. The user notification may be, for example, a notification banner displayed across a portion of the display. The notification banner may include a portion of the information of the alert. An example of a user alert may include without limitation a determination that the user has crossed the boundary of a time zone. In some embodiments, the device has a location sensor (e.g., GPS sensor 532 and/or GPS module 135), and the device obtains a current location of the device from the location sensor. Using the location sensor, the device may determine whether the current location of the device is in a different time zone, as compared to a previous location of the device, for example the location of the device at the time of a previous user interaction (e.g., the last time the user looked at the display, or the last time the device detected a user movement of the device, such as a wrist raise). In accordance with the determination that the current location is in a different time zone than the previous location, the device may display a notification banner across a portion of the display. In some embodiments, the notification banner may include an alert indicating that the user has crossed a time zone, a notification of the current time in the new time zone, and so forth. In some embodiments, the device may prompt the user whether to accept the time change (e.g., the device may display an affordance for accepting the time change and/or an affordance for rejecting the time change). The user prompt may be displayed as part of the notification banner, or the user prompt may be displayed in response to detecting a user contact on the displayed notification banner. In response to receiving data indicating a user acceptance of the time change (e.g., a contact on the displayed affordance for accepting the time change), the device may update the displayed time based on the new time zone. In response to receiving data indicating a user rejection of the time change (e.g., a contact on the displayed affordance for rejecting the time change), the device may forego updating the displayed time based on the new time zone.

Figure 20:
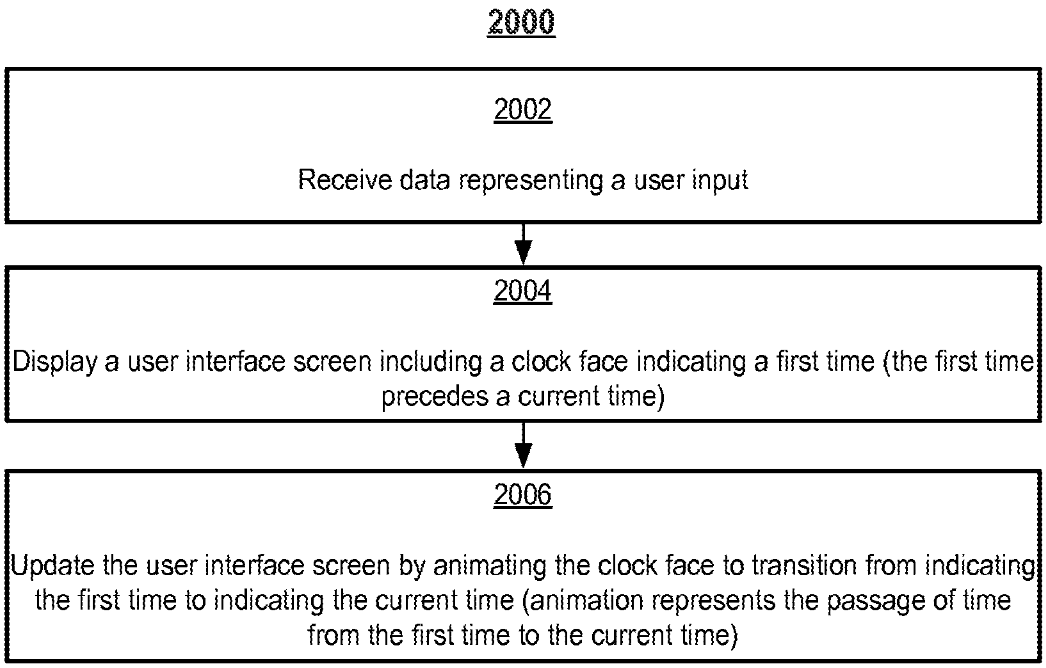
FIG. 20 is a flow diagram illustrating a process for context-specific user interfaces.

FIG. 20 is a flow diagram illustrating process 2000 for providing context-specific user interfaces. In some embodiments, process 2000 may be performed at an electronic device with a touch-sensitive display, such as device 100 (FIG. 1A), 300 (FIG. 3), 500 (FIG. 5) or 600 (FIGS. 6A and 6B). Some operations in process 2000 may be combined, the order of some operations may be changed, and some operations may be omitted. Process 2000 provides context-specific user interfaces that give the user an immediate indication of elapsed time before viewing, making these interfaces less confusing and, thus, conserving power and increasing battery life.

At block 2002, the device receives data representing a user input (e.g., 602). At block 2004, responsive at least in part to receiving the data, the device displays a user interface screen including a clock face (e.g., 606) indicating a first time (the first time precedes a current time). At block 2006, the device updates the user interface screen by animating the clock face to transition from indicating the first time to indicating the current time (animation represents the passage of time from the first time to the current time; see, e.g., 612).

Note that details of the processes described above with respect to process 2000 (FIG. 20) are also applicable in an analogous manner to the methods described below. For example, process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33) may include one or more of the characteristics of the various methods described above with reference to process 2000. For brevity, these details are not repeated below.

It should be understood that the particular order in which the operations in FIG. 20 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and process 3300 (FIG. 33) may be incorporated with one another. Thus, the techniques described with respect to process 2000 may be relevant to process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33).

Figure 21:
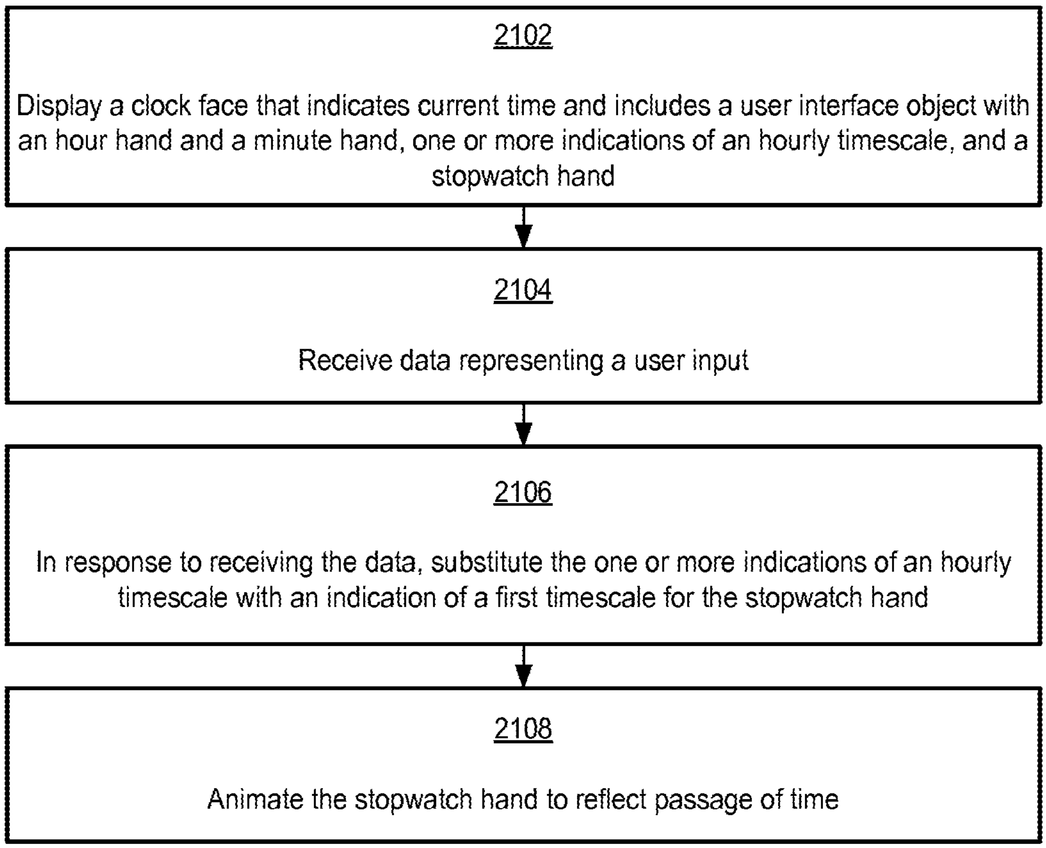
FIG. 21 is a flow diagram illustrating a process for context-specific user interfaces.

FIG. 21 is a flow diagram illustrating process 2100 for providing context-specific user interfaces. In some embodiments, process 2100 may be performed at an electronic device with a touch-sensitive display, such as device 100 (FIG. 1A), 300 (FIG. 3), 500 (FIG. 5) or 700 (FIGS. 7A and 7B). Some operations in process 2100 may be combined, the order of some operations may be changed, and some operations may be omitted. Process 2100 provides context-specific user interfaces that combine a stopwatch function and a timekeeping function, making these interfaces at once multifunctional and less confusing to the user, thus conserving power and increasing battery life.

At block 2102, the device displays a clock face that indicates current time and includes a user interface object with an hour hand and a minute hand, one or more indications of an hourly timescale, and a stopwatch hand (e.g., as on screen 702). At block 2104, the device receives data representing a user input (e.g., touch 712). At block 2106, responsive at least in part to receiving the data, the device substitutes the one or more indications of an hourly timescale with an indication of a first timescale for the stopwatch hand (e.g., 724). At block 2108, the device animates the stopwatch hand to reflect passage of time (e.g., cf. 726 and 736).

Note that details of the processes described above with respect to process 2100 (FIG. 21) are also applicable in an analogous manner to the methods described below. For example, process 2000 (FIG. 20), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33) may include one or more of the characteristics of the various methods described above with reference to process 2100. For brevity, these details are not repeated below.

It should be understood that the particular order in which the operations in FIG. 21 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of process 2000 (FIG. 20), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and process 3300 (FIG. 33) may be incorporated with one another. Thus, the techniques described with respect to process 2100 may be relevant to process 2000 (FIG. 20), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33).

Figure 22:
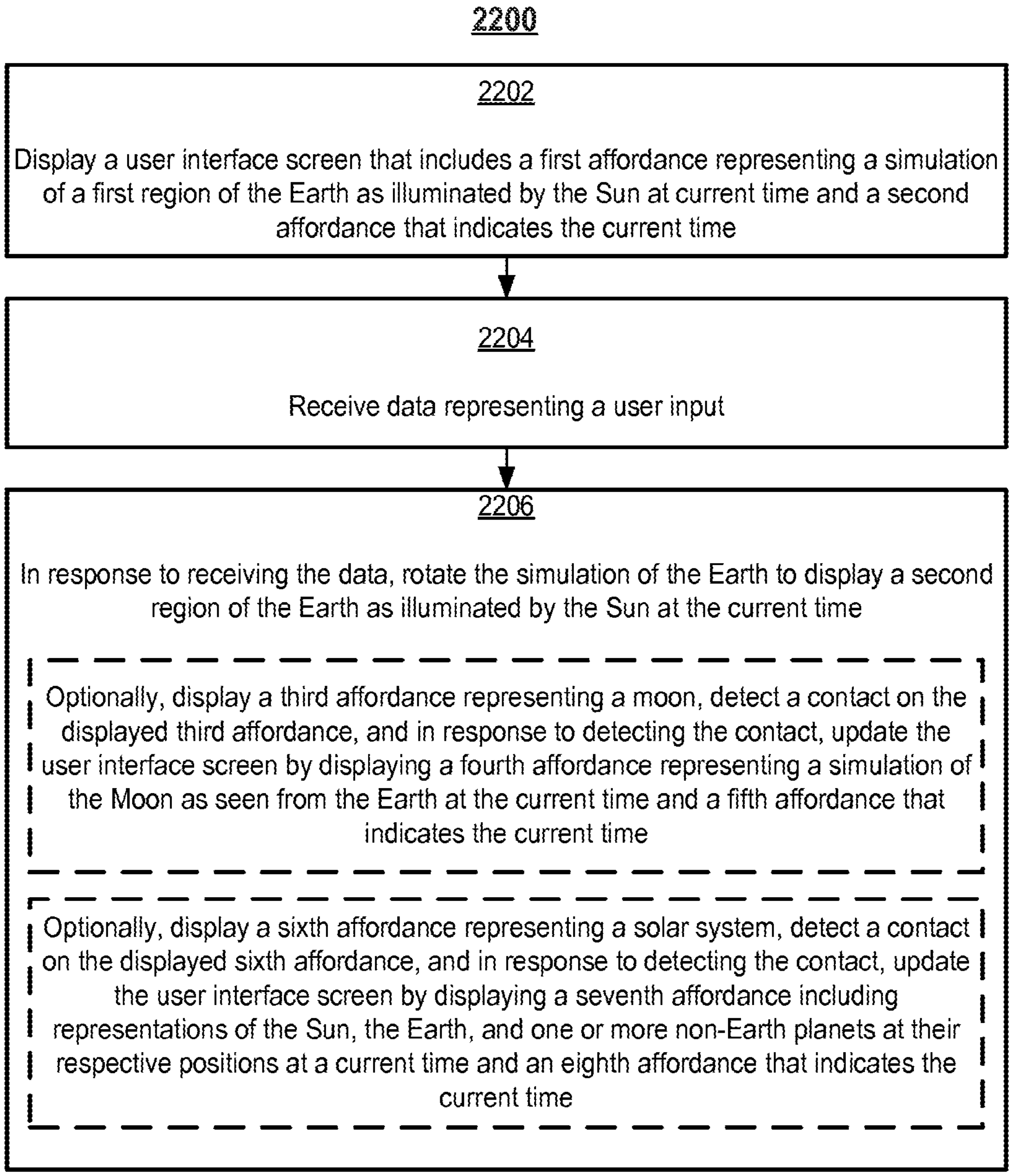
FIG. 22 is a flow diagram illustrating a process for context-specific user interfaces.

FIG. 22 is a flow diagram illustrating process 2200 for providing context-specific user interfaces. In some embodiments, process 2200 may be performed at an electronic device with a touch-sensitive display, such as device 100 (FIG. 1A), 300 (FIG. 3), 500 (FIG. 5), 800 (FIG. 8), 900 (FIG. 9), or 1000 (FIG. 10). Some operations in process 2200 may be combined, the order of some operations may be changed, and some operations may be omitted. Process 2200 provides context-specific user interfaces that provide timekeeping and geographical/astronomical information, making these interfaces at once multifunctional and less confusing to the user, thus conserving power and increasing battery life.

At block 2202, the device displays a user interface screen that includes a first affordance representing a simulation of a first region of the Earth as illuminated by the Sun at current time (e.g., 804) and a second affordance that indicates the current time (e.g., 806). At block 2204, the device receives data representing a user input (e.g., swipe 812). At block 2206, responsive at least in part to receiving the data, the device rotates the simulation of the Earth to display a second region of the Earth as illuminated by the Sun at the current time (e.g., 822). Optionally, at block 2206, the device displays a third affordance representing a moon (e.g., 808, 826, 846, 1016, and 1034), detects a contact on the displayed third affordance, and responsive at least in part to detecting the contact, updates the user interface screen by displaying a fourth affordance representing a simulation of the Moon as seen from the Earth at the current time (e.g., 904) and a fifth affordance that indicates the current time (e.g., 906). Optionally, at block 2206, the device displays a sixth affordance representing a solar system (e.g., 810, 828, and 848), detects a contact on the displayed sixth affordance, and responsive at least in part to detecting the contact, updates the user interface screen by displaying a seventh affordance including representations of the Sun, the Earth, and one or more non-Earth planets at their respective positions at a current time (e.g., 1004) and an eighth affordance that indicates the current time (e.g., 1012).

Note that details of the processes described above with respect to process 2200 (FIG. 22) are also applicable in an analogous manner to the methods described below. For example, process 2000 (FIG. 20), process 2100 (FIG. 21), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33) may include one or more of the characteristics of the various methods described above with reference to process 2200. For brevity, these details are not repeated below.

It should be understood that the particular order in which the operations in FIG. 22 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of process 2000 (FIG. 20), process 2100 (FIG. 21), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and process 3300 (FIG. 33) may be incorporated with one another. Thus, the techniques described with respect to process 2200 may be relevant to process 2000 (FIG. 20), process 2100 (FIG. 21), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33).

FIG. 23 is a flow diagram illustrating process 2300 for providing context-specific user interfaces. In some embodiments, process 2300 may be performed at an electronic device with a touch-sensitive display, such as device 100 (FIG. 1A), 300 (FIG. 3), 500 (FIG. 5) or 1100 (FIGS. 11A-C). Some operations in process 2300 may be combined, the order of some operations may be changed, and some operations may be omitted. Process 2300 provides context-specific user interfaces that allow the user to view current time of day with respect to daylight/nighttime conditions, making these interfaces at once multifunctional and less confusing to the user, thus conserving power and increasing battery life.

At block 2302, the device displays a user interface screen that includes a first portion indicating daytime (e.g., 1104); a second portion indicating nighttime (e.g., 1106); a user interface object representing a sinusoidal wave with a period representing a day (e.g., 1108); a first affordance representing the Sun displayed at a first position on the sinusoidal wave indicating a current time of the day and whether the current time of the day is during daytime or nighttime (e.g., 1110); and a second affordance, the second affordance indicating the current time of day (e.g., 1114). Optionally, at block 2304, the device receives a contact on the touch-sensitive display at the first affordance at the first position indicating the current time (e.g., 1148). Optionally, at block 2306, while continuing to receive the user contact, the device detects movement of the user contact from the first position to a second position on the displayed sinusoidal wave without a break in contact of the user contact on the touch-sensitive display (second position on the sinusoidal wave indicates a non-current time; see, e.g., touch 1166). Optionally, at block 2308, responsive at least in part to detecting the contact at the second position, the device translates the first affordance on-screen from the first position on the sinusoidal wave to the second position on the sinusoidal wave (translation tracks the displayed sinusoidal wave; see, e.g., 1162). Optionally, at block 2310, the device updates the second affordance to indicate the non-current time (e.g., 1168).

Note that details of the processes described above with respect to process 2300 (FIG. 23) are also applicable in an analogous manner to the methods described below. For example, process 2000 (FIG. 20), process 2100 (FIG. 21), process 2200 (FIG. 22), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33) may include one or more of the characteristics of the various methods described above with reference to process 2300. For brevity, these details are not repeated below.

It should be understood that the particular order in which the operations in FIG. 23 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of process 2000 (FIG. 20), process 2100 (FIG. 21), process 2200 (FIG. 22), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and process 3300 (FIG. 33) may be incorporated with one another. Thus, the techniques described with respect to process 2300 may be relevant to process 2000 (FIG. 20), process 2100 (FIG. 21), process 2200 (FIG. 22), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33).

FIG. 24 is a flow diagram illustrating process 2400 for providing context-specific user interfaces. In some embodiments, process 2400 may be performed at an electronic device with a touch-sensitive display, such as device 100 (FIG. 1A), 300 (FIG. 3), 500 (FIG. 5) or 1200 (FIG. 12). Some operations in process 2400 may be combined, the order of some operations may be changed, and some operations may be omitted. Process 2400 provides context-specific user interfaces that provide an easily distinguishable background image and indications of date and/or time created out of the background, making these interfaces easier for the user to view, thus conserving power and increasing battery life.

At block 2402, the device displays a user interface screen that includes a background, based on an image (e.g., 1204 and 1212), with a plurality of pixels (a subset of the pixels are modified in appearance relative to the image such that the subset of pixels represents one or more of a first user interface object indicating a date and a second user interface object indicating a time of day; see, e.g., 1206 and/or 1208). Optionally, at block 2402, one of the first user interface object and the second user interface object is a color independent of the background. Optionally, at block 2404, if one of the first user interface object and the second user interface object is a color independent of the background, the device receives data representing a background color of the background at a position of the displayed first user interface object or the displayed second user interface object (first color is different from background color at the position of the displayed first user interface object or the displayed second user interface object).

Note that details of the processes described above with respect to process 2400 (FIG. 24) are also applicable in an analogous manner to the methods described below. For example, process 2000 (FIG. 20), process 2100 (FIG. 21), process 2200 (FIG. 22), process 2300 (FIG. 23), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33) may include one or more of the characteristics of the various methods described above with reference to process 2400. For brevity, these details are not repeated below.

It should be understood that the particular order in which the operations in FIG. 24 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of process 2000 (FIG. 20), process 2100 (FIG. 21), process 2200 (FIG. 22), process 2300 (FIG. 23), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and process 3300 (FIG. 33) may be incorporated with one another. Thus, the techniques described with respect to process 2400 may be relevant to process 2000 (FIG. 20), process 2100 (FIG. 21), process 2200 (FIG. 22), process 2300 (FIG. 23), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33).

Figure 25:
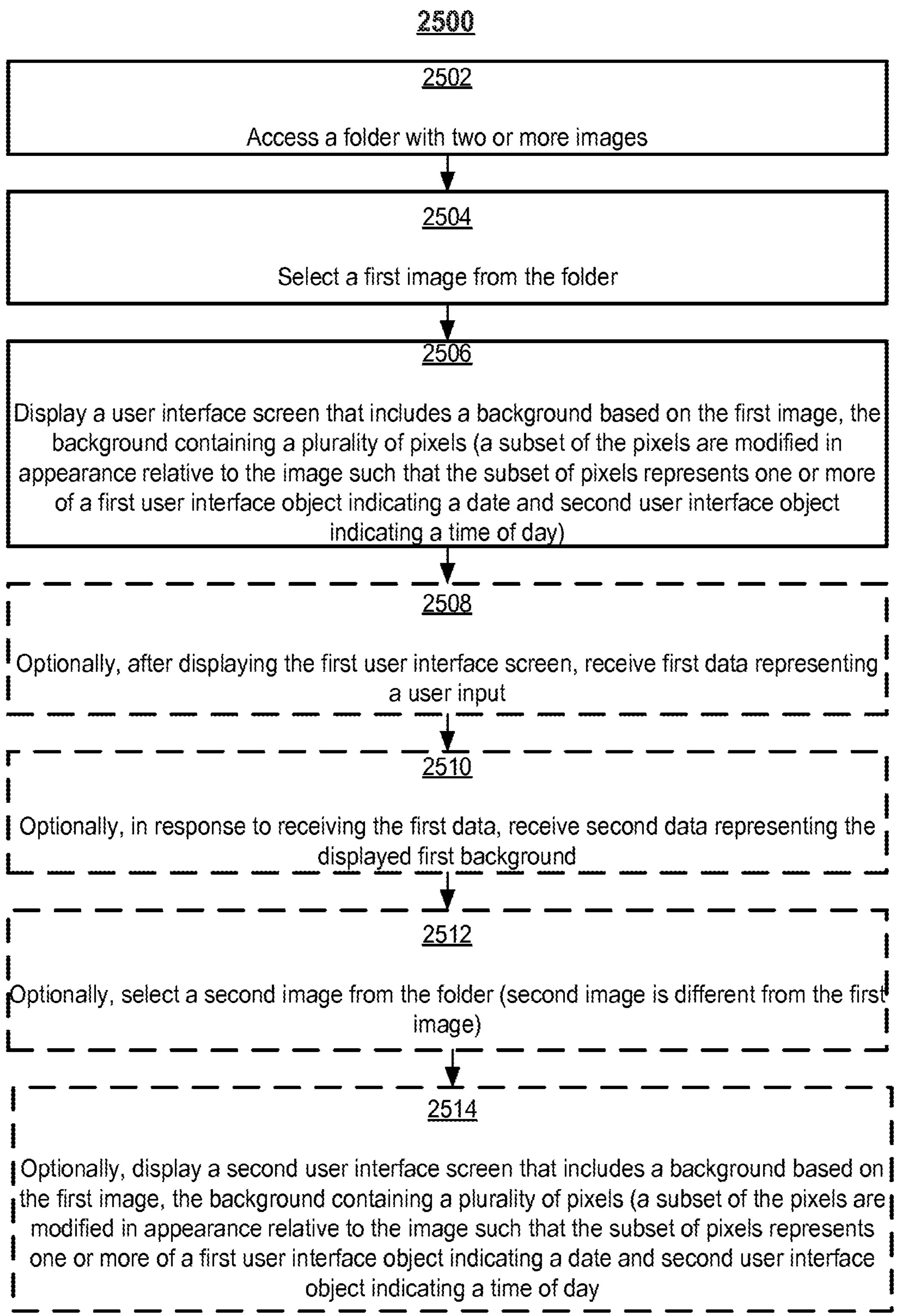
FIG. 25 is a flow diagram illustrating a process for context-specific user interfaces.

FIG. 25 is a flow diagram illustrating process 2500 for providing context-specific user interfaces. In some embodiments, process 2500 may be performed at an electronic device with a touch-sensitive display, such as device 100 (FIG. 1A), 300 (FIG. 3), 500 (FIG. 5) or 1200 (FIG. 12). Some operations in process 2500 may be combined, the order of some operations may be changed, and some operations may be omitted. Process 2500 provides context-specific user interfaces that provide an easily distinguishable background image and indications of date and/or time created out of the background, making these interfaces easier for the user to view, thus conserving power and increasing battery life.

At block 2502, the device accesses a folder with two or more images. At block 2504, the device selects a first image from the folder. At block 2506, the device displays a user interface screen (e.g., 1202) that includes a background based on the first image, the background containing a plurality of pixels (a subset of the pixels are modified in appearance relative to the image such that the subset of pixels represents one or more of a first user interface object indicating a date and second user interface object indicating a time of day; see, e.g., 1204). Optionally, at block 2508, after displaying the first user interface screen, the device receives first data representing a user input. Optionally, at block 2510, responsive at least in part to receiving the first data, the device receives second data representing the displayed first background. Optionally, at block 2512, the device selects a second image from the folder (second image is different from the first image; see, e.g., 1212). Optionally, at block 2514, the device displays a second user interface screen (e.g., 1210) that includes a background based on the first image, the background containing a plurality of pixels (a subset of the pixels are modified in appearance relative to the image such that the subset of pixels represents one or more of a first user interface object indicating a date and second user interface object indicating a time of day.

Note that details of the processes described above with respect to process 2500 (FIG. 25) are also applicable in an analogous manner to the methods described below. For example, process 2000 (FIG. 20), process 2100 (FIG. 21), process 2200 (FIG. 22), process 2300 (FIG. 23), process 2400 (FIG. 24), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33) may include one or more of the characteristics of the various methods described above with reference to process 2500. For brevity, these details are not repeated below.

It should be understood that the particular order in which the operations in FIG. 25 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of process 2000 (FIG. 20), process 2100 (FIG. 21), process 2200 (FIG. 22), process 2300 (FIG. 23), process 2400 (FIG. 24), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and process 3300 (FIG. 33) may be incorporated with one another. Thus, the techniques described with respect to process 2500 may be relevant to process 2000 (FIG. 20), process 2100 (FIG. 21), process 2200 (FIG. 22), process 2300 (FIG. 23), process 2400 (FIG. 24), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33).

Figure 26:
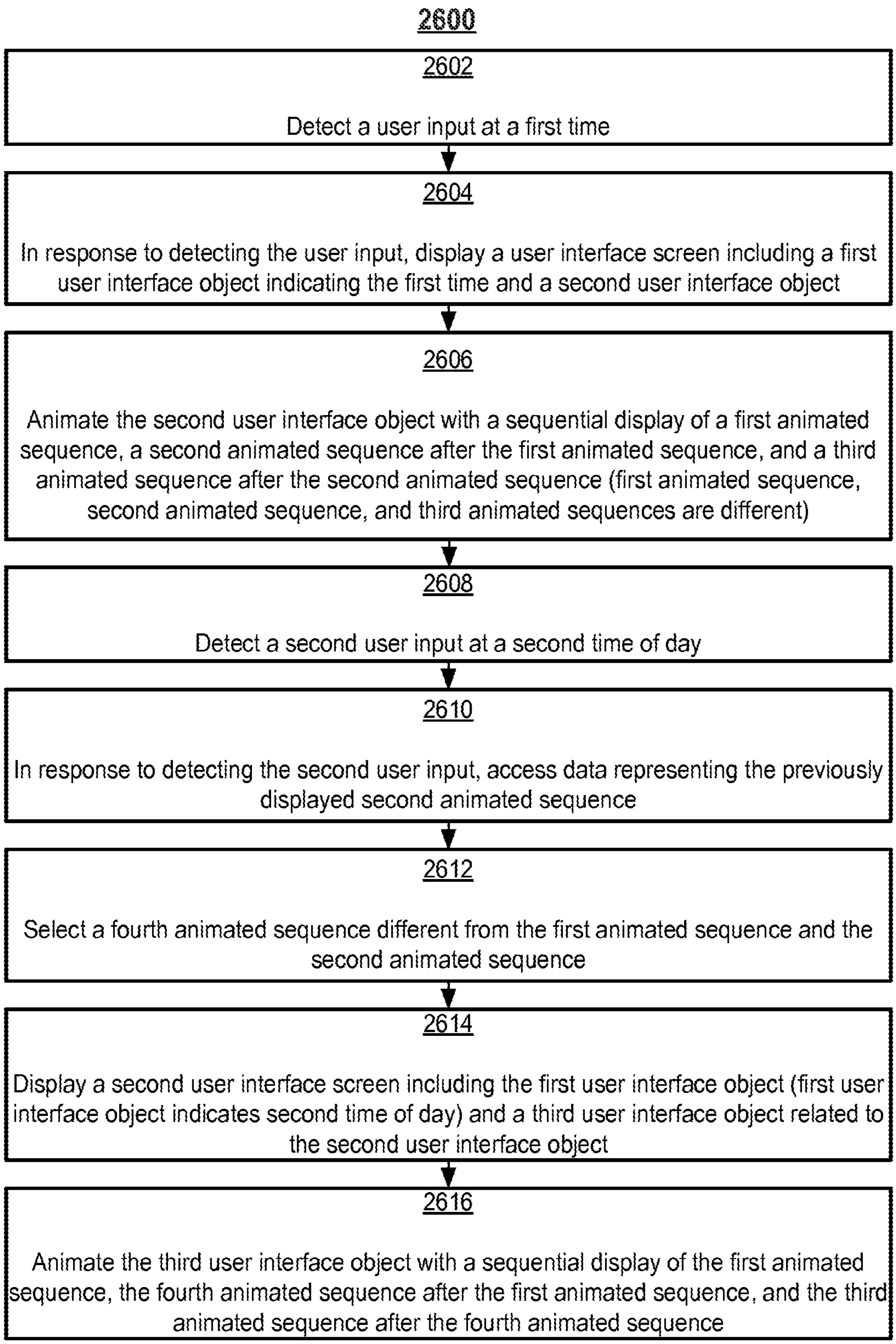
FIG. 26 is a flow diagram illustrating a process for context-specific user interfaces.

FIG. 26 is a flow diagram illustrating process 2600 for providing context-specific user interfaces. In some embodiments, process 2600 may be performed at an electronic device with a touch-sensitive display, such as device 100 (FIG. 1A), 300 (FIG. 3), 500 (FIG. 5) or 1300 (FIGS. 13A and 13B). Some operations in process 2600 may be combined, the order of some operations may be changed, and some operations may be omitted. Process 2600 provides context-specific user interfaces that provide timekeeping and a variable animated sequence, making these interfaces more interactive and engaging to the user, thus improving the interface while conserving power and increasing battery life.

At block 2602, the device detects a user input at a first time (e.g., 1304). At block 2604, responsive at least in part to detecting the user input, the device displays a user interface screen including a first user interface object indicating the first time (e.g., 1306) and a second user interface object (e.g., 1308). At block 2606, the device animates the second user interface object with a sequential display of a first animated sequence, a second animated sequence after the first animated sequence, and a third animated sequence after the second animated sequence (first animated sequence, second animated sequence, and third animated sequences are different; see, e.g., screens 1302, 1310, and 1320). At block 2608, the device detects a second user input at a second time of day (e.g., 1332). At block 2610, responsive at least in part to detecting the second user input, the device accesses data representing the previously displayed second animated sequence. At block 2612, the device selects a fourth animated sequence different from the first animated sequence and the second animated sequence. At block 2614, the device displays a second user interface screen including the first user interface object (first user interface object indicates second time of day; see, e.g., 1334) and a third user interface object related to the second user interface object (e.g., 1336). At block 2616, the device animates the third user interface object with a sequential display of the first animated sequence, the fourth animated sequence after the first animated sequence, and the third animated sequence after the fourth animated sequence (see, e.g., screens 1330, 1340, and 1350).

Note that details of the processes described above with respect to process 2600 (FIG. 26) are also applicable in an analogous manner to the methods described below. For example, process 2000 (FIG. 20), process 2100 (FIG. 21), process 2200 (FIG. 22), process 2300 (FIG. 23), process 2400 (FIG. 24), process 2500 (FIG. 25), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33) may include one or more of the characteristics of the various methods described above with reference to process 2600. For brevity, these details are not repeated below.

It should be understood that the particular order in which the operations in FIG. 26 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of process 2000 (FIG. 20), process 2100 (FIG. 21), process 2200 (FIG. 22), process 2300 (FIG. 23), process 2400 (FIG. 24), process 2500 (FIG. 25), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and process 3300 (FIG. 33) may be incorporated with one another. Thus, the techniques described with respect to process 2600 may be relevant to process 2000 (FIG. 20), process 2100 (FIG. 21), process 2200 (FIG. 22), process 2300 (FIG. 23), process 2400 (FIG. 24), process 2500 (FIG. 25), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33).

Figure 27A:
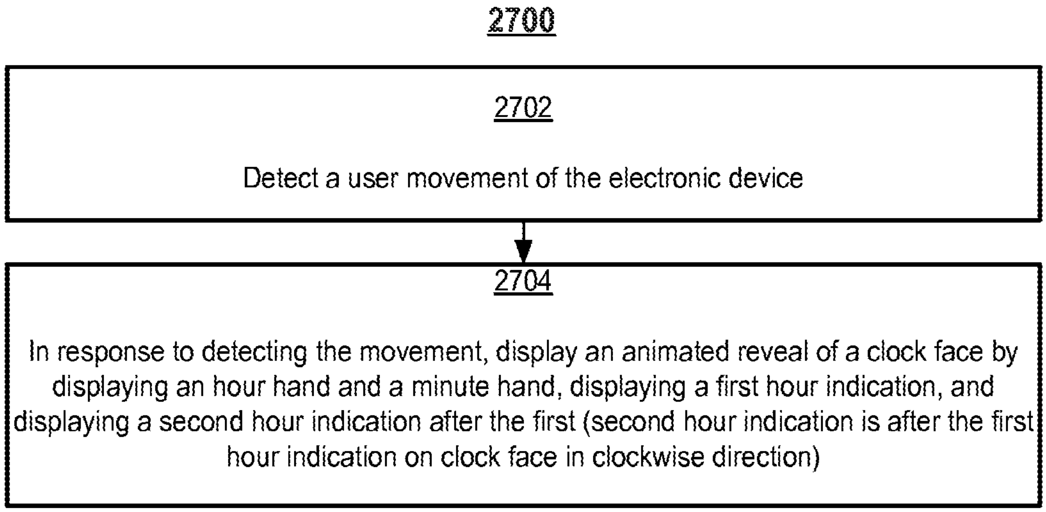
FIG. 27A is a flow diagram illustrating a process for context-specific user interfaces.

FIG. 27A is a flow diagram illustrating process 2700 for providing context-specific user interfaces. In some embodiments, process 2700 may be performed at an electronic device with a touch-sensitive display, such as device 100 (FIG. 1A), 300 (FIG. 3), 500 (FIG. 5) or 1400 (FIG. 14A). Some operations in process 2700 may be combined, the order of some operations may be changed, and some operations may be omitted. Process 2700 provides context-specific user interfaces that are less confusing to the user, thus conserving power and increasing battery life.

At block 2702, the device detects a user movement of the device (e.g., 1404). At block 2704, responsive at least in part to detecting the movement, the device displays an animated reveal of a clock face by displaying an hour hand and a minute hand (e.g., 1424), displaying a first hour indication (e.g., 1436), and displaying a second hour indication after the first (second hour indication is after the first hour indication on clock face in clockwise direction; see, e.g., 1438).

Note that details of the processes described above with respect to process 2700 (FIG. 27A) are also applicable in an analogous manner to the methods described below. For example, process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33) may include one or more of the characteristics of the various methods described above with reference to process 2700. For brevity, these details are not repeated below.

It should be understood that the particular order in which the operations in FIG. 27A have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and process 3300 (FIG. 33) may be incorporated with one another. Thus, the techniques described with respect to process 2700 may be relevant to process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33).

FIG. 27B is a flow diagram illustrating process 2710 for indicating time using a character-based user interface. In some embodiments, process 2710 may be performed at an electronic device with a display and a touch-sensitive surface, such as device 100 (FIG. 1), 300 (FIG. 3), 500 (FIG. 5), and/or 14000 (FIGS. 14B-T). Some operations in process 2710 may be combined, the order of some operations may be changed, and some operations may be omitted. Process 2710 provides character-based user interfaces that are less confusing, more interactive, and more engaging to the user, thus improving the interface while conserving power and increasing battery life.

At block 2712, a character user interface object that indicates a first time is displayed. The character user interface object includes representations of a first limb and a second limb and indicates a first time by indicating a first hour with the first limb and a first minute with the second limb. At block 2714, the character user interface object is updated to indicate a second time by indicating a second hour with the first limb and a second minute with the second limb. Optionally, at block 2714, updating the character user interface object to indicate a second time includes an extension of the first limb and a retraction of the second limb.

Note that details of the processes described above with respect to process 2710 (FIG. 27B) are also applicable in an analogous manner to the methods described below. For example, process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33) may include one or more of the characteristics of the various methods described above with reference to process 2710. For brevity, these details are not repeated below.

It should be understood that the particular order in which the operations in FIG. 27B have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and process 3300 (FIG. 33) may be incorporated with one another. Thus, the techniques described with respect to process 2710 may be relevant to process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33).

FIG. 27C is a flow diagram illustrating process 2720 for indicating time using a character-based user interface. In some embodiments, process 2720 may be performed at an electronic device with a display and a touch-sensitive surface, such as device 100 (FIG. 1), 300 (FIG. 3), 500 (FIG. 5), and/or 14000 (FIGS. 14B-T). Some operations in process 2720 may be combined, the order of some operations may be changed, and some operations may be omitted. Process 2720 provides character-based user interfaces that are less confusing, more interactive, and more engaging to the user, thus improving the interface while conserving power and increasing battery life.

At block 2722, a character user interface object that indicates a first time value is displayed. The character user interface object includes a representation of a first limb with a first endpoint and a second endpoint. The first endpoint is an axis of rotation for the limb, and the second endpoint indicates a first time value. At block 2724, the character user interface object is updated to indicate a second time value. Updating the character user interface object includes moving the first endpoint and moving the second endpoint to indicate the second time value.

Note that details of the processes described above with respect to process 2720 (FIG. 27C) are also applicable in an analogous manner to the methods described below. For example, process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33) may include one or more of the characteristics of the various methods described above with reference to process 2720. For brevity, these details are not repeated below.

It should be understood that the particular order in which the operations in FIG. 27C have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and process 3300 (FIG. 33) may be incorporated with one another. Thus, the techniques described with respect to process 2720 may be relevant to process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33).

Figure 27D:
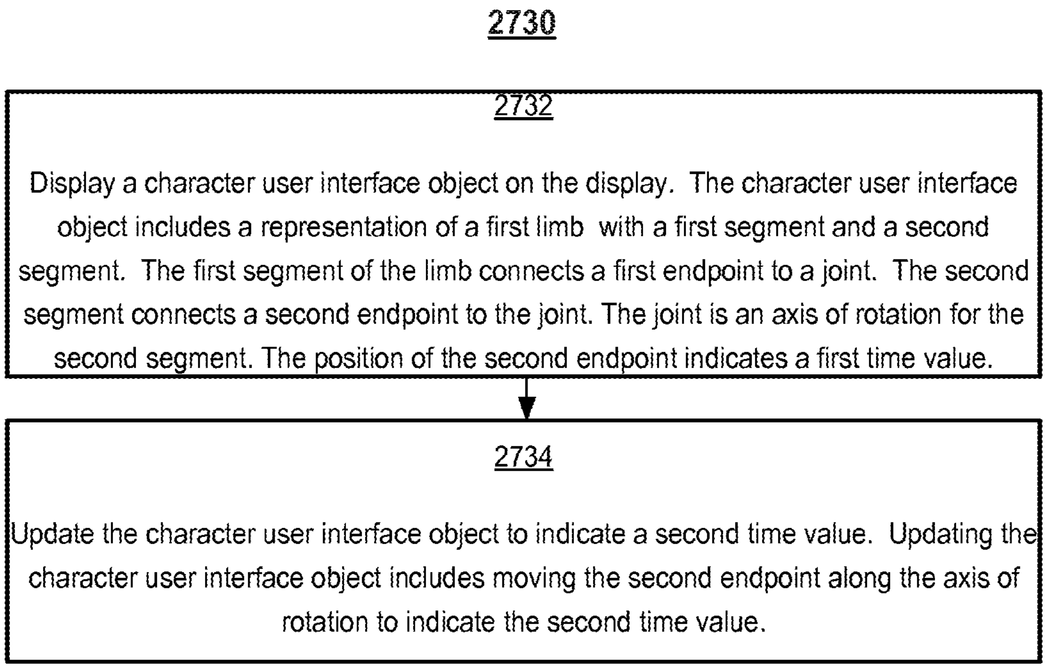
FIG. 27D is a flow diagram illustrating a process for context-specific user interfaces.

FIG. 27D is a flow diagram illustrating process 2730 for indicating time using a character-based user interface. In some embodiments, process 2730 may be performed at an electronic device with a display and a touch-sensitive surface, such as device 100 (FIG. 1), 300 (FIG. 3), 500 (FIG. 5), and/or 14000 (FIGS. 14B-T). Some operations in process 2730 may be combined, the order of some operations may be changed, and some operations may be omitted. Process 2730 provides character-based user interfaces that are less confusing, more interactive, and more engaging to the user, thus improving the interface while conserving power and increasing battery life.

At block 2732, a character user interface object that indicates a first time value is displayed. The character user interface object includes a representation of a first limb with a first segment and a second segment. The first segment of the limb connects a first endpoint to a joint. The second segment connects a second endpoint to the joint. The joint is an axis of rotation for the second segment. The position of the second endpoint indicates a first time value. At block 2734, the character user interface object is updated to indicate a second time value. Updating the character user interface object includes moving the second endpoint along the axis of rotation to indicate the second time value.

Note that details of the processes described above with respect to process 2730 (FIG. 27D) are also applicable in an analogous manner to the methods described below. For example, process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33) may include one or more of the characteristics of the various methods described above with reference to process 2730. For brevity, these details are not repeated below.

It should be understood that the particular order in which the operations in FIG. 27D have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2800 (FIG. 28), process 2900 (FIG. 29), process 3000 (FIG. 30), process 3100 (FIG. 31), process 3200 (FIG. 32), and process 3300 (FIG. 33) may be incorporated with one another. Thus, the techniques described with respect to process 2730 may be relevant to process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process

2740 (FIG. 27E), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33).

Figure 27E:
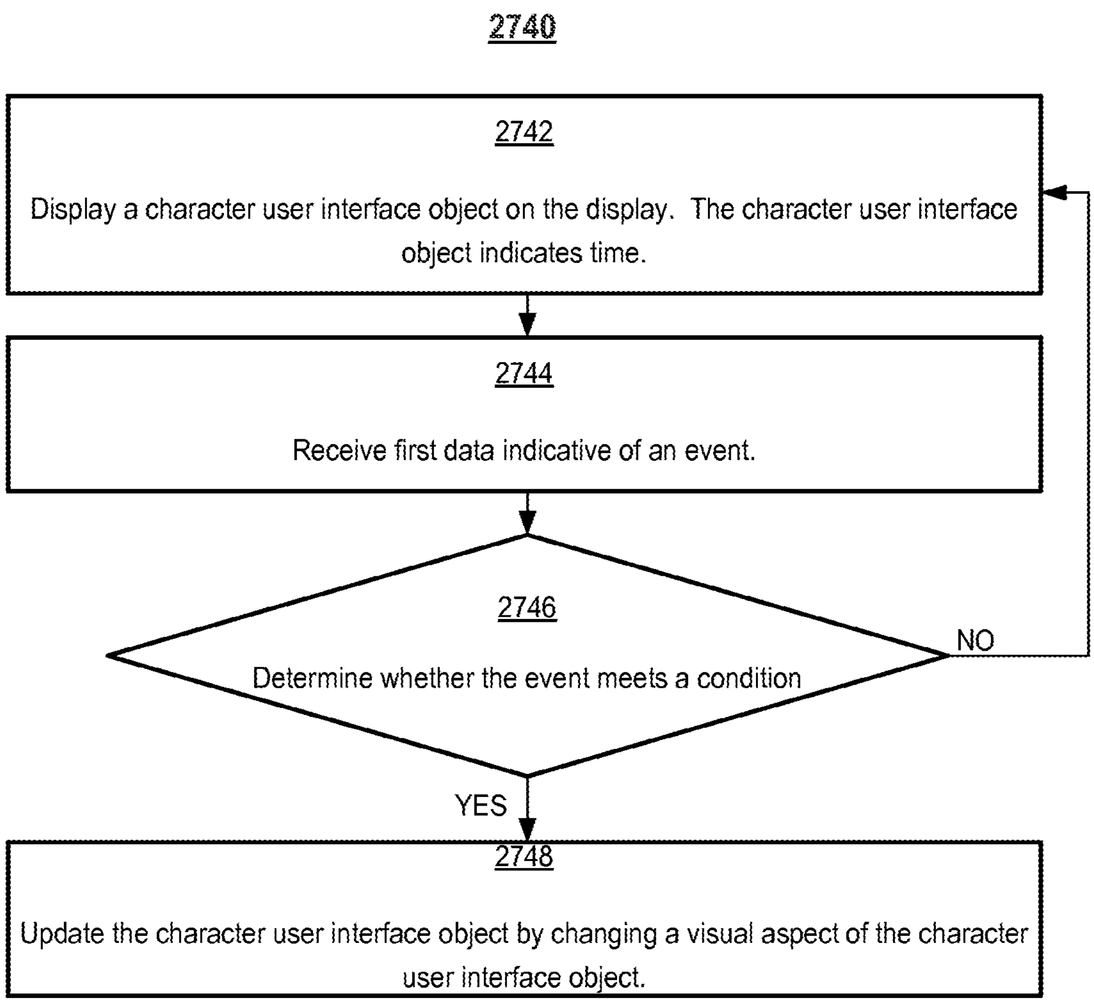
FIG. 27E is a flow diagram illustrating a process for context-specific user interfaces.

FIG. 27E is a flow diagram illustrating process 2740 for indicating time using a character-based user interface. In some embodiments, process 2740 may be performed at an electronic device with a display and a touch-sensitive surface, such as device 100 (FIG. 1), 300 (FIG. 3), 500 (FIG. 5), and/or 14000 (FIGS. 14B-T). Some operations in process 2740 may be combined, the order of some operations may be changed, and some operations may be omitted. Process 2740 provides character-based user interfaces that are less confusing, more interactive, and more engaging to the user, thus improving the interface while conserving power and increasing battery life.

At block 2742, a character user interface object that indicates time is displayed. At block 2744, first data indicative of an event is received. At block 2746, a determination is made as to whether the event meets a condition. At block 2748, in accordance with the determination that the event meets the condition, the character user interface object is updated by changing a visual aspect of the character user interface object.

Note that details of the processes described above with respect to process 2740 (FIG. 27E) are also applicable in an analogous manner to the methods described below. For example, process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33) may include one or more of the characteristics of the various methods described above with reference to process 2740. For brevity, these details are not repeated below.

It should be understood that the particular order in which the operations in FIG. 27E have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2750 (FIG. 27F), process 2800 (FIG. 28), process 2900 (FIG. 29), process 3000 (FIG. 30), process 3100 (FIG. 31), process 3200 (FIG. 32), and process 3300 (FIG. 33) may be incorporated with one another. Thus, the techniques described with respect to process 2740 may be relevant to process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2750 (FIG. 27F), process 2800 (FIG. 28), process 2900 (FIG. 29), process 3000 (FIG. 30), process 3100 (FIG. 31), process 3200 (FIG. 32), and/or process 3300 (FIG. 33).

Figure 27F:
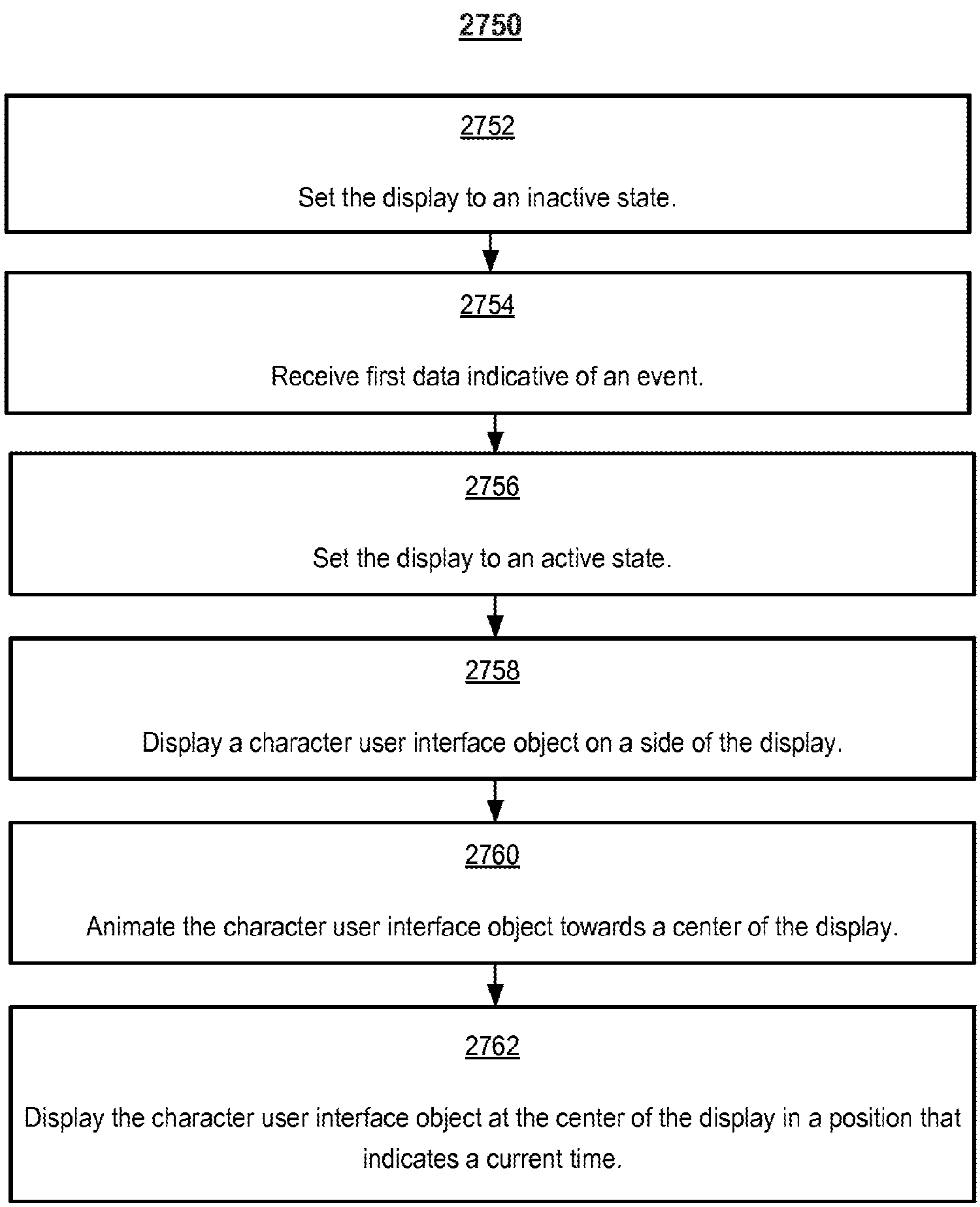
FIG. 27F is a flow diagram illustrating a process for context-specific user interfaces.

FIG. 27F is a flow diagram illustrating process 2750 for indicating time using a character-based user interface. In some embodiments, process 2750 may be performed at an electronic device with a display and a touch-sensitive surface, such as device 100 (FIG. 1), 300 (FIG. 3), 500 (FIG. 5), and/or 14000 (FIGS. 14B-T). Some operations in process 2750 may be combined, the order of some operations may be changed, and some operations may be omitted. Process 2750 provides character-based user interfaces that are less confusing, more interactive, and more engaging to the user, thus improving the interface while conserving power and increasing battery life.

At block 2752, the display is set to an inactive state. At block 2754, first data indicative of an event is received. At block 2756, in response to receiving the first data, the display is set to an active state. At block 2758, a character user interface object is displayed on a side of the display. At block 2760, the character user interface object is animated towards a center of the display. At block 2762, the character user interface object is displayed at the center of the display in a position that indicates a current time.

Note that details of the processes described above with respect to process 2750 (FIG. 27F) are also applicable in an analogous manner to the methods described below. For example, process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2800 (FIG. 28), process 2900 (FIG. 29), process 3000 (FIG. 30), process 3100 (FIG. 31), process 3200 (FIG. 32), and/or process 3300 (FIG. 33) may include one or more of the characteristics of the various methods described above with reference to process 2750. For brevity, these details are not repeated below.

It should be understood that the particular order in which the operations in FIG. 27F have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2800 (FIG. 28), process 2900 (FIG. 29), process 3000 (FIG. 30), process 3100 (FIG. 31), process 3200 (FIG. 32), and process 3300 (FIG. 33) may be incorporated with one another. Thus, the techniques described with respect to process 2750 may be relevant to process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2800 (FIG. 28), process 2900 (FIG. 29), process 3000 (FIG. 30), process 3100 (FIG. 31), process 3200 (FIG. 32), and/or process 3300 (FIG. 33).

Figure 28:
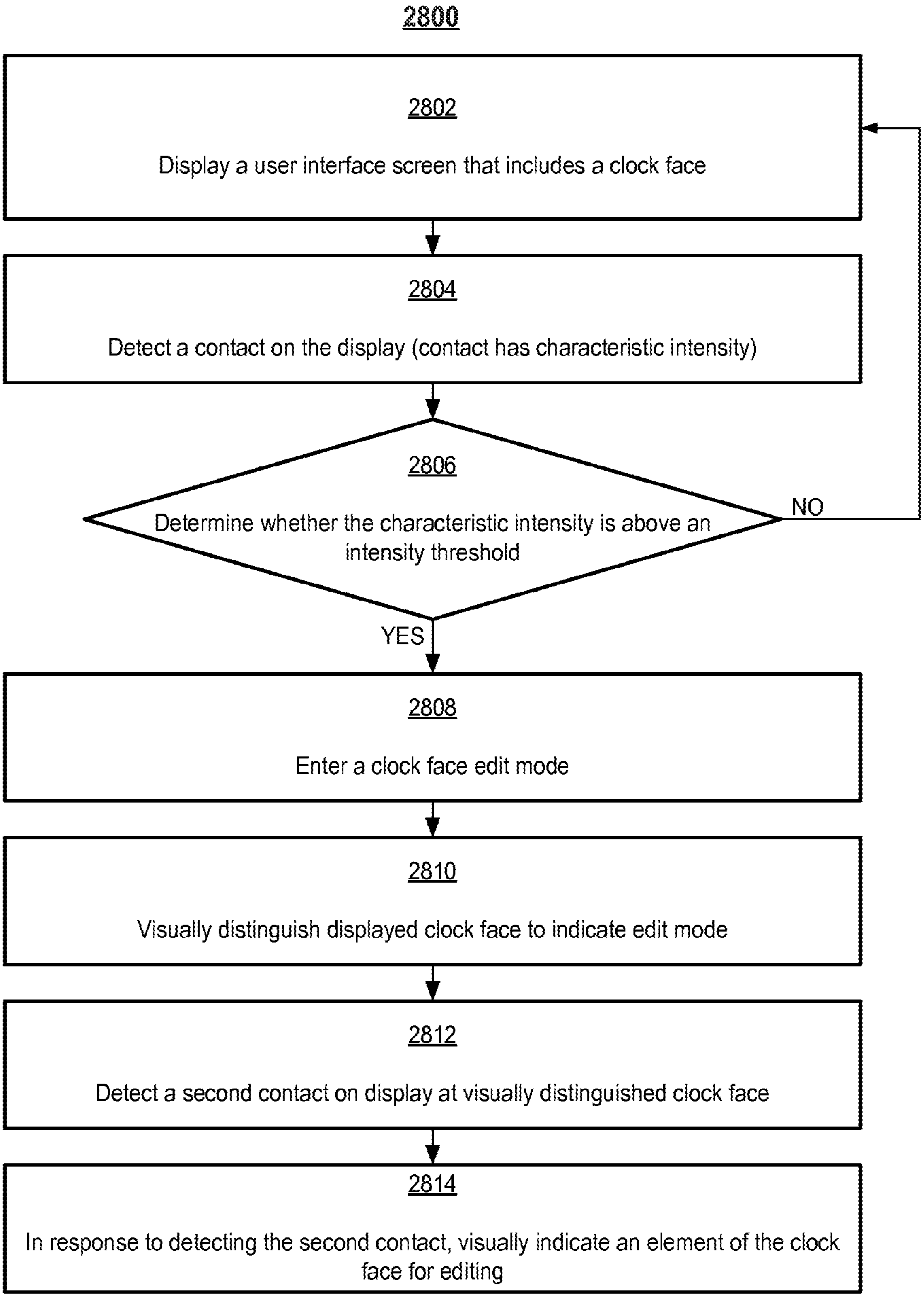
FIG. 28 is a flow diagram illustrating a process for context-specific user interfaces.

FIG. 28 is a flow diagram illustrating process 2800 for providing context-specific user interfaces. In some embodiments, process 2800 may be performed at an electronic device with a touch-sensitive display configured to detect intensity of contacts, such as 500 (FIG. 5) or 1500 (FIG. 15). Some operations in process 2800 may be combined, the order of some operations may be changed, and some operations may be omitted. Process 2800 provides for editing multiple aspects of various context-specific user interfaces in a comprehensive yet easy-to-use manner, thus conserving power and increasing battery life.

At block 2802, the device displays a user interface screen that includes a clock face (e.g., 1504). At block 2804, the device detects a contact on the display (contact has characteristic intensity; see, e.g., touch 1508). At block 2806, a determination is made as to whether the characteristic intensity is above an intensity threshold. At block 2808, in accordance with a determination that the characteristic intensity is above the intensity threshold, the device enters a clock face edit mode (see, e.g., screen 1510). In accordance with a determination that the characteristic intensity is not above the intensity threshold (where the clock face includes an affordance representing an application, and where the contact is on the affordance representing the application), the device may launch the application represented by the affordance. At block 2810, the device visually distinguishes the displayed clock face to indicate edit mode (e.g., 1512). At block 2812, the device detects a second contact on the display at the visually distinguished clock face (e.g., 1520). At block 2814, responsive at least in part to detecting the second contact, the device visually indicates an element of the clock face for editing (e.g., 1534).

Note that details of the processes described above with respect to process 2800 (FIG. 28) are also applicable in an analogous manner to the methods described below. For example, process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2900 (FIG. 29), process 3000 (FIG. 30), process 3100 (FIG. 31), process 3200 (FIG. 32), and/or process 3300 (FIG. 33) may include one or more of the characteristics of the various methods described above with reference to process 2800. For brevity, these details are not repeated below.

It should be understood that the particular order in which the operations in FIG. 28 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2900 (FIG. 29), process 3000 (FIG. 30), process 3100 (FIG. 31), process 3200 (FIG. 32), and process 3300 (FIG. 33) may be incorporated with one another. Thus, the techniques described with respect to process 2800 may be relevant to process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2900 (FIG. 29), process 3000 (FIG. 30), process 3100 (FIG. 31), process 3200 (FIG. 32), and/or process 3300 (FIG. 33).

Figure 29:
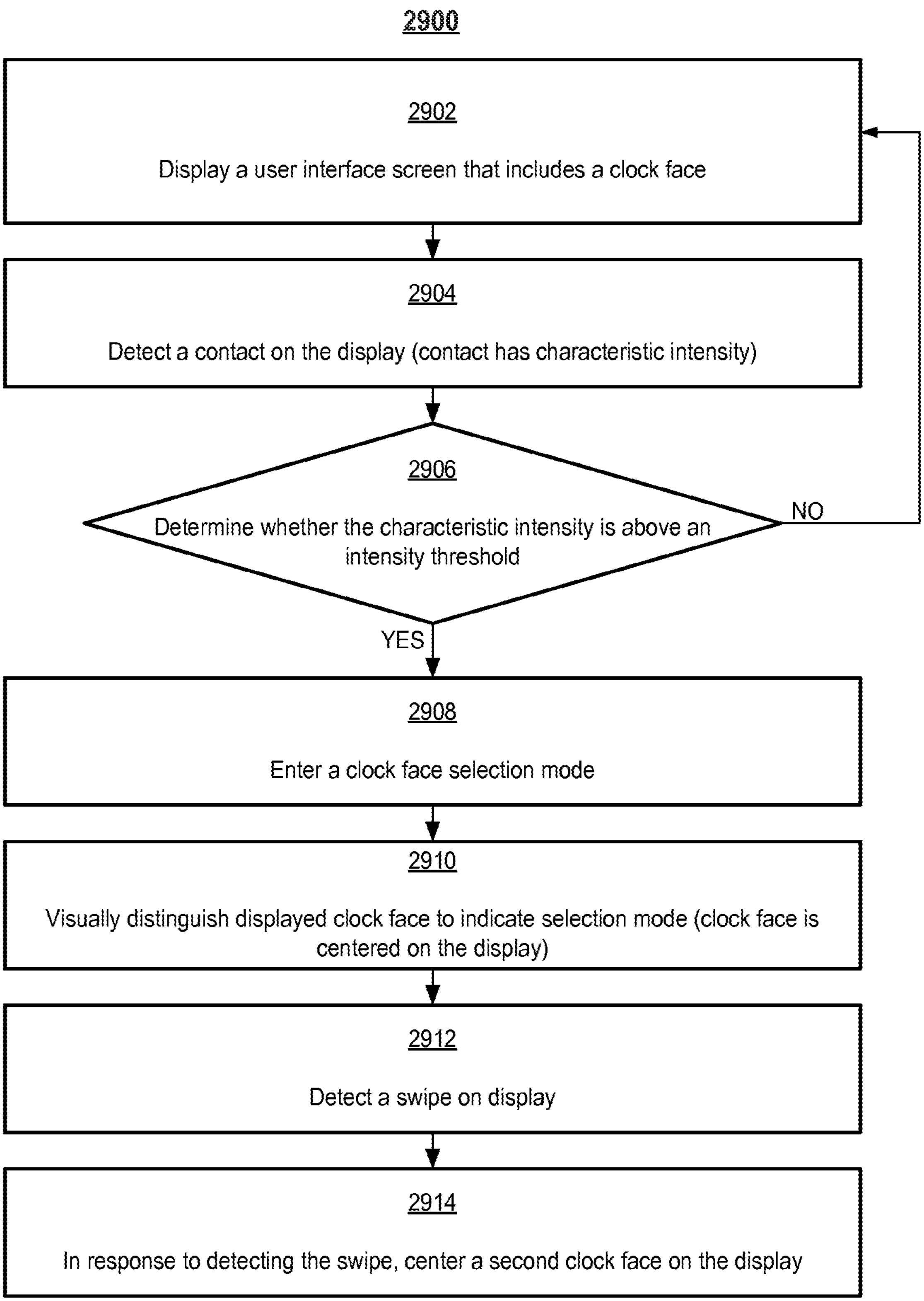
FIG. 29 is a flow diagram illustrating a process for context-specific user interfaces.

FIG. 29 is a flow diagram illustrating process 2900 for providing context-specific user interfaces. In some embodiments, process 2900 may be performed at an electronic device with a touch-sensitive display configured to detect intensity of contacts, such as 500 (FIG. 5) or 1600 (FIGS. 16A-C). Some operations in process 2900 may be combined, the order of some operations may be changed, and some operations may be omitted. Process 2900 provides for selecting context-specific user interfaces in a comprehensive yet easy-to-use manner, thus conserving power and increasing battery life.

At block 2902, the device displays a user interface screen that includes a clock face (e.g., 1604). At block 2904, the device detects a contact on the display (contact has characteristic intensity (e.g., 1606). At block 2906, a determination is made as to whether the characteristic intensity is above an intensity threshold. At block 2908, in accordance with a determination that the characteristic intensity is above the intensity threshold, the device enters a clock face selection mode (see, e.g., screen 1610). In accordance with a determination that the characteristic intensity is not above the intensity threshold (where the clock face includes an affordance representing an application, and where the contact is on the affordance representing the application), the device may launch the application represented by the affordance. At block 2910, the device visually distinguishes the displayed clock face to indicate selection mode (the clock face is centered on the display; see, e.g., 1612). At block 2912, the device detects a swipe on the display at the visually distinguished clock face (e.g., 1618). At block 2914, responsive at least in part to detecting the swipe, the device centers a second clock face on the display (e.g., 1616 on screen 1620).

Note that details of the processes described above with respect to process 2900 (FIG. 29) are also applicable in an analogous manner to the methods described below. For example, process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 3000 (FIG. 30), process 3100 (FIG. 31), process 3200 (FIG. 32), and/or process 3300 (FIG. 33) may include one or more of the characteristics of the various methods described above with reference to process 2900. For brevity, these details are not repeated below.

It should be understood that the particular order in which the operations in FIG. 29 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 3000 (FIG. 30), process 3100 (FIG. 31), process 3200 (FIG. 32), and process 3300 (FIG. 33) may be incorporated with one another. Thus, the techniques described with respect to process 2900 may be relevant to process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750

(FIG. 27F), process 2800 (FIG. 28), process 3000 (FIG. 30), process 3100 (FIG. 31), process 3200 (FIG. 32), and/or process 3300 (FIG. 33).

Figure 30:
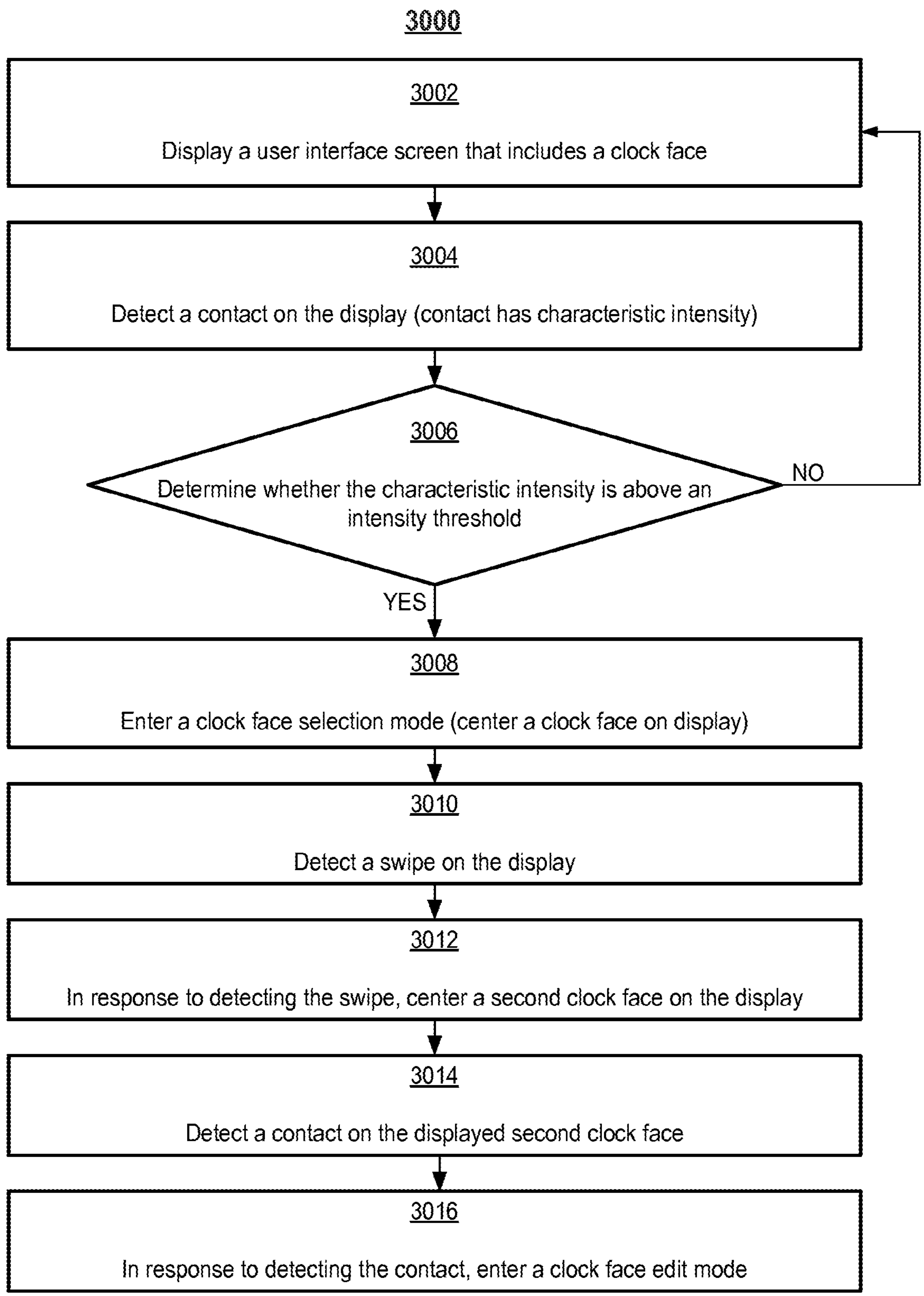
FIG. 30 is a flow diagram illustrating a process for context-specific user interfaces.

FIG. 30 is a flow diagram illustrating process 3000 for providing context-specific user interfaces. In some embodiments, process 3000 may be performed at an electronic device with a touch-sensitive display configured to detect intensity of contacts, such as 500 (FIG. 5), 1500 (FIG. 15), or 1600 (FIGS. 16A-C). Some operations in process 3000 may be combined, the order of some operations may be changed, and some operations may be omitted. For example, FIG. 30 illustrates an exemplary embodiment for accessing clock face selection and edit modes from a single interface, but other orders of operation are possible. Process 3000 provides for selecting and editing context-specific user interfaces in a comprehensive yet easy-to-use manner, thus conserving power and increasing battery life.

At block 3002, the device displays a user interface screen that includes a clock face (e.g., 1502 and/or 1602). At block 3004, the device detects a contact on the display (contact has characteristic intensity; see, e.g., 1508 and/or 1606). At block 3006, a determination is made as to whether the characteristic intensity is above an intensity threshold. At block 3008, in accordance with a determination that the characteristic intensity is above the intensity threshold, the device enters a clock face selection mode and visually distinguishes the displayed clock face to indicate selection mode (the clock face is centered on the display; see, e.g., 1512 and/or 1612). In accordance with a determination that the characteristic intensity is not above the intensity threshold (where the clock face includes an affordance representing an application, and where the contact is on the affordance representing the application), the device may launch the application represented by the affordance. At block 3010, the device detects a swipe on the display at the visually distinguished clock face (e.g., 1618). At block 3012, responsive at least in part to detecting the swipe, the device centers a second clock face on the display (e.g., 1616 on screen 1620). At block 3014, the device detects a contact on the touch-sensitive display at the displayed second clock face (e.g., 1520). At block 3016, responsive at least in part to detecting the contact, the device enters a clock face edit mode for editing the second clock face (see, e.g., screen 1530).

Note that details of the processes described above with respect to process 3000 (FIG. 30) are also applicable in an analogous manner to the methods described below. For example, process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3100 (FIG. 31), process 3200 (FIG. 32), and/or process 3300 (FIG. 33) may include one or more of the characteristics of the various methods described above with reference to process 3000. For brevity, these details are not repeated below.

It should be understood that the particular order in which the operations in FIG. 30 have been described is exemplary and not intended to indicate that the described order is the only order in which the operations could be performed. One of ordinary skill in the art would recognize various ways to reorder the operations described herein, as well as excluding certain operations. For example, the device could detect a contact on the displayed first clock face before detecting the swipe. In this case, the device may enter clock face edit mode to edit the first clock face. For brevity, all of these details are not repeated here. Additionally, it should be noted that aspects of process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3100 (FIG. 31), process 3200 (FIG. 32), and process 3300 (FIG. 33) may be incorporated with one another. Thus, the techniques described with respect to process 2900 may be relevant to process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3100 (FIG. 31), process 3200 (FIG. 32), and/or process 3300 (FIG. 33).

Figure 31:
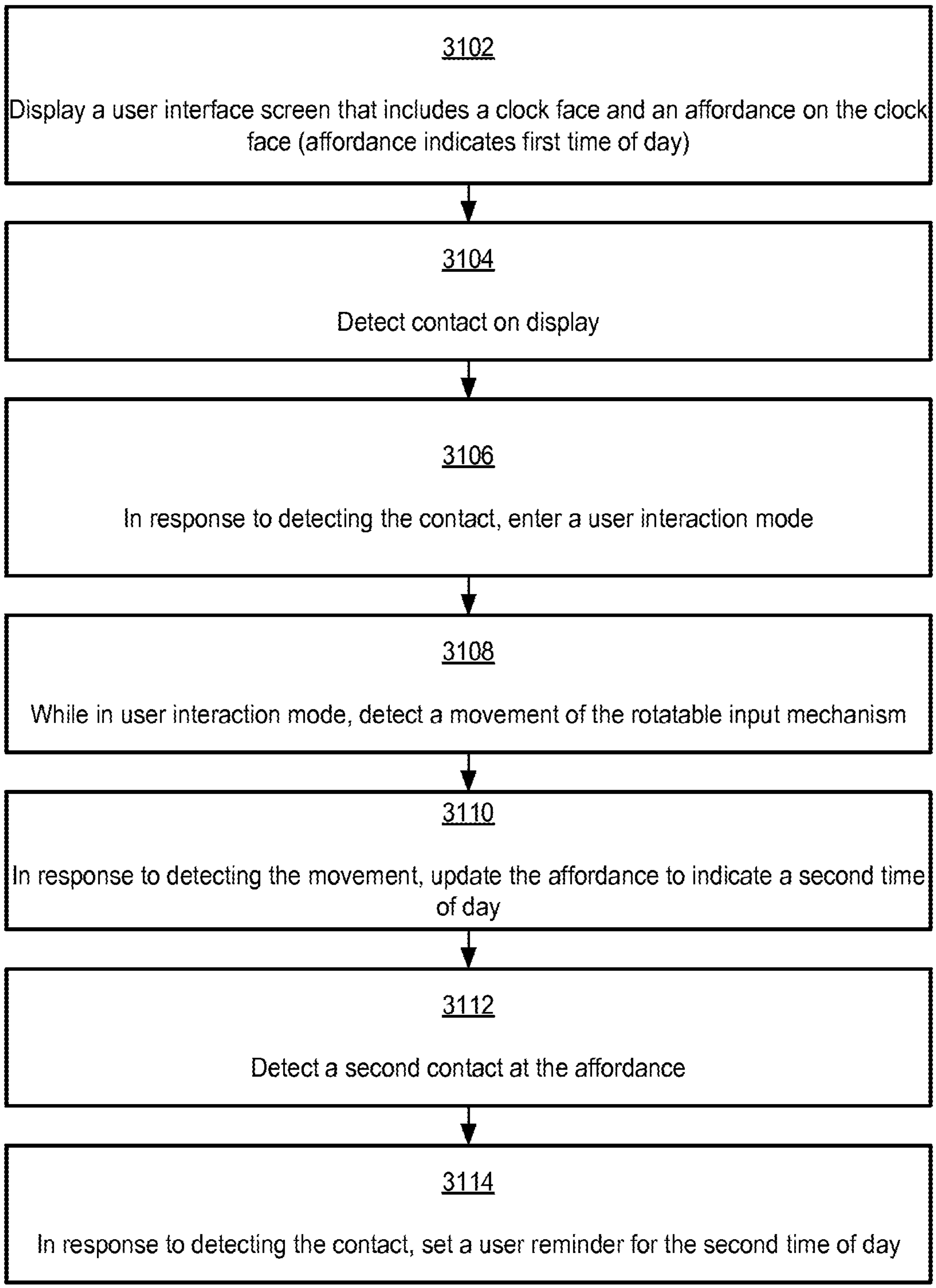
FIG. 31 is a flow diagram illustrating a process for context-specific user interfaces.

FIG. 31 is a flow diagram illustrating process 3100 for providing context-specific user interfaces. In some embodiments, process 3100 may be performed at an electronic device with a touch-sensitive display and a rotatable input mechanism, such as 500 (FIG. 5) or 1600 (FIGS. 17A and 17B). Some operations in process 3100 may be combined, the order of some operations may be changed, and some operations may be omitted. Process 3100 provides for setting a user reminder in various context-specific user interfaces in a less confusing and easy-to-access manner, thus conserving power and increasing battery life.

At block 3102, the device displays a user interface screen that includes a clock face (e.g., screen 1702) and an affordance on the clock face (affordance indicates first time of day; see, e.g., 1706). At block 3104, the device detects a contact on the display. At block 3106, responsive at least in part to detecting the contact, the device enters a user interaction mode. At block 3108, while in user interaction mode, the device detects a movement of the rotatable input mechanism (e.g., 1708). At block 3110, responsive at least in part to detecting the movement, the device updates the affordance to indicate a second time of day (e.g., 1714). At block 3112, the device detects a second contact at the affordance (e.g., 1716). At block 3114, responsive at least in part to detecting the contact, the device sets a user reminder for the second time of day (e.g., 1748).

Note that details of the processes described above with respect to process 3100 (FIG. 31) are also applicable in an analogous manner to the methods described below. For example, process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3200 (FIG. 32), and/or process 3300 (FIG. 33) may include one or more of the characteristics of the various methods described above with reference to process 3100. For brevity, these details are not repeated below.

It should be understood that the particular order in which the operations in FIG. 31 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3200 (FIG. 32), and process 3300 (FIG. 33) may be incorporated with one another. Thus, the techniques described with respect to process 3100 may be relevant to process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3200 (FIG. 32), and/or process 3300 (FIG. 33).

Figure 32:
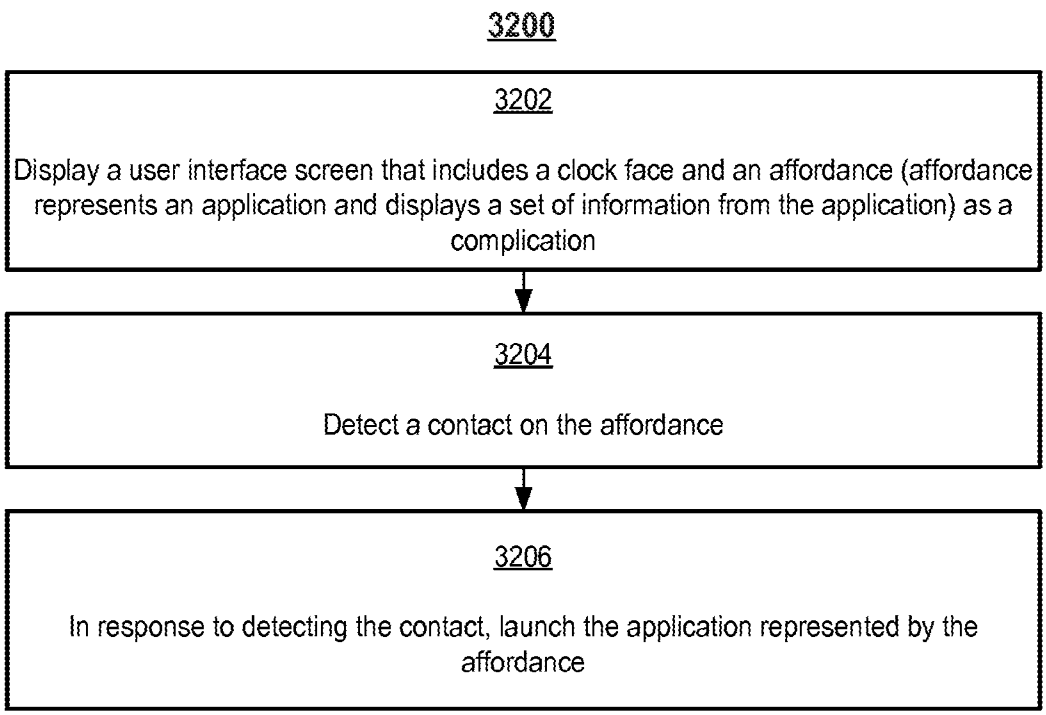
FIG. 32 is a flow diagram illustrating a process for context-specific user interfaces.
Figure 33:
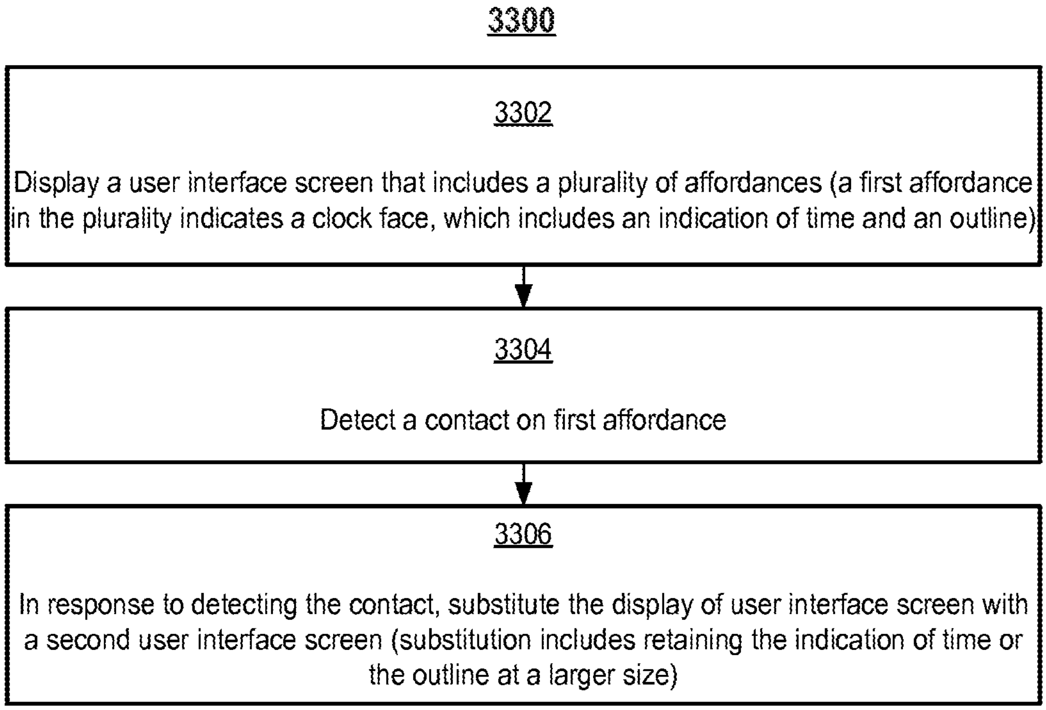
FIG. 33 is a flow diagram illustrating a process for context-specific user interfaces.

FIG. 32 is a flow diagram illustrating process 3200 for providing context-specific user interfaces. In some embodiments, process 3200 may be performed at an electronic device with a touch-sensitive display, such as device 100 (FIG. 1A), 300 (FIG. 3), 500 (FIG. 5) or 1800 (FIGS. 18A-18C). Some operations in process 3200 may be combined, the order of some operations may be changed, and some operations may be omitted. Process 3200 provides for launching an application directly from an application complication (which also provides application information) through various context-specific user interfaces, thus conserving power and increasing battery life by easily linking various user applications and a timekeeping clock face.

At block 3202, the device displays a user interface screen that includes a clock face (e.g., 1804) and an affordance (affordance represents an application and displays a set of information from the application) as a complication (e.g., 1806 and/or 1808). At block 3204, the device detects a contact on the affordance (e.g., 1810 and/or 1812). At block 3206, responsive at least in part to detecting the contact, the device launches the application represented by the affordance (see, e.g., screen 1820 and/or 1830).

Note that details of the processes described above with respect to process 3200 (FIG. 32) are also applicable in an analogous manner to the methods described below. For example, process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), and/or process 3300 (FIG. 33) may include one or more of the characteristics of the various methods described above with reference to process 3100. For brevity, these details are not repeated below.

It should be understood that the particular order in which the operations in FIG. 32 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), and process 3300 (FIG. 33) may be incorporated with one another. Thus, the techniques described with respect to process 3200 may be relevant to process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), and/or process 3300 (FIG. 33).

FIG. 33 is a flow diagram illustrating process 3300 for providing context-specific user interfaces. In some embodiments, process 3300 may be performed at an electronic device with a touch-sensitive display, such as device 100 (FIG. 1A), 300 (FIG. 3), 500 (FIG. 5) or 1900 (FIG. 19). Some operations in process 3300 may be combined, the order of some operations may be changed, and some operations may be omitted. Process 3300 provides a simple means by which to access various context-specific user interfaces, thus conserving power and increasing battery life.

At block 3302, the device displays a user interface screen that includes a plurality of affordances (a first affordance in the plurality indicates a clock face, which includes an indication of time and an outline; see, e.g., screen 1902 and affordance 1906). At block 3304, the device detects a contact on first affordance (e.g., 1908). At block 3306, responsive at least in part to detecting the contact, the device substitutes the display of user interface screen with a second user interface screen (substitution includes retaining the indication of time or the outline at a larger size; see, e.g., screen 1930 with outline 1932 and/or hour hand and minute hand 1934).

Note that details of the processes described above with respect to process 3300 (FIG. 33) are also applicable in an analogous manner to the methods described below. For example, process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), and/or process 3200 (FIG. 32) may include one or more of the characteristics of the various methods described above with reference to process 3300. For brevity, these details are not repeated below.

It should be understood that the particular order in which the operations in FIG. 33 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), and process 3200 (FIG. 32) may be incorporated with one another. Thus, the techniques described with respect to process 3300 may be relevant to process 2000 (FIG. 20), process 2100 (FIG. 21), process 2200 (FIG. 22), process 2300 (FIG. 23), process 2400 (FIG. 24), process 2500 (FIG. 25), process 2600 (FIG. 26), process 2700 (FIG. 27A), process 2710 (FIG. 27B), process 2720 (FIG. 27C), process 2730 (FIG. 27D), process 2740 (FIG. 27E), process 2750 (FIG. 27F), process 2800 (FIG. 28), process 2900 (FIG. 29), process 3000 (FIG. 30), process 3100 (FIG. 31), and/or process 3200 (FIG. 32).

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B, 3, 5A, and 5B) are all included within the scope of the techniques described herein.

Figure 34:
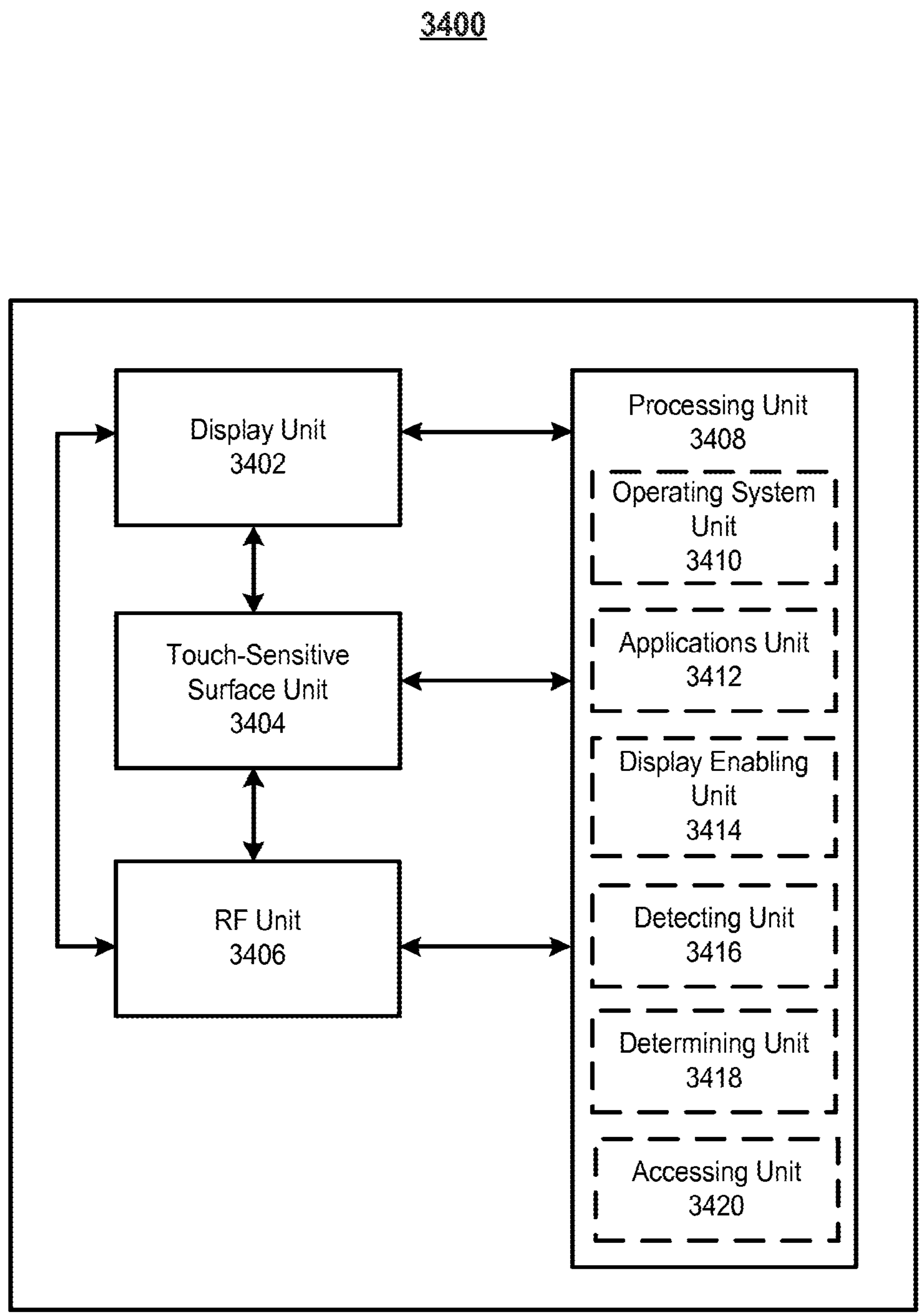
FIG. 34 is a functional block diagram of an electronic device in accordance with some embodiments.

FIG. 34 shows exemplary functional blocks of an electronic device 3400 that, in some embodiments, performs the features described above. As shown in FIG. 34, an electronic device 3400 includes a display unit 3402 configured to display graphical objects; a touch-sensitive surface unit 3404 configured to receive user gestures; one or more RF units 3406 configured to detect and communicate with external electronic devices; and a processing unit 3408 coupled to display unit 3402, touch-sensitive surface unit 3404, and RF unit(s) 3406. In some embodiments, processing unit 3408 is configured to support an operating system 3410 and an applications unit 3412. In some embodiments, operating system 3410 is configured to launch applications with applications unit 3412 or enter a device mode. In some embodiments, operating system 3410 is configured to launch an application, enter a clock face edit mode of the electronic device, enter a clock face selection mode of the electronic device, or enter a user interaction mode of the electronic device. In some embodiments, applications unit 3412 is configured to launch or run applications with applications unit 3412. For example, applications unit 3412 may be used for launching an application, running a launched application, or setting a user reminder.

In some embodiments, the processing unit 3408 includes a display enabling unit 3414, a detecting unit 3416, a determining unit 3418, and an accessing unit 3420. In some embodiments, the display enabling unit 3414 is configured to cause a display of a user interface (or portions of a user interface) in conjunction with the display unit 3402. For example, the display enabling unit 3414 may be used for displaying a user interface screen, updating a user interface screen, displaying a clock face, substituting one or more indications of an hourly timescale with an indication of a first timescale for a stopwatch hand, animating a stopwatch hand, rotating a simulation of the Earth (or Moon, or solar system), animating a user interface object, displaying an animated reveal of a clock face, displaying a character user interface object, updating a displayed character user interface object (e.g., updating a displayed character user interface object to indicate a second time or updating a displayed character user interface object by changing a visual aspect of the displayed character user interface object), visually distinguishing a displayed clock face to indicate a clock face edit mode, visually indicating an element of a clock face for editing, visually distinguishing a displayed clock face to indicate a clock face selection mode, centering a clock face on the display, updating an affordance to indicate a time of day, or substituting the display of a first user interface screen with a second user interface screen. In some embodiments, the detecting unit 3416 is configured to detect and/or receive user input, e.g., through the use of touch-sensitive surface unit 3404 or a rotatable input mechanism (e.g., 506 or 1540). For example, the detecting 3416 may be used for detecting a user input, receiving data representing a user input, receiving a user input, detecting a user movement of the device, detecting a contact on the touch-sensitive display, detecting a swipe on the touch-sensitive display, or detecting a movement of the rotatable input mechanism. In some embodiments, the determining unit 3418 is configured to make determinations. For example, determining unit 3418 may be used for determining whether characteristic intensity of a contact on the touch-sensitive display is above an intensity threshold or determining whether an event meets a condition. In some embodiments, the accessing unit 3420 is configured to access and/or select information. For example, accessing unit 3420 may be used for accessing a folder, selecting an image from the folder, accessing data representing a previously displayed animated sequence, or selecting an animated sequence. The units of FIG. 34 may be used to implement the various techniques and methods described above with respect to FIGS. 6-19.

The functional blocks of the device 3400 are, optionally, implemented by hardware, software, or a combination of hardware and software to carry out the principles of the various described examples. It is understood by persons of skill in the art that the functional blocks described in FIG. 34 are, optionally, combined or separated into sub-blocks to implement the principles of the various described examples. Therefore, the description herein optionally supports any possible combination or separation or further definition of the functional blocks described herein.

Figure 35:
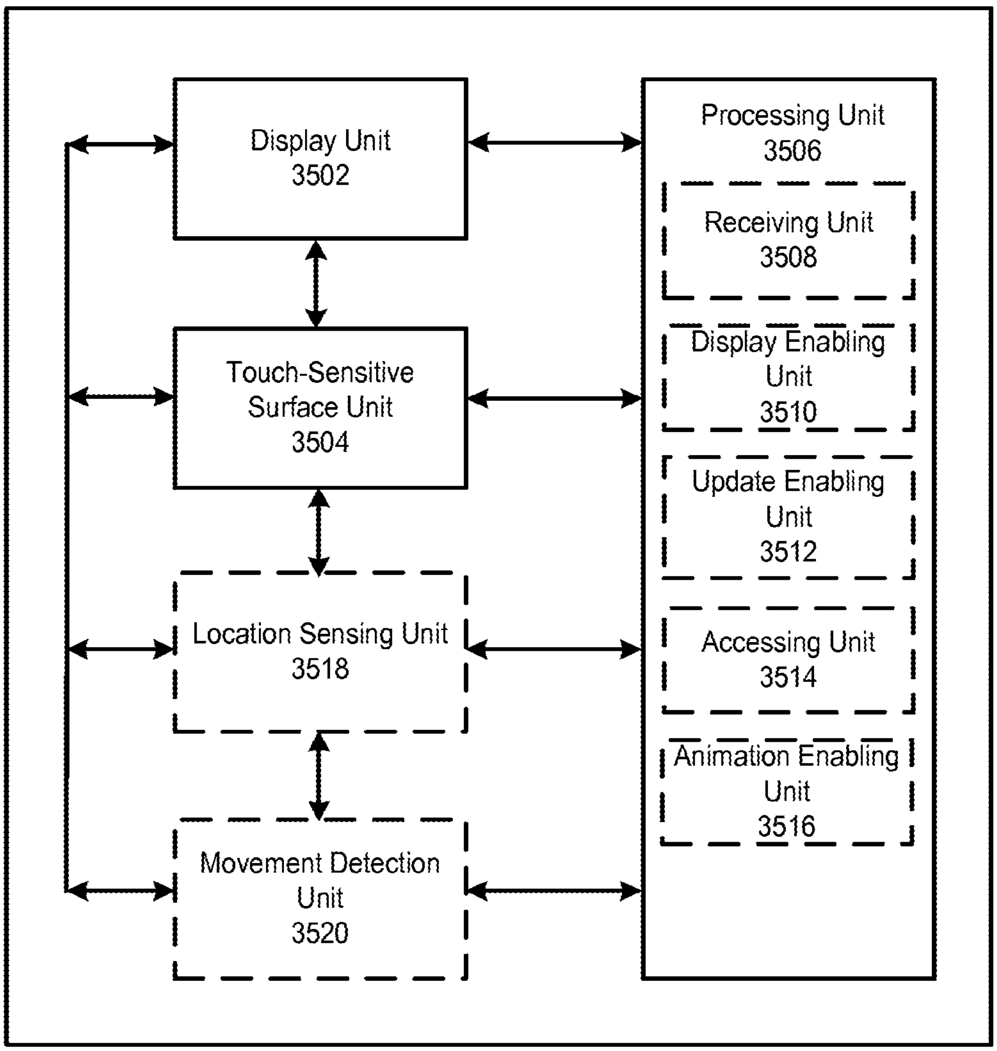
FIG. 35 is a functional block diagram of an electronic device in accordance with some embodiments.

In accordance with some embodiments, FIG. 35 shows an exemplary functional block diagram of an electronic device 3500 configured in accordance with the principles of the various described embodiments. In accordance with some embodiments, the functional blocks of electronic device 3500 are configured to perform the techniques described above. The functional blocks of the device 3500 are, optionally, implemented by hardware, software, or a combination of hardware and software to carry out the principles of the various described examples. It is understood by persons of skill in the art that the functional blocks described in FIG. 35 are, optionally, combined or separated into sub-blocks to implement the principles of the various described examples. Therefore, the description herein optionally supports any possible combination or separation or further definition of the functional blocks described herein.

As shown in FIG. 35, an electronic device 3500 includes a display unit 3502 configured to display a graphic user interface, optionally, a touch-sensitive surface unit 3504 configured to receive contacts, optionally, a location sensing unit 3518 configured to sense location, optionally, a movement detection unit 3520, and a processing unit 3506 coupled to the display unit 3502, optionally, the touch-sensitive surface unit 3504, optionally, the location sensing unit 3518, and optionally, the movement detection unit 3520. In some embodiments, the processing unit 3506 includes a receiving unit 3508, a display enabling unit 3510, an update enabling unit 3512, an accessing unit 3514, and an animation enabling unit 3516.

The processing unit 3506 is configured to receive (e.g., with receiving unit 3508) data representing a user input, and in response to receiving the data: enable display (e.g., with display enabling unit 3510), on the display unit (e.g., display unit 3502), of a user interface screen, the user interface screen including a clock face indicating a first time, wherein the first time precedes a current time; and enable update (e.g., with update enabling unit 3512), on the display unit (e.g., display unit 3502), of the user interface screen by enabling animation (e.g., with animation enabling unit 3516), on the display unit (e.g., display unit 3502), of the clock face to transition from indicating the first time to indicating the current time, wherein the animation represents the passage of time from the first time to the current time.

In some embodiments, the processing unit 3506 is further configured to receive (e.g., with receiving unit 3508) second data representing a time of a previous user movement of electronic device 3500, wherein the previous user movement of electronic device 3500 is before receipt of the data representing the user input, and wherein the time of the previous user movement of electronic device 3500 is the first time indicated by the clock face. In some embodiments, the first time precedes the current time by a first duration, and wherein the first duration is a predetermined duration before the current time. In some embodiments, the predetermined duration is 5 hours. In some embodiments, the first time is a predetermined time of day. In some embodiments, the clock face is animated for a period of time indicative of the first duration. In some embodiments, the clock face is animated for a period of time independent of the first duration. In some embodiments, the clock face comprises a representation of a digital clock including a numerical indication of an hour and a numerical indication of a minute. In some embodiments, the clock face comprises a representation of an analog clock including an hour hand and a minute hand. In some embodiments, enabling animation (e.g., with animation enabling unit 3516) of the first user interface object (e.g., on the user interface screen displayed on display unit 3502) comprises rotating one or more of the hour hand and the minute hand in a clockwise motion on-screen. In some embodiments, the processing unit 3506 is further configured to access (e.g., with accessing unit 3514) an image of a scene, wherein the image of the scene is representative of the time indicated by the clock face; and enable display (e.g., with display enabling unit 3510), on the display unit (e.g., display unit 3502), of the image as a background on the user interface screen. In some embodiments, the image of the scene is an image captured at substantially the same time of day as the time indicated by the clock face. In some embodiments, the processing unit 3506 is further configured to access (e.g., with accessing unit 3514) a first image of a scene, wherein the first image is representative of the first time; and access (e.g., with accessing unit 3514) a second image of the scene, wherein the second image is representative of the current time; and in response to receiving (e.g., with receiving unit 3508) the data representing the user input: enable successive display (e.g., with display enabling unit 3510), on the display unit (e.g., display unit 3502), of the first image of the scene and the second image of the scene, the successive display indicating the passage of time from the first time to the current time. In some embodiments, the first image of the scene and the second image of the scene are displayed as backgrounds on the user interface screen. In some embodiments, the processing unit 3506 is further configured to access (e.g., with accessing unit 3514) a sequence of images of a scene, the sequence of images including: a first image of the scene, wherein the first image of the scene is representative of the first time; one or more second images of the scene, wherein the one or more second images are representative of one or more times between the first time and the current time, and wherein the one or more second images are after the first image of the scene within the sequence of images; and a third image of the scene, wherein the third image of the scene is representative of the current time, and wherein the third image of the scene is after the one or more second images of the scene within the sequence of images; and in response to receiving (e.g., with receiving unit 3508) the data representing the user input: enable display (e.g., with display enabling unit 3510), on the display unit (e.g., display unit 3502), of the sequence of images of the scene as an animated sequence, wherein displaying the sequence of images comprises enabling animation (e.g., with animation enabling unit 3516) of the sequence of images to indicate the passage of time from the first time to the current time. In some embodiments, the sequence of images of the scene is displayed as an animated background on the user interface screen. In some embodiments, the scene is user-designated. In some embodiments, electronic device 3500 further comprises a location sensing unit (e.g., location sensing unit 3730), processing unit 3506 is coupled to the location sensing unit (e.g., location sensing unit 3730), and the processing unit 3506 is further configured to enable obtaining a current location of electronic device 3500 from the location sensor (e.g., location sensing unit 3518), wherein the first image represents the first time at the current location, and wherein the second image or the third image represents the current time at the current location. In some embodiments, the processing unit 3506 is further configured to enable display (e.g., with display enabling unit 3510), on the display unit (e.g., display unit 3502), of a user interface object on the user interface screen at a first position, wherein the first position of the user interface object is based on the first time. In some embodiments, the processing unit 3506 is further configured to enable animation (e.g., with animation enabling unit 3516), on the display unit (e.g., display unit 3502), of the user interface object by moving the user interface object from the first position to a second position on the user interface screen, wherein the second position is based on the current time, and wherein moving the user interface object from the first position to a second position indicates the passage of time from the first time to the current time. In some embodiments, the user interface object is a graphical representation of a sun. In some embodiments, the user interface object is a graphical representation of a moon. In some embodiments, the electronic device 3500 further includes a movement detection unit (e.g., movement detection unit 3520), the processing unit 3506 is coupled to the movement detection unit, and the processing unit 3506 is further configured to: detect a movement of the electronic device (e.g., with movement detection unit 3520), wherein the user input comprises the movement of the electronic device 3500. In some embodiments, the user input is a contact on the touch-sensitive surface unit (e.g., touch-sensitive surface unit 3504).

The operations described above with reference to FIG. 20 are, optionally, implemented by components depicted in FIGS. 1A-1B or FIG. 35. For example, receiving operation 2002, displaying operation 2004, and updating operation 2006 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 36:
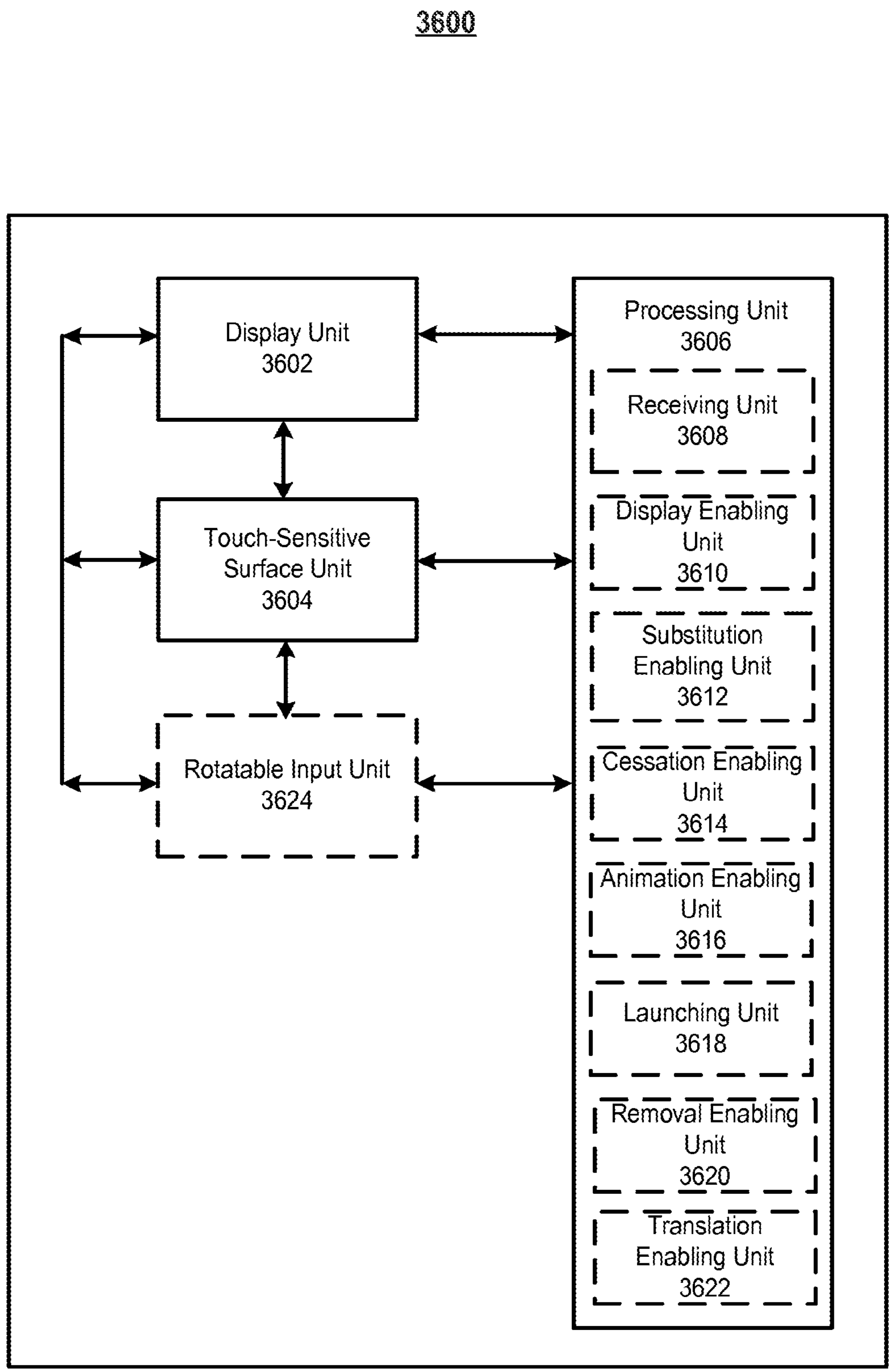
FIG. 36 is a functional block diagram of an electronic device in accordance with some embodiments.

In accordance with some embodiments, FIG. 36 shows an exemplary functional block diagram of an electronic device 3600 configured in accordance with the principles of the various described embodiments. In accordance with some embodiments, the functional blocks of electronic device 3600 are configured to perform the techniques described above. The functional blocks of the device 3600 are, optionally, implemented by hardware, software, or a combination of hardware and software to carry out the principles of the various described examples. It is understood by persons of skill in the art that the functional blocks described in FIG. 36 are, optionally, combined or separated into sub-blocks to implement the principles of the various described examples. Therefore, the description herein optionally supports any possible combination or separation or further definition of the functional blocks described herein.

As shown in FIG. 36, an electronic device 3600 includes a display unit 3602 configured to display a graphic user interface, optionally, a touch-sensitive surface unit 3604 configured to receive contacts, optionally, a rotatable input unit 3624 configured to receive rotatable input (e.g., from a rotatable input mechanism), and a processing unit 3606 coupled to the display unit 3602, optionally, the touch-sensitive surface unit 3604, and optionally, the rotatable input unit 3624. In some embodiments, the processing unit 3606 includes a receiving unit 3608, a display enabling unit 3610, a substitution enabling unit 3612, a cessation enabling unit 3614, an animation enabling unit 3616, a launching unit 3618, a removal enabling unit 3620, and a translation enabling unit 3622.

The processing unit 3606 is configured to enable display (e.g., with display enabling unit 3610), on the display unit (e.g., display unit 3602), of a clock face that indicates current time, the clock face including: a user interface object comprising an hour hand and a minute hand, wherein the user interface object indicates the current time; one or more indications of an hourly timescale; and a stopwatch hand; receive data (e.g., with receiving unit 3608) representing a user input; and enable substitution (e.g., with substitution enabling unit 3612), on the display unit (e.g., display unit 3602), of the one or more indications of an hourly timescale with an indication of a first timescale for the stopwatch hand; and enable animation (e.g., with animation enabling unit 3616), on the display unit (e.g., display unit 3602), of the stopwatch hand to reflect passage of time.

In some embodiments, the processing unit 3606 is further configured to, while enabling animation (e.g., with animation enabling unit 3616), on the display unit (e.g., display unit 3602), of the stopwatch hand to reflect the passage of time, receive second data (e.g., with receiving unit 3608) representing a second user input; and in response to receiving the second data: enable cessation (e.g., with cessation enabling unit 3614), on the display unit (e.g., display unit 3602) of the animation of the stopwatch hand. In some embodiments, the processing unit 3606 is further configured to enable display (e.g., with display enabling unit 3610), on the display unit (e.g., display unit 3602), of a first affordance, the first affordance representing a start/stop function, wherein the first data representing the first user input and the second data representing the second user input both represent contacts on the displayed first affordance. In some embodiments, the processing unit 3606 is further configured to enable display (e.g., with display enabling unit 3610), on the display unit (e.g., display unit 3602), of a second affordance, the second affordance representing a lap function; receive third data (e.g., with receiving unit 3608) representing a contact on the displayed second affordance, wherein the third data is received after receiving the first data and before receiving the second data; and enable display (e.g., with display enabling unit 3610), on the display unit (e.g., display unit 3602), of a third numerical indication of elapsed time between receiving the first data and receiving the third data. In some embodiments, the processing unit 3606 is further configured to enable display (e.g., with display enabling unit 3610), on the display unit (e.g., display unit 3602), of a third affordance, the third affordance representing a stopwatch application; receive fourth data (e.g., with receiving unit 3608) representing a contact on the displayed third affordance; and in response to receiving the fourth data: launch (e.g., with launching unit 3618) the stopwatch application. In some embodiments, the first timescale for the stopwatch hand is 60 seconds. In some embodiments, the first timescale for the stopwatch hand is 30 seconds. In some embodiments, the first timescale for the stopwatch hand is 6 seconds. In some embodiments, the first timescale for the stopwatch hand is 3 seconds. In some embodiments, movement of the stopwatch hand is animated at a rate based on the first timescale for the stopwatch hand. In some embodiments, enabling substitution (e.g., with substitution enabling unit 3612), on the display unit (e.g., display unit 3602), of the one or more indications of an hourly timescale with an indication of a first timescale for the stopwatch hand comprises: enabling removal (e.g., with removal enabling unit 3620), on the display unit (e.g., display unit 3602), of the one or more indications of the hourly timescale; enabling display (e.g., with display enabling unit 3610), on the display unit (e.g., display unit 3602), of the indication of the first timescale for the stopwatch hand; and enabling translation (e.g., with translation enabling unit 3622), on the display unit (e.g., display unit 3602), of the displayed indication of the first timescale for the stopwatch hand in a rotational motion, wherein the rotational motion is in a clockwise direction. In some embodiments, electronic device 3600 further comprises a rotatable input unit (e.g., rotatable input unit 3624), wherein the processing unit is coupled to the rotatable input unit (e.g., rotatable input unit 3624), and processing unit 3606 is further configured to receive fifth data representing a rotatable input from the rotatable input unit (e.g., with rotatable input unit 3624); and enable substitution (e.g., with substitution enabling unit 3612), on the display unit (e.g., display unit 3602) of the indication of the first timescale for the stopwatch hand with an indication of a second timescale for the stopwatch hand, wherein the second timescale is different from the first timescale. In some embodiments, enabling substitution (e.g., with substitution enabling unit 3612), on the display unit (e.g., display unit 3602) of the indication of the first timescale for the stopwatch hand with the indication of the second timescale for the stopwatch hand comprises: enabling removal (e.g., with removal enabling unit 3620), on the display unit (e.g., display unit 3602), of the indication of the first timescale for the stopwatch hand; enabling display (e.g., with display enabling unit 3610), on the display unit (e.g., display unit 3602) of the indication of the second timescale for the stopwatch hand; and enabling translation (e.g., with translation enabling unit 3622), on the display unit (e.g., display unit 3602), of the displayed indication of the second timescale for the stopwatch hand in a rotational motion, wherein the rotational motion is in a clockwise direction. In some embodiments, the processing unit 3606 is further configured to after receiving the first data representing the first user input: enable animation (e.g., with animation enabling unit 3616), on the display unit (e.g., display unit 3602), of the stopwatch hand to represent a rotational motion about an origin; and enable cessation (e.g., with cessation enabling unit 3614), on the display unit (e.g., display unit 3602), of the animation to display the stopwatch hand at a position at $\pi/2$ radians relative to the rotational motion about the origin.

The operations described above with reference to FIG. 21 are, optionally, implemented by components depicted in FIGS. 1A-1B or FIG. 36. For example, displaying operation 2102, receiving operation 2104, and substituting operation 2106 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 37:
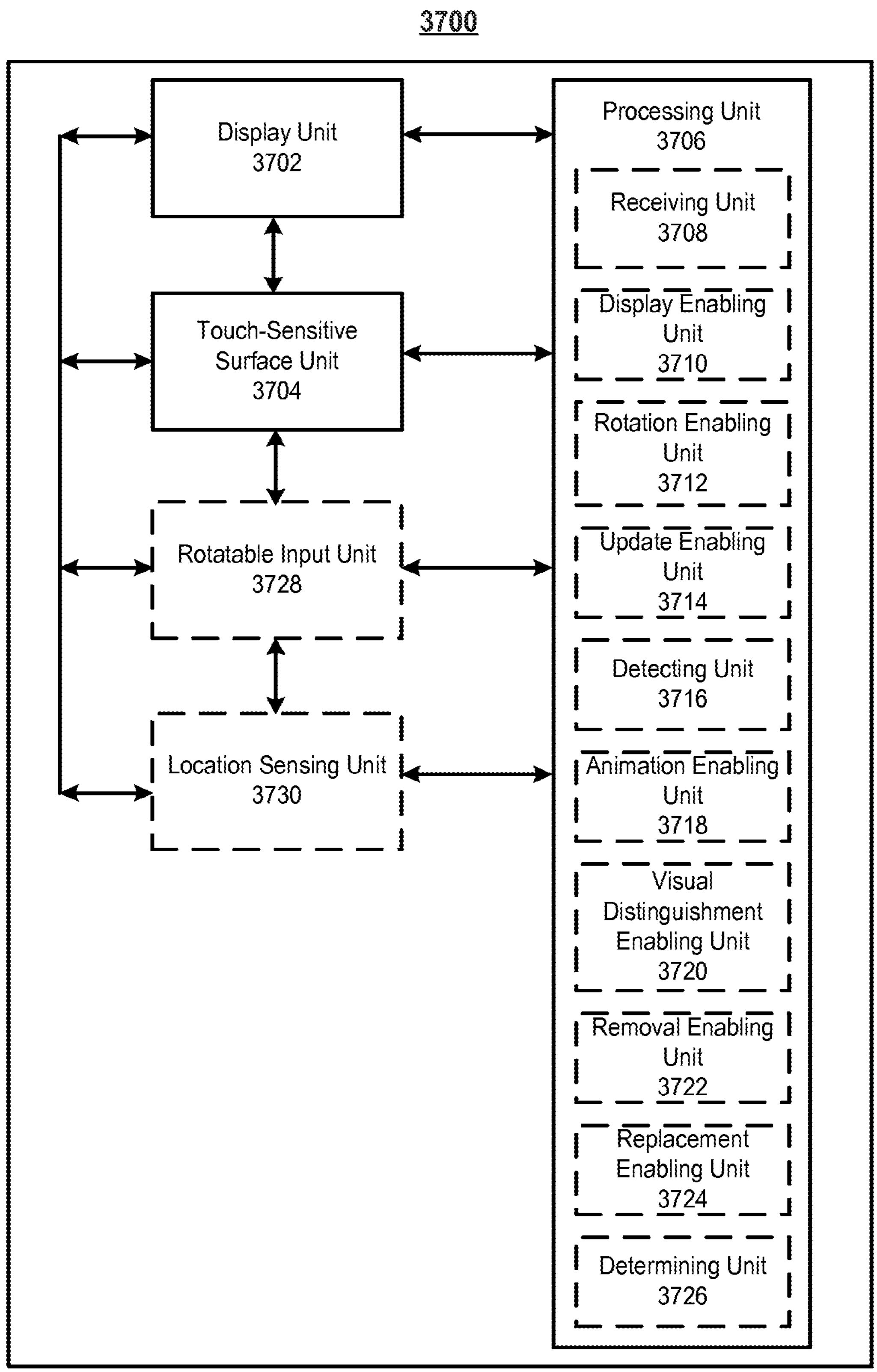
FIG. 37 is a functional block diagram of an electronic device in accordance with some embodiments.

In accordance with some embodiments, FIG. 37 shows an exemplary functional block diagram of an electronic device 3700 configured in accordance with the principles of the various described embodiments. In accordance with some embodiments, the functional blocks of electronic device 3700 are configured to perform the techniques described above. The functional blocks of the device 3700 are, optionally, implemented by hardware, software, or a combination of hardware and software to carry out the principles of the various described examples. It is understood by persons of skill in the art that the functional blocks described in FIG. 37 are, optionally, combined or separated into sub-blocks to implement the principles of the various described examples. Therefore, the description herein optionally supports any possible combination or separation or further definition of the functional blocks described herein.

As shown in FIG. 37, an electronic device 3700 includes a display unit 3702 configured to display a graphic user interface, optionally, a touch-sensitive surface unit 3704 configured to receive contacts, optionally, a rotatable input unit 3728 configured to receive rotatable input (e.g., from a rotatable input mechanism), optionally, a location sensing unit 3730 configured to sense location, and a processing unit 3706 coupled to the display unit 3702, optionally, the touch-sensitive surface unit 3704, optionally, the rotatable input unit 3728, and optionally, the location sensing unit 3730. In some embodiments, the processing unit 3706 includes a receiving unit 3708, a display enabling unit 3710, a rotation enabling unit 3712, an update enabling unit 3714, a detecting unit 3716, an animation enabling unit 3718, a visual distinguishment enabling unit 3720, a removal enabling unit 3722, a replacement enabling unit 3724, and a determining unit 3726.

The processing unit 3706 is configured to enable display (e.g., with display enabling unit 3710), on the display unit (e.g., display unit 3702), of a user interface screen, the user interface screen including: a first affordance representing a simulation of a first region of the Earth as illuminated by the Sun at a current time; and a second affordance indicating the current time; receive (e.g., with receiving unit 3708) a user input; and in response to receiving the user input: enable rotation (e.g., with rotation enabling unit 3712), on the display unit (e.g., display unit 3702), of the simulation of the Earth to display a second region of the Earth as illuminated by the Sun at the current time.

In some embodiments, the first affordance representing the simulation of the first region of the Earth as illuminated by the Sun at the current time comprises a representation of a solar terminator. In some embodiments, the user input comprises a swipe on the touch-sensitive surface unit (e.g., touch-sensitive surface unit 3704) in a first swipe direction. In some embodiments, the simulation of the first region of the Earth is rotated in a first direction of rotation, and the processing unit 3706 is further configured to: receive (e.g., with receiving unit 3708) a second user input; and in response to receiving the second user input: enable rotation (e.g., with rotation enabling unit 3712), on the display unit (e.g., display unit 3702), of the simulation of the first region of the Earth in a second direction of rotation, wherein the second direction of rotation and the first direction of rotation are different. In some embodiments, the second user input comprises a swipe on the touch-sensitive surface unit (e.g., touch-sensitive surface unit 3704) in a second swipe direction, and the first swipe direction and the second swipe direction are different. In some embodiments, electronic device 3700 further comprises a rotatable input unit (e.g., rotatable input unit 3728), wherein the processing unit 3706 is coupled to the rotatable input unit, and wherein the processing unit 3706 is further configured to: receive a third user input representing a rotatable input from the rotatable input unit (e.g., rotatable input unit 3728) and in response to receiving the third user input: enable update (e.g., with update enabling unit 3714), on the display unit (e.g., display unit 3702), of the first affordance to represent a simulation of the first region of the Earth as illuminated by the Sun at a non-current time. In some embodiments, the processing unit 3706 is further configured to: enable update (e.g., with update enabling unit 3714), on the display unit (e.g., display unit 3702), of the second affordance to indicate the non-current time. In some embodiments, electronic device 3700 further comprises a location sensing unit (e.g., location sensing unit 3730), wherein the processing unit 3706 is coupled to the location sensing unit, and wherein the processing unit 3706 is further configured to: before displaying the user interface screen, obtain a current location of electronic device 3700 from the location sensing unit (e.g., location sensing unit 3730), wherein the displayed first region of the Earth represented by the first affordance indicates the current location of electronic device 3700. In some embodiments, the processing unit 3706 is further configured to: detect (e.g., with detecting unit 3716) a user movement of electronic device 3700; and in response to detecting the user movement: enable animation (e.g., with animation enabling unit 3718), on the display unit (e.g., display unit 3702), of the first affordance representing the simulation of the Earth by translating the first affordance on-screen towards the center of the displayed user interface screen. In some embodiments, the processing unit 3706 is further configured to: enable display (e.g., with display enabling unit 3710), on the display unit (e.g., display unit 3702), of a third affordance, the third affordance representing a moon; detect (e.g., with detecting unit 3716) a contact on the displayed third affordance on the touch-sensitive surface unit (e.g., touch-sensitive surface unit 3704), and in response to detecting the contact: enable update (e.g., with update enabling unit 3714), on the display unit (e.g., display unit 3702), of the user interface screen, wherein enabling update of the display of the user interface screen comprises: enabling display (e.g., with display enabling unit 3710), on the display unit (e.g., display unit 3702), of a fourth affordance representing a simulation of the Moon, the fourth affordance representing a simulation of the Moon as seen from the Earth at the current time; and enabling display (e.g., with display enabling unit 3710), on the display unit (e.g., display unit 3702), of a fifth affordance indicating the current time. In some embodiments, enabling update (e.g., with update enabling unit 3714), on the display unit (e.g., display unit 3702), of the user interface screen comprises enabling animation (e.g., with animation enabling unit 3718), on the display unit (e.g., display unit 3702), of the first affordance representing the simulation of the first region of the Earth as illuminated by the Sun by zooming out. In some embodiments, the processing unit 3706 is further configured to: receive (e.g., with receiving unit 3708) a fourth user input; and in response to receiving the fourth user input: enable rotation (e.g., with rotation enabling unit 3712), on the display unit (e.g., display unit 3702), of the simulation of the Moon to display the Moon as seen from the Earth at a non-current time; and enable update (e.g., with update enabling unit 3714), on the display unit (e.g., display unit 3702), of the fifth affordance to indicate the non-current time. In some embodiments, the fourth user input comprises a swipe on the touch-sensitive surface unit (e.g., touch-sensitive surface unit 3704) in a first swipe direction. In some embodiments, the simulation of the Moon as seen from the Earth is rotated in a first direction of rotation, and the processing unit 3706 is further configured to: receive (e.g., with receiving unit 3708) a fifth user input; and in response to receiving the fifth user input: enable rotation (e.g., with rotation enabling unit 3712), on the display unit (e.g., display unit 3702), of the simulation of the Moon as seen from the Earth in a second direction of rotation, wherein the second direction of rotation and the first direction of rotation are different. In some embodiments, the fifth user input comprises a swipe on the touch-sensitive surface unit (e.g., touch-sensitive surface unit 3704) in a second swipe direction, and the first swipe direction and the second swipe direction are different. In some embodiments, electronic device 3700 further comprises a rotatable input unit (e.g., rotatable input unit 3728), the processing unit 3706 is coupled to the rotatable input unit, and receiving the fourth user input comprises receiving a rotatable input from the rotatable input unit (e.g., rotatable input unit 3728) in a first direction of rotation. In some embodiments, electronic device 3700 further comprises a rotatable input unit (e.g., rotatable input unit 3728), the processing unit 3706 is coupled to the rotatable input unit, and the simulation of the Moon as seen from the Earth is rotated in a first direction of rotation, wherein the processing unit is further configured to: receive (e.g., with receiving unit 3708) a sixth user input; and in response to receiving the sixth user input: enable rotation (e.g., with rotation enabling unit 3712), on the display unit (e.g., display unit 3702), of the simulation of the Moon as seen from the Earth in a second direction of rotation, wherein the second direction of rotation and the first direction of rotation are different. In some embodiments, the sixth user input comprises a rotatable input from the rotatable input unit (e.g., rotatable input unit 3728) in a second direction of rotation, and wherein the first direction of rotation and the second direction of rotation are different. In some embodiments, the processing unit 3706 is further configured to: detect (e.g., with detecting unit 3716) a user double tap on the touch-sensitive surface unit (e.g., touch-sensitive surface unit 3704), the user double tap comprising a first contact on the touch-sensitive surface unit and a second contact on the touch-sensitive surface unit; determine (e.g., with determining unit 3726) whether the first contact and the second contact were received within a predetermined interval; and in response to detecting the user double tap, and in accordance with a determination that the first contact and the second contact were received within the predetermined interval: enable display (e.g., with display enabling unit 3710), on the display unit (e.g., display unit 3702), of additional lunar information. In some embodiments, the processing unit 3706 is further configured to: enable display (e.g., with display enabling unit 3710), on the display unit (e.g., display unit 3702), of a sixth affordance on the touch-sensitive surface unit (e.g., touch-sensitive surface unit 3704), the sixth affordance representing a solar system; detect (e.g., with detecting unit 3716) a contact on the displayed sixth affordance, and in response to detecting the contact: enable update (e.g., with update enabling unit 3714), on the display unit (e.g., display unit 3702), of the user interface screen, wherein enabling update (e.g., with update enabling unit 3714), on the display unit (e.g., display unit 3702), of the user interface screen comprises: enabling display (e.g., with display enabling unit 3710), on the display unit (e.g., display unit 3702), of a seventh affordance representing a solar system, the seventh affordance comprising representations of the Sun, the Earth, and one or more non-Earth planets at their respective positions at a current time; and enabling display (e.g., with display enabling unit 3710), on the display unit (e.g., display unit 3702), of an eighth affordance indicating the current time. In some embodiments, enabling update (e.g., with update enabling unit 3714), on the display unit (e.g., display unit 3702), of the user interface screen comprises enabling animation (e.g., with animation enabling unit 3718), on the display unit (e.g., display unit 3702), of the first affordance representing the simulation of the first region of the Earth as illuminated by the Sun or enabling animation (e.g., with animation enabling unit 3718), on the display unit (e.g., display unit 3702), of the fourth affordance representing a simulation of the Moon as seen from the Earth by zooming out. In some embodiments, the processing unit 3706 is further configured to: receive (e.g., with receiving unit 3708) a seventh user input; and in response to receiving the seventh user input: enable update (e.g., with update enabling unit 3714), on the display unit (e.g., display unit 3702), of the seventh affordance to depict respective positions of the Sun, the Earth, and the one or more non-Earth planets for a non-current time, wherein updating the seventh affordance comprises rotating the Earth and the one or more non-Earth planets about the Sun; and enable update (e.g., with update enabling unit 3714), on the display unit (e.g., display unit 3702), of the eighth affordance to indicate the non-current time. In some embodiments, the seventh user input comprises a swipe on the touch-sensitive surface unit (e.g., touch-sensitive surface unit 3704) in a first swipe direction. In some embodiments, the Earth and the one or more non-Earth planets are rotated about the Sun in a first direction of rotation, and the processing unit 3706 is further configured to: receive (e.g., with receiving unit 3708) an eighth user input; and in response to receiving the eighth user input: enable rotation (e.g., with rotation enabling unit 3712), on the display unit (e.g., display unit 3702), of the Earth and the one or more non-Earth planets about the Sun in a second direction of rotation, wherein the second direction of rotation and the first direction of rotation are different. In some embodiments, the eighth user input comprises a swipe on the touch-sensitive surface unit (e.g., touch-sensitive surface unit 3704) in a second swipe direction, and wherein the first swipe direction and the second swipe direction are different. In some embodiments, electronic device 3700 further comprises a rotatable input unit (e.g., rotatable input unit 3728), the processing unit 3706 is coupled to the rotatable input unit (e.g., rotatable input unit 3728), and receiving the seventh user input comprises receiving a rotatable input from the rotatable input unit (e.g., rotatable input unit 3728) in a first direction of rotation. In some embodiments, electronic device 3700 further comprises a rotatable input unit (e.g., rotatable input unit 3728), the processing unit 3706 is coupled to the rotatable input unit, wherein the Earth and the one or more non-Earth planets are rotated about the Sun in a first direction of rotation, and the processing unit 3706 is further configured to: receive (e.g., with receiving unit 3708) a ninth user input; and in response to receiving the ninth user input: enable rotation (e.g., with rotation enabling unit 3712), on the display unit (e.g., display unit 3702), of the Earth and the one or more non-Earth planets about the Sun in a second direction of rotation, wherein the second direction of rotation and the first direction of rotation are different. In some embodiments, the ninth user input comprises a rotatable input from the rotatable input unit (e.g., rotatable input unit 3728) in a second direction of rotation, and wherein the first direction of rotation and the second direction of rotation are different. In some embodiments, the representation of the Earth further comprises a representation of the orbit of the Earth around the Sun, and wherein the representation of the one or more non-Earth planets further comprises a representation of the orbit of the one or more non-Earth planets around the Sun. In some embodiments, the processing unit 3706 is further configured to: receive (e.g., with receiving unit 3708) a tenth user input comprising a contact on the touch-sensitive surface unit (e.g., touch-sensitive surface unit 3704), wherein the contact is associated with the representation of the Earth or the representation of the one or more non-Earth planets, the contact on the touch-sensitive surface unit having an associated duration; while continuing to receive the contact, determine (e.g., with determining unit 3726) whether the duration of the contact exceeds a predetermined threshold; in response to receiving the tenth user input, and in accordance with a determination that the duration of the contact exceeds the predetermined threshold: enable visual distinguishment (e.g., with visual distinguishment enabling unit 3720), on the display unit (e.g., display unit 3702), of the representation of the Earth or the representation of the one or more non-Earth planets associated with the contact; detect (e.g., with detecting unit 3716) a break in the contact; and in response to detecting the break in the contact: enable display (e.g., with display enabling unit 3710), on the display unit (e.g., display unit 3702), of information about the Earth or the one or more non-Earth planets associated with the contact. In some embodiments, the processing unit 3706 is further configured to: after enabling display, on the display unit, of the information about the Earth or the one or more non-Earth planets associated with the contact, receive (e.g., with receiving unit 3708) an eleventh user input; determine (e.g., with determining unit 3732) whether the eleventh user input represents a tap or a swipe on the touch-sensitive surface unit (e.g., touch-sensitive surface unit 3704); in accordance with a determination that the eleventh user input represents a tap: enable removal (e.g., with removal enabling unit 3724), on the display unit (e.g., display unit 3702), of the displayed information about the Earth or the one or more non-Earth planets; and in accordance with a determination that the eleventh user input represents a swipe: enable replacement (e.g., with replacement enabling unit 3724), on the display unit (e.g., display unit 3702), of the displayed information about the Earth or the one or more non-Earth planets with information about a second planet selected from the group consisting of the Earth and the one or more non-Earth planets, wherein the second planet is not the planet associated with the contact.

The operations described above with reference to FIG. 22 are, optionally, implemented by components depicted in FIGS. 1A-1B or FIG. 37. For example, displaying operation 2202, receiving operation 2204, and rotating operation 2206 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 38:
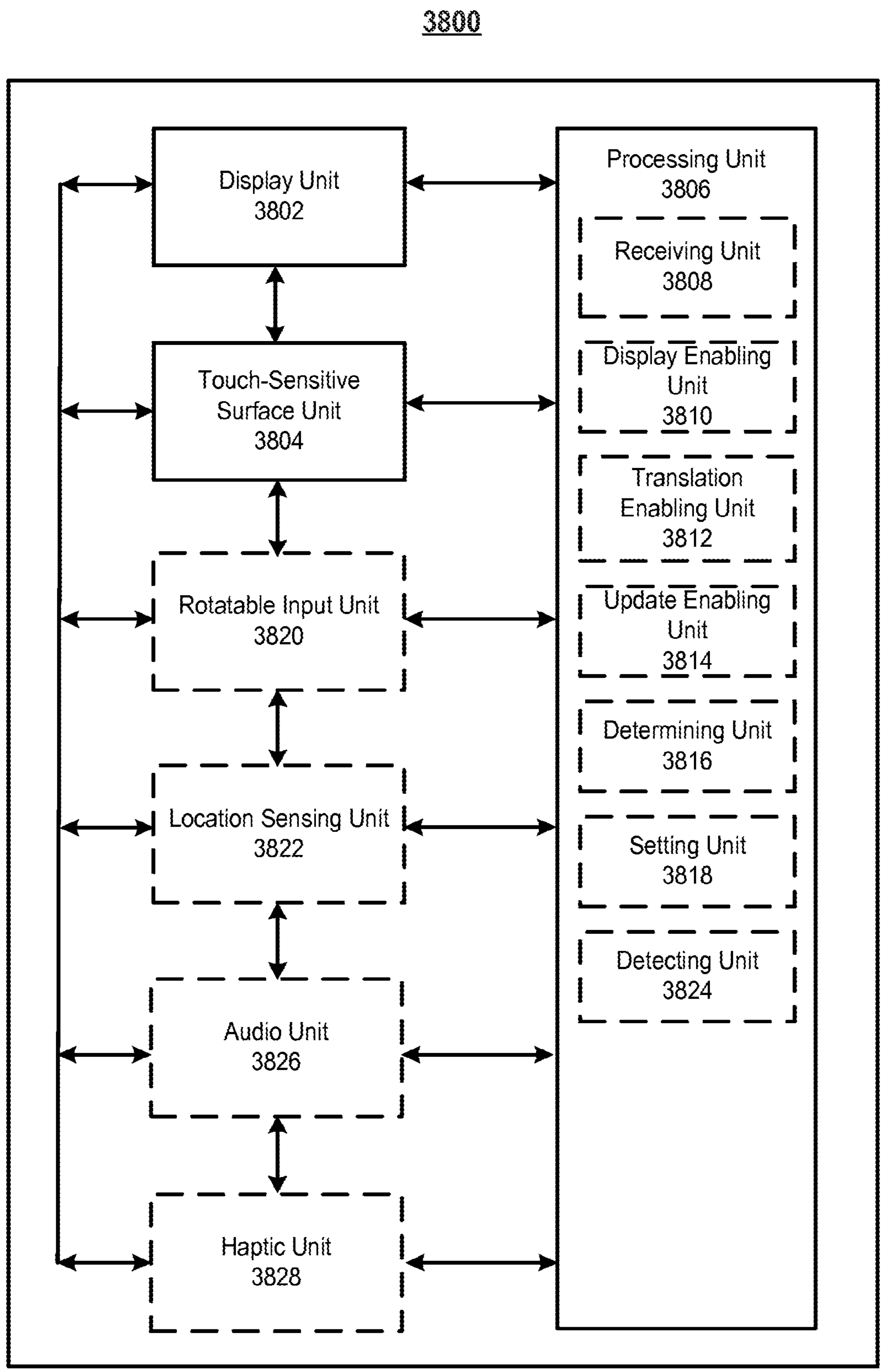
FIG. 38 is a functional block diagram of an electronic device in accordance with some embodiments.

In accordance with some embodiments, FIG. 38 shows an exemplary functional block diagram of an electronic device 3800 configured in accordance with the principles of the various described embodiments. In accordance with some embodiments, the functional blocks of electronic device 3800 are configured to perform the techniques described above. The functional blocks of the device 3800 are, optionally, implemented by hardware, software, or a combination of hardware and software to carry out the principles of the various described examples. It is understood by persons of skill in the art that the functional blocks described in FIG. 38 are, optionally, combined or separated into sub-blocks to implement the principles of the various described examples. Therefore, the description herein optionally supports any possible combination or separation or further definition of the functional blocks described herein.

As shown in FIG. 38, an electronic device 3800 includes a display unit 3802 configured to display a graphic user interface, optionally, a touch-sensitive surface unit 3804 configured to receive contacts, optionally, a rotatable input unit 3820 configured to receive rotatable input (e.g., from a rotatable input mechanism), optionally, a location sensing unit 3822 configured to sense location, optionally, an audio unit 3826, optionally, a haptic unit 3828, and a processing unit 3806 coupled to the display unit 3802, optionally, the touch-sensitive surface unit 3804, optionally, the rotatable input unit 3820, optionally, the location sensing unit 3822, optionally, the audio unit 3826, and optionally, the haptic unit 3828. In some embodiments, the processing unit 3806 includes a receiving unit 3808, a display enabling unit 3810, a translation enabling unit 3812, an update enabling unit 3814, a determining unit 3816, a setting unit 3818, and a detecting unit 3824.

The processing unit 3806 is configured to enable display (e.g., with display enabling unit 3810), on the display unit (e.g., display unit 3802), of a user interface screen, the user interface screen comprising: a first portion of the user interface screen, the first portion indicating daytime; a second portion of the user interface screen, the second portion indicating nighttime; a user interface object, the user interface object representing a sinusoidal wave with a period representing a day, wherein the sinusoidal wave indicates a path of the Sun through the day, and wherein the sinusoidal wave is displayed in one or more of the first portion and the second portion; a first affordance representing the Sun, wherein the first affordance is displayed at a first position on the displayed sinusoidal wave, the first position indicating a current time of the day and whether the current time of the day is during daytime or nighttime; and a second affordance, the second affordance indicating the current time of day.

In some embodiments, electronic device 3800 further comprises a location sensing unit (e.g., location sensing unit 3822), processing unit 3806 is coupled to the location sensing unit (e.g., location sensing unit 3822), and processing unit 3806 is further configured to: obtain a current location of the electronic device from the location sensing unit (e.g., with location sensing unit 3822), wherein the ratio of the displayed first portion indicating daytime relative to the second portion indicating nighttime indicates daylight hours at the current location at the current time. In some embodiments, amplitude of the sinusoidal wave is based on height of the Sun relative to horizon at the current location and at the current time. In some embodiments, the processing unit 3806 is further configured to: enable display (e.g., with display enabling unit 3810), on the display unit (e.g., display unit 3802), of a line on the user interface screen, wherein the line divides the first portion of the user interface screen indicating daytime and the second portion of the user interface screen indicating nighttime, wherein the line intersects the sinusoidal wave at a first point representing sunrise and at a second point representing sunset. In some embodiments, the processing unit 3806 is further configured to: receive (e.g., with receiving unit 3808) a user contact on the touch-sensitive surface unit (e.g., touch-sensitive surface unit 3804) at the first affordance, the first affordance displayed at the first position on the displayed sinusoidal wave, the first position indicating the current time; while continuing to receive the user contact, detect (e.g., with detecting unit 3824) movement (e.g., on touch-sensitive surface unit 3804) of the user contact from the first position to a second position on the displayed sinusoidal wave without a break in contact of the user contact on the touch-sensitive surface unit, the second position on the displayed sinusoidal wave indicating a non-current time; and in response to detecting the contact at the second position: enable translation (e.g., with translation enabling unit 3812), on the display unit (e.g., display unit 3802), of the first affordance on-screen from the first position on the displayed sinusoidal wave to the second position on the displayed sinusoidal wave, wherein the translation tracks the displayed sinusoidal wave; and enable update (e.g., with update enabling unit 3814), on the display unit (e.g., display unit 3802), of the second affordance to indicate the non-current time. In some embodiments, the processing unit 3806 is further configured to: in response to detecting the contact at the first affordance: enable display (e.g., with display enabling unit 3810), on the display unit (e.g., display unit 3802), of, on the user interface screen: a third user interface object, wherein the third user interface object is displayed at the first point along the sinusoidal wave representing sunrise; and a fourth user interface object, wherein the fourth user interface object is displayed at the second point along the sinusoidal wave representing sunset. In some embodiments, the processing unit 3806 is further configured to: in response to detecting (e.g., with detecting unit 3824) the contact at the first affordance (e.g., on touch-sensitive surface unit 3804): enable display (e.g., with display enabling unit 3810), on the display unit (e.g., display unit 3802), of, on the user interface screen: a fifth user interface object, wherein the fifth user interface object is displayed along the sinusoidal wave at a third point representing dawn; and a sixth user interface object, wherein the sixth user interface object is displayed along the sinusoidal wave at a fourth point representing dusk. In some embodiments, the processing unit 3806 is further configured to: detect (e.g., with detecting unit 3824) a break in contact of the user contact on the touch-sensitive surface unit (e.g., touch-sensitive surface unit 3804), and in response to detecting the break in contact of the user contact on the touch-sensitive surface unit: enable translation (e.g., with translation enabling unit 3812), on the display unit (e.g., display unit 3802), of the first affordance on-screen from the second position to the first position, wherein the translation tracks the displayed sinusoidal wave; and enable update (e.g., with update enabling unit 3814), on the display unit (e.g., display unit 3802), of the second affordance to indicate the current time of day. In some embodiments, the first affordance representing the sun appears filled when the first affordance is displayed at a position fully within the first portion of the user interface screen. In some embodiments, the first affordance representing the sun appears hollow when the first affordance is displayed at a position fully within the second portion of the user interface screen. In some embodiments, the first affordance representing the sun appears half-filled when the first affordance is displayed at a position intersecting both the first portion and the second portion of the user interface screen. In some embodiments, the processing unit 3806 is further configured to: determine (e.g., with determining unit 3816) whether the position of the first affordance on the displayed sinusoidal wave intersects with a position of the second affordance indicating the current time of day; and in accordance with a determination that the position of the first affordance on the displayed sinusoidal wave intersects with a position of the second affordance indicating the current time of day: enable display (e.g., with display enabling unit 3810), on the display unit (e.g., display unit 3802), of the second affordance at a second position that does not intersect the position of the displayed sinusoidal wave. In some embodiments, the processing unit 3806 is further configured to: detect (e.g., with detecting unit 3824) a user input; and in response to detecting the user input: enable display (e.g., with display enabling unit 3810), on the display unit (e.g., display unit 3802), of a second user interface screen, the second user interface screen comprising an indication of a time of sunrise and an indication of a time of sunset. In some embodiments, the electronic device 3800 further comprises a rotatable input unit (e.g., rotatable input unit 3820), the processing unit 3806 is coupled to the rotatable input unit, and the processing unit 3806 is further configured to: detect (e.g., with detecting unit 3824) a movement corresponding to a rotatable input from the rotatable input unit (e.g., rotatable input unit 3820); and in response to detecting the movement: enable translation (e.g., with translation enabling unit 3812), on the display unit (e.g., display unit 3802), of the first affordance representing the Sun to a third position on the displayed sinusoidal wave, wherein the third position indicates a third time of day, wherein the third time of day is not the current time of day; detect (e.g., with detecting unit 3824) a contact on the touch-sensitive surface unit (e.g., with touch-sensitive surface unit 3804) on the displayed first affordance at the third position; and in response to detecting the contact: set (e.g., with setting unit 3818) a user reminder for the third time of day. In some embodiments, setting the user reminder for the third time of day comprises: enabling display, on the display unit (e.g., display unit 3802), of a third affordance on the display, the third affordance representing a user prompt to set an alert for the third time of day.

In some embodiments, the processing unit 3806 is further configured to enable display (e.g., with display enabling unit 3810), on the display unit (e.g., display unit 3802), of a visual alert for the third time of day, and the user reminder for the third time of day comprises the visual alert for the third time of day. In some embodiments, the electronic device 3800 further comprises an audio unit (e.g., audio unit 3826), the processing unit 3806 is coupled to the audio unit, the processing unit 3806 is further configured to enable an audio alert for the third time of day via the audio unit (e.g., with audio unit 3826), and the user reminder for the third time of day comprises the audio alert for the third time of day. In some embodiments, the electronic device 3800 further comprises a haptic unit (e.g., haptic unit 3828), the processing unit 3806 is coupled to the haptic unit, the processing unit 3806 is further configured to enable a haptic alert for the third time of day via the haptic unit (e.g., with haptic unit 3828), and the user reminder for the third time of day comprises the haptic alert for the third time of day.

The operations described above with reference to FIG. 23 are, optionally, implemented by components depicted in FIGS. 1A-1B or FIG. 38. For example, displaying operation 2302, optional receiving operation 2304, and optional detecting operation 2306 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 39:
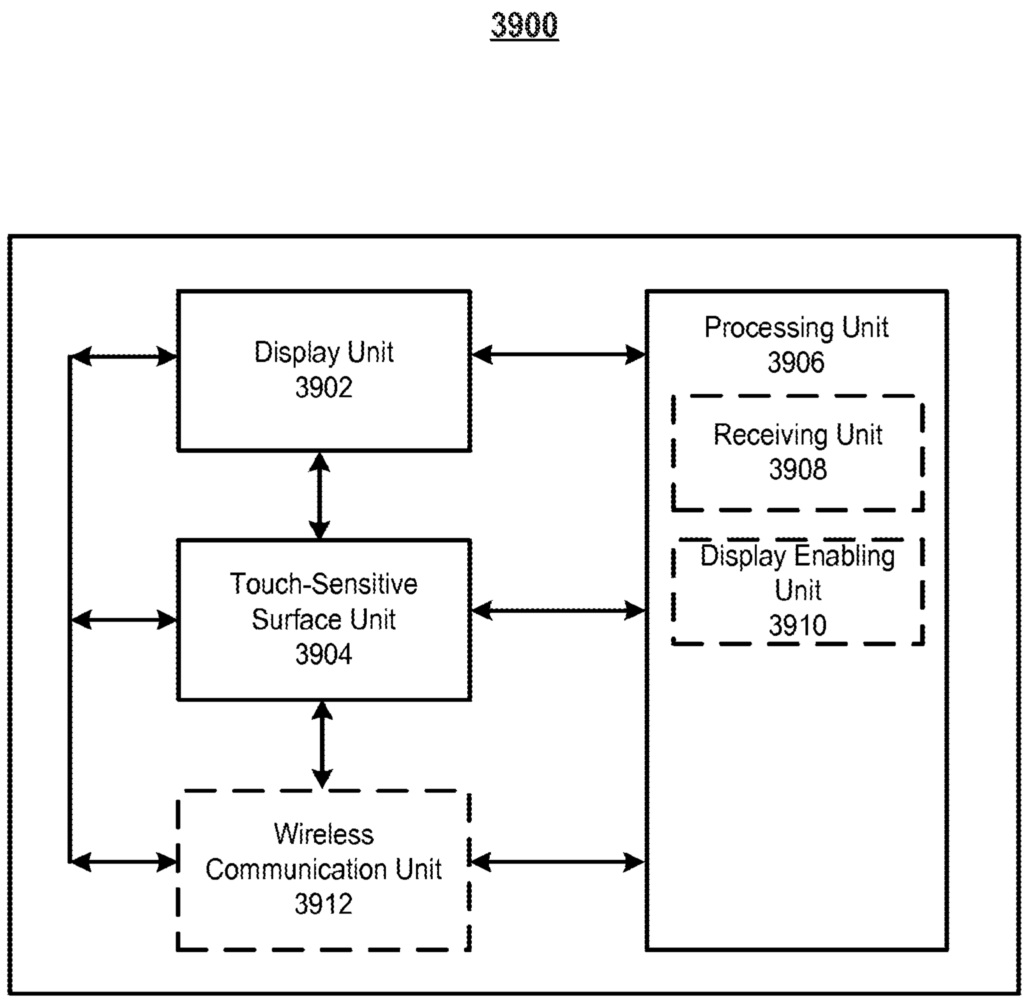
FIG. 39 is a functional block diagram of an electronic device in accordance with some embodiments.

In accordance with some embodiments, FIG. 39 shows an exemplary functional block diagram of an electronic device 3900 configured in accordance with the principles of the various described embodiments. In accordance with some embodiments, the functional blocks of electronic device 3900 are configured to perform the techniques described above. The functional blocks of the device 3900 are, optionally, implemented by hardware, software, or a combination of hardware and software to carry out the principles of the various described examples. It is understood by persons of skill in the art that the functional blocks described in FIG. 39 are, optionally, combined or separated into sub-blocks to implement the principles of the various described examples. Therefore, the description herein optionally supports any possible combination or separation or further definition of the functional blocks described herein.

As shown in FIG. 39, an electronic device 3900 includes a display unit 3902 configured to display a graphic user interface, optionally, a touch-sensitive surface unit 3904 configured to receive contacts, optionally, a wireless communication unit 3912 configured to send and/or receive wireless communication, and a processing unit 3906 coupled to the display unit 3902, optionally, the touch-sensitive surface unit 3904, and optionally, the wireless communication unit 3912. In some embodiments, the processing unit 3906 includes a receiving unit 3908 and a display enabling unit 3910.

The processing unit 3906 is configured to enable display (e.g., with display enabling unit 3910), on the display unit (e.g., display unit 3902), of a user interface screen, the user interface screen including: a background based on an image, the background comprising a plurality of pixels, wherein a subset of the pixels are modified in appearance relative to the image such that the subset of pixels represents one or more of: a first user interface object indicating a date; and a second user interface object indicating a time of day.

In some embodiments, the subset of the pixels is modified by color blending. In some embodiments, the subset of the pixels is modified by color blurring. In some embodiments, the subset of the pixels is modified in appearance relative to the image such that the subset of pixels represents the first user interface object indicating the date. In some embodiments, the subset of the pixels is modified in appearance relative to the image such that the subset of pixels represents the second user interface object indicating the time of day. In some embodiments, one of the first user interface object indicating the date and the second user interface object indicating the time of day is a first color independent of the background. In some embodiments, the processing unit 3906 is further configured to: receive (e.g., with receiving unit 3908) data representing a background color of the background at a position of the displayed first user interface object or the displayed second user interface object, wherein the first color is different from the background color at the position of the displayed first user interface object or the displayed second user interface object. In some embodiments, the image is a photo. In some embodiments, the image is stored on the electronic device. In some embodiments, wherein the electronic device 3900 further comprises a wireless communication unit (e.g., wireless communication unit 3912), wherein the processing unit 3906 is coupled to the wireless communication unit, and the image is stored on an external device coupled to electronic device 3900 via the wireless communication unit (e.g., wireless communication unit 3912). In some embodiments, the processing unit 3906 is further configured to: before enabling display (e.g., with display enabling unit 3910), on the display unit (e.g., display unit 3902), of the user interface screen: enable receipt (e.g., with receiving unit 3908), via the wireless communication unit (e.g., wireless communication unit 3912) of data representing the background from the external device. In some embodiments, the processing unit 3906 is further configured to: enable receipt (e.g., with receiving unit 3908), via the wireless communication unit (e.g., wireless communication unit 3912) of data representing a current background of the external device, and enable display (e.g., with display enabling unit 3910), on the display unit (e.g., display unit 3902), of a second user interface screen on the display, the second user interface screen including: a second background, wherein the second background corresponds with the current background of the external device, the second background comprising a second plurality of pixels, wherein a second subset of the pixels are modified in appearance relative to the current background of the external device such that the second subset of pixels represents one or more of: a third user interface object indicating the date; and a fourth user interface object indicating the time of day.

The operations described above with reference to FIG. 24 are, optionally, implemented by components depicted in FIGS. 1A-1B or FIG. 39. For example, displaying operation 2402 and optional receiving operation 2404 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 40:
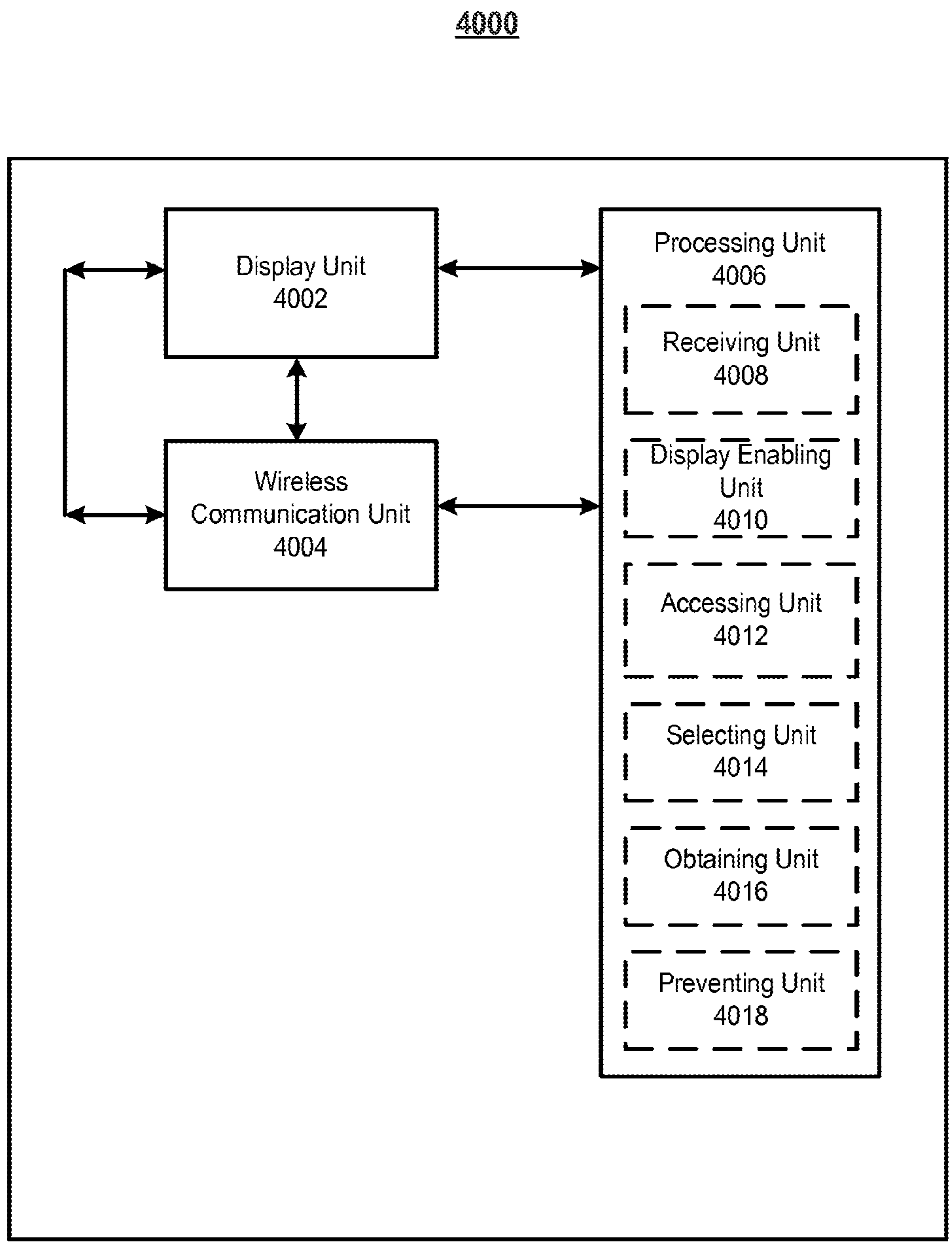
FIG. 40 is a functional block diagram of an electronic device in accordance with some embodiments.

In accordance with some embodiments, FIG. 40 shows an exemplary functional block diagram of an electronic device 4000 configured in accordance with the principles of the various described embodiments. In accordance with some embodiments, the functional blocks of electronic device 4000 are configured to perform the techniques described above. The functional blocks of the device 4000 are, optionally, implemented by hardware, software, or a combination of hardware and software to carry out the principles of the various described examples. It is understood by persons of skill in the art that the functional blocks described in FIG. 40 are, optionally, combined or separated into sub-blocks to implement the principles of the various described examples. Therefore, the description herein optionally supports any possible combination or separation or further definition of the functional blocks described herein.

As shown in FIG. 40, an electronic device 4000 includes a display unit 4002 configured to display a graphic user interface, optionally, a wireless communication unit 4004 configured to send and/or receive wireless communications, and a processing unit 4006 coupled to the display unit 4002, and optionally, the wireless communication unit 4004. In some embodiments, device 4000 may further include a touch-sensitive surface unit configured to receive contacts and coupled to the processing unit 4006. In some embodiments, the processing unit 4006 includes a receiving unit 4008, a display enabling unit 4010, an accessing unit 4012, a selecting unit 4014, an obtaining unit 4016, and a preventing unit 4018.

The processing unit 4006 is configured to access (e.g., with accessing unit 4012) a folder, the folder including two or more images; select (e.g., with selecting unit 4014) from the folder a first image; and enable display (e.g., with display enabling unit 4010), on the display unit (e.g., display unit 4002), of a user interface screen, the user interface screen comprising: a background based on the first image, the background comprising a plurality of pixels, wherein a subset of the pixels are modified in appearance relative to the image such that the subset of pixels represents one or more of: a first user interface object indicating a date; and a second user interface object indicating a time of day.

In some embodiments, the subset of the pixels is modified by color blending. In some embodiments, the subset of the pixels is modified by color blurring. In some embodiments, the subset of the pixels is modified in appearance relative to the image such that the subset of pixels represents the first user interface object indicating the date. In some embodiments, the subset of the pixels is modified in appearance relative to the image such that the subset of pixels represents the second user interface object indicating the time of day. In some embodiments, one of the first user interface object indicating the date and the second user interface object indicating the time of day is a first color independent of the background. In some embodiments, the processing unit 4006 is further configured to: receive (e.g., with receiving unit 4008) data representing a background color of the background at a position of the displayed first user interface object or the displayed second user interface object, wherein the first color is different from the background color at the position of the displayed first user interface object or the displayed second user interface object. In some embodiments, the processing unit 4006 is further configured to: after enabling display, on the display unit, of the first user interface screen, receive (e.g., with receiving unit 4008) first data representing a user input, and in response to receiving the first data representing the user input: obtain (e.g., with obtaining unit 4016) second data representing the displayed first background; select (e.g., with selecting unit 4014) a second image from the folder, wherein the second image is different from the first image; and enable display (e.g., with display enabling unit 4010), on the display unit (e.g., display unit 4002), of a second user interface screen, the second user interface screen comprising: a second background based on the second image, the second background comprising a second plurality of pixels, wherein a second subset of the pixels are modified in appearance relative to the second image such that the second subset of pixels represents one or more of: a third user interface object indicating a date; and a fourth user interface object indicating a time of day. In some embodiments, the processing unit 4006 is further configured to: receive (e.g., with receiving unit 4008) data representing a user prohibition of a third image from the folder; and in response to receiving the data: prevent (e.g., with preventing unit 4018) the display, on the display unit (e.g., display unit 4002), of the third image as a third background in response to a future user input. In some embodiments, at least one of the first background, the second background, and the third background is a photo. In some embodiments, the folder is stored on the electronic device 4000. In some embodiments, the electronic device 4000 further includes a wireless communication unit (e.g., wireless communication unit 4004), the processing unit 4006 is coupled to the wireless communication unit, and the folder is stored on an external device coupled to the electronic device 4000 via the wireless communication unit (e.g., wireless communication unit 4004). In some embodiments, accessing the folder comprises: receiving (e.g., with receiving unit 4008), via the wireless communication unit (e.g., wireless communication unit 4004), data representing at least one of the two or more backgrounds.

The operations described above with reference to FIG. 25 are, optionally, implemented by components depicted in FIGS. 1A-1B or FIG. 40. For example, accessing operation 2502, selecting operation 2504, and displaying operation 2506 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 41:
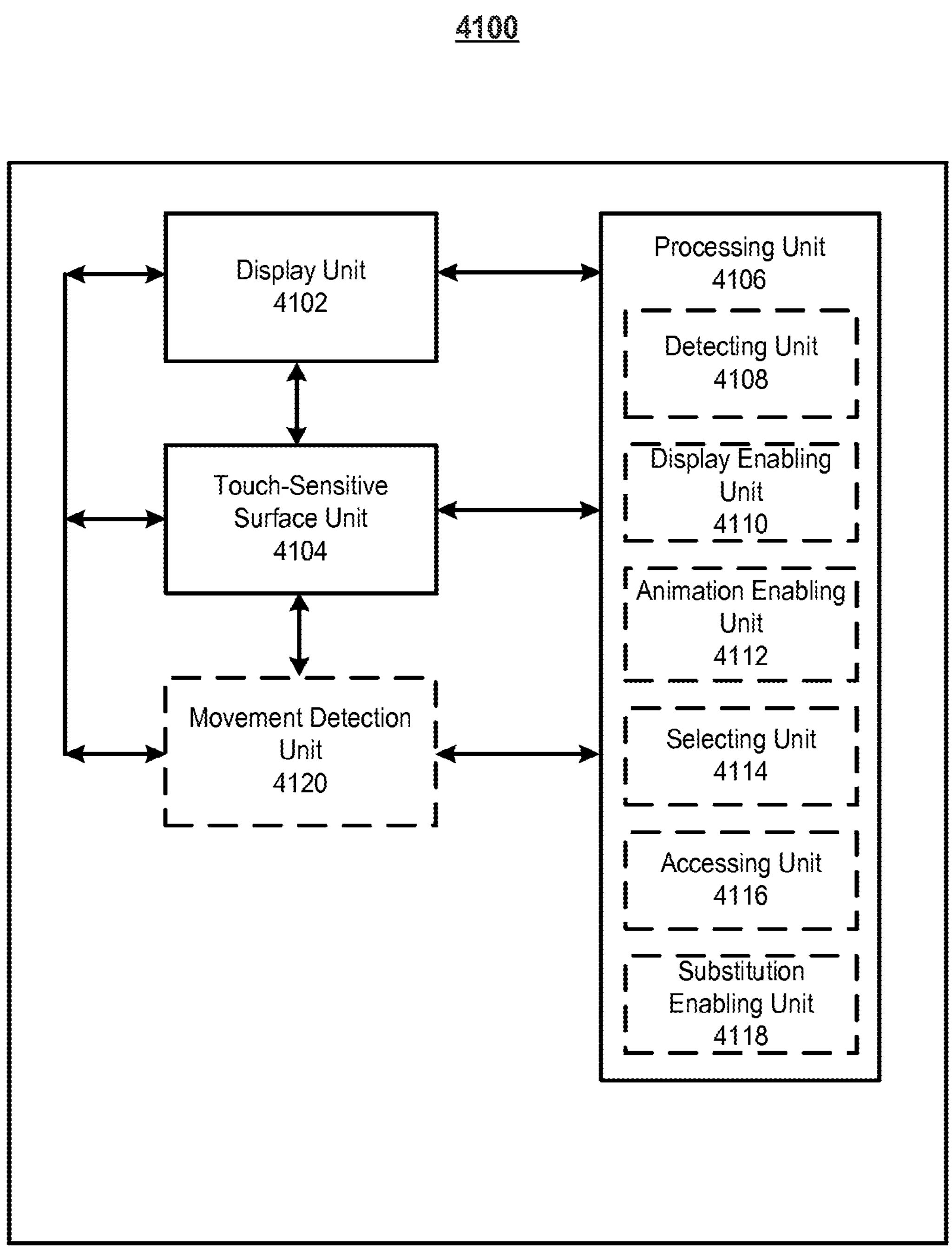
FIG. 41 is a functional block diagram of an electronic device in accordance with some embodiments.

In accordance with some embodiments, FIG. 41 shows an exemplary functional block diagram of an electronic device 4100 configured in accordance with the principles of the various described embodiments. In accordance with some embodiments, the functional blocks of electronic device 4100 are configured to perform the techniques described above. The functional blocks of the device 4100 are, optionally, implemented by hardware, software, or a combination of hardware and software to carry out the principles of the various described examples. It is understood by persons of skill in the art that the functional blocks described in FIG. 41 are, optionally, combined or separated into sub-blocks to implement the principles of the various described examples. Therefore, the description herein optionally supports any possible combination or separation or further definition of the functional blocks described herein.

As shown in FIG. 41, an electronic device 4100 includes a display unit 4102 configured to display a graphic user interface, optionally, a touch-sensitive surface unit 4104 configured to receive contacts, optionally, a movement detection unit 4120 configured to detect movement, and a processing unit 4106 coupled to the display unit 4102, optionally, the touch-sensitive surface unit 4104 and optionally, the movement detection unit 4120. In some embodiments, the processing unit 4106 includes a detecting unit 4108, a display enabling unit 4110, an animation enabling unit 4112, a selecting unit 4114, an accessing unit 4116, and a substitution enabling unit 4118.

The processing unit 4106 is configured to detect (e.g., with detecting unit 4108) a user input, wherein the user input is detected at a first time, and in response to detecting the user input: enable display (e.g., with display enabling unit 4110), on the display unit (e.g., display unit 4102), of a user interface screen, the user interface screen including: a first user interface object indicating the first time; and a second user interface object; and enable animation (e.g., with animation enabling unit 4112), on the display unit (e.g., display unit 4102), of the second user interface object, the animation comprising a sequential display of a first animated sequence, a second animated sequence after the first animated sequence, and a third animated sequence after the second animated sequence, wherein the first animated sequence, the second animated sequence, and the third animated sequence are different; after enabling animation of the second user interface object, detect (e.g., with detecting unit 4108) a second user input, wherein the second user input is detected at a second time, wherein the second time is after the first time, and in response to detecting the second user input: access (e.g., with accessing unit 4116) data representing the previously displayed second animated sequence; select (e.g., with selecting unit 4114) a fourth animated sequence, wherein the fourth animated sequence is different from the first animated sequence and the second animated sequence; enable display (e.g., with display enabling unit 4110), on the display unit (e.g., display unit 4102), of a second user interface screen, the second user interface screen including: the first user interface object, wherein the first user interface object is updated to indicate the second time; and a third user interface object related to the second user interface object; and enable animation (e.g., with animation enabling unit 4112), on the display unit (e.g., display unit 4102), of the third user interface object, the animation comprising a sequential display of the first animated sequence, the fourth animated sequence after the first animated sequence, and the third animated sequence after the fourth animated sequence.

In some embodiments, the third animated sequence is based on a reverse sequence of the first animated sequence. In some embodiments, the electronic device 4100 further comprises a movement detection unit (e.g., movement detection unit 4120), wherein the processing unit 4106 is coupled to the movement detection unit, and wherein the processing unit 4106 is further configured to enable detection of a movement of the electronic device via the movement detection unit (e.g., movement detection unit 4120), and wherein the user input represents a user movement of the electronic device 4100. In some embodiments, the electronic device 4100 further comprises a movement detection unit (e.g., movement detection unit 4120), wherein the processing unit 4106 is coupled to the movement detection unit, and wherein the processing unit 4106 is further configured to enable detection of a movement of the electronic device via the movement detection unit (e.g., movement detection unit 4120), and wherein the second user input represents a second user movement of the electronic device 4100. In some embodiments, the second user interface object and the third user interface object are the same. In some embodiments, the third user interface object is a reflection of the second user interface object. In some embodiments, the fourth animated sequence comprises a reflection of the second animated sequence about a horizontal axis. In some embodiments, the fourth animated sequence comprises a reflection of the second animated sequence about a vertical axis. In some embodiments, the processing unit 4106 is further configured to: detect (e.g., using detecting unit 4108) a contact on the touch-sensitive surface unit (e.g., touch-sensitive surface unit 4104), and in response to detecting the contact: enable substitution (e.g., with substitution enabling unit 4118), on the display unit (e.g., display unit 4102), of the second user interface object or the third user interface object with a display, on the display unit (e.g., display unit 4102), of a fourth user interface object, wherein the fourth user interface object is related to the second and the third user interface objects. In some embodiments, the first user interface object comprises a representation of a digital clock including a numerical indication of an hour and a numerical indication of a minute. In some embodiments, the first time is a current time.

The operations described above with reference to FIG. 26 are, optionally, implemented by components depicted in FIGS. 1A-1B or FIG. 41. For example, detecting operation 4102, displaying operation 4104, and animating operation 4106 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 42:
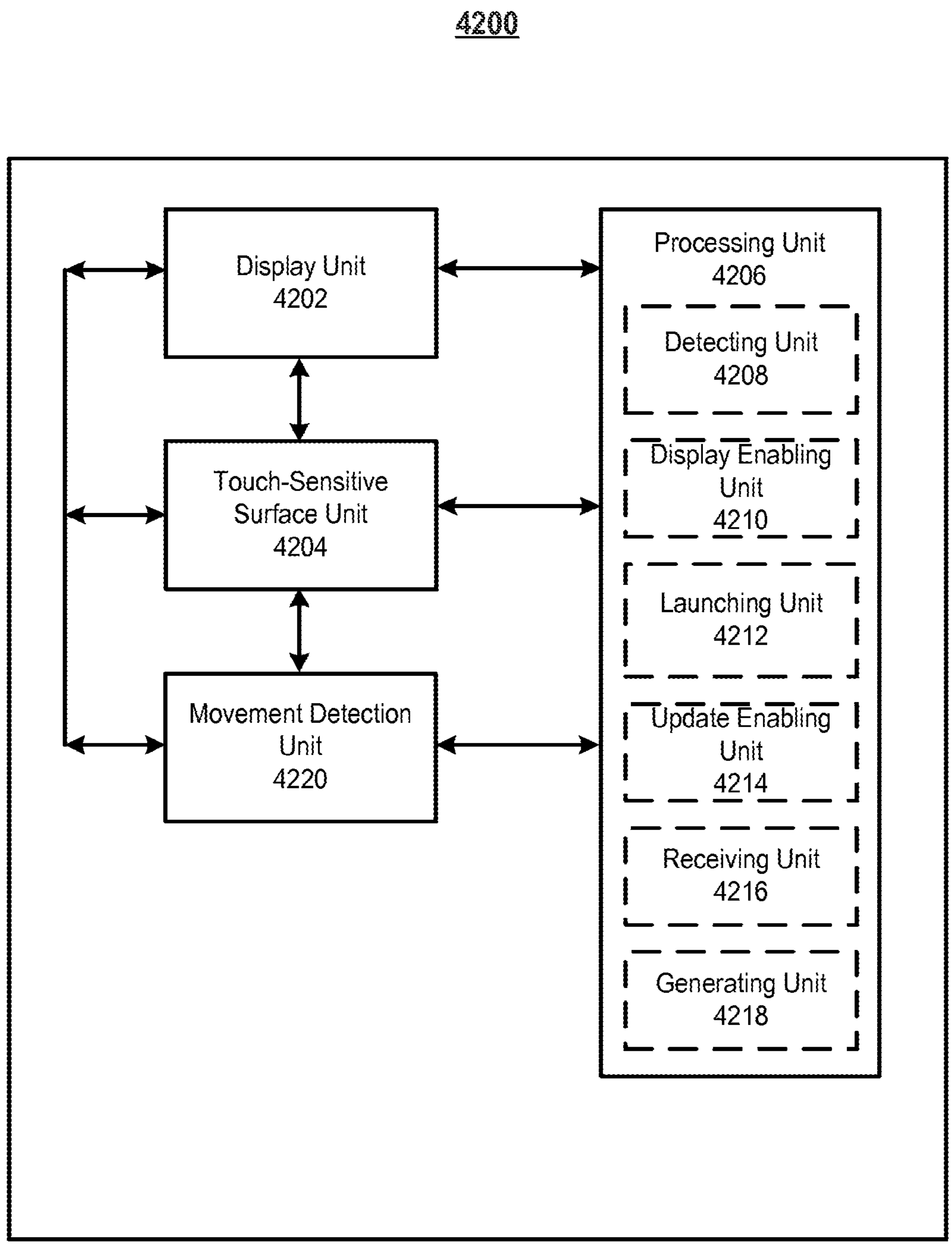
FIG. 42 is a functional block diagram of an electronic device in accordance with some embodiments.

In accordance with some embodiments, FIG. 42 shows an exemplary functional block diagram of an electronic device 4200 configured in accordance with the principles of the various described embodiments. In accordance with some embodiments, the functional blocks of electronic device 4200 are configured to perform the techniques described above. The functional blocks of the device 4200 are, optionally, implemented by hardware, software, or a combination of hardware and software to carry out the principles of the various described examples. It is understood by persons of skill in the art that the functional blocks described in FIG. 42 are, optionally, combined or separated into sub-blocks to implement the principles of the various described examples. Therefore, the description herein optionally supports any possible combination or separation or further definition of the functional blocks described herein.

As shown in FIG. 42, an electronic device 4200 includes a display unit 4202 configured to display a graphic user interface, optionally, a touch-sensitive surface unit 4204 configured to receive contacts, optionally, a movement detection unit 4220 configured to detect movement, and a processing unit 4206 coupled to the display unit 4202, optionally, the touch-sensitive surface unit 4204 and optionally, the movement detection unit 4220. In some embodiments, the processing unit 4206 includes a detecting unit 4208, a display enabling unit 4210, a launching unit 4212, an update enabling unit 4214, a receiving unit 4216, and a generating unit 4218.

The processing unit 4206 is configured to detect, by the movement detection unit (e.g., movement detection unit 4220), a user movement of the electronic device 4200; and, in response to detecting the movement: enable display (e.g., with display enabling unit 4210), on the display unit (e.g., display unit 4202), of an animated reveal of a clock face, wherein the animation comprises: enabling display (e.g., with display enabling unit 4210), on the display unit (e.g., display unit 4202), of an hour hand and a minute hand; and enabling display (e.g., with display enabling unit 4210), on the display unit (e.g., display unit 4202), of a first hour indication; and after displaying the first hour indication, enabling display (e.g., with display enabling unit 4210), on the display unit (e.g., display unit 4202), of a second hour indication, wherein the second hour indication is displayed on the clock face at a position after the first hour indication in a clockwise direction.

In some embodiments, the processing unit 4206 is further configured to: after enabling display (e.g., with display enabling unit 4210), on the display unit (e.g., display unit 4202), of the second hour indication, enable display (e.g., with display enabling unit 4210), on the display unit (e.g., display unit 4202), of a first minute indication; and enable display (e.g., with display enabling unit 4210), on the display unit (e.g., display unit 4202), of a second minute indication, wherein the second minute indication is displayed on the clock face at a position after the first minute indication in a clockwise direction. In some embodiments, the hour hand and the minute hand are displayed before the first hour indication. In some embodiments, the processing unit 4206 is further configured to: enable display (e.g., with display enabling unit 4210), on the display unit (e.g., display unit 4202), of an animated reveal of an outline of the clock face, wherein the outline of the clock face is animated to be displayed progressively in a clockwise direction. In some embodiments, after the animation, the clock face indicates a current time. In some embodiments, the processing unit 4206 is further configured to: enable display (e.g., with display enabling unit 4210), on the display unit (e.g., display unit 4202), of an affordance as a complication on the clock face, wherein the affordance represents an application; detect (e.g., with detecting unit 4208) a contact on the affordance on the touch-sensitive surface unit (e.g., touch-sensitive surface unit 4204), and in response to detecting the contact: launch (e.g., with launching unit 4212) the application represented by the affordance. In some embodiments, the processing unit 4206 is further configured to: enable update (e.g., with update enabling unit 4214), on the display unit (e.g., display unit 4202), of a color of the clock face, wherein updating the color comprises continuously changing the color of the clock face over time. In some embodiments, the color of the clock face is a background color of the clock face. In some embodiments, the clock face comprises a seconds hand, and the color of the clock face is a color of a seconds hand. In some embodiments, the processing unit 4206 is further configured to: detect (e.g., with detecting unit 4208), by the movement detection unit (e.g., movement detection unit 4220), a second user movement of the electronic device 4200; and, in response to detecting the second movement: enable display (e.g., with display enabling unit 4210), on the display unit (e.g., display unit 4202), of a second color of the clock face, wherein the second color is different from the first color; and enable update (e.g., with update enabling unit 4214), on the display unit (e.g., display unit 4202), of the second color of the clock face, wherein updating the second color comprises continuously changing the second color of the clock face over time. In some embodiments, the processing unit 4206 is further configured to: receive (e.g., with receiving unit 4216) data representing a name; and in response to receiving the data: generate (e.g., with generating unit 4218) a monogram; and enable display (e.g., with display enabling unit 4210), on the display unit (e.g., display unit 4202), of the monogram as a second affordance on the clock face.

The operations described above with reference to FIG. 27A are, optionally, implemented by components depicted in FIGS. 1A-1B or FIG. 42. For example, detecting operation 2702 and displaying operation 2704 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 43:
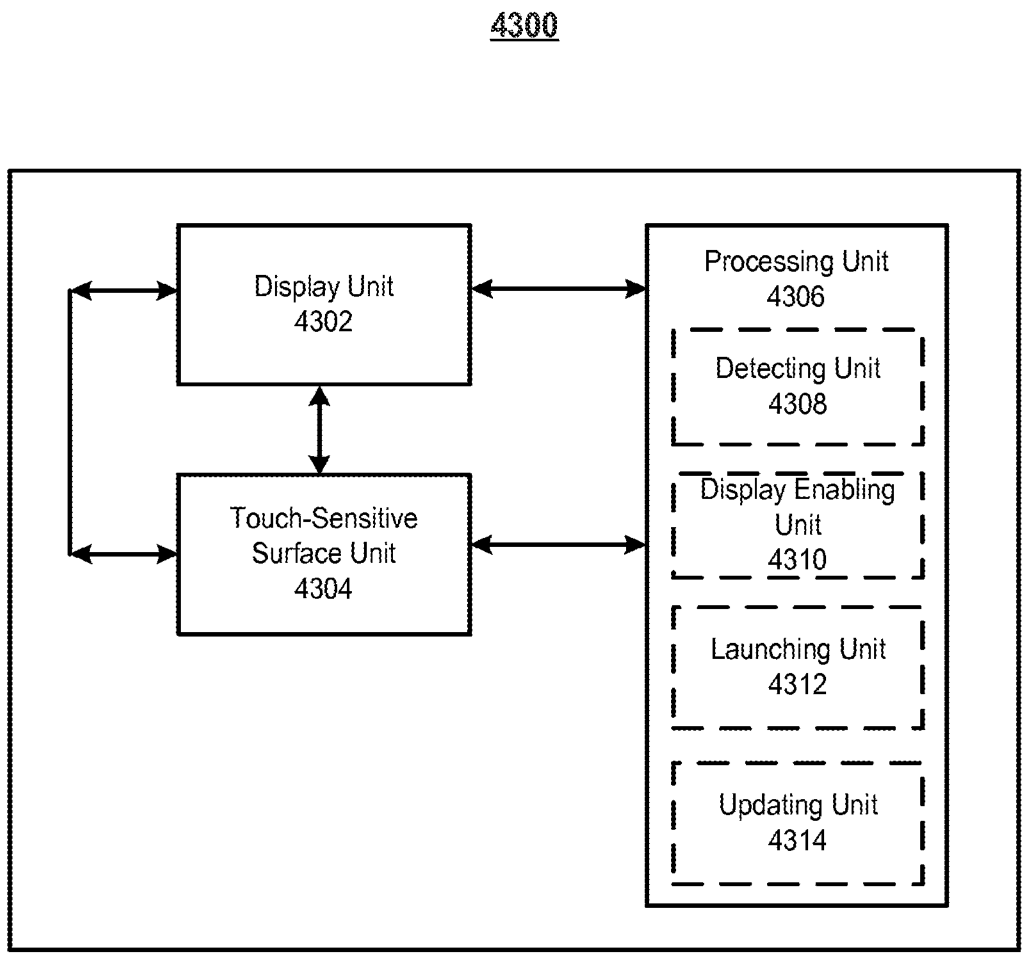
FIG. 43 is a functional block diagram of an electronic device in accordance with some embodiments.

In accordance with some embodiments, FIG. 43 shows an exemplary functional block diagram of an electronic device 4300 configured in accordance with the principles of the various described embodiments. In accordance with some embodiments, the functional blocks of electronic device 4300 are configured to perform the techniques described above. The functional blocks of the device 4300 are, optionally, implemented by hardware, software, or a combination of hardware and software to carry out the principles of the various described examples. It is understood by persons of skill in the art that the functional blocks described in FIG. 43 are, optionally, combined or separated into sub-blocks to implement the principles of the various described examples. Therefore, the description herein optionally supports any possible combination or separation or further definition of the functional blocks described herein.

As shown in FIG. 43, an electronic device 4300 includes a display unit 4302 configured to display a graphic user interface, optionally, a touch-sensitive surface unit 4304 configured to receive contacts, and a processing unit 4306 coupled to the display unit 4302, and optionally, the touch-sensitive surface unit 4304. In some embodiments, the processing unit 4306 includes a detecting unit 4308, a display enabling unit 4310, a launching unit 4312, and an updating unit 4314.

The processing unit 4306 is configured to enable display (e.g., with display enabling unit), on the display unit (e.g., display unit 4302), of a user interface screen, the user interface screen including: a clock face; and an affordance, wherein the affordance represents an application, wherein the affordance comprises a set of information obtained from the application, wherein the set of information is updated (e.g., with updating unit 4314) in accordance with data from the application, and wherein the affordance is displayed as a complication on the clock face; detect (e.g., with detecting unit 4308) a contact on the displayed affordance on the touch-sensitive surface unit (e.g., touch-sensitive surface 4304), and in response to detecting the contact: launch (e.g., with launching unit 4312) the application represented by the affordance.

The operations described above with reference to FIG. 32 are, optionally, implemented by components depicted in FIGS. 1A-1B or FIG. 43. For example, displaying operation 3202, detecting operation 3204, and launching operation 3206 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 44:
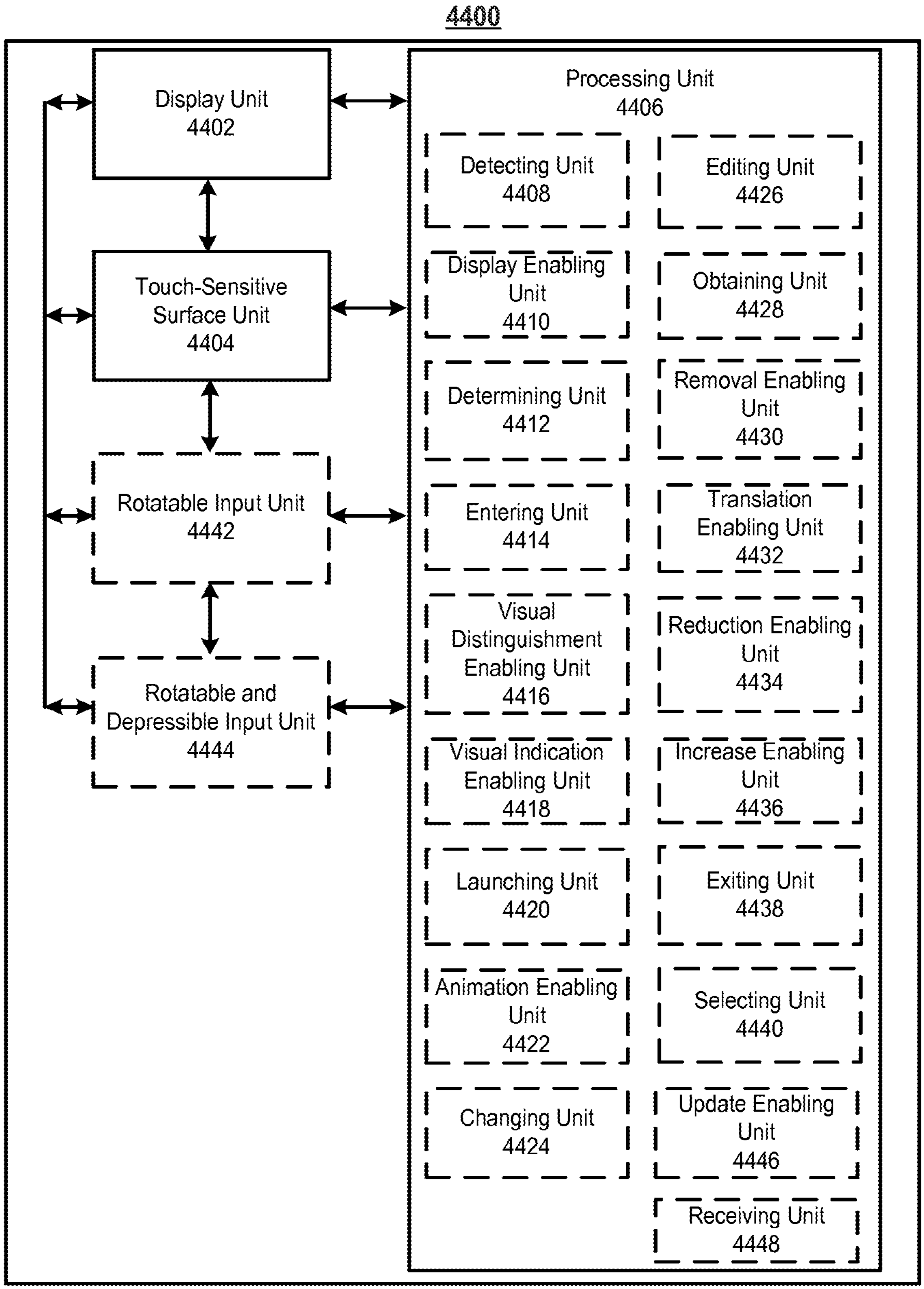
FIG. 44 is a functional block diagram of an electronic device in accordance with some embodiments.

In accordance with some embodiments, FIG. 44 shows an exemplary functional block diagram of an electronic device 4400 configured in accordance with the principles of the various described embodiments. In accordance with some embodiments, the functional blocks of electronic device 4400 are configured to perform the techniques described above. The functional blocks of the device 4400 are, optionally, implemented by hardware, software, or a combination of hardware and software to carry out the principles of the various described examples. It is understood by persons of skill in the art that the functional blocks described in FIG. 44 are, optionally, combined or separated into sub-blocks to implement the principles of the various described examples. Therefore, the description herein optionally supports any possible combination or separation or further definition of the functional blocks described herein.

As shown in FIG. 44, an electronic device 4400 includes a display unit 4402 configured to display a graphic user interface, optionally, a touch-sensitive surface unit 4404 configured to receive contacts and to detect intensity of contacts, optionally, a rotatable input unit 4442 configured to receive rotatable input (e.g., from a rotatable input mechanism), optionally, a rotatable and depressible input unit 4444 configured to receive rotatable and depressible input (e.g., from a rotatable and depressible input mechanism), and a processing unit 4206 coupled to the display unit 4202, optionally, the touch-sensitive surface unit 4204, optionally, the rotatable input unit 4442, and optionally, the rotatable and depressible input unit 4444. In some embodiments, the processing unit 4406 includes a detecting unit 4408, a display enabling unit 4410, a determining unit 4412, an entering unit 4414, a visual distinguishment enabling unit 4416, a visual indication enabling unit 4418, a launching unit 4420, an animation enabling unit 4422, a changing unit 4424, an editing unit 4426, an obtaining unit 4428, a removal enabling unit 4430, a translation enabling unit 4432, an exiting unit 4438, a reduction enabling unit 4434, an increase enabling unit 4436, a selecting unit 4440, an update enabling unit 4446, and a receiving unit 4448.

The processing unit 4406 is configured to enable display (e.g., with display enabling unit 4410), on the display unit (e.g., 4402), of a user interface screen including a clock face; detect (e.g., with detecting unit 4408) a contact on the touch-sensitive surface unit (e.g., 4404), the contact having a characteristic intensity, and in response to detecting the contact: determine (e.g., with determining unit 4412) whether the characteristic intensity is above an intensity threshold; and in accordance with a determination that the characteristic intensity is above the intensity threshold: enter (e.g., with entering unit 4414) a clock face edit mode of the electronic device; enable visual distinguishment (e.g., with visual distinguishment enabling unit 4416, on the display unit (e.g., display unit 4402), of the displayed clock face to indicate the clock face edit mode; and detect (e.g., with detecting unit 4408) a second contact on the touch-sensitive surface unit, wherein the second contact is on the visually distinguished displayed clock face, and in response to detecting the second contact: enable visual indication (e.g., with visual indication enabling unit 4418), on the display unit (e.g., display unit 4402), of an element of the clock face for editing.

In some embodiments, the clock face includes an affordance representing an application, wherein the contact is on the affordance representing the application on the touch-sensitive surface unit, and wherein the processing unit 4406 is further configured to: in accordance with a determination that the characteristic intensity is not above the intensity threshold: launch (e.g., with launching unit 4420) the application represented by the affordance. In some embodiments, enabling visual distinguishment (e.g., with visual distinguishment enabling unit 4416), on the display unit (e.g., display unit 4402), of the displayed clock face comprises reducing size of the displayed clock face. In some embodiments, enabling visual indication (e.g., with visual indication enabling unit 4418), on the display unit (e.g., display unit 4402), of the element of the clock face for editing comprises: enabling visual distinguishment enabling unit 4416), on the display unit (e.g., display unit 4402), of an outline around the element of the clock face. In some embodiments, the processing unit 4406 is further configured to: enable animation (e.g., with animation enabling unit 4422), on the display unit (e.g., 4402), of the outline around the element of the clock face to depict a rhythmic expansion and contraction of the outline. In some embodiments, visually indicating the element of the clock face for editing comprises: enabling animation (e.g., with animation enabling unit 4422), on the display unit (e.g., 4402), of the element of the clock face to depict a rhythmic expansion and contraction of the element of the clock face. In some embodiments, visually indicating the element of the clock face for editing comprises: enabling animation (e.g., with animation enabling unit 4422), on the display unit (e.g., 4402), of the element of the clock face to depict a flashing of the element of the clock face. In some embodiments, the processing unit 4406 is further configured to enable change (e.g., with changing unit 4424), on the display unit (e.g., 4402), of a color of the element of the clock face, and wherein visually indicating the element of the clock face for editing comprises: changing the color of the element of the clock face. In some embodiments, the electronic device further comprises a rotatable input unit (e.g., rotatable input unit 4442), wherein the processing unit 4406 is coupled to the rotatable input unit, and wherein the processing unit 4406 is further configured to: after entering the clock face edit mode: detect (e.g., with detecting unit 4408) a movement corresponding to a rotatable input from the rotatable input unit (e.g., rotatable input unit 4442), and in response to detecting the movement: edit (e.g., with editing unit 4426) an aspect of the visually indicated element of the clock face. In some embodiments, the processing unit 4406 is further configured to enable change (e.g., with changing unit 4424), on the display unit (e.g., 4402), of a color of the visually indicated element of the clock face, and wherein editing the aspect of the visually indicated element of the clock face comprises: enabling change (e.g., with changing unit 4424), on the display unit (e.g., display unit 4402), of the color of the visually indicated element of the clock face. In some embodiments, the processing unit 4406 is further configured to enable change (e.g., with changing unit 4424), on the display unit (e.g., 4402), of a color of the visually indicated element of the clock face, wherein the visually indicated element of the clock face is a clock face background, and wherein editing (e.g., with editing unit 4426) the aspect of the visually indicated element of the clock face comprises: enabling change (e.g., with changing unit 4424), on the display unit (e.g., display unit 4402), of a color of the clock face background. In some embodiments, the processing unit 4406 is further configured to enable change (e.g., with changing unit 4424), on the display unit (e.g., 4402), of a color of the visually indicated element of the clock face, wherein the clock face comprises a seconds hand, and wherein editing (e.g., with editing unit 4426) the aspect of the visually indicated element of the clock face comprises: enabling change (e.g., with changing unit 4424), on the display unit (e.g., display unit 4402) of a color of the seconds hand. In some embodiments, the clock face comprises an affordance representing an application, wherein the affordance is displayed, on the display unit (e.g., display unit 4402), as a complication on the clock face, wherein the affordance indicates a first set of information obtained from the application, and wherein editing (e.g., with changing unit 4424) the aspect of the visually indicated element of the clock face comprises enabling update (e.g., with updating unit 4446), on the display unit (e.g., display unit 4402), of the affordance to indicate a second set of information obtained from the application. In some embodiments, the clock face comprises an affordance representing an application, wherein the affordance is displayed as a complication on the clock face on the display unit, wherein the affordance indicates a set of information obtained from a first application, wherein editing the aspect of the visually indicated element of the clock face comprises enabling update (e.g., with updating unit 4446), on the display unit (e.g., display unit 4402), of the affordance to indicate a set of information obtained from a second application, and wherein the first and the second applications are different. In some embodiments, the clock face comprises a plurality of visible divisions of time, wherein the plurality comprises a first number of visible divisions of time, and wherein editing the aspect of the visually indicated element of the clock face comprises enabling change (e.g., with changing unit 4424), on the display unit, of the first number of visible divisions of time in the plurality to a second number of visible divisions of time in the plurality. In some embodiments, the second number is greater than the first number. In some embodiments, the second number is less than the first number. In some embodiments, the processing unit 4406 is further configured to: after entering the clock face edit mode: enable display (e.g., with display enabling unit 4410), on the display unit (e.g., 4402), of an indicator of position along a series of positions, the indicator indicating a first position along the series; and in response to receiving the data indicating the rotatable input of the rotatable input unit (e.g., rotatable input unit 4442): enable update (e.g., with update enabling unit 4446), on the display unit (e.g., display unit 4402), of the indicator of position to indicate a second position along the series. In some embodiments, the indicator of position along a series of positions indicates a position of a currently selected option for the editable aspect along a series of selectable options for the editable aspect of the visually indicated element of the clock face. In some embodiments, the indicator is displayed on the display at a position adjacent to the rotatable input unit. In some embodiments, the editable aspect of the visually indicated element of the clock face is color, and wherein the indicator comprises a series of colors, wherein each position in the series depicts a color, and wherein the color of the currently indicated position along the series is representative of the color of the visually indicated element. In some embodiments, the processing unit 4406 is further configured to: after visually indicating the element of the clock face for editing: detect (e.g., with detecting unit 4408) a third contact on the touch-sensitive surface unit (e.g., touch-sensitive surface unit 4404) at a second displayed element of the clock face, and in response to detecting the third contact: enable removal (e.g., with removal enabling unit 4430), on the display unit (e.g., display unit 4402), of the visual indication of the first element of the clock face for editing; and enable visual indication (e.g., with visual indication enabling unit 4418), on the display unit (e.g., display unit 4402), of the second element of the clock face for editing. In some embodiments, before detecting the third contact, the indicated first element of the clock face is indicated by an outline around the element, wherein enabling removal (e.g., with removal enabling unit 4430) of the visual indication of the first element comprises: enabling translation (e.g., with translation enabling unit 4432), on the display unit (e.g., display unit 4402), of the outline on-screen away from the first element. In some embodiments, enabling visual indication (e.g., with visual indication enabling unit 4418), on the display unit (e.g., display unit 4402), of the second element of the clock face for editing comprises: enabling translation (e.g., with translation enabling unit 4432), on the display unit (e.g., display unit 4402), of a visible outline on-screen towards from the second element; and enabling display (e.g., with display enabling unit 4410), on the display unit (e.g., 4402), of the visible outline around the second element, wherein the translating and the displaying comprise a continuous on-screen movement of the visible outline. In some embodiments, the processing unit 4406 is further configured to: after enabling visual indication (e.g., with visual indication enabling unit 4418), on the display (e.g., display unit 4402), of the first element of the clock face for editing, detect a swipe on the touch-sensitive surface unit, and in response to detecting the swipe: enable removal (e.g., with removal enabling unit 4430), on the display unit (e.g., display unit 4402), of the visual indication of the first element of the clock face for editing; enable visual indication (e.g., with visual indication enabling unit 4418), on the display unit (e.g., display unit 4402), of a second element of the clock face for editing; after visually indicating the second element of the clock face for editing, detect a user input, and in response to detecting the user input: edit (e.g., with editing unit 4426) a second aspect of the visually indicated second element of the clock face, wherein the second aspect of the second element is different from the first aspect of the first element of the clock face. In some embodiments, the processing unit 4406 is further configured to: enable display (e.g., with display enabling unit 4410), on the display unit (e.g., 4402), of a paging affordance on the user interface screen, wherein the paging affordance indicates an editable aspect of the currently indicated element of the clock face, a position of the editable aspect of the currently indicated element within a sequence of editable aspects, and a total number of editable aspects within the sequence of editable aspects. In some embodiments, the processing unit 4406 is further configured to: after entering the clock face edit mode of the electronic device: detect (e.g., with detecting unit 4408) a fourth contact on the touch-sensitive surface unit (e.g., touch-sensitive surface unit 4404), the fourth contact having a second characteristic intensity, and in response to detecting the fourth contact; determine (e.g., with determining unit 4412) whether the second characteristic intensity is above a second intensity threshold; and in accordance with a determination that the second characteristic intensity is above the second intensity threshold: exit (e.g., with exiting unit 4438) the clock face edit mode; and enable cessation, on the display unit (e.g., display unit 4402), of the visual distinguishment (e.g., enabling the cessation of the visual distinguishment with visual distinguishment unit 4416), on the display unit (e.g., display unit 4402), of the displayed clock face. In some embodiments, enabling visual distinguishment (e.g., with visual distinguishment unit 4416), on the display unit (e.g., display unit 4402), of the displayed clock face to indicate the clock face edit mode further comprises reducing a size of the displayed clock face, and wherein enabling cessation, on the display unit, of the visual distinguishment of the displayed clock face comprises enabling an increase (e.g., with increase enabling unit 4436), on the display unit (e.g., display unit 4402), of the size of the displayed clock face. In some embodiments, the electronic device further comprises a rotatable and depressible input unit (e.g., rotatable and depressible input unit 4444), wherein the processing unit 4406 is coupled to the rotatable and depressible input unit, and wherein the processing unit 4406 is further configured to: after entering the clock face edit mode of the electronic device: detect (e.g., with detecting unit 4408) a depression corresponding to a rotatable and depressible input from the rotatable and depressible input unit (e.g., rotatable and depressible input unit 4444), and in response to detecting the depression: exit (e.g., with exiting unit 4438) the clock face edit mode; and enable cessation, on the display unit, of the visual distinguishment (e.g., enabling the cessation of the visual distinguishment with visual distinguishment unit 4416), on the display unit (e.g., display unit 4402), of the displayed clock face. In some embodiments, enabling visual distinguishment, on the display unit, of the displayed clock face to indicate the clock face edit mode comprises: enabling a reduction (e.g., with reduction enabling unit 4434), on the display unit (e.g., display unit 4402), of a size of the displayed clock face, and wherein enabling cessation, on the display unit, of the visual distinguishment (e.g., enabling the cessation of the visual distinguishment with visual distinguishment unit 4416), on the display unit (e.g., display unit 4402), of the displayed clock face comprises: enabling an increase (e.g., with increase enabling unit 4436), on the display unit (e.g., display unit 4402), of the size of the displayed clock face. In some embodiments, the processing unit 4406 is further configured to: receive (e.g., with receiving unit 4448) a user input, and in response to receiving the user input: enter (e.g., with entering unit 4414) a color selection mode of the electronic device 4400; while in the color selection mode of the electronic device 4400, receive (e.g., with receiving unit 4448) data representing an image, and in response to receiving the data: select (e.g., with selecting unit 4440) a color of the image; and enable update (e.g., with update enabling unit 4446), on the display unit (e.g., display unit 4402), of the displayed clock face, wherein enabling update the displayed clock face comprises enabling change (e.g., with changing unit 4424), on the display unit (e.g., 4402), of a color of the clock face to the color of the image. In some embodiments, selecting the color of the image comprises selecting a color with greatest prevalence in the image.

The operations described above with reference to FIG. 28 are, optionally, implemented by components depicted in FIGS. 1A-1B or FIG. 44. For example, displaying operation 2802, detecting operation 2804, and determining operation 2806 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 45:
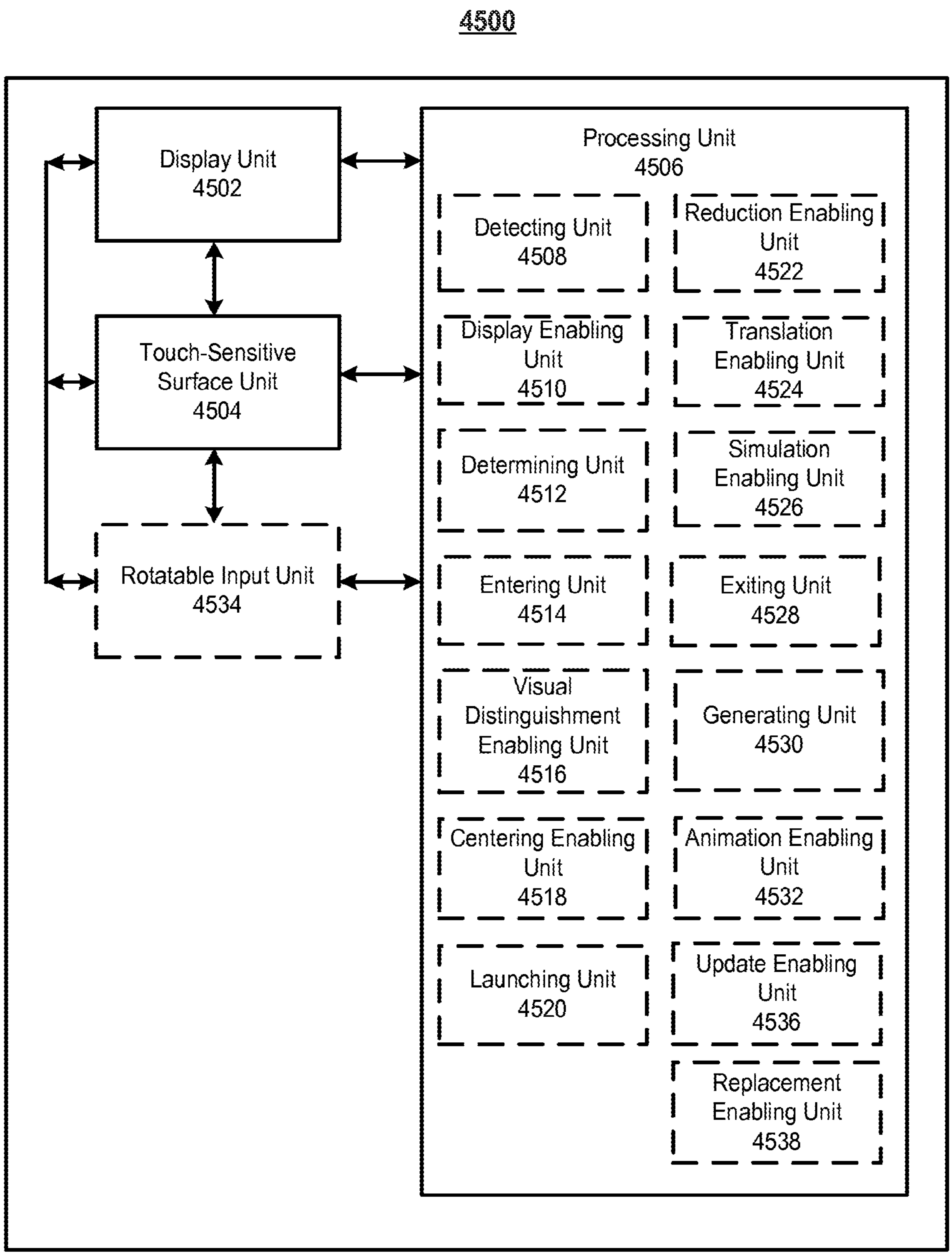
FIG. 45 is a functional block diagram of an electronic device in accordance with some embodiments.

In accordance with some embodiments, FIG. 45 shows an exemplary functional block diagram of an electronic device 4500 configured in accordance with the principles of the various described embodiments. In accordance with some embodiments, the functional blocks of electronic device 4500 are configured to perform the techniques described above. The functional blocks of the device 4500 are, optionally, implemented by hardware, software, or a combination of hardware and software to carry out the principles of the various described examples. It is understood by persons of skill in the art that the functional blocks described in FIG. 45 are, optionally, combined or separated into sub-blocks to implement the principles of the various described examples. Therefore, the description herein optionally supports any possible combination or separation or further definition of the functional blocks described herein.

As shown in FIG. 45, an electronic device 4500 includes a display unit 4502 configured to display a graphic user interface, optionally, a touch-sensitive surface unit 4504 configured to receive contacts and to detect intensity of contacts, optionally, a rotatable input unit 4534 configured to receive rotatable input (e.g., from a rotatable input mechanism), and a processing unit 4506 coupled to the display unit 4502, optionally, the touch-sensitive surface unit 4504, and, optionally, the rotatable input unit 4534. In some embodiments, the processing unit 4506 includes a detecting unit 4508, a display enabling unit 4510, a determining unit 4512, an entering unit 4514, a visual distinguishment enabling unit 4516, a centering enabling unit 4518, a launching unit 4520, a reduction enabling unit 4522, a translation enabling unit 4524, a simulation enabling unit 4526, an exiting unit 4528, a generating unit 4530, an animation enabling unit 4532, an update enabling unit 4536, and a replacement enabling unit 4538.

The processing unit 4506 is configured to enable display, on the display unit, on the touch-sensitive surface unit (e.g., touch-sensitive surface unit 4504) a user interface screen including a clock face; enable display (e.g., with display enabling unit 4510), on the display unit (e.g., display unit 4502), on the touch-sensitive surface unit (e.g., touch-sensitive surface unit 4504) a user interface screen including a clock face; detect a contact on the touch-sensitive surface unit (e.g., touch-sensitive surface unit 4504), the contact having a characteristic intensity, and in response to detecting the contact: determine (e.g., with determining unit 4512) whether the characteristic intensity is above an intensity threshold; and in accordance with a determination that the characteristic intensity is above the intensity threshold: enter (e.g., with entering unit 4514) a clock face selection mode of the electronic device; enable visual distinguishment (e.g., with visual distinguishment enabling unit 4516), on the display unit (e.g., display unit 4502), of the displayed clock face to indicate the clock face selection mode, wherein the displayed clock face is centered on the display; and detect (e.g., with detecting unit 4508) a swipe on the touch-sensitive surface unit (e.g., touch-sensitive surface unit 4504), and in response to detecting the swipe: enable centering (e.g., with centering enabling unit 4518), on the display unit (e.g., display unit 4502), of a second clock face.

In some embodiments, the clock face includes an affordance representing an application, wherein the contact is on the affordance representing the application on the touch-sensitive surface unit (e.g., touch-sensitive surface unit 4504), and the processing unit is further configured to: in accordance with a determination that the characteristic intensity is not above the intensity threshold: launch (e.g., with launching unit 4520) the application represented by the affordance. In some embodiments, visually distinguishing the displayed clock face to indicate the clock face selection mode comprises enabling reduction (e.g., with reduction enabling unit 4522), on the display unit (e.g., display unit 4502), of the size of the displayed clock face. In some embodiments, the first and the second clock faces are among a plurality of clock faces, the plurality including at least the first and the second clock face. In some embodiments, entering the clock face selection mode of the electronic device further comprises: enabling display (e.g., with display enabling unit 4510), on the display unit (e.g., display unit 4502), of at least the first and the second clock faces from the plurality of clock faces, wherein the displayed clock faces are shown at a reduced size and arranged in a sequence of clock faces, and wherein the clock faces in the sequence that are not currently centered are displayed in a partial view. In some embodiments, the second clock face is arranged after the first clock face in the sequence of clock faces, wherein enabling centering (e.g., with centering enabling unit 4518), on the display unit (e.g., display unit 4502), of the second clock face comprises: enabling translation (e.g., with translation enabling unit 4524), on the display unit (e.g., display unit 4502), of the first clock face on-screen; and enabling display (e.g., with display enabling unit 4510), on the display unit (e.g., display unit 4502), of a partial view of the first clock face. In some embodiments, centering the second clock face on the display comprises: enabling translation (e.g., with translation enabling unit 4524), on the display unit (e.g., display unit 4502), of the second clock face onto the displayed user interface screen; and enabling translation (e.g., with translation enabling unit 4524), on the display unit (e.g., display unit 4502), of the first clock face off of the displayed user interface screen. In some embodiments, enabling centering (e.g., with centering enabling unit 4518), on the display unit (e.g., display unit 4502), of the second clock face on the display comprises enabling simulation (e.g., with simulation enabling unit 4526), on the display unit (e.g., display unit 4502), of a movement of the second clock face towards the user on the display. In some embodiments, the processing unit is further configured to: after centering the second clock face on the display: detect (e.g., with detecting unit 4508) a contact on the displayed second clock face on the touch-sensitive surface unit (e.g., touch-sensitive surface unit 4504), and in response to detecting the contact: exit (e.g., with exiting unit 4528) the clock face selection mode; and enable display (e.g., with display enabling unit 4510), on the display unit (e.g., display unit 4502), of a second user interface screen including the second clock face. In some embodiments, the processing unit is further configured to: after entering the clock face selection mode: detect (e.g., with detecting unit 4508) a second swipe on the touch-sensitive surface unit (e.g., touch-sensitive surface unit 4504), and in response to detecting the second swipe: enable centering (e.g., with centering enabling unit 4518), on the display unit (e.g., display unit 4502), of a clock face generation affordance on the display; detect (e.g., with detecting unit 4508) a contact on the displayed clock face generation affordance, and in response to detecting the contact: generate (e.g., with generating unit 4530) a third clock face; and enable display (e.g., with display enabling unit 4510), on the display unit (e.g., display unit 4502), of the third clock face, wherein the third clock face is centered on the display. In some embodiments, the processing unit is further configured to: after entering the clock face selection mode, and before detecting the second swipe: enable display (e.g., with display enabling unit 4510), on the display unit (e.g., display unit 4502), of at least a partial view of the clock face generation affordance on the user interface screen. In some embodiments, the processing unit is further configured to: after entering the clock face selection mode: detect (e.g., with detecting unit 4508) a third swipe on the touch-sensitive surface unit (e.g., touch-sensitive surface unit 4504), and in response to detecting the third swipe: enable centering (e.g., with centering enabling unit 4518), on the display unit (e.g., display unit 4502), of a random clock face generation affordance on the display; detect (e.g., with detecting unit 4508) a contact on the displayed random clock face generation affordance on the touch-sensitive surface unit (e.g., touch-sensitive surface unit 4504), and in response to detecting the contact: generate (e.g., with generating unit 4530) a fourth clock face, wherein the fourth clock face is randomly generated; and enable display (e.g., with display enabling unit 4510), on the display unit (e.g., display unit 4502), of the fourth clock face, wherein the fourth clock face is centered on the display. In some embodiments, the fourth clock face is different from the first clock face, the second clock face, and the third clock face. In some embodiments, the processing unit is further configured to: after entering the clock face selection mode, and before detecting the third swipe: enable display (e.g., with display enabling unit 4510), on the display unit (e.g., display unit 4502), of at least a partial view of the random clock face generation affordance on the user interface screen. In some embodiments, enabling centering (e.g., with centering enabling unit 4518), on the display unit (e.g., display unit 4502), of the first clock face, the second clock face, the third clock face, or the fourth clock face further comprises: enabling visible distinguishment (e.g., with visual distinguishment enabling unit 4516), on the display unit (e.g., display unit 4502) of an outline around the centered clock face. In some embodiments, the processing unit is further configured to: enable animation (e.g., with animation enabling unit 4532), on the display unit (e.g., display unit 4502), of the outline around the centered clock face to depict a rhythmic expansion and contraction of the outline. In some embodiments, enabling centering (e.g., with centering enabling unit 4518), on the display unit (e.g., display unit 4502), of the first clock face, the second clock face, the third clock face, or the fourth clock face further comprises: enabling animation (e.g., with animation enabling unit 4532), on the display unit (e.g., display unit 4502), of the centered clock face to depict a rhythmic expansion and contraction of the centered clock face. In some embodiments, enabling centering (e.g., with centering enabling unit 4518), on the display unit (e.g., display unit 4502), of the first clock face, the second clock face, the third clock face, or the fourth clock face further comprises: enabling animation (e.g., with animation enabling unit 4532), on the display unit (e.g., display unit 4502), of the centered clock face to depict a flashing of the centered clock face. In some embodiments, the first clock face, the second clock face, the third clock face, or the fourth clock face is centered on the display unit (e.g., display unit 4502), the centered clock face comprises a representation of a first image, and the processing unit is further configured to: detect a contact (e.g., with detecting unit 4508) on the touch-sensitive surface unit (e.g., touch-sensitive surface unit 4504) on the displayed representation, and in response to detecting the contact on the displayed representation: enable display, on the display unit (e.g., display unit 4502), of a second user interface screen, the second user interface screen comprising: a background based on the first image; a first user interface object indicating a date; and a second user interface object indicating a time of day. In some embodiments, device 4500 further comprises a rotatable input unit (e.g., rotatable input unit 4534), the processing unit 4506 is coupled to the rotatable input unit (e.g., rotatable input unit 4534), and the processing unit is further configured to: while enabling display, on the display unit (e.g., display unit 4502), of the second user interface screen, detect a movement (e.g., with detecting unit 4508) of the rotatable input unit (e.g., rotatable input unit 4534) corresponding to a rotatable input from the rotatable and depressible input unit, wherein the movement is in a first direction of rotation, and in response to detecting the movement: enable display, on the display unit (e.g., display unit 4502), of a second image, wherein the second image is a cropped image based on the first image. In some embodiments, the processing unit is further configured to: detect a second contact (e.g., with detecting unit 4508) on the touch-sensitive surface unit (e.g., touch-sensitive surface unit 4504), the second contact having a second characteristic intensity, and in response to detecting the second contact: determine (e.g., with determining unit 4512) whether the second characteristic intensity is above a second intensity threshold; and in accordance with a determination that the second characteristic intensity is above the second intensity threshold: enable display (e.g., with display enabling unit 4510), on the display unit (e.g., display unit 4502), of a third user interface screen, the third user interface screen comprising: a second background based on the second image; a third user interface object indicating a date; and a fourth user interface object indicating a time of day. In some embodiments, the processing unit is further configured to: in accordance with a determination that the second characteristic intensity is not above the second intensity threshold: enable update (e.g., with update enabling unit 4536), on the display unit (e.g., display unit 4502), of the second image, wherein the update comprises one or more of: translating the second image on the display unit (e.g., display unit 4502); cropping the second image; or zooming the second image. In some embodiments, the processing unit is further configured to: while enabling display (e.g., with display enabling unit 4510), on the display unit (e.g., display unit 4502), of the second user interface screen, detect (e.g., with detecting unit 4508) a second movement of the rotatable input unit (e.g., rotatable input unit 4534) corresponding to a second rotatable input from the rotatable and depressible input unit, wherein the second movement is in a second direction of rotation different from the first direction of rotation, and in response to detecting the second movement: enable replacement (e.g., with replacement enabling unit 4538), on the display unit (e.g., display unit 4502), of the second user interface screen with a third user interface screen, the third user interface screen including two or more images. In some embodiments, the processing unit is further configured to: enable display (e.g., with display enabling unit 4510), on the display unit (e.g., display unit 4502), of a paging affordance on the user interface screen, wherein the paging affordance indicates the currently centered clock face, a position of the centered clock face within a sequence of clock faces, and a total number of clock faces within the sequence of clock faces.

The operations described above with reference to FIGS. 29-30 are, optionally, implemented by components depicted in FIGS. 1A-1B or FIG. 45. For example, displaying operation 2902, detecting operation 2904, and determining operation 2906 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 46:
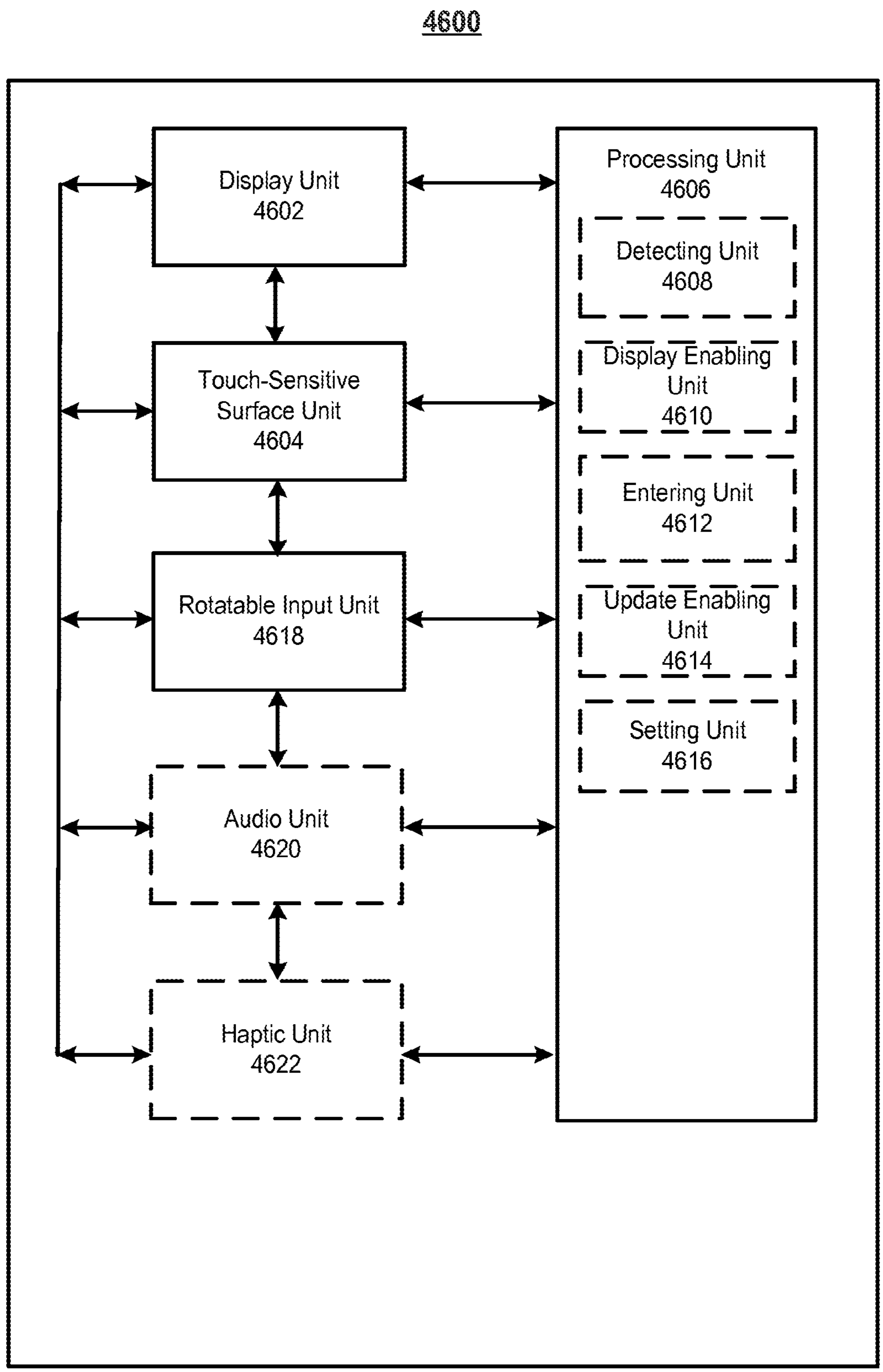
FIG. 46 is a functional block diagram of an electronic device in accordance with some embodiments.

In accordance with some embodiments, FIG. 46 shows an exemplary functional block diagram of an electronic device 4600 configured in accordance with the principles of the various described embodiments. In accordance with some embodiments, the functional blocks of electronic device 4600 are configured to perform the techniques described above. The functional blocks of the device 4600 are, optionally, implemented by hardware, software, or a combination of hardware and software to carry out the principles of the various described examples. It is understood by persons of skill in the art that the functional blocks described in FIG. 46 are, optionally, combined or separated into sub-blocks to implement the principles of the various described examples. Therefore, the description herein optionally supports any possible combination or separation or further definition of the functional blocks described herein.

As shown in FIG. 46, an electronic device 4600 includes a display unit 4602 configured to display a graphic user interface, optionally, a touch-sensitive surface unit 4604 configured to receive contacts, optionally, a rotatable input unit 4618 configured to receive rotatable input (e.g., from a rotatable input mechanism), optionally, an audio unit 4620 configured to generate audio, optionally, a haptic unit 4622 configured to generate haptic output, and a processing unit 4606 coupled to the display unit 4502, optionally, the touch-sensitive surface unit 4504, optionally, the rotatable input unit 4618, optionally, the audio unit 4620, and optionally, the haptic unit 4622. In some embodiments, the processing unit 4606 includes a detecting unit 4608, a display enabling unit 4610, an entering unit 4612, an update enabling unit 4614, and a setting unit 4616.

The processing unit 4606 is configured to enable display (e.g., with display enabling unit 4610), on the display unit (e.g., display unit 4602), of a user interface screen, the user interface screen including: a clock face; and an affordance on the clock face, the affordance indicating a first time of day; detect (e.g., with detecting unit 4608) a contact on the touch-sensitive surface unit (e.g., touch-sensitive surface unit 4604); and in response to detecting the contact: enter (e.g., with entering unit 4612) a user interaction mode of the electronic device; while the electronic device is in the user interaction mode, detect (e.g., with detecting unit 4608) a rotatable input from the rotatable input unit (e.g., rotatable input unit 4618), and in response to detecting the rotatable input: enable update (e.g., with update enabling unit 4614), on the display unit (e.g., display unit 4602), of the affordance to indicate a second time of day; detect (e.g., with detecting unit 4608) a second contact on the touch-sensitive surface unit (e.g., touch-sensitive surface unit 4604) at the affordance indicating the second time, and in response to detecting the second contact: set (e.g., with setting unit 4616) a user reminder for the second time of day.

In some embodiments, setting the user reminder for the second time of day comprises: enabling display (e.g., with display enabling unit 4610), on the display unit (e.g., display unit 4602), of a second affordance on the display, the second affordance representing a user prompt to set an alert for the second time of day. In some embodiments, the processing unit is further configured to enable display (e.g., with display enabling unit 4610), on the display unit (e.g., display unit 4602), of a visual alert for the second time of day, and wherein the user reminder for the third time of day comprises the visual alert for the second time of day. In some embodiments, the electronic device 4600 further comprises an audio unit (e.g., audio unit 4620), wherein the processing unit is coupled to the audio unit, and wherein the processing unit is further configured to enable an audio alert for the second time of day via the audio unit (e.g., with audio unit 4620), and wherein the user reminder for the third time of day comprises the audio alert for the second time of day. In some embodiments, the electronic device 4600 further comprises a haptic unit (e.g., haptic unit 4622), wherein the processing unit is coupled to the haptic unit, and wherein the processing unit is further configured to enable a haptic alert for the second time of day via the haptic unit (e.g., with haptic unit 4622), and wherein the user reminder for the second time of day comprises the haptic alert for the second time of day.

The operations described above with reference to FIG. 31 are, optionally, implemented by components depicted in FIGS. 1A-1B or FIG. 46. For example, displaying operation 3102, detecting operation 3104, and entering operation 3106 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 47:
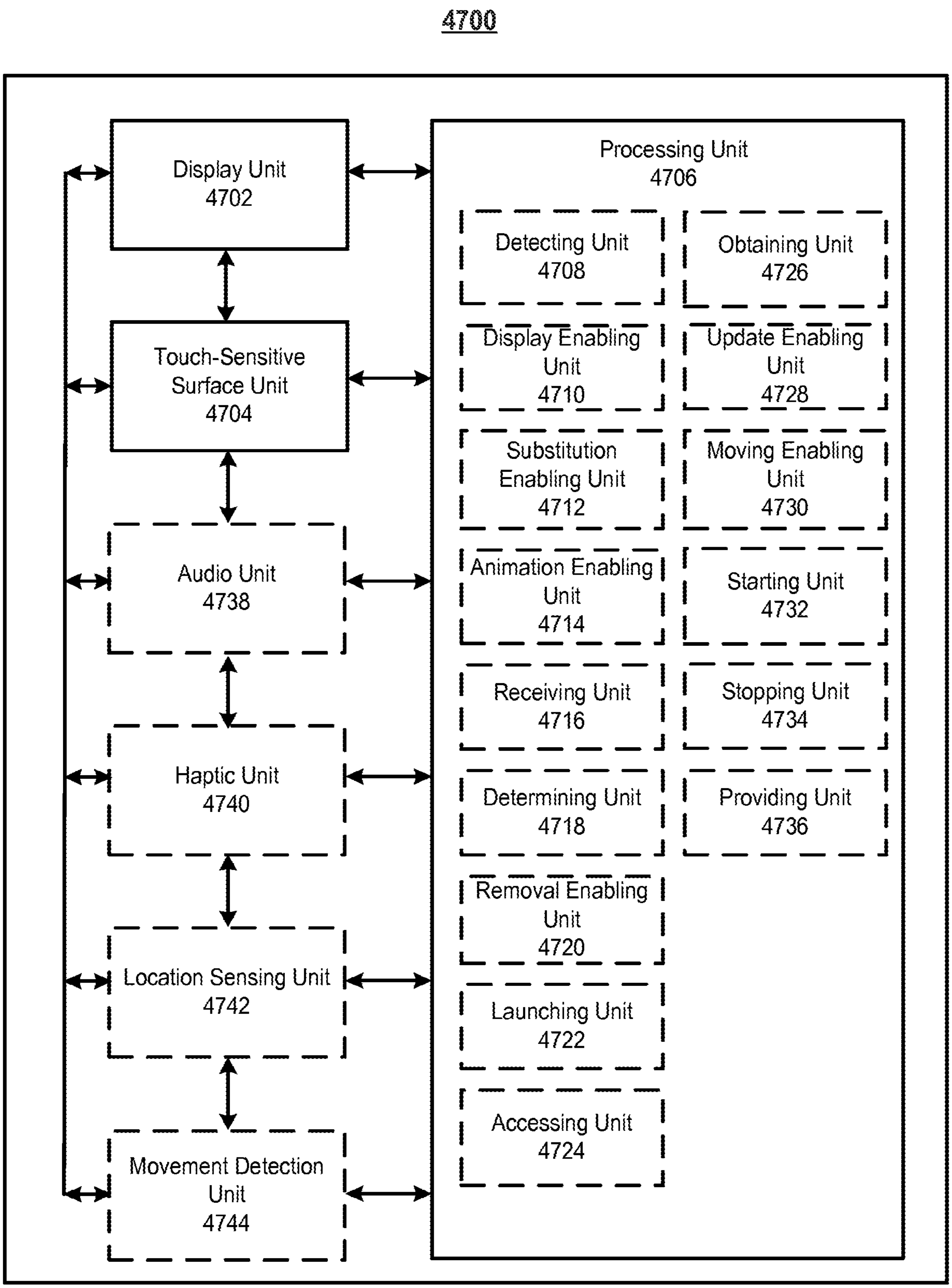
FIG. 47 is a functional block diagram of an electronic device in accordance with some embodiments.

In accordance with some embodiments, FIG. 47 shows an exemplary functional block diagram of an electronic device 4700 configured in accordance with the principles of the various described embodiments. In accordance with some embodiments, the functional blocks of electronic device 4700 are configured to perform the techniques described above. The functional blocks of the device 4700 are, optionally, implemented by hardware, software, or a combination of hardware and software to carry out the principles of the various described examples. It is understood by persons of skill in the art that the functional blocks described in FIG. 47 are, optionally, combined or separated into sub-blocks to implement the principles of the various described examples. Therefore, the description herein optionally supports any possible combination or separation or further definition of the functional blocks described herein.

As shown in FIG. 47, an electronic device 4700 includes a display unit 4702 configured to display a graphic user interface, optionally, a touch-sensitive surface unit 4704 configured to receive contacts, optionally, an audio unit 4738 configured to generate audio, optionally, a haptic unit 4740 configured to generate haptic output, optionally, a location sensing unit 4742 configured to sense location, optionally, a movement detection unit 4744, and a processing unit 4706 coupled to the display unit 4702, optionally, the touch-sensitive surface unit 4704, optionally, the audio unit 4738, optionally, the haptic unit 4740, optionally, the location sensing unit 4742, and optionally, the movement detection unit 4744. In some embodiments, the processing unit 4706 includes a detecting unit 4708, a display enabling unit 4710, a substitution enabling unit 4712, an animation enabling unit 4714, a receiving enabling unit 4716, a determining unit 4718, a removal enabling unit 4720, a launching unit 4722, an accessing unit 4724, an obtaining unit 4726, an update enabling unit 4728, a moving enabling unit 4730, a starting unit 4732, a stopping unit 4734, and a providing unit 4736.

The processing unit 4706 is configured to enable display (e.g., with display enabling unit 4710), on the display unit (e.g., display unit 4702), of a user interface screen, the user interface screen including a plurality of affordances, the plurality including a first affordance, wherein the first affordance indicates a clock face that includes: an indication of time; and an outline; detect (e.g., with detecting unit 4708) a contact on the displayed first affordance on the touch-sensitive surface unit (e.g., touch-sensitive surface unit 4704); and in response to detecting the contact: enable substitution (e.g., with substitution enabling unit 4712), on the display unit (e.g., display unit 4702), of the user interface screen with a second user interface screen, wherein the substitution comprises retaining one of the one or more of the indication of time and the outline, wherein the retained indication of time or outline is displayed on the second user interface screen at a size larger than on the first user interface screen.

In some embodiments, the processing unit 4706 is further configured to: enable animation (e.g., with animation enabling unit 4714), on the display unit (e.g., display unit 4702), of the one or more retained elements by progressively displaying the element on the second user interface screen. In some embodiments, the outline is retained, and wherein the outline is progressively displayed in a rotational motion.

In some embodiments, the processing unit 4706 is further configured to: receive (e.g., with receiving unit 4716) a notification; determine (e.g., with determining unit 4718) whether the notification has been missed; and in accordance with a determination that notification has been missed: enable display (e.g., with display enabling unit 4710), on the display unit (e.g., display unit 4702), of an affordance, the affordance indicating a missed notification. In some embodiments, an aspect of the displayed affordance represents a number of missed notifications received by the electronic device. In some embodiments, the processing unit 4706 is further configured to: receive data representing user viewing of the missed notification, and in response to receiving the data: enable removal (e.g., with removal enabling unit 4720), on the display unit (e.g., display unit 4702), of the affordance. In some embodiments, the processing unit 4706 is further configured to: enable display (e.g., with display enabling unit 4710), on the display unit (e.g., display unit 4702), of a stopwatch progress affordance, the stopwatch progress affordance indicating a currently running stopwatch application, wherein the stopwatch progress affordance comprises a representation of a digital stopwatch, and wherein the representation of the digital stopwatch is continuously updated (e.g., with update enabling unit 4728) to indicate a stopwatch time generated by the currently running stopwatch application; detect (e.g., with detecting unit 4708) a contact on the displayed stopwatch progress affordance, and in response to detecting the contact: launch (e.g., with launching unit 4722) the stopwatch application. In some embodiments, the electronic device comprises a location sensing unit (e.g., location sensing unit 4742), wherein the processing unit 4706 is coupled to the location sensing unit, and the processing unit 4706 is further configured to: while a clock face is displayed on the display unit, detect (e.g., with detecting unit 4708) a contact on the touch-sensitive surface unit (e.g., touch-sensitive surface unit 4704), and in response to detecting the contact: access (e.g., with accessing unit 4724) data representing a designated home location, the designated home location having an associated home time zone; obtain (e.g., with obtaining unit 4726) a current time zone of the electronic device from the location sensor; determine (e.g., with determining unit 4718) whether the current time zone is different from the home time zone; and in response to a determination that the current time zone is different from the home time zone: enable update (e.g., with update enabling unit 4728), on the display unit (e.g., display unit 4702), of the displayed clock face to indicate a current time at the home time zone. In some embodiments, the designated home location is user-designated. In some embodiments, the designated home location is a location designated by the system based on data representing one or more of: amount of time spent at the location; which times of day are spent at the location; and number of contact entries associated with the location stored on the electronic device. In some embodiments, the electronic device 4700 further includes a movement detection unit (e.g., movement detection unit 4744), the processing unit 4706 is coupled to the movement detection unit, and the processing unit 4706 is further configured to: enable display (e.g., with display enabling unit 4710), on the display unit (e.g., display unit 4702), of a clock face on the display, the displayed clock face comprising a plurality of pixels; detect (e.g., with detecting unit 4708) a movement of the electronic device 4700 via the movement detection unit (e.g., movement detection unit 4744); and in response to detecting the movement: enable moving (e.g., with moving enabling unit 4730), on the display unit (e.g., display unit 4702), of the displayed clock face on the display, wherein moving comprises modifying in appearance a subset of pixels in the plurality. In some embodiments, the processing unit 4706 is further configured to: enable display (e.g., with display enabling unit 4710), on the display unit (e.g., display unit 4702), of a tachymeter user interface object comprising a start/stop affordance; detect (e.g., with detecting unit 4708) a user input at a first time; in response to detecting the user input: start (e.g., with starting unit 4732) a virtual tachymeter; detect (e.g., with detecting unit 4708) a second user input at a second time, the second time separated from the first time by a tachymeter interval; in response to detecting the second user input: stop (e.g., with stopping unit 4734) the virtual tachymeter; and enable display (e.g., with display enabling unit 4710), on the display unit (e.g., display unit 4702), of a time value based on a number of units of time in a predetermined interval divided by the tachymeter interval. In some embodiments, the processing unit 4706 is further configured to: enable display (e.g., with display enabling unit 4710), on the display unit (e.g., display unit 4702), of a telemeter user interface object comprising a start/stop affordance; detect (e.g., with detecting unit 4708) a user input at a first time; in response to detecting the user input: start (e.g., with starting unit 4732) a virtual telemeter; detect (e.g., with detecting unit 4708) a second user input at a second time, the second time separated from the first time by a telemeter interval; in response to detecting the second contact: stop (e.g., with stopping unit 4734) the virtual telemeter; and enable display (e.g., with display enabling unit 4710), on the display unit (e.g., display unit 4702), of a distance based on the telemeter interval. In some embodiments, the processing unit 4706 is further configured to: enable display (e.g., with display enabling unit 4710), on the display unit (e.g., display unit 4702), of a repeated interval timer user interface; receive (e.g., with receiving unit 4716) data representing a user-designated time interval; and in response to receiving the data representing the user-designated time interval: provide (e.g., with providing unit 4736) a user alert, wherein the user alert is repeated at times based on the user-designated time interval. In some embodiments, the user alert comprises one or more of: a visual alert, enabled on the display unit (e.g., display unit 4702); an audio alert, wherein the electronic device further comprises an audio unit (e.g., audio unit 4738) coupled to the processing unit, and wherein the processing unit is further configured to enable an audio alert via the audio unit (e.g., audio unit 4738); and a haptic alert, wherein the electronic device further comprises a haptic unit (e.g., haptic unit 4740) coupled to the processing unit, and wherein the processing unit is further configured to enable a haptic alert via the haptic unit (e.g., haptic unit 4738).

The operations described above with reference to FIG. 33 are, optionally, implemented by components depicted in FIGS. 1A-1B or FIG. 47. For example, displaying operation 3302, detecting operation 3304, and substituting operation 3306 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 48:
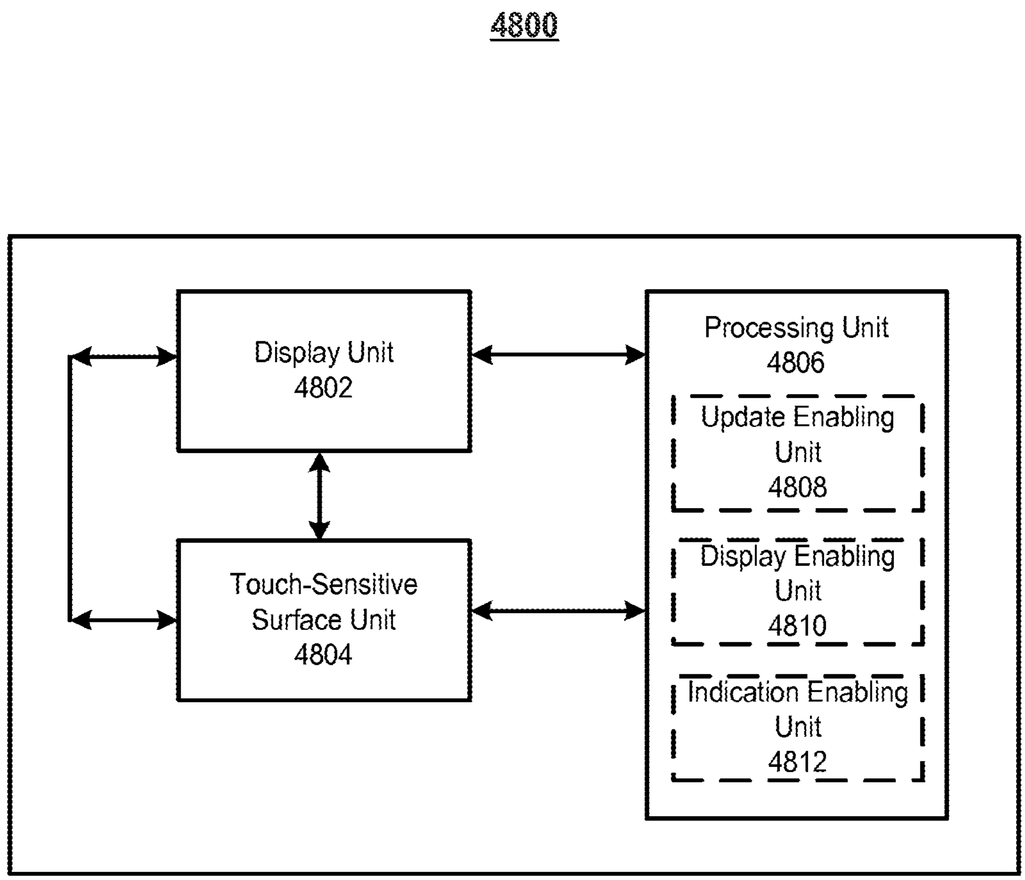
FIG. 48 is a functional block diagram of an electronic device in accordance with some embodiments.

In accordance with some embodiments, FIG. 48 shows an exemplary functional block diagram of an electronic device 4800 configured in accordance with the principles of the various described embodiments. In accordance with some embodiments, the functional blocks of electronic device 4800 are configured to perform the techniques described above. The functional blocks of the device 4800 are, optionally, implemented by hardware, software, or a combination of hardware and software to carry out the principles of the various described examples. It is understood by persons of skill in the art that the functional blocks described in FIG. 48 are, optionally, combined or separated into sub-blocks to implement the principles of the various described examples. Therefore, the description herein optionally supports any possible combination or separation or further definition of the functional blocks described herein.

As shown in FIG. 48, an electronic device 4800 includes a display unit 4802 configured to display a graphic user interface, optionally, a touch-sensitive surface unit 4804 configured to receive contacts, and a processing unit 4806 coupled to the display unit 4802, and optionally, the touch-sensitive surface unit 4804. In some embodiments, the processing unit 4806 includes an update enabling unit 4808, a display enabling unit 4810, and an indication enabling unit 4812.

The processing unit 4806 is configured to enable display (e.g., with display enabling unit 4810), on the display unit (e.g., display unit 4802), of a character user interface object, the character user interface object comprising representations of a first limb and a second limb, wherein the processing unit 4806 is configured to enable the character user interface object to indicate (e.g., with indication enabling unit 4812), on the display unit (e.g., display unit 4802), a first time by: enabling indication (e.g., with indication enabling unit 4812), on the display unit (e.g., display unit 4802), of a first hour with the first limb and a first minute with the second limb; and enable update (e.g., with update enabling unit 4808), on the display unit (e.g., display unit 4802), of the character user interface object to indicate a second time, wherein the processing unit is configured to enable the character user interface object to indicate (e.g., with indication enabling unit 4812), on the display unit (e.g., display unit 4802), the second time by: enabling indication (e.g., with indication enabling unit 4812), on the display unit (e.g., display unit 4802), of a second hour with the second limb and a second minute with the first limb.

In some embodiments, enabling update (e.g., with update enabling unit 4808), on the display unit (e.g., display unit 4802), of the character user interface object to indicate a second time comprises enabling an extension of the first limb and a retraction of the second limb on the display unit.

The operations described above with reference to FIG. 27B are, optionally, implemented by components depicted in FIGS. 1A-1B or FIG. 48. For example, displaying operation 2712, updating operation 2714, and the optional updating operation within block 2714 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 49:
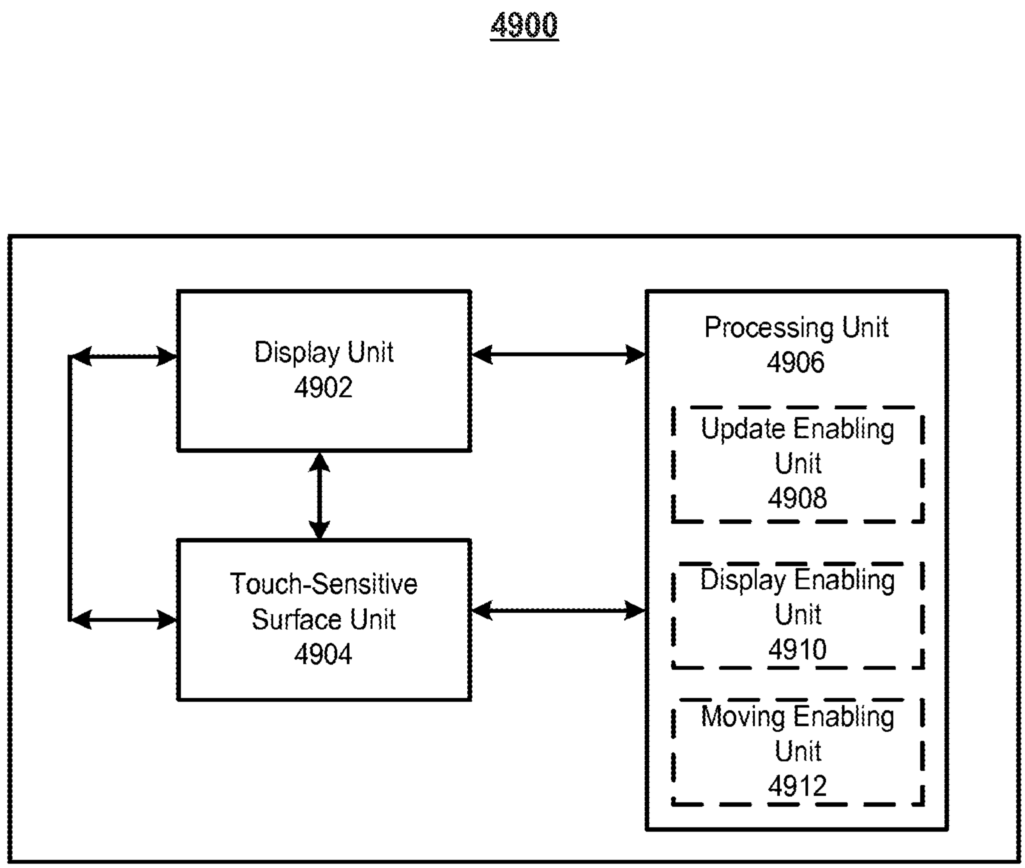
FIG. 49 is a functional block diagram of an electronic device in accordance with some embodiments.

In accordance with some embodiments, FIG. 49 shows an exemplary functional block diagram of an electronic device 4900 configured in accordance with the principles of the various described embodiments. In accordance with some embodiments, the functional blocks of electronic device 4900 are configured to perform the techniques described above. The functional blocks of the device 4900 are, optionally, implemented by hardware, software, or a combination of hardware and software to carry out the principles of the various described examples. It is understood by persons of skill in the art that the functional blocks described in FIG. 49 are, optionally, combined or separated into sub-blocks to implement the principles of the various described examples. Therefore, the description herein optionally supports any possible combination or separation or further definition of the functional blocks described herein.

As shown in FIG. 49, an electronic device 4900 includes a display unit 4902 configured to display a graphic user interface, optionally, a touch-sensitive surface unit 4904 configured to receive contacts, and a processing unit 4906 coupled to the display unit 4902, and optionally, the touch-sensitive surface unit 4904. In some embodiments, the processing unit 4906 includes an update enabling unit 4908, a display enabling unit 4910, and a moving enabling unit 4912.

The processing unit 4806 is configured to enable display (e.g., with display enabling unit 4910), on the display unit (e.g., display unit 4902), of a character user interface object on the display, the character user interface object comprising a representation of a limb, the limb including: a first endpoint of the limb having a first position, wherein the first endpoint of the limb is an axis of rotation for the limb, and a second endpoint of the limb having a second position, wherein the position of the second endpoint of the limb indicates a first time value; and enable update (e.g., with update enabling unit 4908), on the display unit (e.g., display unit 4902), of the character user interface object to indicate a second time value, wherein enabling update, on the display unit, of the character user interface object comprises enabling moving (e.g., with moving enabling unit 4912), on the display unit (e.g., display unit 4902), of the first endpoint of the limb to a third position, and moving the second endpoint of the limb to a fourth position to indicate the second time value.

In some embodiments, the character user interface object further comprises a representation of a second limb, the second limb including: a first endpoint of the second limb having a first position, wherein the first endpoint of the second limb is an axis of rotation for the second limb, and a second endpoint of the second limb having a second position, wherein the position of the second endpoint of the second limb indicates a third time value, and the processing unit is further configured to: enable update (e.g., with update enabling unit 4908), on the display unit (e.g., display unit 4902), of the character user interface object to indicate a fourth time value, wherein enabling update, on the display unit, of the character user interface object to indicate the fourth time value comprises enabling moving (e.g., with moving enabling unit 4912), on the display unit (e.g., display unit 4902), of the first endpoint of the second limb to a third position, and enabling moving (e.g., with moving enabling unit 4912), on the display unit (e.g., display unit 4902), of the second endpoint of the second limb to a fourth position to indicate the fourth time value.

The operations described above with reference to FIG. 27C are, optionally, implemented by components depicted in FIGS. 1A-1B or FIG. 49. For example, displaying operation 2722 and updating operation 2724 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 50:
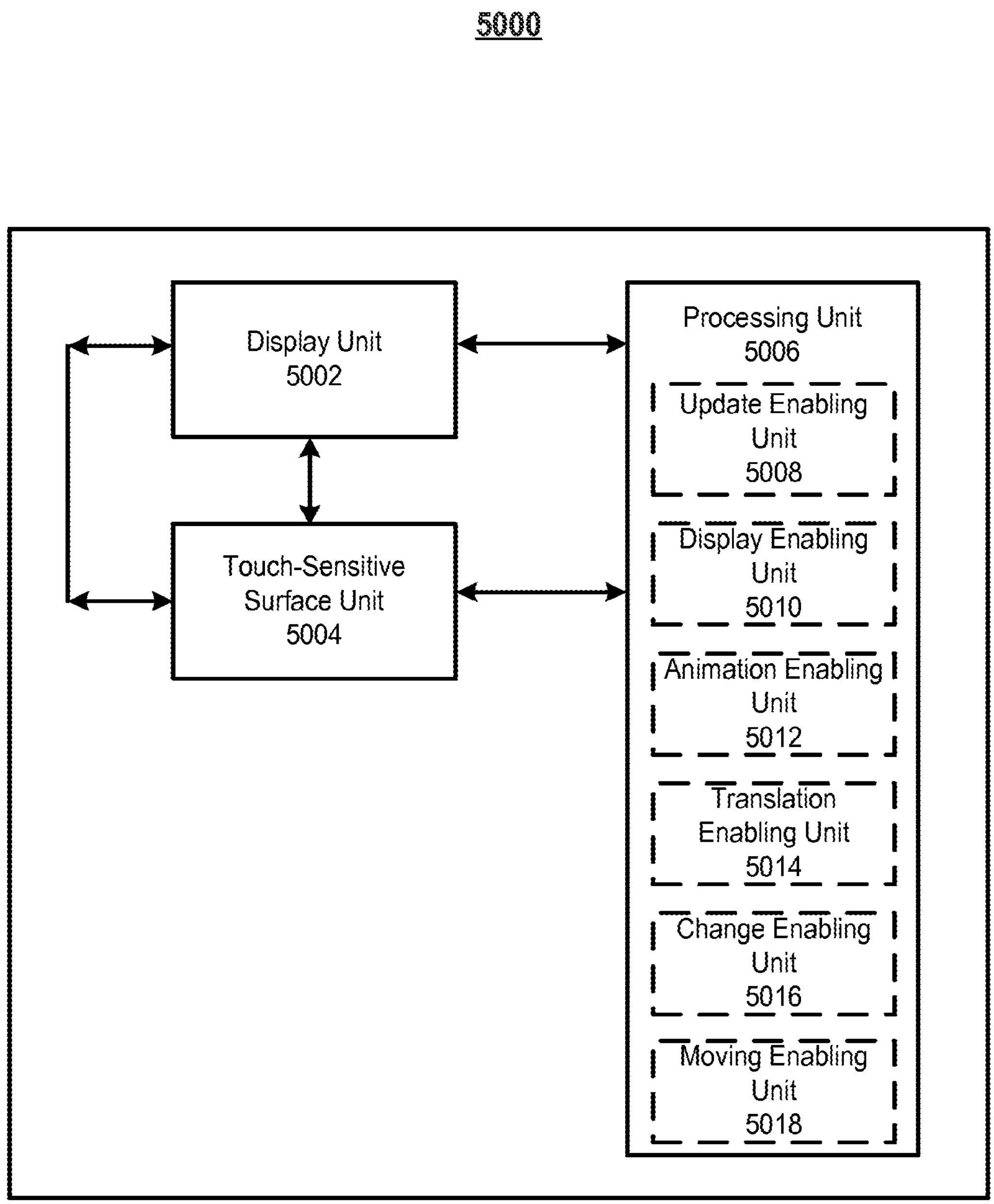
FIG. 50 is a functional block diagram of an electronic device in accordance with some embodiments.

In accordance with some embodiments, FIG. 50 shows an exemplary functional block diagram of an electronic device 5000 configured in accordance with the principles of the various described embodiments. In accordance with some embodiments, the functional blocks of electronic device 5000 are configured to perform the techniques described above. The functional blocks of the device 5000 are, optionally, implemented by hardware, software, or a combination of hardware and software to carry out the principles of the various described examples. It is understood by persons of skill in the art that the functional blocks described in FIG. 50 are, optionally, combined or separated into sub-blocks to implement the principles of the various described examples. Therefore, the description herein optionally supports any possible combination or separation or further definition of the functional blocks described herein.

As shown in FIG. 50, an electronic device 5000 includes a display unit 5002 configured to display a graphic user interface, optionally, a touch-sensitive surface unit 5004 configured to receive contacts, and a processing unit 5006 coupled to the display unit 5002, and optionally, the touch-sensitive surface unit 5004. In some embodiments, the processing unit 5006 includes an update enabling unit 5008, a display enabling unit 5010, an animation enabling unit 5012, a translation enabling unit 5014, a change enabling unit 5016, and a moving enabling unit 5018.

The processing unit 5006 is configured to enable display (e.g., with display enabling unit 5010), on the display unit (e.g., display unit 5002), of a character user interface object, the character user interface object comprising a representation of a limb, the limb including a first segment of the limb and a second segment of the limb, wherein the first segment of the limb connects a first endpoint of the limb to a joint of the limb, the first endpoint of the limb having a first position, and wherein the second segment of the limb connects a second endpoint of the limb to the joint of the limb, the second endpoint of the limb having a second position, wherein the joint of the limb is an axis of rotation for the second segment of the limb, and wherein the position of the second endpoint of the limb indicates a first time value; and enable update (e.g., with update enabling unit 5008), on the display unit (e.g., display unit 5002), of the character user interface object to indicate a second time value, wherein enabling update comprises enabling moving (e.g., with moving enabling unit 5018), on the display unit (e.g., display unit 5002), of the second endpoint of the limb along the axis of rotation for the second segment of the limb to a third position to indicate the second time.

In some embodiments, enabling update (e.g., with update enabling unit 5008), on the display unit (e.g., display unit 5002), of the character user interface object further comprises enabling moving (e.g., with moving enabling unit 5018), on the display unit (e.g., display unit 5002), of the first endpoint. In some embodiments, the character user interface object further comprises a representation of a second limb, the second limb including a first segment of the second limb and a second segment of the second limb, wherein the first segment of the second limb connects a first endpoint of the second limb to a joint of the second limb, the first endpoint of the second limb having a first position, wherein the second segment of the second limb connects a second endpoint of the second limb to the joint of the second limb, the second endpoint of the second limb having a second position, wherein the joint of the second limb is an axis of rotation for the second segment of the second limb, and wherein the position of the second endpoint of the second limb indicates a third time, and wherein the processing unit 5006 is further configured to: enable update (e.g., with update enabling unit 5008), on the display unit (e.g., display unit 5002), of the character user interface object to indicate a fourth time, wherein enabling update comprises enabling moving (e.g., with moving enabling unit 5018), on the display unit (e.g., display unit 5002), of the second endpoint of the second limb along the axis of rotation for the second segment of the second limb to a third position to indicate the fourth time value. In some embodiments, the first limb indicates an hour and the second limb indicates a minute. In some embodiments, the first limb indicates a minute and the second limb indicates an hour. In some embodiments, enabling update (e.g., with update enabling unit 5008), on the display unit (e.g., display unit 5002), of the character user interface object to indicate the second time further comprises: enabling animation (e.g., with animation enabling unit 5012), on the display unit (e.g., display unit 5002), of the character user interface object, wherein enabling animation, on the display unit, of the character user interface object comprises a motion of the first endpoint on-screen. In some embodiments, enabling update (e.g., with update enabling unit 5008), on the display unit (e.g., display unit 5002), of the character user interface object further comprises: enabling animation (e.g., with animation enabling unit 5012), on the display unit (e.g., display unit 5002), of the character user interface object, wherein enabling animation, on the display unit, of the character user interface object comprises a rotation of the second segment at the joint on-screen. In some embodiments, the processing unit is further configured to: enable translation (e.g., with translation enabling unit 5014), on the display unit (e.g., display unit 5002), of the character user interface object on-screen towards a center of the display. In some embodiments, enabling translation (e.g., with translation enabling unit 5014), on the display unit (e.g., display unit 5002), of the character user interface object comprises animating the character user interface object to represent walking. In some embodiments, the processing unit is further configured to: enable change (e.g., with change enabling unit 5016), on the display unit (e.g., display unit 5002), of a visual aspect of the display to highlight the character user interface object. In some embodiments, the processing unit is further configured to: enable animation (e.g., with animation enabling unit 5012), on the display unit (e.g., display unit 5002), of the character user interface object in response to being highlighted. In some embodiments, the character user interface object further comprises a representation of a foot. In some embodiments, the processing unit is further configured to: enable animation (e.g., with animation enabling unit 5012), on the display unit (e.g., display unit 5002), of the foot to indicate passage of time. In some embodiments, the first time and the second time are the same. In some embodiments, the processing unit is further configured to: enable display (e.g., with display enabling unit 5010), on the display unit (e.g., display unit 5002), of a numerical indication of a time value.

The operations described above with reference to FIG. 27D are, optionally, implemented by components depicted in FIGS. 1A-1B or FIG. 50. For example, displaying operation 2732 and updating operation 2734 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 51:
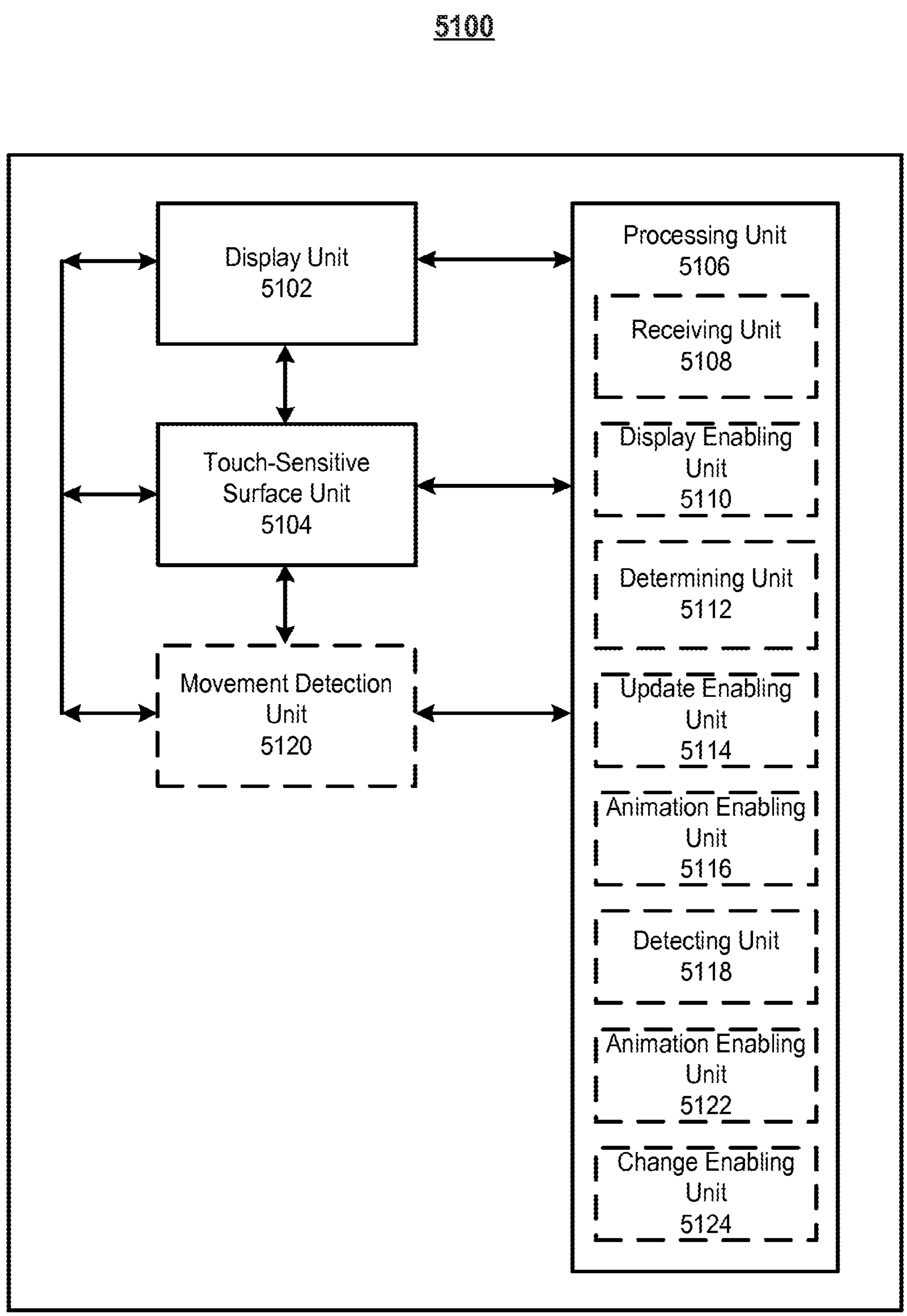
FIG. 51 is a functional block diagram of an electronic device in accordance with some embodiments.

In accordance with some embodiments, FIG. 51 shows an exemplary functional block diagram of an electronic device 5100 configured in accordance with the principles of the various described embodiments. In accordance with some embodiments, the functional blocks of electronic device 5100 are configured to perform the techniques described above. The functional blocks of the device 5100 are, optionally, implemented by hardware, software, or a combination of hardware and software to carry out the principles of the various described examples. It is understood by persons of skill in the art that the functional blocks described in FIG. 51 are, optionally, combined or separated into sub-blocks to implement the principles of the various described examples. Therefore, the description herein optionally supports any possible combination or separation or further definition of the functional blocks described herein.

As shown in FIG. 51, an electronic device 5100 includes a display unit 5102 configured to display a graphic user interface, optionally, a touch-sensitive surface unit 5104 configured to receive contacts, optionally, a movement detection unit 5120 configured to detect movement, and a processing unit 5106 coupled to the display unit 5102, optionally, the touch-sensitive surface unit 5104 and optionally, the movement detection unit 5120. In some embodiments, the processing unit 5106 includes a receiving unit 5108, a display enabling unit 5110, a determining unit 5112, an update enabling unit 5114, an animation enabling unit 5116, a detecting unit 5118, an animation enabling unit 5122, and a change enabling unit 5124.

The processing unit 5106 is configured to enable display (e.g., with display enabling unit 5110), on the display unit (e.g., display unit 5102), of a character user interface object, wherein the character user interface object indicates a current time; receive (e.g., with receiving unit 5108) first data indicative of an event; determine (e.g., with determining unit 5112) whether the event meets a condition; and in accordance with the determination that the event meets the condition: enable update (e.g., with update enabling unit 5114), on the display unit (e.g., display unit 5102), of the displayed character user interface object by changing (e.g., with change enabling unit 5124) a visual aspect of the character user interface object.

In some embodiments, after enabling update (e.g., with update enabling unit 5114), on the display unit (e.g., display unit 5102), of the displayed character user interface object, the character user interface object still indicates the current time. In some embodiments, after enabling update (e.g., with update enabling unit 5114), on the display unit (e.g., display unit 5102), of the displayed character user interface object, the character user interface object no longer indicates the current time. In some embodiments, the first data indicates a calendar event; the condition corresponds to a duration of the calendar event; and determining whether the event meets the condition comprises determining whether the current time is within the duration of the calendar event. In some embodiments, the calendar event is a birthday, and wherein enabling update (e.g., with update enabling unit 5114), on the display unit (e.g., display unit 5102), of the displayed character user interface object comprises enabling animation (e.g., with animation enabling unit 5122), on the display unit (e.g., display unit 5102), of the character user interface object to display a birthday greeting. In some embodiments, the calendar event is a holiday, and wherein updating the displayed character user interface object comprises enabling change (e.g., with change enabling unit 5124), on the display unit (e.g., display unit 5102), of a visual aspect of the character user interface object to reflect the holiday. In some embodiments, the first data indicates a notification, and wherein the processing unit is further configured to: enable display (e.g., with display enabling unit 5110), on the display unit (e.g., display unit 5102), of the notification on the display; and enable animation (e.g., with animation enabling unit 5122), on the display unit (e.g., display unit 5102), of the character user interface object to react to the displayed notification. In some embodiments, the first data indicates a time of day; the condition corresponds to a nighttime portion of the day; determining whether the event meets the condition comprises determining whether the time of day is within the nighttime portion of the day; and enabling update (e.g., with update enabling unit 5114), on the display unit (e.g., display unit 5102), of the displayed character user interface object comprises enabling change (e.g., with change enabling unit 5124), on the display unit (e.g., display unit 5102), of the visual aspect of the character user interface object to represent nighttime. In some embodiments, the first data indicates the current time; the condition corresponds to an hour on the hour; determining whether the event meets the condition comprises determining whether the current time is an hour on the hour; and enabling update (e.g., with update enabling unit 5114), on the display unit (e.g., display unit 5102), of the displayed character user interface object comprises enabling animation (e.g., with animation enabling unit 5122), on the display unit (e.g., display unit 5102), of the character user interface object to announce the hour on the hour for one or more hours. In some embodiments, the first data indicates current or forecasted weather; the condition corresponds to one or more designated weather conditions; determining whether the event meets the condition comprises determining whether the current or forecasted weather is one of the one or more designated weather conditions; and enabling update (e.g., with update enabling unit 5114), on the display unit (e.g., display unit 5102), of the displayed character user interface object comprises enabling change (e.g., with change enabling unit 5124), on the display unit (e.g., display unit 5102), of the visual aspect of the character user interface object to reflect the current or forecasted weather. In some embodiments, the first data indicates a second electronic device; the condition corresponds to a threshold proximity to the first electronic device; determining whether the event meets the condition comprises determining whether the second electronic device is within the threshold proximity to the first electronic device; and enabling update (e.g., with update enabling unit 5114), on the display unit (e.g., display unit 5102), of the displayed character user interface object comprises enabling animation (e.g., with animation enabling unit 5122), on the display unit (e.g., display unit 5102), of the character user interface object to react to the second electronic device. In some embodiments, the first data indicates user activity; the condition corresponds to a threshold interval after a previous user activity; determining whether the event meets the condition comprises determining whether the first data is received outside of the threshold interval after the previous user activity; and enabling update (e.g., with update enabling unit 5114), on the display unit (e.g., display unit 5102), of the displayed character user interface object comprises enabling animation (e.g., with animation enabling unit 5122), on the display unit (e.g., display unit 5102), of the character user interface object to reflect inactivity. In some embodiments, the first data indicates user activity; the condition corresponds to current user activity; determining whether the event meets the condition comprises determining whether the user activity is current user activity; and updating the displayed character user interface object comprises enabling animation (e.g., with animation enabling unit 5122), on the display unit (e.g., display unit 5102), of the character user interface object to represent exercise. In some embodiments, the first data indicates user movement of the device (e.g., from movement detection unit 5120); the condition corresponds to a threshold interval after a previous user movement of the device; determining whether the event meets the condition comprises determining whether the first data is received outside of the threshold interval after the previous user movement of the device (e.g., from movement detection unit 5120); and enabling update (e.g., with update enabling unit 5114), on the display unit (e.g., display unit 5102), of the displayed character user interface object comprises enabling animation (e.g., with animation enabling unit 5122), on the display unit (e.g., display unit 5102), of the character user interface object to represent fatigue. In some embodiments, the first data indicates user contact on the touch-sensitive surface unit (e.g., touch-sensitive surface unit 5104); the condition corresponds to a user contact on the displayed character user interface object; determining whether the event meets the condition comprises determining whether the user contact on the touch-sensitive surface unit is on the displayed character user interface object; and enabling update (e.g., with update enabling unit 5114), on the display unit (e.g., display unit 5102), of the displayed character user interface object comprises enabling animation (e.g., with animation enabling unit 5122), on the display unit (e.g., display unit 5102), of the character user interface object to react to the contact. In some embodiments, the processing unit 5106 is further configured to: detect (e.g., with detecting unit 5118) a user input; and in response to detecting the user input, enable display (e.g., with display enabling unit 5110), on the display unit (e.g., display unit 5102), of the character user interface object. In some embodiments, the user input comprises a user movement of the device, wherein the electronic device further comprises a movement detection unit (e.g., movement detection unit 5120), wherein the processing unit 5106 is coupled to the movement detection unit, and wherein the processing unit 5106 is further configured to: detect, by the movement detection unit (e.g., movement detection unit 5120), the user movement of the device 5100. In some embodiments, the user input comprises a contact on the touch-sensitive surface unit (e.g., touch-sensitive surface unit 5104), and wherein the processing unit 5106 is further configured to detect (e.g., with detecting unit 5118) the contact on the touch-sensitive surface unit.

The operations described above with reference to FIG. 27E are, optionally, implemented by components depicted in FIGS. 1A-1B or FIG. 51. For example, displaying operation 2742, receiving operation 2744, and determining operation 2746 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 52:
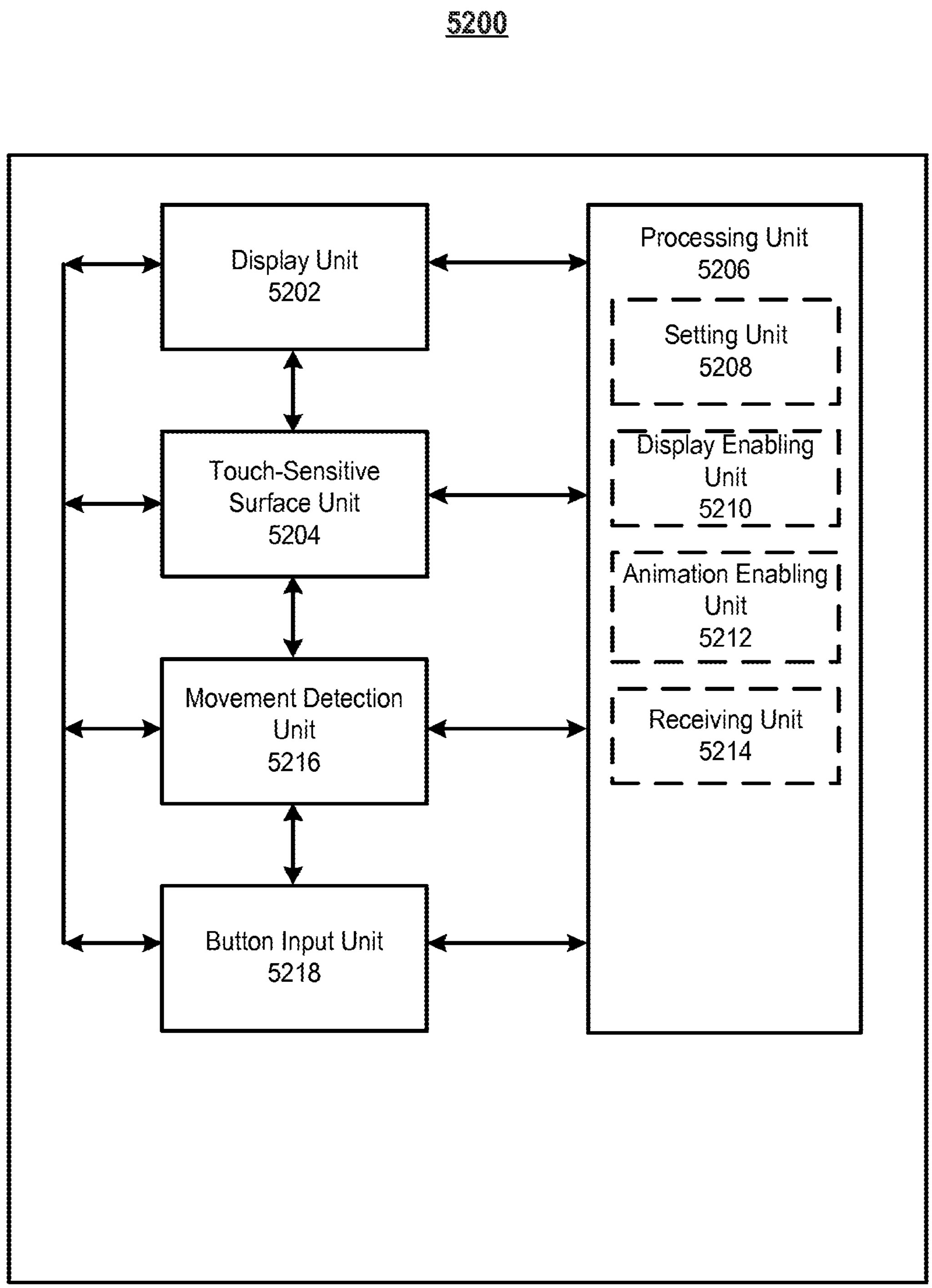
FIG. 52 is a functional block diagram of an electronic device in accordance with some embodiments.

In accordance with some embodiments, FIG. 52 shows an exemplary functional block diagram of an electronic device 5200 configured in accordance with the principles of the various described embodiments. In accordance with some embodiments, the functional blocks of electronic device 5200 are configured to perform the techniques described above. The functional blocks of the device 5200 are, optionally, implemented by hardware, software, or a combination of hardware and software to carry out the principles of the various described examples. It is understood by persons of skill in the art that the functional blocks described in FIG. 52 are, optionally, combined or separated into sub-blocks to implement the principles of the various described examples. Therefore, the description herein optionally supports any possible combination or separation or further definition of the functional blocks described herein.

As shown in FIG. 52, an electronic device 5200 includes a display unit 5202 configured to display a graphic user interface, optionally, a touch-sensitive surface unit 5204 configured to receive contacts, optionally, a movement detection unit 5216 configured to detect movement, optionally, a button input unit 5218 configured to receive input from a button, and a processing unit 5206 coupled to the display unit 5202, optionally, the touch-sensitive surface unit 5204, optionally, the movement detection unit 5216, and optionally, the button input unit 5218. In some embodiments, the processing unit 5206 includes a setting unit 5208, a display enabling unit 5210, an animation enabling unit 5212, and a receiving unit 5214.

The processing unit 5206 is configured to set (e.g., with setting unit 5208) the display unit (e.g., display unit 5202) to an inactive state; receive (e.g., with receiving unit 5214) first data indicative of an event; in response to receiving the first data: set (e.g., with setting unit 5208) the display unit (e.g., display unit 5202) to an active state; enable display (e.g., with display enabling unit 5210), on the display unit (e.g., display unit 5202), of a character user interface object on a side of the display; enable animation (e.g., with animation enabling unit 5212), on the display unit (e.g., display unit 5202), of the character user interface object towards a center of the display; and enable display (e.g., with display enabling unit 5210), on the display unit (e.g., display unit 5202), of the character user interface object at the center of the display in a position that indicates a current time.

In some embodiments, enabling animation (e.g., with animation enabling unit 5212), on the display unit (e.g., display unit 5202), of the character user interface object provides the impression of walking. In some embodiments, the electronic device 5200 includes a movement detection unit (e.g., movement detection unit 5216), wherein the movement detection unit is coupled to the processing unit 5206, and the processing unit 5206 is further configured to receive (e.g., with receiving unit 5214) input from the movement detection unit, and wherein the event includes a motion raising the electronic device 5200 into a viewing position. In some embodiments, the electronic device 5200 includes a button input unit (e.g., button input unit 5218), wherein the button input unit is coupled to the processing unit 5206, and the processing unit 5206 is further configured to receive input from the button input unit, and wherein the event includes a press on the button input unit on the device 5200. In some embodiments, the event includes a touch on the touch-sensitive surface (e.g., touch-sensitive surface unit 5204).

The operations described above with reference to FIG. 27F are, optionally, implemented by components depicted in FIGS. 1A-1B or FIG. 52. For example, setting operation 2752, receiving operation 2754, and setting operation 2756 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Attention is now directed toward embodiments of user interfaces and associated processes that may be implemented on an electronic device, such as device 100, 300, or 500.

FIGS. 53A-53F illustrate exemplary user interfaces. FIGS. 54A-54E are flow diagrams illustrating exemplary methods. The user interfaces in FIGS. 53C-53F are used to illustrate the processes in FIGS. 54A-54E.

FIGS. 53A-53F depict device 5300, which in some embodiments includes some or all of the features described with respect to devices 100, 300, and/or 500. In some embodiments, device 5300 has touch-sensitive and pressure-sensitive display 5302 (sometimes simply called a touch-screen). In some embodiments, device 5300 has rotatable and depressible input mechanism 5304. In some embodiments, device 5300 has depressible input mechanism 5306. Display 5302 and input mechanisms 5304 and 5306 may share some or all characteristics, respectively, with display 504 and input mechanisms 506 and 508.

In some embodiments, device 5300 includes an attachment mechanism for attaching, affixing, or connecting a device to a body part or to clothing of a user. In this manner, device 5300 may be considered a "wearable device," sometimes simply referred to as a "wearable." In the examples of FIGS. 53A and 53B, device 5300 may comprise a wrist strap (not pictured), which may be used to affix the device to the wrist of a user. In some embodiments, device 5300 takes the form factor of a "smart watch," a portable electronic device configured to be affixed by a strap to the wrist of a user.

Attention is now directed toward techniques for accessing and presenting information corresponding to past times and future times. In some embodiments, a user interface is configured to present information in the form of complications, which may be visually displayed user interface objects sharing any or all of the characteristics of complications discussed above in this disclosure.

In some embodiments, a user may access a "time scrubbing" mode or a "time travel" mode, and associated user interfaces. In "time scrubbing" or "time travel" mode, a user may advance or rewind a non-current time, also called a "scrubbing time." "Scrubbing" may refer to the action of progressing through time forward, or progressing through time backward. A user may "scrub forward" as he causes a scrubbing time to advance further into the future (as if fast-forwarding), and a user may "scrub backward" as he causes a scrubbing time to move further into the past (as if rewinding). Rather than corresponding to the current time of day (or to a time somewhere else in the world), the scrubbing time may be set in accordance with a user input. As the user sets and updates the scrubbing time (e.g., as the user scrubs), the information displayed in interfaces associated with time-scrubbing mode may be updated in accordance with the scrubbing time. Namely, the scrubbing time may be displayed on the time scrubbing interface, and a difference between the scrubbing time and the current time may be displayed on the time scrubbing interface. In some embodiments, an indicator of the difference between the current time and the scrubbing time is displayed. In some embodiments, one or more complications may be updated in accordance with the scrubbing time, such that the complications, while the device is in time-scrubbing mode, display information corresponding to the scrubbing time rather than information corresponding to the current time. In this way, the device may appear to "travel" through time as the scrubbing time advances into the future or rewinds into the past, and the displayed complications are updated accordingly. In some embodiments, the complications may display forecasted or predicted information corresponding to a scrubbing time in the future, and may display recorded or historical information corresponding to a scrubbing time in the past.

Features described can allow a user to use time-scrubbing mode to quickly, easily, and intuitively access past and future information corresponding to a plurality of displayed complications; the user may easily view information corresponding to more than one complication for the same point in the future or point in the past, and may appreciate the manner in which the information corresponding to different complications did or will interrelate by virtue of corresponding to the same scrubbing time. For example, a user may scrub forward in time to see that a calendar event later in the day corresponds to a forecasted thunderstorm; information which the user may not have appreciated if the user viewed the future event in a calendar application interface and the forecasted weather in a separate weather application interface.

Attention is now specifically directed to interfaces for time scrubbing a likeness of an analog clock face.

Figure 53A:
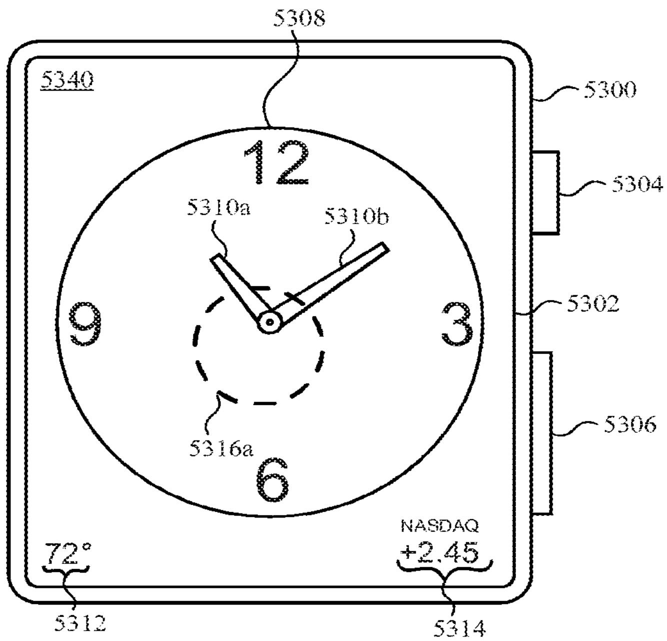
FIGS. 53A-53F illustrate exemplary user interfaces in accordance with some embodiments.

FIG. 53A depicts exemplary user interface 5340, displayed on display 5302 of device 5300. In some embodiments, user interface 5340 is a watch face interface screen, such as a home interface of a wearable smart-watch portable electronic device. Interface 5340 includes watch face 5308, which is a displayed likeness of an analog watch face. Watch face 5308 includes hour hand 5310*a* and minute hand 5310*b*. In some embodiments, watch face 5308 may further include a second hand. In FIG. 53A, hour hand 5310*a* and minute hand 5310*b* indicate that the current time is 11:09.

Interface 5340 further includes weather complication 5312, which is a complication configured to indicate weather data for a user-selected location. In some embodiments, weather complication 5312 may be associated with a weather application from which it draws weather data. In some embodiments, weather complication 5312 may be a selectable affordance, such that detection of a user input at a location on display 5302 corresponding to weather complication 5312 may cause an associated interface to be displayed, additional information to be displayed, or an associated application (e.g., a weather application) to be accessed or opened. In some embodiments, weather complication 5312 may display information about the temperature, the precipitation, the wind speed, the cloud cover, or any other relevant or useful weather information.

In some embodiments, weather complication 5312 may display information corresponding to present information, to future information (e.g., future scheduled events, predicted/forecasted information, etc.), or to past information (e.g., historical information, recorded events, past events, past predictions/forecasts, etc.). In the depicted example, weather complication 5312 is displaying current weather information, indicating that the current air temperature is 72°.

Interface 5340 further includes stock-market complication 5314, which is a complication configured to indicate stock-market data. In some embodiments, stock-market complication 5314 may be associated with a stock-market application from which it draws stock-market data. In some embodiments, stock-market complication 5314 may be a selectable affordance, such that detection of a user input at a location on display 5302 corresponding to stock-market complication 5314 may cause an associated interface to be displayed, additional information to be displayed, or an associated application (e.g., a stock-market application) to be accessed or opened. In some embodiments, stock-market complication 5314 may display information about one or more stocks, one or more markets or indexes, one or more portfolios, or any other relevant or useful stock-market information.

In some embodiments, stock-market complication 5314 may display information corresponding to present information or to past information (e.g., historical information, recorded events, past events, or past predictions/forecasts). In some embodiments, stock-market complication 5314 may be incapable of displaying information corresponding to future information, as future stock-market information may be un-knowable. In some embodiments, stock-market complication 5314 may be configured to display certain future information, such as scheduled future purchases or sales, scheduled future events (e.g., markets opening), or projected or predicted future stock market performances. In the depicted example, stock-market complication 5314 is displaying current stock-market information, indicating that the NASDAQ is up 2.45 points on the day.

FIG. 53A further depicts user input 5316*a*, which is a touch contact detected by touch-sensitive display 5302. Touch contact input 5316*a* may be a single-touch input, a multi-touch input, a single-tap input, and/or a multi-tap input detected by touch- and/or pressure-sensitive elements in display 5302. In the displayed example, input 5316*a* is a single-finger, single-tap input detected at a location on display 5302 corresponding to displayed watch face 5308. Device 5300 may be configured, in some embodiments, to, in response to detecting user input 5316*a* (or any other suitable predefined user input, including rotation of a rotatable input mechanism) activate a time-scrubbing mode.

Figure 53B:
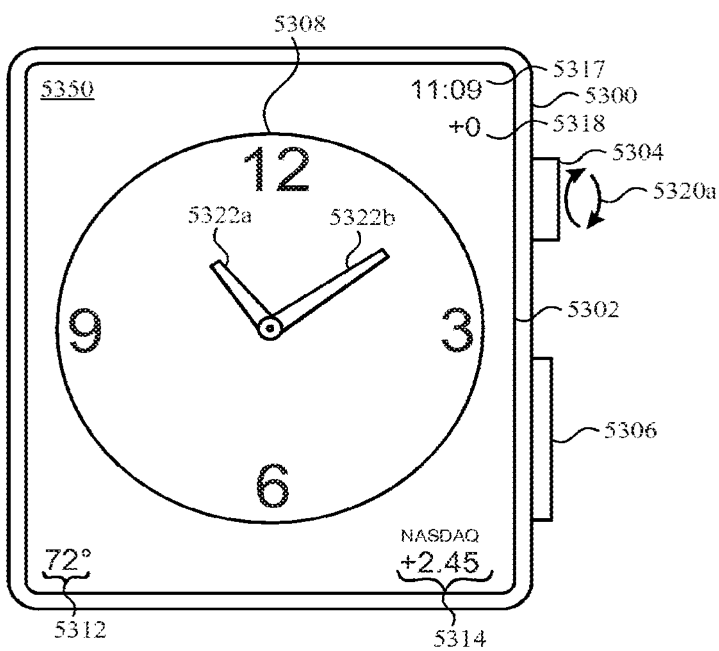

FIG. 53B depicts exemplary user interface 5350, displayed on display 5302 of device 5300. Exemplary user interface 5350 shows the manner in which, in some embodiments, device 5300 responds to the detection of input 5316*a* in FIG. 53A. Namely, user interface 5350 shows the activation, by device 5300, of a time-scrubbing mode and an associated time scrubbing interface in accordance with some embodiments.

In the depicted example, interface 5350 retains many of the same elements and features of interface 5340, including the same prominent watch face 5308, and the same complications 5312 and 5314. In some embodiments, the visual appearance of one or more of the elements of interface 5350 differs from the appearance of a corresponding or associated element in interface 5340, so as to indicate that time-scrubbing mode has been activated.

In some embodiments, time-scrubbing mode is a mode of operation of a device in which a user may indicate, by one or more user inputs, a time other than a current time. In accordance with the user's indication of a past or future time, a device may display an indication of the user's indicated time, and may update one or more user interface objects in accordance with the user's indicated time. The updated user interface objects, such as complications, affordances, icons, or the like, may be updated to show information that corresponds to the user's indicated time, which may be called a scrubbing time. Thus, in some embodiments, as a user "scrubs" forward or backward in time, the scrubbing time is continuously updated, and other information displayed on an interface is correspondingly continuously updated, such that the information displayed on the display continuously corresponds to the scrubbing time. In the depicted example of activating and using a time-scrubbing mode of FIGS. 53A-53C, described in greater detail below, a user uses a rotational user input to scrub forward in time from 11:09 (the current time) to 11:34 (a future scrubbing time). In accordance with the forward scrubbing, complications 5312 and 5314 are updated to correspond to the future scrubbing time, with weather complication 5312 displaying a forecasted air temperature and stock-market complication 5314 ceasing to be displayed (to indicate that future information is unavailable).

In the depicted example, interface 5350 differs from interface 5340 in that, in the place of clock hands 5310*a* and 5310*b*, interface 5350 includes scrubbing hour hand 5322*a* and scrubbing minute hand 5322*b*. In some embodiments, scrubbing hands may be displayed in place of or in addition to non-scrubbing hands (e.g., hands indicating the current time). In some embodiments, scrubbing hands may have the same visual appearance as current-time hands, or may have a different appearance from current-time hands. For example, scrubbing hands may be displayed in a different size, shape, color, highlighting, or animation style as current-time hands. In some embodiments, for example, current-time hands (e.g., hands 5310*a* and 5310*b* in FIG. 53A) may be displayed in white, while scrubbing hands (e.g., hands 5322*a* and 5322*b*) may be displayed in green.

In the depicted example, interface 5350 further differs from interface 5340 by including digital clock face 5317, which displays the current time (11:09). Interface 5350 further differs from interface 5340 by including time difference indicator 5318, which displays an indication of the difference between the current time and the scrubbing time. In the example shown, the scrubbing time is 11:09 and the current time is also 11:09, as the scrubbing time has not yet been moved away from the current time. Therefore, time difference indicator 5318 indicates that there is no difference between the current time and the scrubbing time by indicating a difference of "+0" minutes.

FIG. 53B further depicts rotational input 5320*a*, which is a rotational user input detected by rotational input mechanism 5304 of device 5300. Rotational user input 5320*a* may include one or more rotations of rotational input mechanism 5304, the one or more rotations each having one or more speeds, accelerations, directions, durations, and spacings relative to one another. The one or more rotations may together form a predefined rotation pattern constituting an input. In the depicted example, rotational input 5320*a* is a single rotation of rotatable input mechanism 5304 in a clockwise direction as defined if looking at the face of the rotatable input mechanism from in the plane of the page to the left of the figure. (That is, the illustrated direction of rotation is such that rotatable input mechanism 5304 is being rotated into the plane of the page in the z-axis direction at the top of rotatable input mechanism 5304, while it is being rotated out of the plane of the page in the z-axis direction at the bottom of rotatable input mechanism 5304.) In some embodiments, rotational input 5320*a* is an input for scrubbing forward to a future time.

Figure 53C:
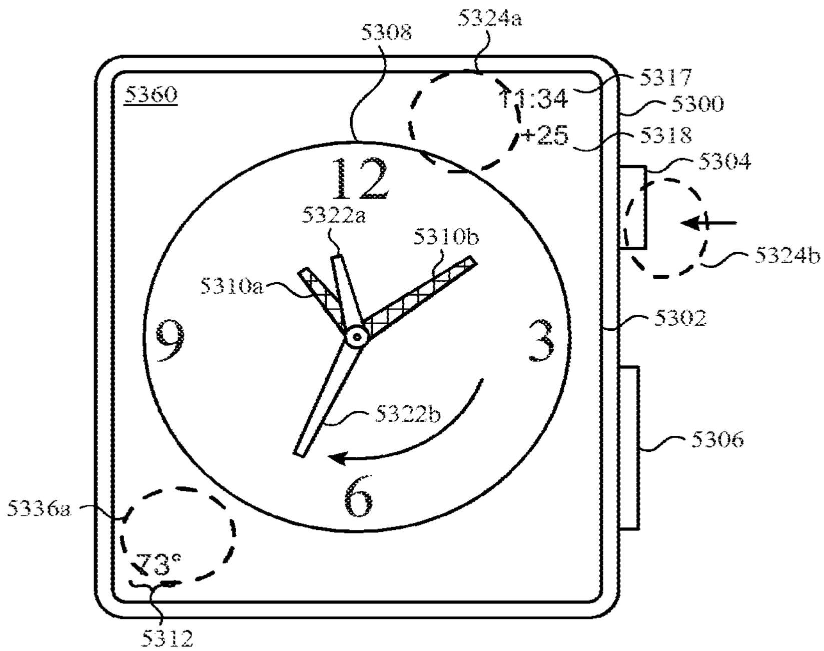

FIG. 53C depicts exemplary user interface 5360 displayed on display 5302 of device 5300. Exemplary user interface 5360 shows the manner in which, in some embodiments, device 5300 responds to the detection of input 5320*a* in FIG. 53B. Namely, user interface 5360 shows time scrubbing to a future time, by device 5300, and an associated interface in accordance with some embodiments. Specifically, interface 5360 depicts how watch face 5308 (and hands 5310*a*, 5310*b*, 5322*a*, and 5322*b*) and complications 5312 and 5314 are updated in accordance with time scrubbing.

First, in the depicted example, in accordance with user input 5320*a*, scrubbing hands 5322*a* and 5322*b* are moved forward to indicate the scrubbing time. In some embodiments, scrubbing hands may be moved continuously, smoothly, or regularly to match a rotational user input, such that the further and faster a rotational input rotates, the further and faster scrubbing hands may advance. In some embodiments, scrubbing hands may sweep from a previous position into a current position, simulating the appearance of watch hands sweeping into a new position as the watch is set to a new time by rotating a watch crown. In the depicted example, scrubbing hour hand 5322*a* and scrubbing minute hand 5322*b* have swept from their previous position in interface 5350 to their new position in interface 5360 (as indicated by the arced arrow showing the movement of scrubbing hour hand 5322*b*) in accordance with the detection of rotational user input 5320*a* in FIG. 53B.

Further, in the depicted example, as scrubbing hands 5322*a* and 5322*b* sweep forward as the scrubbing time is advanced into the future, hands 5310*a* and 5310*b*, which are current-time hands, are revealed in their place. In some embodiments, hands 5310*a* and 5310*b* are identical in appearance as they were in interface 5340 in FIG. 53A. In some embodiments, hands 5310*a* and 5310*b* are displayed in a manner to visually indicate that time-scrubbing mode is active, such as by visually distinguishing the hands 5310*a* and 5310*b* from their appearance when time-scrubbing mode was not active, such as by being displayed in a different size, shape, color, highlighting, or animation style. In the depicted embodiment, hands 5310*a* and 5310*b* are displayed in a white color before the activation of time-scrubbing mode, while they are displayed in a gray, partially translucent color in time-scrubbing mode; this gray translucent color is indicated by the hash pattern on hands 5310*a* and 5310*b* in FIG. 53C. In the depicted example, hands 5310*a* and 5310*b* are displayed as being "behind" scrubbing hands 5322*a* and 5322*b*, as shown by hour scrubbing hand 5322*a* occluding hour hand 5310*a* where the two hands partially overlap; this arrangement may help emphasize scrubbing hands while in time-scrubbing mode, as the scrubbing hands may be central to the functionality of time scrubbing and may correspond to other information displayed on a scrubbing interface.

Further, in the depicted example, digital clock face 5317 and time difference indicator 5318 have been updated in accordance with the scrubbing time. In the depicted example of interface 5360, digital clock face 5317 has been updated to indicate the new scrubbing time of 11:34, and time difference indicator has been updated to indicate the difference between the current time (11:09) and the scrubbing time (11:34) of "+25" minutes. In some embodiments, user interface objects such as digital clock face 5317 and time difference indicator 5318 may be continuously or intermittently updated as a user scrubs forward or backward in time. Updates may be displayed for each changing second, 15 seconds, minute, 5 minutes, hour, or the like. In some embodiments, one or more animations may be used to depict text or numerals changing as the user scrubs forward or backward in time. In some embodiments, text, numerals, or other characters or elements of a user interface object may be suddenly replaced by a new character as scrubbing is performed, such that the "09" in 11:09 would cease to be displayed and be immediately replaced by a "10." In some embodiments, one or more characters or other elements of a user interface object may transition by way of an animation; for example, old elements or characters may fade away by becoming increasingly translucent, may shrink in size, may translate in one or more directions, and/or may be displayed as "flipping" out of view to simulate the appearance of a flap-display, split-flap display, or arrival/departure board; new elements or characters may, for example, fade into view by becoming decreasingly translucent, may grow in size, may translate in one or more directions, and/or may be displayed as "flipping" into view to simulate the appearance of a flap-display, split-flap display, or arrival/departure board. In some embodiments, any of the animations described above or elsewhere in this disclosure may be reversed, such that an animation may be displayed in a first order when a user is scrubbing in a first direction, and the animation may be displayed in the opposite order (as if rewinding a video) when a user is scrubbing in the opposite direction.

Further, in the depicted example of FIG. 53C, complications 5312 and 5314 have been updated in accordance with the scrubbing to a future time, such that the displayed (or newly undisplayed) complications correspond to the displayed scrubbing time by displaying information related to the displayed scrubbing time. Complications may be updated in time-scrubbing mode such that the information displayed by the complication corresponds to the currently displayed scrubbing time, rather than the current time. An update to a complication may include, as compared to when the device was not in time-scrubbing mode or was scrubbed to a different scrubbing time, displaying different information, ceasing to display information, or beginning to display information after having ceased to display information.

For example, when a scrubbing time is a future time, displayed complications may display future scheduled events such as future calendar events, may display forecasted or projected information (such as a weather forecast) or may indicate a lack of availability of information corresponding to the future time. In the case of a lack of availability of information corresponding to a future time, a complication may affirmatively indicate that no information is available via displayed text or symbol, the complication may cease to be displayed to indicate that no information is available, or the complication may be "freeze" and/or be displayed in a manner so as to indicate that the information displayed in the frozen state does not correspond to the future time (e.g., a complication may be grayed out or faded out with the future-most available information displayed, if the complication is scrubbed so far into the future that no information for the scrubbing time is available).

When a scrubbing time is a past time, displayed complications may display past scheduled events such as a past calendar event, may display previously projected information such as a past weather forecast (e.g., in the absence of available historical data), or may indicate a lack of availability of information corresponding to the past time. In the case of a lack of availability of information corresponding to a past time, a complication may affirmatively indicate that no information is available via displayed text or symbol, the complication may cease to be displayed to indicate that no information is available, or the complication may be "freeze" and/or be displayed in a manner so as to indicate that the information displayed in the frozen state does not correspond to the past time (e.g., a complication may be grayed out or faded out with the oldest available information displayed, if the complication is scrubbed so far into the past that no information for the scrubbing time is available).

In some embodiments, a complication may cease to display information when no information is available for or relevant to a certain period of time. For example, if a complication relates to a daily performance of a stock index, then, as a user scrubs backwards through time, the complication may cease to display any information when the user scrubs to the early morning hours, or to a weekend, when the stock market was not open and no daily performance is considered relevant. As a user continues to scrub in the same direction, relevant information may again be displayed as the user scrubs through additional scrubbing times, such as reaching another period when the stock market was open and beginning to display a daily performance for the stock index for that day and time.

In the example depicted in FIG. 53C, a user is scrubbing forward in time (the current time being 11:09, as indicated by hands 5310*a* and 5310*b*) and has reached 11:34 (as indicated by digital clock face 5317 and scrubbing hands 5322*a* and 5322*b*) with a time offset of plus 25 minutes (as indicated by time difference indicator 5318). As the user has scrubbed forward in time by 25 minutes, weather complication 5312 has been updated to reflect a weather forecast for 25 minutes in the future, when it is predicted to be one degree warmer, at 73° rather than the current 72° (as indicated in interface 5350 in FIG. 53B). As the user has scrubbed forward in time by 25 minutes, stock-market complication 5314 has been updated to reflect the fact that information about the future performance of the NASDAQ is unavailable; the lack of information is conveyed by the stock-market complication 5314, as shown in interface 5350 in FIG. 53B, ceasing to be displayed in interface 5360 in FIG. 53C.

FIG. 53C further depicts user input 5336*a*, which is a touch contact detected by touch-sensitive display 5302. Touch contact input 5336*a* may be a single-touch input, a multi-touch input, a single-tap input, and/or a multi-tap input detected by touch- and/or pressure-sensitive elements in display 5302. In the displayed example, input 5336*a* is a single-finger, single-tap input detected at a location on display 5302 corresponding to displayed weather complication. In some embodiments, in response to detecting user input 5336*a*, device 5300 may provide additional information, additional interfaces, or additional modes corresponding to weather complication 5312. For example, device 5300 may launch a weather application associated with weather complication 5312. In some embodiments, device 5300 may provide additional information, additional interfaces, or additional modes corresponding to a selected complication and to the scrubbing time. For example, in response to a user tapping a weather complication when the device is scrubbed to a past time, an interface of a weather application showing historical weather data for the scrubbed-to past time may be displayed; in response to a user tapping a weather complication when the device is scrubbed to a future time, an interface of a weather application showing forecasted weather for the scrubbed-to future time may be displayed. In the depicted example, in response to detecting user input 5336*a*, device 5300 may provide current weather information (because the scrubbing time is so close to the present, e.g., below a predefined threshold amount of time into the future) in some embodiments, or it may provide forecasted weather information associated with the scrubbing time of 11:34 in some embodiments.

FIG. 53C further depicts user inputs 5324*a* and 5324*b*, both of which are user inputs configured to cause device 5300 to exit time-scrubbing mode and return to a non-time-scrubbing interface. In some embodiments, any suitable user input may be predetermined to cause a device to exit time-scrubbing mode. In the depicted example, user input 5324*a* is a touch contact detected on display 5302. In some embodiments, user input 5324*a* may be a single-touch input, a multi-touch input, a single-tap input, and/or a multi-tap input detected by touch- and/or pressure-sensitive elements in display 5302. In some embodiments, user input 5324*a* is a single-tap input detected at a location corresponding to digital clock face 5317 and/or time difference indicator 5318. In the depicted example, user input 5324*b* is a depression input detected by rotatable and depressible input mechanism 5304. In some embodiments, user input 5324*b* may be a single-press input or a multi-press input detected by a rotatable and depressible input mechanism. In some embodiments, user input 5324*b* is a single-press input detected by depressible and rotatable input mechanism 5304.

In response to detecting either user input 5324*a* or 5324*b*, or any other suitable predetermined user input, device 5300 may cause time-scrubbing mode to be ceased and may cease to display time scrubbing interfaces. In some embodiments, updated complications may return to their original appearance before time-scrubbing mode was engaged, or may change to an appearance corresponding to a new current time other than the current time that was current when time-scrubbing mode was engaged. In some embodiments, indications that time-scrubbing mode is active, such as digital clock face 5317, time difference indicator 5318, and scrubbing hands 5322*a* and 5322*b* may cease to be displayed. In some embodiments, hands corresponding to a current time, such as hands 5310*a* and 5310*b*, may return to their original visual appearance and style from before time-scrubbing mode was engaged. Any of these changes may be made by way of any of the animations described above, including a reversed and/or accelerated version of any such animation. In the depicted example, in response to detecting user input 5324*a* or 5324*b*, device 5300 ceases to display user interface 5360 and displays user interface 5340 again; user interface 5340 indicates that the current time is still 11:09 and that the information corresponding to both weather complication 5312 (72°) and stock-market complication 5314 (NASDAQ+2.45) has not changed since time-scrubbing mode was activated.

Attention is now specifically directed to interfaces for time scrubbing a digital clock face. In the depicted example of activating and using a time-scrubbing mode of FIGS. 53D-53F, described in greater detail below, a user uses a rotational user input to scrub forward in time from 11:09 (the current time) to 11:34 (a future scrubbing time). In accordance with the forward scrubbing, complications 5312 and 5314 are updated to correspond to the future scrubbing time, with weather complication 5312 displaying a forecasted air temperature and stock-market complication 5314 ceasing to be displayed (to indicate that future information is unavailable).

Figure 53D:
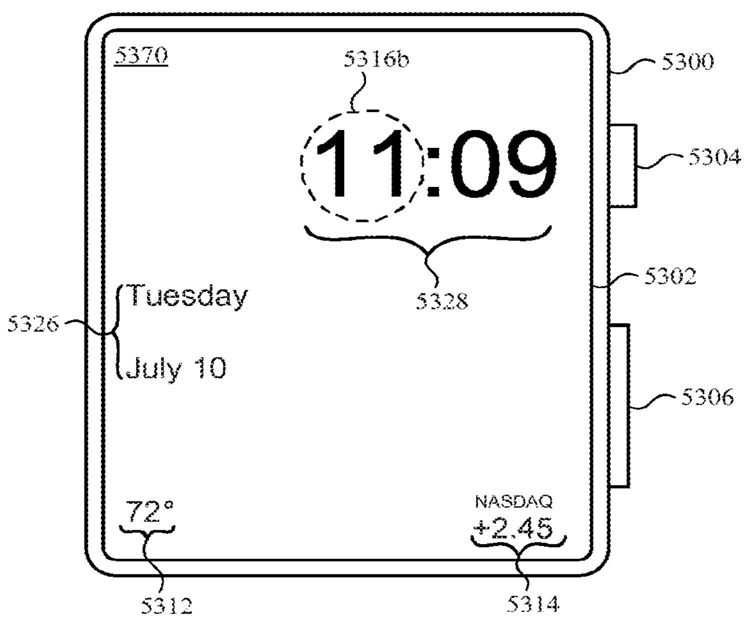

FIG. 53D depicts exemplary user interface 5370, displayed on display 5302 of device 5300. In some embodiments, user interface 5370 is a watch face interface screen, such as a home interface of a wearable smart-watch portable electronic device. In some embodiments, interface 5370 may be displayed by device 5300 in response to a user (such as a user of a device displaying interface 5340 as described in FIG. 53A) selecting a different "face" for device 5300, for example causing interface 5340 to cease to be displayed and interface 5370 to begin to be displayed. Interface 5370 may share some common elements with interface 5340, namely weather complication 5312 and stock-market complication 5314. In some embodiments, complications 5312 and 5314 in interface 5370 may have some or all of the attributes as described above with reference to interface 5340 in FIG. 53A.

Interface 5370 includes digital watch face 5328, which is indicating that the current time is 11:09. Interface 5370 also includes day/date object 5326, which is indicating that the current day of the week is Tuesday and that the current date is July 10. In some embodiments, day/date object 5326 may be considered a complication, and may be referred to as a day/date complication.

FIG. 53D further depicts user input 5316*b*, which is a touch contact detected by touch-sensitive display 5302. Touch contact input 5316*b* may be a single-touch input, a multi-touch input, a single-tap input, and/or a multi-tap input detected by touch- and/or pressure-sensitive elements in display 5302. In the displayed example, input 5316*b* is a single-finger, single-tap input detected at a location on display 5302 corresponding to digital clock face 5328. Device 5300 may be configured, in some embodiments, to, in response to detecting user input 5316*b* (or any other suitable predefined user input, including rotation of a rotatable input mechanism), activate a time-scrubbing mode.

Figure 53E:
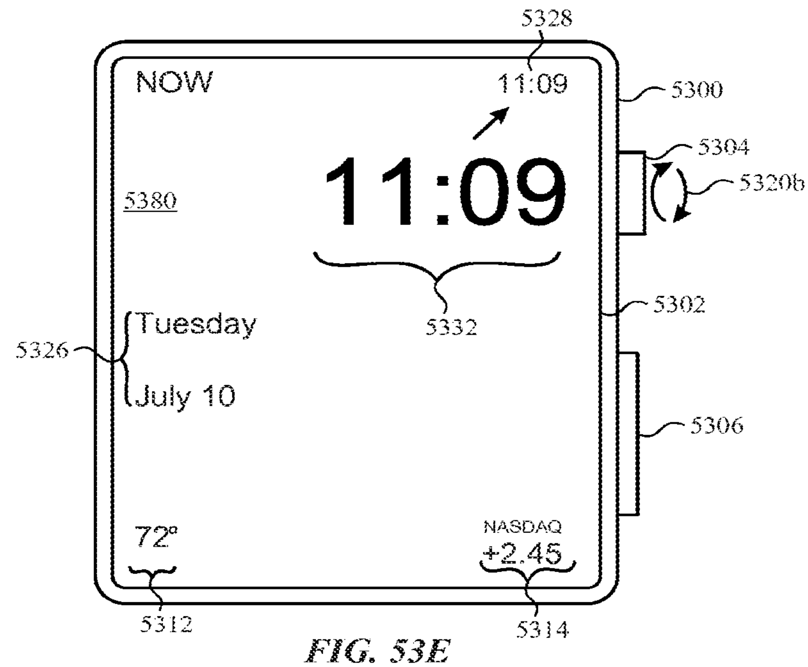

FIG. 53E depicts exemplary user interface 5380, displayed on display 5302 of device 5300. Exemplary user interface 5380 shows the manner in which, in some embodiments, device 5300 responds to the detection of input 5316*b* in FIG. 53D. Namely, user interface 5380 shows the activation, by device 5300, of a time-scrubbing mode and an associated time scrubbing interface in accordance with some embodiments.

In the depicted example, interface 5380 includes object 5326 and complications 5312 and 5314 in the same manner as described above with reference to interface 5370 in FIG. 53D. In some embodiments, object 5326 and complications 5312 and 5314 may be visually distinguished in one or more ways from their respective appearances in interface 5370 in FIG. 53D to indicate that time-scrubbing mode is active.

In the depicted example, interface 5380 differs from interface 5370 in several ways that indicate that time-scrubbing mode has been activated. In the depicted example, interface 5380 differs from interface 5370 in that digital clock face 5328 has translated to the top right corner of display 5302 (as indicated by the diagonal arrow) and has decreased in size. In some embodiments, this transition may include an animation of the translation and the resizing. In some embodiments, when digital clock face 5328 is moved from its position in interface 5370 to its position in interface 5380, it may be displayed in a different size, shape, color, highlighting, or animation style. In some embodiments, the shape, color, highlighting, and/or animation style of digital clock face 5328 may remain unchanged as digital clock face translates and is resized between interface 5370 in FIG. 53D and interface 5380 in FIG. 53E. In some embodiments, digital clock face 5328 may appear in a white color in both interfaces 5370 and interface 5380.

In some embodiments, when digital clock face 5328 transitions to the top corner of display 5302 as time-scrubbing mode is activated, a visual indicator indicating that digital clock face 5328 indicates a current time may be displayed. In the depicted example, the word "NOW" is displayed on display 5302 near the top left corner of display 5302. In some embodiments, the visual indicator, such as the word "NOW," may be displayed in a similar or identical visual style as digital clock face 5328 following its transition into its position in interface 5380. For example, the word "NOW" may be displayed in a similar size, font, color, highlighting, and/or animation style as digital clock face 5328 in interface 5380. In the depicted example, the word "NOW" or another indicator may appear in a white color when digital clock face 5328 appears in a white color.

In the depicted example, interface 5380 further differs from interface 5370 by including digital clock face 5332, which is a second digital clock face that has appeared in the position on display 5302 that was previously occupied by digital clock face 5328 (before its transition and resizing) in interface 5370 in FIG. 53D. In some embodiments, digital clock face 5332 displays the scrubbing time of time-scrubbing mode, which currently is 11:09, the same as the current time, as the user has not entered any input causing the scrubbing time to advance into the future or rewind into the past. In some embodiments, digital clock face 5332 may be displayed in the same or similar visual style as digital clock face 5328, including by being displayed in the same size, font, color, highlighting, and/or animation style. In some embodiments, digital clock face 5332 may be displayed in a different visual style than digital clock face 5328 in interface 5370, to indicate to the user that digital clock face 5332 indicates a scrubbing time rather than a current time, such as by being displayed in a green color rather than a white color. In some embodiments, digital clock face 5332 may appear on interface 5380 in response to the activation of time-scrubbing mode in accordance with any of the animations discussed above with reference to complications being updated during scrubbing. In some embodiments, the animation of digital clock face 5332 appearing in interface 5380 may include digital clock face 5380 increasing in size and/or gradually becoming less translucent (e.g., fading in).

FIG. 53E further depicts rotational input 5320*b*, which is a rotational user input detected by rotational input mechanism 5304 of device 5300. In some embodiments, rotational user input 5320*b* may have one or more characteristics in common with rotational input 5320*a* described above with reference to FIG. 53B. In some embodiments, rotational input 5320*b* is an input for scrubbing forward to a future time.

Figure 53F:
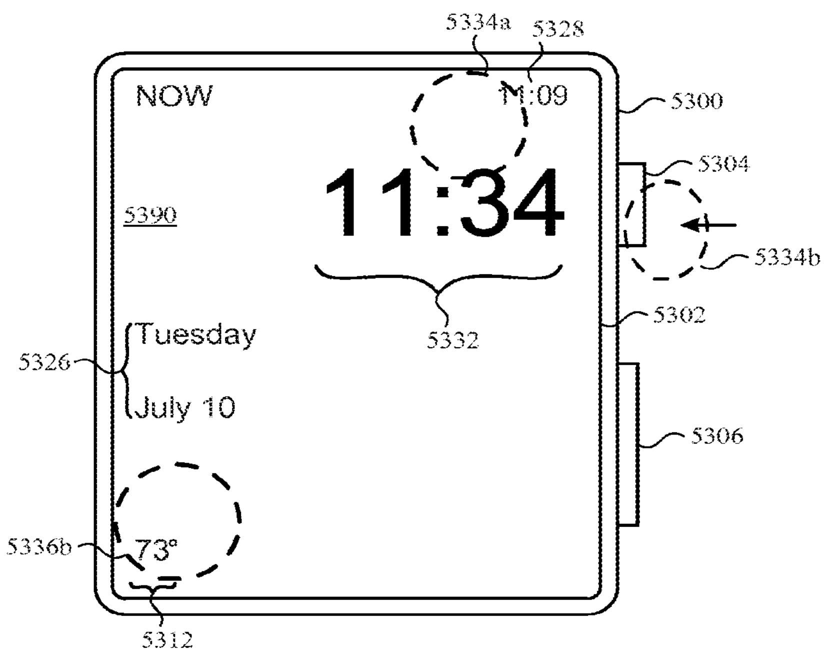

FIG. 53F depicts exemplary user interface 5390 displayed on display 5302 of device 5300. Exemplary user interface 5390 shows the manner in which, in some embodiments, device 5300 responds to the detection of input 5320*b* in FIG. 53E. Namely, user interface 5390 shows time scrubbing to a future time by device 5300 and an associated interface in accordance with some embodiments. Specifically, interface 5390 depicts how digital clock face 5332 and complications 5312 and 5314 are updated in accordance with time scrubbing.

First, in the depicted example, in accordance with user input 5320*b*, digital clock face 5332 has changed from displaying "11:09" to instead displaying "11:24," thereby indicating the scrubbing time. In some embodiments, a digital clock face may be stepped forward in accordance with a rotational user input, such that the further and faster a rotational input rotates, the further and faster a digital clock face indicating a scrubbing time may advance. In some embodiments, displayed numerals on a digital clock face may change iteratively, such as once for every minute scrubbed, once for every five minutes scrubbed, or the like. Updates may be displayed for each changing second, 15 seconds, minute, 5 minutes, hour, or the like. In some embodiments, displayed numerals on a digital clock face may change gradually or smoothly, such as by fading into and out of view or translating into or out of view. In some embodiments, displayed numerals on a digital clock face may be animated as changing individually (e.g., number by number), and in some embodiments displayed numerals on a digital clock face may be animated as changing as a group (e.g., part of, or the entire, digital clock face changes together). In some embodiments, one or more of the numerals or other elements displayed as part of a digital clock face, including digital clock face 5332, may change in any of the manners described above with reference to digital clock face 5317 and FIG. 53C, including by way of an animation simulating the appearance of a flap-display, split-flap display, or arrival/departure board.

Further, in the depicted example, as digital clock face 5332 advances further as the scrubbing time is advanced into the future, digital clock face 5328 may remain fixed and continue to display the current time. (If the current time advances with the passage of time, digital clock face 5328 may accordingly advance, and a scrubbing clock face such as digital clock face 5332 may also accordingly advance to maintain the same offset between the current time and the scrubbing time.) In some embodiments, a time difference indicator may be displayed as part of user interface 5390 (and/or 5380 in FIG. 53E), and the time difference indicator may be updated (in accordance, in some embodiments, with any of the animations or display styles discussed above, including those discussed with reference to digital clock face 5332 and/or those discussed with reference to digital clock face 5317 and FIG. 53C) to display an updated time difference in accordance with the scrubbing time advancing further into the future. If user interface 5390 included a time difference indicator, for example, it would be updated in accordance with the time being scrubbed forward to indicate a positive 25 minute difference between the scrubbing time of 11:34 and the current time of 11:09.

Further, in the depicted example of FIG. 53F, complications 5312 and 5314 have been updated in the same manner as described above with reference to interface 5360 in FIG. 53C, so as to correspond to the scrubbing time of 11:34 rather than the current time of 11:09. In some embodiments, day/date object 5326 may also be updated in accordance with a scrubbing time in time-scrubbing mode; for example, if a user scrubs far enough into the future or the past to reach a different day, then day/date object 5326 may be updated in a same or similar manner as a complication may be updated to reflect the change to the day and date.

FIG. 53F further depicts user input 5336*b*, which is a touch contact detected by touch-sensitive display 5302. Touch contact input 5336*b* may be a single-touch input, a multi-touch input, a single-tap input, and/or a multi-tap input detected by touch- and/or pressure-sensitive elements in display 5302. In the displayed example, input 5336*b* is a single-finger, single-tap input detected at a location on display 5302 corresponding to displayed weather complication. In some embodiments, in response to detecting user input 5336*a*, device 5300 may provide additional information, additional interfaces, or additional modes corresponding to weather complication 5312, including in any of the manners described above with respect to input 5336*a* and FIG. 53C.

FIG. 53F further depicts user inputs 5334*a* and 5334*b*, both of which are user inputs configured to cause device 5300 to exit time-scrubbing mode and return to a non-time-scrubbing interface. In some embodiments, any suitable user input may be predetermined to cause a device to exit time-scrubbing mode. In some embodiments, user inputs 5334*a* and 5334*b* may share some or all characteristics with user inputs 5324*a* and 5324*b* described above, respectively.

In response to detecting either user input 5334*a* or 5334*b*, or any other suitable predetermined user input, device 5300 may cause time-scrubbing mode to be ceased and may cease to display time scrubbing interfaces. In some embodiments, updated complications may return to their original appearance before time-scrubbing mode was engaged, or may change to an appearance corresponding to a new current time other than the current time that was current when time-scrubbing mode was engaged. In some embodiments, indications that time-scrubbing mode is active, such as digital clock face 5332, may cease to be displayed, and user interface objects that moved position and/or changed appearance, such as digital clock face 5328, may return to their original visual appearance and style from before time-scrubbing mode was activated. Any of these changes may be made by way of any of the animations described above, including a reversed and/or accelerated version of any such animation. In the depicted example, in response to detecting user input 5334*a* or 5334*b*, device 5300 ceases to display user interface 5390 and displays user interface 5370 again; user interface 5370 indicates that the current time is still 11:09 and that the information corresponding to both weather complication 5312 (72°) and stock-market complication 5314 (NASDAQ+2.45) has not changed since time-scrubbing mode was activated.

FIGS. 54A-54E are flow diagrams illustrating a method for accessing and presenting information corresponding to past times and future times. Method 700 is performed at a device (e.g., 100, 300, 500, 5300) with a display and a rotatable input mechanism. Some operations in method 700 may be combined, the order of some operations may be changed, and some operations may be omitted.

As described below, method 700 provides an intuitive way to access and present information corresponding to past times and future times. The method reduces the cognitive burden on a user for accessing and presenting information corresponding to past times and future times, thereby creating a more efficient human-machine interface. For battery-operated computing devices, enabling a user to access and present information corresponding to past times and future times, such as in a time-scrubbing mode in which displayed complications may be scrubbed forward and/or backward in time, conserves power and increases the time between battery charges, by reducing the number of inputs required, reducing processing power used, and/or reducing the time of usage of the device.

In some embodiments, a device may display a current-time indicator displaying a current time. In response to a user input (such as a tap on a touch-sensitive display on the current-time indicator), the device may display, in addition to the current-time indicator, a non-current-time indicator. In response to and in accordance with a user input (such as a rotation of a rotatable input mechanism such as a crown of a smart watch), the time displayed by the non-current-time indicator may be scrubbed forward or backward. In accordance with the scrubbing of the non-current time to a future or past time, one or more complications or other user interface objects may be updated to correspond to the non-current time, by displaying information relating to the complication and correlating to the non-current time rather than the current time.

In FIG. 54A, at block 5402, method 700 is performed at an electronic device having a display and a rotatable input mechanism. An exemplary device is device 5300 of FIGS. 53A-53F, which has display 5302 and has a rotatable input mechanism 5304.

A block 5404, the device displays a first current-time indicator indicating a current time. In some embodiments, a current-time indicator is any watch face, clock face, or other indication of a time that is configured, designed, or understood to display a current time, such as the current time of day in the timezone in which a user is currently located. In some situations, a current-time indicator may be displaying a non-current time, such as when the watch is not set for the correct time; however, in most situations, a current-time indicator will display the correct current time. In the example of interface 5340 in FIG. 53A, watch face 5308 and clock hands 5310*a* and 5310*b* together form a current-time indicator, indicating that the current time is 11:09. In the example of interface 5370 in FIG. 53D, digital clock face 5328 is a current-time indicator, indicating that the current time is 11:09.

At block 5406, the device displays a first user interface object configured to display information corresponding to the current time, wherein the information corresponding to the current time pertains to a first information source and is information other than a day, time, or date of the current time. In some embodiments, the first user interface object may be a complication, as described above, and may be configured to display information corresponding to a certain subject matter or a certain information source. In some embodiments, complications may correspond to weather information, to stock market information, to calendar information, to day/date information, to time information, to world clock information, to social media information, to message information, to email information, to pedometer information, to health/fitness information, to exercise information, to alarm information, to stopwatch information, to information associated with third-party applications, or to any other suitable information that may be visually presented as part of a complication or other user interface object. In the examples of interfaces 5340 and 5370 in FIGS. 53A and 53D, weather complication 5312 is a user interface object configured to display information corresponding to the current time (e.g., current information), the information pertaining to a weather application and/or a source of weather data in some embodiments. In some embodiments, weather complication 5312 may be configured to display current weather information for the current time, such as a current air temperature (e.g., 72°). In the examples of interfaces 5340 and 5370 in FIGS. 53A and 53D, stock-market complication 5314 is a user interface object configured to display information corresponding to the current time (e.g., current information), the information pertaining to a stock-market application and/or a source of stock-market data, in some embodiments. In some embodiments, stock-market complication 5314 may be configured to display a current performance of the NASDAQ, such as points gained or lost on the current day of trading (e.g., plus 2.45 points).

In some embodiments, user interface objects or complications may be configured to display information that is the most current information available, such as a most recent temperature reading or a most recent stock score. In some embodiments, user interface objects or complications may be configured to display information that explicitly relates to the current time, such as a calendar event that is occurring at the current time, or a proximate calendar event that is occurring at a time in the near future or a time in the near past with reference to the current time.

At block 5408, optionally, the device detects a first touch contact at a location corresponding to the first current-time indicator. In some embodiments, the input may be one or more touch contacts detected by a touch-sensitive and/or pressure-sensitive surface, such as a touch-screen. In some embodiments, the first touch contact may be detected at a location on a touch-screen at which the first current-time indicator is currently displayed. In some embodiments, a user may tap a current-time indicator such as a displayed watch face or a digital clock face, and a device may responsively activate a time-scrubbing mode and display associated time-scrubbing interfaces. In the example of interface 5340 in FIG. 53A, device 5300 detects user input 5316*a*, which is a touch contact detected by touch-sensitive display 5302. In some embodiments, user input 5316*a* is a single-finger single-tap gesture detected at a location of display 5302 at which watch face 5308 is currently displayed. In the example of interface 5370 in FIG. 53D, device 5300 detects user input 5316*b*, which is a touch contact detected by touch-sensitive display 5302. In some embodiments, user input 5316*b* is a single-finger single-tap gesture detected at a location of display 5302 at which digital clock face 5328 is currently displayed.

At block 5410, optionally, in response to detecting the first touch contact, the device displays a non-current-time indicator indicating the current time. In some embodiments, when time-scrubbing mode is activated, a non-current-time indicator is displayed. A non-current-time indicator may be any watch face, clock face, or other indication of a time that is configured, designed, or understood to display a non-current time. In some embodiments, a non-current-time indicator may indicate a "scrubbing time" that is displayed when time-scrubbing mode is activated; the scrubbing time may be a time that is set in accordance with user inputs and is used to change what information is displayed by complications or other user interface objects during time-scrubbing mode. In some embodiments, the non-current-time indicator may suddenly appear upon the activation of time-scrubbing mode, while in some embodiments the non-current-time indicator may appear by way of animation such as translating into position or gradually becoming less transparent (e.g., fading in).

In some embodiments, a scrubbing time, such as one displayed on a scrubbing watch face or a scrubbing clock face, may be set in accordance with user inputs, and may also be set to the current time (such that the scrubbing time and the current time may be the same time). In some embodiments, when a time-scrubbing mode is initially activated and a user input or instruction has not yet been received to set a scrubbing time, the scrubbing time is automatically set to the current time as a starting point. In this way, in some embodiments, a non-current-time indicator such as a scrubbing watch face or a scrubbing clock face may sometimes display the current time. In such instances, despite the non-current-time indicator displaying a time that is the same as the current time, a user may understand that the non-current-time indicator is not an indication of the current time per se, but rather an indication that a scrubbing time is set to a time that is the same as the current time.

In the depicted example of interface 5350 of FIG. 53B, time-scrubbing mode has been activated and, accordingly, scrubbing hands 5322*a* and 5322*b* have been displayed in the same position that hands 5310*a* and 5310*b* were displayed prior to the activation of time-scrubbing mode. In some embodiments, scrubbing hands 5322*a* and 5322*b* are non-current-time indicators configured to indicate a scrubbing time, although in the example of interface 5350 of FIG. 53B, they are presently indicating a scrubbing time that is the same as the current time of 11:09.

In the depicted example of interface 5380 in FIG. 53E, time-scrubbing mode has been activated and, accordingly, digital clock face 5332 has been displayed in the same position that digital clock face 5328 was displayed prior to the activation of time-scrubbing mode. In some embodiments, digital clock face 5332 is a non-current-time indicator configured to indicate a scrubbing time, although in the example of interface 5380 in FIG. 53E, it is presently indicating a scrubbing time that is the same as the current time of 11:09.

In some embodiments, such as when a user executes multiple user inputs to scrub a scrubbing time forward and then backward, or backward and then forward, to return the scrubbing time to zero, a non-current-time indicator indicating the current time may also be responsively displayed.

At block 5412, the device detects a first rotation of the rotatable input mechanism. In some embodiments, a first rotation of the rotatable input mechanism may comprise one or more rotations in one or more directions, having one or more speeds, having one or more durations, and having one or more spacings relative to one another. In some embodiments, a first rotation of the rotatable input mechanism may comprise a single rotation of a rotatable input mechanism in a predefined rotational direction. In some embodiments, a user may rotate a rotatable input mechanism in a first direction, and a device may responsively scrub a scrubbing time forward into the future (or, in some embodiments, backward into the past). In some embodiments, the first rotation of a rotatable input mechanism may begin to be detected when a time-scrubbing mode is inactive, while in some embodiments it may begin to be detected while a time-scrubbing mode is already activated. In the depicted examples of FIGS. 53B and 53E, rotational inputs 5320*a* and 5320*b* are detected by device 5300 when a user rotates rotatable input mechanism 5304 in a first direction.

Figure 54B:
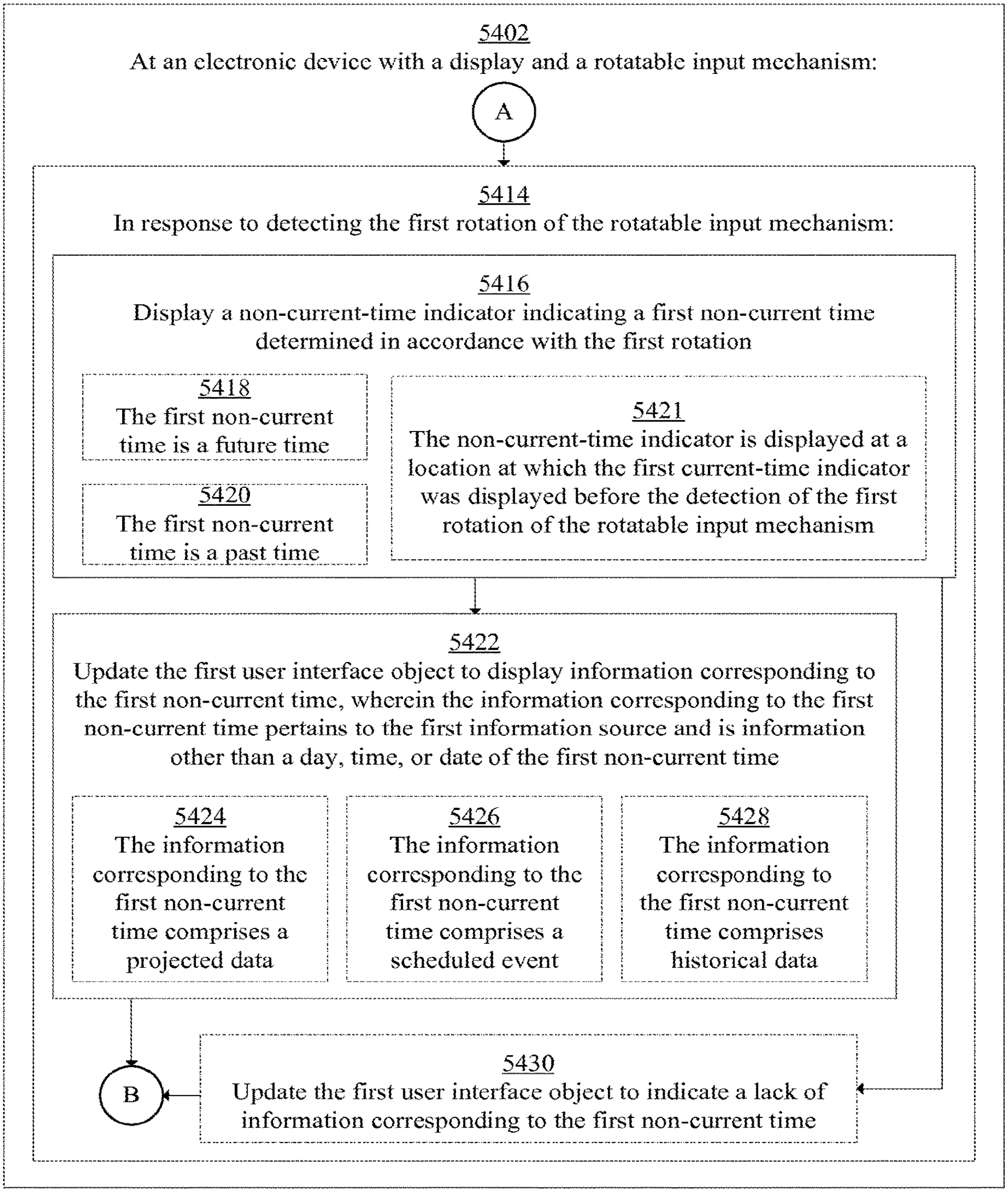

In FIG. 54B, block 5402 is continued, such that the additional method blocks are also performed at an electronic device with a display and a rotatable input mechanism. In FIG. 54B, block 5414 follows from block 5412.

Figure 54C:
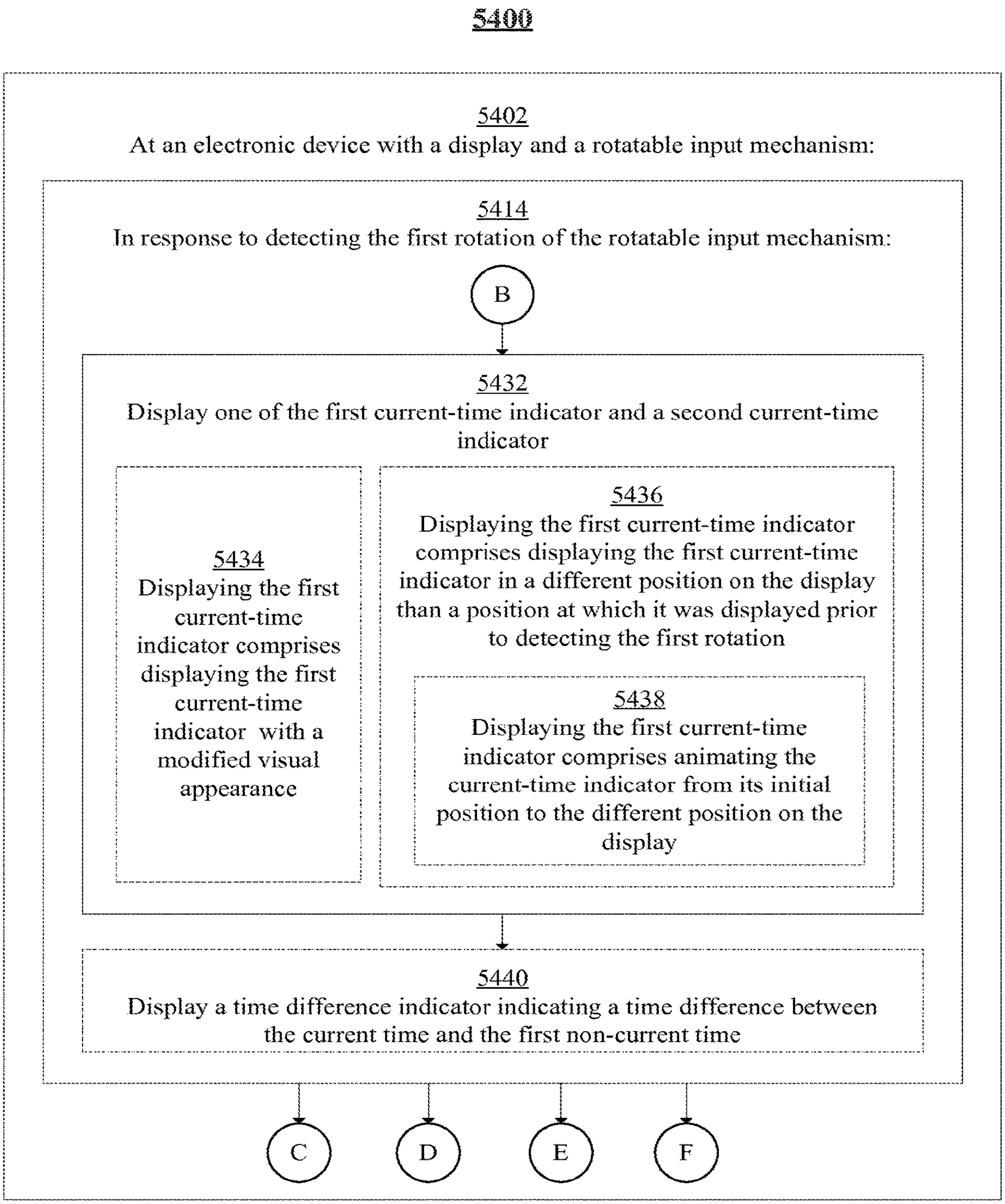

At block 5414, blocks 5416 to 5442 (some of which are optional), shown in FIGS. 54B and 54C, are performed in response to detecting the first rotation of the rotatable input mechanism. In discussing blocks 5416 to 5442 below, the phrase "in response to detecting the first rotation of the rotatable input mechanism" may or may not be repeated for clarity. In some embodiments, method steps are performed in response to detecting rotation of a rotatable input mechanism, which may be the primary input mechanism for driving functionality in a time-scrubbing mode. That is, in some embodiments, rotation of a rotatable input mechanism may be the core manner in which a user scrubs time forward or scrubs time backward, and various elements of the user interface objects may react accordingly to the user's rotational input commands.

At block 5416, in response to detecting the first rotation of the rotatable input mechanism, the device displays a non-current-time indicator indicating a first non-current time determined in accordance with the first rotation. In some embodiments, the first non-current-time indicator may be any of the non-current-time indicators described above with reference to block 5410, or may share some or all of the characteristics of the non-current-time indicators described above. In some embodiments, in contrast to the non-current-time indicator in block 5410, the non-current-time indicator displayed in block 5414 (which may be a different non-current-time indicator or the same non-current-time indicator) indicates a non-current time that is determined in accordance with the first rotation. In some embodiments, the indicated non-current time is a scrubbing time, and the scrubbing time is determined in accordance with a user's rotational scrubbing input.

In some embodiments, when the rotational input is detected before the activation of time-scrubbing mode, a non-current-time indicator, such as a scrubbing-time digital clock face or scrubbing hands on an analog clock face, may begin to be displayed and display a user-selected scrubbing time. In some embodiments, when the rotational input is detected once a time-scrubbing mode has already been activated, then a previously displayed non-current-time indicator may be modified to display a newly selected scrubbing time.

In some embodiments, a scrubbing time for a time-scrubbing mode may be selected in accordance with a characteristic of the rotational input, and the selected scrubbing time may be displayed by the non-current-time indicator. In some embodiments, the non-current-time indicator may display an animation of the indicator changing to the newly selected scrubbing time, including any of the animation styles discussed above with reference to digital clock face 5317 and FIG. 53C. In some embodiments, an animation may include displaying clock hands (e.g., a minute hand and an hour hand) sweeping into new positions.

In some embodiments, a rotation of a rotational input mechanism in one direction may cause scrubbing forward, while a rotation of the rotational input mechanism in a direction substantially opposite to the one direction may cause scrubbing backward. In some embodiments, the rate of scrubbing (forward or backward) may be proportionally related to the rate of rotation; in some embodiments, the amount of time scrubbed may be proportionally related to the distance (e.g., angular rotation) of rotation. In some embodiments, the scrubbing rate and amount of time scrubbed may simulate the effect of a watch crown, where clock hands are physically connected to the crown by a series of gears, and accordingly the movement of the hands follows a user's twisting of the crown, reflecting a rotation of the crown by way of a predefined gear ratio. (In some embodiments, the rate and distance of scrubbing of a digital clock face may be the same as the rate and distance of scrubbing of a displayed likeness of an analog clock face.)

In some embodiments, a device may provide different "gearings" for different available faces. That is, a user may select between more than one watch or clock interface, and, depending on the interface selected, the speed and distance of scrubbing in response to a given rotational input may vary. For example, in some embodiments, an interface displaying (as a time indicator) a likeness of the globe may display one rotation of the globe (approximately 24 hours) in response to a first rotation of the rotational input. Meanwhile, in some embodiments, an interface displaying (as a time indicator) a likeness of the solar system may display one revolution of the Earth (approximately 365 days) in response to the same first rotation of the rotational input. Differences in the amount of time scrubbed in response to a given rotational input may similarly be provided between other watch faces, such as an analog face like the one shown in interface 5340 in FIG. 53A, or a digital face such as the one shown in interface 5370 in FIG. 53D.

In some embodiments, the rate of time scrubbing and/or the amount of time scrubbed in response to a rotational input may not have a fixed relationship to the angular magnitude of the rotational input. That is, in some embodiments, a rotational input of a given angular magnitude may result in different amounts of time scrubbed, depending on various other factors. As discussed above, in some embodiments, different interfaces may be associated with different default gearings. In some embodiments, a user may manually select different gearings, for example by executing an input on a displayed user interface object or by executing an input by actuating a hardware button (e.g., executing one or more presses of a rotatable and depressible input mechanism).

In some embodiments, a gearing may not be fixed, such that, during the course of an ongoing rotational input, the relative rate (e.g., instantaneous rate) of time scrubbing as compared to the rate (e.g., instantaneous rate) of rotation of the rotatable input mechanism may be increased and/or decreased. For example, a variable gearing may be configured such that rotation below a threshold speed (e.g., angular rotation per second) causes time scrubbing at a first rate or a first gearing, while rotation above the threshold speed causes time scrubbing at an accelerated rate or an accelerated fearing. In this way, when a user wishes to scrub by a large amount of time, the device may recognize their rapid rotation of the rotational input mechanism and accordingly accelerate the time scrubbing rate, helping the user to more easily scrub by a large distance. In some embodiments, during an ongoing rotational input, if the speed of a rotational input drops below a predefined speed threshold after the time scrubbing rate has been accelerated, then the time scrubbing rate may be decelerated and/or returned to its original rate; this deceleration may aid a user who has used accelerated scrubbing to move the scrubbing time by a large amount, enabling the user to more precisely set the final desired scrubbing time as the user begins to slow his rotational input. In some embodiments, gearing may be dynamically varied in accordance with any characteristic of a user input, such as a speed, a direction, a distance (e.g., angular distance), and/or a pressure.

In some embodiments in which a time scrubbing speed is accelerated, it should be noted that an animation of time scrubbing may be different for accelerated scrubbing than for non-accelerated scrubbing. For example, in some embodiments, for non-accelerated scrubbing, a device may provide a first animation of numbers on a digital clock face changing (with or without an accompanying animation such as a translation or a flipping effect) or a first animation of a minute hand and an hour hand sweeping around a clock face. Meanwhile, in some embodiments, for accelerated scrubbing, a device may provide one or more different animations, such as blurring numbers on a digital clock face to signify that they are being changed rapidly, or by providing an animation of a blurred minute hand (or hiding a minute hand altogether) in order to avoid the minute hand appearing to "jump" from one position to another on a display without sweeping through intermediate positions. In some embodiments, such alternate animations for accelerated scrubbing may be provided as part of an accelerated scrubbing mode, sometimes called a "turbo mode."

In some embodiments, a scrubbing time may be set partially in accordance with a user's input and partially in accordance with predefined scrubbing times. For example, in some embodiments, predefined scrubbing times may be configured such that, when a user executes an input that would set a scrubbing time to a predefined range of times, the actual scrubbing time is set to a predefined time. For example, if a predefined scrubbing time is 12:00 noon, and the user rotates a rotational input mechanism an appropriate distance and speed to set the scrubbing time to 11:58, then the scrubbing time may be rounded to 12:00 noon and set to 12:00 noon. The range of scrubbing times that will "snap" to a predefined scrubbing time may be set to any suitable length of time, such as one minute, five minutes, 15 minutes, 30 minutes, one hour, six hours, 12 hours, 24 hours, 2 days, one week, one month, one year, etc. In some embodiments, a device may snap to different predefined scrubbing times depending on what interface a user is using; for example, in an interface featuring a likeness of the Earth or a representation of the sun, the device may be configured to "snap" to scrubbing times to times corresponding to sunset, sunrise, or high noon. As another example, in interfaces featuring a likeness of the solar system, the device may be configured to "snap" to scrubbing times corresponding to astronomical events such as planet alignments or eclipses.

In some embodiments, predefined scrubbing times may be determined in accordance with user input. In some embodiments, a user may manually set predefined scrubbing times, such as by setting "snap" times or selecting a "snap" interval. In some embodiments, predefined scrubbing times may be set in accordance with data or information relating to one or more user interface objects or complications. For example, a device may be configured to round a scrubbing time to the time at which a calendar event begins or ends. In some embodiments, a device may be configured to round a scrubbing time to times at which data for a complication changes, becomes available, or ceases to be available. In some embodiments, a device may be configured to slow or stop a scrubbing rate in accordance with a calendar event or other scheduled event being reached while scrubbing forward or backward, and a device may be configured to snap or round a scrubbing time to a time corresponding to the calendar event or scheduled event.

In the depicted example of interface 5360 in FIG. 53C, scrubbing hands 5322*a* and 5322*b* have swept smoothly forward from their previous position in interface 5350 in FIG. 53B, moving forward in time in accordance with the speed and magnitude of user input 5320*a* in FIG. 53B, to indicate in user interface 5360 that the scrubbing time has been set to the non-current time of 11:34, which is 25 minutes ahead of the current time of 11:09. In the depicted example of interface 5390 in FIG. 53F, the numerals in digital clock face 5332 have changed in accordance with the speed and magnitude of user input 5320*b* in FIG. 53C to indicate in user interface 5390 that the scrubbing time has been set to the non-current time of 11:34, which is 25 minutes ahead of the current time of 11:09.

At block 5418, optionally, the first non-current time is a future time. In some embodiments, a non-current scrubbing time may be a time that is in the future as compared to the current time. In some embodiments, a user may scrub to a future time in a time-scrubbing mode by executing a rotation of a rotatable input mechanism in a predefined direction. A predefined direction of rotation for scrubbing into the future may be substantially opposite to a predefined direction of rotation for scrubbing into the past. In the examples of interfaces 5360 and 5390 in FIGS. 53C and 53F, respectively, the scrubbing time is a future time of 11:34, which is 25 minutes ahead of the current time of 11:09.

At block 5420, optionally, the first non-current time is a past time. In some embodiments, a non-current scrubbing time may be a time that is in the past as compared to the current time. In some embodiments, a user may scrub to a past time in a time-scrubbing mode by executing a rotation of a rotatable input mechanism in a predefined direction. A predefined direction of rotation for scrubbing into the past may be substantially opposite to a predefined direction of rotation for scrubbing into the future.

At block 5421, the non-current-time indicator is displayed at a location at which the first current-time indicator was displayed before the detection of the first rotation of the rotatable input mechanism. In some embodiments, a non-current-time indicator, such as one that is newly displayed upon the activation of time-scrubbing mode, may be displayed at a location at which a current-time indicator was previously displayed before the activation of time-scrubbing mode. In some embodiments, the non-current-time indicator may appear in its displayed position by way of any of the animations discussed above with reference to digital clock face 5317 and FIG. 53C. In some embodiments, a current-time indicator such as a digital clock face may be animated as translating out of the way, and a non-current-time indicator, such as a different digital clock face with numerals displayed in a different color, may be animated as increasing in size as if appearing from the distant z-axis and moving toward the viewer. In some embodiments, a scrubbing time indicator may replace the current-time indicator on the display. In the example depicted in interfaces 5380 and 5390 of FIGS. 53E and 53F, digital clock face 5332 is displayed at the same location on display 5302 that digital clock face 5323 (which is reduced in size and translated to the upper corner upon the activation of time-scrubbing mode) was displayed in interface 5370 in FIG. 53D before the activation of time-scrubbing mode. In the example of interface 5350 in FIG. 53B, scrubbing hands 5322*a* and 5322*b* are displayed in the same position and same orientation as hands 5310*a* and 5310*b* were previously displayed, though scrubbing hands 5322*a* and 5322*b* may be displayed in the depicted position in response to a touch contact activating time-scrubbing mode; after a rotational input while in time-scrubbing mode, scrubbing hands 5322*a* and 5322*b* may be displayed at a different orientation (e.g., indicating a different time) though in the same general position (e.g., with the same center/anchor point) as hands 5310*a* and 5310*b* were previously displayed, as depicted in interface 5360 of FIG. 53C.

At block 5422, in response to detecting the first rotation of the rotatable input mechanism, the device updates the first user interface object to display information corresponding to the first non-current time, wherein the information corresponding to the first non-current time pertains to the first information source and is information other than a day, time, or date of the first non-current time. In some embodiments, when a user executes a rotational input as a command to scrub time forward or backward, one or more user interface objects displayed on a user interface, such as one or more complications, may be updated in accordance with the newly selected scrubbing time. In some embodiments, a user interface object or a complication may be predetermined to correspond to a first information source, subject matter, and/or a first application, and scrubbing time forward or backward will not change the information source, subject matter, or application to which a complication or user interface object pertains. For example, in some embodiments, when a complication is configured to display information pertaining to the weather obtained from a weather application, scrubbing the time forward or backward may not change that the complication displays weather information obtained from a weather application—rather, the change may be with respect to the time (rather than subject matter or information source) to which the displayed information pertains. That is, if the weather complication is configured to display current weather information (e.g., the most up-to-date temperature reading available) when a device is not in time-scrubbing mode, then scrubbing the time forward may cause the weather complication to instead display forecasted or projected weather information, while scrubbing the time backward may cause the device to display historical weather information (or past projected weather information) in some embodiments.

In some embodiments, information may be considered to correspond to a time when the information is stored, linked, tagged, or associated with metadata indicating that the information corresponds to that time. For example, a piece of information (such as a weather forecast) may be stored locally or remotely from the device, and may be associated with a metadata or other tag that indicates a future time to which the weather forecast data corresponds (e.g., the time for the weather forecast). In some embodiments, as a user scrubs forward or backward through time, the device may determine when to display the weather forecast data by comparing the displayed scrubbing time to the time associated with the tag or metadata of the stored weather forecast (or other stored data entry).

In some embodiments, a user interface object such as a complication may be updated dynamically as a user scrubs time forward and/or scrubs time backward. In some embodiments, information displayed by a complication may be updated with each displayed change to the non-current-time indicator, or it may be updated in accordance with predefined periods of scrubbing time (e.g., 5 minutes, 15 minutes, 1 hour, 1 day, etc.). In some embodiments, information displayed by a complication may be updated as frequently as new or different information from the currently displayed information is available; for example, if a weather forecast predicts a steady temperature for the next hour, and then an increase by one degree, then a complication displaying a weather temperature may not display any change as the user scrubs through the first hour, then may display the increased temperature when the scrubbing time reaches the time at which the forecasted temperature changes.

In some embodiments, a user interface object such as a complication may be updated by way of an animation, including any of the animations described above with reference to digital clock face 5317 and FIG. 53C. In some embodiments, when a numeral displayed by an animation is changed, a sudden cut or a hard cut transition may be used. In some embodiments, when a change other than a single numeral being changed is made to a complication, a transition animation may be displayed in which a previous portion of (or all of) the complication is displayed as translating upwards (e.g., as if being flipped and rotated upward about a point of connection at the top of the complication, in the manner in which a page may be flipped upward on a notepad), shrinking in size, and/or fading away (e.g., becoming increasingly transparent in time); while a new portion of (or all of) the complication may be displayed as increasing in size (as if translating in from the distant z-axis and moving toward the viewer) and/or fading into view (e.g., becoming decreasingly transparent in time).

In the example of interfaces 5360 and 5390 in FIGS. 53C and 53F, respectively, weather complication 5312 has been updated in accordance with the time being scrubbed forward by 25 minutes to 11:34. Before the time was scrubbed forward, weather complication 5312 displayed a current weather temperature of 72°, while after the time has been scrubbed forward, weather complication 5312 has been updated to display a forecasted weather temperature of 73°, the forecasted weather temperature being a forecast corresponding to the future scrubbing time of 11:34.

At block 5424, optionally, the information corresponding to the first non-current time comprises projected data. In some embodiments, the information displayed by a user interface object or complication that has been updated in a time-scrubbing mode may include projected or forecasted information, such as a weather forecast. In some embodiments, when forecasted or projected information (rather than known or scheduled information) is displayed, an indication (such as a visual symbol, a display stylization, etc.) may be provided to alert the user that the information is a forecast or a projection. In the example of interfaces 5360 and 5390 in FIGS. 53C and 53F, respectively, the information displayed by weather complication 5312 is projected data in the form of a forecasted weather prediction for a future time.

In some embodiments, forecasted or projected information may pertain to a future scrubbing time, in that the prediction or forecast was made about a future time, such that the user is provided with a forecast or a prediction for the future. In some embodiments, forecasted or projected information may pertain to a past time, in that the prediction or forecast was made at a past time, such that the user is provided with a previous prediction or forecast.

At block 5426, optionally, the information corresponding to the first non-current time comprises a scheduled event. In some embodiments, information displayed by a complication may include calendar information such as the name of a scheduled event, the time of a scheduled event, the place of a scheduled event, participants or invitees to a scheduled event, or other information about a scheduled event. For example, a complication may be configured to display information from a user's personal calendar; in some embodiments, the complication may display the name of a current calendar event, such as "Conference Call." In some embodiments, the complication may display the name of a nearest upcoming calendar event. In some embodiments, when a user scrubs forward or backward in time, such a calendar complication may change to display information corresponding to a calendar event scheduled for the scrubbing time, or to display information corresponding to a nearest upcoming calendar event with respect to the scrubbing time.

In some embodiments, when scrubbing into the future and/or the past, the device may determine what information to display in a different manner than the device determines what information to display for the current time when time-scrubbing mode is not activated. For example, if a meeting is scheduled for 12:00 noon, then a calendar complication may, in some embodiments, display information pertaining to the 12:00 noon meeting starting at a time before 12:00 noon, such as 11:00 a.m. or 9:00 a.m., or whenever a previous calendar event concludes. In this way, the user may see the calendar event regarding the 12:00 noon meeting before the time of the meeting, and is less likely to forget about the meeting and be late. Thus, information may be displayed about the meeting for a period of time that extends beyond (e.g., before) the time of the calendar event in the user's calendar. In some embodiments, the same thing may not be true in time-scrubbing mode. For example, in some embodiments, when a user enters time-scrubbing mode, a calendar complication may suppress display of information pertaining to calendar events when the scrubbing time is not set to a time for which the calendar event is actually scheduled. Thus, for a noon meeting, despite the device displaying the meeting, in some embodiments, outside time-scrubbing mode when the current time is 11:09, display of the meeting may be suppressed in time-scrubbing mode when the scrubbing time is set to 11:09. In some embodiments, suppressing display of calendar events in time-scrubbing mode when the scrubbing time is not set to a time for which the calendar event is actually scheduled may aid a user's quick comprehension of the time for which calendar events are scheduled when a user is scrubbing through time quickly. (Note that, in other embodiments, time-scrubbing mode may display calendar information when the scrubbing time is not set to a time for which the calendar event is scheduled; in some such embodiments, the device may display a time for the calendar event to aid a user's understanding of the time of the calendar event as the user is scrubbing through time.)

At block 5428, optionally, the information corresponding to the first non-current time comprises historical data. In some embodiments, information displayed by a complication may include historical information such as recorded data or other information. Recorded data or other information, in some embodiments, may include recorded measurements, figures, readings, statistics, or events. Recorded data or other information, in some embodiments, may include recorded forecasts or recorded predictions. Recorded data or other information, in some embodiments, may include any information regarding the previous state of a device and/or of a user interface. In some embodiments, as a user scrubs through past times, a device may display historical data that pertains to the past scrubbing time. In some embodiments, historical information may pertain to a past scrubbing time in that the information itself concerns the past scrubbing time (e.g., a weather temperature reading at the time). In some embodiments, historical information may pertain to a past scrubbing time in that the information was recorded or created at the past scrubbing time (e.g., a weather forecast made at the past scrubbing time).

Block 5430 optionally follows from blocks 5416-5420. At block 5430, optionally, in response to detecting the first rotation of the rotatable input mechanism, the device updates the first user interface object to indicate a lack of information corresponding to the first non-current time. In some embodiments, as a user is scrubbing forward or backward in time in a time-scrubbing mode, a user interface object or complication may cease to be displayed to indicate that there is no information to be displayed corresponding to the selected scrubbing time. For example, when a user scrubs a stock-market complication to a future time, stock information may not be available for the future time; accordingly, the complication (or part of the complication) may cease to be displayed. A similar result could occur when a user scrubs so far forward in time that reliable projection or forecast data is not available; for example, a user may scrub so far into the future that no weather forecast is available, and a weather complication could cease to be displayed. A similar result could occur when a user scrubs so far backward in time that historical data is no longer available; for example, a device (or an information source to which the device has access) may only cache or otherwise store a limited amount of historical information, and when a user scrubs beyond that point, a complication may cease to be displayed. A similar result could also occur when a user scrubs to a time to which no calendar data applies; for example, if a user scrubs to a time at which no events are scheduled on a calendar, then a device may cease to display a calendar complication.

In some embodiments, when a user scrubs to a time for which no relevant information is available for display by a complication, a complication may fade to a translucent appearance, may be displayed in a faded or muted color scheme, or may be displayed in a grayed-out color scheme, to indicate to the user that no information is available for the selected scrubbing time. In some such embodiments, the complication may continue to display, in the altered (e.g., faded or grayed-out) manner, the information that was most recently displayed by the complication. This may help the user to know that information pertaining to the selected scrubbing time is not available, while allowing the user to remain oriented to, and aware of, the complication's presence.

In FIG. 54C, block 5402 is continued, such that the additional method blocks are also performed at an electronic device with a display and a rotatable input mechanism. In FIG. 54C, block 5414 is continued, such that blocks 5432-5442 (some of which are optional) are performed "in response to detecting the first rotation of the rotatable input mechanism." In discussing blocks 5432 to 5442 below, the phrase "in response to detecting the first rotation of the rotatable input mechanism" may or may not be repeated for clarity.

Block 5432 follows from blocks 5422-5428, or optionally from block 5430. At block 5432, in response to detecting the first rotation of the rotatable input mechanism, the device displays one of the first current-time indicator and a second current-time indicator. In some embodiments, block 5432 may optionally be performed in response to detecting a user input that activates a time-scrubbing mode, such as the user input detected at block 5408. In some embodiments, when a time-scrubbing mode is activated (whether by a touch contact detected on a touch-sensitive surface or by a rotation of a rotatable input mechanism), in addition to displaying a non-current-time indicator indicating a scrubbing time, the device may also display a current-time indicator. In some embodiments, the current-time indicator displayed in time-scrubbing mode may be the same current-time indicator that was displayed before the activation of time-scrubbing mode, such as the current-time indicator displayed at block 5404, such that the same current-time indicator continues to be displayed. In some embodiments, the current-time indicator displayed in time-scrubbing mode may be a second current-time indicator different from the current-time indicator that was displayed before the activation of time-scrubbing mode.

At block 5434, optionally, displaying the first current-time indicator in response to detecting the first rotation comprises displaying the first current-time indicator with a modified visual appearance. In some embodiments, upon the activation of time-scrubbing mode, the visual appearance of the first current-time indicator may be altered in such a way so as to signal to the user that time-scrubbing mode has been activated and to direct the user's focus to the non-current-time indicator rather than the current-time indicator. For example, a size, shape, color, highlighting, and/or animation style of a current-time indicator may be altered upon the activation of time-scrubbing mode.

In some embodiments, a current-time indicator may be displayed in a faded, muted, partially transparent, or grayed-out color scheme while time-scrubbing mode is active. In the depicted example of interface 5360 in FIG. 53C, clock hands 5310*a* and 5310*b* are displayed in a grayed-out color scheme, as indicated by the hashing shown in the figure. This grayed-out color scheme may signal to a user that time-scrubbing mode is active, and may direct a user's attention to scrubbing hands 5322*a* and 5322*b* instead, which may be displayed in a brighter or more noticeable color, such as green.

In the example of interface 5380 in FIG. 53E, digital clock face 5328 may be displayed in green when time-scrubbing mode is activated, whereas it may have been displayed in white before time-scrubbing mode was activated. In some embodiments, displaying more user interface objects, including current-time indicators, in a bright color such as green may signal to a user that the device is in a time-scrubbing mode of operation.

In some embodiments, a current-time indicator may be displayed in a smaller size than it was displayed before the activation of a time-scrubbing mode. In the depicted example of interface 5380 in FIG. 53E, digital clock face 5328 has been translated to the top corner of display 5302 (as indicated by the diagonal arrow) and is displayed in a smaller size than the size at which it was displayed (in interface 5370 in FIG. 53D) before the activation of time-scrubbing mode. The smaller display size of the current-time indicator may signal to a user that time-scrubbing mode is active, and may direct a user's attention to digital clock face 5332, which may be displayed in a larger size and may display a scrubbing time.

At block 5436, optionally, displaying the first current-time indicator in response to detecting the first rotation comprises displaying the first current-time indicator in a different position on the display than a position at which it was displayed prior to detecting the first rotation. In some embodiments, upon the activation of time-scrubbing mode, a current-time indicator may cease to be displayed in one position and instead be displayed in another position. The position at which the current-time indicator is displayed during time-scrubbing mode may be a less prominent position than the prior position, such as a position closer to an edge or corner of the display. In the example of interface 5390 in FIG. 53F, digital clock face 5328 is displayed at a different position than the position at which it was displayed (in interface 5370 in FIG. 53D) prior to the activation of time-scrubbing mode, having been moved closer to the upper right-hand corner of display 5302.

At block 5438, optionally, displaying the first current-time indicator in response to detecting the first rotation comprises animating the first current-time indicator from its initial position to the different position on the display. In some embodiments, the animation may comprise the indicator fading away (e.g., becoming more transparent) from its old position and/or fading into (e.g., becoming less transparent) its new position. In some embodiments, the animation may include translating the object across the display. In some embodiments, the animation may include displaying the object increasing or decreasing in size. In some embodiments, the animation may include any of the animations described above with respect to digital clock face 5317 and FIG. 53C or with respect to block 5422. In some embodiments, the current-time indicator may suddenly cease to be displayed at its initial position and immediately begin to be displayed at the different position.

At block 5440, optionally, in response to detecting the first rotation of the rotatable input mechanism, the device displays a time difference indicator indicating a time difference between the current time and the first non-current time. In some embodiments, a time difference indicator may be any user interface object that indicates a difference between one time and another time, such as the difference between a current time and a scrubbing time. In some embodiments, a time difference indicator may indicate a number of seconds, minutes, hours, days, weeks, months, years, etc. In some embodiments, a time difference indicator may indicate whether a scrubbing time is in the future or in the past relative to a current time. In some embodiments, a time difference indicator is automatically displayed upon activation of time-scrubbing mode. In some embodiments, explicitly displaying the difference between the scrubbing time and the current time may help a user to more easily understand and contextualize how far away from the current time the scrubbing time (and the corresponding information displayed in the complications) is. In the example of interfaces 5350 and 5360 in FIGS. 53B and 53C, respectively, time difference indicator 5318 uses numerals to indicate the number of minutes difference between the current time and the scrubbing time, which is zero minutes in FIG. 53B and 25 minutes in FIG. 53C. In the example depicted, time difference indicator 5318 uses a "+" symbol to indicate that the scrubbing time is in the future as compared to the current time (and defaults to using a "+" symbol when the scrubbing time is equal to the current time). In some embodiments, if the scrubbing time is in the past as compared to the current time, then time difference indicator 5318 may display a "−" symbol to indicate that the scrubbing time is a past time.

In some embodiments, when time-scrubbing mode is activated, elements previously displayed on the display may be removed from the display. For example, in some embodiments, complications or other user interface objects displayed at a portion of the display where a time difference indicator is displayed may be removed from the display (e.g., the device may cease to display them) during time-scrubbing mode. In some embodiments, the same may be true of interface objects or complications that are displayed at a location on the display where a current-time indicator (or an accompanying object such as the displayed word "NOW") is displayed when time-scrubbing mode is active. In some embodiments, complications may be removed from the display upon the activation of time-scrubbing mode without regard for whether any other object will be displayed at the same location on the display during time-scrubbing mode. In some embodiments, when a current-time indicator or a time-difference indicator is displayed at or moved to a location of a display at which numbers on a likeness of an analog clock face were displayed, the numbers on the likeness of the analog clock face may be hidden; for example, if a current-time indicator or time-difference indicator is displayed near the bottom of a clock interface in a time-scrubbing mode, then the numbers "5," "6," and "7" may be hidden on the clock face. In some embodiments, dials or sub-dials displayed in a device interface (such as any dial described elsewhere in this disclosure) may cease to be displayed upon the activation of time-scrubbing mode when a time-difference indicator or a current-time indicator is displayed at a portion of the display at which the dial or sub-dial was previously displayed.

In some embodiments, user interface elements displayed before the activation of a time-scrubbing mode may change in size or appearance in order to make room for the display of a time-difference indicator or a current-time indicator in time-scrubbing mode. For example, in some embodiments, previously-displayed tick marks may be replaced by or animated as transitioning into dots, which may be smaller in size and/or may have more empty space between them on the display. In some embodiments, any suitable user interface object may shrink in size and/or change locations on the display upon the activation of time-scrubbing mode, including to create space on the display for the display of a time-difference indicator and/or a current-time indicator or associated user interface objects.

In FIG. 54D, block 5402 is continued, such that the additional method blocks are also performed at an electronic device with a display and a rotatable input mechanism.

Blocks 5442, 5444-5446, and 5448 each follow, optionally, from blocks 5414-5440.

At block 5442, optionally, in response to a passage of time, the device updates the non-current-time indicator to indicate a second non-current time in accordance with the passage of time, such that a time difference between the current time and a presently indicated non-current time remains fixed. In some embodiments, as time passes, the current time is accordingly updated to keep time. Additionally to updating the current time, the device, in some embodiments, also updates a non-current time, such as a scrubbing time for time-scrubbing mode, in accordance with the passage of time. In this way, in some embodiments, once a user has set a scrubbing time, the difference between the scrubbing time and the current time may remain fixed even as time passes. Thus, in some embodiments, when a scrubbing time is set to the future, the current time will not "catch up" to the scrubbing time, because the scrubbing time will advance in time in parallel to the current time.

In some embodiments, as the scrubbing time is advanced in accordance with the passage of time, complications and other user interface objects may be accordingly updated, in accordance with any of the methods explained above, to reflect the newly updated scrubbing time. Thus, a complication in time-scrubbing mode may be updated, in some embodiments, both in accordance with the scrubbing time being altered by user input and in accordance with the scrubbing time being altered by the passage of time.

At block 5444, optionally, while displaying the updated first user interface object displaying information corresponding to the first non-current time, the device detects a second touch contact at a location corresponding to the updated first user interface object, and in response to detecting the second touch contact, displays a user interface corresponding to the first user interface object. The touch contact detected may be a single-touch input, a multi-touch input, a single-tap input, and/or a multi-tap input detected by touch- and/or pressure-sensitive elements in any touch- and/or pressure-sensitive surface, including a touch-screen. In some embodiments, complications or other user interface objects that are updated in accordance with a scrubbing time in time-scrubbing mode may be selectable affordances, such that if a device detects an input at a location corresponding to the complication, then an interface or application associated with the complication may be accessed. For example, a user may tap on a weather complication, in some embodiments, such as weather complication 5312, to cause an associated weather application to be opened. In another example, a user may tap on a stock-market complication such as stock-market complication 5314, and, in some embodiments, a stock-market application may be opened. In the depicted example of FIGS. 53C and 53F, user inputs 5336*a* and 5336*b* are detected on display 5302 at a location at which weather complication 5312 is displayed; in some embodiments, in response to detecting user input 5336*a* or 5336*b*, a weather application may be accessed and a weather interface may be displayed.

At block 5446, optionally, the user interface displayed in accordance with the detection of a second touch contact at a location corresponding to the updated first user interface object corresponds to the first non-current time. In some embodiments, the functionality of tapping or otherwise selecting complications or other user interface objects may vary in accordance with the displayed scrubbing time, such that a different application or interface may be provided depending on what the scrubbing time is set to at the moment of the user's selection. For example, in response to a user tapping a weather complication when the device is scrubbed to a past time, an interface of a weather application showing historical weather data for the scrubbed-to past time may be displayed; in response to a user tapping a weather complication when the device is scrubbed to a future time, an interface of a weather application showing forecasted weather for the scrubbed-to future time may be displayed. In another example, in response to a user tapping a calendar complication, a calendar event that is scheduled for the scrubbed-to time may be opened, and an interface for that specific event may be displayed. In the depicted example of FIGS. 53C and 53F, in response to detecting user input 5336*a* or 5336*b*, device 5300 may provide an interface corresponding to forecasted weather information associated with the scrubbing time of 11:34 in some embodiments.

In some embodiments, a displayed complication may correspond to an interface of the device that is configured to display a likeness of the Earth, the moon, and/or the solar system. In some embodiments, if a user scrubs time forward or backward on a scrubbing interface that contains such a complication, and then taps the complication to select it, then a corresponding Earth, moon, and/or solar system interface may be displayed, wherein the Earth, moon, and/or solar system interface is itself scrubbed forward to the scrubbing time of the previous interface. In some embodiments, a user may select complications corresponding to Earth, moon, and/or solar system interfaces to cause an animation to be displayed of the interface "flying" (e.g., smoothly zooming and panning) between views of the Earth, views of the moon, and/or views of the solar system. As the user flies between these various interfaces, in some embodiments, time scrubbing may be maintained, and the scrubbing time may be reflected in the complications displayed in each interface and/or in the displayed likenesses of the Earth, the moon, and/or the solar system.

At block 5448, optionally, the device detects a third touch contact at a location corresponding to the first current-time indicator, and in response to detecting the third touch contact, ceases to display the non-current-time indicator and updates the first user interface object to display information corresponding to the current time. The touch contact detected may be a single-touch input, a multi-touch input, a single-tap input, and/or a multi-tap input detected by touch- and/or pressure-sensitive elements in any touch- and/or pressure-sensitive surface, including a touch-screen. In some embodiments, when a user taps on the current-time indicator, the device may responsively exit time-scrubbing mode. Upon exiting time-scrubbing mode, in some embodiments, the device may cease to display the scrubbing time. Upon exiting time-scrubbing mode, in some embodiments, display of the current time may return to an original visual appearance (e.g., position, size, color, style, etc.) that was displayed before time-scrubbing mode was activated. Upon exiting time-scrubbing mode, in some embodiments, complications or other user interface object that were updated, in accordance with any of the above methods, to correspond to a scrubbing time, may be again updated to correspond to the current time. In some embodiments, this may involve returning to their original appearance from before time-scrubbing mode was activated, while in some embodiments it may involve displaying new and/or different information (such as information corresponding to a new current time that is different from when time-scrubbing mode was activated, or information that is newly available or has been updated since time-scrubbing mode was activated). The displayed complications or user interface objects may be updated, upon deactivating time-scrubbing mode, in accordance with any of the animations discussed above with reference to digital clock face 5317 in FIG. 53C. In the depicted example of FIGS. 53C and 53F, touch contacts 5324*a* and 5334*a* are each detected at a location on display 5302 at which a current-time indicator is displayed; in response to detecting either input, device 5300 may cause time-scrubbing mode to be deactivated, and the displayed time indicators and complications may be accordingly updated. In the depicted example, if no information has changed and the time has not changed since the activation of time-scrubbing mode, exiting time-scrubbing mode in FIGS. 53C and 53F may cause the display, respectively, of interface 5340 in FIG. 53A and of interface 5370 in FIG. 53C.

In some embodiments, other user inputs may be operable to cause the device to exit a time-scrubbing mode. In some embodiments, alternate user inputs that may cause a device to exit a time-scrubbing mode may include a depression of a rotatable and depressible input mechanism, such as user inputs 5324*b* and 5334*b* in FIGS. 53C and 53F, respectively. Allowing a user to exit a time-scrubbing mode by depressing a rotatable and depressible input mechanism may increase the ease of scrubbing time forward or backward and then easily exiting time-scrubbing mode when a user is finished with time-scrubbing mode, as commands to execute both functions can be entered with a single input mechanism. In some embodiments, a device may exit a time-scrubbing mode after a predefined period of time of inactivity, such as when a device times out and a display is darkened.

At block 5450, optionally, the device detects a second rotation of the rotatable input mechanism, and, in response to detecting the second rotation of the rotatable input mechanism, the device updates the non-current-time indicator to indicate a third non-current time, determined in accordance with the second rotation, and updates the first user interface object to display information corresponding to the third non-current time, wherein the information corresponding to the third non-current time pertains to the first information source and is information other than a day, a time, or a date of the first non-current time; and displays one of the first current-time indicator and the second current-time indicator. In some embodiments, after detecting a first rotation and setting a first scrubbing time, as described above, a device may then detect another rotation of the same rotational input mechanism, and may set another scrubbing time in accordance with the second rotation. The device may set a second scrubbing time in accordance with any of the methods described above, and may update the displayed user interface object and complications to correspond to the second scrubbing time in accordance with any of the methods described above. In some embodiments, a user may scrub forward or backward in time, pause, and then scrub forward or backward in time again, with or without leaving time-scrubbing mode. In some embodiments, displayed complications may be dynamically updated throughout the process to always reflect the displayed scrubbing time as the user scrubs, pauses, and then scrubs again. In some embodiments, this process may be wholly or partially repeated or iterated any number of times.

In FIG. 54E, block 5402 is continued, such that the additional method blocks are also performed at an electronic device with a display and a rotatable input mechanism.

Blocks 5452 and 5454 follow, optionally, from blocks 5414-5440.

At block 5452, optionally, the device displays a second user interface object configured to display second information corresponding to the current time, wherein the second information corresponding to the current time pertains to a second information source and is information other than a day, time, or date of the current time; and, in response to detecting the first rotation of the rotatable input mechanism: updates the second user interface object to display second information corresponding to the first non-current time, wherein the second information corresponding to the first non-current time pertains to the second information source and is information other than a day, time, or date of the first non-current time.

At block 5454, optionally, the first and second information sources are separate applications.

In some embodiments, a device may display more than one complication or other user interface object, wherein the complications or other user interface objects pertain to separate subject matters, separate information sources, or separate applications of the device. For example, in some embodiments, an interface of a device such as a watch face interface or a home screen interface may display two distinct complications, each complication being associated with a distinct application of the device and each complication drawing information from the respective associated application and displaying the information on the interface. In the depicted example of FIG. 53A, weather complication 5312 and stock-market complication 5314 are distinct complications that may each be associated with a distinct information source and/or application (e.g., a weather application and a stock-market complication, respectively).

In some embodiments, when a user scrubs time forward or backward in any of the manners described above, not just one but both (and, in some embodiments, more than two) of the displayed complications or other user interface objects are simultaneously updated in accordance with the time scrubbing. A second displayed complication or user interface object (in addition to a third, fourth, etc.) may be updated in accordance with scrubbing by any of the methods described above. In some embodiments, all of the complications displayed on an interface may be simultaneously updated in accordance with the displayed non-current time as a user scrubs through time. This may be advantageous because, in some embodiments, a user may be able to observe past information and/or future information of more than one information source or of more than one application without having to separately open each application; this may allow a user to observe and recognize contextual relationships between temporally-related data provided by different applications or different information sources by being able to see information from all applications at once, the information displayed all corresponding to the same past time or to the same future time.

In the depicted example of FIG. 53C, in response to the user scrubbing forward in time by 25 minutes to a scrubbing time of 11:34, weather complication 5312 has been updated in accordance with the scrubbing time to display a forecasted weather temperature of 73° for the scrubbing time of 11:34. At the same time, stock-market complication 5314 has been updated by being removed from interface 5360, in accordance with the fact that no information is available from the stock-market application or information source associated with stock-market complication 5314. (In some embodiments, a second complication having access to information, from an associated application or information source, corresponding to the scrubbing time of 11:34, could display the information alongside the information displayed by weather complication 5312.) Thus, in some embodiments, in order to view future information (or to be informed of a lack of future information) from the distinct and separate applications that are associated with complications 5312 and 5314, a user may not need to separately access each application or separately instruct each application to access and/or display future information; rather, simply by scrubbing to a future time, both complications may be caused to simultaneously access and display future information corresponding to the selected scrubbing time.

It should be understood that the particular order in which the operations in FIG. 54 have been described is merely exemplary and is not intended to indicate that the described order is the only order in which the operations could be performed. One of ordinary skill in the art would recognize various ways to reorder the operations described herein.

Note that details of the processes described above with respect to method 5400 (e.g., FIG. 54) are also applicable in an analogous manner to the methods and techniques described elsewhere in this application. For example, other methods described in this application may include one or more of the characteristics of method 5400. For example, the devices, hardware elements, inputs, interfaces, modes of operation, faces, time indicators, and complications described above with respect to method 5400 may share one or more of the characteristics of the devices, hardware elements, inputs, interfaces, modes of operation, faces, time indicators, and complications described elsewhere in this application with respect to other methods. Moreover, the techniques described above with respect to method 5400 may be used in combination with any of the interfaces, faces, or complications described elsewhere in this application. For brevity, these details are not repeated elsewhere in this application.

Figure 55:
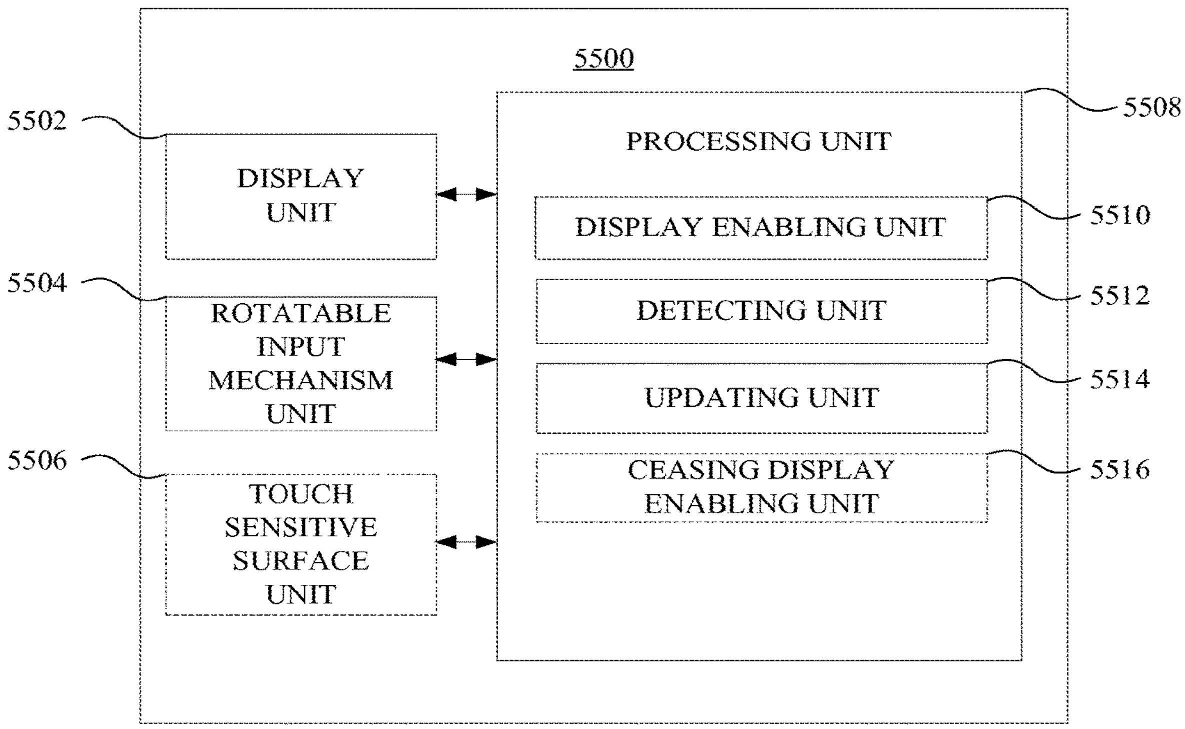
FIG. 55 is a functional block diagram of an electronic device in accordance with some embodiments.

In accordance with some embodiments, FIG. 55 shows an exemplary functional block diagram of an electronic device 5500 configured in accordance with the principles of the various described embodiments. In accordance with some embodiments, the functional blocks of electronic device 5500 are configured to perform the techniques described above. The functional blocks of the device 5500 are, optionally, implemented by hardware, software, or a combination of hardware and software to carry out the principles of the various described examples. It is understood by persons of skill in the art that the functional blocks described in FIG. 55 are, optionally, combined or separated into sub-blocks to implement the principles of the various described examples. Therefore, the description herein optionally supports any possible combination or separation or further definition of the functional blocks described herein.

As shown in FIG. 55, electronic device 5500 includes a display unit 5502 configured to display a graphic user interface including complications, current-time indicators, and non-current-time indicators; electronic device 5500 further includes a rotatable input mechanism unit 5504 configured to receive rotational inputs. Optionally, device 5500 also includes a touch-sensitive surface unit 5506 configured to receive contacts. Device 5500 further includes processing unit 5508 coupled to display unit 5502, rotatable input mechanism unit 5504, and, optionally, touch-sensitive surface unit 5506. Processing unit 5508 contains display enabling unit 5510, detecting unit 5512, and updating unit 5514. Optionally, processing unit 5508 further ceasing display enabling unit 5516.

Processing unit 5512 is configured to: enable display (e.g., with display enabling unit 5510) on display unit 5502 of a first current-time indicator indicating a current time;

enable display (e.g., with display enabling unit 5510) on display unit 5502 of a first user interface object configured to display information corresponding to the current time, wherein the information corresponding to the current time pertains to a first information source and is information other than a day, time, or date of the current time; detect (e.g., with detecting unit 5512) a first rotation of rotatable input mechanism unit 5504; in response to detecting the first rotation of rotatable input mechanism unit 5504: enable display (e.g., with display enabling unit 5510) on display unit 5502 of a non-current-time indicator indicating a first non-current time determined in accordance with the first rotation; update (e.g., with updating unit 5514) the first user interface object to display information corresponding to the first non-current time, wherein the information corresponding to the first non-current time pertains to the first information source and is information other than a day, time, or date of the first non-current time; and enable display (e.g., with display enabling unit 5510) on display unit 5502 of one of the first current-time indicator and a second current-time indicator.

In some embodiments, processing unit 5508 is further configured to: in response to detecting the first rotation of the rotatable input mechanism unit 5504: update (e.g., with updating unit 5514) the first user interface object to indicate a lack of information corresponding to the first non-current time.

In some embodiments, the first non-current time is a future time.

In some embodiments, the information corresponding to the first non-current time comprises projected data.

In some embodiments, the information corresponding to the first non-current time comprises a scheduled event.

In some embodiments, the first non-current time is a past time.

In some embodiments, the information corresponding to the first non-current time comprises historical data.

In some embodiments, enabling display (e.g., with display enabling unit 5510) on display unit 5502 of the first current-time indicator in response to detecting the first rotation comprises enabling display on display unit 5502 of the first current-time indicator with a modified visual appearance.

In some embodiments, enabling display (e.g., with display enabling unit 5510) on display unit 5502 of the first current-time indicator in response to detecting the first rotation comprises enabling display on display unit 5502 of the first current-time indicator in a different position on the display than a position at which it was displayed prior to detecting the first rotation.

In some embodiments, enabling display (e.g., with display enabling unit 5510) on display unit 5502 of the first current-time indicator in response to detecting the first rotation comprises animating the first current-time indicator from its initial position to the different position on the display.

In some embodiments, the non-current-time indicator is displayed at a location at which the first current-time indicator was displayed before the detection of the first rotation of rotatable input mechanism unit 5504.

In some embodiments, processing unit 5508 is further configured to: in response to detecting the first rotation of rotatable input mechanism unit 5504, enable display (e.g., with display enabling unit 5510) on display unit 5502 of a time difference indicator indicating a time difference between the current time and the first non-current time.

In some embodiments, processing unit 5508 is further configured to: before detecting the first rotation of rotatable input mechanism unit 5504, detect (e.g., with detecting unit 5512) a first touch contact at a location corresponding to the first current-time indicator; and in response to detecting the first touch contact: enable display (e.g., with display enabling unit 5510) on display unit 5502 of the non-current-time indicator indicating the current time.

In some embodiments, processing unit 5508 is further configured to: in response to a passage of time, update (e.g., with updating unit 5514) the non-current-time indicator to indicate a second non-current time in accordance with the passage of time, such that a time difference between the current time and a presently indicated non-current time remains fixed.

In some embodiments, processing unit 5508 is further configured to: while enabling display on display unit 5502 of the updated first user interface object displaying information corresponding to the first non-current time, detect (e.g., with detecting unit 5512) a second touch contact at a location corresponding to the updated first user interface object; and in response to detecting the second touch contact, enable display (e.g., with display enabling unit 5510) on display unit 5502 of a user interface corresponding to the first user interface object.

In some embodiments, the user interface corresponds to the first non-current time.

In some embodiments, processing unit 5508 is further configured to: after detecting the first rotation of rotatable input mechanism unit 5504, detect (e.g., with detecting unit 5512) a third touch contact at a location corresponding to the first current-time indicator; and in response to detecting the third touch contact: cease to enable display (e.g., with ceasing display enabling unit 5518) on display unit 5502 of the non-current-time indicator; and update (e.g., with updating unit 5514) the first user interface object to display information corresponding to the current time.

In some embodiments, processing unit 5508 is further configured to: detect (e.g., with detecting unit 5512) a second rotation of rotatable input mechanism unit 5504; in response to detecting the second rotation of rotatable input mechanism unit 5504: update (e.g., with updating unit 5514) the non-current-time indicator to indicate a third non-current time determined in accordance with the second rotation; update (e.g., with updating unit 5514) the first user interface object to display information corresponding to the third non-current time, wherein the information corresponding to the third non-current time pertains to the first information source and is information other than a day, time, or date of the first non-current time; and enable display (e.g., with display enabling unit 5510) on display unit 5502 of one of the first current-time indicator and the second current-time indicator.

In some embodiments, processing unit 5508 is further configured to: enable display (e.g., with display enabling unit 5510) on display unit 5502 of a second user interface object configured to display second information corresponding to the current time, wherein the second information corresponding to the current time pertains to a second information source and is information other than a day, time, or date of the current time; and in response to detecting the first rotation of rotatable input mechanism unit 5504: update (e.g., with updating unit 5514) the second user interface object to display second information corresponding to the first non-current time, wherein the second information corresponding to the first non-current time pertains to the second information source and is information other than a day, time, or date of the first non-current time.

In some embodiments, the first and second information sources are separate applications.

The operations described above with reference to FIGS. 54A-54E are, optionally, implemented by components depicted in FIG. 1A, 1B, 2, 3, 4A, 4B, 5A, 5B, 53A, 53B or 55. For example, displaying operations 5404, 5406, 5416, and 5432; detecting operation 5412; and updating operation 5422 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A, 1B, 2, 3, 4A, 4B, 5A, 5B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

FIGS. 56A-56I show exemplary context-specific user interfaces that may be operated on device 5600. Device 5600 may be device 100, 300, or 500 in some embodiments. In some embodiments, the electronic device has a touch-sensitive display (e.g., touchscreen 504).

Device 5600 displays user interface screen 5602 which includes a plurality of affordances representing various event data from two or more distinct applications (e.g., email, calendar, notification). Event data include any data that are associated with a time or a time period, such as, non-exclusively, meeting data from a calendar application, messaging data from a messaging application, email data from an email application, notification data for certain events from a notification application. Affordances representing event data from the different applications are arranged to serve as an immediate notification to the user of times and schedules associated with the event data.

Figure 56A:
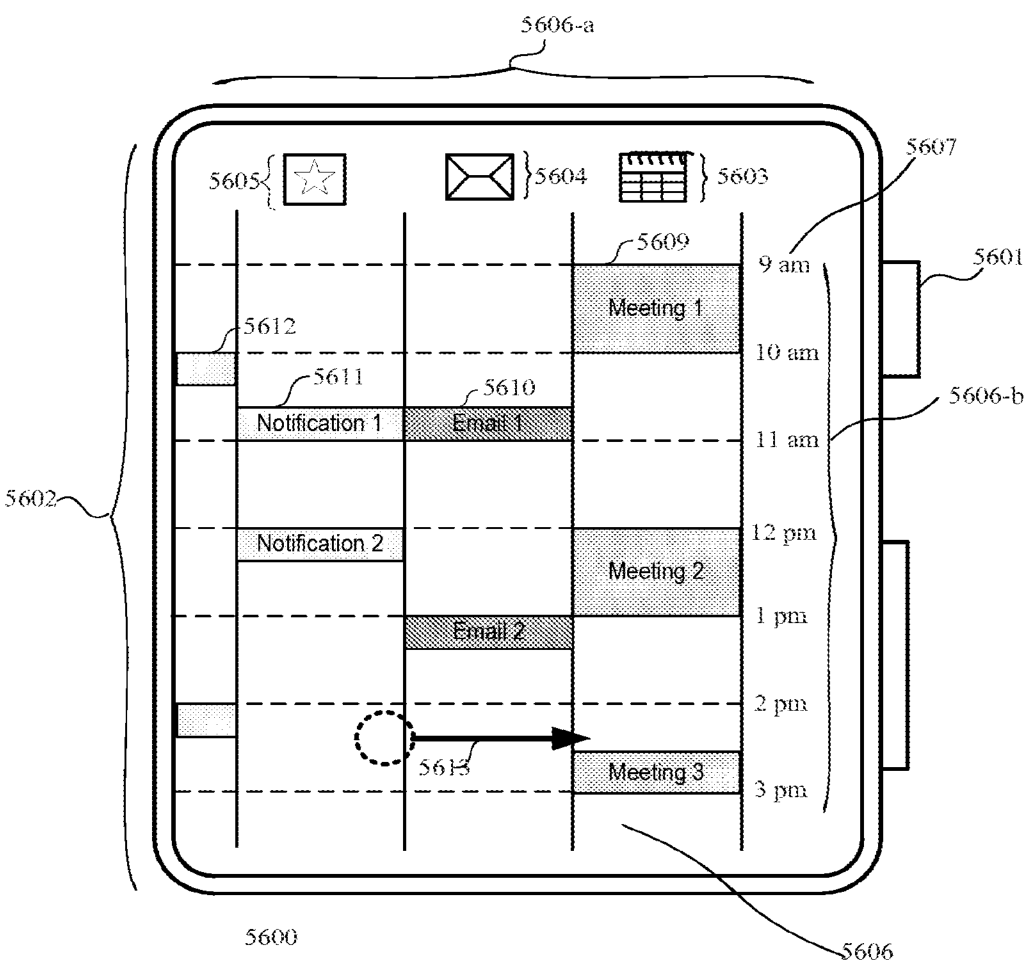
FIGS. 56A-56I illustrate exemplary context-specific user interfaces.

In some embodiments, as shown in FIG. 56A, user interface screen 5602 includes a timeline (e.g., 5606) with a plurality of columns (e.g., 5606-*a*) and rows (e.g., 5606-*b*). The plurality of columns 5606-*a* represent applications (e.g., a calendar application, an email application, a notification application, etc.), and the plurality of rows 5606-*b* represent times (e.g., 9 am, 10 am, 11 am, 12 pm, 1 pm, 2 pm, 3 pm, etc.). By placing affordances representing events at appropriate columns and rows, the timeline can easily and efficiently inform the user of the upcoming events and their associated times and applications.

In FIG. 56A, each column includes an affordance (e.g., 5603, 5604, or 5605) that represents an application. For example, the first column includes affordance 5603 representing a calendar application. The second column includes affordance 5604 representing an email application. The third column includes affordance 5605 representing a notification application. There are additional columns to the right and/or left of the displayed portion of timeline 5606 representing further applications than the displayed applications. Further, a part of the fourth column is displayed in user interfaces screen 5602, suggesting that there is at least one additional column to the left of the displayed portion in the timeline.

Similarly, each row includes an affordance (e.g., number 5607, or other graphics or texts) that represents a time or a time period. The first row is displayed between affordance 5607 representing 9:00 am and affordance representing 10 am, thus representing a one-hour time block from 9 am to 10 am. Subsequent rows are displayed between affordances representing the later hours to represent different time blocks at an interval of a one-hour time period (e.g., second row representing a one-hour time block from 10 am to 11 am, third row representing from 11 am to 12 pm, etc.). There may be additional rows below and above the displayed portion of the timeline 5606 representing times beyond the displayed hours (such as, for example, 8 am, 7 am, 6 am, etc., above the displayed portion, and 4 pm, 5 pm, 6 pm, 7 pm etc., below the displayed portion).

In FIG. 56A, representations of event data obtained from the two or more different applications (e.g., affordances 5609, 5610, 5611, 5612) are arranged relative to each other according to their associated times and applications. In the illustrated example, affordance 5609 represents a meeting event from a calendar application, which is scheduled from 9 am to 10 am. Thus, affordance 5609 is displayed at a first column indicating the calendar application (with affordance 5603) and at a first row representing an hour block from 9 am to 10 am. Affordances for additional meeting(s) from the calendar application (e.g., affordances for "Meeting 2" and "Meeting 3") are arranged in the first column and at appropriate rows representing the respective times associated with those additional meeting data. For example, the illustrated user interface screen 5602 notifies the user that "Meeting 2" from the calendar application is scheduled for an hour from 12 pm to 1 pm, and "Meeting 3" from the calendar application is scheduled for half an hour from 2:30 pm to 3 pm. As such, an appropriate arrangement of the affordances in a grid timeline may immediately notify the user of any upcoming events along with the nature of those events as well as the times scheduled for each event.

Similarly, in the illustrated example, affordance 5610 represents email data obtained from an email application which is associated with time 10:30 am (e.g., a time at which the email was received). Thus, affordance 5610 is displayed at a second column indicating the email application (with affordance 5604) and at a row indicating 10:30 am. Although the email data is associated with a specific time point, rather than a time block, the affordance representing the email data may be displayed, as shown in the illustrated example, to occupy a time block (e.g., 30 minutes, 15 minutes) starting from the specific time point associated with the email data. Affordances for additional email data from the email application are arranged in the second column and at appropriate rows representing the respective times associated with those additional email data. For example, the illustrated user interface screen 5602 notifies the user that "Email 2" from the email application was received at 1:00 pm.

Further, affordance 5611 represents notification data for a particular event (e.g., a software update, a backup schedule, etc.) obtained from a notification application where the event is scheduled to run at 10:30 am. The event represented by the notification data may be, non-exclusively, a software update schedule, a backup schedule, or any other device schedules that may warrant a forewarning. In the illustrated example, affordance 5611 representing the notification data is displayed at a third column indicating the notification application (with affordance 5605) and at a row indicating a 30-minute time block from 10:30 am. The notification data may be associated with a specific time point (e.g., a time at which the associated event is scheduled to start) or a time block (e.g., if the device has information regarding an estimated duration for which the associated event is scheduled to run, etc.). Affordances for additional notification data from the notification application are arranged in the third column and at appropriate rows representing the respective times associated with the additional notification data. For example, the illustrated user interface screen 5602 notifies the user that "Notification 2" (e.g., for another event such as a software update, a backup, etc.) from the notification application is scheduled at 12:00 pm.

Further, in some embodiments, as shown in FIG. 56A, the user interface (e.g., timeline 506) provides the user with the ability to correlate and cross-reference information from different applications, by time. For example, one can see that Email 2 was received right after Meeting 2 and may be related to the meeting.

In some embodiments, as shown in FIG. 56A, user interface screen 5602 displays a portion of the user interface (e.g., timeline 5606) due to limitations on the display size. The display of a portion of the fourth column with representation 5612 suggests that there is at least one additional column representing an additional application to the left of the displayed portion of the user interface (e.g., timeline 5606). As such, in cases where the user interface screen 5602 displays a portion smaller than the entirety of the user interface (e.g., timeline 5606), a user can scroll the user interface to navigate through different portions (e.g., replace the current portion with display of a different portion). For example, a user may provide an input to scroll the user interface using a finger gesture (e.g., a swipe gesture) on a touch sensitive display of device 5600, a stylus gesture, a hand motion, or a rotatable input mechanism (e.g., 5601) of device 5600, etc.

In FIG. 56A, a user provides an input corresponding to a request to scroll the user interface (e.g., timeline 5606) in a rightward direction, by making a rightward finger swipe gesture (e.g., 5613 in FIG. 56A) on a touch-sensitive display of device 5600. In response to detecting the finger swipe gesture 5613, device 5600 scrolls the user interface (e.g., timeline 5606) such that the portion shown in the user interface screen 5602 is replaced with the portion shown in 5602*b* in FIG. 56B.

Figure 56B:
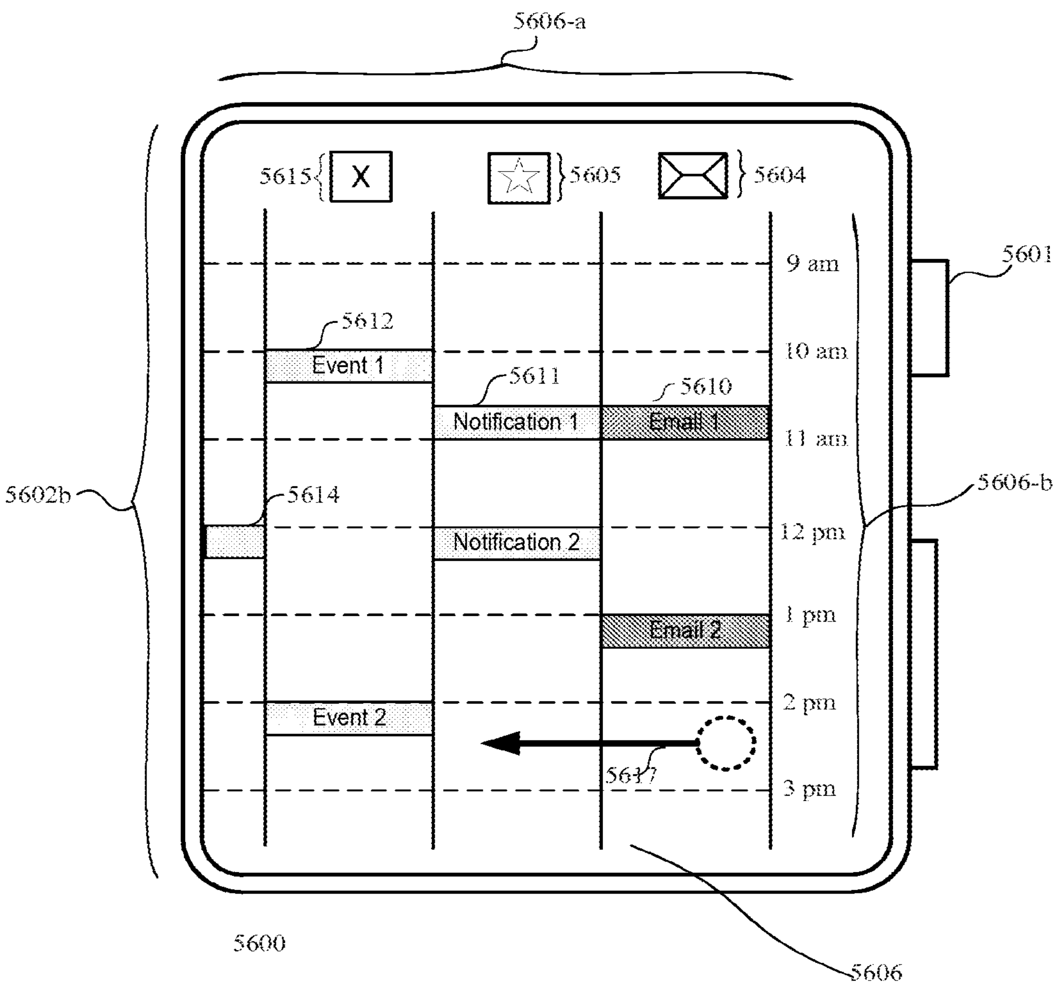

In FIG. 56B, user interface screen 5602*b* displays a different portion of the user interface (e.g., timeline 5606) that includes a full view of the fourth column (which was only partially displayed in the previous portion shown in FIG. 56A). The fourth column includes representation of "X" application (e.g., affordance 5615). The "X" application is, optionally, a second calendar application, a second email application, a messaging application, a health-related application, a game application, or any other application that can create an event or provide data associated with a time or a time period. Event data from the "X" application are represented with affordances (e.g., affordance 5612 for "Event 1" and affordance for "Event 2") which are arranged in the fourth column and at appropriate rows according to the respective times associated with the event data.

Optionally, a user is allowed to modify settings associated with the user interface (e.g., timeline 5606) to remove, add or change applications from which device 5600 obtains the event data and to ultimate organize and display on the user interface (e.g., timeline). For example, a user may change the settings so that device 5600 obtains event data only from the default email application and default calendar application to simplify the timeline, etc. Further, a user may modify the settings to rearrange the order of the applications represented by the columns of the timeline. For example, a user may rearrange the order of the applications so that the first column (the leftmost column in FIG. 56A) represents an email application not a calendar application, etc.

Further, device 5600 may obtain event data from various applications not only running on device 5600 but also running on different devices that are connected to device 5600 via a communication medium (e.g., Bluetooth, Wi-Fi, cellular data network, mobile satellite network, wireless sensor network, wired or wireless communication medium). For example, a wearable device 5600 is connected to a second device (e.g., a mobile phone, a tablet, a computer) via a wireless medium and obtains event data from applications on the second device. In some embodiments, device 5600 may download event data from a cloud storage connected to a plurality of different devices.

Moreover, a user is further allowed to modify the settings associated with the user interface (e.g., timeline 5606) to selectively obtain the event data from the applications (e.g., device 5600 is set to obtain only the event data that meet certain criteria from a certain application). For example, a user adjusts the setting to obtain only the event data from the notification application that meet priority criteria, which are met, for example, when the associated events (e.g., software update, backup, etc.) are scheduled to start within 24 hours from the current time, require a turn-off of device 5600, require Internet connection, and/or otherwise require user actions, etc. In another example, the device obtains only the event data from the calendar application that meet priority criteria which are met, for example, when the associated meetings are scheduled to start within 24 hours from the current time, and/or require the user attendance, etc. Optionally, priority criteria are different for different applications.

Referring back to FIG. 56B, device 5600 detects an input corresponding to a request to scroll the user interface (e.g., timeline 5606) in a left direction (e.g., detecting a leftward finger swipe gesture 5617). In response to detecting the leftward finger swipe gesture 5617, device 5600 scrolls the user interface (e.g., timeline 5606) in a left direction, for example, to return to the display 5602 shown in FIG. 56A.

Optionally, as shown in the illustrated examples, an input corresponding to a request to scroll the user interface is a finger swipe gesture on a touch sensitive display of device 5600. A finger swipe gesture in a first direction (e.g., left, right, up and down) corresponds to a request to scroll the user interface in that first direction.

In some embodiments, horizontal scrolling allows a user to navigate through columns of different applications (e.g., swiping through columns of applications while being fixed on one or more displayed times), while vertical scrolling allows a user to navigate through rows of different times (e.g., swiping through rows of times while being fixed on displayed one or more applications). Optionally, a concurrent vertical and horizontal scrolling (e.g., a two-dimensional scrolling, a diagonal scrolling) allows a user to navigate through columns and rows at the same time.

Figure 56C:
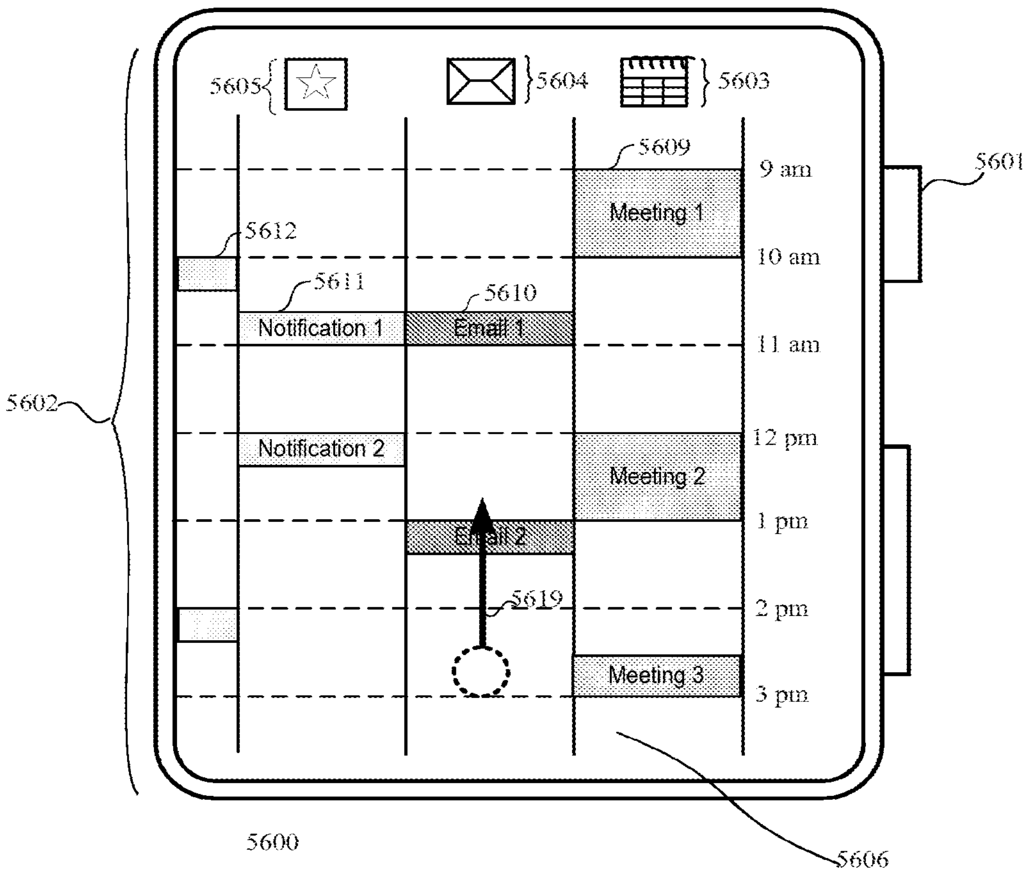

For example, as shown in FIG. 56C, a user provides an input corresponding to a request to scroll the user interface (e.g., timeline 5606) in a vertical direction by making an upward finger swipe gesture (e.g., 5619). In response to detecting the upward finger swipe gesture 5619, device 5600 scrolls the user interface (e.g., timeline 5606) in the direction of the finger swipe (the upward direction) to display additional rows of times representing later hours than the previously displayed portion, as shown in FIG. 56D.

Figure 56D:
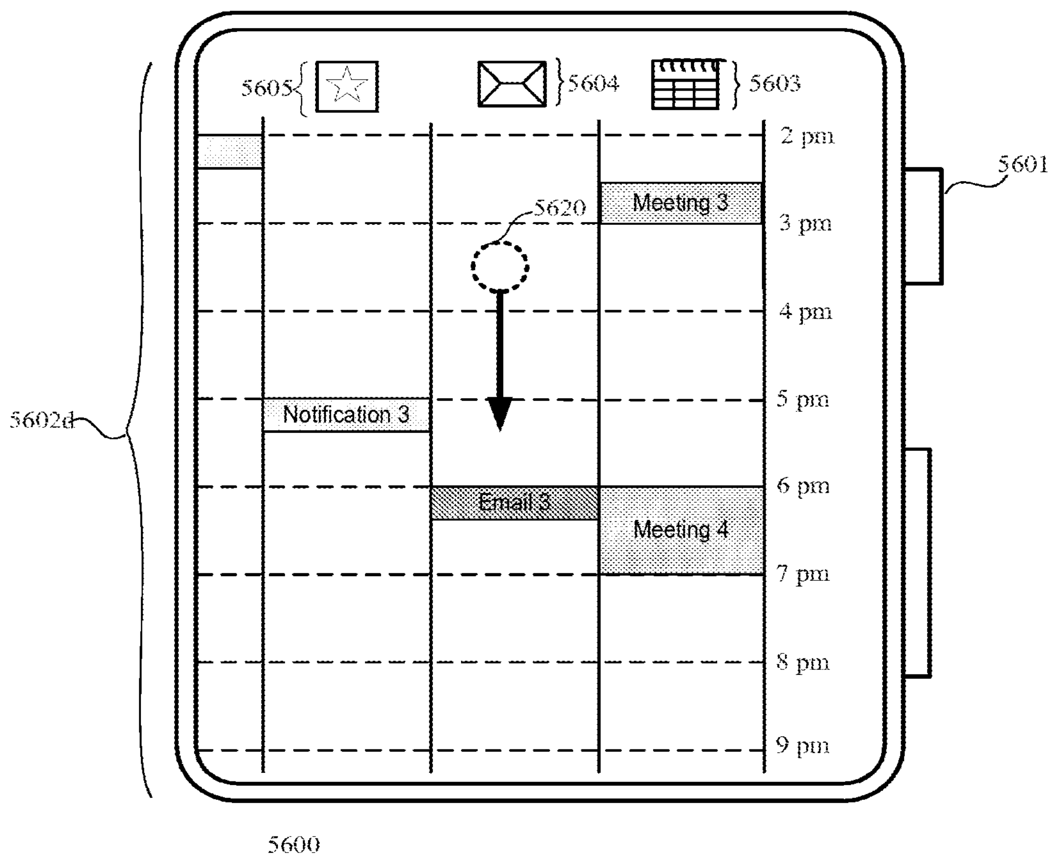

As shown in FIG. 56D, scrolling in response to the upward finger swipe gesture 5619 causes the display of the portion shown in the previous user interface screen 5602 in FIG. 56C to be replaced with display of a different portion shown in the new user interface screen 5602*d* in FIG. 56D. The new user interface screen 5602*d* displays rows representing the additional rows of time below the previously displayed portion, representing the later hours such as 4 pm, 5 pm, 6 pm, etc. Additional affordances (e.g., affordances for "Meeting 3," "Meeting 4," "Email 3," and "Notification 3") associated with the later hours are also displayed in the new portion shown in FIG. 56D.

In some embodiments, device 5600 detects an input corresponding to a request to scroll the user interface in the opposite direction (e.g., downward finger swipe gesture 5620), as shown in FIG. 56D. In response to detecting the downward finger swipe gesture 5620, device 5600 scrolls the user interface in the downward direction, for example, to return to the screen 5602 shown in FIG. 56C. As will be apparent to persons of ordinary skill in the art, the amount by which the user interface (e.g., timeline 5606) is scrolled can be determined based on various factors of the scroll input (e.g., the amount by which the finger is swiped, the velocity of the finger swipe, the amount by which the rotatable input mechanism is rotated, etc.), which are deemed within the scope of the present application.

In some embodiments, as shown in the illustrated examples, an input corresponding to a request to scroll the user interface is a finger swipe gesture (e.g., a finger swipe in a first direction corresponds to a request to scroll the user interface in the first direction). Alternatively or additionally, an input corresponding to a request to scroll the user interface is rotation of rotatable input mechanism 5601 provided on a side of device 5600.

In some embodiments, rotatable input mechanism 5601 can be pulled out to have different positions (e.g., a first position if pulled out by a first amount, a second position if pulled out by a second amount, etc.). If a user rotates rotatable input mechanism 5601 while rotatable input mechanism 5601 is in a first position, the rotation causes the user interface (e.g., timeline 5606) to scroll in a vertical direction (e.g., upward rotation causes upward scrolling, and downward rotation causes downward scrolling). If a user rotates input mechanism 5601 while rotatable input mechanism 5601 is in a second position, the rotation causes the user interface (e.g., timeline 5606) to scroll in a horizontal direction (e.g., upward rotation causes rightward scrolling, and downward rotation causes leftward scrolling).

Figure 56E:
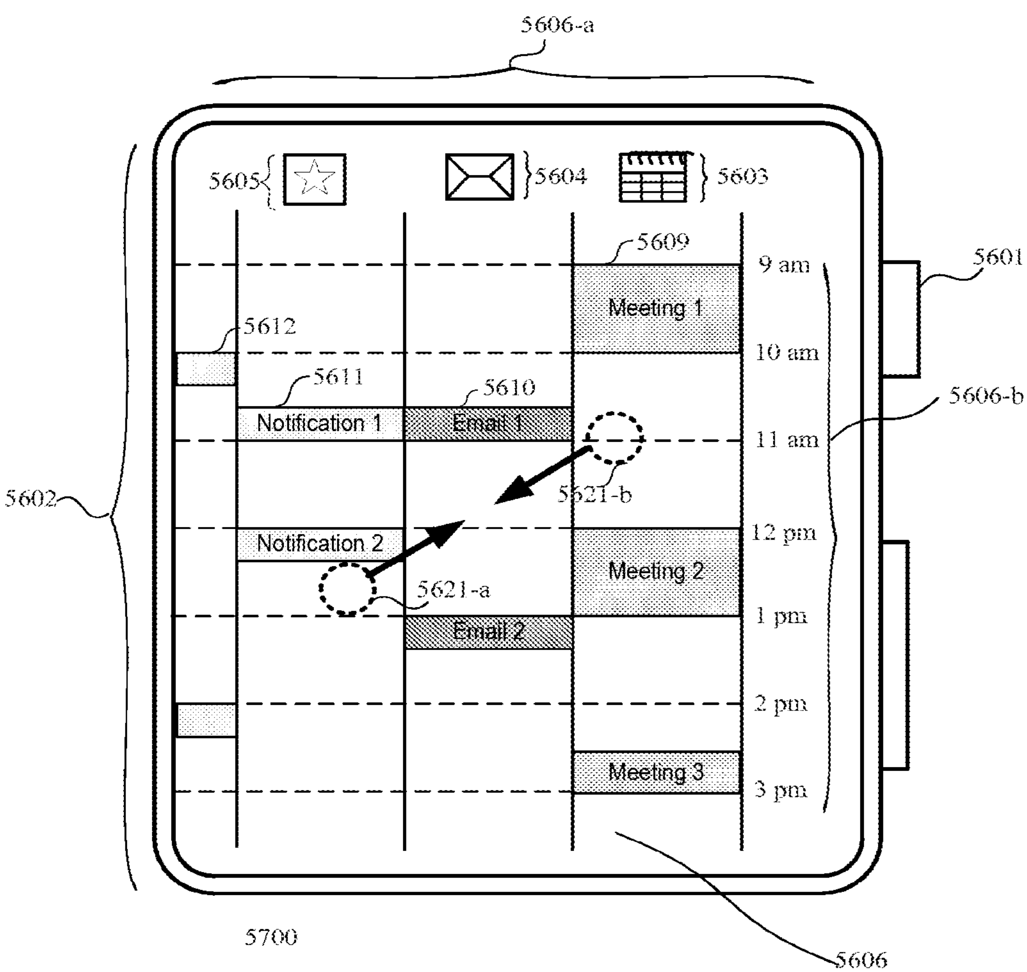
Figure 56F:
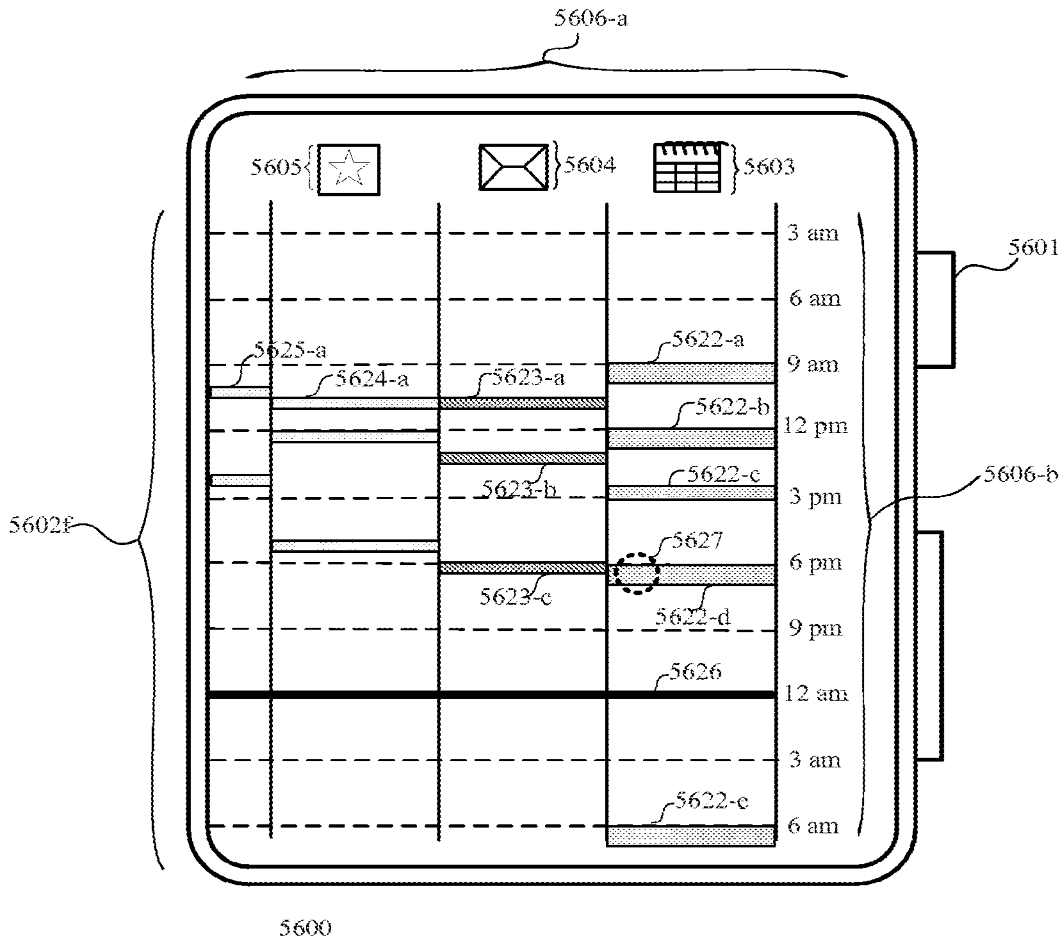
Figure 56G:
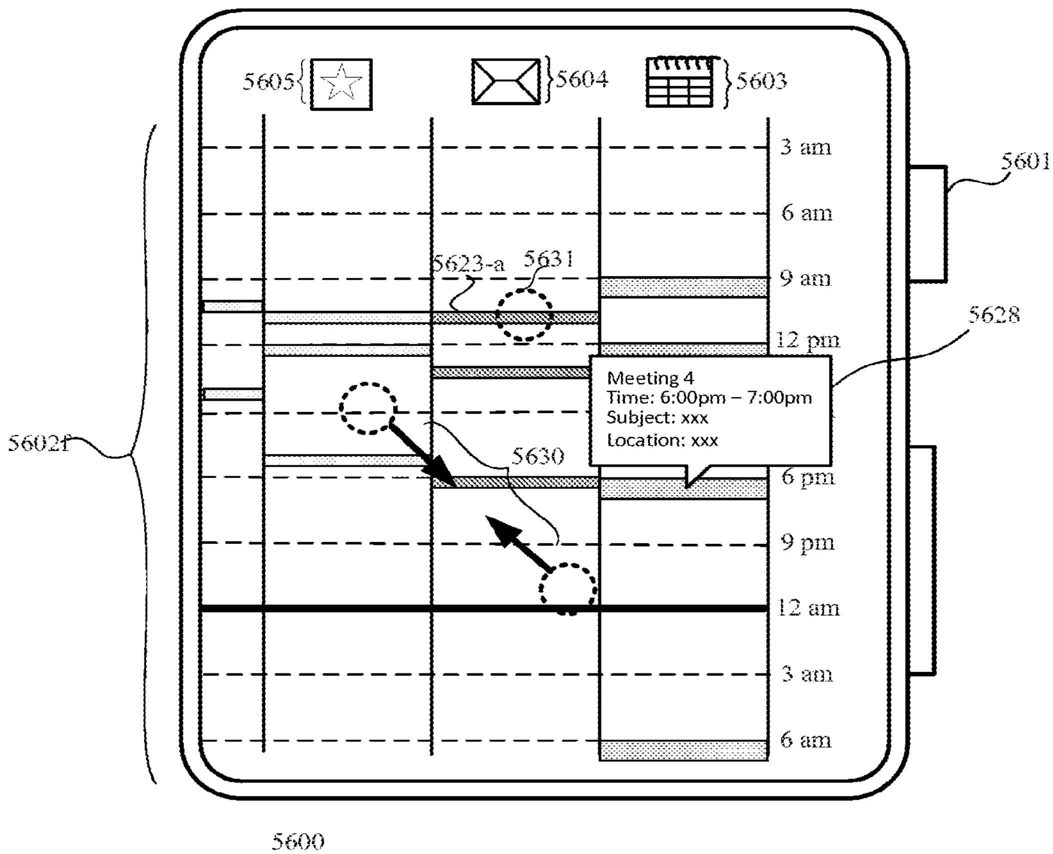

Further, in some embodiments, a user may provide an input corresponding to a request to zoom in or out the user interface (e.g., timeline 5606), as shown in FIGS. 56E-56G. For example, the user interface (e.g., timeline 5606), which displays representations of event data arranged relative to each other based on their associated times and applications, includes a plurality of views (e.g., a first level view, a second level view, a third level view, etc.). The plurality of views of the user interface (e.g., timeline) can be navigated from one to another by zooming in or out the view of the user interface.

In some embodiments, the different views of the user interface (e.g., timeline) have rows representing time blocks of a different interval. For example, a gap of two adjacent rows in a first level view of the timeline (e.g., 5602 in FIG. 56E) represents an interval of an one-hour time period; a gap of two adjacent rows in a second level view represents an interval of a two-hour time period; a gap of two adjacent rows in a third level view (e.g., 5602*f* in FIG. 56F) represents an interval of a three-hour time period; a gap of two adjacent rows in a fourth level view represents an interval of a four-hour time period; and so on. One or more views of the plurality of views of the user interface (e.g., timeline) may have a view that is different from a grid timeline, including, non-exclusively, a list view listing events in a chronological order (e.g., 5602*i* in FIG. 56I), or any other view properly formatted to notify the user of upcoming events aggregated from two or more distinct application.

In some embodiments, as shown in FIG. 56E, a user provides an input corresponding to a request to zoom out the user interface (e.g., timeline 5606) by making a multi-point finger gesture on a touch-sensitive display of device 5600 (e.g., a pinch-in gesture including two touch points 5621-*a* and 5621-*b* moving closer to each). In response to detecting the input corresponding to a request to zoom out the user interface (e.g., timeline 5606), device 5600 replaces the view 5602 in FIG. 56E with display of a different view 5602*f* of the user interface shown in FIG. 56F. The zoomed-out view 5602*f* in FIG. 56F includes rows representing a bigger time gap (e.g., a gap of two adjacent rows in the view 5602*f* represents a time gap of three hours, whereas a gap of two adjacent rows in the previous view 5602 in FIG. 56E represents a time gap of only one hour).

Optionally, in accordance with the zoomed-out view 5602*f* in FIG. 56F, the size of the corresponding representations of the event data are also reduced, as shown in the reduced scale affordances 5622-*a* through 5652-*e*, 5623-*a* through 5623-*c*, 5624-*a*, and partial affordance 5625-*a* in FIG. 56F. For example, in the first column associated with the calendar application, affordance 5622-*a* is a reduced scale representation of the "Meeting 1" associated with a one-hour time block from 9:00 am to 10:00 am (e.g., in FIG. 56E); affordance 5622-*b* is a reduced scale representation of the "Meeting 2" associated with a one-hour time block from 12:00 pm to 1:00 pm (e.g., in FIG. 56E); affordance 5622-*c* is a reduced scale representation of the "Meeting 3" associated with a 30-minute time block from 2:30 pm to 3:00 pm (e.g., in FIG. 56E); affordance 5622-*d* is a reduced scale representation of the "Meeting 4" associated with a one-hour time block from 6:00 pm to 7:00 pm (e.g., in FIG. 56D); affordance 5622-*e* is a reduced scale representation of a first meeting the next day associated with a one-hour time block from 6:00 am to 7:00 am.

In the second column associated with the email application, affordance 5623-*a* is a reduced scale representation of the "Email 1" associated with time 10:30 am (e.g., in FIG. 56E); affordance 5623-*b* is a reduced scale representation of the "Email 2" associated with time 1:00 pm (e.g., in FIG. 56E); affordance 5623-*c* is a reduced scale representation of the "Email 3" associated with time 6:00 pm (e.g., in FIG. 56D). Further, in the third column, affordances representing events from the notification application from 3 am until 6 am of the next day are provided in the user interface screen 5602 (e.g., affordance 5624-*a* is a reduced scale representation of the "Notification 1" associated with time 10:30 am in FIG. 56E). In the partially-displayed fourth column, the reduced scale representations for the events are similarly provided (e.g., affordance 5625-*a* is a reduced scale representation of the "Event 1" from the "X" application shown in FIG. 56B).

In some embodiments, as shown in the illustrated example in FIG. 56F, the zoomed-out view may include representations of event data associated with more than a single day. The view 5602*f* covers from 3 am to 6 am of the next day. Optionally, the change of day is visually indicated using a day separator (e.g., 5626). By way of example, day separator 5626 is a line having different visual characteristics (e.g., thickness, color, shape such as solid or dotted, etc.) than other lines representing the rows of times (e.g., dotted lines in FIG. 56F).

In some embodiments, as shown in the illustrated example in FIG. 56F, a reduced scale representation (e.g., affordances 5622-*a* to 5622-*e*, 5623-*a* to 5623-*c*, 5624-*a*, and 56245-*a* in FIG. 56F) includes less textual information about the associated event data than a regular scale representation (e.g., affordances 5609, 5610, 5611, and 5612 in FIG. 56E), due to the reduced size. Optionally, reduced scale representations include no textual information.

However, in some embodiments, the zoomed-out view 5602*f* can allow a user to see more detailed information about a respective event by requesting to display a callout view of the respective event. As shown in FIG. 56F, a user provides an input corresponding to a request to display a callout view of a selected event by making a finger tap gesture (e.g., 5627) on affordance 5622-*d* (which is a reduced scale representation of the "Meeting 4" associated with a one-hour time block from 6:00 pm to 7:00 pm as shown in FIG. 56D).

In response to detecting the input corresponding to a request to display more detailed information about the respective event 5622-*d*, device 5600 displays a callout view (e.g., 5628), as shown in FIG. 56G, containing the detailed information about the "Meeting 4" represented by the touched affordance 5622-*d*. The detailed information about a calendar event includes, for example, a meeting title, a meeting time, a location, a subject, etc., as shown in callout view 5628 in FIG. 56G. Optionally, the callout view 5628 is displayed proximate to the touched affordance 5622-*d* and overlying at least a portion of the affordance 5622-*d*.

In some embodiments, an input corresponding to a request to display more detailed information about a respective event is a finger tap gesture, as shown in the illustrated examples. Optionally, an input corresponding to a request to display more detailed information about a respective event is a push gesture on a depressible crown 5601 of device 5600. For example, a user may move a current focus (e.g., an affordance with a current focus is highlighted) among the displayed affordances, and as the crown 5601 is depressed, the affordance with a current focus is selected.

Figure 56H:
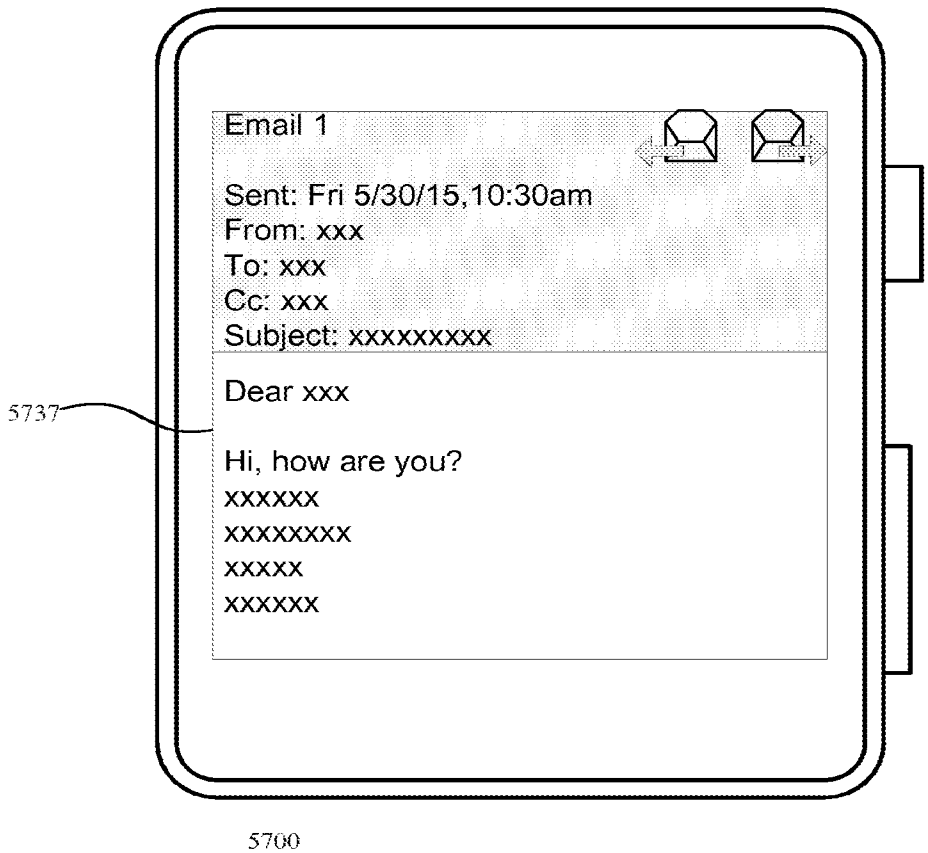

Moreover, device 5600 allows a user to provide an input corresponding to a request to replace the user interface (e.g., timeline 5606) with an application view, as shown in FIGS. 56G and 56H. In FIG. 56G, a user provides an input to end the timeline view and enter an application view by making a tap and hold gesture (e.g., 5631) on affordance 5623-*a* representing the "Email 1" data from the email application. Optionally, the tap and hold gesture is a touch contact held for more than a predetermined time period (e.g., 2 seconds, 3 seconds, 4 seconds, etc.).

In response to detecting the input corresponding to a request to replace the timeline user interface with an application user interface (e.g., tap and hold gesture 5631 in FIG. 56G), device 5600 replaces the display of the user interface screen 5602*f* in FIG. 56G with display of an email application user interface (e.g., 5637 in FIG. 56H) associated with the selected "Email 1" event data. The email application user interface 5637 includes information related to the selected event data "Email 1," such as the subject field, from/to field, received time field, at least a portion of the body of message field, etc.

Optionally, an input corresponding to a request to replace the user interface (e.g., timeline) with an associated application user interface is a sustained push gesture on a depressible button of crown 5601 for more than a predetermined time period.

Figure 56I:
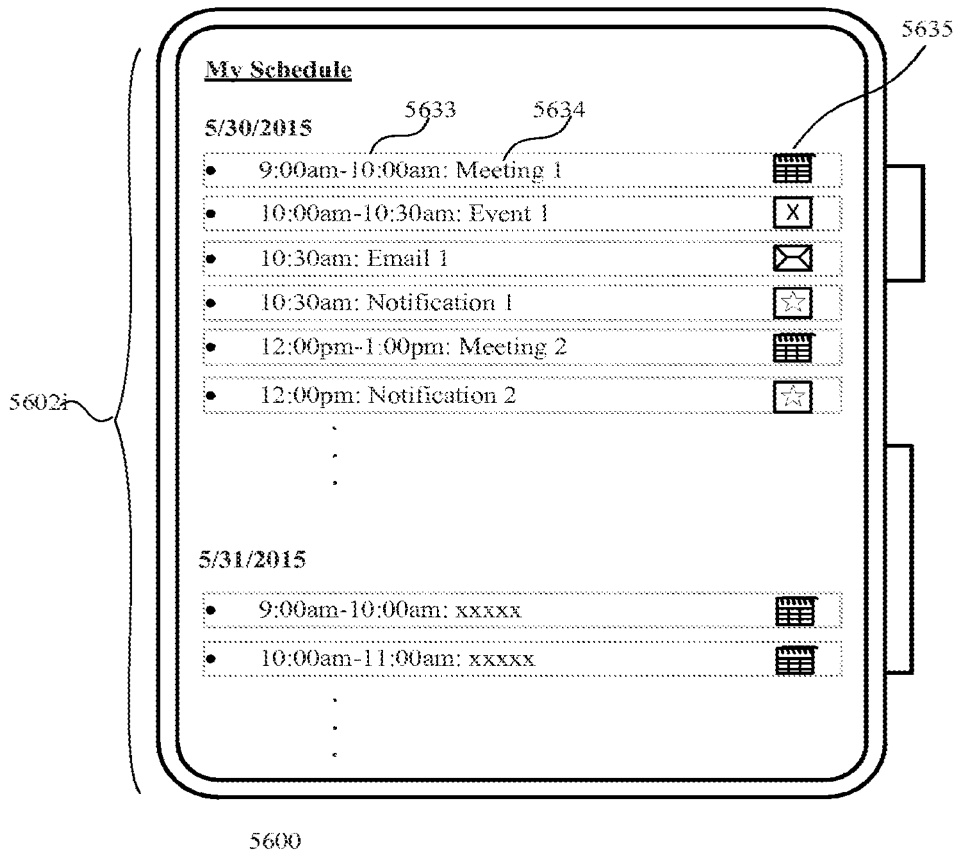
Figure 57E:
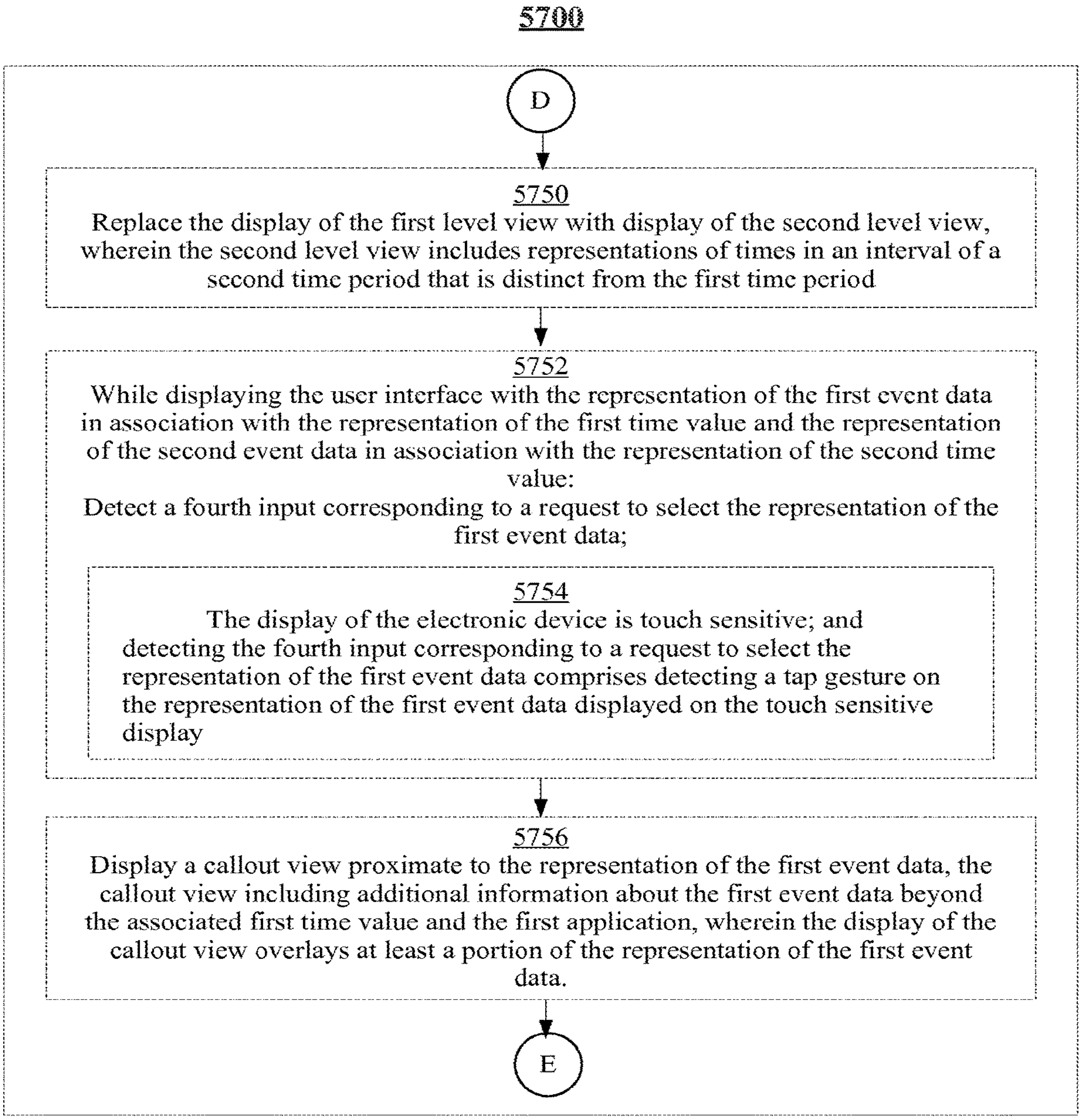
FIG. 57E is a flow diagram illustrating a process for context-specific user interfaces.
Figure 57F:
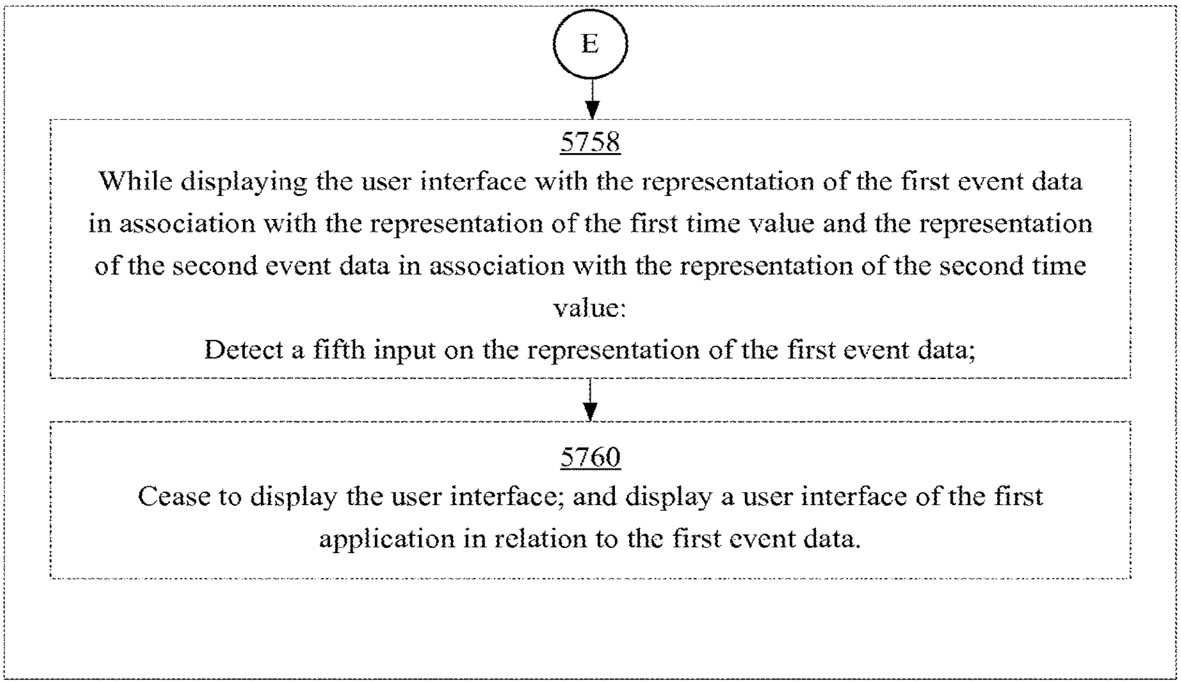
FIG. 57F is a flow diagram illustrating a process for context-specific user interfaces.

Referring to back to FIG. 56G, in response to detecting an input (e.g., pinch-in gesture 5630) corresponding to a request to further zoom out the view 5602*f*, device 5600 brings up a next level view (e.g., 5602*i*) shown in FIG. 56I. This view 5602*i* is not a grid timeline view, but a list view listing events in a chronological order. Optionally, the view 5602*i* displays a list of events for a first day (e.g., May 30, 2015) concurrently with a list of events for a second day (e.g., May 31, 2015), as shown in FIG. 56I.

In some embodiments, as shown in the illustrated example in FIG. 56I, each listed event is displayed with its associated time(s) (e.g., 5633), brief summary (e.g., 5634), and/or affordance representing the associated application (e.g., 5635). Optionally, each list is separately scrollable such that a user can scroll the top list without affecting the bottom list in FIG. 56I.

Further, in the illustrated examples, device 5600 replaces the zoomed out view with a lower level view (e.g., zoomed-in view) in response to detecting an input corresponding to a request to zoom in the view (e.g., pinch out gesture (not shown)).

FIGS. 57A-57F illustrate a flow diagram illustrating process 5700 for providing context-specific user interfaces (e.g., user interface including timeline 5606 shown in FIGS. 56A-56I). In some embodiments, process 5700 may be performed at an electronic device with a touch-sensitive display, such as device 100 (FIG. 1A), 300 (FIG. 3), 500 (FIG. 5) or 600 (FIGS. 6A and 6B). Some operations in process 5700 may be combined, the order of some operations may be changed, and some operations may be omitted. Process 5700 provides context-specific user interfaces that give the user an immediate indication of various event data and associated times from at least two different applications, thus, providing a comprehensive and organized schedule of a day for the user.

At block 5702, the device with a display, a memory and one or more processors is turned on. At block 5704, the device obtains first event data from a first application (e.g., event data of "Meeting 1" from a calendar application in FIG. 56A). At block 5706, the device obtains second event data from a second application distinct from the first application (e.g., event data of "Email 1" from an email application in FIG. 56A). At block 5708, the device determines a first time value (e.g., 9 am-10 am associated with the "Meeting 1") associated with the first event data and a second time value (e.g., 10:30 am associated with the "Email 1") associated with the second event data, and a relative order of the first time value and the second time value.

At block 5710, the device displays, on the display, a user interface (e.g., user interface screen 5602 in FIG. 56A) including a representation of the first event data (e.g., affordance 5609) with a representation of the first time value (e.g., row 5606-*b* representing 9 am-10 am with corresponding text 5607); and a representation of the second event data (e.g., affordance 5610) with a representation of the second time value (e.g., row 5606-*b* representing 10:30 am with corresponding text 5607), wherein the representation of the first event data and the representation of the second event data are displayed with respect to each other in accordance with the relative order of the first time value and the second time value and the respective values of the first time value and the second time value (e.g., affordances 5609, 5610 and 5611 are displayed relative to each other based on their respective times and relative order of the associated times as shown in user interface screen 5602 in FIG. 56A).

At block 5712, the user interface further includes a representation of the first application in association with the representation of the first event data, and a representation of the second application in association with the representation of the second event data.

At block 5714, the device displays the representation of the first event data and the representation of the second event data with respect to each other in accordance with the respective values of the first time value and the second time value includes displaying the representation of the first event data and the representation of the second event data on a timeline (e.g., timeline 5606).

At block 5716, the timeline includes a plurality of rows and columns (e.g., rows 5606-*a* and columns 5606-*b*). The representation of the first event data is displayed at a first column and a first row of the timeline, the first column comprising the representation of the first application (e.g., column 5606-*a* with affordance 5603 representing the calendar application), and the first row comprising the representation of the first time value (e.g., row 5606-*b* representing 9 am-10 am with corresponding text 5607). The representation of the second event data is displayed at a second column and a second row of the timeline, the second column comprising the representation of the second application (e.g., column 5606-*a* with affordance 5604 representing the email application), and the second row comprising the representation of the second time value (e.g., row 5606-*b* representing 10:30 am with corresponding text 5607).

At block 5718, the device detects an input corresponding to a request to scroll the user interface (e.g., timeline) in a first direction. At block 5720, the display of the electronic device is touch sensitive, and detecting the input corresponding to a request to scroll in the first direction comprises detecting a first gesture on the touch sensitive display (e.g., horizontal finger swipe gesture 5613 or 5615). At block 5722, the electronic device further comprises a rotatable input mechanism (e.g., 5601), and detecting the input corresponding to a request to scroll in the first direction comprises detecting rotation of the rotatable input mechanism while the rotatable input mechanism is in a first configuration.

At block 5724, in response to detecting the input corresponding to a request to scroll the user interface (e.g., timeline) in a first direction, the device scrolls the user interface (e.g., timeline) in the first direction in accordance with the input to display at least a representation of a third time value different from the first time value and the second time value. At block 5726, scrolling the user interface in the first direction in accordance with the input to display at least a representation of a third time value different from the first time value and the second time value comprises replacing display of a portion of the user interface (e.g., a portion shown in user interface screen 5602 in FIG. 56A) with display of a different portion of the user interface (e.g., a different portion shown in user interface screen 5602*b* in FIG. 56B).

At block 5728, in response to detecting the input corresponding to a request to scroll the timeline in a first direction, the device scrolls the timeline (e.g., 5606) in the first direction in accordance with the input to display at least one row different from the first row and the second row. At block 5730, scrolling the timeline in the first direction in accordance with the input to display at least one row different from the first row and the second row comprises replacing display of a portion of the timeline (e.g., a portion shown in user interface screen 5602 in FIG. 56A) with display of a different portion of the timeline (e.g., a different portion shown in user interface screen 5602*b* in FIG. 56B).

At block 5732, the device detects a second input corresponding to a request to scroll the user interface (e.g., timeline) in a second direction. At block 5734, the display of the electronic device is touch sensitive, and detecting the input corresponding to a request to scroll in the second direction comprises detecting a second gesture on the touch sensitive display (e.g., vertical finger swipe gestures 5619 or 5620). At block 5736, the electronic device further comprises a rotatable input mechanism (e.g., 5601), and detecting the input corresponding to a request to scroll in the second direction comprises detecting rotation of the rotatable input mechanism while the rotatable input mechanism is in a second configuration.

At block 5738, in response to detecting the second input corresponding to a request to scroll the user interface (e.g., timeline) in a second direction, the device scrolls the user interface (e.g., timeline) in the second direction in accordance with the second input to display at least a representation of a third application different from the first application and the second application. At block 5740, scrolling the user interface in the second direction in accordance with the second input to display at least a representation of a third application different from the first application and the second application comprises replacing display of a portion of the user interface (e.g., a portion shown in user interface screen 5602 in FIG. 56C) with display of a different portion of the user interface (e.g., a portion shown in user interface screen 5602*d* in FIG. 56D).

At block 5742, in response to detecting the second input corresponding to a request to scroll the timeline (e.g., 5606) in a second direction, the device scrolls the timeline in the second direction in accordance with the second input to display at least one column different from the first column and the second column. At block 5744, scrolling the timeline in the second direction in accordance with the second input to display at least one column different from the first column and the second column comprises replacing display of a portion of the timeline (e.g., a portion shown in user interface screen 5602 in FIG. 56C) with display of a different portion of the timeline (e.g., a portion shown in user interface screen 5602*d* in FIG. 56D).

At block 5746, the user interface comprises a plurality of views, and while displaying a first level view out of the plurality of views of the user interface, the first level view with representations of times in an interval of a first time period, the device detects a third input corresponding to a request to display a second level view distinct from the first level view out of the plurality of views of the user interface (e.g., pinch-in or out gestures). At block 5748, the display of the electronic device is touch sensitive; and detecting the third input corresponding to a request to display a second level view distinct from the first level view out of the plurality of views of the user interface comprises detecting two or more simultaneous touches on the touch-sensitive display that are continuously moved to vary the distance between the two or more touches (e.g., touch points 5621-*a* and 5621-*b* for a pinch-in gesture in FIG. 56E).

At block 5750, in response to detecting the third input corresponding to a request to display a second level view distinct from the first level view out of the plurality of views of the user interface (e.g., pinch-in or out gestures), the device replaces the display of the first level view (e.g., a view shown in user interface screen 5602 in FIG. 56E, with an interval of a one-hour timer period) with display of the second level view, wherein the second level view includes representations of times in an interval of a second time period that is distinct from the first time period (e.g., a zoomed-out view shown in user interface screen **5602*f* in FIG. 56F, with an interval of a three-hour time period, or a list-view shown in user interface screen 5602*i* in FIG. 56**I).

At block 5752, while displaying the user interface with the representation of the first event data in association with the representation of the first time value and the representation of the second event data in association with the representation of the second time value, the device detects a fourth input corresponding to a request to select the representation of the first event data (e.g., a tap gesture). At block 5754, the display of the electronic device is touch sensitive; and detecting the fourth input corresponding to a request to select the representation of the first event data comprises detecting a tap gesture on the representation of the first event data displayed on the touch sensitive display (e.g., tap gesture 5627 in FIG. 56F).

At block 5756, in response to detecting the fourth input corresponding to a request to select the representation of the first event data (e.g., a tap gesture), the device displays a callout view (e.g., 5628 in FIG. 56G) proximate to the representation of the first event data, the callout view including additional information about the first event data beyond the associated first time value and the first application, wherein the display of the callout view overlays at least a portion of the representation of the first event data.

At block 5757, while displaying the user interface with the representation of the first event data in association with the representation of the first time value and the representation of the second event data in association with the representation of the second time value, the device detects a fifth input on the representation of the first event data (e.g., tap and hold gesture 5631 in FIG. 56G).

At block 5760, in response to detecting the fifth input on the representation of the first event data (e.g., a tap and hold gesture), the device ceases to display the user interface, and displays a user interface of the first application in relation to the first event data (e.g., email application user interface **5602*i* in FIG. 56**H).

Note that details of the processes described above with respect to method 5700 (e.g., FIG. 57) are also applicable in an analogous manner to the methods and techniques described elsewhere in this application. For example, other methods described in this application may include one or more of the characteristics of method 5700. For example, the devices, hardware elements, inputs, interfaces, modes of operation, faces, time indicators, and complications described above with respect to method 5700 may share one or more of the characteristics of the devices, hardware elements, inputs, interfaces, modes of operation, faces, time indicators, and complications described elsewhere in this application with respect to other methods. Moreover, the techniques described above with respect to method 5700 may be used in combination with any of the interfaces, faces, or complications described elsewhere in this application. For brevity, these details are not repeated elsewhere in this application.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B, 3, 5A, and 5B) are all included within the scope of the techniques described herein.

Figure 58:
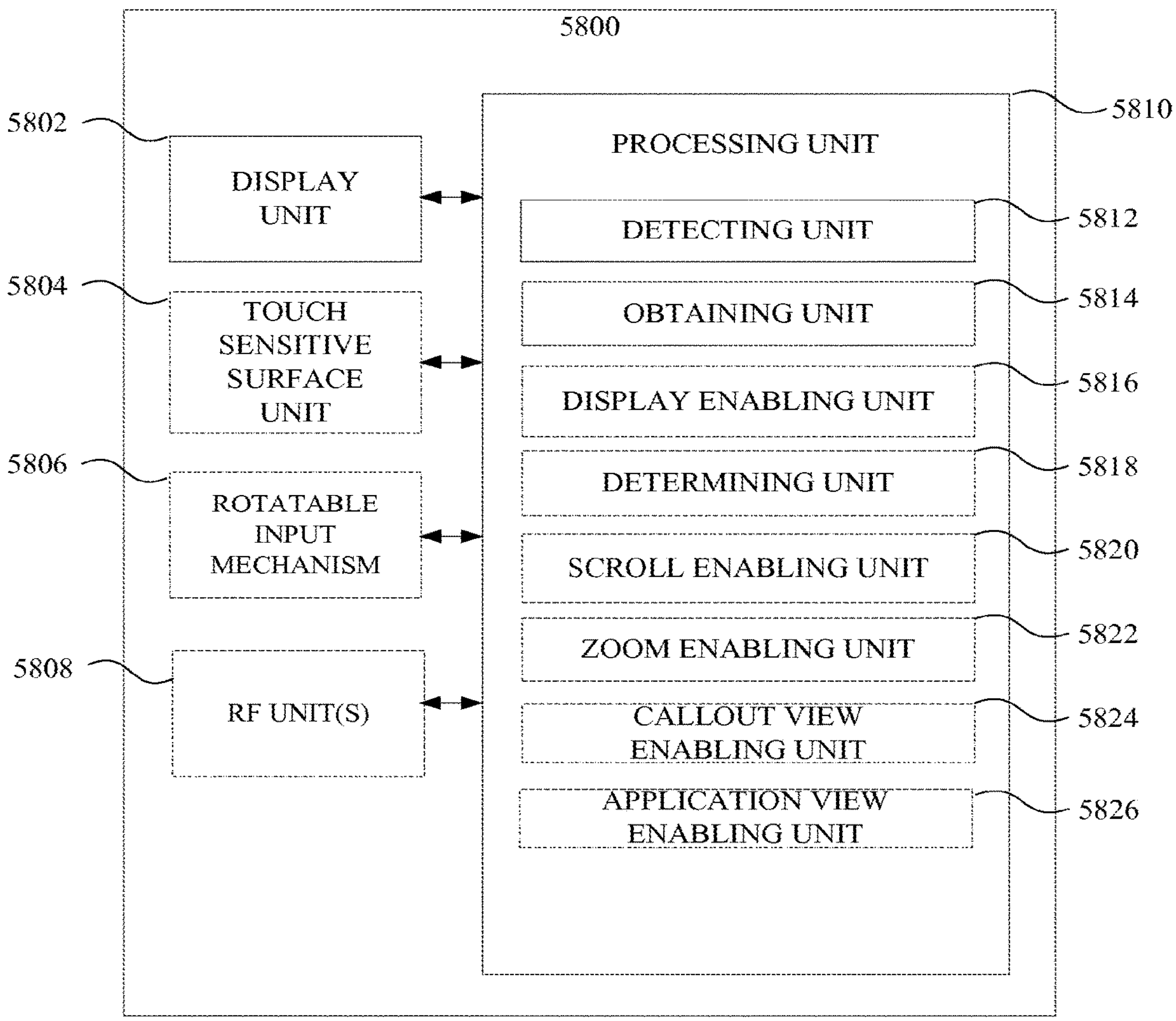
FIG. 58 is a functional block diagram of an electronic device in accordance with some embodiments.

In accordance with some embodiments, FIG. 58 shows an exemplary functional block diagram of an electronic device 5800 configured in accordance with the principles of the various described embodiments. In accordance with some embodiments, the functional blocks of electronic device 5800 are configured to perform the techniques described above (e.g., including process 5700). The functional blocks of the device 5800 are, optionally, implemented by hardware, software, or a combination of hardware and software to carry out the principles of the various described examples. It is understood by persons of skill in the art that the functional blocks described in FIG. 58 are, optionally, combined or separated into sub-blocks to implement the principles of the various described examples. Therefore, the description herein optionally supports any possible combination or separation or further definition of the functional blocks described herein FIG. 58 shows exemplary functional blocks of an electronic device 5800 that, in some embodiments, performs the features described above. As shown in FIG. 58, an electronic device 5800 includes a display unit 5802 configured to display graphical objects and a processing unit 5810 coupled to display unit 5802. In some embodiments, device 5800 further includes a touch-sensitive surface unit 5804 configured to receive user gestures, a rotatable input mechanism 5806, and or one or more RF units 5808 configured to detect and communicate with external electronic devices. In some embodiments, processing unit 5810 includes a detecting unit 5812 configured to detect various inputs provided by a user (e.g., touch inputs, mechanism inputs), and an obtaining unit 5814 configured to obtain event data from various applications (e.g., obtain meeting event data from a calendar application and email data from an email application, etc.).

In some embodiments, processing unit 5810 includes a display enabling unit 5816, a determining unit 5818, a scroll enabling unit 5820, a zoom enabling unit 5822, a callout view enabling unit 5824, and/or an application view enabling unit 5826. For example, the display enabling unit 5816 is configured to cause a display of a user interface (or portions of a user interface) in conjunction with the display unit 5802. For example, the display enabling unit 5816 may be used for displaying a portion of a user interface (e.g., timeline 5606) and updating a displayed portion in accordance with various inputs from a user. The determining unit 5818 may be used for determining respective times associated with the obtained event data from various applications using the obtaining unit 5814, as well as relative order of the times associated with such event data.

The scroll enabling unit 5820 may be used for scrolling the user interface (e.g., timeline 5606) in accordance with various scroll inputs from a user (e.g., horizontal finger swipe gesture 5613 and 5617 for horizontal scroll inputs, and vertical finger swipe gestures 5619 and 5620) for vertical scroll inputs). The scroll enabling unit 5820 enables the user to scroll through columns of applications in the timeline (e.g., 5606) based on the horizontal scroll inputs. The scroll enabling unit 5820 enables the user to scroll through rows of times in the timeline (e.g., 5606) based on the vertical scroll inputs. The zoom enabling unit 5822 may be used for zooming in or out the user interface (e.g., timeline 5606) in accordance with various inputs to zoom in or out the user interface (e.g., pinch-in gesture with two touch points 5621-*a* and 5621-*b* in FIG. 56E). The zoom enabling unit 5822 enables replacing a first level view of the timeline with a second level view of the timeline, wherein the first level view arranges the times in an interval of a first time period, and the second level view arranges the times in an interval of a second time period different from the first time period.

The callout view enabling unit 5824 may be used for displaying a callout view based on an input corresponding to a request to displayed a more detailed view of a selected event (e.g., tap gesture 5627 in FIG. 56F). The callout view enabling unit 5824 enables display of the callout view overlying at least a portion of the event affordance touched by the user (e.g., callout view 5628 overlying at least a portion of the affordance 5622-*d* in FIGS. 56F and 56G). The application view enabling unit 5826 may be used for replacing the display of the user interface (e.g., timeline) with display of an application user interface upon an input corresponding to a request to display the application view associated with the selected event (e.g., tap and hold gesture 5631 in FIG. 56G). The application view enabling unit 5826, upon detecting the input 5631, ceases the display of the timeline 5606 and starts displaying the email application view containing the selected email data (e.g., 5602*i* in FIG. 56I). The units of FIG. 58 may be used to implement the various techniques and methods described above with respect to FIGS. 56A-56I and 57A-57F.

For example, the processing unit 5810 is configured to obtain first event data from a first application (e.g., with obtaining unit 5812) and obtain second event data from a second application distinct from the first application (e.g., with obtaining unit 5812). The processing unit 5810 is configured to determine (e.g., with determining unit 5818) a first time value associated with the first event data and a second time value associated with the second event data and a relative order of the first time value and the second time value. The processing unit 5810 is configured to display (e.g., with display enabling unit 5816), on the display (e.g., display unit 5802), a user interface including: a representation of the first event data with a representation of the first time value; and a representation of the second event data with a representation of the second time value. The representation of the first event data and the representation of the second event data are displayed with respect to each other in accordance with the relative order of the first time value and the second time value and the respective values of the first time value and the second time value.

The processing unit 5810 is configured to detect (e.g., with detecting unit 5812) an input corresponding to a request to scroll the user interface in a first direction. In response to detecting the input corresponding to a request to scroll the user interface in a first direction, the processing unit 5810 is configured to scroll (e.g., with scroll enabling unit 5820) the user interface in the first direction in accordance with the input to display at least a representation of a third time value different from the first time value and the second time value. The scroll enabling unit 5820, for example, enables scrolling such that scrolling the user interface in the first direction in accordance with the input to display at least a representation of a third time value different from the first time value and the second time value comprises replacing display of a portion of the user interface with display of a different portion of the user interface.

The processing unit 5810 is configured to detect (e.g., with detecting unit 5812) a second input corresponding to a request to scroll the user interface in a second direction. In response to detecting the second input corresponding to a request to scroll the user interface in a second direction, the processing unit 5810 is configured to scroll (e.g., with scroll unit 5820) the user interface in the second direction in accordance with the second input to display at least a representation of a third application different from the first application and the second application. The scroll enabling unit 5820 enables scrolling such that scrolling the user interface in the second direction in accordance with the second input to display at least a representation of a third application different from the first application and the second application comprises replacing display of a portion of the user interface with display of a different portion of the user interface.

In some embodiments, the user interface comprises a plurality of views, and while displaying a first level view out of the plurality of views of the user interface, the first level view with representations of times in an interval of a first time period, the processing unit 5810 is configured to detect (e.g., with detecting unit 5812) a third input corresponding to a request to display a second level view distinct from the first level view out of the plurality of views of the user interface. In response to detecting a third input corresponding to a request to display a second level view distinct from the first level view out of the plurality of views of the user interface, the processing unit 5810 is configured to replace the display of the first level view with display of the second level view (e.g., with zoom enabling unit 5822), wherein the second level view includes representations of times in an interval of a second time period that is distinct from the first time period.

In some embodiments, while displaying the user interface with the representation of the first event data in association with the representation of the first time value and the representation of the second event data in association with the representation of the second time value, the processing unit 5810 is configured to detect (e.g., with detecting unit 5812) a fourth input corresponding to a request to select the representation of the first event data. In response to detecting the fourth input corresponding to a request to select the representation of the first event data, the processing unit 5810 is configured to display a callout view proximate to the representation of the first event data (e.g., with callout view enabling unit 5824), the callout view including additional information about the first event data beyond the associated first time value and the first application, wherein the display of the callout view overlays at least a portion of the representation of the first event data.

In some embodiments, while displaying the user interface with the representation of the first event data in association with the representation of the first time value and the representation of the second event data in association with the representation of the second time value, the processing unit 5810 is configured to detect (e.g., with detecting unit 5812) a fifth input on the representation of the first event data. In response to detecting the fifth input on the representation of the first event data, the processing unit 5810 is configured to cease to display the user interface and display a user interface of the first application in relation to the first event data (e.g., with application view enabling unit 5826).

The functional blocks of the device 5800 are, optionally, implemented by hardware, software, or a combination of hardware and software to carry out the principles of the various described examples. It is understood by persons of skill in the art that the functional blocks described in FIG. 58 are, optionally, combined or separated into sub-blocks to implement the principles of the various described examples. Therefore, the description herein optionally supports any possible combination or separation or further definition of the functional blocks described herein.

The operations described above with reference to FIGS. 57A-57F are, optionally, implemented by components depicted in FIGS. 1A-1B or FIG. 58. For example, obtaining operations 5704 and 5706, determining operation 5708, displaying operation 5710, detecting operations 5718, 5732, 5746, 5752 and 5758, scrolling operations 5724 and 5738, zoom operation 5750, callout view display operation 5756, and application view display operation 5760 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 59A-59F depict exemplary user interface screens for a typographic modular face interface and a corresponding interface for editing settings of the typographic modular face. A typographic modular interface may be a display interface that displays information arranged into modules or platters or slots, wherein the information is displayed in typographic form, without any use (or with limited use) of non-standard symbols, logos, and glyphs. The information displayed may correspond to or be related to the present time, such that the information is regularly updated to reflect the most recent information. The edit interface may provide an interface for selecting color settings for the interface, for selecting which complications (if any) are to be displayed in which platters, and for selecting the amount of information that is displayed as a part of one or more of the complications. In a lower-density, higher-privacy setting, less information may be displayed in each complication, and the information may be displayed in a larger font size; in a higher-density, lower-privacy setting, additional information may be displayed in each complication, and some or all of the information may be displayed in a smaller font size. Changes to color settings, complication platter assignments, and density/privacy settings may be made by rotating a rotatable input mechanism while in an edit interface, and the edit interface may be accessed from the typographic modular interface by executing a hard press (e.g., executing a touch contact having a characteristic intensity above an intensity threshold).

Figure 59A:
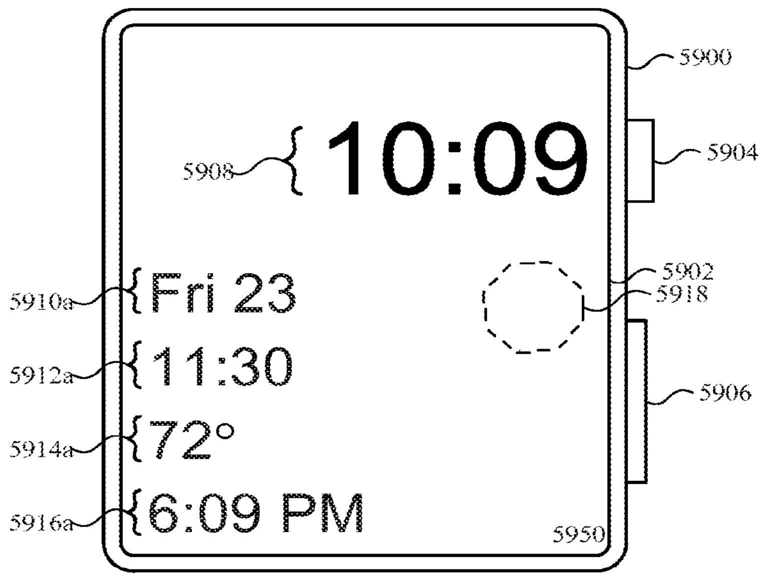
FIGS. 59A-59F illustrate exemplary user interfaces in accordance with some embodiments.

FIG. 59A shows exemplary user interface screen 5950 that device 5900 can display on display 5902. In some embodiments, device 5900 may be one or more of devices 100 (FIG. 1), 300 (FIG. 3), and/or 500 (FIG. 5). The electronic device has touch-sensitive display 5902 (e.g., touchscreen 504).

Users rely on personal electronic devices to keep time throughout the day and to quickly reference time-dependent information, such as information about messages, appointments, the weather, news, and other data. It is becoming increasingly desirable to present the user with interactive user interfaces that promote user interaction with a personal electronic device. Indicating the time alongside a typographic representation of time-dependent information may enhance a user's interaction with the device. Furthermore, allowing a user to set a privacy or density setting that controls the level of detail with which information is displayed on a device may enhance privacy and encourage a user to more freely and comfortably interact with the device. Increasing the level of simplicity, versatility, customizability, and privacy of the interface screen may enhance and prolong user interactions with the device.

Accordingly, provided herein are context-specific user interfaces that include a time-indicator as well as a plurality of slots (e.g., platters, modules) for displaying time-dependent information such as complications or notifications. A user may wish for such an interface to be customizable such that the content, location, privacy level, and appearance of each of the complications can be modified by the user. A user may wish for all information to be displayed in typographic form, without the use (or with minimal use) of non-standard symbols, logos, or glyphs, so that the user does not have to learn the meaning of custom symbols. A user may wish for a privacy or density setting of an interface to be modifiable so that it may be used in different settings when the user desires additional information to be presented or less information to be presented.

Device 5900 may display interface screen 5950 on display 5902. Interface screen 5950 may be referred to as a typographic modular face, because it may display typographic information (as opposed to symbols, logos, graphics, or glyphs) on a customizable modular face (e.g., an interface having a plurality of modules, platters, or slots). Interface screen 5950 comprises clock 5908, which may indicate the current time (or, in some embodiments, a non-current time). Interface screen 5950 further comprises complications 5910*a*, 5912*a*, 5914*a*, and 5916*a*, which are displayed in a first platter, a second platter, a third platter, and a fourth platter, respectively. Each of the platters may correspond to a predefined location on interface screen 5950 on display 5902, with each platter being configured to display information about a respective subject matter.

In the embodiment shown in FIG. 59A, complication 5910*a* is a date complication that indicates a day of the week and the date of the month (Friday the 23rd). Complication 5912*a* is a calendar complication that indicates the time of day of the next appointment or event in a calendar (11:30 a.m.). Complication 5914*a* is a weather complication that indicates a temperature of the weather (72°). Complication 5916*a* is a world clock complication that indicates a time in another time zone (6:09 p.m.).

In the embodiment shown, the complications 5910*a*-5916*a* are displayed in a first density state that displays less information than a second density state. The first density state may correspond to a first privacy state, which may be used to enhance privacy such that onlookers can see only a minimal amount of information on the display of the device, while the user himself may be aware of the context that gives meaning to the minimal information displayed in the first density state. For example, an onlooker might not know what "11:30" means in complication 5912*b*, but the user may know, simply from being reminded of the time, that 11:30 is the time of an upcoming meeting.

FIG. 59A further depicts user input 5918, which is a hard-press user input (a touch contact whose characteristic intensity is above an intensity threshold) detected at the depicted location. In other embodiments, any other suitable user input may be used. In response to detecting user input 5918, device 5900 may display an edit interface for editing the typographic modular interface (e.g., for editing interface screen 5940 or 5950).

Figure 59B:
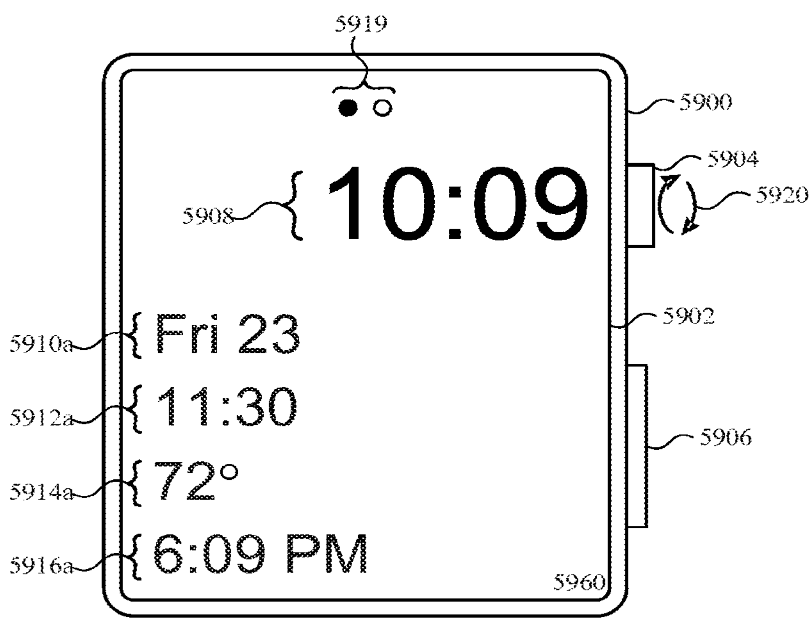

FIG. 59B depicts edit interface screen 5960 for editing display settings for a typographic modular interface such as the interfaces depicted by interface screens 5950 and 5960. An edit interface screen may include some or all of the elements of a typographic modular face screen, and in some embodiments may be considered or referred to as a typographic modular face screen. In some embodiments, an edit interface screen may include one or more visual indications that indicate that the interface is an edit interface screen and/or that indicate that the device is in an editing state.

Edit interface screen 5960, for example, is identical to interface screen 5950 except for paging affordances 5919 displayed at the top of edit interface screen 5960. Paging affordances 5919 indicate that edit interface screen 5960 is an edit interface screen. That is, dots 5919 may signal to the user that the device is in a state configured to edit the device face, rather than in a state configured merely to display the face itself. Paging affordances 5919 further indicate that the edit interface comprises two pages or screens (as indicated by the number of paging affordances), and that interface screen 5960 is the leftmost of two screens (as indicated by the leftmost dot being solid/filled and the rightmost dot being hollow). In the example shown, leftmost edit interface screen 5960 is a screen for modifying color settings of the typographic modular interface. The manner in which color settings may be modified is discussed in further detail below.

FIG. 59B further depicts user input 5920, which is a rotation of rotatable input mechanism 5904. In other embodiments, any other suitable user input may be used. In response detecting user input 5920, device 5900 may edit a density/privacy setting of the typographic modular face, and may display the result of the edited setting.

Figure 59C:
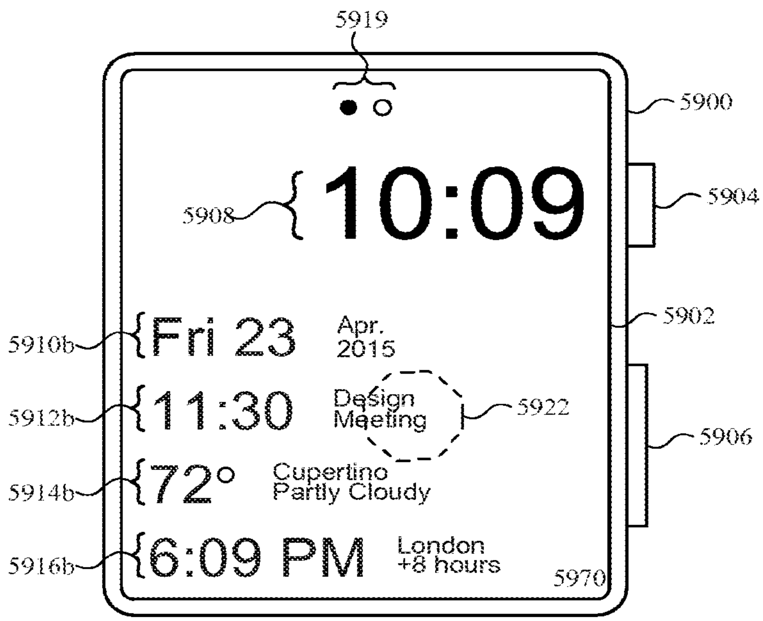

FIG. 59C depicts the result of the detection of user input 5920. In response to detecting user input 5920, the device displays interface screen 5970, which is an updated version of interface screen 5960; interface screen 5970 is still the leftmost of two pages in the edit interface for the typographic modular face, but now reflects the change made to the density setting in response to the detection of user input 5920.

In response to detecting the rotation of the rotatable input mechanism 5904, device 5900 has changed the privacy/density setting from a first density state to a second density state, and the complications 5910-5916 are displayed in a second density state corresponding to additional information and a reduction in privacy.

In some embodiments, a device may be capable of displaying complications, other user interface objects, or other information in multiple density settings. In some embodiments, a second density setting may correspond to displaying additional information in the same platter as compared to the first density setting, making the presentation of information by complications in the second density setting denser. In some embodiments, the second density state may correspond to a second privacy state, and may be used to display more information when a user would rather have access to more information than hide the information for the sake of privacy. The additional information may correspond to the same subject matter as the information that is displayed in the first density state; in some embodiments, it may represent a different portion (or additional portions) of the same underlying data from which the first information was derived. The additional information may be predetermined to be more sensitive than the information that is displayed in the first density state. Because the additional information displayed in the second density state may be more sensitive information corresponding to more sensitive data, the additional information may be displayed at a smaller font size than the first information, to enhance security by making it more difficult for onlookers to read the text of the additional information.

In the example shown, in the second density setting, date complication 5910*b* additionally displays a month and year (April 2015). Calendar complication 5912*b* additionally displays a name of the next appointment ("Design Meeting"). Weather complication 5914*b* additionally displays the location for which the weather is being displayed (Cupertino, California.) and additional information about the weather ("Partly Cloudy"). World clock complication 5916*b* additionally displays the city for which the world clock time is displayed (London, England) and a difference between the time in that city and the time displayed on clock 5908 ("+8 hours").

In some embodiments, a user may rotate a rotatable input mechanism while in the edit state (regardless of page) in either direction in order to cycle through or scroll through two or more density/privacy states/settings. In some embodiments, the density/privacy settings of all displayed complications are updated together, while in other embodiments the density/privacy setting of each complication may be individually modifiable. In some embodiments, there may more than two density states.

For example, in some embodiments there may be three density/privacy states/settings, such that a further rotation of rotatable input mechanism 5904 in the direction of input 5920 may cause additional supplemental information to be displayed in one or more of the platters. The additional supplemental information displayed in the third density/privacy state may correspond, for each platter, to the same underlying subject matter or information source as the information displayed in the first two density states. In some embodiments, the information corresponding to the third density state may be predetermined to be of a higher sensitivity than the information displayed in the first two states, thereby corresponding to an even higher privacy setting. In some embodiments, the additional supplemental information displayed in the third density state may be displayed in an even smaller font size than the information corresponding to the second density state, thereby being even more difficult for onlookers to read.

FIG. 59C further depicts user input 5922, which is a tap input detected on display 5902 at a location corresponding to complication 5912*b* in the second of four complication platters. In other embodiments, any other suitable user input may be used. In response detecting user input 5922, device 5900 may select a complication and/or a platter for editing, and may display the selected complication/platter in a highlighted manner.

Figure 59D:
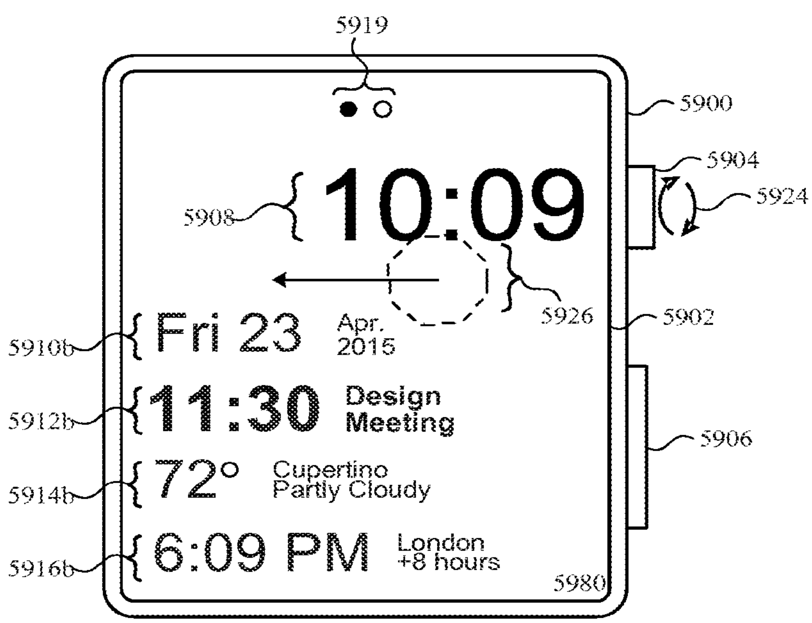

In FIG. 59D, complication 5912*b* is selected for editing in edit interface screen 5980, which is an updated version of edit interface screen 5970. Edit interface screen 5980 is an interface screen for editing a color setting associated with one or more of the displayed complications. In the example shown, complication 5912*b* is displayed as highlighted by being displayed in a larger size than the other complications, and by having the text of the complication bolded. In other embodiments, the selected complication may be displayed with a box or outline around it, in a different position, in a different size, in a highlight text color, with a background color, in italics, underlined, in a different font, or in any other manner suitable to visually distinguish it.

FIG. 59D further depicts user input 5924, which is a rotation of rotatable input mechanism 5904. In other embodiments, any other suitable user input may be used. In response to detecting user input 5924, device 5900 may modify a color setting of a selected complication/platter.

For example, there may be a predefined selection of color settings each corresponding to a color, series of colors, pattern of colors, or animation by which a color setting changes in time. In some embodiments, one or more of the color settings is a gradient color setting or a pattern color setting that renders the complication text (in the first or second density state) as a continuous color gradient or pattern across the different letters and numbers in the complication. The predefined color settings may be arranged into an ordered progression. When the user selects a complication for editing and rotates the rotatable input mechanism, the setting may be modified by cycling or scrolling through the ordered progression to a next or previous color setting in accordance with a direction of the rotation of the input. In some embodiments, the ordered progression may loop around from the last setting to the first.

In some embodiments, a user may edit a color setting of more than one of the complications/platters, or of all of the complications/platters, at the same time. For example, color themes may be predetermined and saved on the device (or available to the device by network communication), such that a user may select a single theme that assigns a color setting to more than one or all of the complications/platters. In some embodiments, themes may assign a predetermined color setting to a predetermined platter. In some embodiments, themes may assign a predetermined color setting to a predetermined type of complication, regardless of the platter in which it appears. In some embodiments, a theme may be a gradient theme or a pattern theme that renders more than one of the complications/platters, or all of the complications/platters, as a continuous gradient or a continuous pattern across the letters and numbers in the multiple complications/platters.

In the example shown in FIG. 59C, the modification to a color setting affects only the selected complication, selected complication 5912*b*, although the modification itself is not shown by the black-and-white figure.

FIG. 59D further depicts user input 5926, which is a leftward swipe gesture applied to the touch-sensitive screen 5902. In other embodiments, any other suitable user input may be used. In response to detecting user input 5926, device 5900 may display a page of the edit interface that is located to the right of the current page.

Figure 59E:
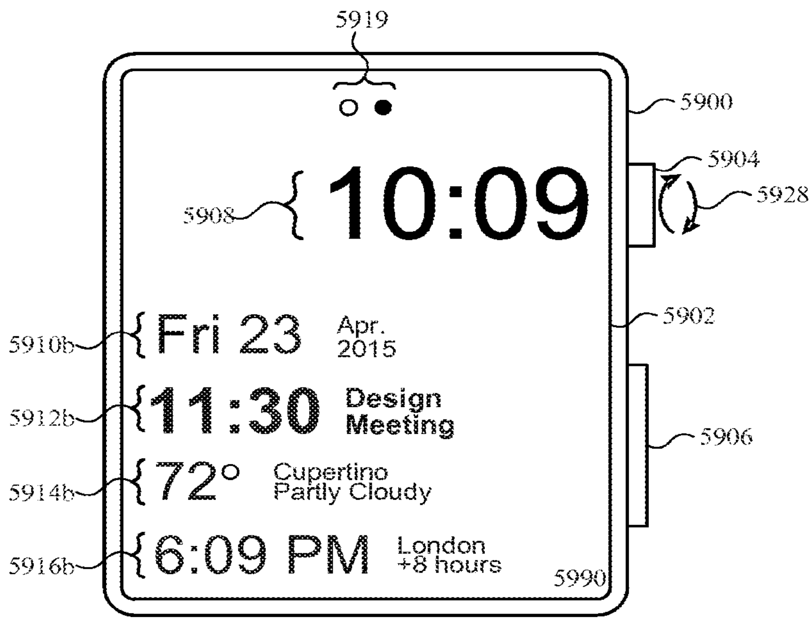

FIG. 59E depicts edit interface screen 5990, which is displayed as a result of the detection of user input 5926 in FIG. 59D. In response to detecting user input 5926, the device displays edit interface screen 5990. Edit interface screen 5990 is the rightmost of two edit interface screens in the depicted edit interface, as indicated by paging affordances 5919 displayed at the top of edit interface screen 5990. Paging affordances 5919 have been updated such that the left dot is hollow and the right dot is solid/filled, showing that the right of two pages is the currently displayed page. In some embodiments, an animation may display a transition from the one page to another, while in some embodiments, the page may remain substantially unchanged and the paging affordances may be the only displayed element that changes when the user pages left or right. In the displayed example, edit interface screen 5990 is otherwise identical to edit interface 5980, depicting clock 5908 and complications 5910*b*-5916*b*. In the depicted example, complication 5912*b* is selected for editing and is highlighted by being displayed at a larger size than the other complications. In the example depicted, the selection of complication 5912*b* for editing has been maintained from the previous edit interface screen 5980; however, in some other embodiments, paging between edit interface screens may cause a complication that is selected for editing to be deselected.

FIG. 59E further depicts user input 5928, which is a rotation of rotatable input mechanism 5904. In other embodiments, any other suitable user input may be used. In response to detecting user input 5928, device 5900 may modify the type of complication that is displayed in the platter in which the selected complication is currently displayed. That is, the device may replace the selected complication with another type of complication.

For example, there may be a predefined selection of complications that are available to be displayed in one or more of the platters. In some embodiments, the one or more complications are arranged into an ordered progression. When the user selects a complication for editing and rotates the rotatable input mechanism, the complication may be replaced by a next or previous complication in the ordered progression of complications by cycling or scrolling through the ordered progression to a next or previous complication in accordance with a direction of the rotation of the input. In some embodiments, the ordered progression may loop around from the last complication to the first.

In some embodiments, a complication that is selected to be displayed in a platter may retain the color setting of the complication that was previously displayed in the platter. In some embodiments, such as those in which certain colors are associated with certain types of complications, a newly selected complication may be displayed in a different color than the complication that was previously displayed in the platter.

The complications available to be displayed may include one or more complications relating to one or more of the following: date, calendar, weather, world clock, sunrise/sunset, time, stocks, alarm, stopwatch, activity, exercise, standing, the moon, music, Nike, Tesla charge, charge of device (e.g., device 5900), other device charge, city manager, MLB, other sports, Twitter, other social media, and messages. The foregoing list of complications is merely exemplary, not exhaustive. In some embodiments, an option available for one or more of the platters may further be to display no complications in the platter. The "blank" option may be included as an option in the ordered progression of complications and may be accessible in the edit interface in the same manner as complications are accessible.

In some embodiments, a user may select a complication for a given platter on a slot-by-slot basis, by tapping platters/complications to select the platter, and then using the rotatable input mechanism to cycle through available complications and assign them to the platter. In some embodiments, a user may assign a complication to more than one platter at a time, or to all of the platters at one time, for example by selecting a predetermined or curated "complication set." The device may have complication sets saved on the device, or they may be accessible by the device via a network connection, and the user may select a set that assigns more than one complication to more than one respective platter. For example, a user may select a "stocks" complication set, and the device may assign complications pertaining to the NASDAQ, the Dow Jones, and the S&P 500 to respective platters.

Figure 59F:
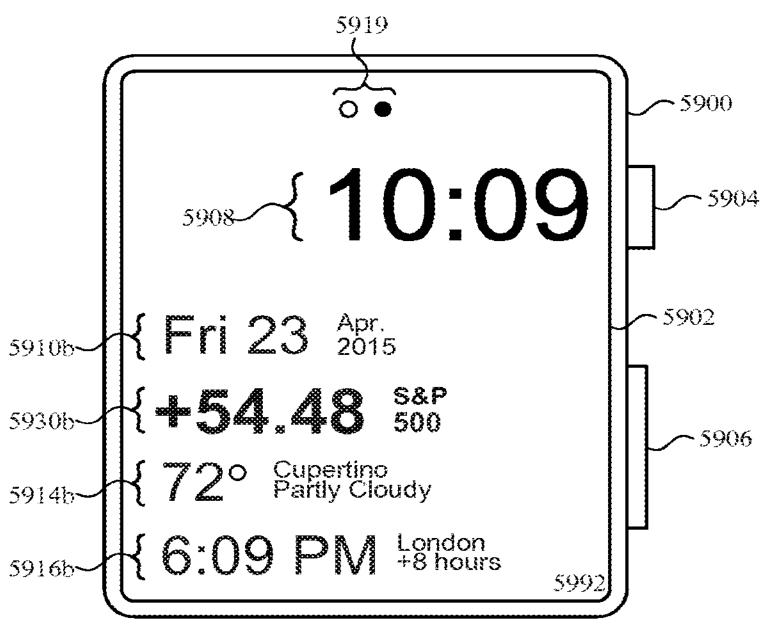

FIG. 59F displays edit interface screen 5992, which is an updated version of edit interface screen 5990 reflecting the response by device 5900 to the detection of user input 5928 in FIG. 59E. In response to detecting user input 5928, which is a rotation of rotatable input mechanism 5902, device 5900 updates the complication that is assigned to the second platter by assigning a next complication in the ordered progression of complications to the slot. In the depicted example, the complication that follows previously displayed calendar complication 5912*b* in the ordered progression is S&P 500 complication 5930*b*, which displays information about the performance of the Standard & Poor's stock market index (e.g., a gain of 54.48 points). Note that S&P 500 complication 5930*b* is displayed in a second density/privacy state, as are the other complications in FIG. 59F. In some embodiments, if the density/privacy state were changed to the first state, then the complication would display less information, such as by suppressing display of the name of the stock index. In some embodiments, if the density/privacy state were changed to an even higher density setting, then the complication would display additional information, such as highly sensitive information pertaining to a user's personal portfolio performance.

In some embodiments, users may be able to modify settings pertaining to other aspects of the typographic modular face, including but not limited to: the number of modules/slots, the position of the modules, the alignment and justification of text within the modules, the font of the text, and the size of the font. In some embodiments, these and other setting may be modified in similar manners as described above by accessing additional edit interface screens that may be represented by additional paging affordances.

FIGS. 60A-60F are flow diagrams illustrating a method for providing and supplementing information in accordance with user inputs in accordance with some embodiments. Method 6000 is performed at a device (e.g., 100, 300, 500, 5900) with a display, a rotatable input mechanism, and one or more processors. Some operations in method 6000 may be combined, the order of some operations may be changed, and some operations may be omitted.

As described below, method 6000 provides an intuitive way to providing and supplementing information. The method reduces the cognitive burden on a user for accessing information pertaining to various density settings, various privacy levels, and various subject matters, thereby creating a more efficient human machine interface. For battery-operated computing devices, enabling a user to more quickly and more efficiently access, configure, and navigate a user interface for providing and supplementing information, including information corresponding to various privacy levels, conserves power and increases the time between battery charges.

Figure 60A:
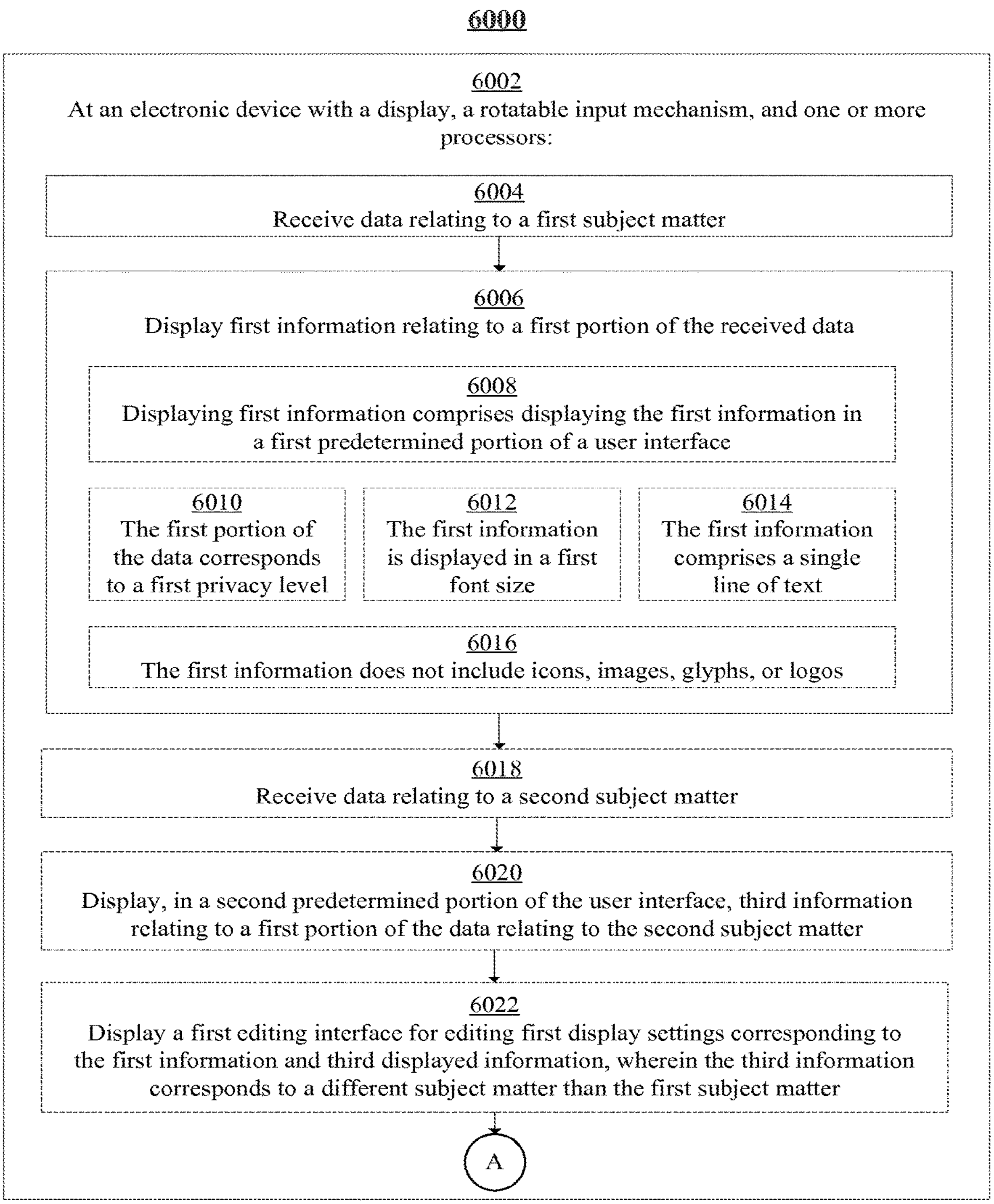

In FIG. 60A, at block 6002, method 6000 is performed at an electronic device having a display, a battery, and one or more processors. An exemplary device is device 5900 of FIGS. 59A-6F, which has display 5902 and a rotatable input mechanism 5904.

A block 6004, the device receives data relating to a first subject matter. In some embodiments, the received data may be any data that is stored on the device or accessed by the device through network communications, including data received through applications or programs run by the device. In some embodiments, the received data may be data corresponding to a first application and/or first subject matter that may be presented, by the device, in a complication or other user interface object.

At block 6006, the device displays information relating to a first portion of the received data. In some embodiments, the data is logically divided into multiple portions, segments, sections, or the like, upon being received or initially accessed by the device. In some embodiments, the device may divide the received data into multiple portions, segments, sections, or the like in accordance with predefined rules or dynamic analysis. In some embodiments, the received data may be divided or assigned into multiple portions, segments, sections, or the like in accordance with user inputs or instructions.

In some embodiments, information relating to a first portion of the received data may be displayed in any visual format that is suitable to be viewed by a user, including in textual, numerical, image-based, animation-based, and/or video-based format.

In the depicted example of FIG. 59A, device 5900 receives, among other information, information from a calendar application. The subject matter of the information received from the calendar application is calendar data, events, and the like. In the depicted example, a first portion of the calendar data comprises information about a time of an upcoming calendar event, the time of which is 11:30. In the depicted example, complication 5912*a* displays the text "11:30" in accordance with the first portion of the received data.

At block 6008, optionally, displaying the first information comprises displaying the first information in a first predetermined portion of a user interface. In some embodiments, a user interface may have one or more predefined portions in which information may be displayed. In some embodiments, the portions may be predefined by the device, while in some embodiments the portions may be defined in accordance with user input. In some embodiments, a user interface may have multiple slots, platters, or modules that may each be configured to display information relating to a respective subject matter. In the displayed example of FIG. 59A, interface screen 5950 includes four platters displaying, respectively, complications 5910*a*-5910*d*, each of which correspond to a distinct subject matter.

At block 6010, optionally, the first portion of the data corresponds to a first privacy level. In some embodiments, different portions of the received data may correspond to different privacy levels or different privacy settings. For example, one portion of the data may be determined to be less private and less sensitive, while another portion of the data may be determined to be more private and more sensitive, while yet another portion of the data may be determined to be most private and most sensitive. In some embodiments, portions of the received data may be defined or determined in accordance with a privacy or sensitivity level of the data. Dividing data into portions according to privacy levels may allow users to choose a privacy setting, thereby allowing users to choose the privacy/sensitivity level of the data that they wish for a device to display. This may be useful in allowing users to customize use of a device for different situations and settings, such as allowing display of more sensitive information when a user is home, and suppressing display of more sensitive information when a user is in public and the display of his device may be viewed by others.

In the example depicted in FIG. 59A, the first portion of the received data displayed by complication 5912*a* may correspond to a first privacy level, which in some embodiments corresponds to least sensitive data. For example, device 5900 may have received various pieces of information about an upcoming calendar event, and may have divided the information into portions. One portion of the data may relate to the time of the upcoming event, and this portion may be considered least sensitive. Another portion of the data may relate to the name of the upcoming event, and this information may be considered more sensitive. Yet another portion of the data may relate to the name of invitees or participants in the upcoming event, and this information may be considered most sensitive. In the example depicted in FIG. 59A, device 5900 is in a first density state that corresponds to a first privacy state, and, accordingly, only the information corresponding to the portion of the data corresponding to the least sensitive data is displayed; that is, the time of the upcoming calendar event is displayed in complication 5912*a*, but the name of the upcoming event and participants/invitees to the upcoming event are suppressed from display.

At block 6012, optionally, the first information is displayed in a first font size. In some embodiments, the manner in which information corresponding to one portion of received data is displayed may be distinguished from the manner in which information corresponding to another portion of the received data is displayed. In some embodiments, the manner of display may be distinguished by different display "densities," which may correspond to different density settings of a device. In some embodiments, density settings may correspond to displaying a different amount of information and/or a different number of user interface objects in the same area of a user interface, thereby defining more and less dense user interfaces. In some embodiments, one portion of data displayed in a first density state may be displayed in a first manner, while another portion of information displayed in a second density state may be displayed in a second manner. In some embodiments, one portion of information displayed in a first density state may be displayed in a first size, while another portion of information displayed in a second density state may be displayed in a second size. In some embodiments, information corresponding to more sensitive data may be displayed in a smaller size, making it more difficult for onlookers to observe the information, while information corresponding to less sensitive information may be displayed in a larger size, making it easier for a user to observe the information. Font size chosen for display, in some embodiments, may thus correspond inversely to the sensitivity of data.

In some embodiments, information corresponding to different portions of data may be distinguished by different font size settings, with each font size setting corresponding to one or more than one font size. For example, a larger font size setting may include font sizes of size 12 and 14, while a smaller font size setting may include font sizes of size 10 and 12.

In the depicted example of FIG. 59A, as explained above, device 5900 may be in a first density setting corresponding to a lowest density; and the first portion of the received data displayed by complication 5912*a* may correspond to a first privacy level, which in some embodiments corresponds to least sensitive data. In the depicted example, the information displayed corresponding to the first information may be displayed in a first font size or in a first font size setting.

At block 6014, optionally, the first information comprises a single line of text. As described above, information presented in accordance with different density settings may be visually distinguished. Furthermore, information presented as part of a higher-density setting may be configured to present a greater amount of information per display area on a display. In some embodiments, in order to present more information on the same area of a display (and the same area of a user interface), in addition to smaller font sizes being used, information may be presented with different numbers of lines of text. In some embodiments, when different font sizes are used for information corresponding to different density settings, using different numbers of lines of text may be facilitated by the different font sizes, such that more lines of text in a smaller font size may fit in the same vertical space as fewer lines of text in a larger font size.

In some embodiments, information corresponding to a lower privacy setting and a less dense density state may be displayed in a larger font size and may comprise a single line of text. In some embodiments, information corresponding to a higher privacy setting and a denser density state may be displayed in a smaller font size and may comprise more than one line of text (or a greater number of lines of text than the information corresponding to a less dense density setting).

In the depicted example of FIG. 59A, as explained above, device 5900 may be in a first density setting corresponding to a lowest density; and the first portion of the received data displayed by complication 5912*a* may correspond to a first privacy level, which in some embodiments corresponds to least sensitive data. In some embodiments, the information displayed corresponding to the first information may be displayed in a first font size or in a first font size setting. In the depicted example, the information displayed corresponding to the first information comprises a single line of text (e.g., the text "11:30" in complication 5912*a* does not have any other lines of text above or below it).

At block 6016, optionally, the first information does not include icons, images, glyphs, or logos. In some embodiments, information relating to received data may be presented without the use, or with minimal use, of icons, images, glyphs, logos, or non-standard symbols. In some embodiments, information may be presented primarily or exclusively by way of text and numerals. In some embodiments, presenting information primarily or exclusively by text and numerals may include the limited use of standard typographic symbols, such as punctuation. In some embodiments, standard symbols may include widely used typographical symbols that may not be considered punctuation, such as the degree symbol "°" used in complication 5914*a* in FIG. 59A. In some embodiments, minimizing or avoiding use of non-standard symbols, icons, images, glyphs, or logos may aid users who wish for information to be displayed in typographic form, so that the user does not have to learn the meaning of custom symbols. Exclusively or primarily presenting typographic information may shorten a learning curve for a device and allow users to more intuitively grasp a user interface, including the meaning of user interface objects that they have not seen before.

In the depicted example of FIG. 59A, the first information presented in complication 5912*a* makes use only of numerals and punctuation, while the information presented in the other complications 5910*a*, 5914*a*, and 5916*a* makes use only of letters, numerals, punctuation, and the standard typographical symbol "s". None of the complications in FIG. 59A include icons, images, glyphs, logos, or non-standard symbols.

At block 6018, optionally, the device receives data relating to a second subject matter. The second subject matter may be any subject matter, including any subject matter of the types described above with reference to block 6004. In some embodiments, the second subject matter is different from the first subject matter, and the data received by the device relating to the second subject matter may be associated with a different program or application than the information relating to the first subject matter.

At block 6020, optionally, the device displays, in a second predetermined portion of the user interface, third information relating to a first portion of the data relating to the second subject matter.

In some embodiments, the second data received by the device may be divided into portions in any of the manners described above with reference to block 6006. In some embodiments, a first portion of the data relating to the second subject matter may correspond to a same privacy setting and/or a same density setting as the first portion of the data relating to the first subject matter. For example, in some embodiments, for each application or subject matter or data source for which data is received, the device may assign a portion of the data to predetermined privacy settings, such that portions of data relating to different subject matters may have corresponding privacy levels or sensitivity levels. In some embodiments, when a device is in a first privacy state and/or a first density state, information corresponding to portions of data associated with the same privacy level or sensitivity level may simultaneously be displayed.

In some embodiments, a user interface may be configured such that various platters (e.g., predefined areas of the user interface) may display information relating to respective subject matters. In some embodiments, predetermined portions of each platter may be configured to display information associated with a predetermined privacy or sensitivity level. For example, in some embodiments, platters may be portions of a user interface that are arranged as rows on the user interface. In the example depicted in FIG. 59A, four platters contain complications 5910*a*-5914*a*, respectively, which are arranged as rows on interface 5950, stacked atop one another.

In the depicted example of FIG. 59A, device 5900 receives, among other information, information from a weather application. The subject matter of the information received from the weather application is weather data, records, forecasts, and the like. In the depicted example, a first portion of the weather data comprises information about a time of a forecasted weather temperature, which is 72°. In the depicted example, complication 5914*a* displays the text "72°" in accordance with the first portion of the received data. In the depicted example, complication 5914*a* is displayed in a different predetermined platter than complication 5912*a*.

At block 6022, optionally, device 5900 displays a first editing interface for editing first display settings corresponding to the first information and third displayed information, wherein the third information corresponds to a different subject matter than the first subject matter. In some embodiments, the third information is information displayed as part of a complication in a different platter from the first information displayed as part of a complication in a first platter. In some embodiments, the third information may be the same as the second information discussed above with reference to FIG. 6020.

It should be noted that the editing interfaces and methods described below may be freely combined with and modified by any of the editing interfaces discussed above in this application in the "Editing Context-Specific User Interfaces" section of this disclosure, or elsewhere.

In some embodiments, an editing interface may take the form of a clock face, or of a typographic modular interface, such that a user may edit display settings of a clock face or typographic modular face while being provided with a preview of what the edited interface will look like. In some embodiments, an editing interface may be a different interface from an interface that displays information as discussed above with reference to blocks 6007-6020. In some embodiments, an editing interface may be any interface allowing a user to modify one or more display settings of an interface, including display settings of the editing interface or display settings of any of the interfaces discussed above with reference to blocks 6007-6020. In some embodiments, an editing interface may include more than one user interface screen.

In some embodiments, an editing interface may be caused to be displayed when a device detects a touch contact whose characteristic intensity is above an intensity threshold.

In the depicted example, device 5900 detects touch contact 5918 in FIG. 59A. In some embodiments, device 5900 determines, via pressure-sensitive display 5902, whether a characteristic intensity of touch contact 5918 exceeds an intensity threshold. In accordance with the determination that a characteristic intensity of touch contact 5918 exceeds an intensity threshold, device 5900 causes interface screen 5960 in FIG. 59B to be displayed. In the depicted example, interface screen 5960 is an editing interface screen that is identical to interface screen 5950 with the exception of the presence of paging affordances 5919. In some embodiments, interface screen 5960 is an editing interface screen for editing one or more color settings and/or one or more density/privacy settings of device 5900, the color settings and/or density settings corresponding to the first displayed information (e.g., complication 5912*a* in FIG. 59B) and third displayed information (e.g., any other displayed complication, such as complication 5914*a* in FIG. 59B).

Figure 60B:
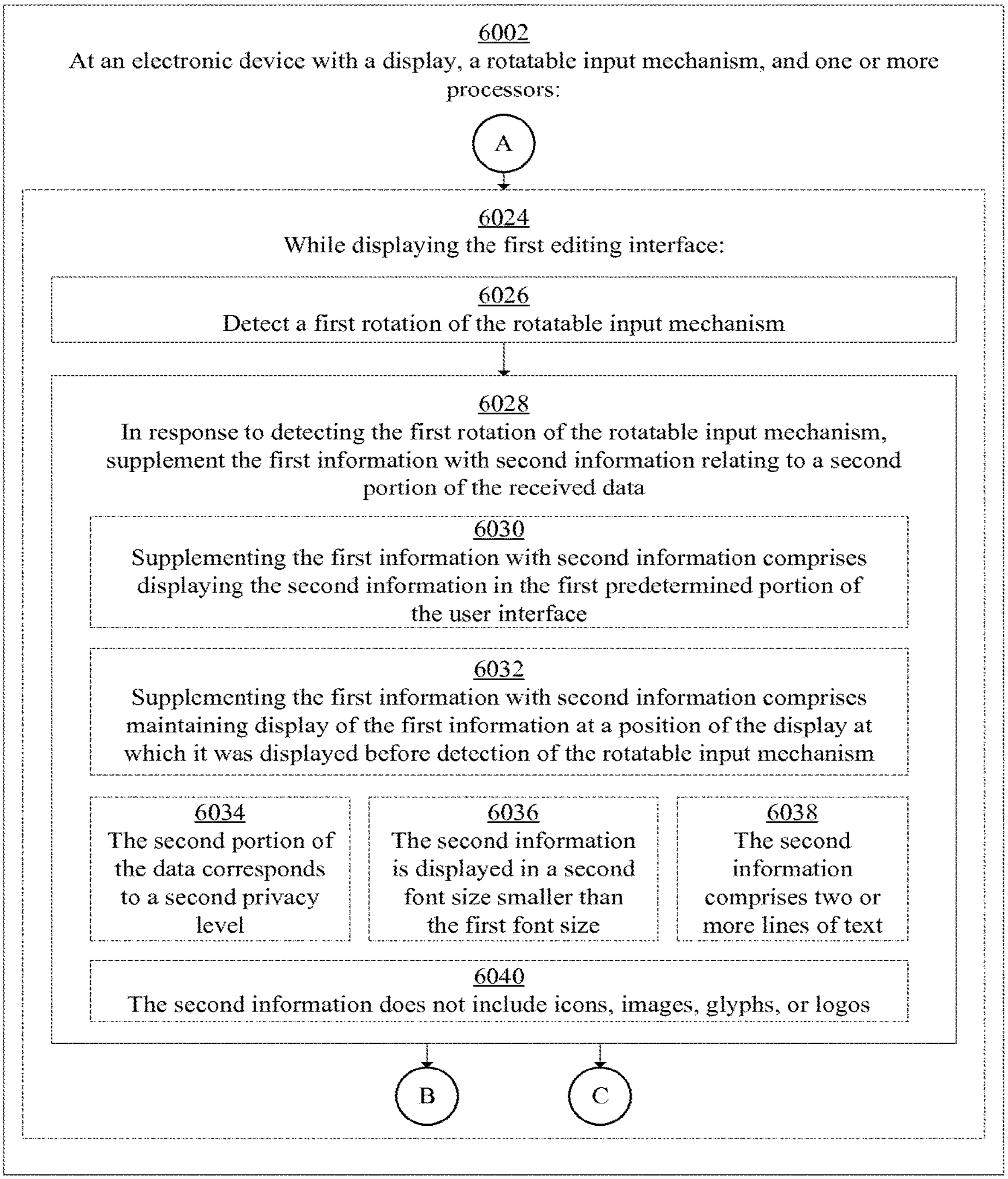

In FIG. 60B, block 6002 is continued, such that method 6000 is further performed at an electronic device having a display, a battery, and one or more processors.

Figure 60C:
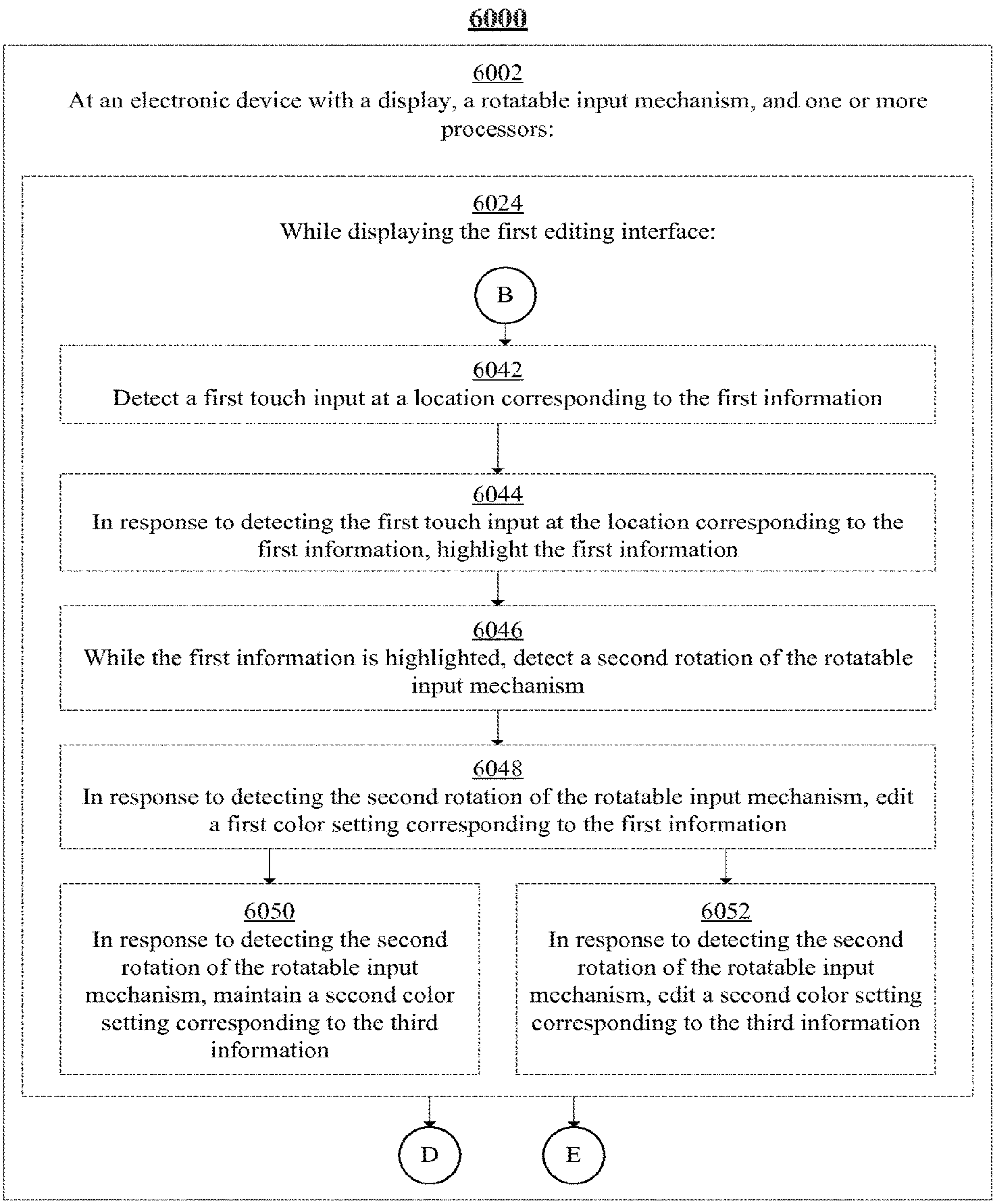

Block 6024 optionally follows from block 6022. At block 6024, optionally, blocks 6026-6052 (some of which are optional, and some of which are depicted in FIG. 60C) are performed while displaying the first editing interface. In the depicted example, blocks 6026-6052 may be performed while displaying editing interface screen 5960 or a related interface screen that is further a part of the same editing interface as editing interface screen 5960, as will be explained in further detail below.

At block 6026, the device detects a first rotation of the rotatable input mechanism. In some embodiments, a first rotation of the rotatable input mechanism may comprise one or more rotations in one or more directions, having one or more speeds, having one or more durations, and having one or more spacings relative to one another. In some embodiments, a first rotation of the rotatable input mechanism may comprise a single rotation of a rotatable input mechanism in a predefined rotational direction. In the example depicted in FIG. 59B, device 5900 detects user input 5920, which is a rotation of rotatable input mechanism 5904.

At block 6028, in response to detecting the first rotation of the rotatable input mechanism, the device supplements the first information with second information relating to a second portion of the received data.

In some embodiments, a first rotation of the rotatable input mechanism may be predetermined to be registered by the device as a command to change a density/privacy setting of the device. In some embodiments, when the device is in an edit state or an edit interface, and the device detects a rotation of the rotatable input mechanism, the device may edit a density/privacy state by cycling through two or more available privacy/density settings; for example, a device may change from a first privacy/density setting to a second, then a second to a third, then a third back to a first, each change coming in accordance with the device detecting rotation of the rotatable input mechanism of greater than a predefined threshold rotation angle and/or speed. In this way, a user may twist a rotatable input mechanism to cycle through available density settings. Rotating a rotatable input mechanism in substantially opposite directions may cause cycling through available density/privacy states in an opposite direction, such as from a first to a third, a third to a second, and then a second to a first.

In some embodiments, when a device changes from a first, lower density state to a second, higher density state (e.g., less dense to denser), displayed information such as user interface objects or complications may be supplemented with additional information. In some embodiments, supplemental information displayed by a previously displayed complication may include information relating to a portion of the underlying data that has been determined to be of a higher sensitivity than the portion of the data relating to the previously displayed information. Thus, in some embodiments, when a user changes a privacy/density setting of a device, displayed embodiments may display information relating to portions of underlying data having a higher sensitivity. In some embodiments, because the information relating to portions of underlying data having a higher sensitivity may be taken from the same underlying data, the second displayed information may thus concern the same subject matter as the first displayed information.

In the depicted example of FIG. 59C, in response to detecting user input 5920 in FIG. 59B, device 5900 supplements each of the four displayed complications with additional information, the additional information relating to respective second portions of the same underlying data and subject matter. In FIG. 59C, the complications are all displayed in a second density state (and are accordingly denoted by reference numerals 5910*b*-5916*b*) that is more dense than the density state of the same complications in FIG. 59B (as denoted by reference numerals 5910*a*-5916*a*). In the particular example of the second platter of four (from the top) in interface screen 5970 in FIG. 59C, complication 5912*b* is displayed in a second density state, and has accordingly been supplemented with second information relating to a second portion of the underlying data corresponding to the upcoming calendar event. The second information displayed in complication 5912*b* (the text "Design Meeting") is information relating to the name of the upcoming calendar event.

At block 6030, optionally, supplementing the first information with second information comprises displaying the second information in the first predetermined portion of the user interface. As described above with reference to block 6020, a user interface may be configured such that various platters (e.g., predefined areas of the user interface) may display information relating to respective subject matters. In some embodiments, predetermined portions of each platter may be configured to display information associated with a predetermined privacy or sensitivity level. For example, in some embodiments, less sensitive information may be displayed on the left side of a platter, while more sensitive information may be displayed on the right side of a platter. (This arrangement may be advantageous because onlookers may naturally start reading from the left side, and may only have time to observe less sensitive information if they are only observing the device for a short time.) In some embodiments, different pieces of information in complications may be divided into separate sections in the complication (such as the way in which the text "11:30" and the text "Design Meeting" are separated in complication 5912*b* in FIG. 59C). In some embodiments, separate sections in a complication may be justified to one side, having a predefined spacing from one another (such as the way in which the text "Design Meeting" is the same distance from the text "11:30" in complication 5912*b* in FIG. 59B as the text "Cupertino Partly Cloudy" is from the text "72°" in complication 5914*b*). In some embodiments, separate sections in a complication may be arranged into fixed columns, such that information relating to the same density/privacy setting may be displayed in a cohesive vertical column.

In the displayed example of FIG. 59C, the second information in the form of the text "Design Meeting" is displayed in the same platter, as part of the same complication, as the first information in the form of the text "11:30."

At block 6032, optionally, supplementing the first information with second information comprises maintaining display of the first information at a position of the display at which it was displayed before detection of the rotatable input mechanism. In some embodiments, rather than replacing, displacing, or otherwise disturbing information already displayed in a first privacy/density setting, information displayed in a second privacy/density setting may be displayed in addition to information that was already displayed when a device was in a first privacy/density setting. In some embodiments, information that was already displayed when a device was in a first privacy/density setting may be maintained in the same position on a display and/or in the same position on a user interface when the device is set to a second privacy/density setting. In the depicted example of interface 5970 in FIG. 59C, when device 5900 is set to a second privacy/density setting and the complications each enter a second density state, the information that was originally displayed by complications 5910*a*-5916*b* in FIG. 59B is not displaced, moved, occluded, or replaced in complications 5910*b*-5916*b* in FIG. 59C, but is rather maintained at the same position on the displayed interface and at the same position on display 5902.

At block 6034, optionally, the second portion of the data corresponds to a second privacy level. As described above with reference to block 6010, different portions of the received data may correspond to different privacy levels or different privacy settings. As the first information displayed, as explained above with reference to block 6010, may correspond to a first privacy level, the second information may correspond to a second privacy level. In some embodiments, the second privacy level may correspond to the display of more sensitive information that the first privacy level, while in some embodiments the second privacy level may correspond to the display of less sensitive information that the first privacy level.

In the example depicted in FIG. 59C, the second portion of the received data displayed by complication 5912*b* may correspond to a second privacy level, which in some embodiments corresponds to more sensitive data than the data to which the first privacy level corresponds. For example, device 5900 may have received various pieces of information about an upcoming calendar event, and may have divided the information into portions. One portion of the data may relate to the time of the upcoming event, and this portion may be considered least sensitive. Another portion of the data may relate to the name of the upcoming event, and this information may be considered more sensitive. Yet another portion of the data may relate to the name of invitees or participants in the upcoming event, and this information may be considered most sensitive. In the example depicted in FIG. 59C, device 5900 is in a second density state that corresponds to a second privacy state, and, accordingly, information corresponding to the portion of the data corresponding to the more sensitive data is displayed in addition to information corresponding to the least sensitive portion of the data; that is, in addition to the time of the upcoming calendar event, the name of the upcoming calendar event is also displayed is displayed in complication 5912*b*.

At block 6036, optionally, the second information is displayed in a second font size smaller than the first font size. As described above with reference to block 6012, in some embodiments, information corresponding to different privacy or sensitivity levels, or information corresponding to different density states, may be displayed in different font sizes or different font size settings. In some embodiments, less sensitive information corresponding to a lower density setting may be displayed in a larger font size setting, while more sensitive information corresponding to a higher density setting may be displayed in a smaller font size setting. In the depicted example of FIG. 59C, the second information, in the form of the text “Design Meeting” in complication 5912*b*, is displayed in a smaller font size than the font size in which the first information, in the form of the text “11:30” in complication 5912*b*, is displayed.

At block 6038, optionally, the second information comprises two or more lines of text. As explained above with reference to block 6014, in some embodiments, information corresponding to different privacy or sensitivity levels, or information corresponding to different density states, may be displayed in differing numbers of lines of text, which may in some embodiments be facilitated by their being displayed in differing font size settings. In some embodiments, less sensitive information corresponding to a lower density setting may be displayed by a single line of text, while more sensitive information corresponding to a higher density setting may be displayed by more than one line of text (or by more lines of text than are used for the less sensitive information). In the depicted example of FIG. 59C, the second information, in the form of the text “Design Meeting” in complication 5912*b*, is displayed by two lines of text.

At block 6040, optionally, the second information does not include icons, images, glyphs, or logos. As described above with reference to block 6016, displayed information may be presented primarily or exclusively in the form of letters, numerals, and standard typographical symbols. In the depicted example of FIG. 59C, the second information presented in complication 5912*b* makes use only of letters (“Design Meeting”), while the second information presented in the other complications 5910*b*, 5914*b*, and 5916*b* also makes use only of letters, numerals, punctuation, and the standard typographical symbol “+”. None of the complications in FIG. 59C include icons, images, glyphs, logos, or non-standard symbols.

In FIG. 60C, block 6002 is continued, such that method 6000 is further performed at an electronic device having a display, a battery, and one or more processors. In FIG. 60C, block 6024 is, optionally, continued, such that blocks 6042-6052 are, optionally, performed while displaying the first editing interface. In the depicted example, blocks 6042-6052 may be performed while displaying editing interface screen 5960 or a related interface screen that is further a part of the same editing interface as editing interface screen 5960, as will be explained in further detail below.

At block 6042, optionally, the device detects a first touch input at a location corresponding to the first information. The touch input detected may be a single-touch input, a multi touch input, a single-tap input, and/or a multi-tap input detected by touch- and/or pressure sensitive elements in any touch- and/or pressure-sensitive surface, including a touchscreen. In some embodiments, a device may detect a touch contact at a location that corresponds to the first information. In some embodiments, the touch input may be detected on a touchscreen, such as display 5902. In some embodiments, the touch input may be detected at a location at which the first information is displayed. In some embodiments, the touch input may be detected at a location of a platter in which the first information is displayed, such that the touch contact may be detected at a location corresponding to information associated with the first information, such as second or third information included in the same complication in the same platter as the first information.

In the depicted example of FIG. 59C, device 5900 detects user input 5922, which is a tap input detected on display 5902 at a location corresponding to complication 5912*b* in the second of four complication platters on interface screen 5970.

At block 6044, optionally, in response to detecting the first touch input at the location corresponding to the first information, the device highlights the first information. In some embodiments, a touch input detected at a location corresponding to first information, detected while a device is in an editing state, may be predetermined to cause the device to select the first information for editing of one or more display settings. In some embodiments, when a user taps on a displayed complication when a device is in an editing state, the complication may be selected for editing of one or more display settings, such as a color setting. In some embodiments, once selected, a user may use one or more inputs to modify a color setting of the selected complication and/or the selected displayed information.

In some embodiments, highlighting first information may include displaying the first information in accordance with any distinct visual appearance suitable to distinguish it from other displayed information in an interface, or suitable to distinguish it from a previous visual appearance of the same information. In some embodiments, highlighting may be achieved by changing a display size, display color, background color, outline setting, underline setting, italic setting, bold setting, font size setting, font setting, outline setting, animation style, or any other suitable aspect of the visual appearance of displayed information. In the depicted embodiment in FIG. 59D, in response to detecting input 5922 in FIG. 59C, device 5900 highlights complication 5912*b* by displaying the text of complication 5912*b* at a larger size and in a bolded font as compared to the appearance of the other complications 5910*b*, 5914*b*, and 5916*b* in editing interface screen 5980 in FIG. 59D (and as compared to the previous appearance of complication 5912*b* in editing interface screen 5970 in FIG. 59C).

At block 6046, optionally, while the first information is highlighted, the device detects a second rotation of the rotatable input mechanism. In some embodiments, a second rotation of the rotatable input mechanism may comprise one or more rotations in one or more directions, having one or more speeds, having one or more durations, and having one or more spacings relative to one another. In some embodiments, a second rotation of the rotatable input mechanism may comprise a single rotation of a rotatable input mechanism in a predefined rotational direction. In the example depicted in FIG. 59D, while device 5900 is displaying the information in complication 5912*b* in a highlighted (bold and larger font size) appearance, device 5900 detects user input 5924, which is a rotation of rotatable input mechanism 5904.

At block 6048, optionally, in response to detecting the second rotation of the rotatable input mechanism, the device edits a first color setting corresponding to the first information. In some embodiments, color settings may be modified by a user using an edit interface such as the one depicted in part by editing interface screens 5960, 5970, and 5980 in FIGS. 59B, 59C, and 59D, respectively. In some embodiments, after a user has selected certain information, such as a one or more complications or platters, for editing, the user may then execute a rotational input through a rotatable input mechanism to edit a color setting of the selected information. In some embodiments, there may be a predefined selection of color settings each corresponding to a color, series of colors, pattern of colors, or animation by which a color setting changes in time. In some embodiments, one or more of the color settings are a gradient color setting or a pattern color setting that renders the complication text (in the first or second density state) as a continuous color gradient or pattern across the different letters and numbers in the complication. The predefined color settings may be arranged into an ordered progression. When the user selects a complication for editing and rotates the rotational input mechanism, the setting may be modified by cycling or scrolling through the ordered progression to a next or previous color setting in accordance with a direction of the rotation of the input. The color setting may be changed in response to the rotatable input mechanism being rotated at least through a predefined minimum rotation angle, such that one long continuous rotation may cause the device to progress sequentially through a series of color settings. In some embodiments, the ordered progression may loop around from the last setting to the first.

In the depicted example of FIG. 59D, a color setting of complication 5912*b* may be modified in accordance with user input 5924, although the change to a color setting is not depicted by the black-and-white figure.

At block 6050, optionally, in response to detecting the second rotation of the rotatable input mechanism, the device maintains a second color setting corresponding to the third information. As explained above with reference to block 6022, the third information, in some embodiments, is information displayed as part of a complication in a different platter from the first information displayed as part of a complication in a first platter. Thus, in some embodiments, when a color setting of one platter, complication, or other displayed information is edited, the color setting of another platter, complication, or other displayed information may be maintained and not changed. In some embodiments, users may wish to be able to individually customize the color settings of complications on an interface, which may help users to assign meaningful color-complication relationships in accordance with their chosen arrangement of complications.

Block 6052 optionally follows from block 6048. At block 6052, optionally, in response to detecting the second rotation of the rotatable input mechanism, the device edits a second color setting corresponding to the third information. As explained above with reference to block 6022, the third information, in some embodiments, is information displayed as part of a complication in a different platter from the first information displayed as part of a complication in a first platter. Thus, in some embodiments, when a color setting of one platter, complication, or other displayed information is edited, the color setting of another platter, complication, or other displayed information may be edited in accordance with the same input that caused the editing of the first platter, complication, or other displayed information.

In some embodiments, a user may edit a color setting of more than one of the complications/platters, or of all of the complications/platters, at the same time. For example, color themes may be predetermined and saved on the device (or available to the device by network communication), such that a user may select a single theme that assigns a color setting to more than one or all of the complications/platters. In some embodiments, themes may assign a predetermined color setting to a predetermined platter. In some embodiments, themes may assign a predetermined color setting to a predetermined type of complication, regardless of the platter in which it appears. In some embodiments, a theme may be a gradient theme or a pattern theme that renders more than one of the complications/platters, or all of the complications/platters, as a continuous gradient or a continuous pattern across the letters and numbers in the multiple complications/platters. In some embodiments, selecting a predefined color setting scheme or theme may be advantageous because it may allow a user to assign color settings to complications such that adjacent colors are adequately contrasting, making distinction between complications easier. In some embodiments, themes that assign predefined color settings to predefined complications or types of complications (rather than to platters) may be advantageous because they may help a user to quickly identify a complication or complication type based on its color.

In FIG. 60D, block 6002 is continued, such that method 6000 is further performed at an electronic device having a display, a battery, and one or more processors.

Block 6054 optionally follows from blocks 6024-6052. At block 6054, while displaying the first editing interface, the device detects a horizontal swipe gesture. In some embodiments, the horizontal swipe gesture may be detected at any location on a touch-sensitive surface or at any location on a touch-sensitive surface corresponding to the first editing interface. In this way, the horizontal swipe gesture may be said, in some embodiments, to be location independent. In the depicted example of FIG. 59D, device 5900 detects user input 5926, which is a leftward swipe gesture applied to the touch-sensitive screen 5902.

At block 6056, optionally, in response to detecting the horizontal swipe gesture, the device displays a second editing interface for editing second display settings corresponding to the first information and the third information. In some embodiments, the second editing interface may be an interface for editing a different display setting or a different display characteristic of the same underlying user interface. In some embodiments, the second editing interface may be a second page among several editing interface pages that are accessible by paging from side to side. In some embodiments, a user may swipe from side to side to navigate between one editing interface or editing page and other editing interfaces or editing pages, for example, by swiping to the left to access a page to the right, or by swiping to the right to access a page to the left. In some embodiments, editing interface pages which may be paged through by a user may each correspond to editing a different display setting; a page may be configured to edit a color setting, a font setting, a text size setting, a text style (e.g., underline, bold, italics, etc.), a location setting (e.g., the location at which information is displayed), a privacy setting, a density setting, and/or a complication identity setting (e.g., the underlying data or information which is displayed in a given slot, location, or platter). In some embodiments, editing interface pages may be configured to edit more than one display setting in accordance with predefined user inputs.

In the depicted example of FIGS. 59D and 59F, editing interface screen 5980 in FIG. 59D may, in some embodiments, be considered a first editing interface, while editing interface screen 5990 in FIG. 59E may, in some embodiments, be considered a second, distinct editing interface. In the depicted example, editing interface 5980 in FIG. 59D is configured to allow a user to edit color settings (as explained above with reference to blocks 6042-6052) by selecting a platter for editing and then rotating rotatable input mechanism 5904. In the depicted example, editing interface 5990 in FIG. 59E is configured to allow a user to edit complication identity settings. In a similar manner as described above with reference to editing color settings in blocks 6042-6052, a user may, in some embodiments, tap a platter on display 5902 to select the platter for editing, and execute one or more rotational inputs of rotatable input mechanism 5904 in order to cycle through available complications that may be displayed in each platter (including selecting to display no complication in a platter). In some embodiments, a user may edit the complication identity setting of more than one platter at once, for example, by selecting more than one platter for editing, or by selecting a predefined or curated theme or scheme of complications to be displayed in predefined platters. In some embodiments, one or more of the first and second editing interface may be configured to allow a user to edit a density setting of device 5900 (as described above with reference to blocks 6026-6040) by rotating rotatable input mechanism 5904 when no complication or platter is selected for editing.

Figure 60E:
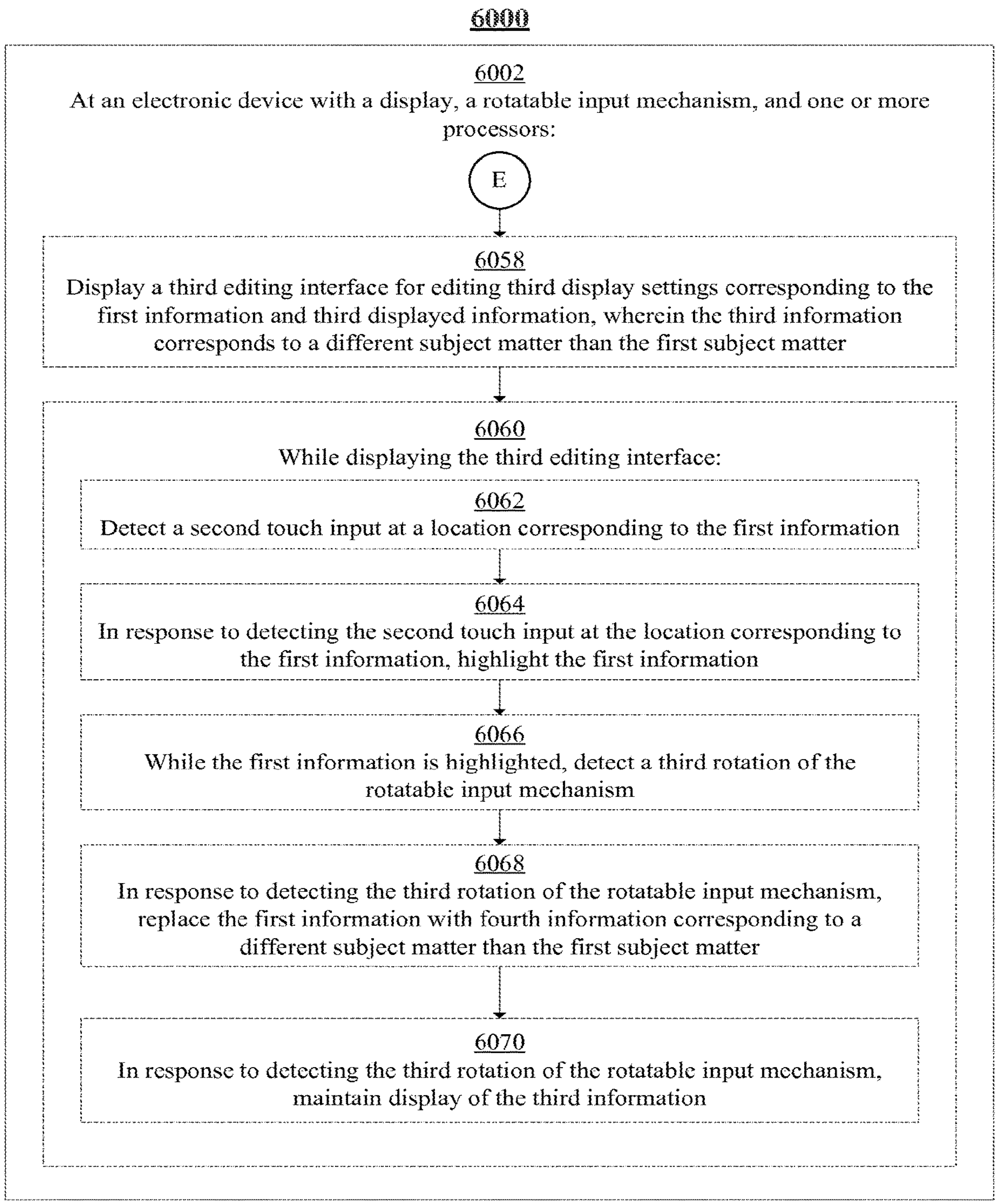

In FIG. 60E, block 6002 is continued, such that method 6000 is further performed at an electronic device having a display, a battery, and one or more processors.

Block 6058 optionally follows from blocks 6024-6052. At block 6058, optionally, the device displays a third editing interface for editing third display settings corresponding to the first information and third displayed information, wherein the third information corresponds to a different subject matter than the first subject matter. In some embodiments, the third editing interface may share some or all of the characteristics of the first and/or second editing interfaces described above with reference to blocks 6022 and 6056, respectively. In some embodiments, the third editing interface may be the same interface as the second editing interface described above with reference to block 6056, including that it may be accessed by executing a swipe gesture while displaying the first editing interface, as described above with reference to blocks 6054-6056. In the depicted example of FIG. 59E, editing interface screen 5990 is displayed by device 5900.

At block 6060, optionally, blocks 6062-6070 are optionally performed while displaying the third editing interface. In the depicted example of FIGS. 59E-59F, blocks 6062-6070 may be performed while displaying editing interface screen 5990 or a related interface screen that is further a part of the same editing interface as editing interface screen 5990, as will be explained in further detail below.

At block 6062, the device detects a second touch input at a location corresponding to the first information. The touch input detected may be a single-touch input, a multi touch input, a single-tap input, and/or a multi-tap input detected by touch- and/or pressure sensitive elements in any touch- and/or pressure-sensitive surface, including a touch-screen. In some embodiments, a device may detect a touch contact at a location that corresponds to the first information. In some embodiments, the touch input may be detected on a touchscreen, such as display 5902. In some embodiments, the touch input may be detected at a location at which the first information is displayed. In some embodiments, the touch input may be detected at a location of a platter in which the first information is displayed, such that the touch contact may be detected at a location corresponding to information associated with the first information, such as second or third information included in the same complication in the same platter as the first information.

At block 6064, optionally, in response to detecting the second touch input at the location corresponding to the first information, the device highlights the first information. In some embodiments, the device may highlight the first information in any of the manners described above with reference to block 6044.

In some embodiments, rather than detecting a touch input while the third editing interface is displayed and responsively highlighting a complication or a platter, a complication or platter may already be highlighted when the third editing interface is accessed. This may occur, in some embodiments, when a user has already selected a platter/complication for editing in a previous editing interface, and pages to a new editing interface. In some embodiments, paging between editing interfaces may cause previously selected platters/complications to no longer be highlighted, while, in some embodiments, paging between editing interfaces may cause previously selected platters/complications to remain selected for editing and remain highlighted upon displaying the new editing interface.

In the depicted example of FIG. 59E, complication **5912*b* is selected for editing and accordingly highlighted by being displayed in a bold font and at an increased font size as compared to the other complications 5910*b*, 5914*b*, and 5916*b* in interface 5990. In the depicted example, complication 5912*b* was highlighted in accordance with having been previously selected for editing by touch input 5922 in FIG. 59C, rather than in the manner described above by blocks 6062 and 6064**.

At block 6066, optionally, while the first information is highlighted, the device detects a second rotation of the rotatable input mechanism. In some embodiments, a second rotation of the rotatable input mechanism may comprise one or more rotations in one or more directions, having one or more speeds, having one or more durations, and having one or more spacings relative to one another. In some embodiments, a second rotation of the rotatable input mechanism may comprise a single rotation of a rotatable input mechanism in a predefined rotational direction. In the example depicted in FIG. 59E, while device 5900 is displaying the information in complication **5912*b* in a highlighted (bold and larger font size) appearance, device 5900 detects user input 5928, which is a rotation of rotatable input mechanism 5904**.

At block 6068, optionally, in response to detecting the third rotation of the rotatable input mechanism, the device replaces the first information with fourth information corresponding to a different subject matter than the first subject matter. In some embodiments, complication identity settings may be edited by a user in an analogous manner to the way in which color settings may be edited, as described above with reference to block 6048. Just as a user may cycle through color settings for one or more complications by selecting a complication for editing and rotating the rotatable input mechanism in some editing interfaces, a user may similarly cycle through complication identity settings for one or more platters by selecting a complication/platter for editing and rotating the rotatable input mechanism in some interfaces. Rather than editing a color setting, however, (or, in some embodiments, in addition to editing a color setting), the device may cycle through different complications by replacing the complication displayed in a selected platter with one or more next or previous available complications in accordance with a magnitude and/or speed of a user's rotation. In some embodiments, a user may select from any available complication to be displayed in the selected platter, or may select an option for displaying no complication in the selected platter.

In the depicted example of FIG. 59F, in response to detecting user input 5928 in FIG. 59E, device 5900 replaces complication 5912*b* in FIG. 59E with complication 5930*b* in FIG. 59F. In the depicted example, complication 5930*b* is a stock-market complication which displays information about the performance of the Standard & Poor's stock market index (e.g., a gain of 54.48 points). Note that complication 5930*b* is displayed in a second density/privacy state, as are the other complications in FIG. 59F. Further note that complication 5930*b* is displayed in a highlighted state with bolded font and font of a larger size than the other complications 5910*b*, 5914*b*, and 5916*b* in interface 5992, so as to signify that complication 5930*b* and or its associated platter remain selected for editing.

At block 6070, optionally, in response to detecting the third rotation of the rotatable input mechanism, the device maintains display of the third information. As explained above with reference to block 6022, the third information, in some embodiments, is information displayed as part of a complication in a different platter from the first information displayed as part of a complication in a first platter. Thus, in some embodiments, when a complication identity setting of one platter is edited, the complication identity setting of another platter may be maintained and not changed. In the depicted example of FIG. 59F, when complication 5930*b* replaces complication 5912*b* from FIG. 59E, the other complications 5910*b*, 5914*b*, and 5916*b* are maintained on display 5902.

In some embodiments, when a complication identity setting of one platter is edited, the complication identity setting of another platter may be edited in accordance with the same input that caused the editing of the first platter. This may occur, in some embodiments, when a user selects a predefined theme or scheme of related or otherwise curated complications, each one being assigned to a predefined platter.

Figure 60F:
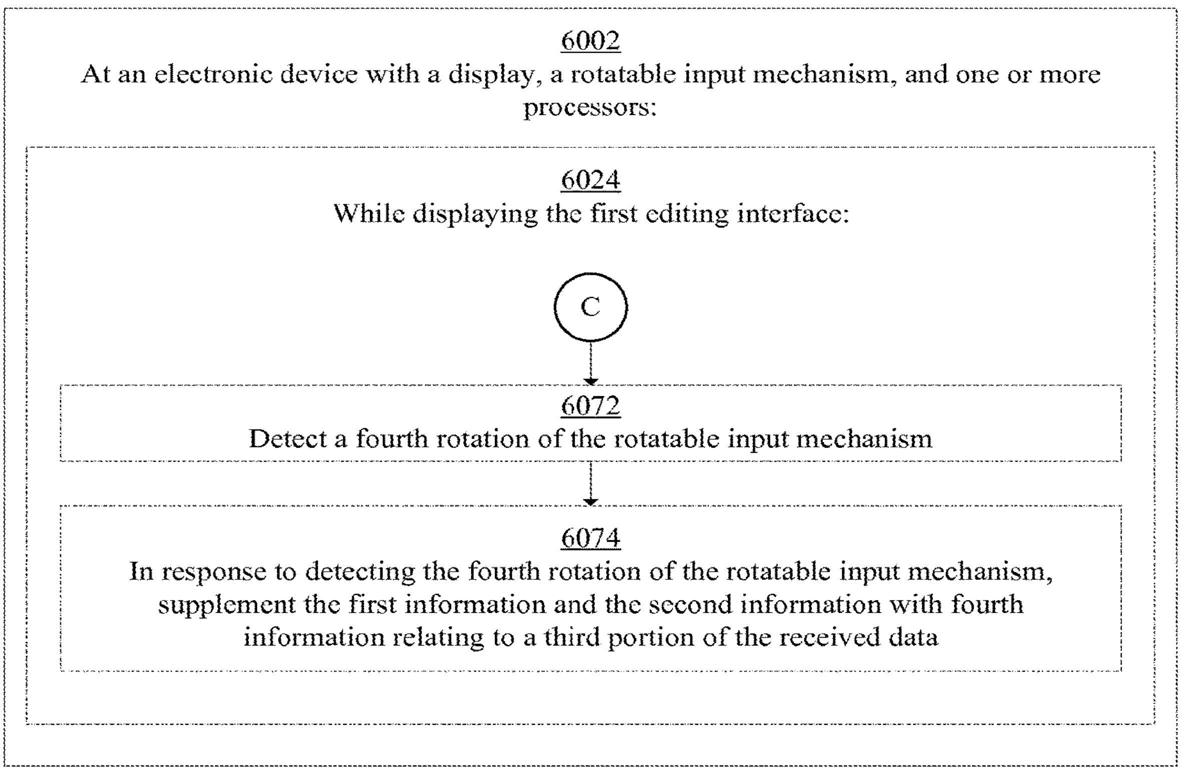

In FIG. 60F, block 6002 is continued, such that method 6000 is further performed at an electronic device having a display, a battery, and one or more processors. In FIG. 60C, block 6024 is, optionally, continued from FIG. 60B, such that blocks 6072-6074 are, optionally, performed while displaying the first editing interface.

Block 6074 optionally follows from blocks 6028-6040. At block 6074, the device detects a fourth rotation of the rotatable input mechanism. In some embodiments, a first rotation of the rotatable input mechanism may comprise one or more rotations in one or more directions, having one or more speeds, having one or more durations, and having one or more spacings relative to one another. In some embodiments, a first rotation of the rotatable input mechanism may comprise a single rotation of a rotatable input mechanism in a predefined rotational direction.

At block 6076, optionally, in response to detecting the fourth rotation of the rotatable input mechanism, the device supplements the first information and the second information with fourth information relating to a third portion of the received data. In some embodiments, the fourth information may correspond to a third portion of the same data used by the device to present the first information and the second information. As described above with reference to block 6010, the received information may be divided into portions; in some embodiments, the third portion of the data may be determined to be even more private and even more sensitive than the first and second portions of the data. In some embodiments, the fourth information relating to the third portion of the received data may be presented when the device is set to a third privacy/density state, such as by a user executing an additional rotational input or a further rotational input in any of the manners described above with reference to blocks 6026-6040. That is, in some embodiments, a user may execute a first rotation to supplement the first, less sensitive information with the second, more sensitive information; the user may then continue the rotation or execute an additional rotation in the same direction to supplement the first and second information with the fourth, even more sensitive information. In some embodiments, the even more sensitive information may be displayed in the same platter as the first and second information, simply further to the right. In some embodiments, the even more sensitive information may be displayed in an even smaller font size setting than the font size setting corresponding to the second information. In some embodiments, the even more sensitive information may include even more lines of text than the second information. In some embodiments, the even more sensitive information may be presented without the use (or with limited use) of icons, images, glyphs, or logos.

It should be understood that the particular order in which the operations in FIG. 60 have been described is merely exemplary and is not intended to indicate that the described order is the only order in which the operations could be performed. One of ordinary skill in the art would recognize various ways to reorder the operations described herein.

Note that details of the processes described above with respect to method 6000 (e.g., FIG. 60) are also applicable in an analogous manner to the methods described elsewhere in this application. For example, other methods described in this application may include one or more of the characteristics of method 6000. For example, the devices, hardware elements, inputs, interfaces, modes of operation, faces, time indicators, and complications described above with respect to method 6000 may share one or more of the characteristics of the devices, hardware elements, inputs, interfaces, modes of operation, faces, time indicators, and complications described elsewhere in this application with respect to other methods. Moreover, the techniques described above with respect to method 6000 may be used in combination with any of the interfaces, faces, or complications described elsewhere in this application. For brevity, these details are not repeated elsewhere in this application.

Figure 61:
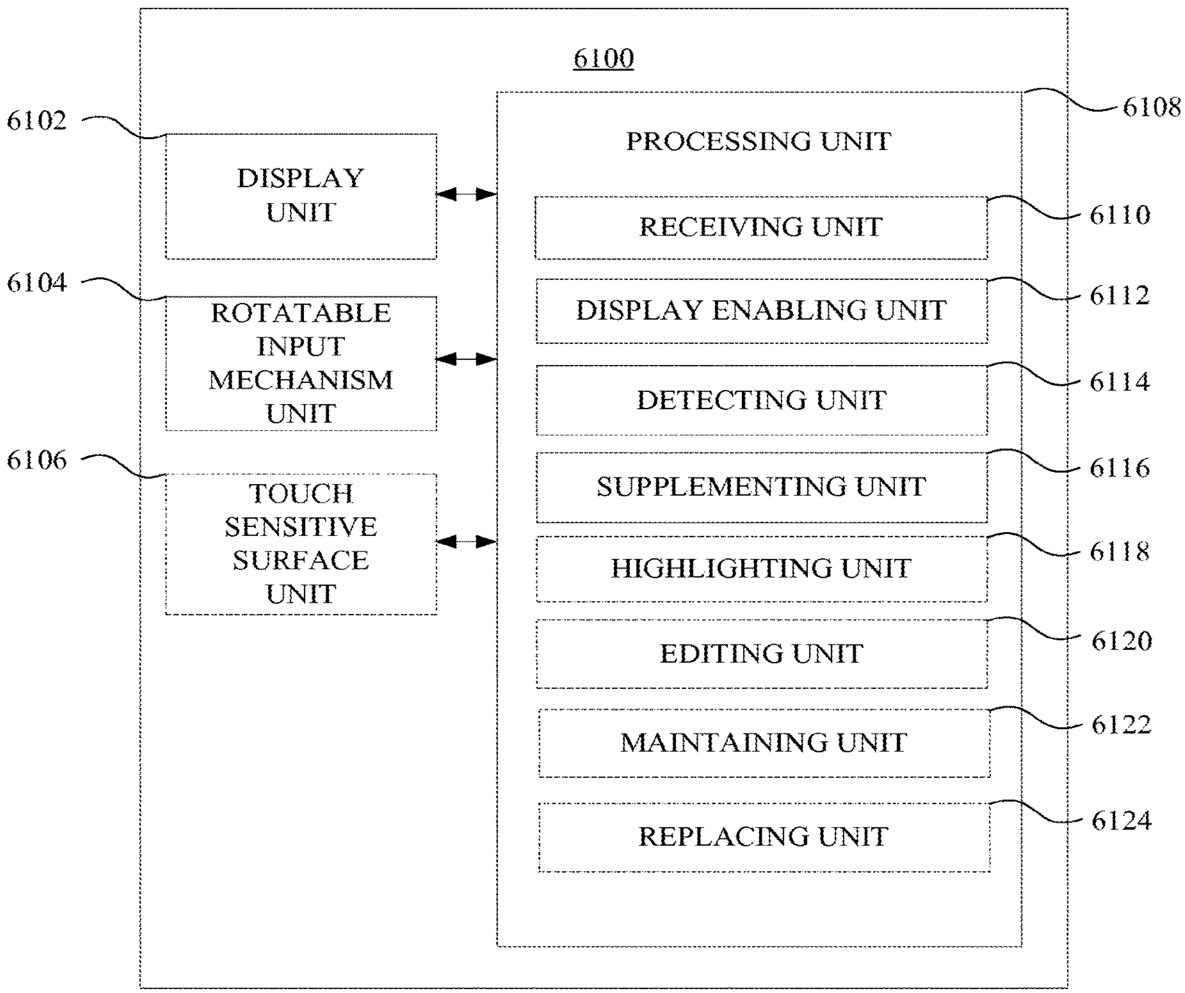
FIG. 61 is a functional block diagram of an electronic device in accordance with some embodiments.

In accordance with some embodiments, FIG. 61 shows an exemplary functional block diagram of an electronic device 6100 configured in accordance with the principles of the various described embodiments. In accordance with some embodiments, the functional blocks of electronic device 6100 are configured to perform the techniques described above. The functional blocks of the device 6100 are, optionally, implemented by hardware, software, or a combination of hardware and software to carry out the principles of the various described examples. It is understood by persons of skill in the art that the functional blocks described in FIG. 61 are, optionally, combined or separated into sub-blocks to implement the principles of the various described examples. Therefore, the description herein optionally supports any possible combination or separation or further definition of the functional blocks described herein.

As shown in FIG. 61, electronic device 6100 includes display unit 6102 configured to display a graphic user interface such as a typographic modular interface and/or an editing interface, and rotatable input mechanism unit 6104 configured to receive rotational inputs. Optionally, device 6100 also includes a touch-sensitive surface unit 6106 configured to receive contacts. Device 6100 further includes processing unit 6108 coupled to display unit 6102, rotatable input mechanism unit 6104, and, optionally, touch-sensitive surface unit 6106. Processing unit 6108 contains receiving unit 6110, display enabling unit 6112, detecting unit 6114 and supplementing unit 6116. Optionally, processing unit 6108 further includes highlighting unit 6118, editing unit 6120, maintaining unit 6122, and replacing unit 6124.

Processing unit 6112 is configured to: receive (e.g., with receiving unit 6110) data relating to a first subject matter; enable display (e.g., with display enabling unit 6112) on the display unit 6102 of first information relating to a first portion of the received data; detect (e.g., with detecting unit 6114) a first rotation of the rotatable input mechanism unit 6104; and, in response to detecting the first rotation of the rotatable input mechanism unit 6104, supplement (e.g., with supplementing unit 6116) the first information with second information relating to a second portion of the received data.

In some embodiments, enabling display (e.g., with display enabling unit 6112) on the display unit 6102 of first information comprises enabling display on the display unit 6102 of the first information in a first predetermined portion of a user interface.

In some embodiments, supplementing the first information with second information comprises enabling display on the display unit 6102 of the second information in the first predetermined portion of the user interface.

In some embodiments, wherein supplementing (e.g., with display enabling unit 6112) the first information with second information comprises maintaining display of the first information at a position of the display unit 6102 at which it was displayed before detection of the rotatable input mechanism unit 6104.

In some embodiments, processing unit 6108 is further configured to: receive (e.g., with receiving unit 6110) data relating to a second subject matter; enable display (e.g., with display enabling unit 6112) on the display unit 6102, in a second predetermined portion of the user interface, of third information relating to a first portion of the data relating to the second subject matter.

In some embodiments, the first portion of the data corresponds to a first privacy level; and the second portion of the data corresponds to a second privacy level.

In some embodiments, the first information is displayed on the display unit 6102 in a first font size; and the second information is displayed on the display unit 6102 in a second font size smaller than the first font size.

In some embodiments, the first information comprises a single line of text; the second information comprises two or more lines of text.

In some embodiments, processing unit 6108 is further configured to: enable display (e.g., with display enabling unit 6112) on the display unit 6102 of a first editing interface for editing first display settings corresponding to the first information and the third information, while enabling display (e.g., with display enabling unit 6112) on the display unit 6102 of the first editing interface: detect (e.g., with detecting unit 6114) a first touch input at a location corresponding to the first information; in response to detecting the first touch input at the location corresponding to the first information, highlight (e.g., with highlighting unit 6118) the first information; while the first information is highlighted, detect (e.g., with detecting unit 6114) a second rotation of the rotatable input mechanism unit 6104; and in response to detecting the second rotation of the rotatable input mechanism unit 6104, edit (e.g., with editing unit 6120) a first color setting corresponding to the first information.

In some embodiments, processing unit 6108 is further configured to: while enabling display (e.g., with display enabling unit 6112) on the display unit 6102 of the first editing interface: in response to detecting the second rotation of the rotatable input mechanism unit 6104, maintain (e.g., with maintaining unit 6122) a second color setting corresponding to the third information.

In some embodiments, processing unit 6108 is further configured to: while enabling display (e.g., with display enabling unit 6112) on the display unit 6102 of the first editing interface: in response to detecting the second rotation of the rotatable input mechanism unit 6104, edit (e.g., with editing unit 6120) a second color setting corresponding to the third information.

In some embodiments, processing unit 6108 is further configured to: while enabling display (e.g., with display enabling unit 6112) on the display unit 6102 of the first editing interface, detect (e.g., with detecting unit 6114) a horizontal swipe gesture; and in response to detecting the horizontal swipe gesture, enable display (e.g., with display enabling unit 6112) on the display unit 6102 of a second editing interface for editing second display settings corresponding to the first information and the third information.

In some embodiments, processing unit 6108 is further configured to: enable display (e.g., with display enabling unit 6112) on the display unit 6102 of a third editing interface for editing third display settings corresponding to the first information and the third information; while enabling display (e.g., with display enabling unit 6112) on the display unit 6102 of the third editing interface: detect (e.g., with detecting unit 6114) a second touch input at a location corresponding to the first information; in response to detecting the second touch input at the location corresponding to the first information, highlight (e.g., with highlighting unit 6118) the first information; while the first information is highlighted, detect (e.g., with detecting unit 6114) a third rotation of the rotatable input mechanism unit 6104; and in response to detecting the third rotation of the rotatable input mechanism unit 6104, replace (e.g., with replacing unit 6124) the first information with fourth information corresponding to a different subject matter than the first subject matter.

In some embodiments, processing unit 6108 is further configured to: while enabling display (e.g., with display enabling unit 6112) on the display unit 6102 of the third editing interface: in response to detecting the third rotation of the rotatable input mechanism unit 6104, maintain (e.g., with maintaining unit 6122) display on the display unit 6102 of the third information.

In some embodiments, processing unit 6108 is further configured to: detect a fourth rotation of the rotatable input mechanism unit 6104; in response to detecting the fourth rotation of the rotatable input mechanism unit 6104, supplement the first information and the second information with fourth information relating to a third portion of the received data.

In some embodiments, the first information and the second information do not include icons, images, glyphs, or logos.

The functional blocks of the device 6100 are, optionally, implemented by hardware, software, or a combination of hardware and software to carry out the principles of the various described examples. It is understood by persons of skill in the art that the functional blocks described in FIG. 61 are, optionally, combined or separated into sub-blocks to implement the principles of the various described examples. Therefore, the description herein optionally supports any possible combination or separation or further definition of the functional blocks described herein.

The operations described above with reference to FIGS. 60A-60F are, optionally, implemented by components depicted in FIGS. 1A-1B or FIG. 59. For example, receiving operation 6004, displaying operation 6006, detecting operation 6026, and supplementing operation 6028 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the appended claims.

What is claimed is:

1. An electronic device, comprising:

a touch-sensitive display;

one or more processors;

a memory; and one or more programs, wherein the one or more programs are stored in the memory and configured to be executed by the one or more processors, the one or more programs including instructions for:

displaying a watch face that includes a plurality of complications and an indication of time, wherein the watch face that includes the plurality of complications and the indication of time is a first watch face of a plurality of watch faces;

while displaying the watch face, detecting a first contact on the touch-sensitive display;

in response to detecting the first contact on the touch-sensitive display, displaying a user interface for editing the watch face;

while displaying a first user interface of the user interface for editing the watch face that visually indicates that the first user interface is for editing the indication of time that is included in the watch face, detecting a second contact on the touch-sensitive display;

in response to detecting the second contact on the touch-sensitive display, switching from displaying the first user interface of the user interface for editing the watch face to displaying a second user interface of the user interface for editing the watch face that visually indicates that the second user interface is for editing one or more complications of the plurality of complications on the watch face;

displaying a second watch face of the plurality of watch faces that includes a second plurality of complications and a second indication of time, wherein the second watch face of the plurality of watch faces is different from the first watch face of the plurality of watch faces;

while displaying the second watch face of the plurality of watch faces, detecting a third contact on the touch-sensitive display;

in response to detecting the third contact on the touch-sensitive display, displaying a user interface for editing the second watch face of the plurality of watch faces;

while displaying a first user interface of the user interface for editing the second watch face of the plurality of watch faces that visually indicates that the first user interface of the user interface for editing the second watch face of the plurality of watch faces is for editing the second indication of time, detecting a fourth contact on the touch-sensitive display; and in response to detecting the fourth contact on the touch-sensitive display, switching from displaying the first user interface of the user interface for editing the second watch face of the plurality of watch faces to displaying a second user interface of the user interface for editing the second watch face of the plurality of watch faces that visually indicates that the second user interface of the user interface for editing the second watch face of the plurality of watch faces is for editing one or more complications of the second plurality of complications on the second watch face of the plurality of watch faces.

2. The electronic device of claim 1, wherein the second contact is a swipe.

3. The electronic device of claim 1, the one or more programs further including instructions for:

while displaying the second user interface of the user interface for editing the watch face:

visually indicating a first complication of the plurality of complications on the watch face;

while visually indicating the first complication, detecting an input; and in response to detecting the input, editing the first complication.

4. The electronic device of claim 3, wherein the watch face comprises an affordance representing an application, wherein the affordance is displayed as the first complication, wherein the affordance indicates a first set of information obtained from the application, and wherein editing the first complication comprises updating the affordance to indicate a second set of information obtained from the application.

5. The electronic device of claim 3, wherein the watch face comprises an affordance representing an application, wherein the affordance is displayed as the first complication, wherein the affordance indicates a first set of information obtained from the application, wherein editing the first complication comprises updating the affordance to indicate a second set of information obtained from a second application, and wherein the first and the second applications are different.

6. The electronic device of claim 3, the one or more programs further including instructions for:

while displaying the second user interface of the user interface for editing the watch face and visually indicating the first complication of the plurality of complications:

detecting a third contact; and in response to detecting the third contact:

ceasing to visually indicate the first complication; and visually indicating a second complication of the plurality of complications, the second complication different from the first complication.

7. The electronic device of claim 6, the one or more programs further including instructions for:

while displaying the second user interface of the user interface for editing the watch face and visually indicating the second complication, detecting a second input; and in response to detecting the second input, editing the second complication.

8. The electronic device of claim 1, the one or more programs further including instructions for:

displaying a paging affordance on the user interface for editing the watch face, wherein the paging affordance indicates an editable aspect of the watch face, a position of the editable aspect within a sequence of editable aspects, and a total number of editable aspects within the sequence of editable aspects.

9. The electronic device of claim 1, the one or more programs further including instructions for:

while displaying the user interface for editing the watch face:

displaying an indicator of position along a series of positions, the indicator indicating a first position along the series;

detecting a second input; and in response to detecting the second input, updating the indicator of position to indicate a second position along the series, wherein the indicator of position along a series of positions indicates a position of a currently displayed option for editing an aspect of the watch face.

10. The electronic device of claim 1, the one or more programs further including instructions for:

while displaying the user interface for editing the watch face, detecting an input; and in response to detecting the input:

ceasing to display the user interface for editing the watch face; and maintaining display of the watch face.

11. The electronic device of claim 1, the one or more programs further including instructions for:

while displaying the first user interface of the user interface for editing the watch face:

detecting an input; and in response to detecting the input, editing the indication of time.

12. The electronic device of claim 1, wherein:

the indication of time includes a plurality of visible divisions of time, and wherein the plurality comprises a first number of visible divisions of time; and the one or more programs further include instructions for:

detecting an input; and in response to detecting the input, changing the first number of visible divisions of time in the plurality of visible divisions of time to a second number of visible divisions of time in the plurality of visible divisions of time.

13. The electronic device of claim 12, wherein the second number is greater than the first number.

14. The electronic device of claim 12, wherein the second number is less than the first number.

15. A non-transitory computer-readable storage medium storing one or more programs configured to be executed by one or more processors of an electronic device with a touch-sensitive display device, the one or more programs including instructions for:

at a watch with a touch-sensitive display:

displaying a watch face that includes a plurality of complications and an indication of time, wherein the watch face that includes the plurality of complications and the indication of time is a first watch face of a plurality of watch faces;

while displaying the watch face, detecting a first contact on the touch-sensitive display;

in response to detecting the first contact on the touch-sensitive display, displaying a user interface for editing the watch face;

while displaying a first user interface of the user interface for editing the watch face that visually indicates that the first user interface is for editing the indication of time that is included in the watch face, detecting a second contact input on the touch-sensitive display;

in response to detecting the second contact on the touch-sensitive display, switching from displaying the first user interface of the user interface for editing the watch face to displaying a second user interface of the user interface for editing the watch face that visually indicates that the second user interface is for editing one or more complications of the plurality of complications on the watch face;

displaying a second watch face of the plurality of watch faces that includes a second plurality of complications and a second indication of time, wherein the second watch face of the plurality of watch faces is different from the first watch face of the plurality of watch faces;

while displaying the second watch face of the plurality of watch faces, detecting a third contact on the touch-sensitive display;

in response to detecting the third contact on the touch-sensitive display, displaying a user interface for editing the second watch face of the plurality of watch faces;

while displaying a first user interface of the user interface for editing the second watch face of the plurality of watch faces that visually indicates that the first user interface of the user interface for editing the second watch face of the plurality of watch faces is for editing the second indication of time, detecting a fourth contact on the touch-sensitive display; and in response to detecting the fourth contact on the touch-sensitive display, switching from displaying the first user interface of the user interface for editing the second watch face of the plurality of watch faces to displaying a second user interface of the user interface for editing the second watch face of the plurality of watch faces that visually indicates that the second user interface of the user interface for editing the second watch face of the plurality of watch faces is for editing one or more complications of the second plurality of complications on the second watch face of the plurality of watch faces.

16. A method, comprising:

at a watch with a touch-sensitive display:

displaying a watch face that includes a plurality of complications and an indication of time, wherein the watch face that includes the plurality of complications and the indication of time is a first watch face of a plurality of watch faces;

while displaying the watch face, detecting a first contact on the touch-sensitive display;

in response to detecting the first contact on the touch-sensitive display, displaying a user interface for editing the watch face;

while displaying a first user interface of the user interface for editing the watch face that visually indicates that the first user interface is for editing the indication of time that is included in the watch face, detecting a second contact input on the touch-sensitive display;

in response to detecting the second contact on the touch-sensitive display, switching from displaying the first user interface of the user interface for editing the watch face to displaying a second user interface of the user interface for editing the watch face that visually indicates that the second user interface is for editing one or more complications of the plurality of complications on the watch face;

displaying a second watch face of the plurality of watch faces that includes a second plurality of complications and a second indication of time, wherein the second watch face of the plurality of watch faces is different from the first watch face of the plurality of watch faces;

while displaying the second watch face of the plurality of watch faces, detecting a third contact on the touch-sensitive display;

in response to detecting the third contact on the touch-sensitive display, displaying a user interface for editing the second watch face of the plurality of watch faces;

while displaying a first user interface of the user interface for editing the second watch face of the plurality of watch faces that visually indicates that the first user interface of the user interface for editing the second watch face of the plurality of watch faces is for editing the second indication of time, detecting a fourth contact on the touch-sensitive display; and in response to detecting the fourth contact on the touch-sensitive display, switching from displaying the first user interface of the user interface for editing the second watch face of the plurality of watch faces to displaying a second user interface of the user interface for editing the second watch face of the plurality of watch faces that visually indicates that the second user interface of the user interface for editing the second watch face of the plurality of watch faces is for editing one or more complications of the second plurality of complications on the second watch face of the plurality of watch faces.

17. The non-transitory computer-readable storage medium of claim 15, wherein the second contact is a swipe.

18. The non-transitory computer-readable storage medium of claim 15, the one or more programs further including instructions for:

while displaying the second user interface of the user interface for editing the watch face:

visually indicating a first complication of the plurality of complications on the watch face;

while visually indicating the first complication, detecting an input; and in response to detecting the input, editing the first complication.

19. The non-transitory computer-readable storage medium of claim 18, wherein the watch face comprises an affordance representing an application, wherein the affordance is displayed as the first complication, wherein the affordance indicates a first set of information obtained from the application, and wherein editing the first complication comprises updating the affordance to indicate a second set of information obtained from the application.

20. The non-transitory computer-readable storage medium of claim 18, wherein the watch face comprises an affordance representing an application, wherein the affordance is displayed as the first complication, wherein the affordance indicates a first set of information obtained from the application, wherein editing the first complication comprises updating the affordance to indicate a second set of information obtained from a second application, and wherein the first and the second applications are different.

21. The non-transitory computer-readable storage medium of claim 18, the one or more programs further including instructions for:

while displaying the second user interface of the user interface for editing the watch face and visually indicating the first complication of the plurality of complications:

detecting a third contact; and in response to detecting the third contact:

ceasing to visually indicate the first complication; and visually indicating a second complication of the plurality of complications, the second complication different from the first complication.

22. The non-transitory computer-readable storage medium of claim 21, the one or more programs further including instructions for:

while displaying the second user interface of the user interface for editing the watch face and visually indicating the second complication, detecting a second input; and in response to detecting the second input, editing the second complication.

23. The non-transitory computer-readable storage medium of claim 15, the one or more programs further including instructions for:

displaying a paging affordance on the user interface for editing the watch face, wherein the paging affordance indicates an editable aspect of the watch face, a position of the editable aspect within a sequence of editable aspects, and a total number of editable aspects within the sequence of editable aspects.

24. The non-transitory computer-readable storage medium of claim 15, the one or more programs further including instructions for:

while displaying the user interface for editing the watch face:

displaying an indicator of position along a series of positions, the indicator indicating a first position along the series;

detecting a second input; and in response to detecting the second input, updating the indicator of position to indicate a second position along the series, wherein the indicator of position along a series of positions indicates a position of a currently displayed option for editing an aspect of the watch face.

25. The non-transitory computer-readable storage medium of claim 15, the one or more programs further including instructions for:

while displaying the user interface for editing the watch face, detecting an input; and in response to detecting the input:

ceasing to display the user interface for editing the watch face; and maintaining display of the watch face.

26. The non-transitory computer-readable storage medium of claim 15, the one or more programs further including instructions for:

while displaying the first user interface of the user interface for editing the watch face:

detecting an input; and in response to detecting the input, editing the indication of time.

27. The non-transitory computer-readable storage medium of claim 15, wherein:

the indication of time includes a plurality of visible divisions of time, and wherein the plurality comprises a first number of visible divisions of time; and the one or more programs further include instructions for:

detecting an input; and in response to detecting the input, changing the first number of visible divisions of time in the plurality of visible divisions of time to a second number of visible divisions of time in the plurality of visible divisions of time.

28. The non-transitory computer-readable storage medium of claim 27, wherein the second number is greater than the first number.

29. The non-transitory computer-readable storage medium of claim 27, wherein the second number is less than the first number.

30. The method of claim 16, wherein the second contact is a swipe.

31. The method of claim 16, further comprising:

while displaying the second user interface of the user interface for editing the watch face:

visually indicating a first complication of the plurality of complications on the watch face;

while visually indicating the first complication, detecting an input; and in response to detecting the input, editing the first complication.

32. The method of claim 31, wherein the watch face comprises an affordance representing an application, wherein the affordance is displayed as the first complication, wherein the affordance indicates a first set of information obtained from the application, and wherein editing the first complication comprises updating the affordance to indicate a second set of information obtained from the application.

33. The method of claim 31, wherein the watch face comprises an affordance representing an application, wherein the affordance is displayed as the first complication, wherein the affordance indicates a first set of information obtained from the application, wherein editing the first complication comprises updating the affordance to indicate a second set of information obtained from a second application, and wherein the first and the second applications are different.

34. The method of claim 31, further comprising:

while displaying the second user interface of the user interface for editing the watch face and visually indicating the first complication of the plurality of complications:

detecting a third contact; and in response to detecting the third contact:

ceasing to visually indicate the first complication; and visually indicating a second complication of the plurality of complications, the second complication different from the first complication.

35. The method of claim 34, further comprising:

while displaying the second user interface of the user interface for editing the watch face and visually indicating the second complication, detecting a second input; and in response to detecting the second input, editing the second complication.

36. The method of claim 16, further comprising:

displaying a paging affordance on the user interface for editing the watch face, wherein the paging affordance indicates an editable aspect of the watch face, a position of the editable aspect within a sequence of editable aspects, and a total number of editable aspects within the sequence of editable aspects.

37. The method of claim 16, further comprising:

while displaying the user interface for editing the watch face:

displaying an indicator of position along a series of positions, the indicator indicating a first position along the series;

detecting a second input; and in response to detecting the second input, updating the indicator of position to indicate a second position along the series, wherein the indicator of position along a series of positions indicates a position of a currently displayed option for editing an aspect of the watch face.

38. The method of claim 16, further comprising:

while displaying the user interface for editing the watch face, detecting an input; and in response to detecting the input:

ceasing to display the user interface for editing the watch face; and maintaining display of the watch face.

39. The method of claim 16, further comprising:

while displaying the first user interface of the user interface for editing the watch face:

detecting an input; and in response to detecting the input, editing the indication of time.

40. The method of claim 16, wherein:

the indication of time includes a plurality of visible divisions of time, and wherein the plurality comprises a first number of visible divisions of time; and the method further comprising:

detecting an input; and in response to detecting the input, changing the first number of visible divisions of time in the plurality of visible divisions of time to a second number of visible divisions of time in the plurality of visible divisions of time.

41. The method of claim 40, wherein the second number is greater than the first number.

42. The method of claim 40, wherein the second number is less than the first number.

* * * * *